US006216124B1

(12) United States Patent
Wakio et al.

(10) Patent No.: US 6,216,124 B1
(45) Date of Patent: Apr. 10, 2001

(54) DATABASE SYSTEM WITH ORIGINAL AND PUBLIC DATABASES AND DATA EXPLOITATION SUPPORT APPARATUS FOR DISPLAYING RESPONSE TO INQUIRY OF DATABASE SYSTEM

(75) Inventors: Koji Wakio; Hajime Shimizu, both of Kawasaki; Ichiro Watanabe, Odawara; Shoichi Arai, Kawasaki; Tsutomu Tanaka, Odawara; Yuji Terauchi, Kawasaki; Yasuhiro Watanabe, Odawara; Kazuhiro Takekawa, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/500,061

(22) Filed: Feb. 8, 2000

Related U.S. Application Data

(62) Division of application No. 08/576,933, filed on Dec. 22, 1995, now Pat. No. 6,065,014.

(30) Foreign Application Priority Data

Dec. 26, 1994 (JP) .................................................. 6-337128

(51) Int. Cl.[7] ................................................ G06F 17/30

(52) U.S. Cl. ................................ 707/3; 707/10; 707/104; 709/203; 709/211; 709/219; 709/220

(58) Field of Search ................................ 707/3, 10, 104; 709/203, 211, 219, 220

(56) References Cited

U.S. PATENT DOCUMENTS

| | | | |
|---|---|---|---|
| 4,710,870 | 12/1987 | Blackwell et al. .................. | 364/200 |
| 4,916,611 | 4/1990 | Doyle, Jr. et al. .................. | 364/401 |
| 5,301,105 | 4/1994 | Cummings, Jr. ..................... | 364/401 |
| 5,388,255 | 2/1995 | Pytlik et al. ........................ | 395/600 |
| 5,519,865 | 5/1996 | Kondo et al. ........................ | 707/1 |
| 5,581,461 | 12/1996 | Coll et al. ........................... | 395/205 |

(List continued on next page.)

FOREIGN PATENT DOCUMENTS

| | | |
|---|---|---|
| 5-165893 | 7/1993 | (JP) . |
| 6-119389 | 4/1994 | (JP) . |
| 6-195379 | 7/1994 | (JP) . |
| 6-290221 | 10/1994 | (JP) . |

OTHER PUBLICATIONS

J. Ueno, "Summary Information Service System SIMPLEX", Research Paper of Information Processing Society of Japan, vol. 87, No. 48, 1987 (DB–60), Jul. 20, 1987, pp. 5.1–5.8.

H. Shimizu, S. Ohta and N. Ishikawa, "Strategic Interactive Information System: STRACT", Fujitsu, vol. 41, No. 3, May 1990, pp. 256–263.

J. Ueno, "A Retrieval Interface Based on Montage Method for Statistical Summary Databases", Research Paper of the Institute of Electronics, Information and Communication Engineers (DE–88–15), vol. 88, No. 127, Jul. 20, 1988, pp. 25–32.

J. Ueno, S. Hiyoshi and Y. Nagai, "Summary Database: A Consideration About Graph Producing Function", Transactions of the 32nd (1986, the first half year) Annual Convention of Information Processing Society of Japan, Mar. 11, 1986, pp. 1883–1884.

*Primary Examiner*—Jean R. Homere
(74) *Attorney, Agent, or Firm*—Staas & Halsey LLP

(57) ABSTRACT

The data, as read out from a trunk database, and the read-out data, as processed, are stored in a public database. A setup unit and an operations support unit manage the stored data of the public database and the attribute data of the stored data by a dictionary. In accordance with a demand of a user, an inquiry unit processes and displays the data on the basis of the data stored in the public database and the attribute data.

12 Claims, 242 Drawing Sheets

U.S. PATENT DOCUMENTS

| | | | | |
|---|---|---|---|---|
| 5,703,938 | * | 12/1997 | Lucas et al. | 379/112 |
| 5,778,377 | | 7/1998 | Marlin et al. | 707/103 |
| 5,781,896 | | 7/1998 | Dalal | 707/2 |
| 5,802,511 | * | 9/1998 | Kouchi et al. | 707/2 |
| 5,822,532 | | 10/1998 | Ikeda | 709/224 |
| 5,946,689 | * | 8/1999 | Yanaka et al. | 707/10 |

* cited by examiner

EXTRACTED JOB DATA RECORDING AREA

D1

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA | ... |
|---|---|---|---|---|---|---|---|
| : | : | : | : | : | : | : | : |
| : | : | : | : | : | : | : | : |
| inx | outx | %EXTRACTX | 1993.05.10 | | 1993.06.10 | FINISHED | |
| : | : | : | : | : | : | : | : |

FIG. 7

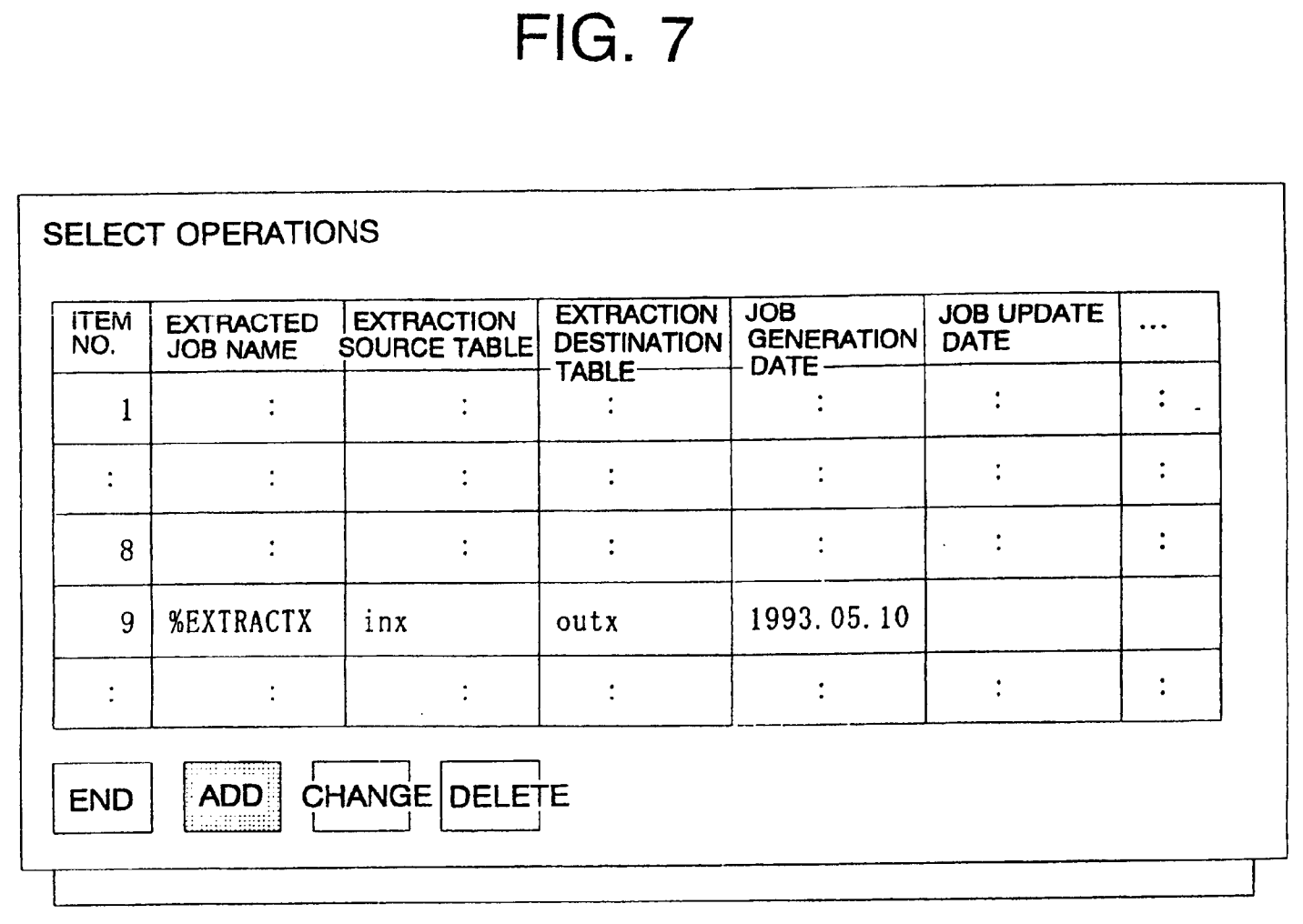

SELECT OPERATIONS

| ITEM NO. | EXTRACTED JOB NAME | EXTRACTION SOURCE TABLE | EXTRACTION DESTINATION TABLE | JOB GENERATION DATE | JOB UPDATE DATE | ... |
|---|---|---|---|---|---|---|
| 1 | : | : | : | : | : | : |
| : | : | : | : | : | : | : |
| 8 | : | : | : | : | : | : |
| 9 | %EXTRACTX | inx | outx | 1993.05.10 | | |
| : | : | : | : | : | : | : |

END ADD CHANGE DELETE

DEFINE ATTRIBUTE OF EXTRACTED JOB

EXTRACTED JOB NAME : EXTRACT1

EXTRACTION SOURCE
SCHEMA NAME : work , TABLE NAME : out

EXTRACTION DESTINATION
SCHEMA NAME : x

CREATOR : TSUKO FUJI

[OK] [CANCEL]

SELECT TABLE TO BE EXTRACTED

| ITEM NO. | TABLE NAME | SCHEMA NAME |
|---|---|---|
| 1 | WORK | in |
| 2 | WORK1 | in |
| 3 | WORK2 | in |

END    O K

FIG. 10

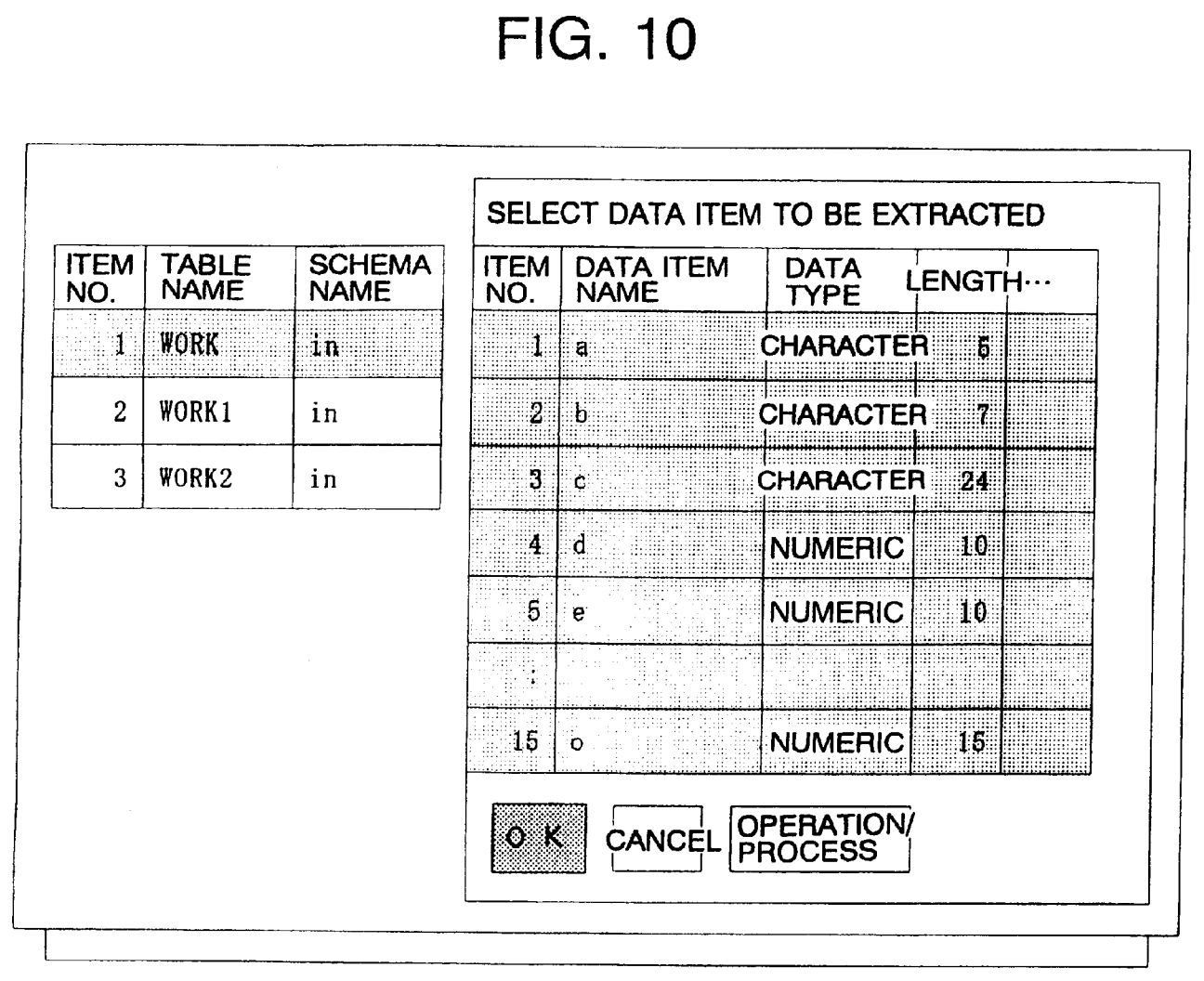

| ITEM NO. | TABLE NAME | SCHEMA NAME |
|---|---|---|
| 1 | WORK | in |
| 2 | WORK1 | in |
| 3 | WORK2 | in |

SELECT DATA ITEM TO BE EXTRACTED

| ITEM NO. | DATA ITEM NAME | DATA TYPE | LENGTH… | |
|---|---|---|---|---|
| 1 | a | CHARACTER | 5 | |
| 2 | b | CHARACTER | 7 | |
| 3 | c | CHARACTER | 24 | |
| 4 | d | NUMERIC | 10 | |
| 5 | e | NUMERIC | 10 | |
| : | | | | |
| 15 | o | NUMERIC | 15 | |

O K

CANCEL

OPERATION/PROCESS

FIG. 11

EXTRACTED JOB RECORDING AREA

```
SELECT a,b,c,d,e,f,g,h,i,j,k,l,m,n,o FROM WORK.in
```

| ITEM NO. | DATA ITEM NAME | DATA TYPE | LENGTH |
|---|---|---|---|
| 1 | a | CHARACTER | 5 |
| 2 | b | CHARACTER | 7 |
| 3 | c | CHARACTER | 24 |
| 4 | d | NUMERIC | 10 |
| 5 | e | NUMERIC | 10 |
| : | | | |
| 15 | o | NUMERIC | 15 |

SELECT PROCESS

| ITEM NO. | CONDITION | LINK |
|---|---|---|
| 1 | a LIKE '1%' | |

[ADD] [CHANGE] [DELETE]

EXTRACTED JOB RECORDING AREA

```
SELECT a, b, c, d, e, f, g, h, i, j, k, l, m, n, o FROM WORK. in
       WHERE a LIKE '1%' INTO x. out
```

FIG. 16

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | JOG EXECUTE DATE | BASIC DATA | ... |
|---|---|---|---|---|---|---|---|
| : | : | : | : | : | : | : | : |
| : | : | : | : | : | : | : | : |
| in | out | EXTRACT1 | 1993.06.10 | | | NOT FINISHED | |
| inx | outx | %EXTRACTX | 1993.05.10 | | 1993.06.10 | FINISHED | |
| : | : | : | : | : | : | : | : |

EXTRACTED JOB RECORDING AREA

```
SELECT a,b,c,d,e,f,g,h,i,j,k,l,m,n,o FROM WORK.in
     WHERE a LIKE '1%' INTO x.out
```

FIG. 17

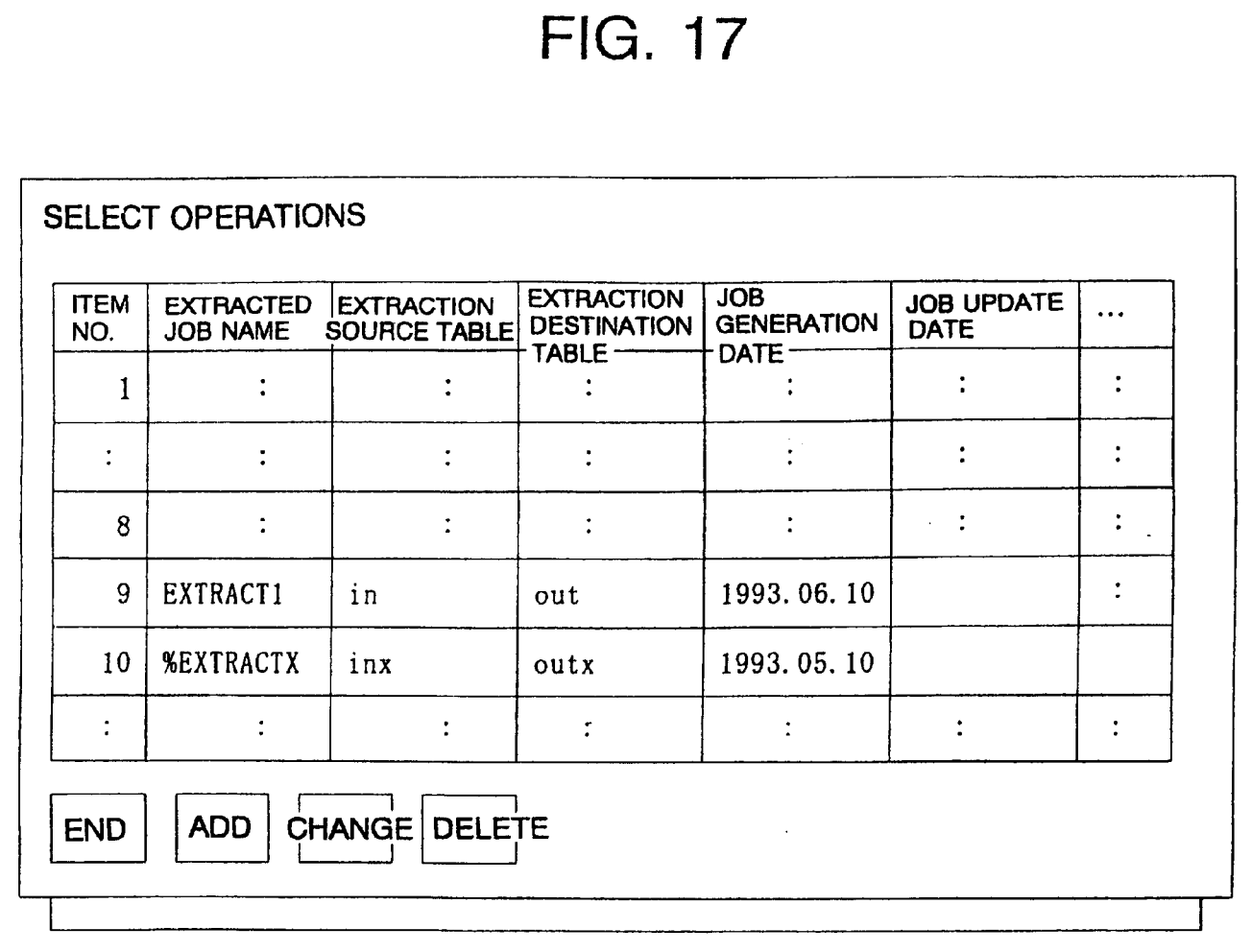

SELECT OPERATIONS

| ITEM NO. | EXTRACTED JOB NAME | EXTRACTION SOURCE TABLE | EXTRACTION DESTINATION TABLE | JOB GENERATION DATE | JOB UPDATE DATE | ... |
|---|---|---|---|---|---|---|
| 1 | : | : | : | : | : | : |
| : | : | : | : | : | : | : |
| 8 | : | : | : | : | : | : |
| 9 | EXTRACT1 | in | out | 1993. 06. 10 | | : |
| 10 | %EXTRACTX | inx | outx | 1993. 05. 10 | | |
| : | : | : | : | : | : | : |

END ADD CHANGE DELETE

FIG. 18

SELECT EXTRACTED JOB TO BE EXECUTED

| ITEM NO. | EXTRACTED JOB NAME | EXTRACTION SOURCE TABLE | EXTRACTION DESTINATION TABLE | JOB GENERATION DATE | JOB EXECUTION DATE | ... |
|---|---|---|---|---|---|---|
| 1 | : | : | : | : | : | : |
| : | : | : | : | : | : | : |
| 8 | : | : | : | : | : | : |
| 9 | EXTRACT1 | in | out | 1993. 06. 10 | | : |
| 10 | %EXTRACTX | inx | outx | 1993. 05. 10 | 1993. 07. 10 | |
| : | : | : | : | : | : | : |

OK NARROW END

SELECT EXTRACTED JOB TO BE EXECUTED

| ITEM NO. | EXTRACTED JOB NAME | EXTRACTION SOURCE TABLE | EXTRACTION DESTINATION TABLE | JOB GENERATION DATE | JOB EXECUTION DATE | ... |
|---|---|---|---|---|---|---|
| 1 | .. | .. | .. | .. | .. | .. |
| .. | .. | .. | .. | .. | .. | .. |
| 8 | .. | .. | .. | .. | .. | .. |
| 9 | EXTRACT1 | in | out | 1993.06.10 | | .. |
| 10 | %EXTRACTX | inx | outx | 1993.05.10 | 1993.07.10 | |
| .. | .. | .. | .. | .. | .. | |

EXECUTION OF EXTRACTED JOB HAS BEEN NORMALLY COMPLETED.
IS FETCH OF BASIC DATA OF DATA ITEM EXECUTED?
■ YES  □ NO

[OK]  [NARROW]  [END]

FIG. 20

TABLE MANAGE DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | COMMODITY MASTER | X | 15 | 150 | | 1993. 05. 12 | | |
| BB | CUSTOMER MASTER | X | 21 | 1567 | | 1993. 05. 12 | | |
| CC | SALES DATA OF MAY | Y | 30 | 5432 | | 1993. 05. 12 | | |
| out | BUSINESS OFFICE MASTER | X | 15 | 150 | | 1993. 08. 10 | | |
| : | : | : | : | : | : | : | : | |

FIG. 22

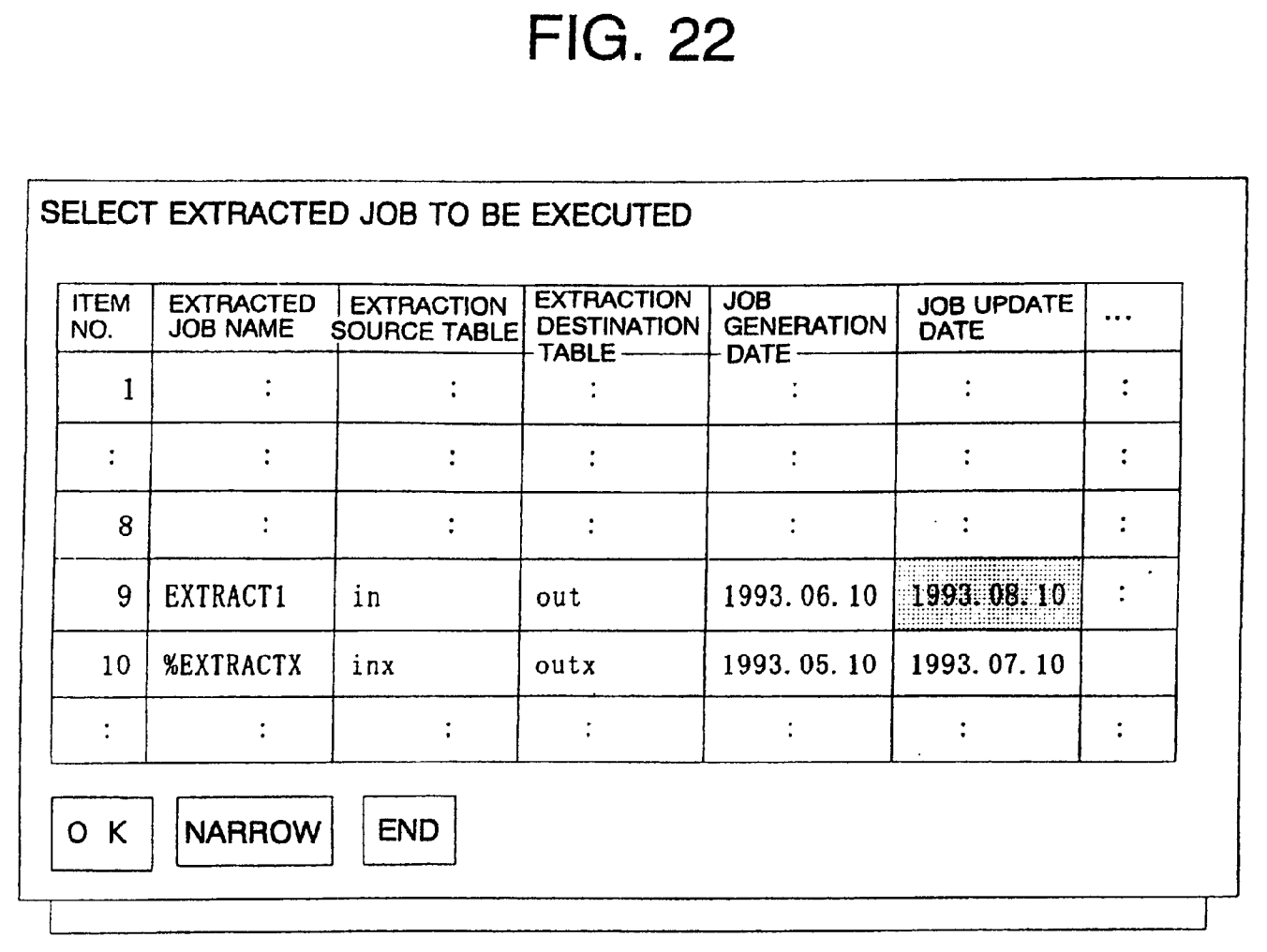

SELECT EXTRACTED JOB TO BE EXECUTED

| ITEM NO. | EXTRACTED JOB NAME | EXTRACTION SOURCE TABLE | EXTRACTION DESTINATION TABLE | JOB GENERATION DATE | JOB UPDATE DATE | ... |
|---|---|---|---|---|---|---|
| 1 | : | : | : | : | : | : |
| : | : | : | : | : | : | : |
| 8 | : | : | : | : | : | : |
| 9 | EXTRACT1 | in | out | 1993.06.10 | 1993.08.10 | : |
| 10 | %EXTRACTX | inx | outx | 1993.05.10 | 1993.07.10 | |
| : | : | : | : | : | : | : |

O K | NARROW | END

FIG. 24

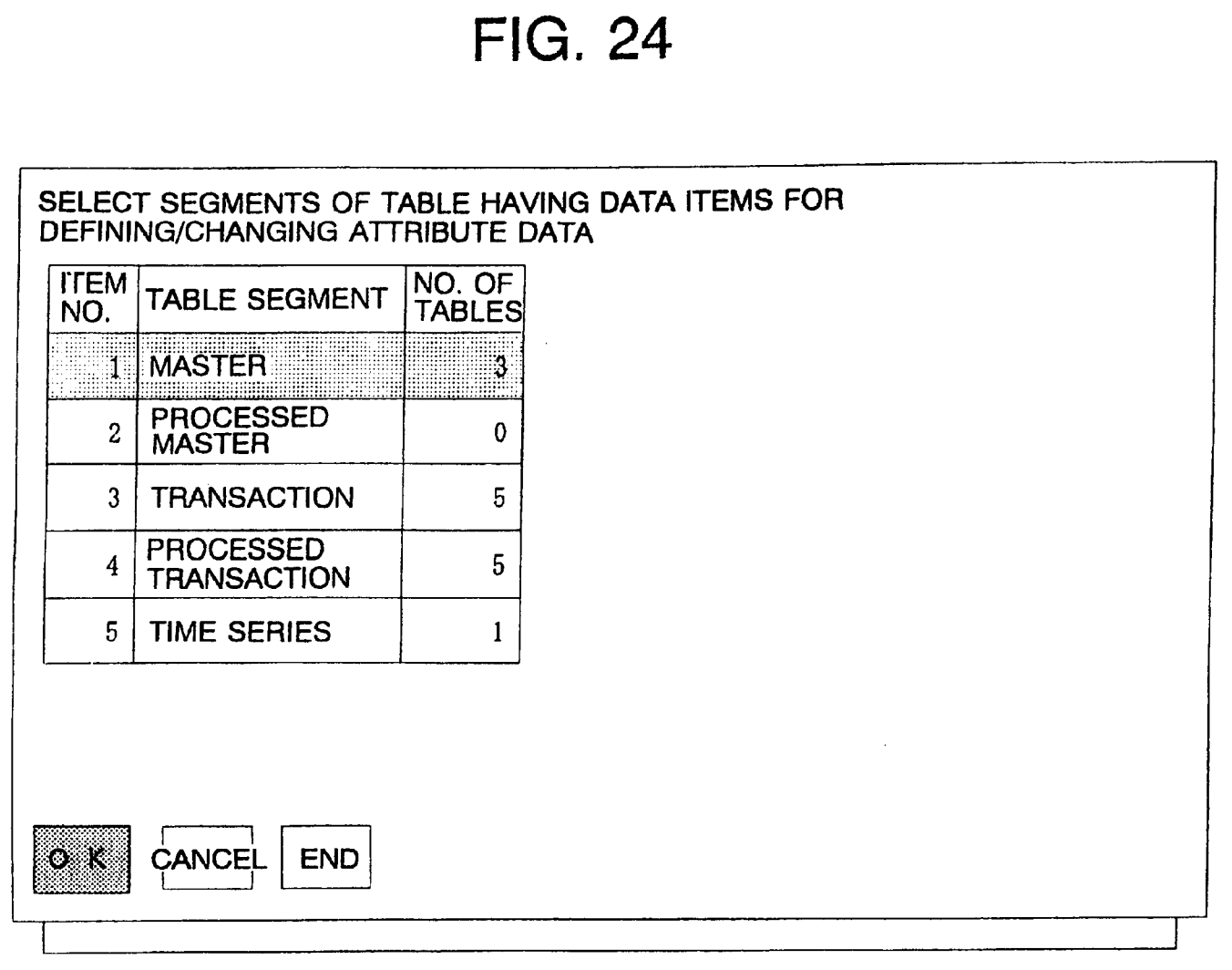

SELECT SEGMENTS OF TABLE HAVING DATA ITEMS FOR DEFINING/CHANGING ATTRIBUTE DATA

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |

O K CANCEL END

FIG. 25

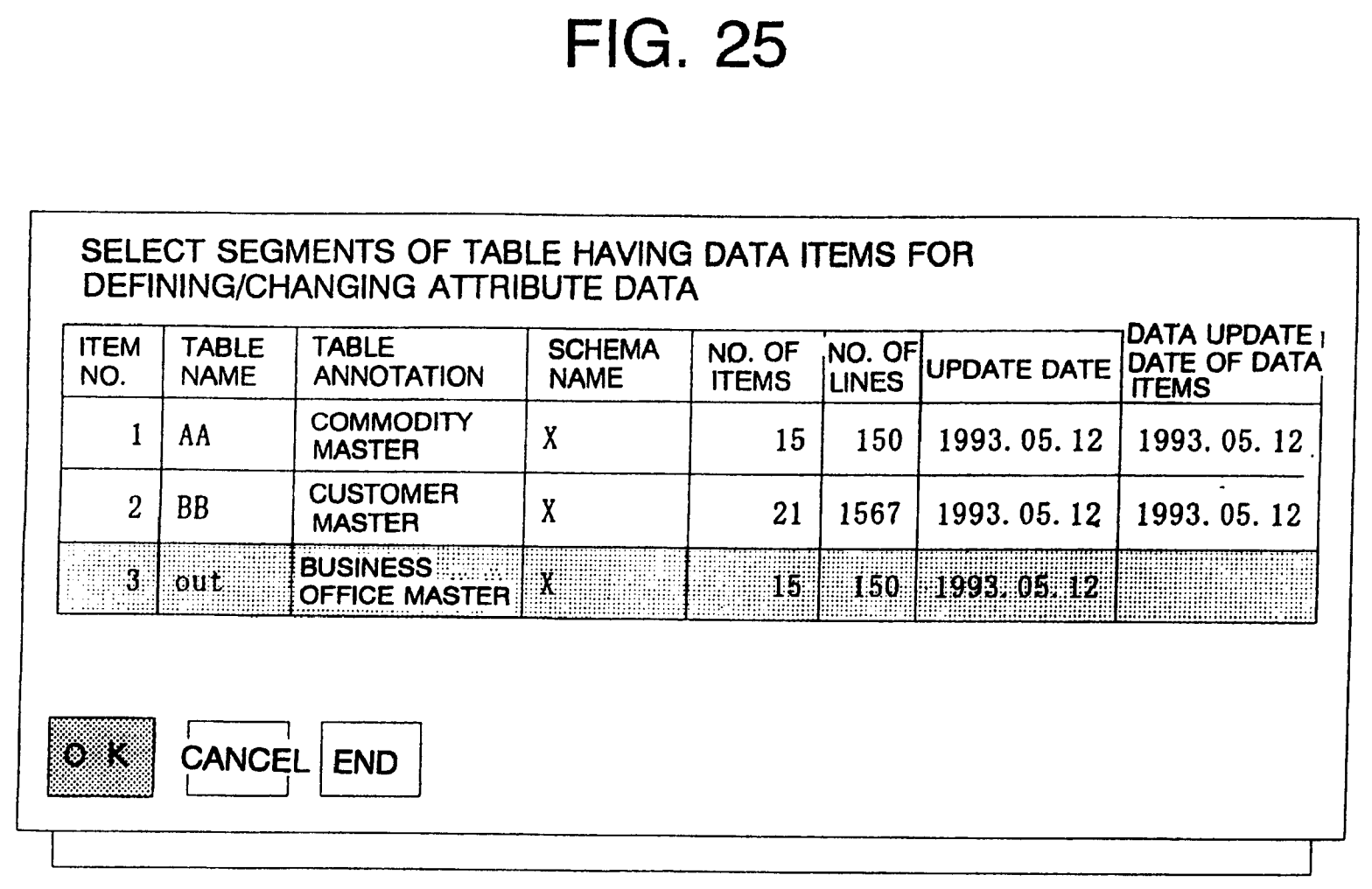

SELECT SEGMENTS OF TABLE HAVING DATA ITEMS FOR DEFINING/CHANGING ATTRIBUTE DATA

| ITEM NO. | TABLE NAME | TABLE ANNOTATION | SCHEMA NAME | NO. OF ITEMS | NO. OF LINES | UPDATE DATE | DATA UPDATE DATE OF DATA ITEMS |
|---|---|---|---|---|---|---|---|
| 1 | AA | COMMODITY MASTER | X | 15 | 150 | 1993. 05. 12 | 1993. 05. 12 |
| 2 | BB | CUSTOMER MASTER | X | 21 | 1567 | 1993. 05. 12 | 1993. 05. 12 |
| 3 | out | BUSINESS OFFICE MASTER | X | 15 | 150 | 1993. 05. 12 | |

O K | CANCEL | END

DEFINE/UPDATE DATA

HEADER: BUSINESS OFFICE CODE
UNIT: _____
EDITION FORMAT: _____
SEGMENT ☐ DATA ■ CODE ☐ LABEL
UNIFIED NAME: _____
CALENDAR: _____

[ O K ]   [CANCEL]   [SELECT CALENDAR]   [SELECT UNIT]

| NAME | DATA CLASS | DATA TYPE |
|------|-----------|-----------|
| a | REAL DATA | CHARACTER |
| b | REAL DATA | CHARACTER |
| c | REAL DATA | NUMERIC |
| : | : | |
| o | REAL DATA | NUMERIC |

[CANCEL]

DEFINE/UPDATE DATA

HEADER: BUSINESS OFFICE CODE
UNIT: _____
EDITION FORMAT: _____
SEGMENT ☐ DATA ■ CODE ☐ LABEL
UNIFIED NAME: BUSINESS OFFICE _____
CALENDAR : _____

[ O K ]  [CANCEL]  [SELECT CALENDAR]  [SELECT UNIT]

| NAME | DATA CLASS | DATA TYPE |
|------|------------|-----------|
| a | REAL DATA | CHARACTER |
| b | REAL DATA | CHARACTER |
| c | REAL DATA | NUMERIC |
| : : | | |
| o | REAL DATA | NUMERIC |

[CANCEL]

SELECT CODE CORRESPONDING TO LABEL

| NAME | DATA CLASS | DATA TYPE |
|------|------------|-----------|
| a | REAL DATA | CHARACTER ← |
| b | REAL DATA | CHARACTER |
| c | REAL DATA | NUMERIC |
| : | | |
| o | REAL DATA | NUMERIC |

CANCEL

HEADER: BUSINESS OFFICE NAME
UNIT:
EDITION FORMAT:
SEGMENT
☐ DATA ☐ CODE ■ LABEL
CORRESPONDING CODE: a
CALENDAR:

DECIDE  CANCEL  SELECT CALENDAR  SELECT UNIT

DEFINE/UPDATE DATA

HEADER: NO. OF BUSINESS CLERKS
UNIT: PERSONS
EDITION FORMAT: ZZZ9
SEGMENT
■ DATA □ CODE □ LABEL
CALENDAR: _____

[OK] [CANCEL] [SELECT CALENDAR] [SELECT UNIT]

| NAME | DATA CLASS | DATA TYPE |
|------|------------|-----------|
| a    | REAL DATA  | CHARACTER |
| b    | REAL DATA  | CHARACTER |
| c    | REAL DATA  | NUMERIC   |
| :    |            |           |
| o    | REAL DATA  | NUMERIC   |

[CANCEL]

FIG. 34

TABLE MANAGE DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | COMMODITY MASTER | X | 15 | 150 | 1 | 1993. 05. 12 | | |
| BB | CUSTOMER MASTER | X | 21 | 1567 | 1 | 1993. 05. 12 | | |
| CC | SALES DATA OF MAY | Y | 30 | 5432 | 3 | 1993. 05. 12 | | |
| : | : | : | : | : | : | : | : | |
| out | BUSINESS OFFICE MASTER | X | 15 | 150 | 0 | 1993. 05. 12 | | |
| : | : | : | : | : | : | : | : | |

FIG. 35

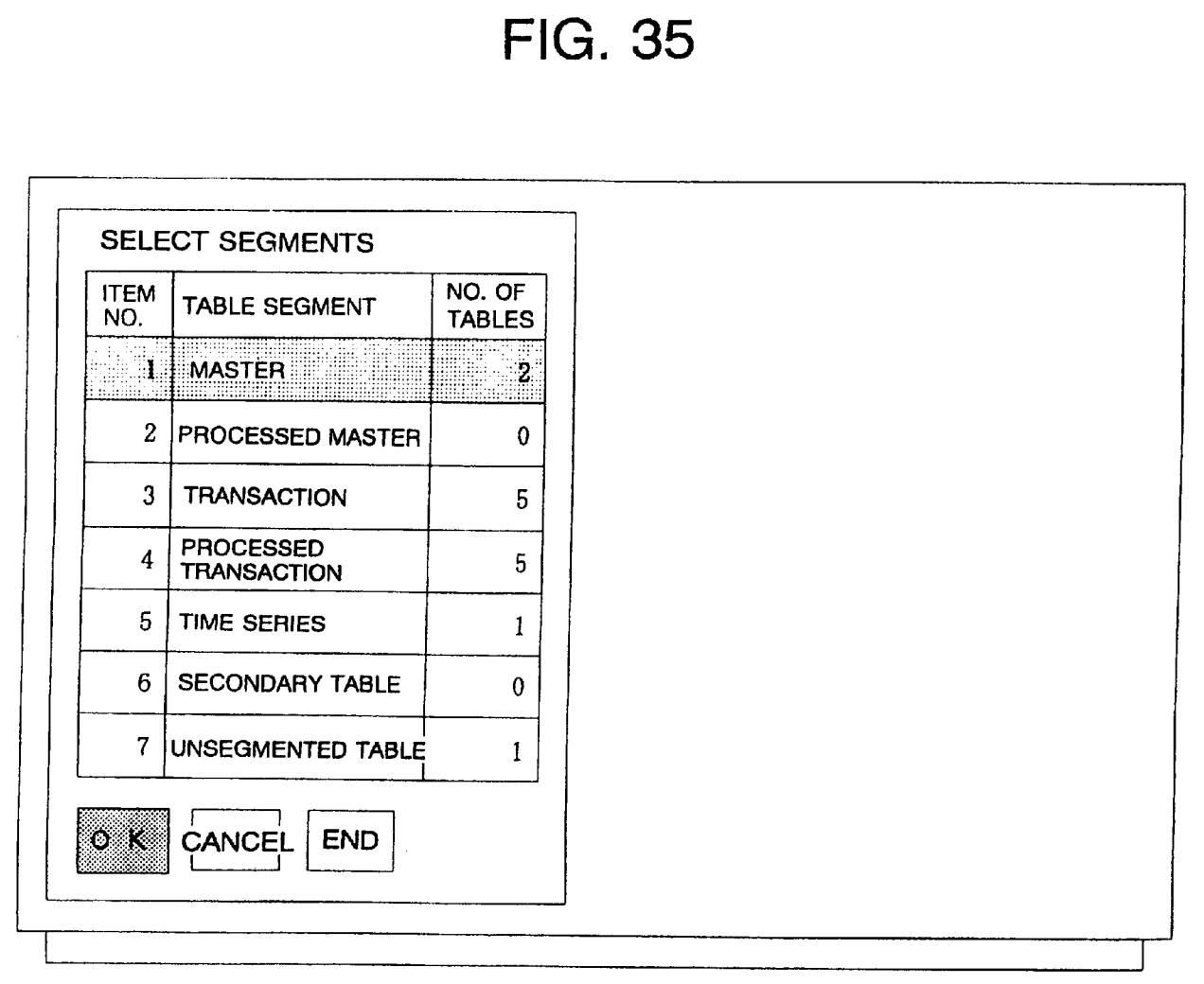

SELECT SEGMENTS

| ITEM NO. | TABLE SEGMENT | NO. OF TABLES |
|---|---|---|
| 1 | MASTER | 2 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 1 |

OK CANCEL END

| ITEM NO. | TABLE SEGMENT | NO. OF TABLES |
|---|---|---|
| 1 | MASTER | 2 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 1 |

[ O K ] [ CANCEL ] [ END ]

SUMMARY OF MASTER DATA

| ITEM NO. | TABLE NAME | TABLE ANNOTATION | NO. OF ITEMS |
|---|---|---|---|
| 1 | AA | COMMODITY MASTER | 15 |
| 2 | BB | CUSTOMER MASTER | 21 |

[ CANCEL ]

| ITEM NO. | TABLE SEGMENT | NO. OF TABLES |
|---|---|---|
| 1 | MASTER | 2 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 1 |

[ OK ] [ CANCEL ] [ END ]

SUMMARY OF UNSEGMENTED TABLE

| ITEM NO. | TABLE NAME | TABLE ANNOTATION | NO. OF ITEMS |
|---|---|---|---|
| 1 | out | BUSINESS OFFICE MASTER | 15 |

[ CANCEL ]

SUMMARY OF UNSEGMENTED TABLE

| ITEM NO. | TABLE NAME | TABLE ANNOTATION | NO. OF ITEMS |
|---|---|---|---|
| 1 | out | BUSINESS OFFICE MASTER | 15 |

CANCEL

| ITEM NO. | TABLE SEGMENT | NO. OF TABLES |
|---|---|---|
| 1 | MASTER | 2 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 1 |

O K   CANCEL   END

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 0 |

[ O K ] [ CANCEL ] [ END ]

SUMMARY OF UNSEGMENTED TABLE

| ITEM NO. | TABLE NAME | TABLE ANNOTATION | NO. OF ITEMS |
|---|---|---|---|

[ CANCEL ]

FIG. 40

TABLE MANAGE DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | COMMODITY MASTER | X | 15 | 150 | 1 | 1993. 05. 12 | | |
| BB | CUSTOMER MASTER | X | 21 | 1567 | 1 | 1993. 05. 12 | | |
| CC | SALES DATA OF MAY | Y | 30 | 5432 | 3 | 1993. 05. 12 | | |
| : | : | : | : | : | : | : | : | |
| out | BUSINESS OFFICE MASTER | X | 15 | 150 | 1 | 1993. 05. 12 | | |
| : | : | : | : | : | : | : | : | |

FIG. 41

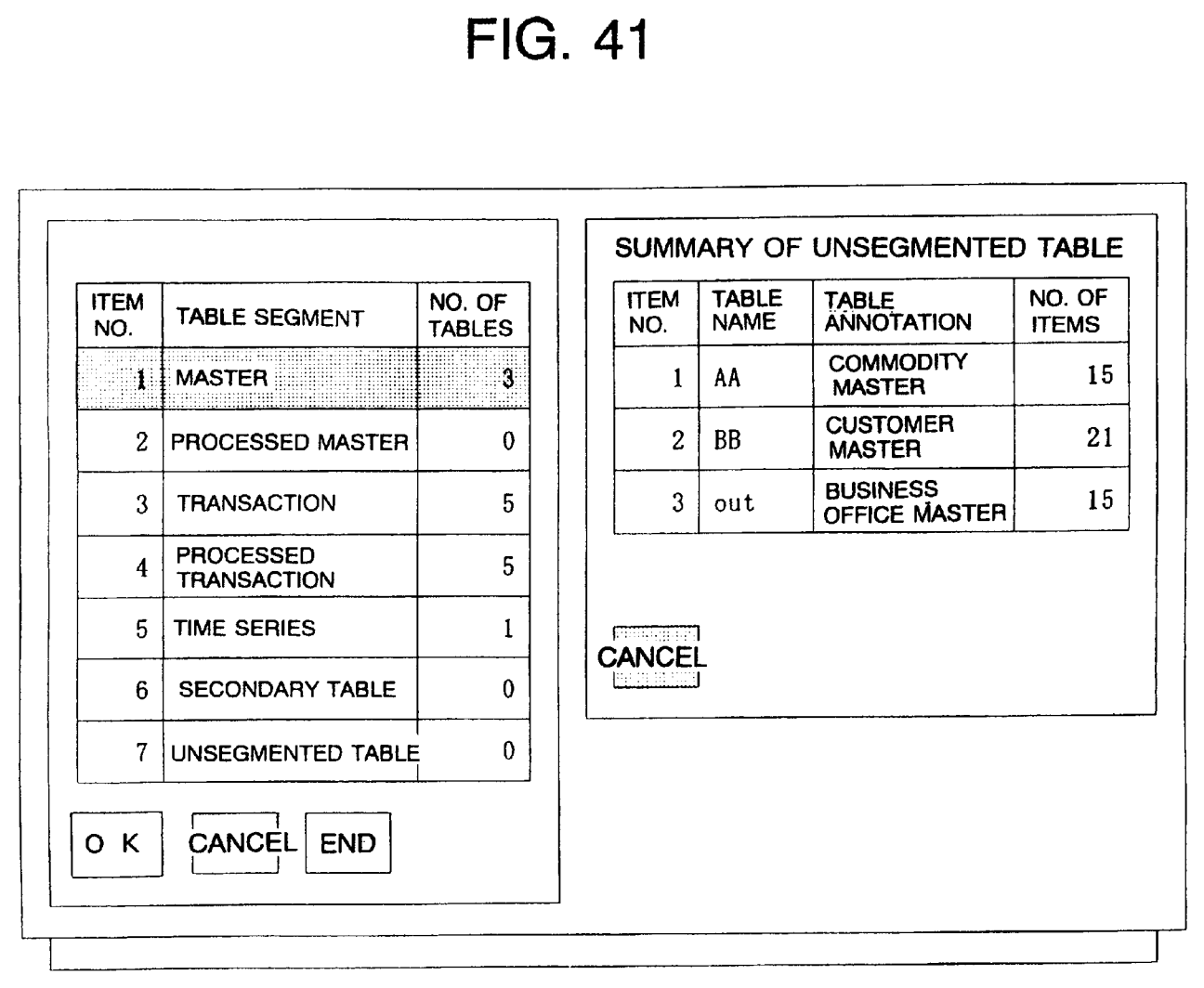

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |
| 7 | UNSEGMENTED TABLE | 0 |

O K CANCEL END

SUMMARY OF UNSEGMENTED TABLE

| ITEM NO. | TABLE NAME | TABLE ANNOTATION | NO. OF ITEMS |
|---|---|---|---|
| 1 | AA | COMMODITY MASTER | 15 |
| 2 | BB | CUSTOMER MASTER | 21 |
| 3 | out | BUSINESS OFFICE MASTER | 15 |

CANCEL

FIG. 42

TABLE MANAGE DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | COMMODITY MASTER | X | 15 | 150 | 1 | 1993. 05. 12 | YES | |
| BB | CUSTOMER MASTER | X | 21 | 1567 | 1 | 1993. 05. 12 | NO | |
| CC | SALES DATA OF MAY | Y | 30 | 5432 | 3 | 1993. 05. 12 | YES | |
| : | : | : | : | : | : | : | : | |
| out | BUSINESS OFFICE MASTER | x | 15 | 150 | 1 | 1993. 05. 12 | NO | |
| : | : | : | : | : | : | : | : | |

FIG. 43

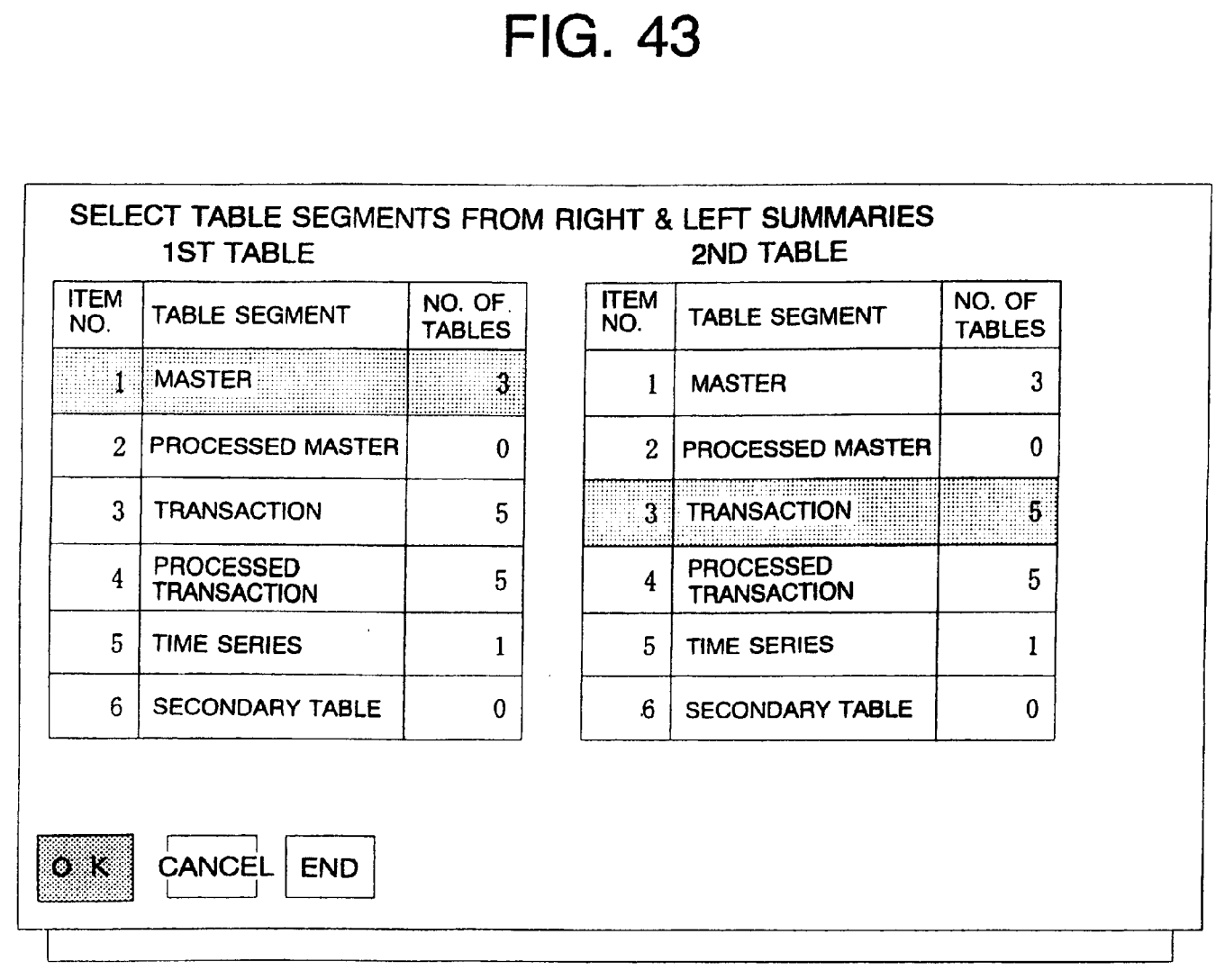

SELECT TABLE SEGMENTS FROM RIGHT & LEFT SUMMARIES

1ST TABLE

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |

2ND TABLE

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SECONDARY TABLE | 0 |

O K CANCEL END

FIG. 44

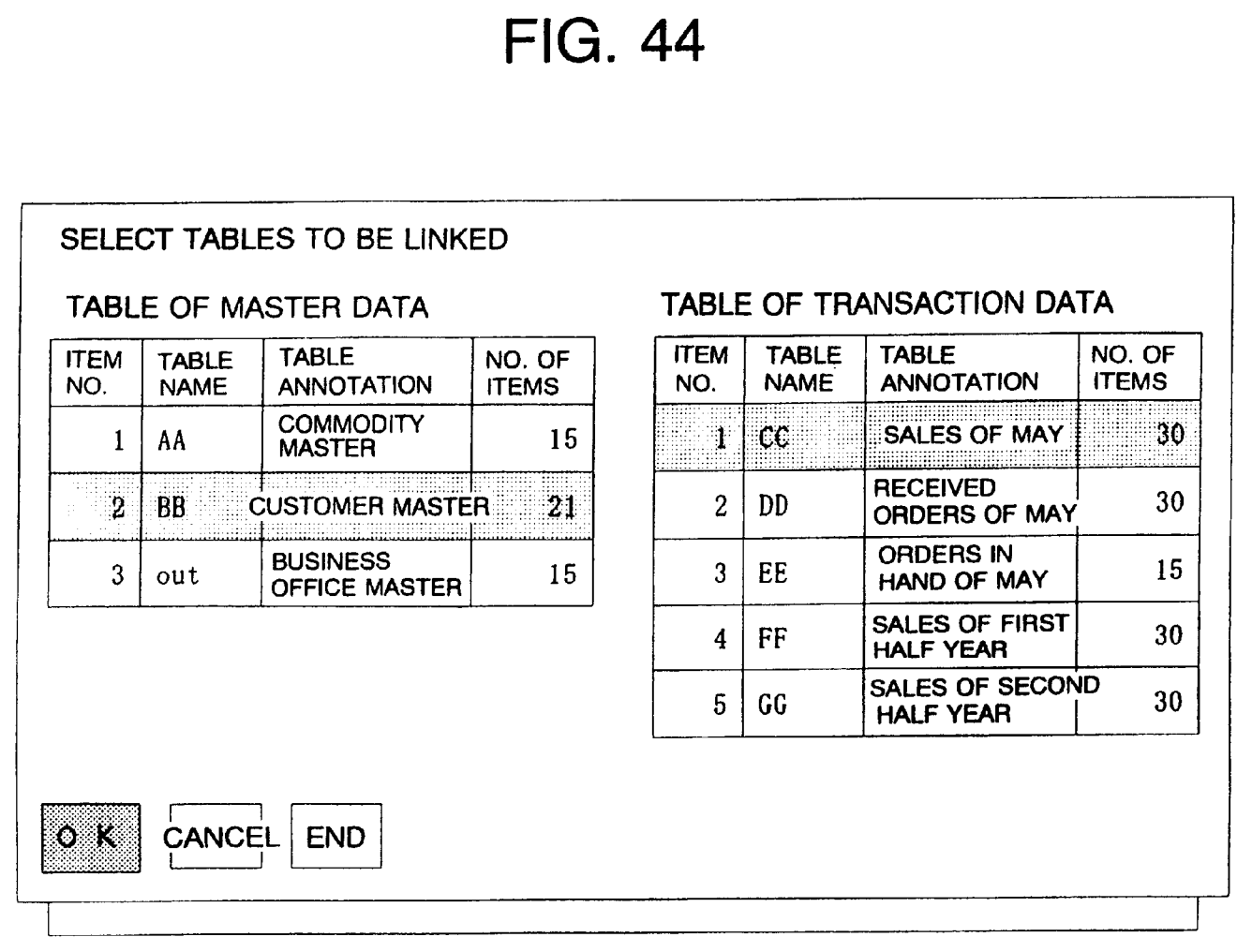

SELECT TABLES TO BE LINKED

TABLE OF MASTER DATA

| ITEM NO. | TABLE NAME | TABLE ANNOTATION | NO. OF ITEMS |
|---|---|---|---|
| 1 | AA | COMMODITY MASTER | 15 |
| 2 | BB | CUSTOMER MASTER | 21 |
| 3 | out | BUSINESS OFFICE MASTER | 15 |

TABLE OF TRANSACTION DATA

| ITEM NO. | TABLE NAME | TABLE ANNOTATION | NO. OF ITEMS |
|---|---|---|---|
| 1 | CC | SALES OF MAY | 30 |
| 2 | DD | RECEIVED ORDERS OF MAY | 30 |
| 3 | EE | ORDERS IN HAND OF MAY | 15 |
| 4 | FF | SALES OF FIRST HALF YEAR | 30 |
| 5 | GG | SALES OF SECOND HALF YEAR | 30 |

O K | CANCEL | END

FIG. 45

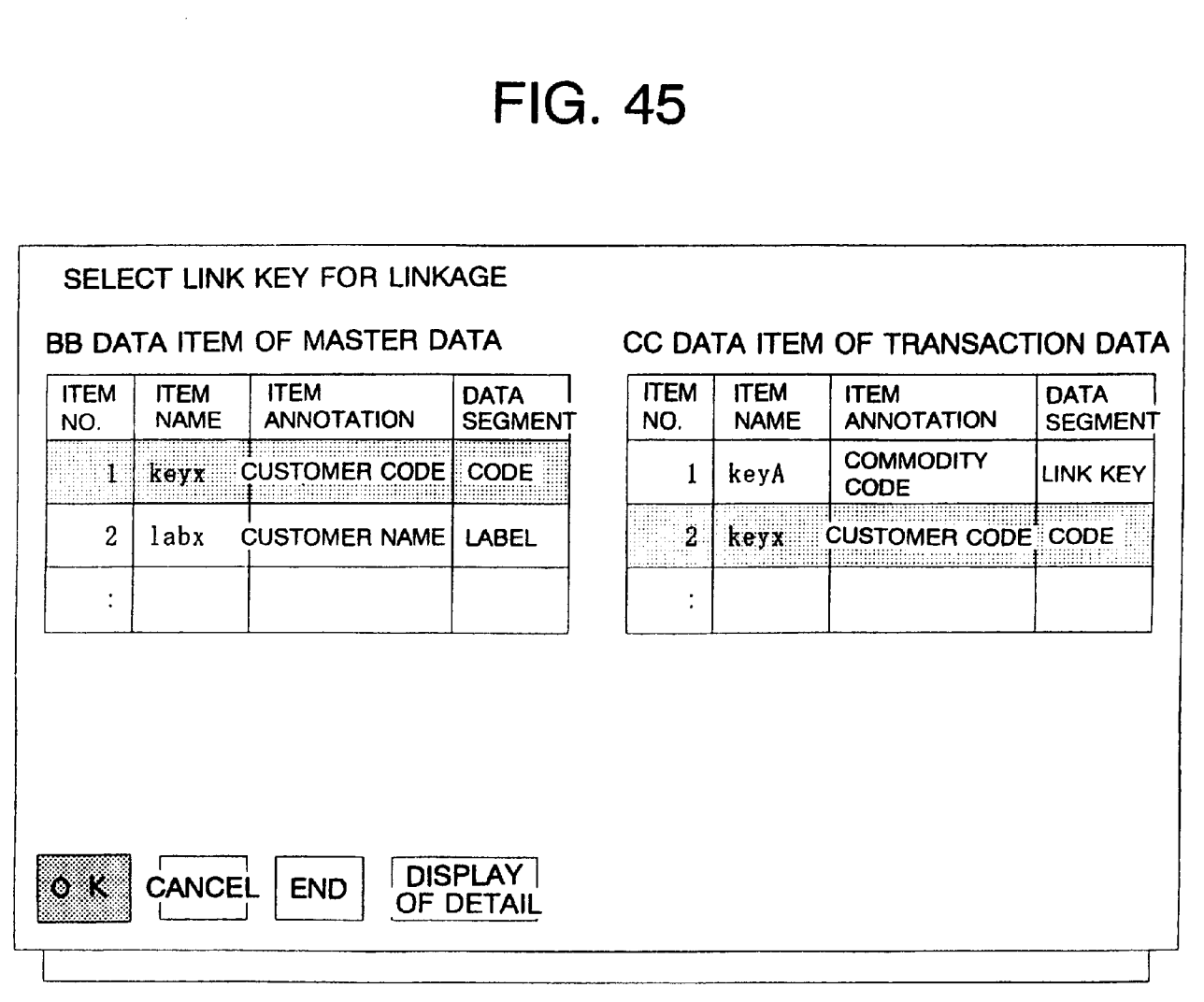

SELECT LINK KEY FOR LINKAGE

BB DATA ITEM OF MASTER DATA

| ITEM NO. | ITEM NAME | ITEM ANNOTATION | DATA SEGMENT |
|---|---|---|---|
| 1 | keyx | CUSTOMER CODE | CODE |
| 2 | labx | CUSTOMER NAME | LABEL |
| : | | | |

CC DATA ITEM OF TRANSACTION DATA

| ITEM NO. | ITEM NAME | ITEM ANNOTATION | DATA SEGMENT |
|---|---|---|---|
| 1 | keyA | COMMODITY CODE | LINK KEY |
| 2 | keyx | CUSTOMER CODE | CODE |
| : | | | |

OK CANCEL END DISPLAY OF DETAIL

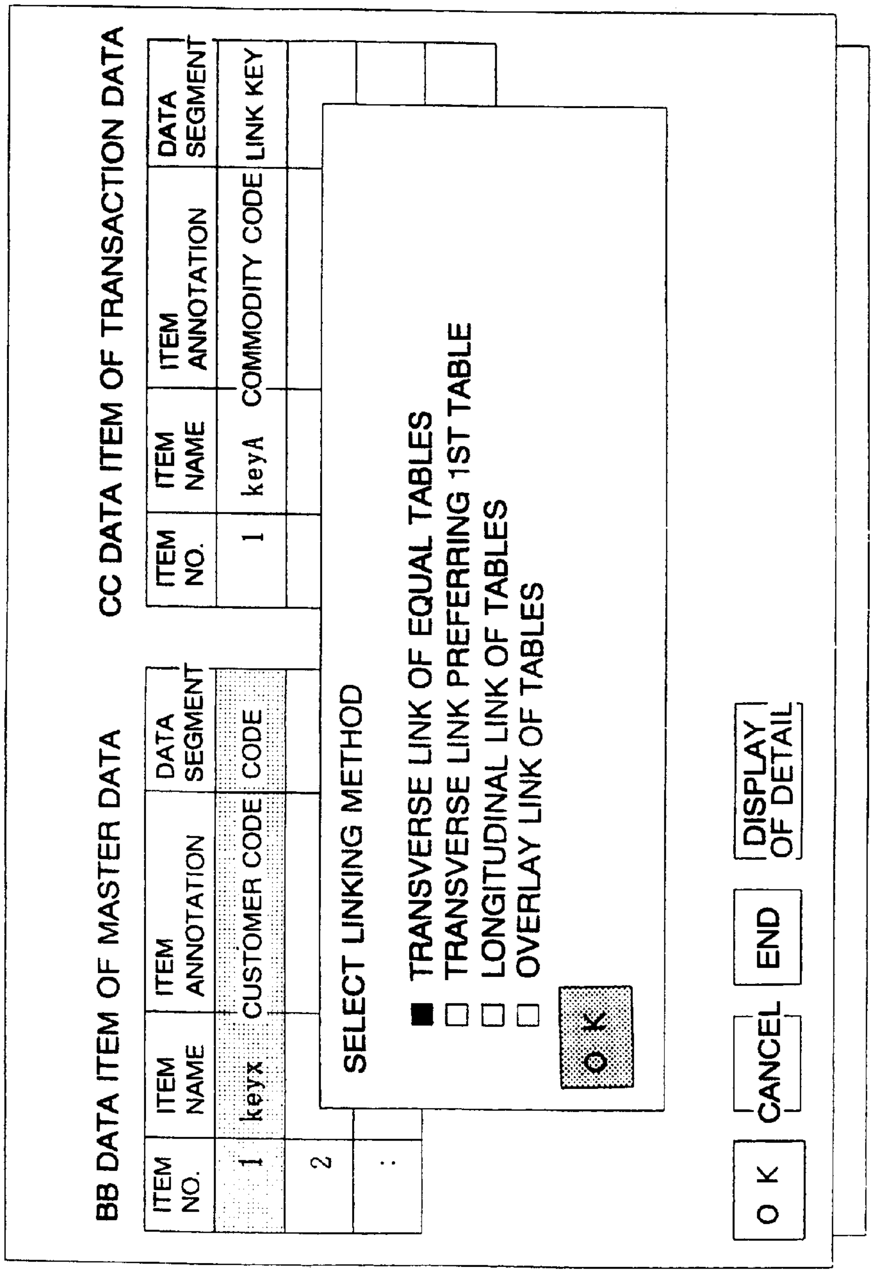

FIG. 46

BB DATA ITEM OF MASTER DATA

| ITEM NO. | ITEM NAME | ITEM ANNOTATION | DATA SEGMENT |
|---|---|---|---|
| 1 | keyx | CUSTOMER CODE | CODE |
| 2 | | | |
| .. | | | |

CC DATA ITEM OF TRANSACTION DATA

| ITEM NO. | ITEM NAME | ITEM ANNOTATION | DATA SEGMENT |
|---|---|---|---|
| 1 | keyA | COMMODITY CODE | LINK KEY |
| | | | |
| | | | |

SELECT LINKING METHOD

■ TRANSVERSE LINK OF EQUAL TABLES
☐ TRANSVERSE LINK PREFERRING 1ST TABLE
☐ LONGITUDINAL LINK OF TABLES
☐ OVERLAY LINK OF TABLES

[ O K ]

[ O K ] [ CANCEL ] [ END ] [ DISPLAY OF DETAIL ]

FIG. 47

| CODE | LINKING METHOD |
|---|---|
| 1 | TRANSVERSE LINK OF EQUAL TABLES |
| 2 | TRANSVERSE LINK PREFERRING 1ST TABLE |
| 3 | LONGITUDINAL LINK OF TABLES |
| 4 | OVERLAY LINK OF TABLES |

FIG. 48

TABLE LINK MANAGING DATA AREA

| 1ST TABLE NAME | 2ND TABLE NAME | NO. OF LINK KEYS | LINK KEY OF 1ST TABLE | LINK KEY OF 2ND TABLE | LINKING METHOD |
|---|---|---|---|---|---|
| CC | AA | 1 | keyA | keyA | 1 |
| CC | BB | 1 | KeyX | KeyX | 1 |
| : | : | : | : | : | : |

FIG. 49

TABLE MANAGE DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | COMMODITY MASTER | X | 15 | 150 | 1 | 1993. 05. 12 | YES | |
| BB | CUSTOMER MASTER | X | 21 | 1567 | 1 | 1993. 05. 12 | YES | |
| CC | SALES DATA OF MAY | Y | 30 | 5432 | 3 | 1993. 05. 12 | YES | |
| : | : | : | : | : | : | : | : | |
| out | BUSINESS OFFICE MASTER | x | 15 | 150 | 1 | 1993. 05. 12 | NO | |
| : | : | : | : | : | : | : | : | |

SELECT TABLE SEGMENT HAVING DATA ITEMS TO BE OPERATED/PROCESSED

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |

O K  CANCEL  END

FIG. 52

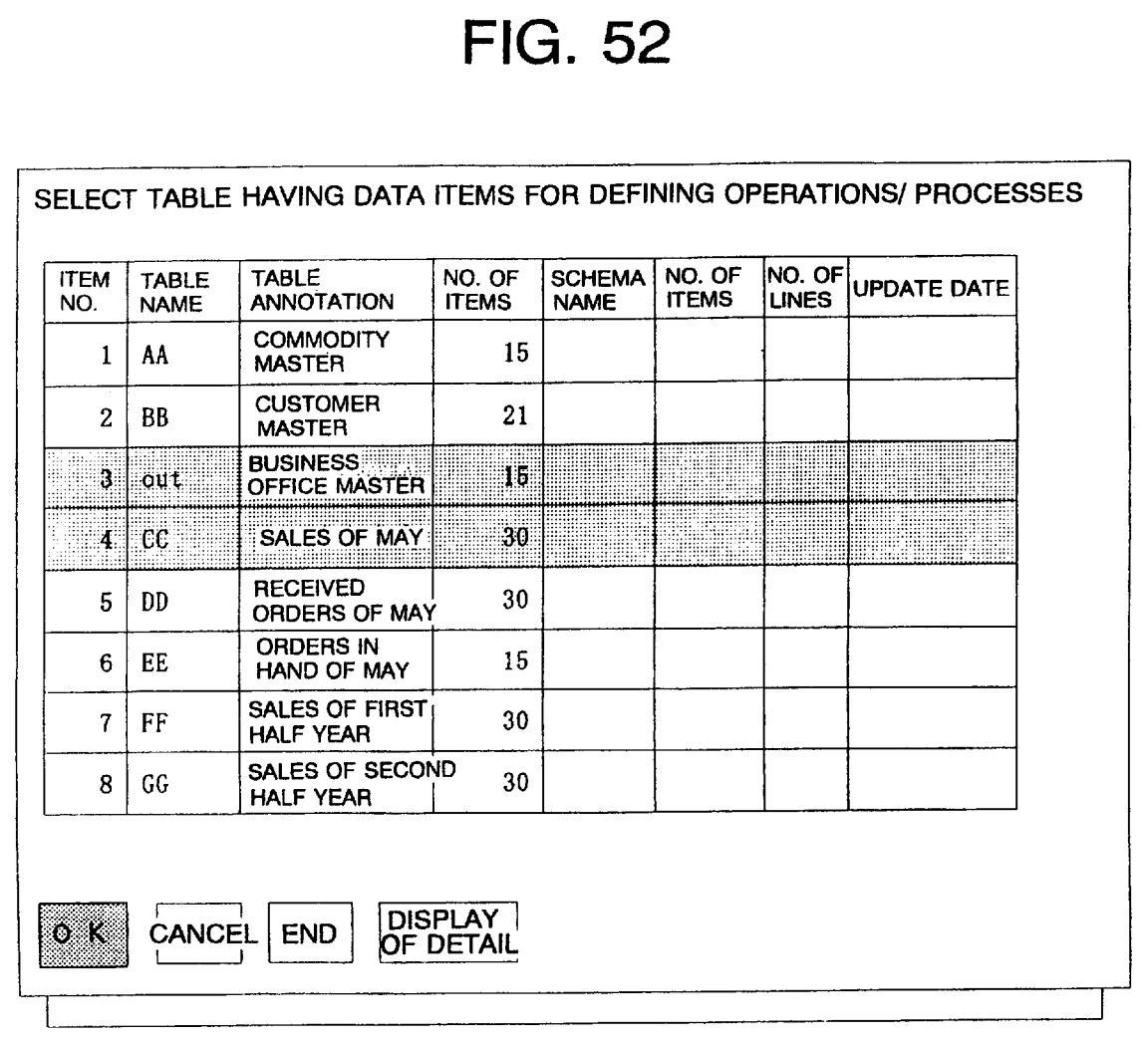

SELECT TABLE HAVING DATA ITEMS FOR DEFINING OPERATIONS/ PROCESSES

| ITEM NO. | TABLE NAME | TABLE ANNOTATION | NO. OF ITEMS | SCHEMA NAME | NO. OF ITEMS | NO. OF LINES | UPDATE DATE |
|---|---|---|---|---|---|---|---|
| 1 | AA | COMMODITY MASTER | 15 | | | | |
| 2 | BB | CUSTOMER MASTER | 21 | | | | |
| 3 | out | BUSINESS OFFICE MASTER | 15 | | | | |
| 4 | CC | SALES OF MAY | 30 | | | | |
| 5 | DD | RECEIVED ORDERS OF MAY | 30 | | | | |
| 6 | EE | ORDERS IN HAND OF MAY | 15 | | | | |
| 7 | FF | SALES OF FIRST HALF YEAR | 30 | | | | |
| 8 | GG | SALES OF SECOND HALF YEAR | 30 | | | | |

O K | CANCEL | END | DISPLAY OF DETAIL

TABLE OF out & CC DATA ITEMS

| ITEM NO. | ITEM NAME | ITEM ANNOTATION | DATA SEGMENT |
|---|---|---|---|
| 1 | C | NO. OF BUSINESS MEMBERS | DATA |
| .. | | | |
| 4 | O | TOTAL NO. OF PERSONS | DATA |
| .. | | | |
| 10 | SALE | SALES | DATA |
| .. | | | |

| DISPLAY OF DETAIL |
|---|

| END |
|---|

DEFINE OPERATION/PROCESS FORMULA

ITEM NAME : ESALE

ITEM ANNOTATION: SALES PER PERSON

FORMULA: SALES ÷ NO. OF BUSINESS MEMBERS

OPERANDS
× ÷ + − (  )
7 8 9
4 5 6
1 2 3
0 000

| FUNCTION |
|---|
| @TODAY |
| @DAY1 |
| @DAY2 |

⇧  ⇨

| O K | CANCEL |
|---|---|

TABLE OF out & CC DATA ITEMS

| ITEM NO. | ITEM NAME | ITEM ANNOTATION | DATA SEGMENT |
|---|---|---|---|
| 1 | C | NO. OF BUSINESS MEMBERS | DATA |
| .. | | | |
| 4 | O | TOTAL NO. OF PERSONS | DATA |
| .. | | | |
| 10 | SALE | SALES | DATA |
| .. | | | |

| END | DISPLAY OF DETAIL |

DEFINE DATA ITEM ATTRIBUTES
ITEM NAME: ESALE
HEADER: SALES PER PERSON
UNIT: 1000 YEN/PERSON
EDITION FORMAT: ¥¥¥ , ¥¥9
SEGMENT
■ DATA  □ CODE  □ LABEL

[ O K ]   [ CANCEL ]

TABLE OF out & CC DATA ITEMS

| ITEM NO. | ITEM NAME | ITEM ANNOTATION | DATA SEGMENT |
|---|---|---|---|
| 1 | C | NO. OF BUSINESS MEMBERS | DATA |
| .. | | | |
| 4 | 0 | TOTAL NO. OF PERSONS | DATA |
| .. | | | |
| 10 | SALE | SALES | DATA |
| .. | | | |
| nn | ESALE | SALES PER PERSON | OPERATIONS |

| END | DISPLAY OF DETAIL |
|---|---|

DEFINE OPERATION/PROCESS FORMULA

ITEM NAME : _____
ITEM ANNOTATION : _____

FORMULA : _____

OPERANDS
× ÷ + − ( )
⑦ ⑧ ⑨
④ ⑤ ⑥
① ② ③
0 000

| FUNCTION |
|---|
| @TODAY |
| @DAY1 |
| @DAY2 |

⇦  ⇨

| O K | CANCEL |

FIG. 59

DATA ITEM GROUPING DEFINITION DATA RECORDING AREA

| REPRESENTATIVE NAME | NO. OF DATA ITEMS | 1ST ITEM | 2ND ITEM | 3RD ITEM | 4TH ITEM | 5TH ITEM | ... |
|---|---|---|---|---|---|---|---|
| CUSTOMER | 5 | BB1 | BB3 | BB4 | BB5 | BB8 | |

| CUSTOMER COMPOSING DATA ITEMS | | |
|---|---|---|
| ITEM NO. | ITEM NAME | HEADER |
| 1 | BB1 | CUSTOMER NAME |
| 2 | BB3 | ADDRESS |
| 3 | BB4 | TEL. NO. |
| 4 | BB5 | ZIP CODE |
| 5 | BB8 | REPRESENTATIVE |

CANCEL

| ITEM NO. | REPRESENTATIVE NAME |
|---|---|
| 1 | CUSTOMER |

ADD  CHANGE  DELETE  END

SALES COMPOSING DATA ITEMS

| ITEM NO. | ITEM NAME | HEADER |
|---|---|---|

ADD  DELETE  CANCEL

SELECT TABLE SEGMENT HAVING DETAIL DATA ITEMS

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |

O K   CANCEL

SELECT TABLE SEGMENT HAVING DETAIL DATA ITEMS

| ITEM NO. | TABLE NAME | TABLE ANNOTATION | NO. OF ITEMS |
|---|---|---|---|
| 1 | CC | SALES OF MAY | 30 |
| 2 | DD | RECEIVED ORDERS OF MAY | 30 |
| 3 | EE | ORDERS IN HAND OF MAY | 15 |
| 4 | FF | SALES OF FIRST HALF YEAR | 30 |
| 5 | GG | SALES OF SECOND HALF YEAR | 30 |

[OK] [CANCEL]

SALES COMPOSING DATA ITEMS

| ITEM NO. | ITEM NAME | HEADER |
|---|---|---|

[ADD] [DELETE] [CANCEL]

SELECT DATA ITEMS

| ITEM NO. | ITEM NAME | HEADER | DATA SEGMENT |
|---|---|---|---|
| 10 | SALE | SALES OF THIS MONTH | DATA |
| 11 | HSALE | SALES OF MAIN COMMODITIES | DATA |
| 12 | LSALE | SALES OF OTHER COMMODITIES | DATA |
| .. | ESALE | SALES PER PERSON | PROCESS |

[O K] [CANCEL] [DISPLAY OF DETAIL] [NARROW]

SALES COMPOSING DATA ITEMS

| ITEM NO. | ITEM NAME | HEADER |
|---|---|---|

[ADD] [DELETE] [CANCEL]

FIG. 68

DATA ITEM GROUPING DEFINITION DATA RECORDING AREA

| REPRESENTATIVE NAME | NO. OF DATA ITEMS | 1ST ITEM | 2ND ITEM | 3RD ITEM | 4TH ITEM | 5TH ITEM | ... |
|---|---|---|---|---|---|---|---|
| CUSTOMER | 5 | BB1 | BB3 | BB4 | BB5 | BB8 | |
| SALES | 4 | SALE | HSALE | LSALE | ESALE | | |

CUSTOMER COMPOSING DATA ITEMS

| ITEM NO. | ITEM NAME | HEADER |
|---|---|---|
| 1 | SALE | SALES OF THIS MONTH |
| 2 | HSALE | SALES OF MAIN COMMODITIES |
| 3 | LSALE | SALES OF OTHER COMMODITIES |
| 4 | ESALE | SALES PER PERSON |

[CANCEL]

| ITEM NO. | REPRESENTATIVE NAME |
|---|---|
| 1 | CUSTOMER |
| 2 | SALES |

[ADD] [CHANGE] [DELETE] [END]

FIG. 71

MANAGEMENT POINT RECORDING AREA

| NAME | DISPLAY ORDER | NO. OF SECTIONS | ... |
|---|---|---|---|
| WHEN (TIME) | 1 | | |
| WHO (PERSON, ORGANIZATION, ENTERPRISE) | 2 | 3 | |

FIG. 72

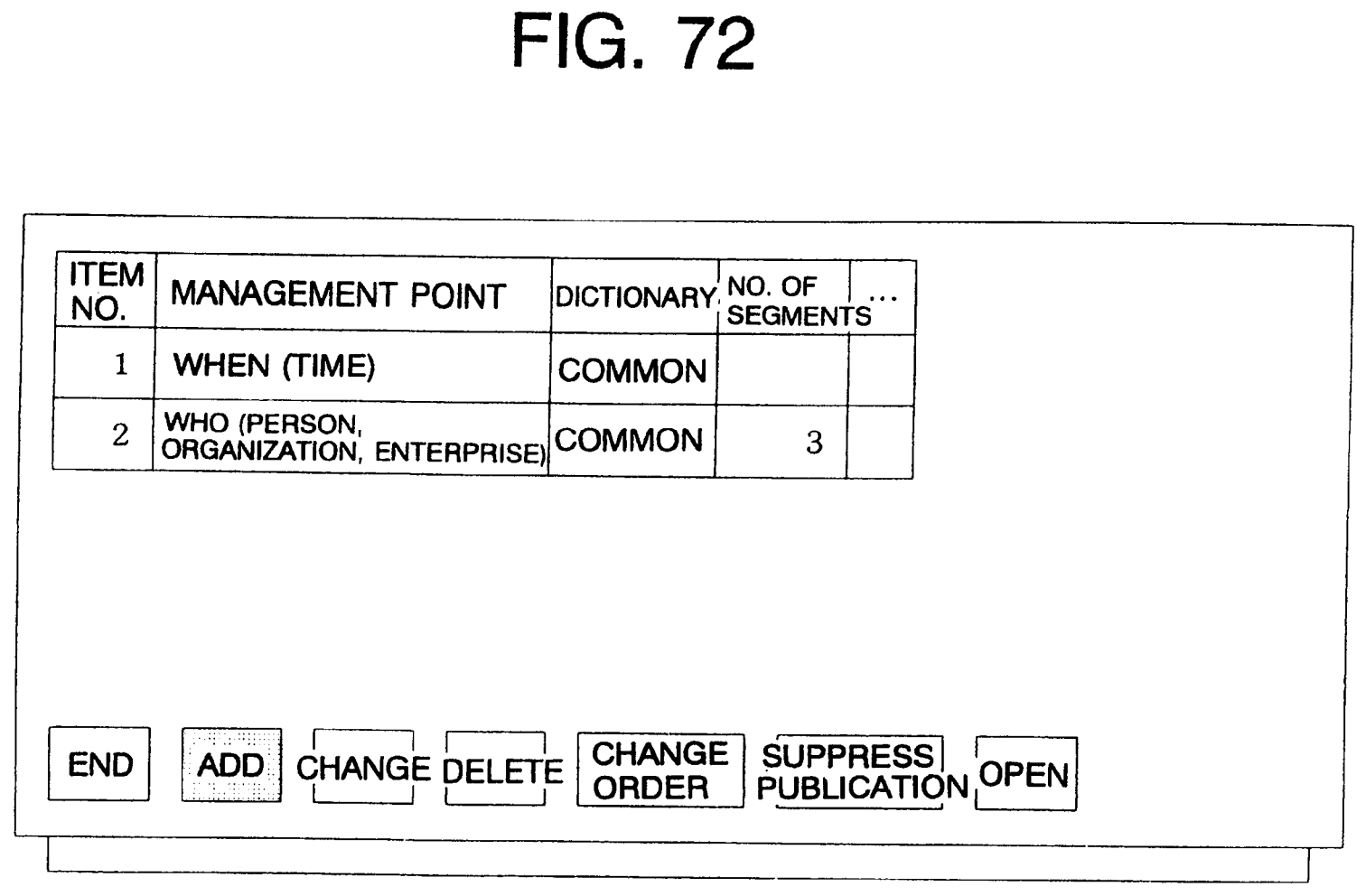

| ITEM NO. | MANAGEMENT POINT | DICTIONARY | NO. OF SEGMENTS | ... |
|---|---|---|---|---|
| 1 | WHEN (TIME) | COMMON | | |
| 2 | WHO (PERSON, ORGANIZATION, ENTERPRISE) | COMMON | 3 | |

END ADD CHANGE DELETE CHANGE ORDER SUPPRESS PUBLICATION OPEN

| ITEM NO. | MANAGEMENT POINT | DICTIONARY | NO. OF SEGMENTS |
|---|---|---|---|
| 1 | WHEN (TIME) | COMMON | ... |
| 2 | | | |

DEFINE ATTRIBUTE DATA OF MANAGEMENT POINT
NAME: WHERE (PLACE)
DICTIONARY ■ COMMON □ OBJECT/PERSONAL
∴

[O K]  [CANCEL]

[END]  [ADD]  [CHANGE DELETE]  [CHANGE ORDER]  [SUPPRESS PUBLICATION] [OPEN]

FIG. 74

| NAME | DISPLAY ORDER | NO. OF SECTIONS | ... |
|---|---|---|---|
| WHEN (TIME) | 1 | | |
| WHO (PERSON, ORGANIZATION, ENTERPRISE) | 2 | 3 | |
| WHERE (PLACE) | 3 | 0 | |

FIG. 76

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 3 | |
| WHERE (PLACE) | 3 | 0 | |

SEGMENT DATA RECORDING AREA

| NAME | DISPLAY ORDER | SEGMENT TYPE | NO. OF GRAPHS |
|---|---|---|---|
| EACH CUSTOMER | 1 | 2 | 0 |
| EACH VENDER | 2 | 2 | 0 |
| EACH DEALER | 3 | 3 | 1 |

FIG. 78

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT TABLE SEGMENT HAVING SEGMENT KEY ITEMS

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |

O K

CANCEL

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT TABLE SEGMENT HAVING SEGMENT KEY ITEMS

| ITEM NO. | TABLE NAME | TABLE ANNOTATION | NO. OF ITEMS |
|---|---|---|---|
| 1 | AA | COMMODITY MASTER | 15 |
| 2 | BB | CUSTOMER MASTER | 21 |
| 3 | CC | BUSINESS OFFICE MASTER | 15 |

[OK] [CANCEL]

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT SEGMENT KEY ITEMS

| ITEM NO. | TABLE ITEM | HEADER |
|---|---|---|
| 1 | ccode | CUSTOMER CODE |
| : | : | |
| 15 | cssh5 | VOLUME OF TRANSACTIONS OF 1993 |

[DISPLAY OF DETAIL] [NARROW] [CANCEL]

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT SEGMENT KEY ITEMS

| ITEM NO. | TABLE ITEM | HEADER |
|---|---|---|
| 1 | ccode | CUSTOMER CODE |

SELECT SEGMENT DEFINING METHOD

☐ DIRECT EXPLOITATION OF DATA VALUE

■ ADD MEANING TO DATA VALUE

[ O K ]   [ CANCEL ]

DESIGNATE ATTRIBUTES OF SEGMENT DEFINITION

SEGMENT NAME: EACH VALUE OF TRANSACTIONS

SEGMENTING METHOD
- ☐ SEGMENTATION AT EQUAL DISTANCES
- ■ DISCONTINUOUS SEGMENTATION
- ☐ SEGMENTATION WITH VALUE

..

| NO. OF DATA | 5,236 |
|---|---|
| MAXIMUM | 38,521 |
| MINIMUM | 532 |
| AVERAGE | 19,320 |
| .. | |

CANCEL  GRAPH

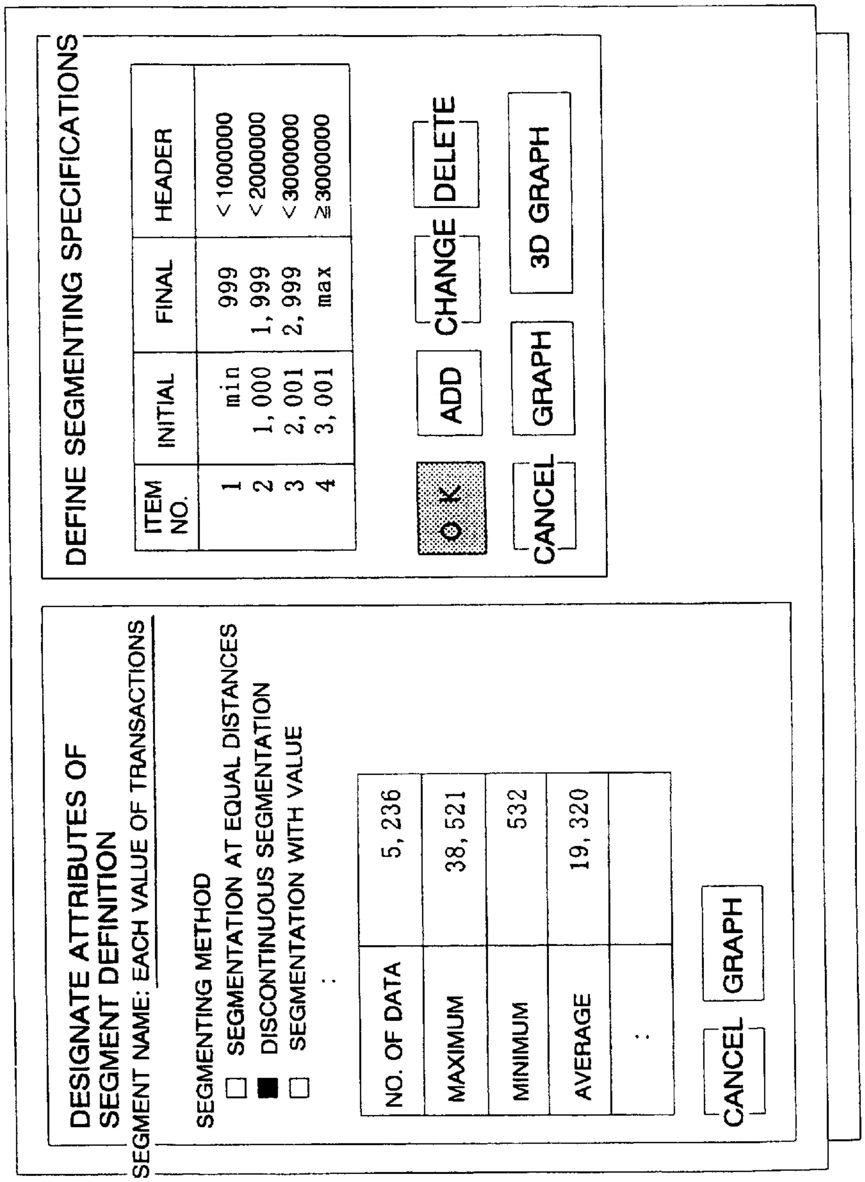

FIG. 83

DEFINE SEGMENTING SPECIFICATIONS

| ITEM NO. | INITIAL | FINAL | HEADER |
|---|---|---|---|
| 1 | min | 999 | <1000000 |
| 2 | 1,000 | 1,999 | <2000000 |
| 3 | 2,001 | 2,999 | <3000000 |
| 4 | 3,001 | max | ≥3000000 |

[O.K.] [ADD] [CHANGE] [DELETE]

[CANCEL] [GRAPH] [3D GRAPH]

DESIGNATE ATTRIBUTES OF SEGMENT DEFINITION

SEGMENT NAME: EACH VALUE OF TRANSACTIONS

SEGMENTING METHOD
☐ SEGMENTATION AT EQUAL DISTANCES
■ DISCONTINUOUS SEGMENTATION
☐ SEGMENTATION WITH VALUE

| NO. OF DATA | 5,236 |
|---|---|
| MAXIMUM | 38,521 |
| MINIMUM | 532 |
| AVERAGE | 19,320 |
| .. | |

[CANCEL] [GRAPH]

CONFIRM SEGMENTING DEFINITIONS AND SELECT OK BUTTON

SEGMENT NAME: EACH VOLUME OF TRANSACTIONS

| ITEM NO. | INITIAL | FINAL | HEADER |
|---|---|---|---|
| 1 | min | 999 | <1000000 |
| 2 | 1,000 | 1,999 | <2000000 |
| 3 | 2,001 | 2,999 | <3000000 |
| 4 | 3,001 | max | ≧3000000 |

[OK] [CHANGE] [CANCEL] [GRAPH] [3D GRAPH]

FIG. 85

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS |
|---|---|---|---|
| EACH CUSTOMER | 1 | 2 | 0 |
| EACH VENDER | 2 | 2 | 0 |
| EACH DEALER | 3 | 3 | 1 |
| EACH VOLUME OF TRANSACTIONS | 4 | 2 | 0 |

SEGMENT SPECIFICATION RECORDING AREA

| KEY ITEM NAME | TYPE | NO. | 1ST SEGMENT | | | 2ND SEGMENT | | | |
|---|---|---|---|---|---|---|---|---|---|
| cssh5 | 2 | 4 | min | 999 | <1000000 | min | 1,999 | <2000000 | ... |

FIG. 87

| ITEM NO. | MANAGEMENT POINT | DICTIONARY | NO. OF SEGMENTS |
|---|---|---|---|
| 1 | WHEN (TIME) | COMMON | |
| 2 | WHO (PERSON, ORGANIZATION, ENTERPRISE) | COMMON | 4 |
| 3 | WHERE (PLACE) | COMMON | 0 |

END

DOCUMENT

| ITEM NO. | MANAGEMENT POINT | DICTIONARY |
|---|---|---|
| 1 | WHEN (TIME) | COMMON |
| 2 | WHO (PERSON, ORGANIZATION, ENTERPRISE) | COMMON |
| 3 | WHERE (PLACE) | COMMON |

END DOCUMENT

SELECT SEGMENTING DEFINITION

| ITEM NO. | SEGMENT DEFINITION |
|---|---|
| 1 | EACH CUSTOMER |
| 2 | EACH VENDER |
| 3 | EACH DEALER |
| 4 | EACH VOLUME OF TRANSACTIONS |

CANCEL DOCUMENT

ATTACH DATA ITEMS TO WORKSHEET

| DATA ITEM | ANNOTATION |
|---|---|
| ♡ WHEN<br>♡ WHO<br>♡ WHERE<br>NO. OF SALES<br>VOLUME OF SALES<br>. . . | TIME<br>PERSONS, ORGANIZATION,<br>ENTERPRISE<br>PLACE |

| | | | |
|---|---|---|---|
| | | | |

[ OK ] [ CANCEL ] [ END ]

ATTACH DATA ITEMS TO WORKSHEET

| EACH VENDER | VOLUME OF SALES | | |
|---|---|---|---|
| | | | |
| | | | |

| DATA ITEM | ANNOTATION |
|---|---|
| ♡ WHEN | TIME |
| ♢ WHO | PERSONS, ORGANIZATION, ENTERPRISE |
| ♢ EACH CUSTOMER | PLACE |
| ♢ EACH VENDER | |
| ♢ EACH DEALER | |
| ♢ EACH VOLUME OF TRANSACTIONS | |
| ♢ WHERE | |
| NO. OF SALES | |
| VOLUME OF SALES | |
| : | |

[ O K ]  [ CANCEL ]  [ END ]

FETCHED DATABASE

| EACH VENDER | VOLUME OF SALES | NO. OF SALES |
|---|---|---|
| ○○ | 999,999 | 9,999 |
| □□ | 999,999 | 9,999 |
| △△ | 999,999 | 9,999 |
| ♡♡ | 999,999 | 9,999 |
| ♣♣ | 999,999 | 9,999 |
| 合計 | 999,999 | 9,999 |

OK   CANCEL  END

COPY

SPREADSHEET SOFTWARE

| A | B | C |
|---|---|---|
|   |   |   |

SELECT JOB TO BE EXECUTED

| EXTRACTION SOURCE TABLE | EXTRACTION DESTINATION TABLE | EXTRACTED JOB NAME | JOB GENERATION DATE | JOB UPDATE DATE | JOG EXECUTION DATE | BASIC DATA |
|---|---|---|---|---|---|---|
| in | out | EXTRACT1 | 1993.05.10 | 1993.06.20 | 1993.05.10 | FINISHED |
| .. | .. | .. | .. | .. | .. | .. |
| ocst | cst | EXTRACTC | 1993.05.10 | 1993.06.20 | 1993.05.10 | FINISHED |
| .. | .. | .. | .. | .. | .. | .. |

| OK | NARROW | RELEASE NARROW | REARRANGE |

END

FIG. 94

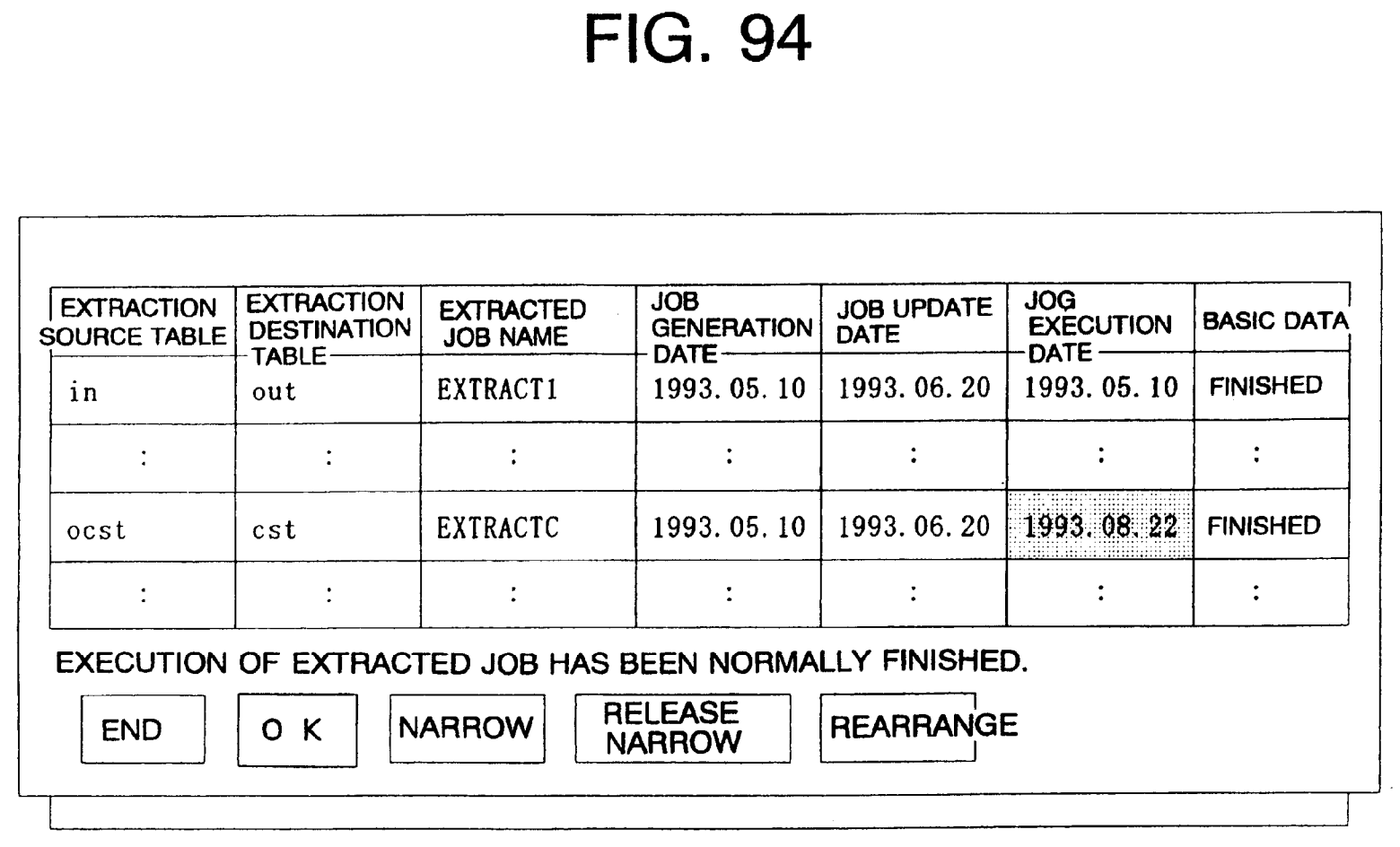

| EXTRACTION SOURCE TABLE | EXTRACTION DESTINATION TABLE | EXTRACTED JOB NAME | JOB GENERATION DATE | JOB UPDATE DATE | JOG EXECUTION DATE | BASIC DATA |
|---|---|---|---|---|---|---|
| in | out | EXTRACT1 | 1993. 05. 10 | 1993. 06. 20 | 1993. 05. 10 | FINISHED |
| : | : | : | : | : | : | : |
| ocst | cst | EXTRACTC | 1993. 05. 10 | 1993. 06. 20 | 1993. 08. 22 | FINISHED |
| : | : | : | : | : | : | : |

EXECUTION OF EXTRACTED JOB HAS BEEN NORMALLY FINISHED.

END | O K | NARROW | RELEASE NARROW | REARRANGE

| EXTRACTION SOURCE TABLE | EXTRACTION DESTINATION TABLE | EXTRACTED JOB NAME | JOB GENERATION DATE | JOB UPDATE DATE | JOG EXECUTION DATE | BASIC DATA |
|---|---|---|---|---|---|---|
| in | ou | .. | | 20 | 1993.05.10 | FINISHED |
| ocst | cs | .. | | 20 | 1993.08.22 | FINISHED |

[WARNING]

MANAGEMENT POINT IS DEFINED IN REPLACED TABLE. MATCHING CAN BE CONFIRMED IF MISMATCH MAY OCCUR.

■ CONFIRM   □ NOT CONFIRM

[END] [O K] [NARROW] [RELEASE NARROW] [REARRANGE]

FIG. 97

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS | PUBLIC SEGMENT | ... |
|---|---|---|---|---|---|
| EACH CUSTOMER | 1 | 2 | 0 | 0 | |
| EACH VENDER | 2 | 2 | 0 | 0 | |
| EACH DEALER | 3 | 3 | 1 | 1 | |
| EACH VOLUME OF TRANSACTIONS | 4 | 2 | 1 | 0 | |

SEGMENT SPECIFICATION RECORDING AREA

| KEY ITEM NAME | TYPE | NO. | 1ST SEGMENT | | | | 2ND SEGMENT | | | | |
|---|---|---|---|---|---|---|---|---|---|---|---|
| cssh5 | 3 | 5 | 2 | 1111 | 1112 | ○○DEALER | 1 | 2111 | □□DEALER | | ... |

SELECT CHANGE BUTTON IF CHANGE IS MADE

SEGMENT NAME: EACH DEALER

| ITEM NO. | 1ST | 2ND | HEADER |
|---|---|---|---|
| 1 | 1111 | 1112 | ○○ DEALER |
| 2 | 2111 | | □□ DEALER |
| 3 | 3111 | 3113 | △△ DEALER |
| 4 | 4111 | | ×× DEALER |
| 5 | 5111 | 5114 | ◇◇ DEALER |

| ITEM NO. | DEALER CODE |
|---|---|
| 1 | 2112 |

END    OK    GRAPH    CHANGE    DEFINE ADDITIONAL DATA    3D GRAPH

SELECT DECIDE BUTTON IF CHANGED

SEGMENT NAME: EACH DEALER

| ITEM NO. | 1ST | 2ND | HEADER |
|---|---|---|---|
| 1 | 1111 | 1112 | ○○ DEALER |
| 2 | 2111 | 2112 | □□ DEALER |
| 3 | 3111 | 3113 | △△ DEALER |
| 4 | 4111 |  | ×× DEALER |
| 5 | 5111 | 5114 | ◇◇ DEALER |

| ITEM NO. | DEALER CODE |
|---|---|
| 1 | 2112 |

[OK]  [GRAPH]  [CHANGE]  [DEFINE ADDITIONAL DATA]  [3D GRAPH]

[END]

FIG. 100

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS | PUBLIC SEGMENT | ... |
|---|---|---|---|---|---|
| EACH CUSTOMER | 1 | 2 | 0 | 0 | |
| EACH VENDER | 2 | 2 | 0 | 0 | |
| EACH DEALER | 3 | 3 | 0 | 0 | |
| EACH VOLUME OF TRANSACTIONS | 4 | 2 | 0 | 0 | |

SEGMENT SPECIFICATION RECORDING AREA

| KEY ITEM NAME | TYPE | NO. | 1ST SEGMENT | | | | 2ND SEGMENT | | | | | |
|---|---|---|---|---|---|---|---|---|---|---|---|---|
| cssh5 | 3 | 5 | 2 | 1111 | 1112 | ○○DEALER | 2 | 2111 | 2112 | □□DEALER | | ... |

FIG. 105

SELECT TABLE TO BE EXTRACTED

| ITEM NO. | TABLE NAME | SCHEMA NAME |
| --- | --- | --- |
| 1 | in | WSC |
| 2 | int1 | WSC |
| 3 | int2 | WSC |

END OK

FIG. 106

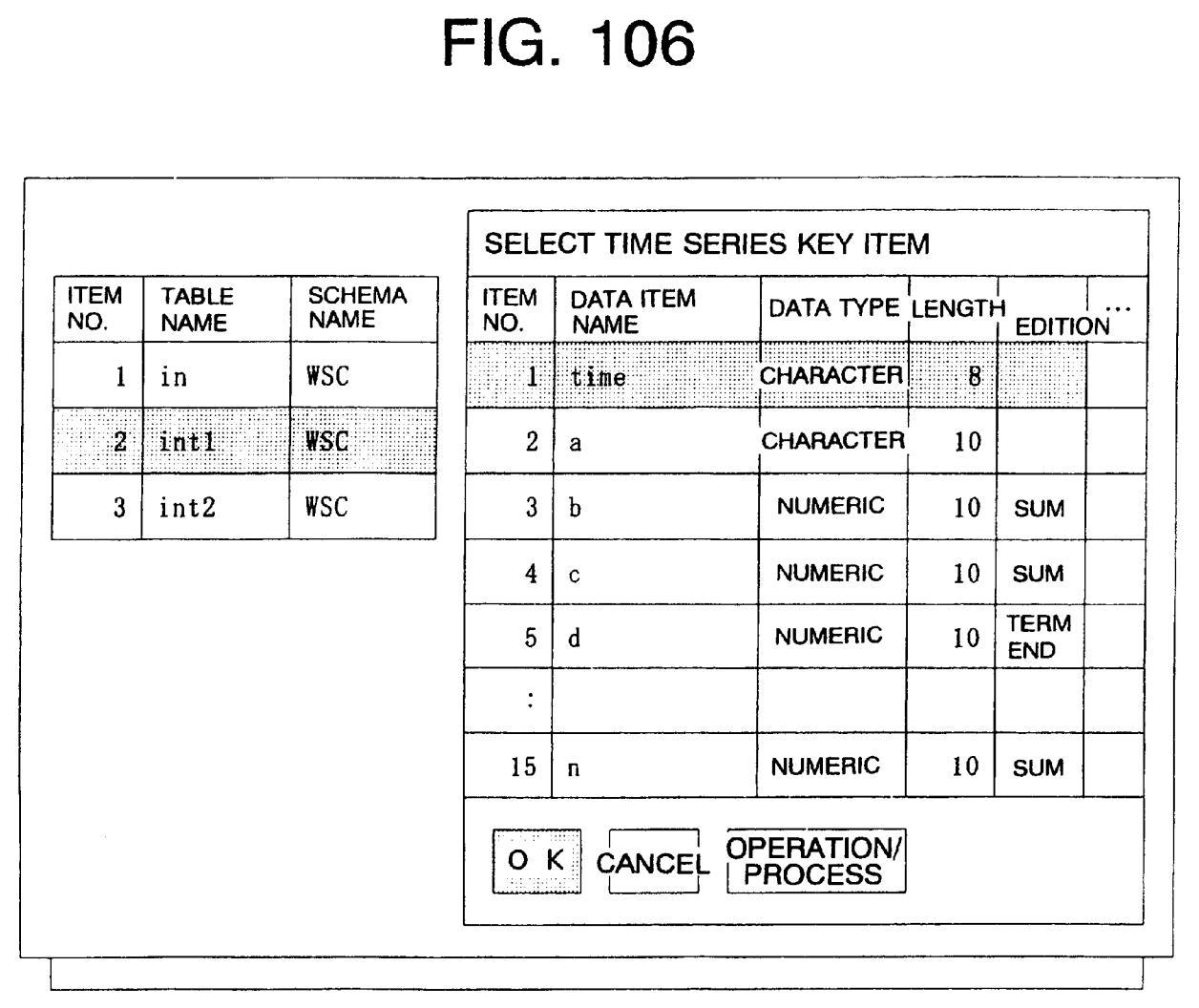

| ITEM NO. | TABLE NAME | SCHEMA NAME |
|---|---|---|
| 1 | in | WSC |
| 2 | int1 | WSC |
| 3 | int2 | WSC |

SELECT TIME SERIES KEY ITEM

| ITEM NO. | DATA ITEM NAME | DATA TYPE | LENGTH | EDITION | ... |
|---|---|---|---|---|---|
| 1 | time | CHARACTER | 8 | | |
| 2 | a | CHARACTER | 10 | | |
| 3 | b | NUMERIC | 10 | SUM | |
| 4 | c | NUMERIC | 10 | SUM | |
| 5 | d | NUMERIC | 10 | TERM END | |
| : | | | | | |
| 15 | n | NUMERIC | 10 | SUM | |

O K | CANCEL | OPERATION/PROCESS

| ITEM NO. | TABLE NAME | SCHEMA NAME |
|---|---|---|
| 1 | in | WSC |
| 2 | int1 | WSC |
| 3 | int2 | WSC |

| ITEM NO. | DATA ITEM NAME | DATA TYPE | LENGTH | ... |
|---|---|---|---|---|
| 1 | time | CHARACTER | 8 | |

DESIGNATE TIME SERIES KEY FORMAT AND DATA KIND

KEY FORMAT: yyyymmdd
DATA CLASS
EXTRACTION SOURCE: QUASI-DATE DATA
EXTRACTION DESIGNATION: DATE DATA
APPLICATION CALENDAR:
STORAGE SEGMENT: 3
NO. OF MAXIMUM DATA PERIODS: 36 CYCLES:

O K    CANCEL

| ITEM NO. | TABLE NAME | SCHEMA NAME |
|---|---|---|
| 1 | in | WSC |
| 2 | int1 | WSC |
| 3 | int2 | WSC |

SELECT DATA ITEM TO BE EXTRACTED

| ITEM NO. | DATA ITEM NAME | DATA TYPE | LENGTH | EDITION | ... |
|---|---|---|---|---|---|
| 1 | time | CHARACTER | 8 | | |
| 2 | a | CHARACTER | 10 | | |
| 3 | b | NUMERIC | 10 | SUM | |
| 4 | c | NUMERIC | 10 | SUM | |
| 5 | d | NUMERIC | 10 | TERM END | |
| ... | | | | | |
| 15 | h | NUMERIC | 10 | SUM | |

[ O K ] [ CANCEL ] [ OPERATION/ PROCESS ]

| ITEM NO. | TABLE NAME | SCHEMA NAME |
|---|---|---|
| 1 | in | WSC |
| 2 | int1 | WSC |
| 3 | int2 | WSC |

SELECT DATA ITEM FOR SETTING CONDITIONS

| ITEM NO. | DATA ITEM NAME | DATA TYPE | LENGTH | EDITION··· |
|---|---|---|---|---|
| 1 | time | CHARACTER | 5 | |
| 2 | a | CHARACTER | 10 | SUM |
| 3 | b | NUMERIC | 10 | SUM |
| 4 | c | NUMERIC | 10 | SUM |
| 5 | d | NUMERIC | 10 | TERM END |
| : | | | | |
| 15 | n | NUMERIC | 10 | SUM |

[ OK ] [ CANCEL ] [ OPERATION/PROCESS ]

| ITEM NO. | TABLE NAME | SCHEMA NAME |
|---|---|---|
| 1 | in | WORK |
| 2 | in1 | WORK |
| 3 | in2 | WORK |

| ITEM NO. | DATA ITEM NAME | DATA TYPE | LENGTH | EDITION .... |
|---|---|---|---|---|
| 1 | time | CHARACTER | 5 | |
| 2 | a | CHARACTER | 10 | SUM |
| 3 | b | NUMERIC | 10 | SUM |

SET CONDITIONS FOR DATA ITEM a a LIKE '1%'

[ O K ] [ CANCEL ]

FIG. 111

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA | EXTENSION |
|---|---|---|---|---|---|---|---|
| : | : | : | : | : | : | : | : |
| int1 | outtd | EXTRACT2 | 1992.03.10 | | | FINISHED | |
| int2 | outtm | EXTRACT3 | 1993.05.10 | | | NOT FINISHED | |
| : | : | : | : | : | : | : | : |

| INPUT DATA | | | OUTPUT DATA | | APPLICATION CALENDAR | STORAGE SEGMENT | NO. OF MAXIMUM DATA PERIODS | CYCLE PERIOD |
|---|---|---|---|---|---|---|---|---|
| DATA CLASS | KEY ITEM | KEY FORMAT | DATA CLASS | KEY FORMAT | | | | |
| : | : | : | : | : | : | : | : | : |
| DATE DATA | time | yyyymmdd | DATE DATA | yyyymmdd | | 3 | 3 MONTHS | |
| MONTH DATA | time | yyyymm | MONTH DATA | yyyymm | BUSINESS BRANCH | 4 | 36 MONTHS | 12 MONTHS |
| : | : | : | : | : | : | : | : | : |

EXTRACTED JOB RECORDING AREA

```
TAGGREGATE b,c,d,e,f,g,h,j,k,l,m,n INTO DATE Z.outtd
           WHERE a LIKE '1%'
           FROM WORK.int1
           WITH XDATE time('yyyymmdd')
                SUM(b,c,e,f,g,h,i,j,k,l,m,n)
                LAST(d)
```

```
TAGGREGATE q,r,s,t,u,v,w INTO MONTH Z.outtm
           WHERE a LIKE '1%'
           FROM WORK.int2
           WITH MONTH time('yyyymm')
                SUM(q,r,s,t,u,v,w)
```

FIG. 112

SELECT JOT TO BE EXECUTED

| ITEM NO. | EXTRACTION SOURCE TABLE | EXTRACTION DESTINATION TABLE | EXTRACTED JOB NAME | JOB GENERATION DATE | JOB UPDATE DATE | ... |
|---|---|---|---|---|---|---|
| : | : | : | : | : | : | |
| 4 | int1 | outtd | EXTRACT2 | 1992.03.10 | | |
| 5 | int2 | outtm | EXTRACT3 | 1993.05.10 | | |
| : | : | : | : | : | : | |

OK　NARROW

FIG. 113

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA | EXTENSION |
|---|---|---|---|---|---|---|---|
| : | : | : | : | : | : | : | : |
| int1 | outtd | EXTRACT2 | 1992.03.10 | 1992.05.12 | 1993.05.12 | FINISHED | |
| int2 | outtm | EXTRACT3 | 1993.05.10 | 1993.05.12 | 1993.05.12 | FINISHED | |
| : | : | : | : | : | : | : | : |

FIG. 115

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | ... | TIME SERIES SEGMENT | ... |
|---|---|---|---|---|---|---|---|---|---|
| : | : | : | : | : | : | : | | : | |
| outtd | SALES DATA OF DAY | Z | 14 | 92 | 5 | 1993.05.12 | | DAY DATA | |
| outtm | SALES DATA OF MONTH | Z | 8 | 36 | 5 | 1993.05.12 | | MONTH DATA | |
| : | : | : | : | : | : | : | | : | |

※ TABLE SEGMENT 5 INDICATES TIME SERIES DATA.

FIG. 119

MANAGEMENT POINT RECORDING AREA

| NAME | DISPLAY ORDER | NO. OF SEGMENTS | GENERATION DATE | ... |
|---|---|---|---|---|
| TIME | 1 | n | 94. 05. 25 | |
| | | | | |
| CUSTOMER | | 5 | | |
| | | | | |

SEGMENT DATA RECORDING AREA

| NAME | DISPLAY ORDER | SEGMENT TYPE |
|---|---|---|
| DATE | 1 | |
| MONTH | 2 | |
| QUARTER YEAR | 5 | |
| HALF YEAR | 3 | |
| YEAR | 4 | |

| NAME | DISPLAY ORDER | SEGMENT TYPE |
|---|---|---|
| TRANSACTION MODE | 1 | 2 |
| TRANSACTION SUM | 2 | 2 |
| COMPANY SCALE | 3 | 3 |
| DISTRICT | 4 | 2 |
| COMMODITY GROUP | 5 | 1 |

ATTACH DATA ITEMS TO WORKSHEET

| DATA ITEM | ANNOTATION |
|---|---|
| ♡ WHEN | TIME |
| ♡ WHO | PERSONS, ORGANIZATION, ENTERPRISE |
| ♡ WHERE | PLACE |
| NO. OF SALES | |
| VOLUME OF SALES | |
| . . . | |

[ O K ] [ CANCEL ] [ END ]

ATTACH DATA ITEMS TO WORKSHEET

| DATA ITEM | ANNOTATION |
|---|---|
| ♡ WHEN | TIME |
| ◇ DATE | YEAR, MONTH, DAY |
| ◇ MONTH | YEAR, MONTH |
| ◇ HALF YEAR | YEAR TERM |
| ◇ YEAR | YEAR |
| ◇ QUARTER YEAR | YEAR TERM |
| ◇ WHO | PERSONS, ORGANIZATION. |
| ◇ EACH | ENTERPRISE |
| ◇ CUSTOMER WHERE | PLACE |
| NO. OF SALES | |
| VOLUME OF SALES | |

O K  CANCEL  END

FETCHED DATABASE

| YEAR, MONTH | VOLUME OF SALES | NO. OF SALES |
|---|---|---|
| 199304 | 999,999 | 9,999 |
| 199305 | 999,999 | 9,999 |
| 199306 | 999,999 | 9,999 |
| 199307 | 999,999 | 9,999 |
| 199308 | 999,999 | 9,999 |
| .. | .. | .. |

[ O K ] [ CANCEL ] [ END ]

COPY →

SPREADSHEET SOFTWARE

| A | B | C |
|---|---|---|
|   |   |   |

ATTACH DATA ITEMS TO WORKSHEET

| | YEAR, MONTH | YEAR, MONTH | |
|---|---|---|---|
| | VOLUME OF SALES | NO. OF SALES | |
| EACH CUSTOMER | | | |

| DATA ITEM | ANNOTATION |
|---|---|
| ◇ WHEN | TIME |
| ◇ DATE | YEAR, MONTH, DAY |
| ◆ MONTH | YEAR, MONTH |
| ◇ HALF YEAR | YEAR TERM |
| ◇ YEAR QUARTER | YEAR |
| ◇ YEAR | YEAR TERM |
| ◇ WHO | PERSONS, ORGANIZATION, ENTERPRISE |
| ◆ EACH CUSTOMER | |
| ◇ WHERE | PLACE |
| NO. OF SALES | |
| VOLUME OF SALES | |

[ OK ] [ CANCEL ] [ END ]

FETCHED DATABASE

| CUSTOMER | VOLUME OF SALES | | | | | | |
|---|---|---|---|---|---|---|---|
| | 199304 | 199304 | 199305 | 199306 | 199305 | 199306 | |
| ○○ | 999,999 | 9,999 | 999,999 | 9,999 | 999,999 | 9,999 | |
| □□ | 999,999 | 9,999 | 999,999 | 9,999 | 999,999 | 9,999 | |
| △△ | 999,999 | 9,999 | 999,999 | 9,999 | 999,999 | 9,999 | |
| ☆☆ | 999,999 | 9,999 | 999,999 | 9,999 | 999,999 | 9,999 | |
| .. | .. | .. | .. | .. | .. | .. | |

[OK]  [CANCEL] [END]

FIG. 126

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA | EXTENSION |
|---|---|---|---|---|---|---|---|
| : | : | : | : | : | : | : | : |
| int1 | outtd | EXTRACT2 | 1992. 03. 10 | 1992. 05. 12 | 1993. 04. 12 | FINISHED | |
| int2 | outtm | EXTRACT3 | 1993. 05. 10 | 1993. 05. 12 | | NOT FINISHED | |
| : | : | : | : | : | : | : | : |

| INPUT DATA | | | OUTPUT DATA | | APPLICATION CALENDAR | STORAGE SEGMENT | NO. OF MAXIMUM DATA PERIODS | CYCLE PERIOD |
|---|---|---|---|---|---|---|---|---|
| DATA CLASS | KEY ITEM | KEY FORMAT | DATA CLASS | KEY FORMAT | | | | |
| : | : | : | : | : | : | : | : | : |
| DATE DATA | time | yyyymmdd | DATE DATA | yyyymmdd | | 3 | 3 MONTHS | |
| MONTH DATA | time | yyyymm | MONTH DATA | yyyymm | BUSINESS BRANCH | 4 | 36 MONTHS | 12 MONTHS |
| : | : | : | : | : | : | : | : | : |

FIG. 127

| ATTRIBUTE DATA | SIGNIFICATION |
|---|---|
| CLASS OF INPUT DATA | DATA CLASS OF INPUT DATA<br>(1) QUASI-DATE DATA *1<br>(2) DATE DATA<br>(3) QUASI-MONTH DATA *1<br>(4) MONTH DATA<br>(5) QUASI-QUARTER YEAR DATA *1<br>(6) QUARTER YEAR DATA<br>(7) QUASI-HALF YEAR DATA *1<br>(8) HALF YEAR DATA<br>(9) QUASI-YEAR DATA *1<br>(10) YEAR DATA |
| INPUT TIME SERIES KEY ITEM | NAME OF TIME SERIES KEY ITEM CONTAINED IN INPUT DATA |
| INPUT TIME SERIES KEY FORMAT | EXPRESSION FORMAT OF TIME SERIES KEY ITEM |
| OUTPUT DATA CLASS | DATA CLASS OF TIME SERIES DATA OUTPUTTED<br>(2) DATE DATA<br>(4) MONTH DATA<br>(6) QUARTER YEAR DATA<br>(8) HALF YEAR DATA<br>(10) YEAR DATA |
| APPLICATION CALENDAR | CALENDAR NAME *2 TO BE APPLIED IN CASE OF PERIOD CLASS TRANSFORMATION (IN CASE OF DIFFERENT DATA CLASSES BETWEEN INPUT AND OUTPUT) |
| STORAGE SEGMENT | METHOD OF STORING TIME SERIES DATA OUTPUTTED<br>(1) BATCH REPLACE<br>(2) UNCONDITIONALLY ADD AND STORE<br>(3) STORE TILL THE MAXIMUM REGISTER PERIOD, THEN DELETE THE OLDEST DATA, AND ADD AND STORE THE LATEST DATA TO ALWAYS MAINTAIN THE LONGEST REGISTER PERIOD<br>(4) STORE TILL THE MAXIMUM REGISTER PERIOD, DELETE DATA OF THE OLDEST CYCLE PERIOD, AND PREPARE THE LATEST CYCLE PERIOD TO UPDATE TO THE PERIOD WITH THE LATEST DATA |
| MAXIMUM NO. OF REGISTER PERIODS | NO. OF THE LONGEST DATA PERIODS OF TIME SERIES DATA (TO BE USED IN CASE STORAGE SEGMENT 3 OR 4) |
| CYCLE PERIOD | NO. OF SIGNIFICANT DATA PERIODS OF TIME SERIES DATA (TO BE USED IN CASE STORAGE SEGMENT 3 OR 4) |

FIG. 128

QUASI-DATE DATA

| YEAR, MONTH, DAY | SALES | CUSTOMER |
|---|---|---|
| 19930101 | | |
| 19930101 | | |
| 19930101 | | |
| 19930102 | | |
| 19930102 | | |
| 19930102 | | |
| 19930103 | | |
| 19930103 | | |
| : | | |

FIG. 129

DATE DATA

| YEAR, MONTH, DAY | SALES |
|---|---|
| 19930101 | |
| 19930102 | |
| 19930103 | |
| 19930104 | |
| 19930105 | |
| 19930106 | |
| 19930107 | |
| 19930108 | |
| : | |

FIG. 136

| INPUT | DAY DATA | MONTH DATA | QUARTER YEAR DATA | HALF YEAR DATA | YEAR DATA |
|---|---|---|---|---|---|
| DAY DATA | △ | ○ | ○ | ○ | ○ |
| MONTH DATA | – | △ | ○ | ○ | ○ |
| QUARTER YEAR DATA | – | – | △ | ○ | ○ |
| HALF YEAR DATA | – | – | – | △ | ○ |
| YEAR DATA | – | – | – | – | △ |

○ : ACCUMULATION AND PERIOD KIND TRANSFORMATION ARE POSSIBLE.
△ : ACCUMULATION IS POSSIBLE (TO TRANSFORM "QUASI-A" DATA TO "A" DATA)
– : IMPOSSIBLE

FIG. 139

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | ... | PRECEDING JOB | BASIC DATA | ... |
|---|---|---|---|---|---|---|---|---|
| MASTC | AA | EXTRACTC | 1992. 05. 10 | 1993. 06. 10 | | | FINISHED | |
| MASTP | BB | EXTRACTP | 1992. 05. 10 | | | | FINISHED | |
| MASTB | CC | EXTRACTB | 1992. 05. 10 | 1992. 06. 10 | | | FINISHED | |
| WORK | out | EXTRACT0 | 1993. 06. 10 | | : | | NOT FINISHED | : |
| WORK | out1 | EXTRACT1 | 1993. 06. 10 | | : | | NOT FINISHED | : |
| WORK | out2 | EXTRACT2 | 1993. 06. 10 | | : | | NOT FINISHED | : |

FIG. 140

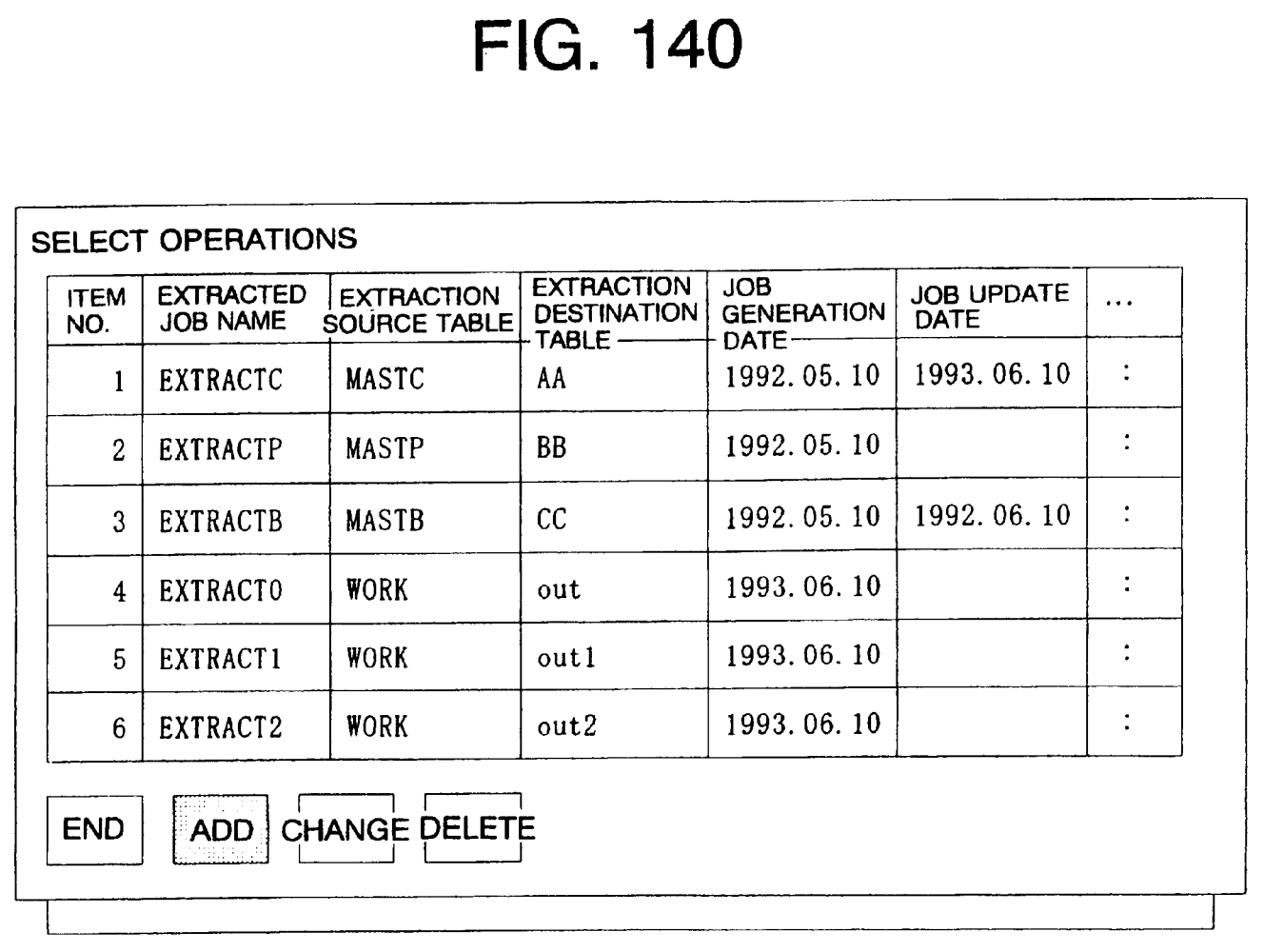

SELECT OPERATIONS

| ITEM NO. | EXTRACTED JOB NAME | EXTRACTION SOURCE TABLE | EXTRACTION DESTINATION TABLE | JOB GENERATION DATE | JOB UPDATE DATE | ... |
|---|---|---|---|---|---|---|
| 1 | EXTRACTC | MASTC | AA | 1992. 05. 10 | 1993. 06. 10 | : |
| 2 | EXTRACTP | MASTP | BB | 1992. 05. 10 | | : |
| 3 | EXTRACTB | MASTB | CC | 1992. 05. 10 | 1992. 06. 10 | : |
| 4 | EXTRACT0 | WORK | out | 1993. 06. 10 | | : |
| 5 | EXTRACT1 | WORK | out1 | 1993. 06. 10 | | : |
| 6 | EXTRACT2 | WORK | out2 | 1993. 06. 10 | | : |

END ADD CHANGE DELETE

DEFINE ATTRIBUTE OF EXTRACTED JOB

EXTRACTED JOB NAME : EXTRACT3

EXTRACTION SOURCE SCHEMA NAME : WORK

EXTRACTION DESTINATION SCHEMA NAME : x　　　TABLE NAME : out3

TABLE ANNOTATION : SALES DATA OF WEST DISTRICT

CREATOR : TSUKO FUJI

OK　　CANCEL

FIG. 142

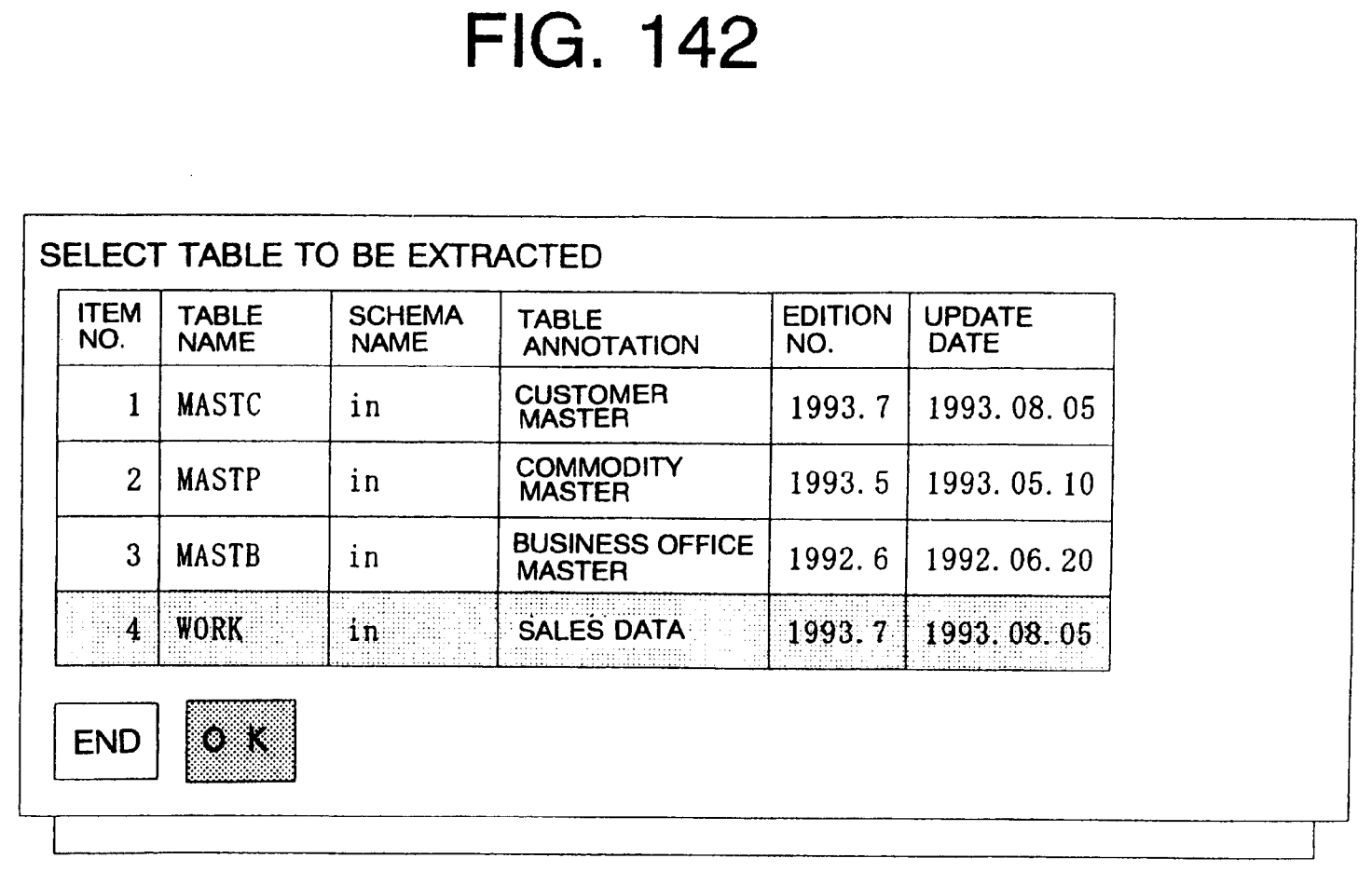

SELECT TABLE TO BE EXTRACTED

| ITEM NO. | TABLE NAME | SCHEMA NAME | TABLE ANNOTATION | EDITION NO. | UPDATE DATE |
|---|---|---|---|---|---|
| 1 | MASTC | in | CUSTOMER MASTER | 1993. 7 | 1993. 08. 05 |
| 2 | MASTP | in | COMMODITY MASTER | 1993. 5 | 1993. 05. 10 |
| 3 | MASTB | in | BUSINESS OFFICE MASTER | 1992. 6 | 1992. 06. 20 |
| 4 | WORK | in | SALES DATA | 1993. 7 | 1993. 08. 05 |

END | O K

| ITEM NO. | TABLE NAME | SCHEMA NAME |
|---|---|---|
| 1 | MASTC | in |
| 2 | MASTP | in |
| 3 | MASTB | in |
| 4 | WORK | in |

SELECT DATA ITEM TO BE EXTRACTED

| ITEM NO. | DATA ITEM NAME | DATA TYPE | LENGTH... |
|---|---|---|---|
| 1 | keyP | CHARACTER | 5 |
| 2 | keyC | CHARACTER | 7 |
| 3 | keyB | CHARACTER | 24 |
| 4 | d | NUMERIC | 10 |
| 5 | e | NUMERIC | 10 |
| 15 | o | NUMERIC | 15 |

[OK]  [CANCEL]  [OPERATION/PROCESS]

```
SELECT keyP, keyC, keyB, d, e, f, g, sale, i, j, k, l, m, n, o
       FROM WORK. in
```

| ITEM NO. | DATA ITEM NAME | DATA TYPE | LENGTH |
|---|---|---|---|
| 1 | keyP | CHARACTER | 5 |
| 2 | keyC | CHARACTER | 7 |
| 3 | keyB | CHARACTER | 12 |
| 4 | d | NUMERIC | 10 |
| 5 | e | NUMERIC | 10 |
| ⋮ | | | |
| 15 | o | NUMERIC | 15 |

SELECT PROCESS

FORMULA : keyB LIKE '3%'

- ○ ALL MATCH
- ● FRONT MATCH
- ○ REAR MATCH
- ○ PARTIAL MATCH
- ○ OR
- ○ AND

CHARACTER STRING TO BE COMPARED: 3

[ O K ]  [ CANCEL ]

FIG. 147

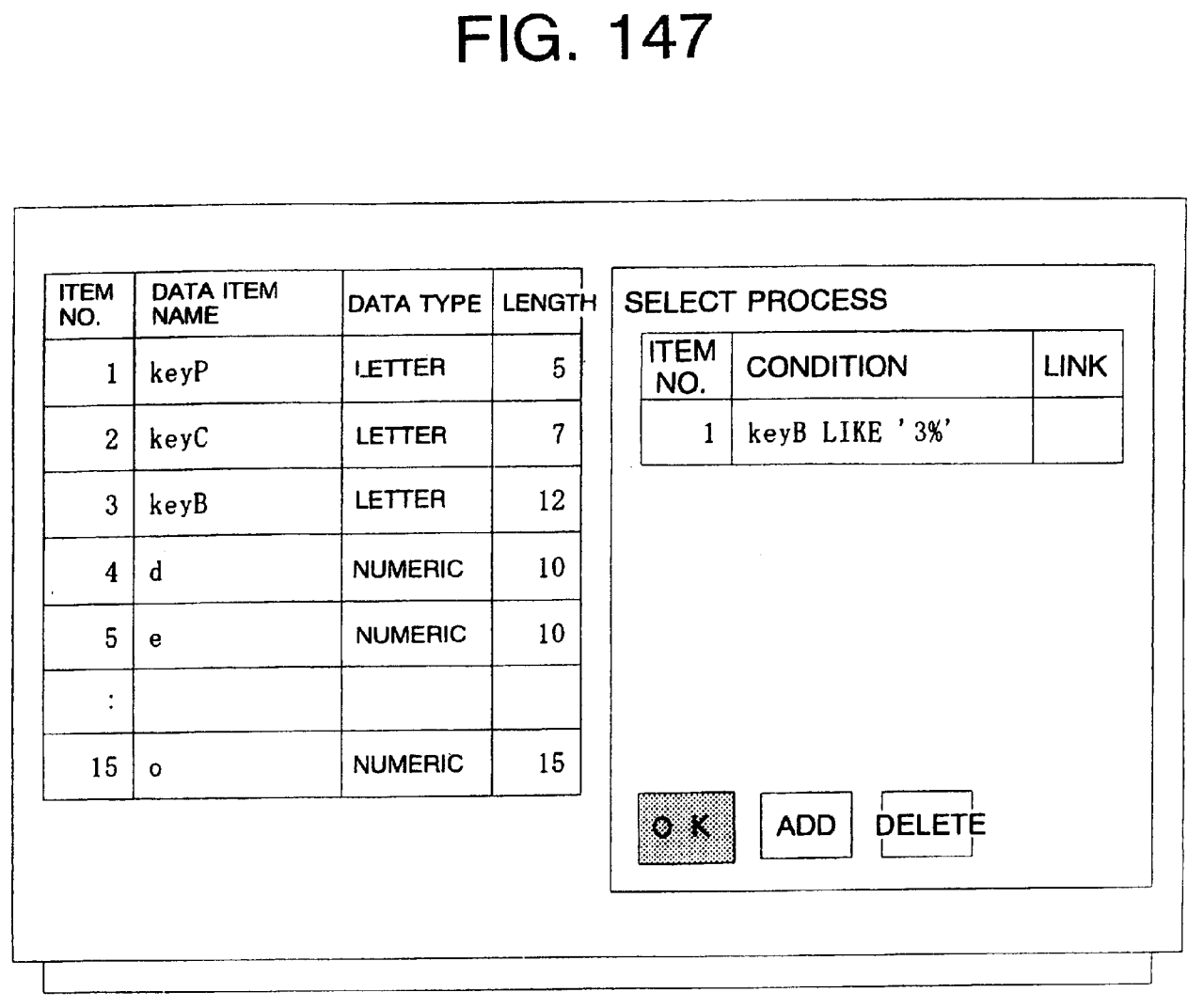

| ITEM NO. | DATA ITEM NAME | DATA TYPE | LENGTH |
|---|---|---|---|
| 1 | keyP | LETTER | 5 |
| 2 | keyC | LETTER | 7 |
| 3 | keyB | LETTER | 12 |
| 4 | d | NUMERIC | 10 |
| 5 | e | NUMERIC | 10 |
| : | | | |
| 15 | o | NUMERIC | 15 |

SELECT PROCESS

| ITEM NO. | CONDITION | LINK |
|---|---|---|
| 1 | keyB LIKE '3%' | |

OK ADD DELETE

FIG. 148

EXTRACTED JOB RECORDING AREA

```
SELECT keyP, keyC, keyB, d, e, f, g, sale, i, j, k, l, m, n, o
       FROM WORK. in
       WHERE keyB  LIKE  '3%'  INTO x. out3
```

FIG. 149

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | ... | PRECEDING JOB | BASIC DATA | ... |
|---|---|---|---|---|---|---|---|---|
| MASTC | AA | EXTRACTC | 1992. 05. 10 | 1993. 06. 10 | | | FINISHED | |
| MASTP | BB | EXTRACTP | 1992. 05. 10 | | | | FINISHED | |
| MASTB | CC | EXTRACTB | 1992. 05. 10 | 1992. 06. 10 | | | FINISHED | |
| WORK | out | EXTRACT0 | 1993. 06. 10 | | | | NOT FINISHED | : |
| WORK | out1 | EXTRACT1 | 1993. 06. 10 | | | | NOT FINISHED | : |
| WORK | out2 | EXTRACT2 | 1993. 06. 10 | | | | NOT FINISHED | : |
| WORK | out3 | EXTRACT3 | 1993. 06. 15 | | | | NOT FINISHED | |

EXTRACTED JOB RECORDING AREA

```
SELECT keyP, keyC, keyB, d, e, f, g, sale, i, j, k, l, m, n, o
       FROM WORK. in
       WHERE keyB  LIKE  '3%'  INTO x. out3
```

FIG. 150

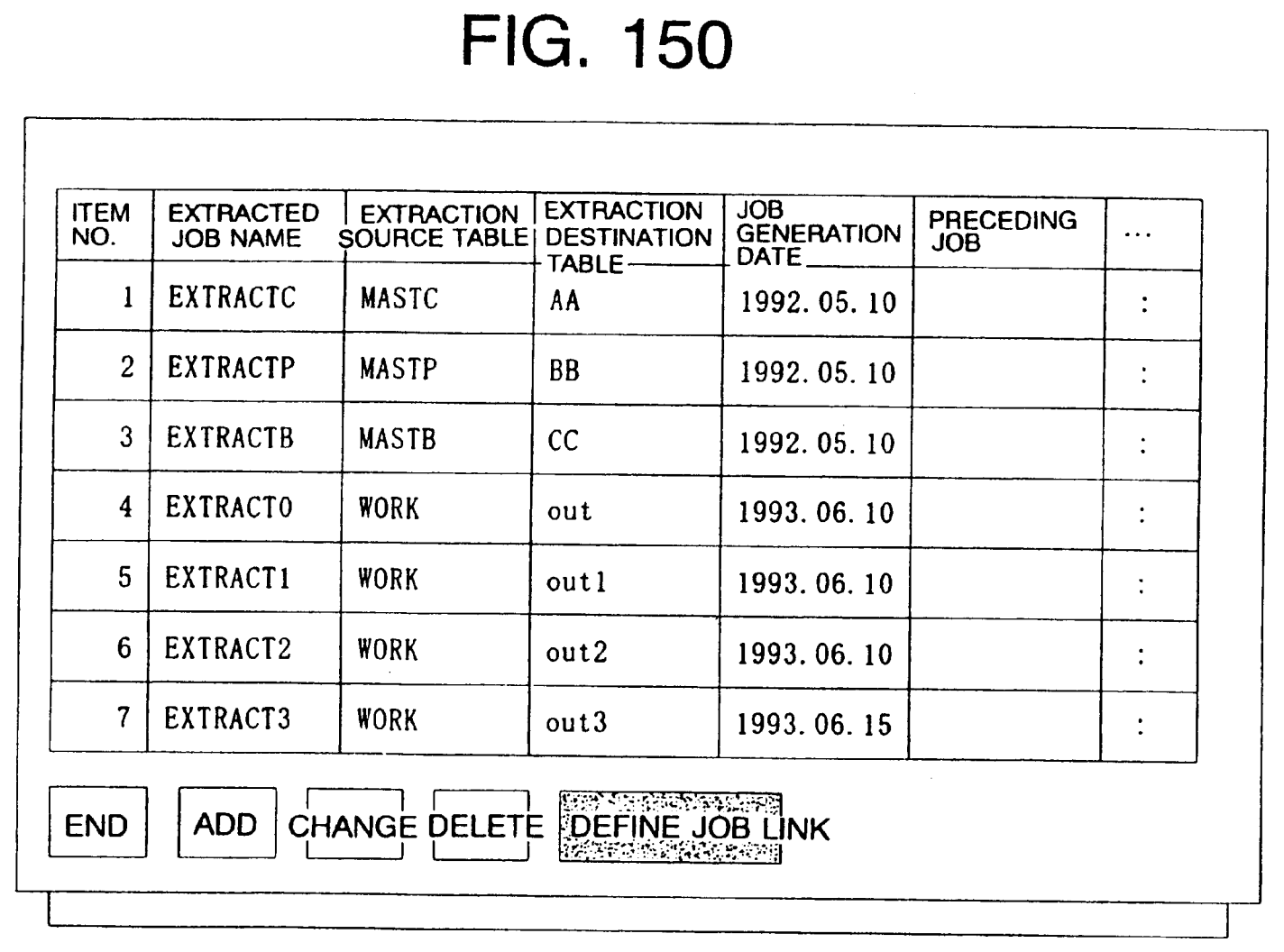

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | : |
| 2 | EXTRACTP | MASTP | BB | 1992. 05. 10 | | : |
| 3 | EXTRACTB | MASTB | CC | 1992. 05. 10 | | : |
| 4 | EXTRACT0 | WORK | out | 1993. 06. 10 | | : |
| 5 | EXTRACT1 | WORK | out1 | 1993. 06. 10 | | : |
| 6 | EXTRACT2 | WORK | out2 | 1993. 06. 10 | | : |
| 7 | EXTRACT3 | WORK | out3 | 1993. 06. 15 | | : |

END ADD CHANGE DELETE DEFINE JOB LINK

FIG.151

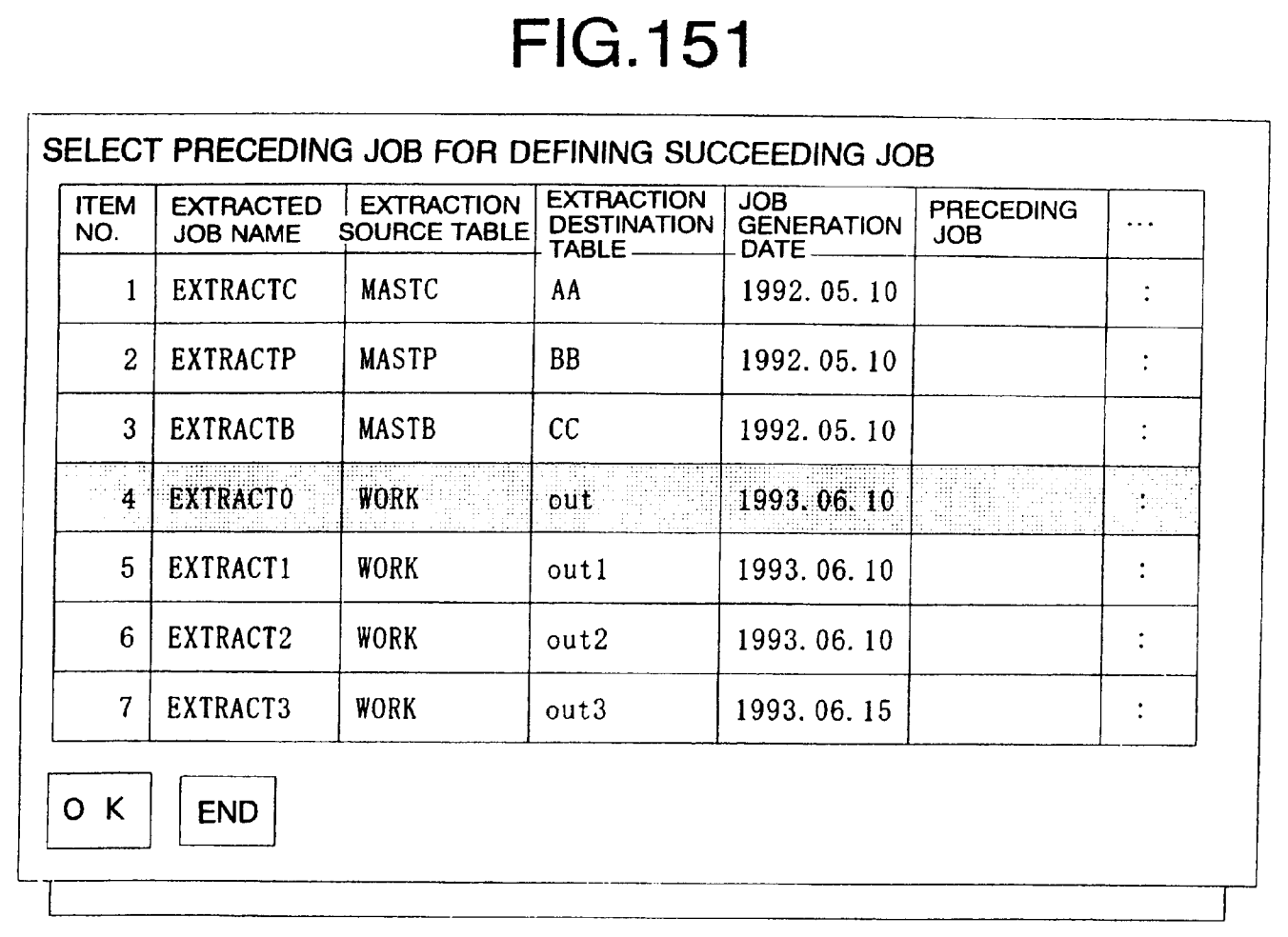

SELECT PRECEDING JOB FOR DEFINING SUCCEEDING JOB

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | : |
| 2 | EXTRACTP | MASTP | BB | 1992. 05. 10 | | : |
| 3 | EXTRACTB | MASTB | CC | 1992. 05. 10 | | : |
| 4 | EXTRACT0 | WORK | out | 1993. 06. 10 | | : |
| 5 | EXTRACT1 | WORK | out1 | 1993. 06. 10 | | : |
| 6 | EXTRACT2 | WORK | out2 | 1993. 06. 10 | | : |
| 7 | EXTRACT3 | WORK | out3 | 1993. 06. 15 | | : |

O K

END

FIG. 152

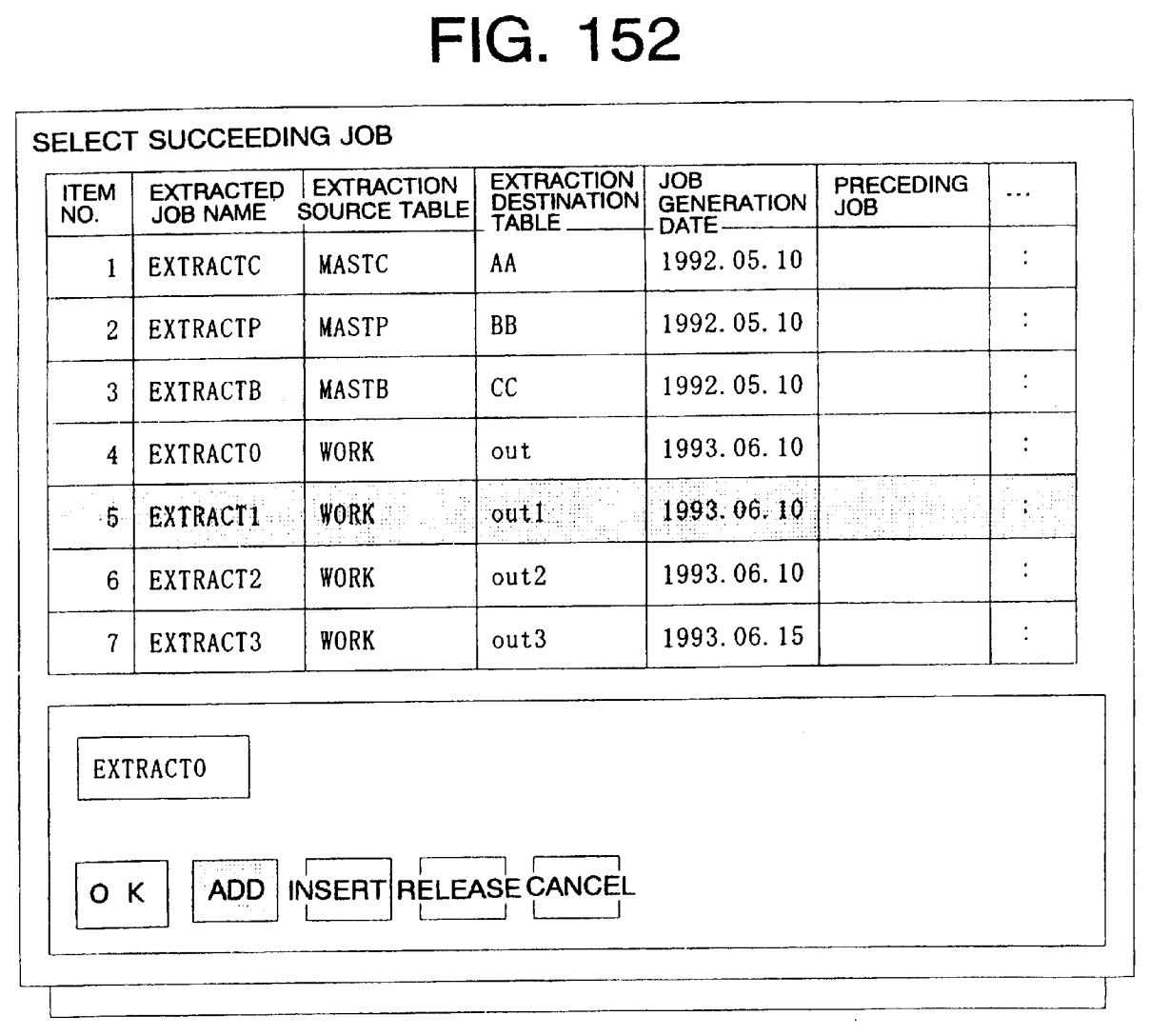

SELECT SUCCEEDING JOB

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | : |
| 2 | EXTRACTP | MASTP | BB | 1992. 05. 10 | | : |
| 3 | EXTRACTB | MASTB | CC | 1992. 05. 10 | | : |
| 4 | EXTRACT0 | WORK | out | 1993. 06. 10 | | : |
| 5 | EXTRACT1 | WORK | out1 | 1993. 06. 10 | | : |
| 6 | EXTRACT2 | WORK | out2 | 1993. 06. 10 | | : |
| 7 | EXTRACT3 | WORK | out3 | 1993. 06. 15 | | : |

EXTRACT0

O K | ADD | INSERT | RELEASE | CANCEL

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | : |
| 2 | EXTRACTP | MASTP | BB | 1992. 05. 10 | | : |
| 3 | EXTRACTB | MASTB | CC | 1992. 05. 10 | | : |
| 4 | EXTRACT0 | WORK | out | 1993. 06. 10 | | : |
| 5 | EXTRACT1 | WORK | out1 | 1993. 06. 10 | EXTRACT0 | : |
| 6 | EXTRACT2 | WORK | out2 | 1993. 06. 10 | | : |
| 7 | EXTRACT3 | WORK | out3 | 1993. 06. 15 | | : |

FIG. 154

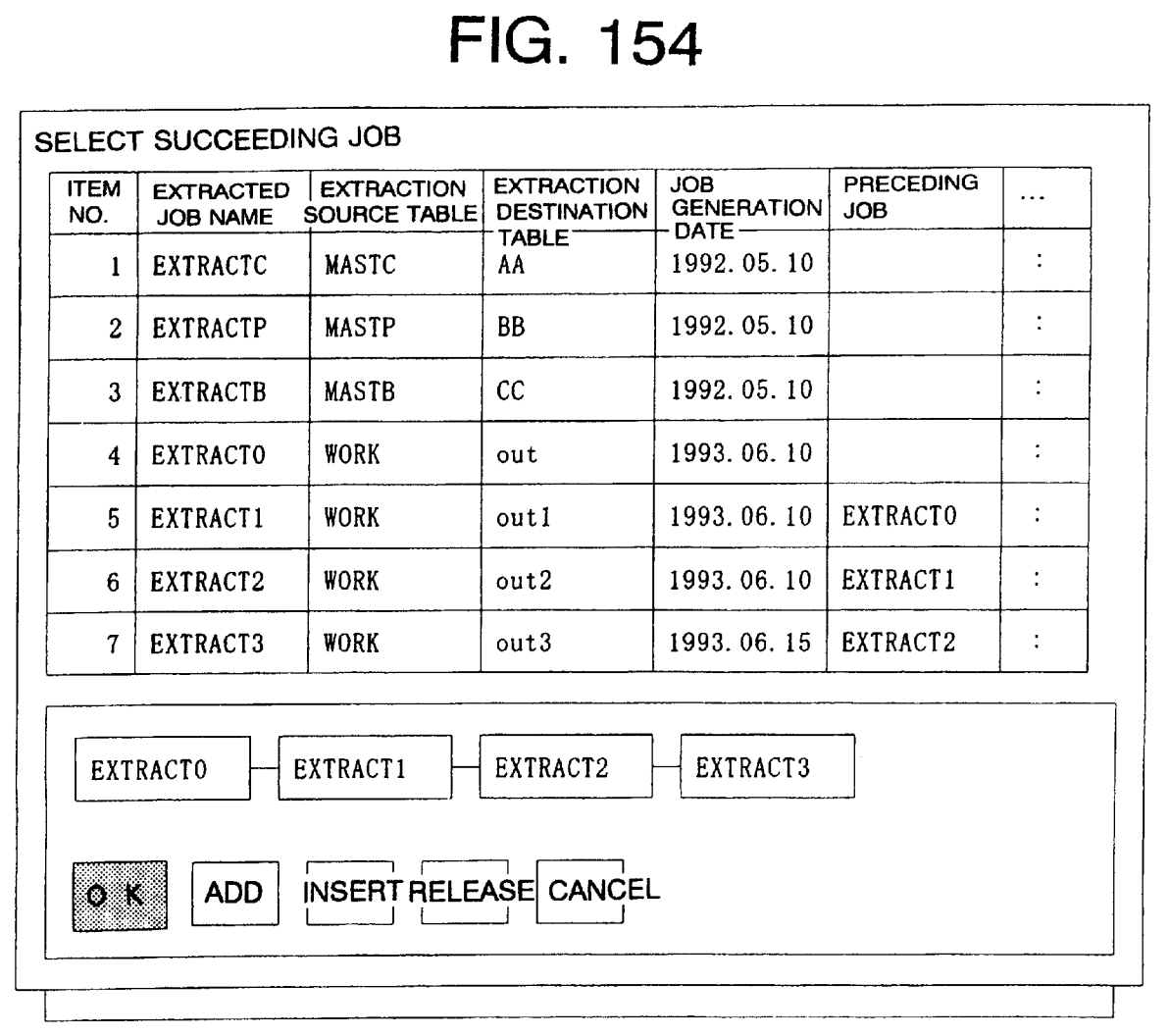

SELECT SUCCEEDING JOB

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | : |
| 2 | EXTRACTP | MASTP | BB | 1992. 05. 10 | | : |
| 3 | EXTRACTB | MASTB | CC | 1992. 05. 10 | | : |
| 4 | EXTRACT0 | WORK | out | 1993. 06. 10 | | : |
| 5 | EXTRACT1 | WORK | out1 | 1993. 06. 10 | EXTRACT0 | : |
| 6 | EXTRACT2 | WORK | out2 | 1993. 06. 10 | EXTRACT1 | : |
| 7 | EXTRACT3 | WORK | out3 | 1993. 06. 15 | EXTRACT2 | : |

EXTRACT0 — EXTRACT1 — EXTRACT2 — EXTRACT3

O K | ADD | INSERT | RELEASE | CANCEL

FIG. 155

EXTRACTED JOB DATA RECORDING AREA

| EXTRACTION SOURCE TABLE | EXTRACTION DESTINATION TABLE | EXTRACTED JOB NAME | JOB GENERATION DATE | JOB UPDATE DATE | ... | PRECEDING JOB | BASIC DATA | ... |
|---|---|---|---|---|---|---|---|---|
| MASTC | AA | EXTRACTC | 1992. 05. 10 | 1993. 06. 10 | | | FINISHED | : |
| MASTP | BB | EXTRACTP | 1992. 05. 10 | | | | FINISHED | : |
| MASTB | CC | EXTRACTB | 1992. 05. 10 | 1992. 06. 20 | | | FINISHED | : |
| WORK | out | EXTRACT0 | 1993. 06. 10 | | | | NOT FINISHED | : |
| WORK | out1 | EXTRACT1 | 1993. 06. 10 | | | EXTRACT0 | NOT FINISHED | : |
| WORK | out2 | EXTRACT2 | 1993. 06. 10 | | | EXTRACT1 | NOT FINISHED | : |
| WORK | out3 | EXTRACT3 | 1993. 06. 15 | | | EXTRACT2 | NOT FINISHED | |

FIG. 156

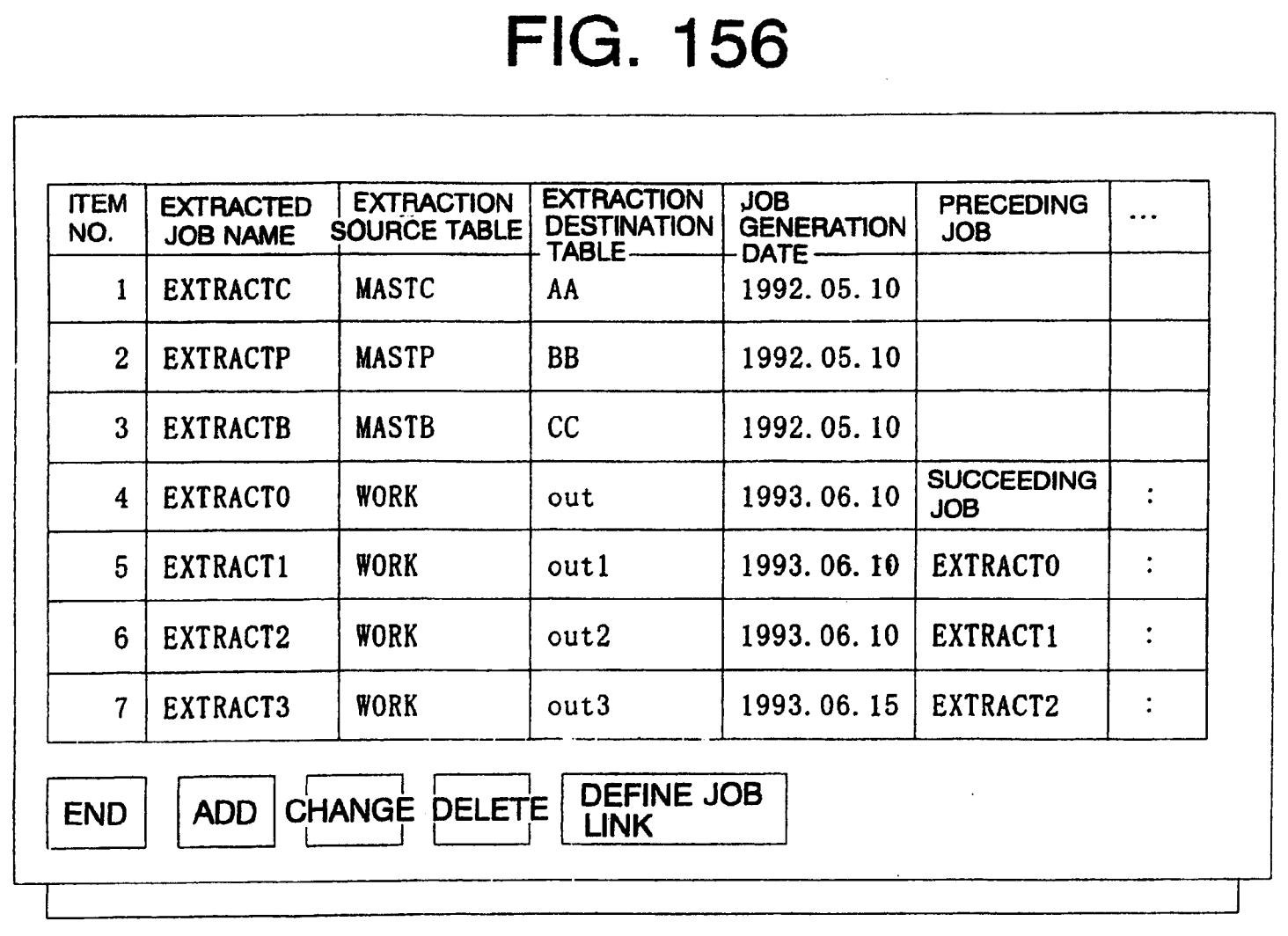

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1992. 05. 10 | | |
| 2 | EXTRACTP | MASTP | BB | 1992. 05. 10 | | |
| 3 | EXTRACTB | MASTB | CC | 1992. 05. 10 | | |
| 4 | EXTRACT0 | WORK | out | 1993. 06. 10 | SUCCEEDING JOB | : |
| 5 | EXTRACT1 | WORK | out1 | 1993. 06. 10 | EXTRACT0 | : |
| 6 | EXTRACT2 | WORK | out2 | 1993. 06. 10 | EXTRACT1 | : |
| 7 | EXTRACT3 | WORK | out3 | 1993. 06. 15 | EXTRACT2 | : |

END ADD CHANGE DELETE DEFINE JOB LINK

FIG. 157

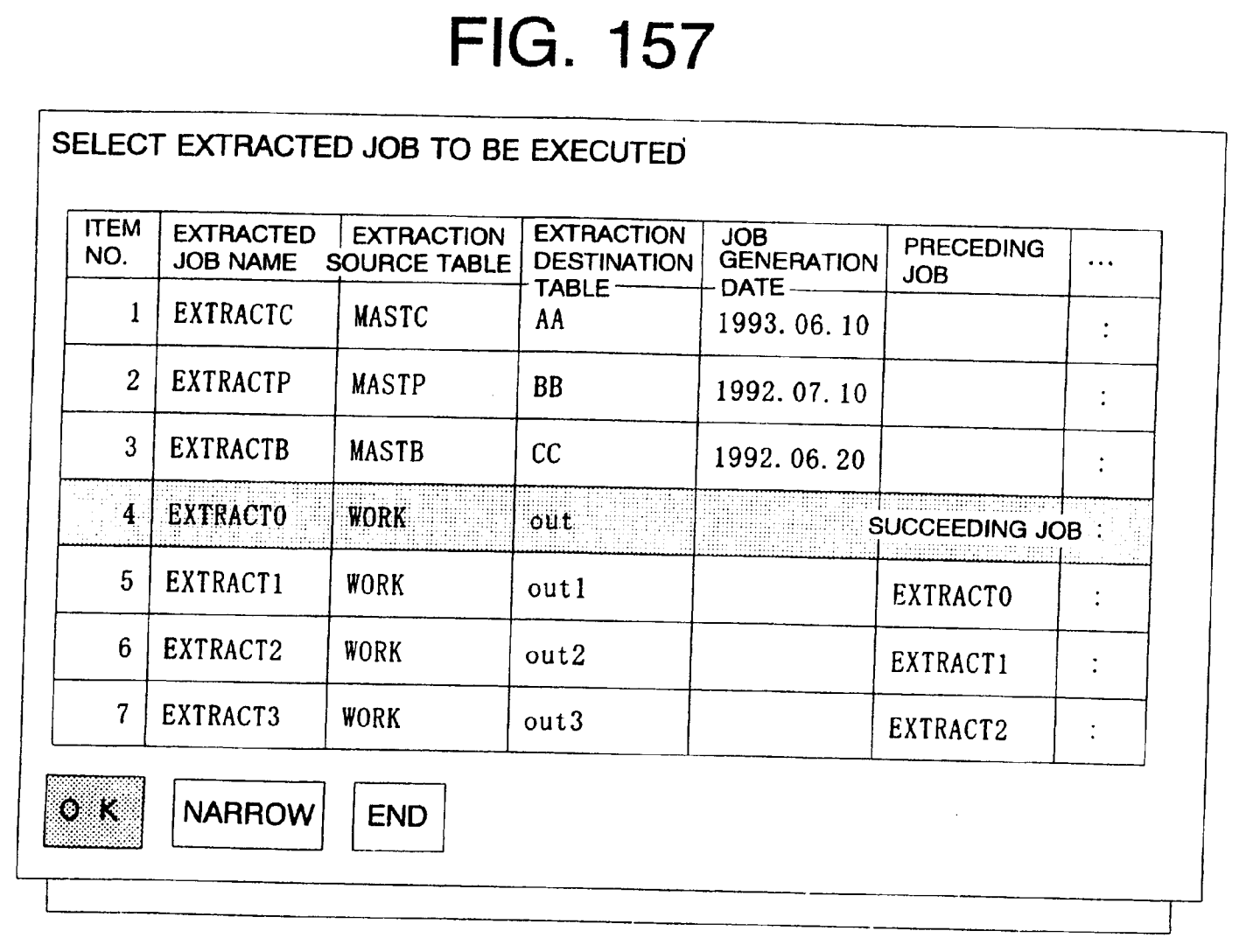

SELECT EXTRACTED JOB TO BE EXECUTED

| ITEM NO. | EXTRACTED JOB NAME | EXTRACTION SOURCE TABLE | EXTRACTION DESTINATION TABLE | JOB GENERATION DATE | PRECEDING JOB | ... |
|---|---|---|---|---|---|---|
| 1 | EXTRACTC | MASTC | AA | 1993. 06. 10 | | : |
| 2 | EXTRACTP | MASTP | BB | 1992. 07. 10 | | : |
| 3 | EXTRACTB | MASTB | CC | 1992. 06. 20 | | : |
| 4 | EXTRACT0 | WORK | out | | SUCCEEDING JOB | : |
| 5 | EXTRACT1 | WORK | out1 | | EXTRACT0 | : |
| 6 | EXTRACT2 | WORK | out2 | | EXTRACT1 | : |
| 7 | EXTRACT3 | WORK | out3 | | EXTRACT2 | : |

O K | NARROW | END

FIG. 162

EXTRACTED JOB DATA RECORDING AREA

| EXTRACTION SOURCE TABLE | EXTRACTION DESTINATION TABLE | EXTRACTED JOB NAME | ... | EDITION NO. | JOB EXECUTION DATE | PRECEDING JOB | BASIC DATA | ... |
|---|---|---|---|---|---|---|---|---|
| MASTC | AA | EXTRACTC | | 1993. 07 | 1993. 08. 05 | | FINISHED | : |
| MASTP | BB | EXTRACTP | | 1993. 05 | 1993. 05. 10 | | FINISHED | : |
| MASTB | CC | EXTRACTB | | 1992. 06 | 1992. 06. 20 | | FINISHED | : |
| WORK | out | EXTRACT0 | | 1993. 07 | 1993. 08. 10 | | FINISHED | : |
| WORK | out1 | EXTRACT1 | | 1993. 07 | 1993. 08. 10 | EXTRACT0 | FINISHED | : |
| WORK | out2 | EXTRACT2 | | 1993. 07 | 1993. 08. 10 | EXTRACT1 | FINISHED | : |
| WORK | out3 | EXTRACT3 | | 1993. 07 | 1993. 08. 10 | EXTRACT2 | FINISHED | |

FIG. 163

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | ... | EXPIRATION DATE | ... |
|---|---|---|---|---|---|---|---|---|---|
| AA | CUSTOMER MASTER | X | 21 | 1567 | 1 | 1993. 08. 05 | | | |
| BB | COMMODITY MASTER | X | 15 | 150 | 1 | 1993. 05. 10 | | | |
| CC | BUSINESS OFFICE MASTER | X | 13 | 68 | 1 | 1992. 06. 20 | | | |
| out | SALES DATA OF WHOLE COMPANY | X | 15 | 3950 | | 1993. 08. 10 | | 1993. 09. 10 | |
| out1 | SALES DATA OF EAST DISTRICT | X | 15 | 2050 | | 1993. 08. 10 | | 1993. 09. 10 | |
| out2 | SALES DATA OF MIDDLE DISTRICT | X | 15 | 850 | | 1993. 08. 10 | | 1993. 09. 10 | |
| out3 | SALES DATA OF WEST DISTRICT | X | 15 | 1050 | | 1993. 08. 10 | | 1993. 09. 10 | |

FIG. 165

EXTRACTION SOURCE TABLE MANAGING DATA RECORDING AREA

| TABLE NAME | SCHEMA NAME | TABLE ANNOTATION | EDITION NO. | UPDATE DATE | NO. OF ITEMS | NO. OF RECORDS | ... |
|---|---|---|---|---|---|---|---|
| MASTC | in | CUSTOMER MASTER | 1993. 7 | 1993. 08. 05 | 21 | 1567 | : |
| MASTP | in | COMMODITY MASTER | 1993. 5 | 1993. 05. 10 | 15 | 150 | : |
| MASTB | in | BUSINESS OFFICE MASTER | 1993. 7 | 1993. 08. 20 | 13 | 70 | : |
| WORK | in | SALES DATA | 1993. 7 | 1993. 08. 05 | 15 | 3950 | : |

FIG. 166

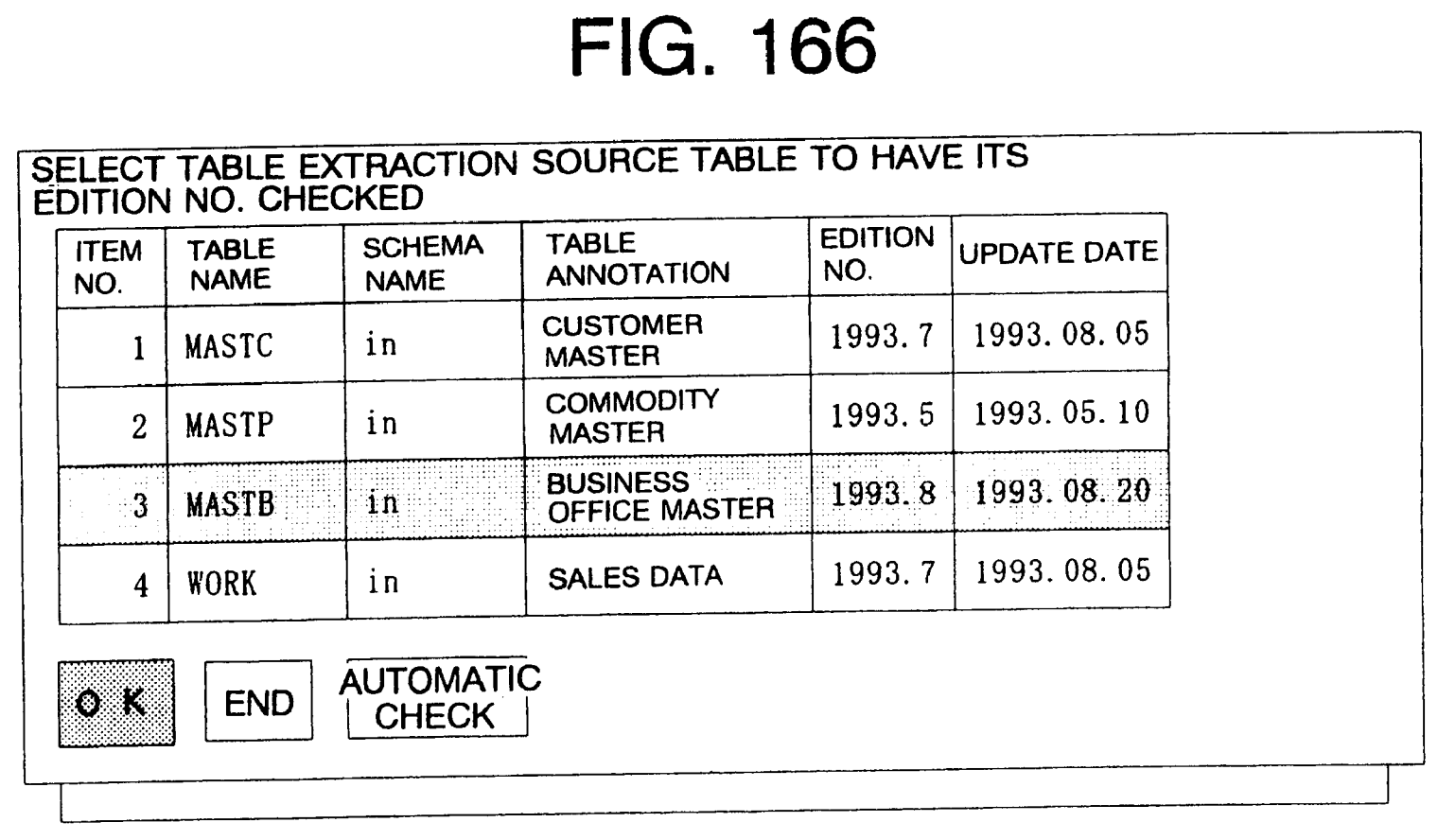

SELECT TABLE EXTRACTION SOURCE TABLE TO HAVE ITS EDITION NO. CHECKED

| ITEM NO. | TABLE NAME | SCHEMA NAME | TABLE ANNOTATION | EDITION NO. | UPDATE DATE |
|---|---|---|---|---|---|
| 1 | MASTC | in | CUSTOMER MASTER | 1993. 7 | 1993. 08. 05 |
| 2 | MASTP | in | COMMODITY MASTER | 1993. 5 | 1993. 05. 10 |
| 3 | MASTB | in | BUSINESS OFFICE MASTER | 1993. 8 | 1993. 08. 20 |
| 4 | WORK | in | SALES DATA | 1993. 7 | 1993. 08. 05 |

O K | END | AUTOMATIC CHECK

FIG. 167

EXTRACTED JOB DATA RECORDING AREA

| EXTRACTION SOURCE TABLE | EXTRACTION DESTINATION TABLE | EXTRACTED JOB NAME | ... | EDITION NO. | JOB EXECUTION DATE | PRECEDING JOB | BASIC DATA | ... |
|---|---|---|---|---|---|---|---|---|
| MASTC | AA | EXTRACTC | | 1993. 07 | 1993. 08. 05 | | FINISHED | : |
| MASTP | BB | EXTRACTP | | 1993. 05 | 1993. 05. 10 | | FINISHED | : |
| MASTB | CC | EXTRACTB | | 1992. 06 | 1992. 06. 20 | | FINISHED | : |
| WORK | out | EXTRACT0 | | 1993. 07 | 1993. 08. 10 | | FINISHED | : |
| WORK | out1 | EXTRACT1 | | 1993. 07 | 1993. 08. 10 | EXTRACT0 | FINISHED | : |
| WORK | out2 | EXTRACT2 | | 1993. 07 | 1993. 08. 10 | EXTRACT1 | FINISHED | : |
| WORK | out3 | EXTRACT3 | | 1993. 07 | 1993. 08. 10 | EXTRACT2 | FINISHED | |

FIG. 168

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | CUSTOMER MASTER | X | 21 | 1567 | 1 | 1993. 08. 05 | | |
| BB | COMMODITY MASTER | X | 15 | 150 | 1 | 1993. 05. 10 | | |
| CC | BUSINESS OFFICE MASTER | X | 13 | 68 | 1 | 1992. 06. 20 | | |
| out | SALES DATA OF WHOLE COMPANY | X | 15 | 3950 | 3 | 1993. 08. 10 | | |
| out1 | SALES DATA OF EAST DISTRICT | X | 15 | 2050 | 3 | 1993. 08. 10 | | |
| out2 | SALES DATA OF MIDDLE DISTRICT | X | 15 | 850 | 3 | 1993. 08. 10 | | |
| out3 | SALES DATA OF WEST DISTRICT | X | 15 | 1050 | 3 | 1993. 08. 10 | | |

| ITEM NO. | TABLE NAME | EDITION NO. |
|---|---|---|
| 1 | MASTC | 1993.07 |
| 2 | MASTP | 1993.05 |
| 3 | MASTB | 1993.07 |
| 4 | WORK | 1993.07 |

| OK | END | AUTOMATIC CHECK |
|---|---|---|

MISMATCH HAS BEEN FOUND IN EDITION NO. SELECT BUTTON IN CASE OF EXECUTION OF EXTRACTED JOB.

| ITEM NO. | TABLE NAME | SCHEMA NAME | TABLE ANNOTATION | EDITION NO. |
|---|---|---|---|---|
| 1 | CG | X | BUSINESS OFFICE MASTER | 1992.06 |

| CANCEL | EXECUTE EXTRACTION |
|---|---|

| ITEM NO. | TABLE NAME | EDITION NO. |
|---|---|---|
| 1 | MASTC | 1993.07 |
| 2 | MASTP | 1993.05 |
| 3 | MASTB | 1993.07 |
| 4 | WORK | 1993.07 |

[ O K ] [ END ] [ AUTOMATIC CHECK ]

EXTRACTED JOB EXTRACTB HAS BEEN NORMALLY EXECUTED.
MISMATCH OF EDITION NO. HAS BEEN ELIMINATED

| ITEM NO. | TABLE NAME | SCHEMA NAME | TABLE ANNOTATION | EDITION NO. |
|---|---|---|---|---|
| 1 | CC | X | BUSINESS OFFICE MASTER | 1993.07 |

[ CANCEL ] [ EXECUTE EXTRACTION ]

FIG. 171

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | CUSTOMER MASTER | X | 21 | 1567 | 1 | 1993. 08. 05 | | |
| BB | COMMODITY MASTER | X | 15 | 150 | 1 | 1993. 05. 10 | | |
| CC | BUSINESS OFFICE MASTER | X | 13 | 70 | 1 | 1993. 08. 20 | | |
| out | SALES DATA OF WHOLE COMPANY | X | 15 | 3950 | 3 | 1993. 08. 10 | | |
| out1 | SALES DATA OF EAST DISTRICT | X | 15 | 2050 | 3 | 1993. 08. 10 | | |
| out2 | SALES DATA OF MIDDLE DISTRICT | X | 15 | 850 | 3 | 1993. 08. 10 | | |
| out3 | SALES DATA OF WEST DISTRICT | X | 15 | 1050 | 3 | 1993. 08. 10 | | |

FIG. 172

EXTRACTED JOB DATA RECORDING AREA

| EXTRACTION SOURCE TABLE | EXTRACTION DESTINATION TABLE | EXTRACTED JOB NAME | ... | EDITION NO. | JOB EXECUTION DATE | PRECEDING JOB | BASIC DATA | ... |
|---|---|---|---|---|---|---|---|---|
| MASTC | AA | EXTRACTC | | 1993.07 | 1993.08.05 | | FINISHED | : |
| MASTP | BB | EXTRACTP | | 1993.05 | 1993.05.10 | | FINISHED | : |
| MASTB | CC | EXTRACTB | | 1993.07 | 1993.08.20 | | FINISHED | : |
| WORK | out | EXTRACT0 | | 1993.07 | 1993.08.10 | | FINISHED | : |
| WORK | out1 | EXTRACT1 | | 1993.07 | 1993.08.10 | EXTRACT0 | FINISHED | : |
| WORK | out2 | EXTRACT2 | | 1993.07 | 1993.08.10 | EXTRACT1 | FINISHED | : |
| WORK | out3 | EXTRACT3 | | 1993.07 | 1993.08.10 | EXTRACT2 | FINISHED | |

FIG. 173

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | CUSTOMER MASTER | X | 21 | 1567 | 1 | 1993. 08. 05 | YES | |
| BB | COMMODITY MASTER | X | 15 | 150 | 1 | 1993. 05. 10 | NO | |
| CC | BUSINESS OFFICE MASTER | X | 13 | 70 | 1 | 1993. 08. 20 | NO | |
| out | SALES DATA OF WHOLE COMPANY | x | 15 | 3950 | 3 | 1993. 08. 10 | NO | |
| out1 | SALES DATA OF EAST DISTRICT | x | 15 | 2050 | 3 | 1993. 08. 10 | NO | |
| out2 | SALES DATA OF MIDDLE DISTRICT | x | 15 | 850 | 3 | 1993. 08. 10 | NO | |
| out3 | SALES DATA OF WEST DISTRICT | x | 15 | 1050 | 3 | 1993. 08. 10 | NO | |
| : | : | : | : | : | : | : | : | |

FIG. 174

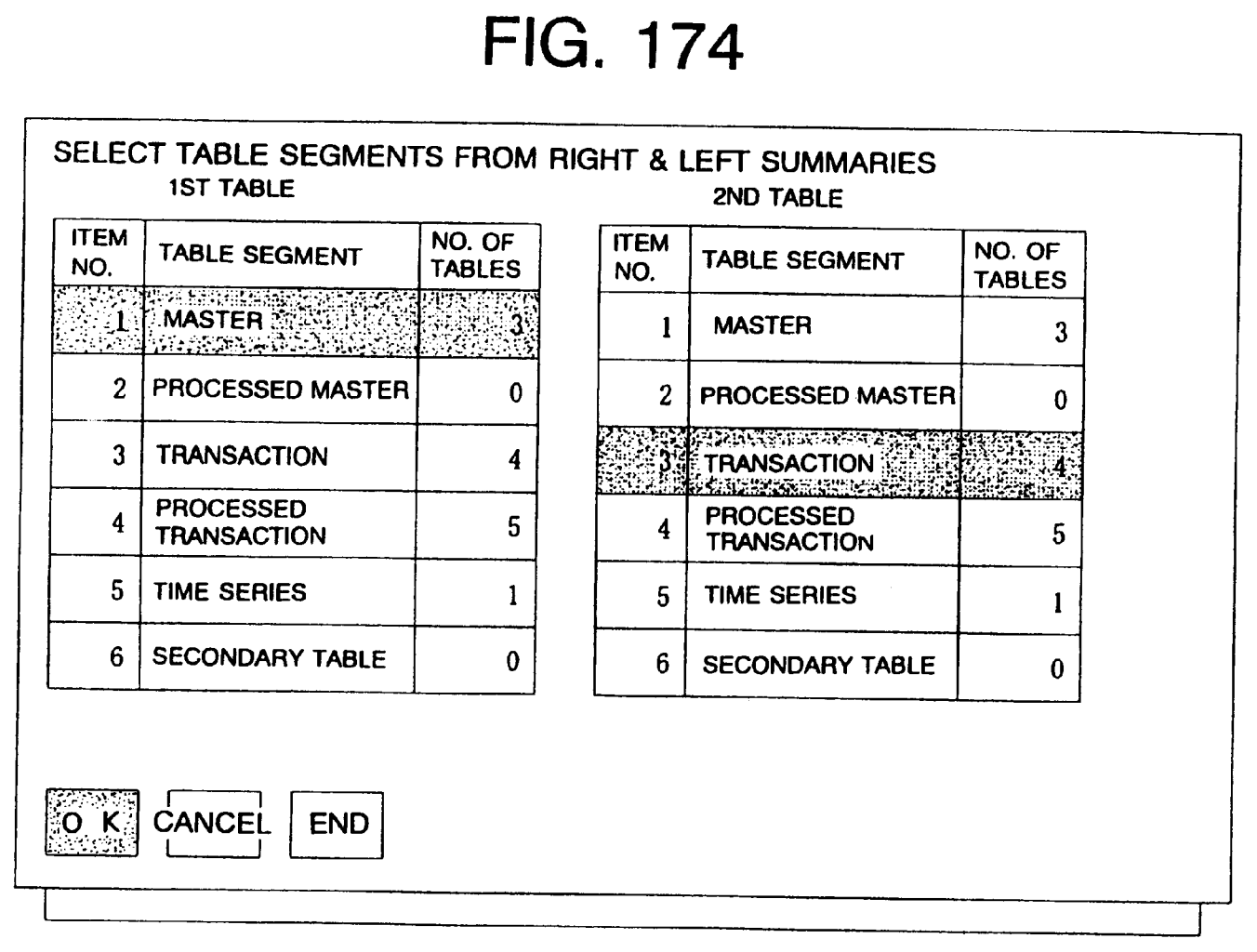

SELECT TABLE SEGMENTS FROM RIGHT & LEFT SUMMARIES

1ST TABLE

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 4 |
| 4 | PROCESSED TRANSACTION | 5 |
| 5 | TIME SERIES | 1 |
| 6 | SECONDARY TABLE | 0 |

2ND TABLE

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 4 |
| 4 | PROCESSED TRANSACTION | 5 |
| 5 | TIME SERIES | 1 |
| 6 | SECONDARY TABLE | 0 |

O K | CANCEL | END

FIG. 175

SELECT TABLES TO BE LINKED

TABLE OF MASTER DATA

| ITEM NO. | TABLE NAME | TABLE ANNOTATION | NO. OF ITEMS |
|---|---|---|---|
| 1 | AA | CUSTOMER MASTER | 21 |
| 2 | BB | COMMODITY MASTER | 15 |
| 3 | CC | BUSINESS OFFICE MASTER | 13 |

TABLE OF TRANSACTION DATA

| ITEM NO. | TABLE NAME | TABLE ANNOTATION | NO. OF ITEMS |
|---|---|---|---|
| 1 | out | SALES DATA OF WHOLE COMPANY | 15 |
| 2 | out1 | SALES DATA OF EAST DISTRICT | 15 |
| 3 | out2 | SALES DATA OF MIDDLE DISTRICT | 15 |
| 4 | out3 | SALES DATA OF WEST DISTRICT | 15 |

O K | CANCEL | END

FIG. 176

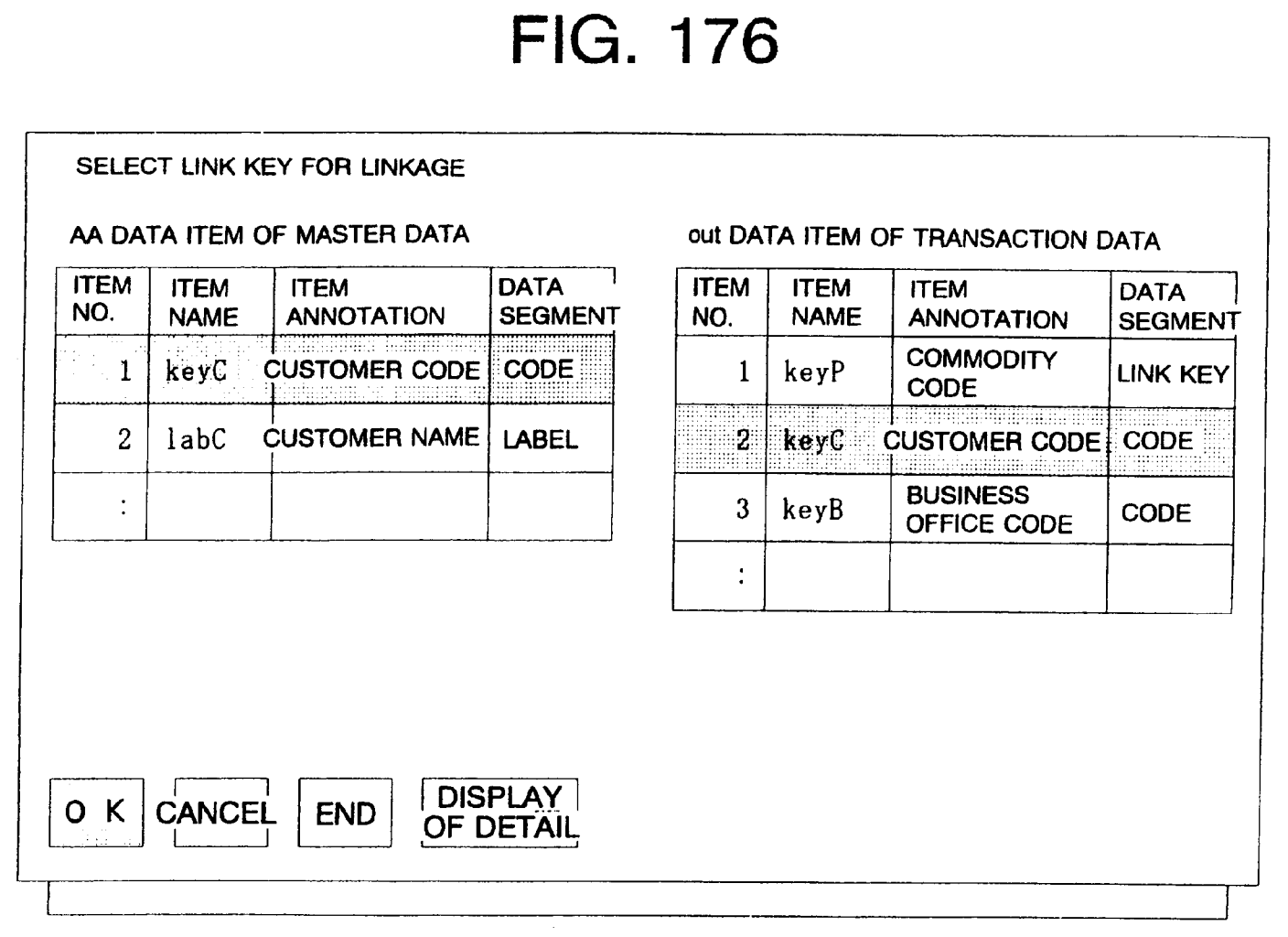

SELECT LINK KEY FOR LINKAGE

AA DATA ITEM OF MASTER DATA

| ITEM NO. | ITEM NAME | ITEM ANNOTATION | DATA SEGMENT |
|---|---|---|---|
| 1 | keyC | CUSTOMER CODE | CODE |
| 2 | labC | CUSTOMER NAME | LABEL |
| : | | | | out DATA ITEM OF TRANSACTION DATA

| ITEM NO. | ITEM NAME | ITEM ANNOTATION | DATA SEGMENT |
|---|---|---|---|
| 1 | keyP | COMMODITY CODE | LINK KEY |
| 2 | keyC | CUSTOMER CODE | CODE |
| 3 | keyB | BUSINESS OFFICE CODE | CODE |
| : | | | |

O K | CANCEL | END | DISPLAY OF DETAIL

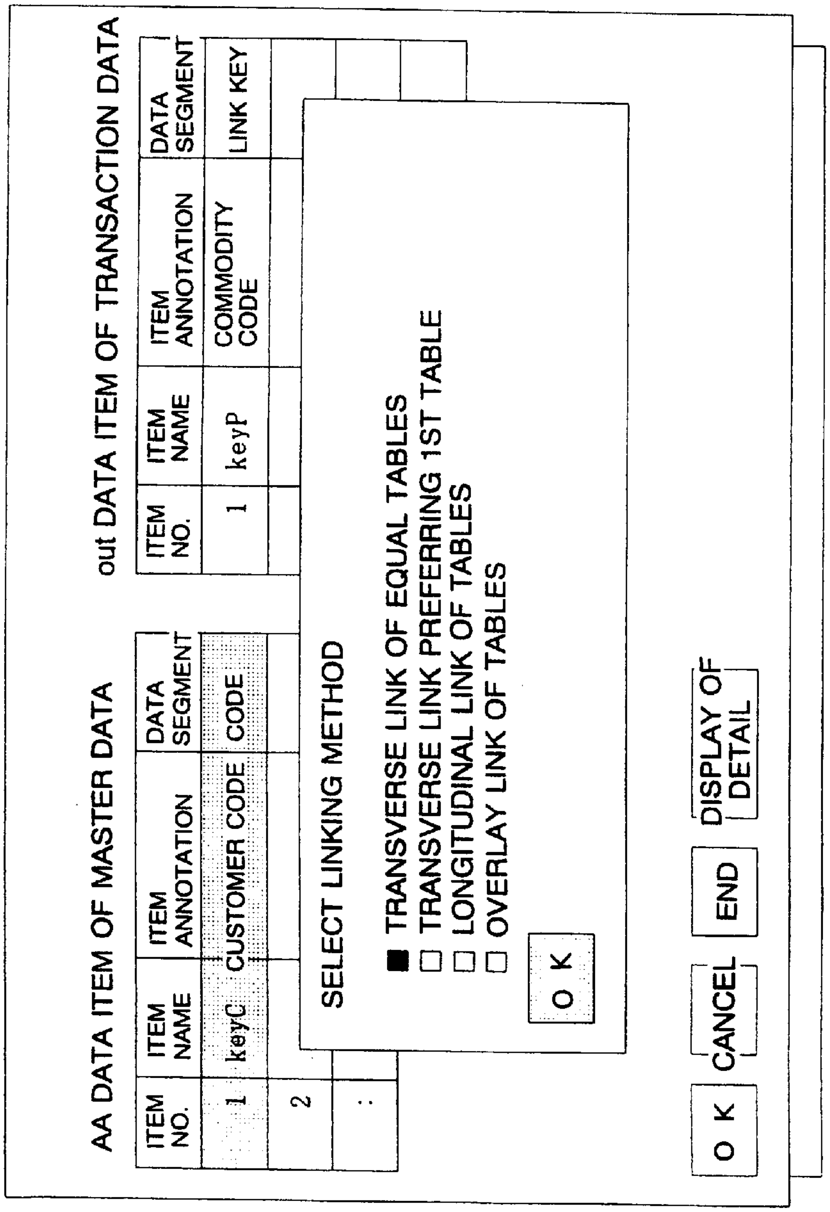

FIG. 177

AA DATA ITEM OF MASTER DATA

| ITEM NO. | ITEM NAME | ITEM ANNOTATION | DATA SEGMENT |
|---|---|---|---|
| 1 | keyC | CUSTOMER CODE | CODE |
| 2 | | | |
| .. | | | |

out DATA ITEM OF TRANSACTION DATA

| ITEM NO. | ITEM NAME | ITEM ANNOTATION | DATA SEGMENT |
|---|---|---|---|
| 1 | keyP | COMMODITY CODE | LINK KEY |
| | | | |

SELECT LINKING METHOD

■ TRANSVERSE LINK OF EQUAL TABLES
☐ TRANSVERSE LINK PREFERRING 1ST TABLE
☐ LONGITUDINAL LINK OF TABLES
☐ OVERLAY LINK OF TABLES

O K

O K | CANCEL | END | DISPLAY OF DETAIL

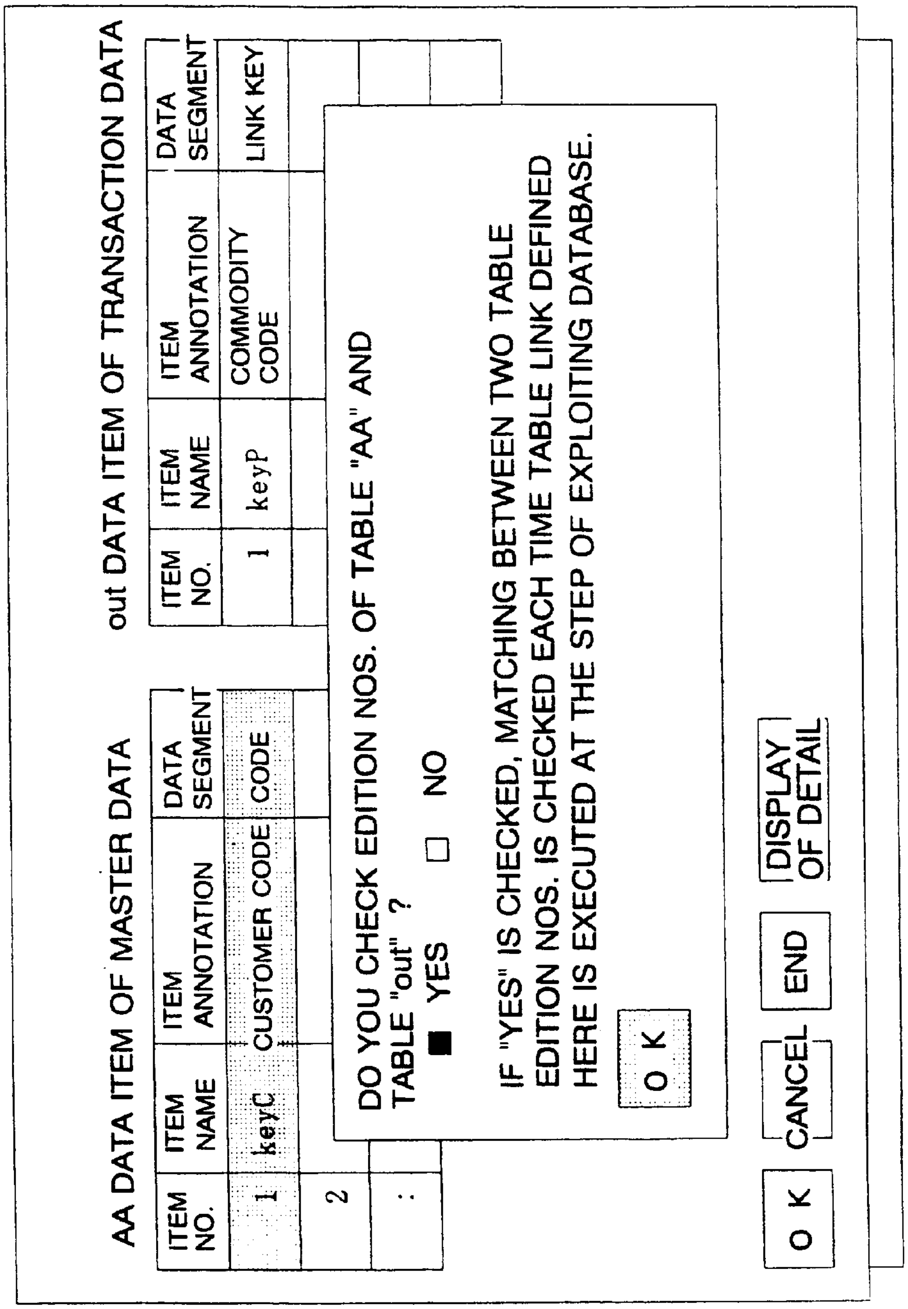

FIG. 178

AA DATA ITEM OF MASTER DATA

| ITEM NO. | ITEM NAME | ITEM ANNOTATION | DATA SEGMENT |
|---|---|---|---|
| 1 | keyC | CUSTOMER CODE | CODE |
| 2 | | | |
| : | | | |

out DATA ITEM OF TRANSACTION DATA

| ITEM NO. | ITEM NAME | ITEM ANNOTATION | DATA SEGMENT |
|---|---|---|---|
| 1 | keyP | COMMODITY CODE | LINK KEY |
| | | | |
| | | | |

DO YOU CHECK EDITION NOS. OF TABLE "AA" AND TABLE "out" ?
■ YES  □ NO

IF "YES" IS CHECKED, MATCHING BETWEEN TWO TABLE EDITION NOS. IS CHECKED EACH TIME TABLE LINK DEFINED HERE IS EXECUTED AT THE STEP OF EXPLOITING DATABASE.

[OK]

[OK] [CANCEL] [END] [DISPLAY OF DETAIL]

FIG. 179

TABLE LINK MANAGING DATA AREA

| 1ST TABLE NAME | 2ND TABLE NAME | EDITION NO. CHECK | NO. OF LINK KEYS | LINK KEY OF 1ST TABLE | LINK KEY OF 2ND TABLE | LINKING METHOD |
|---|---|---|---|---|---|---|
| out | BB | 0 | 1 | keyP | keyP | 1 |
| out | AA | 1 | 1 | KeyC | KeyC | 1 |
| : | : | : | : | : | : | : |

FIG. 180

TABLE MANAGING DATA RECORDING AREA

| TABLE NAME | TABLE ANNOTATION | SCHEMA NAME | NO. OF ITEMS | NO. OF LINES | TABLE SEGMENT | UPDATE DATE | TABLE LINK | ... |
|---|---|---|---|---|---|---|---|---|
| AA | CUSTOMER MASTER | X | 21 | 1567 | 1 | 1993. 08. 05 | YES | |
| BB | COMMODITY MASTER | X | 15 | 150 | 1 | 1993. 05. 10 | YES | |
| CC | BUSINESS OFFICE MASTER | X | 13 | 68 | 1 | 1993. 08. 20 | NO | |
| out | SALES DATA OF WHOLE COMPANY | x | 15 | 3950 | 3 | 1993. 08. 10 | YES | |
| out1 | SALES DATA OF EAST DISTRICT | x | 15 | 2050 | 3 | 1993. 08. 10 | NO | |
| out2 | SALES DATA OF MIDDLE DISTRICT | x | 15 | 850 | 3 | 1993. 08. 10 | NO | |
| out3 | SALES DATA OF WEST DISTRICT | x | 15 | 1050 | 3 | 1993. 08. 10 | NO | |
| : | : | : | : | : | : | : | : | |

FIG. 182

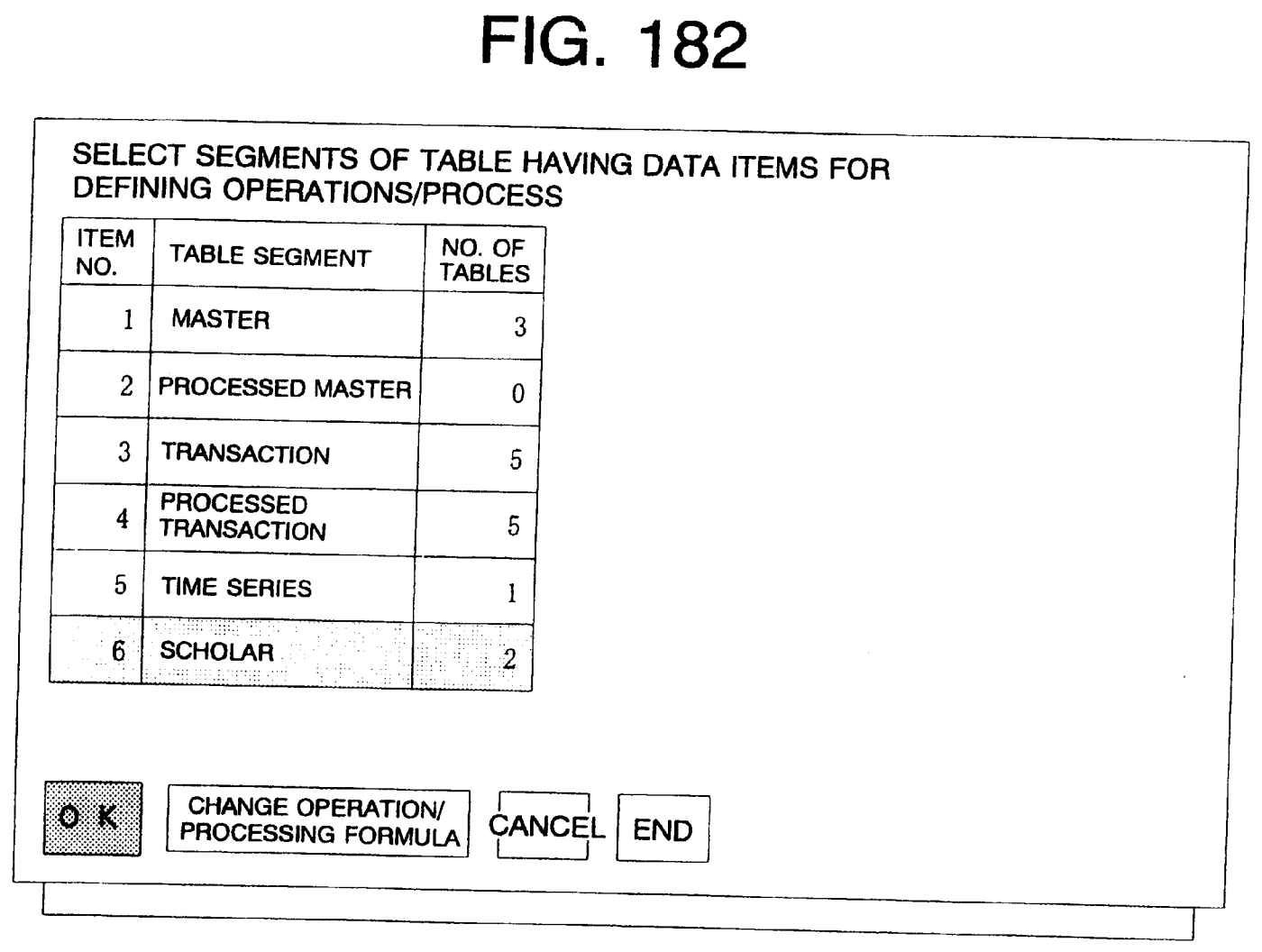

SELECT SEGMENTS OF TABLE HAVING DATA ITEMS FOR DEFINING OPERATIONS/PROCESS

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SCHOLAR | 2 |

O K

CHANGE OPERATION/ PROCESSING FORMULA

CANCEL

END

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥£ RATE | SCHOLAR |

DEFINE OPERATION/PROCESS FORMULA

ITEM NAME : MYR
ITEM ANNOTATION: ¥M RATE
FORMULA :
64.46

OPERANDS
× ÷ + − ( )
⑦ ⑧ ⑨
④ ⑤ ⑥
① ② ③
0 000

| FUNCTION |
|---|
| @TODAY |
| @DAY1 |
| @DAY2 |

[ O K ] [ CANCEL ]

[ END ]

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥£ RATE | SCHOLAR |

[ CANCEL ] [ END ]

DEFINE DATA ITEM ATTRIBUTE

ITEM NAME : MYR
HEADER: ¥M RATE
UNIT: YEN
EDITION : ¥¥¥.¥9
FORMAT :

[ OK ] [ CANCEL ]

[ OK ] [ CANCEL ]

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥€ RATE | SCHOLAR |
| 3 | MYR | ¥M RATE | SCHOLAR |

DEFINE OPERATION/PROCESS FORMULA

ITEM NAME : _____

ITEM ANNOTATION: _____

FORMULA : _____

| OPERANDS |
|---|
| × ÷ + − ( ) |
| ⑦ ⑧ ⑨ |
| ④ ⑤ ⑥ |
| ① ② ③ |
| 0 000 |

| ⇦ | FUNCTION | | |
|---|---|---|---|
| | @TODAY | | |
| | @DAY1 | | |
| ⇨ | @DAY2 | | |

[ O K ] [ CANCEL ]

[ END ]

SELECT SEGMENTS OF TABLE HAVING DATA ITEMS FOR DEFINING OPERATIONS/PROCESS

| ITEM NO. | TABLE SEGMENT | NO. OF TABLES |
|---|---|---|
| 1 | MASTER | 3 |
| 2 | PROCESSED MASTER | 0 |
| 3 | TRANSACTION | 5 |
| 4 | PROCESSED TRANSACTION | 5 |
| 5 | TIME SERIES | 1 |
| 6 | SCHOLAR | 3 |

OK    CHANGE OPERATION/PROCESSING FORMULA    CANCEL    END

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥€ RATE | SCHOLAR |
| 3 | MYR | ¥M RATE | SCHOLAR |

DEFINE OPERATION/PROCESS FORMULA

ITEM NAME : DYR
ITEM ANNOTATION: ¥$ RATE
FORMULA : 100.05

OPERANDS
× ÷ + − ( ) .
⑦ ⑧ ⑨
④ ⑤ ⑥
① ② ③
0 000

| FUNCTION |
|---|
| @TODAY |
| @DAY1 |
| @DAY2 |

⇧ ⇩

O K    CANCEL  DELETE

END

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥£ RATE | SCHOLAR |
| 3 | MYR | ¥M RATE | SCHOLAR |

DEFINE OPERATION/PROCESS FORMULA

ITEM NAME : DYR
ITEM ANNOTATION: ¥$ RATE

FORMULA : 99.09

OPERANDS
× ÷ + − ( )
⑦ ⑧ ⑨ .
④ ⑤ ⑥ )
① ② ③
0 000

| FUNCTION |
|---|
| @TODAY |
| @DAY1 |
| @DAY2 |

[ O K ] [ CANCEL ]

[ END ]

SCHOLAR DATA ITEMS

| ITEM NO. | ITEM NAME | ITEM ANNOTATION | DATA SEGMENT |
|---|---|---|---|
| 1 | DYR | ¥$ RATE | SCHOLAR |
| 2 | PYR | ¥£ RATE | SCHOLAR |
| 3 | MYR | ¥M RATE | SCHOLAR |

DEFINE DATA ITEM ATTRIBUTE

ITEM NAME: MDR
HEADER: ¥$ RATE
UNIT: YEN
EDITION FORMAT: ¥¥¥.¥9

[OK] [CANCEL]

[OK] [CANCEL] [END]

FIG. 194

MANAGEMENT POINT RECORDING AREA

| NAME | DISPLAY ORDER | NO. OF SEGMENTS | EXPIRATION DATE | ... |
|---|---|---|---|---|
| WHEN (TIME) | 1 | | | |
| WHO (PERSON, ORGANIZATION, ENTERPRISE) | 2 | 3 | | |

| ITEM NO. | MANAGEMENT POINT | DICTIONARY | NO. OF SECTIONS | EXPIRATION DATE | ... |
|---|---|---|---|---|---|
| 1 | WHEN (TIME) | COMMON | | | |
| 2 | WHO (PERSON, ORGANIZATION, ENTERPRISE) | COMMON | 3 | | |

| ITEM NO. | MANAGEMENT POINT | DICTIONARY | NO. OF SECTIONS | EXPIRATION DATE |
|---|---|---|---|---|
| 1 | WHEN (TIME) | COMMON | | |
| 2 | | | | ... |

DEFINE ATTRIBUTE DATA OF MANAGEMENT POINT
NAME: WHERE (PLACE)           EXPIRATION DATE : 1995. 03. 20
DICTIONARY ■ COMMON ☐ PURPOSE/PERSONAL

[OK]  [CANCEL]

[END]  [ADD] [CHANGE] [DELETE] [CHANGE ORDER] [SUPPRESS PUBLICATION] [OPEN]

FIG. 197

MANAGEMENT POINT RECORDING AREA

| NAME | DISPLAY ORDER | NO. OF SEGMENTS | EXPIRATION DATE | ... |
|---|---|---|---|---|
| WHEN (TIME) | 1 | | | |
| WHO (PERSON, ORGANIZATION, ENTERPRISE) | 2 | 3 | | |
| WHERE (PLACE) | 3 | 0 | 1995. 03. 20 | |

FIG. 198

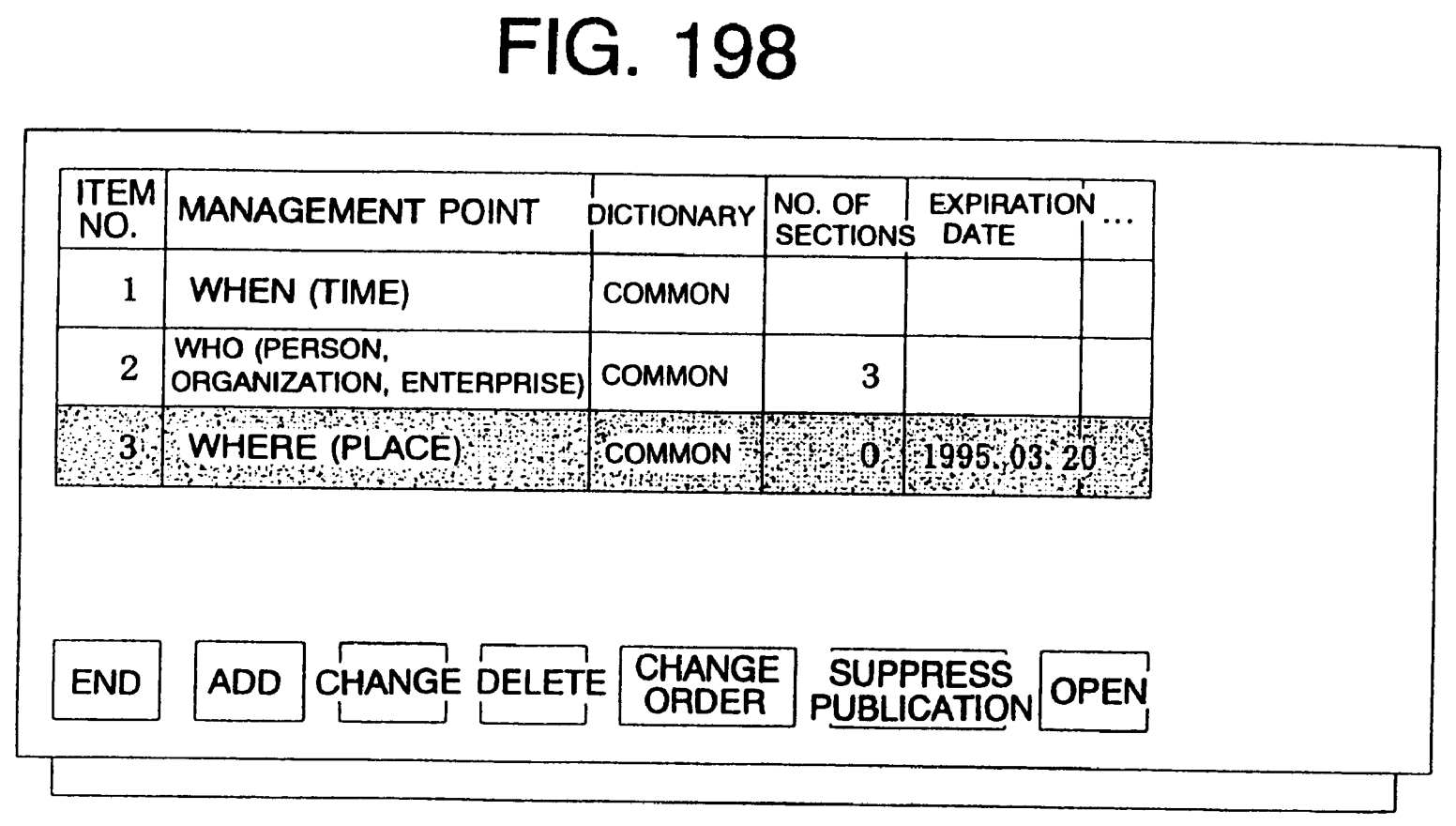

| ITEM NO. | MANAGEMENT POINT | DICTIONARY | NO. OF SECTIONS | EXPIRATION DATE | ... |
|---|---|---|---|---|---|
| 1 | WHEN (TIME) | COMMON | | | |
| 2 | WHO (PERSON, ORGANIZATION, ENTERPRISE) | COMMON | 3 | | |
| 3 | WHERE (PLACE) | COMMON | 0 | 1995.03.20 | |

END | ADD | CHANGE | DELETE | CHANGE ORDER | SUPPRESS PUBLICATION | OPEN

FIG. 199

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 3 | |
| WHERE (PLACE) | 3 | 0 | |

SEGMENT DATA RECORDING AREA

| NAME | DISPLAY ORDER | SEGMENT TYPE | NO. OF GRAPHS | EXPIRATION DATE |
|---|---|---|---|---|
| EACH CUSTOMER | 1 | 2 | 0 | |
| EACH VENDER | 2 | 2 | 0 | |
| EACH DEALER | 3 | 3 | 1 | |

FIG. 200

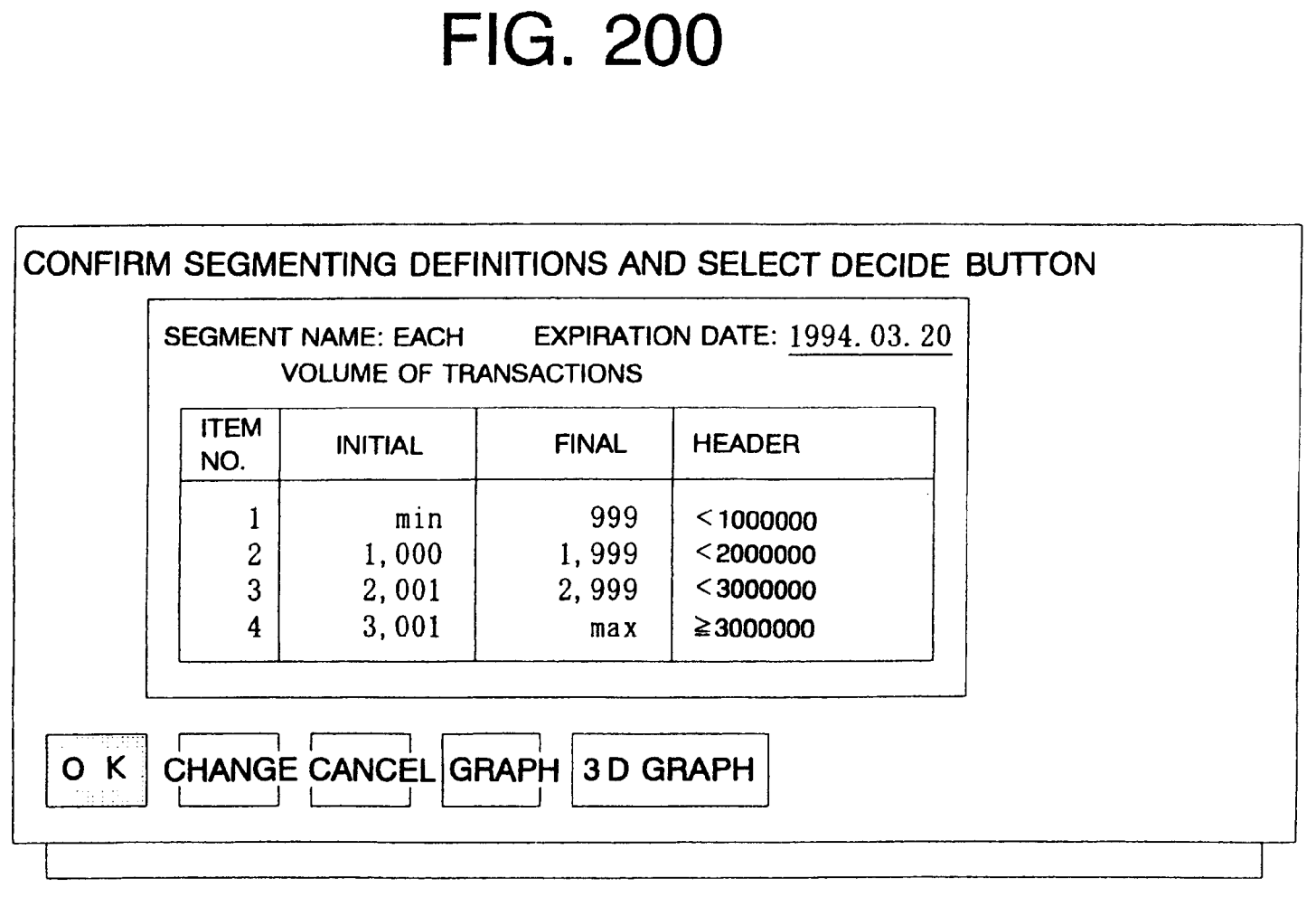

CONFIRM SEGMENTING DEFINITIONS AND SELECT DECIDE BUTTON

SEGMENT NAME: EACH VOLUME OF TRANSACTIONS    EXPIRATION DATE: 1994. 03. 20

| ITEM NO. | INITIAL | FINAL | HEADER |
|---|---|---|---|
| 1 | min | 999 | <1000000 |
| 2 | 1,000 | 1,999 | <2000000 |
| 3 | 2,001 | 2,999 | <3000000 |
| 4 | 3,001 | max | ≧3000000 |

O K | CHANGE | CANCEL | GRAPH | 3 D GRAPH

FIG. 201

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS | EXPIRATION DATE |
|---|---|---|---|---|
| EACH CUSTOMER | 1 | 2 | 0 | |
| EACH VENDER | 2 | 2 | 0 | |
| EACH DEALER | 3 | 3 | 1 | |
| EACH VOLUME OF TRANSACTIONS | 4 | 2 | 0 | 1994. 03. 20 |

SEGMENT SPECIFICATION RECORDING AREA

| KEY ITEM NAME | TYPE | NO. | 1ST SEGMENT | | | 2ND SEGMENT | | | |
|---|---|---|---|---|---|---|---|---|---|
| cssh5 | 2 | 4 | min | 999 | < 1000000 | min | 1, 999 | < 2000000 | ... |

FIG. 205

MANAGEMENT POINT RECORDING AREA

| NAME | DISPLAY ORDER | NO. OF SEGMENTS | PUBLIC SEGMENT | ... |
|---|---|---|---|---|
| WHEN (TIME) | 1 | | PUBLIC | |
| WHO (PERSON, ORGANIZATION, ENTERPRISE) | 2 | 3 | PUBLIC | |
| WHERE (PLACE) | 3 | | PUBLIC | |

SELECT PROCESS

| ITEM NO. | MANAGEMENT POINT | DICTIONARY |
|---|---|---|
| 1 | WHEN (TIME) | COMMON |
| 2 | WHO (PERSON, ORGANIZATION, ENTERPRISE) | |
| 3 | WHERE (PLACE) | |

[END] [ADD] [CHANGE] [DELETE] [CHANGE ORDER] [SUPPRESS PUBLICATION] [OPEN]

FIG. 207

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 3 | |
| WHERE (PLACE) | 3 | 0 | |

SEGMENT DATA RECORDING AREA

| NAME | DISPLAY ORDER | SEGMENT TYPE | NO. OF GRAPHS | PUBLIC SEGMENT |
|---|---|---|---|---|
| EACH CUSTOMER | 1 | 2 | 0 | PUBLIC |
| EACH VENDER | 2 | 2 | 0 | PUBLIC |
| EACH DEALER | 3 | 3 | 1 | PUBLIC |

FIG. 209

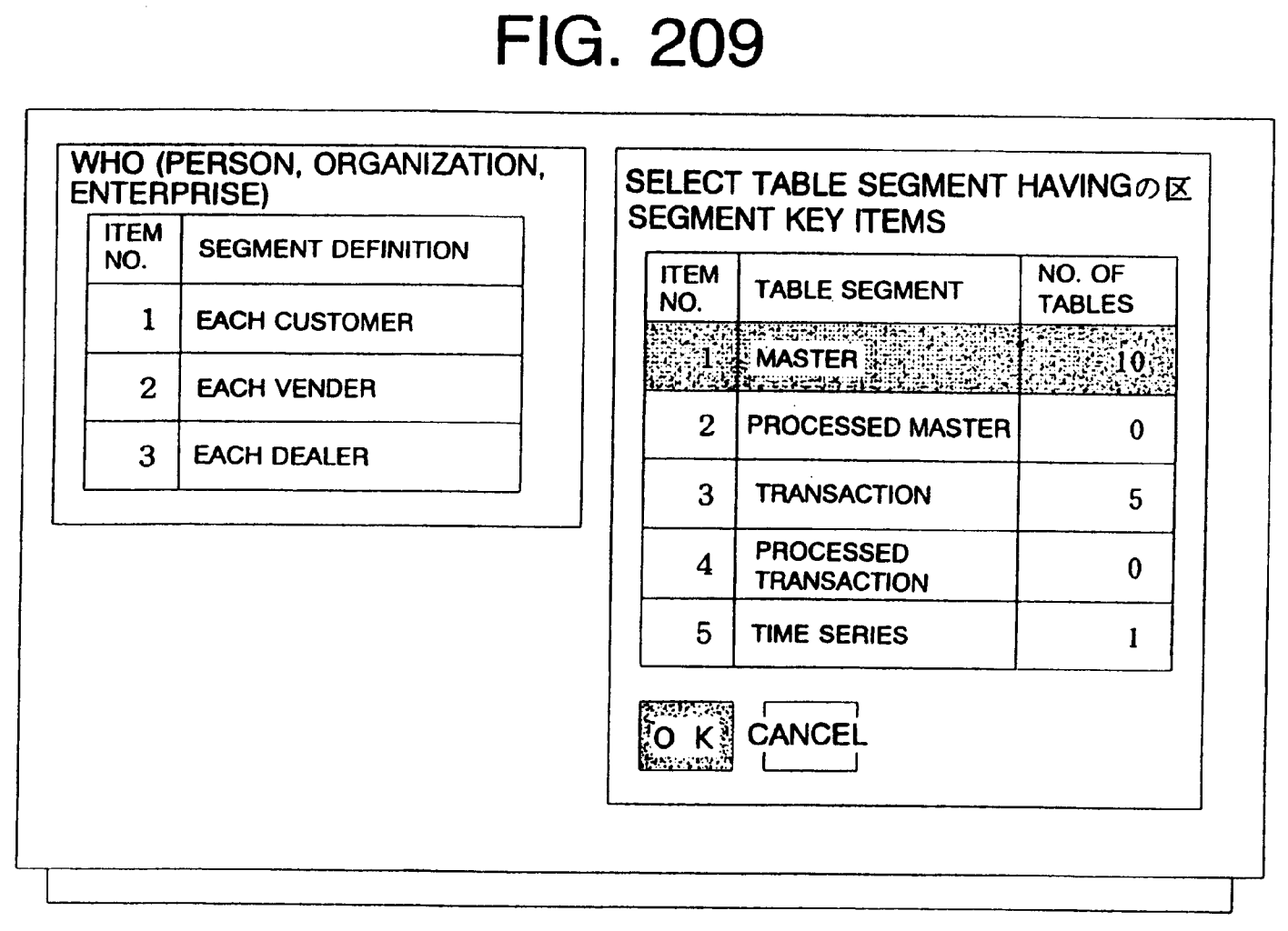

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT TABLE SEGMENT HAVINGの区 SEGMENT KEY ITEMS

| ITEM NO. | TABLE SEGMENT | NO. OF TABLES |
|---|---|---|
| 1 | MASTER | 10 |
| 2 | PROCESSED MASTER | 0 |
| 3 | TRANSACTION | 5 |
| 4 | PROCESSED TRANSACTION | 0 |
| 5 | TIME SERIES | 1 |

O K   CANCEL

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT TABLE SEGMENT HAVING SEGMENT KEY ITEMS

| ITEM NO. | TABLE NAME | TABLE ANNOTATION | ... |
|---|---|---|---|
| 1 | cst | CUSTOMER MASTER | |
| 2 | yy | COMMODITY MASTER | |
| 3 | xx | BRANCH MASTER | |
| .. | | | |
| .. | | | |

OK   CANCEL

WHO (PERSON, ORGANIZATION, ENTERPRISE)

| ITEM NO. | SEGMENT DEFINITION |
|---|---|
| 1 | EACH CUSTOMER |
| 2 | EACH VENDER |
| 3 | EACH DEALER |

SELECT SEGMENT KEY ITEMS

| ITEM NO. | TABLE ITEM | HEADER |
|---|---|---|
| 1 | ccode | CUSTOMER CODE |
| 2 | cname | CUSTOMER NAME |
| .. | .. | |
| 18 | cssh5 | VOLUME OF TRANSACTIONS OF 1993 |

[DISPLAY OF DETAIL] [NARROW] [CANCEL]

WHO (PERSON, ORGANIZATION, ENTERPRISE)

| ITEM NO. | SEGMENT DEFINITION |
|---|---|
| 1 | EAC |
| 2 | EAC |
| 3 | EAC |

| ITEM NO. | TABLE ITEM |
|---|---|
| | HEADER |
| | CUSTOMER CODE |
| | CUSTOMER NAME |
| | |
| | VOLUME OF TRANSACTIONS OF 1993 |

SELECT SEGMENT DEFINING METHOD

☐ DIRECT EXPLOITATION OF DATA VALUE
■ ADD MEANING TO DATA VALUE

[ O K ] [ CANCEL ]

[ DISPLAY OF DETAIL ] [ NARROW ] [ CANCEL ]

DESIGNATE ATTRIBUTES OF
SEGMENT DEFINITION

SEGMENT NAME: EACH VALUE OF TRANSACTIONS

SEGMENTING METHOD
☐ SEGMENTATION AT ARBITRARY INTERVAL
☐ SEGMENTATION AT EQUAL DISTANCES
☐ SEGMENTATION WITH VALUE

| NO. OF DATA | 5,236 |
|---|---|
| MAXIMUM | 38,521 |
| MINIMUM | 532 |
| AVERAGE | 19,320 |
| ·· | |

[CANCEL] [GRAPH]

SEGMENT NAME:
EACH VALUE OF TRANSACTIONS

SEGMENTING METHOD
- ☐ SEGMENTATION AT EQUAL DISTANCES
- ■ SEGMENTATION AT ARBITRARY INTERVAL
- ☐ SEGMENTATION WITH VALUE

| NO. OF DATA | 5,236 |
|---|---|
| MAXIMUM | 38,521 |
| MINIMUM | 532 |
| AVERAGE | 19,320 |
| ∴ | |

[CANCEL] [GRAPH]

DEFINE.SEGMENTING SPECIFICATIONS

| ITEM NO. | INITIAL | FINAL | HEADER |
|---|---|---|---|
| 1 | min | 999 | <1000000 |
| 2 | 1,000 | 1,999 | <2000000 |
| 3 | 2,000 | 2,999 | <3000000 |
| 4 | 3,000 | max | ≧3000000 |

[O K] [ADD] [CHANGE] [DELETE]

[CANCEL] [GRAPH] [3D GRAPH]

FIG. 216

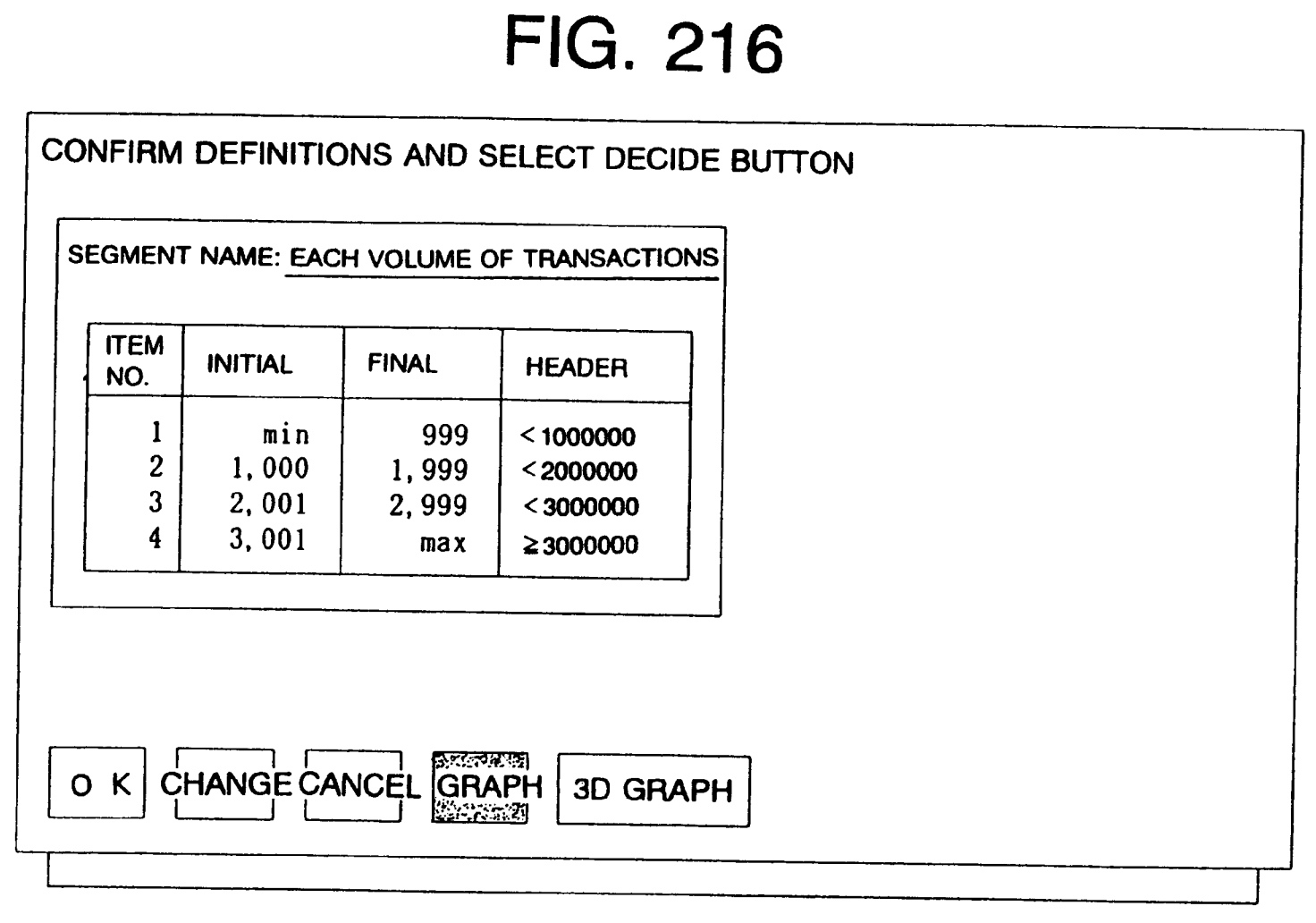

CONFIRM DEFINITIONS AND SELECT DECIDE BUTTON

SEGMENT NAME: EACH VOLUME OF TRANSACTIONS

| ITEM NO. | INITIAL | FINAL | HEADER |
|---|---|---|---|
| 1 | min | 999 | <1000000 |
| 2 | 1,000 | 1,999 | <2000000 |
| 3 | 2,001 | 2,999 | <3000000 |
| 4 | 3,001 | max | ≥3000000 |

O K | CHANGE | CANCEL | GRAPH | 3D GRAPH

| ITEM NO. | INITIAL | FINAL | HEADER |
|---|---|---|---|
| 1 | min | 999 | <1000000 |
| 2 | 1,000 | 1,999 | <2000000 |
| 3 | 2,001 | 2,999 | <3000000 |
| 4 | 3,001 | max | ≥3000000 |

FIG. 218

SELECT POINT OF MANAGEMENT FOR ANOTHER GRAPH AXIS

| ITEM NO. | MANAGEMENT POINT | DICTIONARY |
|---|---|---|
| 1 | WHEN (TIME) | COMMON |
| 2 | WHO (PERSON, ORGANIZATION, ENTERPRISE) | COMMON |
| 3 | WHERE (PLACE) | COMMON |

CANCEL

| ITEM NO. | MANAGEMENT POINT | DICTIONARY |
|---|---|---|
| 1 | WHEN (TIME) | COMMON |
| 2 | WHO (PERSON, ORGANIZATION, ENTERPRISE) | COMMON |
| 3 | WHERE (PLACE) | COMMON |

CANCEL

SELECT SEGMENTING DEFINITION FOR ANOTHER GRAPH AXIS

| ITEM NO. | SEGMENT DEFINITION |
|---|---|
| 1 | EACH CUSTOMER |
| 2 | EACH VENDER |
| 3 | EACH DEALER |

O K    CANCEL

CONFIRM DEFINITION AND SELECT CONFIRMATION BUTTON

SEGMENT NAME: EACH VOLUME OF TR

| ITEM NO. | INITIAL | FINAL | HE/ |
|---|---|---|---|
| 1 | min | 999 | <10 |
| 2 | 1,000 | 1,999 | <20 |
| 3 | 2,001 | 2,999 | <30 |
| 4 | 3,001 | max | ≥30 |

SELECT GRAPH TO BE REGISTERED IN DICTIONARY

| ITEM NO. | GRAPH NAME | CLASS |
|---|---|---|
| 1 | EACH VOLUME OF TRANSACTIONS | SINGLE AXIS |
| 2 | EACH VOLUME OF TRANSACTIONS OF VENDER | TWO AXES |

[CONFIRM] [CANCEL]

[O K] [CHANGE] [CANCEL] [GRAPH] [3D GRAPH]

FIG. 222

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS |
|---|---|---|---|
| EACH CUSTOMER | 1 | 2 | 0 |
| EACH VENDER | 2 | 2 | 0 |
| EACH DEALER | 3 | 3 | 1 |
| EACH VOLUME OF TRANSACTIONS | 4 | 2 | 1 |

SEGMENT SPECIFICATION RECORDING AREA

| KEY ITEM NAME | TYPE | NO. | 1ST SEGMENT | | | 2ND SEGMENT | | | |
|---|---|---|---|---|---|---|---|---|---|
| cssh5 | 2 | 4 | min | 999 | < 1000000 | min | 1,999 | < 2000000 | ... |

MANAGEMENT POINT GRAPH DATA RECORDING AREA

| GRAPH ATTRIBUTE DATA | GRAPHIC DATA |
|---|---|

GRAPH ATTRIBUTE DATA

| TYPE | NAME OF MANAGEMENT POINT OF 2ND AXIS | CREATION DATE | UPDATE DATE OF ADAPTIVE DATA | ... |
|---|---|---|---|---|
| 1 | | 95. 06. 25 | 95. 05. 25 | ... |

FIG. 225

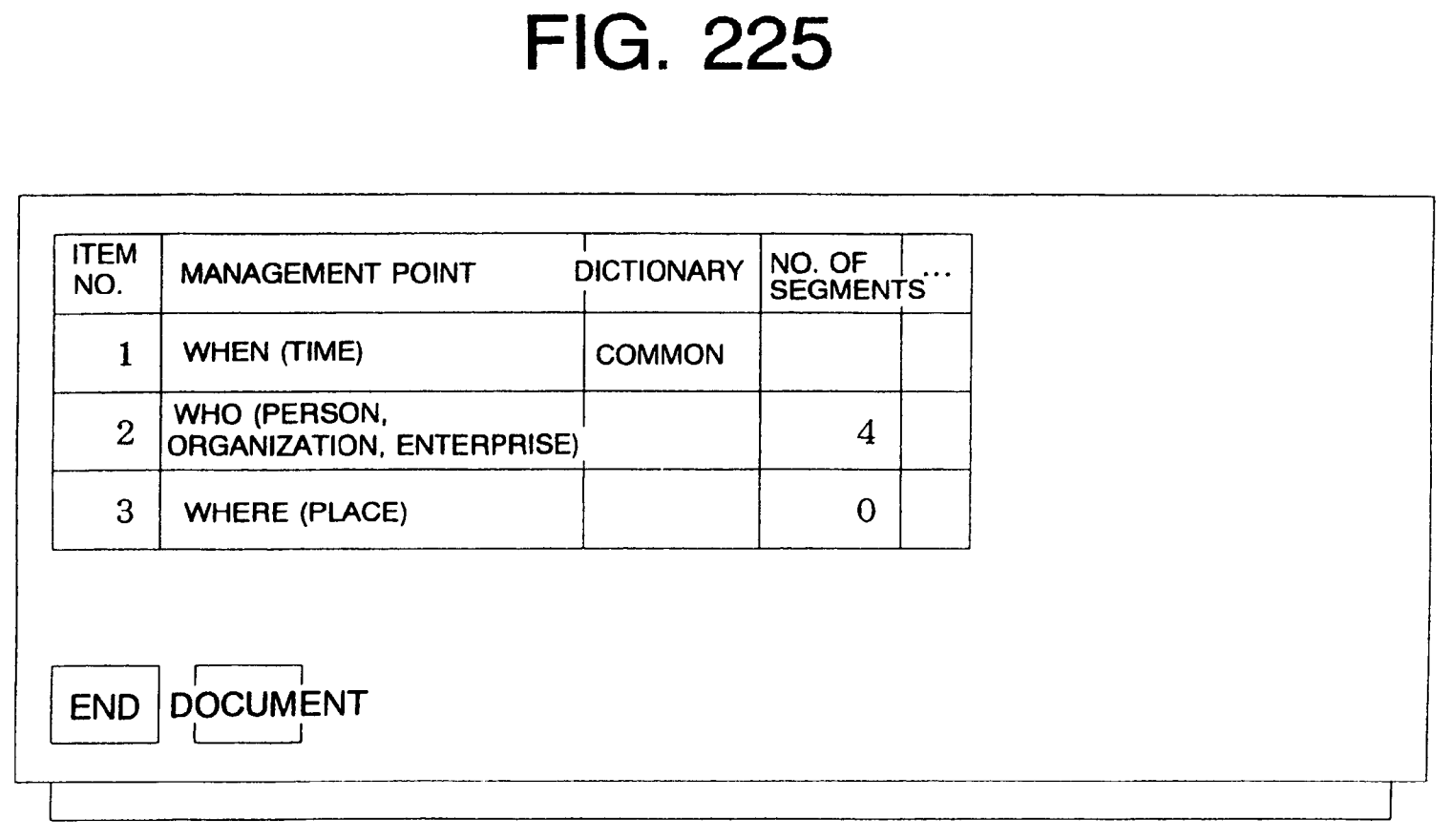

| ITEM NO. | MANAGEMENT POINT | DICTIONARY | NO. OF SEGMENTS | ... |
|---|---|---|---|---|
| 1 | WHEN (TIME) | COMMON | | |
| 2 | WHO (PERSON, ORGANIZATION, ENTERPRISE) | | 4 | |
| 3 | WHERE (PLACE) | | 0 | |

END DOCUMENT

FIG. 226

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | 0 | |

SEGMENT DATA RECORDING AREA

| NAME | DISPLAY ORDER | SEGMENT TYPE | NO. OF GRAPHS |
|---|---|---|---|
| EACH CUSTOMER | 1 | 2 | 0 |
| EACH VENDER | 2 | 2 | 0 |
| EACH DEALER | 3 | 3 | 1 |
| EACH VOLUME OF TRANSACTIONS | 4 | 2 | 1 |

SEGMENT SPECIFICATION RECORDING AREA

| KEY ITEM NAME | TYPE | NO. | 1ST SEGMENT | | | 2ND SEGMENT | | | |
|---|---|---|---|---|---|---|---|---|---|
| cssh5 | 2 | 4 | min | 999 | < 1000000 | min | 1,999 | 2 < 2000000 | ... |

MANAGEMENT POINT GRAPH DATA RECORDING AREA

| GRAPH ATTRIBUTE DATA | GRAPHIC DATA |
|---|---|

FIG. 227

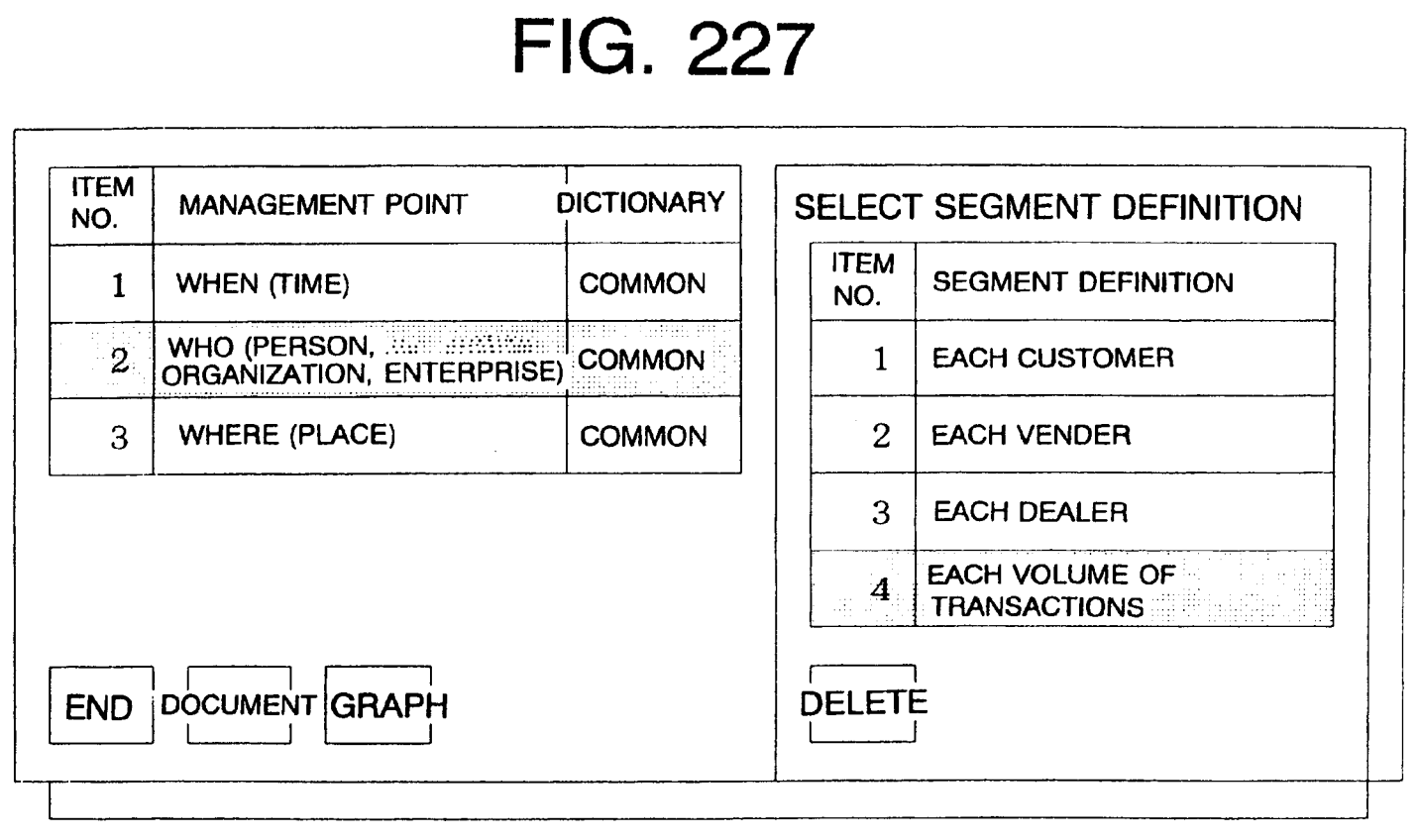

| ITEM NO. | MANAGEMENT POINT | DICTIONARY |
|---|---|---|
| 1 | WHEN (TIME) | COMMON |
| 2 | WHO (PERSON, ORGANIZATION, ENTERPRISE) | COMMON |
| 3 | WHERE (PLACE) | COMMON |

END DOCUMENT GRAPH

SELECT SEGMENT DEFINITION

| ITEM NO. | SEGMENT DEFINITION |
|---|---|
| 1 | EACH CUSTOMER |
| 2 | EACH VENDER |
| 3 | EACH DEALER |
| 4 | EACH VOLUME OF TRANSACTIONS |

DELETE

| ATTACH DATA ITEMS TO WORKSHEET | | | | | |
|---|---|---|---|---|---|
| | | | | DATA ITEM | ANNOTATION |
| | | | | ♡ WHEN<br>♡ WHO<br>◇ EACH CUSTOMER ◇<br>◇ EACH VENDER ◇<br>◇ EACH DEALER ♤<br>◇ EACH VOLUME OF TRANSACTIONS ♤<br>♡ WHERE<br>NO. OF SALES<br>VOLUME OF SALES<br>: | TIME<br>PERSONS, ORGANIZATION, ENTERPRISE<br>PLACE |

O K | CANCEL | END

FIG. 233

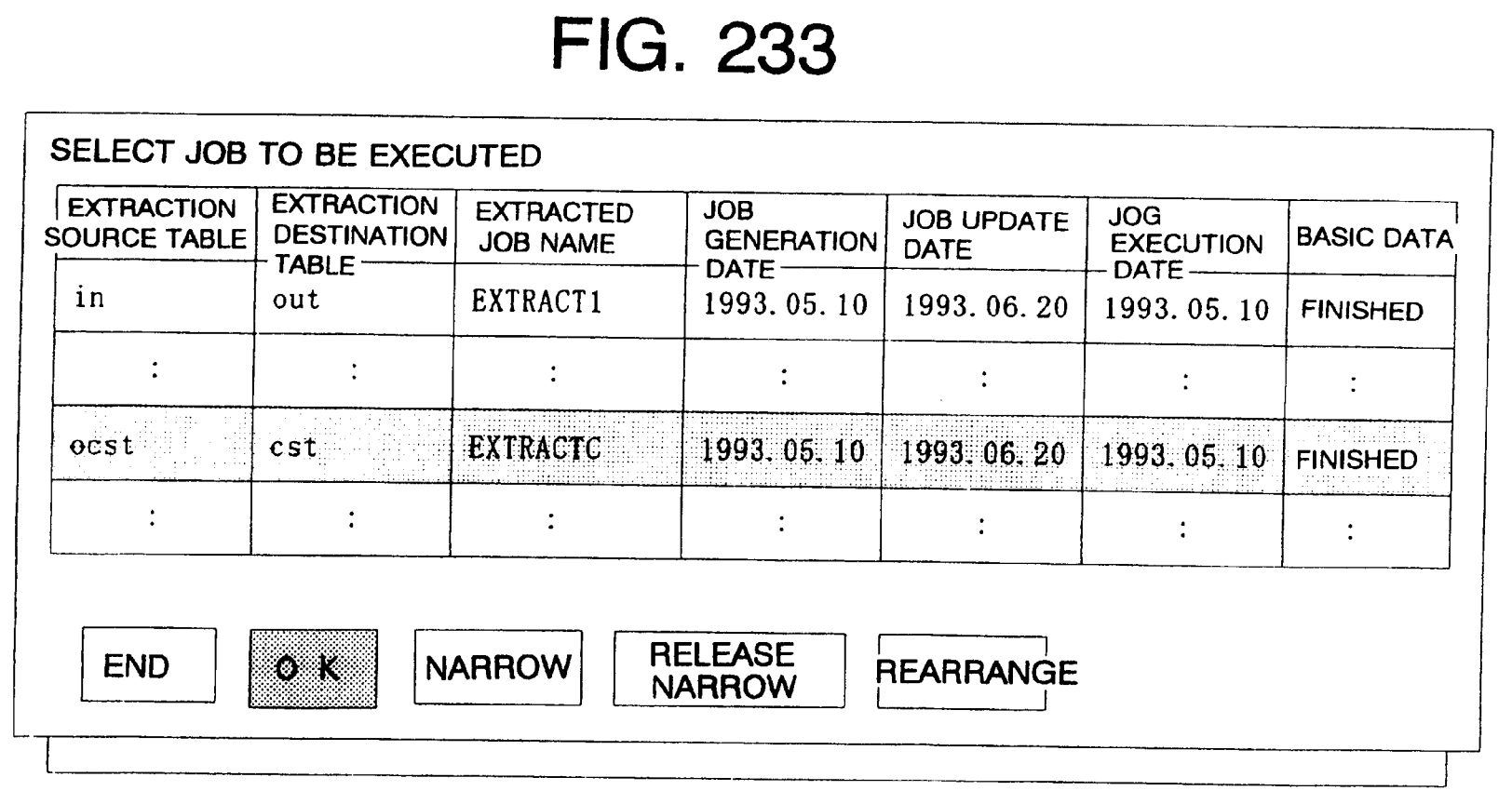

SELECT JOB TO BE EXECUTED

| EXTRACTION SOURCE TABLE | EXTRACTION DESTINATION TABLE | EXTRACTED JOB NAME | JOB GENERATION DATE | JOB UPDATE DATE | JOG EXECUTION DATE | BASIC DATA |
|---|---|---|---|---|---|---|
| in | out | EXTRACT1 | 1993. 05. 10 | 1993. 06. 20 | 1993. 05. 10 | FINISHED |
| : | : | : | : | : | : | : |
| ocst | cst | EXTRACTC | 1993. 05. 10 | 1993. 06. 20 | 1993. 05. 10 | FINISHED |
| : | : | : | : | : | : | : |

END | OK | NARROW | RELEASE NARROW | REARRANGE

| EXTRACTION SOURCE TABLE | EXTRACTION DESTINATION TABLE | EXTRACTED JOB NAME | JOB GENERATION DATE | JOB UPDATE DATE | JOG EXECUTION DATE | BASIC DATA |
|---|---|---|---|---|---|---|
| in | ou | | | 20 | 1993.05.10 | FINISHED |
| : | : | | | | : | : |
| ocst | cs | | | 20 | 1993.08.22 | FINISHED |
| : | : | | | | : | : |

[WARNING]

MANAGEMENT POINT IS DEFINED IN REPLACED TABLE. MATCHING CAN BE CONFIRMED IF MISMATCH MAY OCCUR.

■ CONFIRM ☐ NOT CONFIRM

| END | OK | NARROW | RELEASE NARROW | REARRANGE |

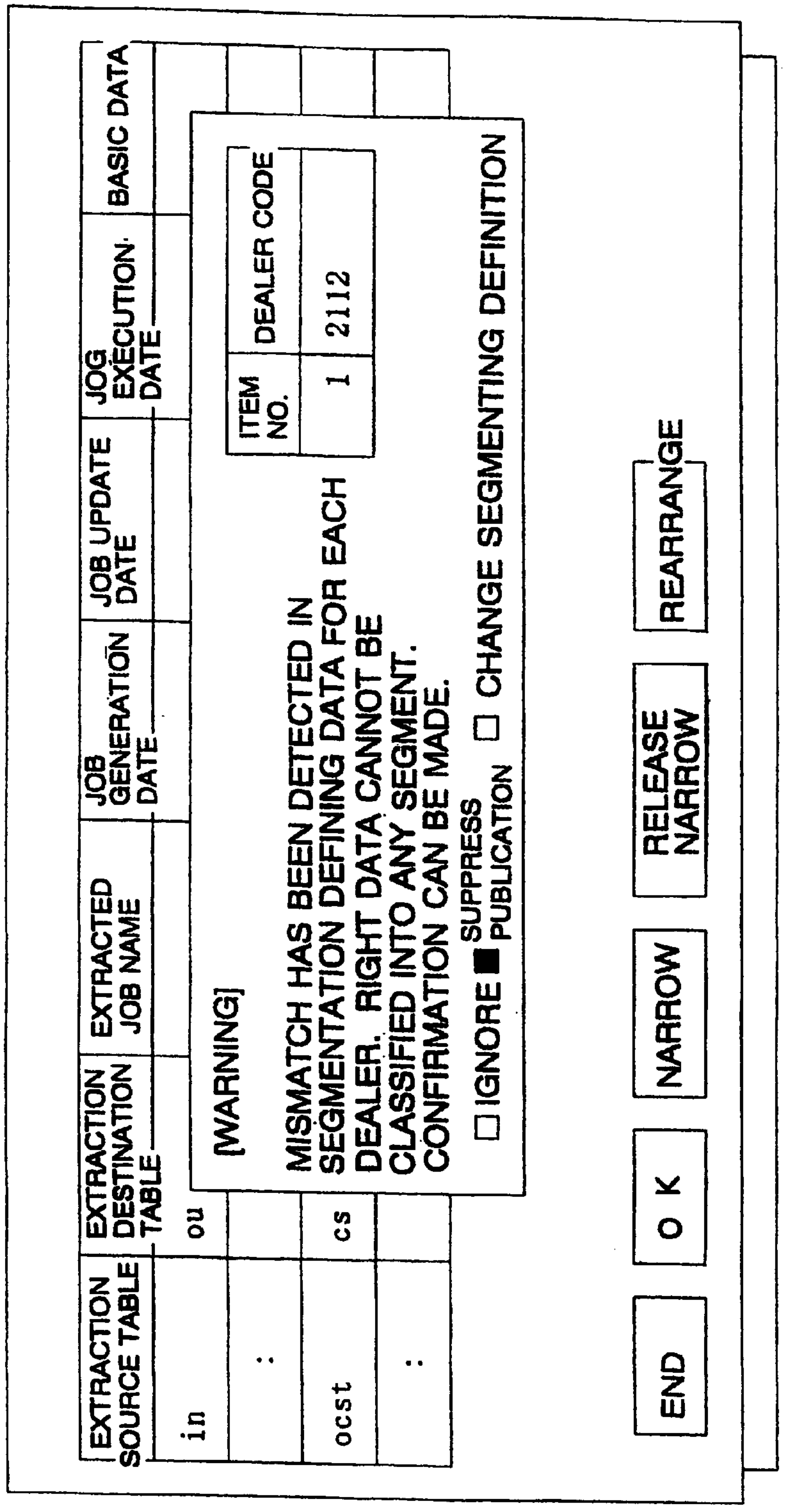

FIG. 235

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA |
|---|---|---|---|---|---|---|
| in | ou | | | | | |
| : | : | | | | | |
| ocst | cs | | | | | |
| : | : | | | | | |

[WARNING]

MISMATCH HAS BEEN DETECTED IN SEGMENTATION DEFINING DATA FOR EACH DEALER. RIGHT DATA CANNOT BE CLASSIFIED INTO ANY SEGMENT. CONFIRMATION CAN BE MADE.

☐ IGNORE ■ SUPPRESS PUBLICATION ☐ CHANGE SEGMENTING DEFINITION

| ITEM NO. | DEALER CODE |
|---|---|
| 1 | 2112 |

[END] [O K] [NARROW] [RELEASE NARROW] [REARRANGE]

FIG. 236

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS | PUBLIC SEGMENT | ... |
|---|---|---|---|---|---|
| EACH CUSTOMER | 1 | 2 | 0 | 0 | |
| EACH VENDER | 2 | 2 | 0 | 0 | |
| EACH DEALER | 3 | 3 | 1 | 1 | |
| EACH VOLUME OF TRANSACTIONS | 4 | 2 | 1 | 0 | |

SEGMENT SPECIFICATION RECORDING AREA

| KEY ITEM NAME | TYPE | NO. | 1ST SEGMENT | | | | 2ND SEGMENT | | | | |
|---|---|---|---|---|---|---|---|---|---|---|---|
| cssh5 | 3 | 5 | 2 | 1111 | 1112 | ○○DEALER | 1 | 2111 | □□DEALER | | ... |

MANAGEMENT POINT GRAPH DATA RECORDING AREA

| GRAPH ATTRIBUTE DATA | GRAPHIC DATA |
|---|---|

FOR CHANGE, SELECT CHANGE BUTTON

SEGMENT NAME: EACH DEALER

| ITEM NO. | 1ST | 2ND | HEADER |
|---|---|---|---|
| 1 | 1111 | 1112 | ○○ DEALER |
| 2 | 2111 |  | □□ DEALER |
| 3 | 3111 | 3113 | △△ DEALER |
| 4 | 4111 |  | ×× DEALER |
| 5 | 5111 | 5114 | ◇◇ DEALER |

| ITEM NO. | DEALER CODE |
|---|---|
| 1 | 2112 |

[END] [O K] [GRAPH] [CHANGE] [DEFINE ADDITIONAL DATA] [3D GRAPH]

SELECT DECIDE BUTTON IF CHANGED

SEGMENT NAME: EACH DEALER

| ITEM NO. | 1ST | 2ND | HEADER |
|---|---|---|---|
| 1 | 1111 | 1112 | ○○ DEALER |
| 2 | 2111 | 2112 | □□ DEALER |
| 3 | 3111 | 3113 | △△ DEALER |
| 4 | 4111 |  | ×× DEALER |
| 5 | 5111 | 5114 | ◇◇ DEALER |

| ITEM NO. | DEALER CODE |
|---|---|
| 1 | 2112 |

[END] [OK] [GRAPH] [CHANGE] [DEFINE ADDITIONAL DATA] [3D GRAPH]

FIG. 239

MANAGEMENT POINT RECORDING AREA

| NAME | DISPLAY ORDER | NO. OF SEGMENTS | ... |
|---|---|---|---|
| WHEN (TIME) | 1 | | |
| WHO (PERSON, ORGANIZATION, ENTERPRISE) | 2 | 4 | |
| WHERE (PLACE) | 3 | | |

SEGMENT DATA RECORDING AREA

| NAME | DISPLAY ORDER | SEGMENT TYPE | NO. OF GRAPHS | PUBLIC SEGMENT | ... |
|---|---|---|---|---|---|
| EACH CUSTOMER | 1 | 2 | 0 | 0 | |
| EACH VENDER | 2 | 2 | 0 | 0 | |
| EACH DEALER | 3 | 3 | 1 | 0 | |
| EACH VOLUME OF TRANSACTIONS | 4 | 2 | 1 | 0 | |

SEGMENT SPECIFICATION RECORDING AREA

| KEY ITEM NAME | TYPE | NO. | 1ST SEGMENT | | | | 2ND SEGMENT | | | | | |
|---|---|---|---|---|---|---|---|---|---|---|---|---|
| cssh5 | 3 | 5 | 2 | 1111 | 1112 | ○○DEALER | 2 | 2111 | 2112 | □□DEALER | | ... |

MANAGEMENT POINT GRAPH DATA RECORDING AREA

| GRAPH ATTRIBUTE DATA | GRAPHIC DATA |
|---|---|

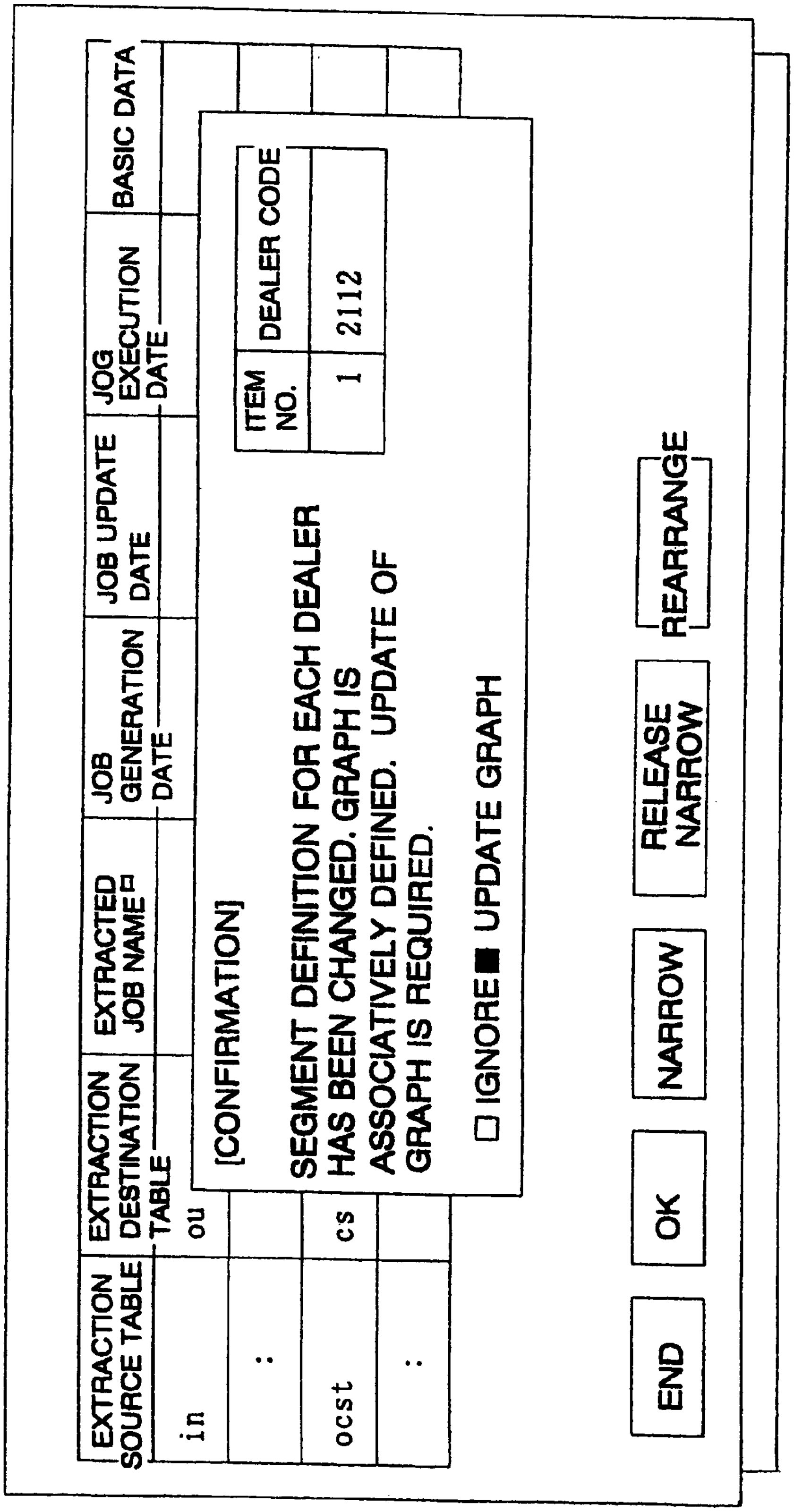

FIG. 240

| EXTRACTION SOURCE TABLE | EXTRACTION DESTINATION TABLE | EXTRACTED JOB NAME | JOB GENERATION DATE | JOB UPDATE DATE | JOB EXECUTION DATE | BASIC DATA |
|---|---|---|---|---|---|---|
| in | ou | | | | | |
| : | : | | | | | |
| ocst | cs | | | | | |

[CONFIRMATION]

SEGMENT DEFINITION FOR EACH DEALER HAS BEEN CHANGED. GRAPH IS ASSOCIATIVELY DEFINED. UPDATE OF GRAPH IS REQUIRED.

☐ IGNORE ■ UPDATE GRAPH

| ITEM NO. | DEALER CODE |
|---|---|
| 1 | 2112 |

| END | OK | NARROW | RELEASE NARROW | REARRANGE |

FIG. 242

| CLAIM RECORDING AREA | | | | | | | |
|---|---|---|---|---|---|---|---|
| CLAIM CLASS | CLAIM TRANSMISSION TIME | CLAIM TRANSMITTER | CLAIM CHANCE | ITEM CLASS | DEMANDED TRANSMISSION TIME | RESULTANT RECEPTION TIME | POINTER TO ATTACHED DATA |
| | | | | | | | |

FIG. 243

ATTACHED MATERIAL RECORDING AREA

| SIZE 1 | NO. OF ATTACHED DATA | CLASS 1 OF ATTACHED MATERIAL | SIZE 1 OF ATTACHED MATERIAL | ATTACHED DATA 1 | CLASS 2 OF ATTACHED MATERIAL | ... |
|---|---|---|---|---|---|---|
| SIZE 2 | ... | | | | | |
| ... | | | | | ... | |

| CLAIM CLASS | NO. OF CLAIMS UNSETTLED | NO. OF CLAIMS SETTLED |
|---|---|---|
| TABLE OF CLAIM STATUS | | |
| UNDEFINED MANAGEMENT POINTS | 10 | 5 |
| UNDEFINED ITEMS | 0 | 0 |
| UNDEFINED LINKS | 1 | 0 |
| ERROR IN SORTING LEVEL | 0 | 0 |
| ERROR IN SUMMING METHOD | 0 | 0 |
| ERROR IN LINKING METHOD AND DEFECTIVE MASTER | 0 | 0 |
| ERROR IN DATA VALUES | 0 | 0 |
| ... | ... | ... |

END | SETTLE CLAIM | NOTIFY FINISH | NOTIFY UNFINISH

| NAME | NO. OF EMPLOYEES | NO. OF SEGMENTS | SORTING TYPE | PROCESS |
|---|---|---|---|---|
| SCALE OF SALES | 5 | 1 | CATEGORY | NOT YET |
| SCALE OF TRANSACTIONS | 2 | 1 | CATEGORY | NOT YET |

TABLE OF UNDEFINED MANAGEMENT POINTS

END  REGISTER  CLAIM DATA  HISTOGRAM

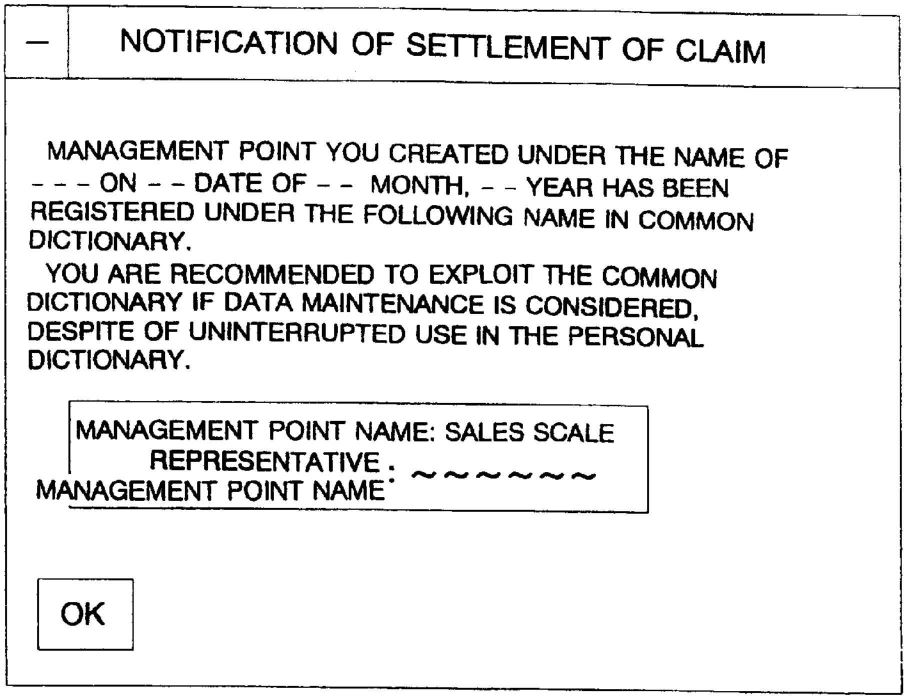

FIG. 249

```
┌─┬──────────────────────────────────────────────┐
│ − │   NOTIFICATION OF SETTLEMENT OF CLAIM      │
├───┴──────────────────────────────────────────────┤
│                                                  │
│   MANAGEMENT POINT YOU CREATED UNDER THE NAME OF │
│  - - - ON - - DATE OF - - MONTH, - - YEAR HAS BEEN│
│   REGISTERED UNDER THE FOLLOWING NAME IN COMMON  │
│   DICTIONARY.                                    │
│     YOU ARE RECOMMENDED TO EXPLOIT THE COMMON    │
│   DICTIONARY IF DATA MAINTENANCE IS CONSIDERED,  │
│   DESPITE OF UNINTERRUPTED USE IN THE PERSONAL   │
│   DICTIONARY.                                    │
│                                                  │
│   ┌────────────────────────────────────────┐     │
│   │MANAGEMENT POINT NAME: SALES SCALE      │     │
│   │       REPRESENTATIVE : ~~~~~~          │     │
│   │MANAGEMENT POINT NAME: ~~~~~~           │     │
│   └────────────────────────────────────────┘     │
│                                                  │
│   ┌─────┐                                        │
│   │ OK  │                                        │
│   └─────┘                                        │
└──────────────────────────────────────────────────┘
```

DATABASE SYSTEM WITH ORIGINAL AND PUBLIC DATABASES AND DATA EXPLOITATION SUPPORT APPARATUS FOR DISPLAYING RESPONSE TO INQUIRY OF DATABASE SYSTEM

This application is a divisional of application Ser. No. 08/576,933, filed Dec. 22, 1995, now U.S. Pat. No. 6,065,014.

BACKGROUND OF THE INVENTION

1. Field of the Invention

The present invention relates to a database system and, more particularly, to a database system for effectively performing the setup, exploitation and operations management of database data, and to a database data exploitation support apparatus for effecting the setup, exploitation and operations management of the database data by supporting the exploitations of the database data.

2. Description of the Related Art

In the database system, the data to be utilized for exploiting the data in the various branches of business can be coarsely divided into the data to be managed and stored in a trunk business system for production and sales managements, the data intrinsic to branches, as occur in the individual branches, and the data such as the market data, as occur at the outside.

The data to be managed/stored in the trunk business system are exemplified by the master data such as the product master or the customer master, and the transaction data for recording the daily transactions and these data are exploited by their combinations while assuring their time consistency.

At the data exploiting time, the types of data to be finally fetched are frequently used by accumulating the values of the data items of the master data of commodities, customers and shops. In this case, the objects to be accumulated such as the data items or the sorting references have to be specifically instructed in addition to the arrangement of the data items from a terminal screen. Therefore, the data exploiter is required to understand the functions and operating methods of the software for supporting the data exploitations and to be conscious of the correspondence between the values of the data items opened in the database and the sorting method intended by the data exploiter. Moreover, the sales of new commodities and the stop of commodity sales may change the references for regulating the sorting method. Therefore, the system for recording/managing the sorting references independently of the master data finds it difficult to follow the change in the master data and is liable to have an inconsistency or mismatch of the data so that it cannot avoid a danger of fetching the erroneous data.

In the prior art, there has been realized a technique for managing the data items of the database by making a dictionary corresponding to the database. However, the dictionary is provided for the individual objects in the forms such as a data storing medium for managing the names and types of data items for establishing the productivity of a program for the database in a manner to correspond to the program, a medium for storing the data of the meaning and use of the data items for the data exploiter, or a medium for storing the definition data for fetching the multidimensional database data while aiming at facilitating the data exploitations.

The dictionary of the prior art does not perform the data managements of the entire system, as centered by the data setup, the data exploitation and the data operations managements, so that it cannot drastically solve the operability and reliability of the data exploiter.

SUMMARY OF THE INVENTION

An object of the present invention is to provide a database system and a database data exploitation support apparatus, which are enabled to drastically improve the reliability of database data and the productivity of data exploitations by managing in a corresponding manner the stored data of a public database made of the data extracted and processed from original data and their attribute data thereby to realize the data management and exploitation system based upon the attribute data.

In the database system according to the present invention: the data read out from an original database and the data processed from the read-out data are stored in a public database; the stored data of the public database and their attribute data are managed in a corresponding manner by a data management unit; and data are processed/displayed by an inquiry unit in accordance with a demand of a user and on the basis of the data stored in the public database and the attribute data.

Specifically, according to a first aspect of the present invention, there is provided a first database system comprising:

an original database;

a public database for storing the data read out from said original database and the data processed from the read-out data;

a data management unit for managing the data stored in said public database and the attribute data of the stored data in a corresponding manner; and an inquiry unit for processing and displaying data on the basis of the data stored in said public database and said attribute data in accordance with a demand of a user.

According to a second aspect of the present invention, there is provided a second database system comprising:

a database for storing data containing master data and transaction data;

a dictionary for storing the management point data corresponding to the data items of at least one of the master data of the transaction data of said database, and the data containing definition data for the references of managements and evaluations;

a setup unit for recording/managing the management points corresponding to the references of managements and evaluations for data exploitations in connection with said data items by said dictionary;

an operations support unit for monitoring the statuses of the master data and the transaction data of said database and for changing the data environments; and an inquiry unit for processing/outputting the data of said database, which have been processed by said setup unit and said operations support unit, on the basis of said management points in accordance with a demand of a user.

According to a third aspect of the present invention, there is provided a first database data exploitation support apparatus comprising:

a setup unit for storing the management points corresponding to references of managements and evaluations for data exploitations, as the data containing management point data and definition data for the references of the managements and evaluations, in a dictionary in a manner to correspond to the data items stored in a database containing master data and transaction data, to record/manage said management points;

an operations support unit for monitoring the statuses of the master data and the transaction data of said database and for changing the data environments; and an inquiry unit for processing/outputting the data of said database, which have been processed by said setup unit and said operations support unit, on the basis of said management points in accordance with a demand of a user.

According to a fourth aspect of the present invention, there is provided a third database system comprising:

a trunk database for storing the master data and the transaction data of a trunk system;

a public database extracted from said trunk database and subjected to a predetermined processing for an information system;

a dictionary for storing the data containing time series definition data to regulating a grouping type for making time series data from the data which are sent out from said trunk database to said public database;

a setup unit for recording/managing the time series definition data for making the time series data from the data of said transaction data, which are extracted from said trunk database, in connection with data items by said dictionary;

an operations support unit for extracting said master data and said transaction data from said trunk database on the basis of the setting of said setup unit to generate a public database, and for making time series data from the data which are extracted from said trunk database, by monitoring the statuses of said public database and changing the data environments and by referring to said time series definition data; and an inquiry unit for processing said time series data with reference to said time series definition data and for processing/outputting the data of said public database, which have been processed by said setup unit and said operations support unit, in accordance with a demand of a user.

According to a fifth aspect of the present invention, there is provided a second database data exploitation support apparatus comprising:

a setup unit for storing the time series definition data for regulating the grouping type to make times series data from the transaction data to be stored in the trunk database of a trunk system, in a dictionary in a manner to correspond to the data items of said transaction data and the master data to be stored in the trunk database of said trunk system, to record/manage said time series definition data;

an operations support unit for extracting said master data and said transaction data from said trunk database on the basis of the setting of said setup unit to generate public database, and for making time series data from the data which are extracted from said trunk database, by monitoring the status of said public database and changing the data environments and by referring to said time series definition data; and an inquiry unit for processing said time series data with reference to said time series definition data and for processing/outputting the data of said public database, which have been processed by said setup unit and said operations support unit, in accordance with a demand of a user.

According to a sixth aspect of the present invention, there is provided a fourth database system comprising:

a trunk database for storing the master data and the transaction data of a trunk system;

a public database extracted from said trunk database and subjected to a predetermined processing for an information system;

a dictionary for storing the data containing consistency definition data for defining data setup jobs for assuring the consistency of the database data of at least one of said trunk database and said public database and the restricting conditions for executing said data setup jobs;

a setup unit for recording/managing the consistency definition data for defining the data setup job for assuring the consistency of the database data of at least one of the master data and the transaction data, which are extracted from said trunk database, and the restricting conditions for executing said data setup jobs, by said dictionary;

an operations support unit for extracting said master data and said transaction data from said trunk database to generate a public database, and for executing the data setup jobs for assuring the consistency of said database data by monitoring the statuses of said public database and changing the data environments and by referring to said consistency definition data of said dictionary; and an inquiry unit for processing/outputting the data of said public database, which have been processed by said setup unit and said operations support unit, in accordance with a demand of a user.

According a seventh aspect of the present invention, there is provided a third database data exploitation support apparatus comprising:

a setup unit for recording/managing the consistency definition data for defining the data setup jobs for assuring the consistency of the database data of at least the master data and the transaction data, which are extracted from a trunk database of a trunk system, and the restricting conditions for executing said data setup jobs, by a dictionary for storing the data containing said consistency definition data;

an operations support unit for extracting said master data and said transaction data from said trunk database to generate public database, and for executing the data setup jobs for assuring the assurance of said database data, by monitoring the status of said public database and changing the data environments and by referring to said consistency definition data of said dictionary; and an inquiry unit for processing/outputting the data of said public database, which have been processed by said setup unit and said operations support unit, in accordance with a demand of a user.

According to an eighth aspect of the present invention, there is provided a fifth database system comprising:

a trunk database for storing the master data and the transaction data of a trunk system;

a public database extracted from said trunk database and subjected to a predetermined processing for an information system;

a dictionary for storing the data containing the management point data corresponding to the database data of said public database, the definition data for references of managements and evaluations, and the statistic data of the corresponding data items;

a setup unit for recording/managing the management points corresponding to the references of the managements and the evaluations for data exploitations, together with said definition data and said statistic data by said dictionary in a manner to correspond to the data items of the database data of said public database;

an operations support unit for extracting said master data and said transaction data from said trunk database to generate a public database, and for monitoring the status of said public database and changing the data environments; and an inquiry unit for graphing the data of said public database, which have been processed by said setup unit and said operations support unit, with reference to said management points by using said management points as at least one axis, to present the graph to a user and for processing/outputting said data in accordance with the inquiry condition which has been determined by the user on the basis of the graphed data.

According to a ninth aspect of the present invention, there is provided a fourth database data exploitation support apparatus comprising:

a setup unit for storing the management points corresponding to the references of managements and evaluations for data exploitations, as the data containing said management point data, the definition data for the reference of the managements and evaluations, and the statistic data of the corresponding data items, in a dictionary in a manner to correspond to the data items of the database data of a public database, to record/manage said management points;

an operations support unit for extracting master data and transaction data from the trunk database of a trunk system to generate said public database on the basis of the setting of said setup unit, and for monitoring the status of said public database and changing the data environments; and an inquiry unit for graphing the data of said public database, which have been processed by said setup unit and said operations support unit, with reference to said management points by using said management points as at least one axis, to present the graph to a user and for processing/outputting said data in accordance with the inquiry condition which has been determined by the user on the basis of the graphed data.

According to a tenth aspect of the present invention, there is provided a sixth database system comprising:

a trunk database for storing the master data and the transaction data of a trunk system;

a public database extracted from said trunk database and subjected to a predetermined processing for an information system;

a dictionary for storing the data containing the management point data corresponding to the database data of said public database and the definition data for references of managements and evaluations;

a setup unit for recording/managing the management points corresponding to the references of the managements and the evaluations for data exploitations by said dictionary in a manner to correspond to the data items of the database data of said public database;

an inquiry unit for subjecting the data of said public database to a predetermined processing in accordance with a demand of a user and with reference to said management points to process/output the same and for collecting claim data indicating a claim to a disadvantage from the user; and an operations support unit for extracting said master data and said transaction data from said trunk database to generate a public database, and for monitoring the status of said public database and changing the data environments and for preparing the database data based upon the notice of said claim to a manager and the operations of said manager on the basis of said collected claim data.

According to an eleventh aspect of the present invention, there is provided a fifth database data exploitation support apparatus comprising:

a setup unit for storing the management points corresponding to the references of managements and evaluations for data exploitations, as the data containing said management point data and the definition data for the reference of the managements and evaluations, in a dictionary in a manner to correspond to the data items of the database data of a public database, to record/manage said management points;

an inquiry unit for subjecting the data of said public database to a predetermined processing in accordance with a demand of a user and with reference to said management points to process/output the same and for collecting claim data indicating a claim to a disadvantage from the user; and an operations support unit for extracting said master data and said transaction data from a trunk database to generate said public database, and for monitoring the status of said public database and changing the data environments and for preparing the database data based upon the notice of said claim to a manager and the operations of said manager on the basis of said collected claim data.

According to a twelfth embodiment of the present invention, there is provided a seventh database system comprising:

a trunk database for storing the master data and the transaction data of a trunk system;

a public database extracted from said trunk database and subjected to a predetermined processing for an information system;

a dictionary for storing the data containing secondary table definition data for defining a job for generating a processed secondary table, in said public database in a manner to correspond to database data;

a setup unit for recording/managing the data items of the database data of said public database and the management points corresponding to references of managements and evaluations for data exploitations, by said dictionary in a corresponding manner and for re cording/managing said secondary table definition data by said dictionary;

an inquiry unit for fetching the data of the final type, which have been subjected to a predetermined processing, in accordance with a demand of a user and for acquiring an operation log indicating the operation history of the user; and an operations support unit for extracting said master data and said transaction data from said trunk database to generate a public database, for monitoring the status of said public database and changing the data environments, and for making/arranging the processed secondary table on said public database on the basis of said operation log and with reference to the secondary table definition data of said dictionary.

According to a thirteenth embodiment of the present invention, there is provided a sixth database data exploitation support apparatus comprising:

a setup unit for storing and recording/managing the secondary table data definition data for defining the management points corresponding references of managements and evaluations for data exploitations and the jobs for generating a secondary table processed in a public database, as the data containing said management point data, the definition data for the references of the managements and evaluations, and said secondary table definition data, by a dictionary in a manner to correspond to the data items of the database data stored in said public database;

an inquiry unit for fetching the data of the final type, which have been subjected to a predetermined processing, in accordance with a demand of a user and with reference to said dictionary and for acquiring an operation log indicating the operation history of the user; and an operations support unit for extracting said master data and said transaction data from the trunk database of a trunk system to generate said public database, for monitoring the status of said public database and changing the data environments, and for making/arranging the processed secondary table on said public database on the basis of said operation log and with reference to the secondary table definition data of said dictionary.

According to a fourteenth embodiment of the present invention, there is provided a database system comprising:

a trunk database for storing the master data and the transaction data of a trunk system;

a public database extracted from said trunk data base and having been subjected to a predetermined processing for a data system;

a dictionary for storing the data containing at least any of calendar data intrinsic to a branch and a business and common to the entirety, as corresponds to the database data of at least one of said trunk database and said public database;

a setup unit for recording/managing said calendar data by said dictionary in a manner to correspond to said database data;

an inquiry unit for fetching the data of the final type, which have been subjected to a predetermined processing, in accordance with a demand of a user and on the basis of the calendar data stored in said dictionary; and an operations support unit for extracting said master data and said transaction data from said trunk database to generate said public database and for monitoring the status of said public database and changing the data environments.

According to a fifteenth embodiment of the present invention, there is provided a seventh database data exploitation support apparatus comprising:

a setup unit for recording/managing the data containing at least any of calendar data intrinsic to a branch and a business and common to the entirety, as corresponds to the database data of at least one of a trunk database and a public database, in a manner to correspond to said database data by a dictionary for storing the data containing said calendar data;

an inquiry unit for fetching the data of the final type, which have been subjected to a predetermined processing, in accordance with a demand of a user and on the basis of the calendar data stored in said dictionary; and an operations support unit for extracting said master data and said transaction data from said trunk database to generate said public database and for monitoring the status of said public database and changing the data environments.

According to a sixteenth embodiment of the present invention, there is provided a ninth database system comprising:

a trunk database for storing the master data and the transaction data of a trunk system;

a public database extracted from said trunk database and having been subjected to a predetermined processing for a data system;

a dictionary for storing the data containing the unit data as the attributes of the data items of the database data of the database data of at least one of said trunk database and said public database;

a setup unit for recording/managing said unit data by said dictionary in a manner to correspond to the data items of said database data;

an inquiry unit for fetching the data of the final type, which have been subjected to a predetermined processing, in accordance with a demand of a user and for generating the data of the final type of said data items by calculating the unit based upon said unit data, with reference to the unit data stored in said dictionary; and an operations support unit for extracting said master data and said transaction data from said trunk database to generate said public database and for monitoring the status of said public database and changing the data environments.

According to a seventeenth embodiment of the present invention, there is provided an eighth database data exploitation support apparatus comprising:

a setup unit for recording/managing the data containing the unit data as the attributes of the data items of at least one of the trunk database of a trunk system and the public database, which is extracted from said trunk database, by a dictionary in a manner to correspond to said data items;

an inquiry unit for fetching the data of the final type, which have been subjected to a predetermined processing, in accordance with a demand of a user and for generating the data of the final type of said data items by referring to the unit data stored in said dictionary and by calculating the unit based upon said unit data; and an operations support unit for extracting master data and transaction data from said trunk database to generate said public database and for monitoring the status of said public database and changing the data environments.

According to an eighteenth embodiment of the present invention, there is provided a tenth database system comprising:

a trunk database for storing the master data and the transaction data of a trunk system;

a public database extracted from said trunk database and having been subjected to a predetermined processing for a data system;

a dictionary for storing the data containing the management point data corresponding to at least one of said trunk database and said public database, and the definition data for references of managements and evaluations;

a setup unit for recording/managing the management point data corresponding to the references of the managements and the evaluations for data exploitations, by said dictionary in a manner to correspond to the data items of said database data;

an inquiry unit for fetching the data of the final type, which have been subjected to a predetermined processing, as a layout based upon said management points in accordance with a demand of a user; and an operations support unit for extracting said master data and said transaction data from said trunk database to generate said public database and for monitoring the status of said public database and changing the data environments.

According to a nineteenth embodiment of the present invention, there is provided a ninth database data exploitation support apparatus comprising:

a dictionary for storing the data containing the management point data corresponding to at least one of said trunk database and said public database, and the definition data for references of managements and evaluations;

a setup unit for recording/managing the management point data corresponding to the database data of at least one of a trunk database and a public database, and definition data for references of the managements and the evaluations, by a dictionary to be stored with said management points and said definition data, in a manner to correspond to the data items of said database data;

an inquiry unit for fetching the data of the final type, which have been subjected to a predetermined processing, as a layout based upon said management points in accordance with a demand of a user; and an operations support unit for extracting said master data and said transaction data from said trunk database to generate said public database and for monitoring the status of said public database and changing the data environments.

In the database system according to the present invention: the data read out from the original database and the data processed from the read-out data are stored in the public database; the stored data of the public database and their attribute data are managed in a corresponding manner by the data management unit; and data are processed/displayed by the inquiry unit in accordance with a demand of a user and on the basis of the data stored in the public database and the attribute data.

More specifically, the database system and its data exploitation support apparatus according to the present invention realizes the easy and highly reliable data exploitations by extracting the data items, to which the references for managements and evaluations common in the entire system or intrinsic to the business correspond, as the management point for the attribute data while noting the relations between the master data and the transaction data, and by adding the definition data for the references of the managements and the evaluations.

The data items common in the whole system are exemplified by the data items which are common in the whole company in the aspect of operations/managements such as the productions or sales, and the definition data for the references of the managements and the evaluations are exemplified by the definition data for regulating the bundle of commodities in terms of commodity codes or for regulating the evaluation references of customers in terms of the volume of transactions.

In the database system and its data exploitation support apparatus, moreover, it is processed around a dictionary while realizing the integration of data: to record/manage the management points arbitrarily in relation to the data items in connection with the extractions of the master data and the transaction data; to add new management points by processing the data items of the master data or adding the data; to fetch the data of the proper final type by interpreting the intention of the data exploiter while referring the management points; and to support the smooth operations and the reliability maintenance of the dictionary for recording/managing the data containing the management points associated with the database.

The management points are recorded/managed by the dictionary in relation to the data items composing the master data. For example, the data to be sent out from the trunk business system are separated into the master data and the transaction data. The management points are set while confirming the data items composing the master data in a terminal display. After the data items for setting the management points have been selected, the definitions for regulating the sorting system can be hierarchically in a signifying manner to the values of the data items.

For the data exploitations, on the basis of the minimum instruction of the user, the system can refer to the management points of the dictionary to deduce the accumulating/processing method of the data thereby to determine the final data fetching method. In this case, the minimum instruction of the user is effected by selecting/instructing the necessary item from the list of data items which are displayed in the screen of the terminal unit, for example. The definition data to be added to the management points are so devised that the system can automatically determine the accumulating/processing method or the data layout method. This determination is made depending upon whether or not the data item selected in the terminal screen is defined as the management point or which location the selected data item is allocated to the layout screen of the terminal screen.

According to the database system and its data exploitation support apparatus of the present invention, as described above: the data read out from the original database and the data processed from the read-out data are stored in the public database; the stored data of the public database and their attribute data are managed in a corresponding manner by the data management unit; and data are processed/displayed by the inquiry unit in accordance with a demand of a user and on the basis of the data stored in the public database and the attribute data. As a result, it is possible to drastically improve the reliability of the database data and the productivity of the database exploitations.

BRIEF DESCRIPTION OF THE DRAWINGS

Other objects and advantages of the invention will become apparent during the following discussion in conjunction with the accompanying drawings, in which:

FIG. 7 is a diagram showing the extracted job data recording area for explaining the database system of FIGS. 2 to 4;

FIG. 10 is a diagram showing a data item selecting screen for explaining the database system of FIGS. 2 to 4;

FIG. 11 is a schematic diagram for explaining an extracted job of the extracted job data recording area of the database system of FIGS. 2 to 4;

FIG. 15 is a schematic diagram for explaining an extracted job in the extracted job recording area of the database system of FIGS. 2 to 4;

FIG. 16 is a schematic diagram for explaining the extracted data recording area and the extracted job recording area of the database system of FIGS. 2 to 4;

FIG. 17 is a diagram showing an extracted job selecting screen for explaining the database system of FIGS. 2 to 4;

FIG. 18 is a diagram showing an extracted job selecting screen for explaining the database system of FIGS. 2 to 4;

FIG. 20 is a schematic diagram for explaining a datable management data recording area of the database system of FIGS. 2 to 4;

FIG. 22 is a diagram showing an extracted job selecting screen for explaining the database system of FIGS. 2 to 4;

FIG. 24 is a diagram showing a table segment selecting screen for explaining the database system of FIGS. 2 to 4;

FIG. 25 is a diagram showing a table selecting screen for explaining the database system of FIGS. 2 to 4;

FIG. 34 is a schematic diagram for explaining the table management data recording area of the database system of FIGS. 2 to 4;

FIG. 35 is a diagram showing a table segment selecting screen for explaining the database system of FIGS. 2 to 4;

FIG. 40 is a schematic diagram for explaining the table management data recording area of the database system of FIGS. 2 to 4;

FIG. 41 is a diagram showing a table selecting screen for explaining the database system of FIGS. 2 to 4;

FIG. 42 is a schematic diagram for explaining the table management data recording area of the database system of FIGS. 2 to 4;

FIG. 43 is a diagram showing a table segment selecting screen for explaining the database system of FIGS. 2 to 4;

FIG. 44 is a diagram showing a table selecting screen for explaining the database system of FIGS. 2 to 4;

FIG. 45 is a diagram showing a link key item selecting screen for explaining the database system of FIGS. 2 to 4;

FIG. 46 is a diagram showing a display screen of a table link defining worksheet for explaining the database system of FIGS. 2 to 4;

FIG. 47 is a diagram for explaining a linking method in a table link management data table of the database system of FIGS. 2 to 4;

FIG. 48 is a schematic diagram for explaining the table link management data recording area of the database system of FIGS. 2 to 4;

FIG. 49 is a schematic diagram for explaining the table management data recording area of the database system of FIGS. 2 to 4;

FIG. 52 is a diagram showing a table selecting screen for explaining the database system of FIGS. 2 to 4;

FIG. 59 is a schematic diagram for explaining a data item grouping definition data recording area of the database system of FIGS. 2 to 4;

FIG. 68 is a schematic diagram for explaining a data item grouping definition data recording area of the database system of FIGS. 2 to 4;

FIG. 71 is a schematic diagram for explaining a management point recording area of the database system of FIGS. 2 to 4;

FIG. 72 is a diagram showing the display screen of the table of management points for explaining the database system of FIGS. 2 to 4;

FIG. 74 is a schematic diagram for explaining the management point recording area of the database system of FIGS. 2 to 4;

FIG. 76 is a schematic diagram for explaining the management point recording area and the segment data recording area of the database system of FIGS. 2 to 4;

FIG. 78 is a diagram showing a table segment selecting screen for explaining the database system of FIGS. 2 to 4;

FIG. 83 is a diagram showing the display screen of a segment attribute defining worksheet for explaining the database system of FIGS. 2 to 4;

FIG. 85 is a schematic diagram for explaining the management point recording area, the segment data recording area and the segment specification recording area of the database system of FIGS. 2 to 4;

FIG. 87 is a diagram showing the display screen of the table of management points for explaining the database system of FIGS. 2 to 4;

FIG. 94 is a diagram showing the display screen of the table of extracted jobs for explaining the database system of FIGS. 2 to 4;

FIG. 97 is a schematic diagram for explaining the management point recording area, the segment data recording area and the segment specification recording area of the database system of FIGS. 2 to 4;

FIG. 100 is a schematic diagram for explaining the management point recording area, the segment data recording area and the segment specification recording area of the database system of FIGS. 2 to 4;

FIG. 105 is a diagram showing a table extraction selecting screen for explaining the database system of FIGS. 101 to 103;

FIG. 106 is a diagram showing a key item selecting screen for explaining the database system of FIGS. 101 to 103;

FIG. 111 is a schematic diagram for explaining the extracted job data recording area and the extracted job recording area of the database system of FIGS. 101 to 103;

FIG. 112 is a diagram showing the extracted job selecting screen for explaining the database system of FIGS. 101 to 103;

FIG. 113 is a schematic diagram for explaining the extracted job data recording area of the database system of FIGS. 101 to 103;

FIG. 115 is a schematic diagram for explaining the table management data recording area of the database system of FIGS. 101 to 103;

FIG. 119 is a schematic diagram for explaining the management point recording area and the segment data recording area of the database system of FIGS. 101 to 103;

FIG. 120 is a diagram showing a layout determining worksheet for explaining the database system of FIGS. 101 to 103;

FIG. 121 is a diagram showing the display screen of a layout determining worksheet for explaining the database system of FIGS. 101 to 103;

FIG. 122 is a diagram showing the display screen of a layout determining worksheet for explaining the database system of FIGS. 101 to 103;

FIG. 123 is a diagram showing the display screen of a layout determining worksheet for explaining the database system of FIGS. 101 to 103;

FIG. 124 is a diagram showing the display screen of a layout determining worksheet for explaining the database system of FIGS. 101 to 103;

FIG. 125 is a diagram showing the display screen of a layout determining worksheet for explaining the database system of FIGS. 101 to 103;

FIG. 126 is a schematic diagram for explaining the extracted job data recording area of the database system of FIGS. 101 to 103;

FIG. 127 is a schematic diagram for explaining the attribute data of the database system of FIGS. 101 to 103;

FIG. 128 is a schematic diagram for explaining quasi-date data of the database system of FIGS. 101 to 103;

FIG. 129 is a schematic diagram for explaining date data of the database system of FIGS. 101 to 103;

FIG. 130 is a schematic diagram for explaining a method for storing time series data of the database system of FIGS. 101 to 103;

Figure 101:
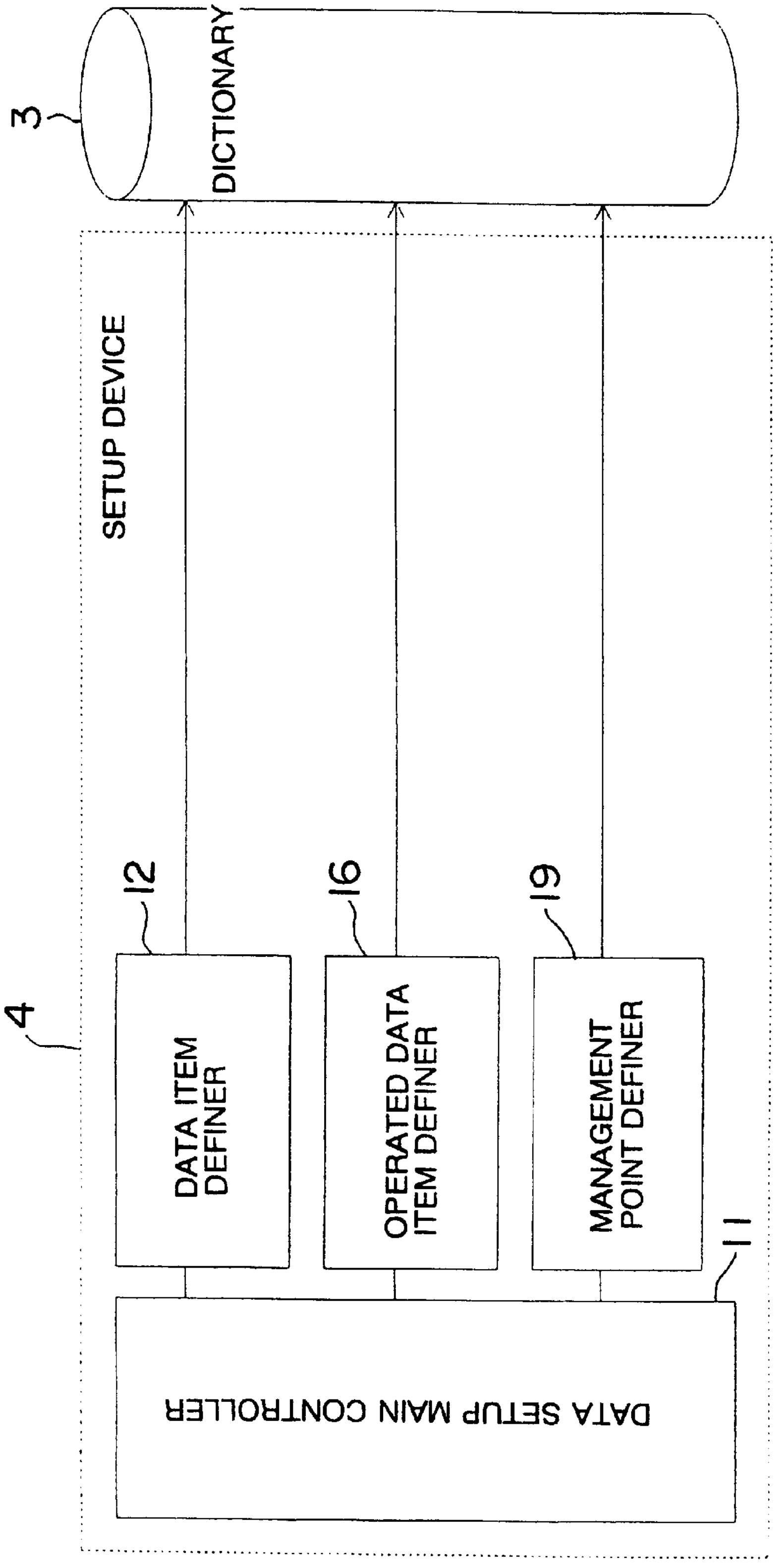
FIG. 101 is a block diagram showing the functional construction of a setup unit of a database system according to a second embodiment of the present invention.
Figure 102:
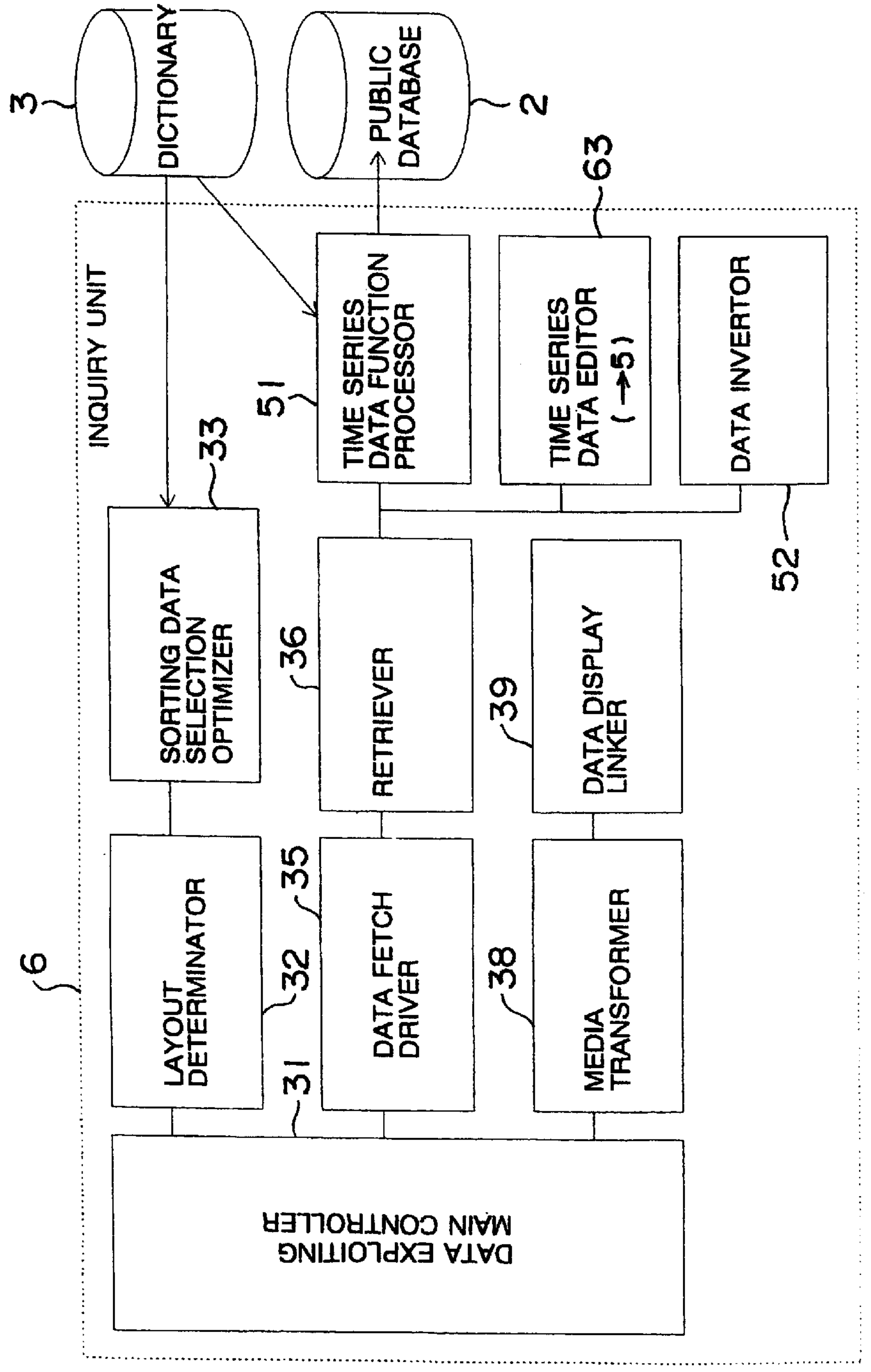
FIG. 102 is a block diagram showing the functional construction of an inquiry unit of the database system according to a second embodiment of the present invention.
Figure 103:
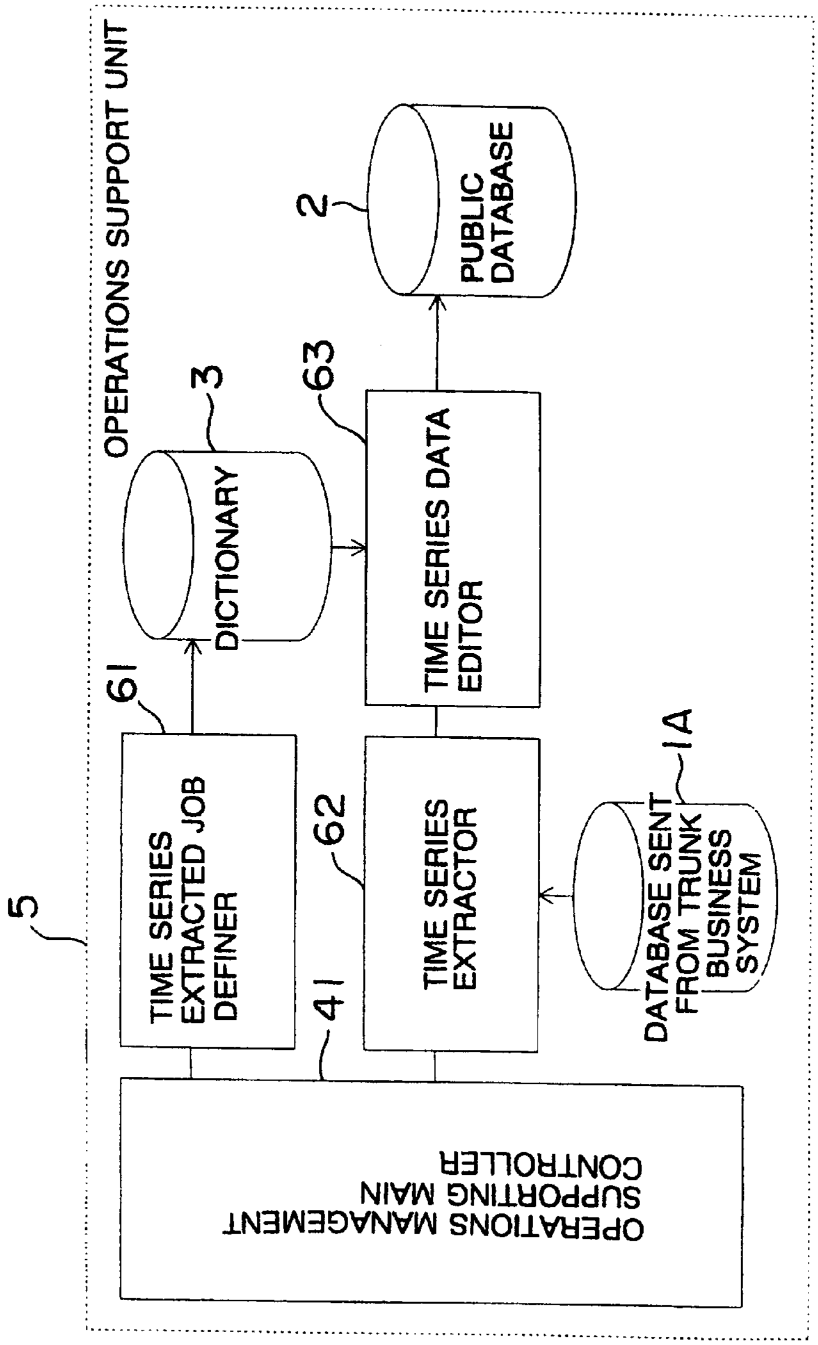
FIG. 103 is a block diagram showing the functional construction of an operations support unit according to the second embodiment of the present invention.
Figure 131:
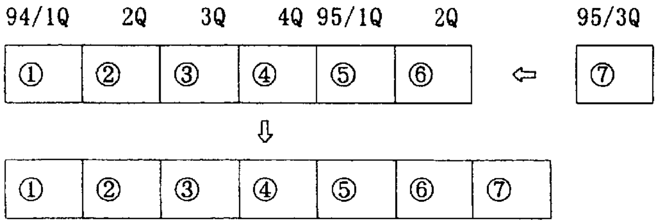
Figure 132:
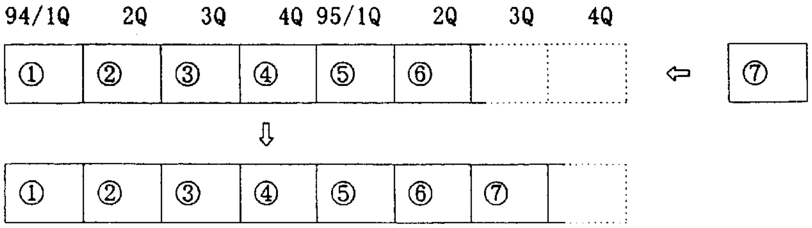
Figure 133:
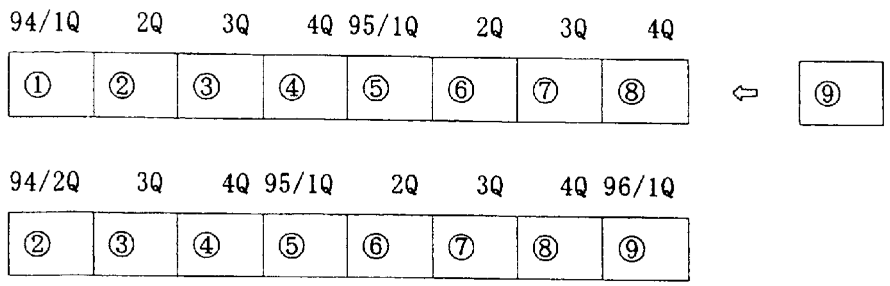
Figure 134:
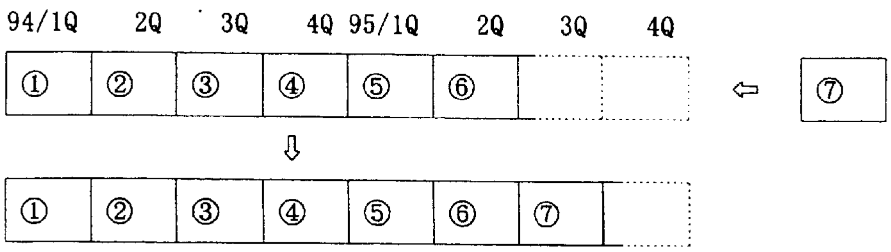
Figure 135:
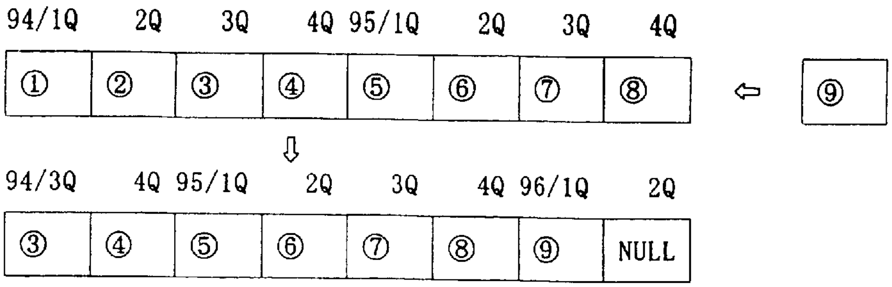
Figure 137:
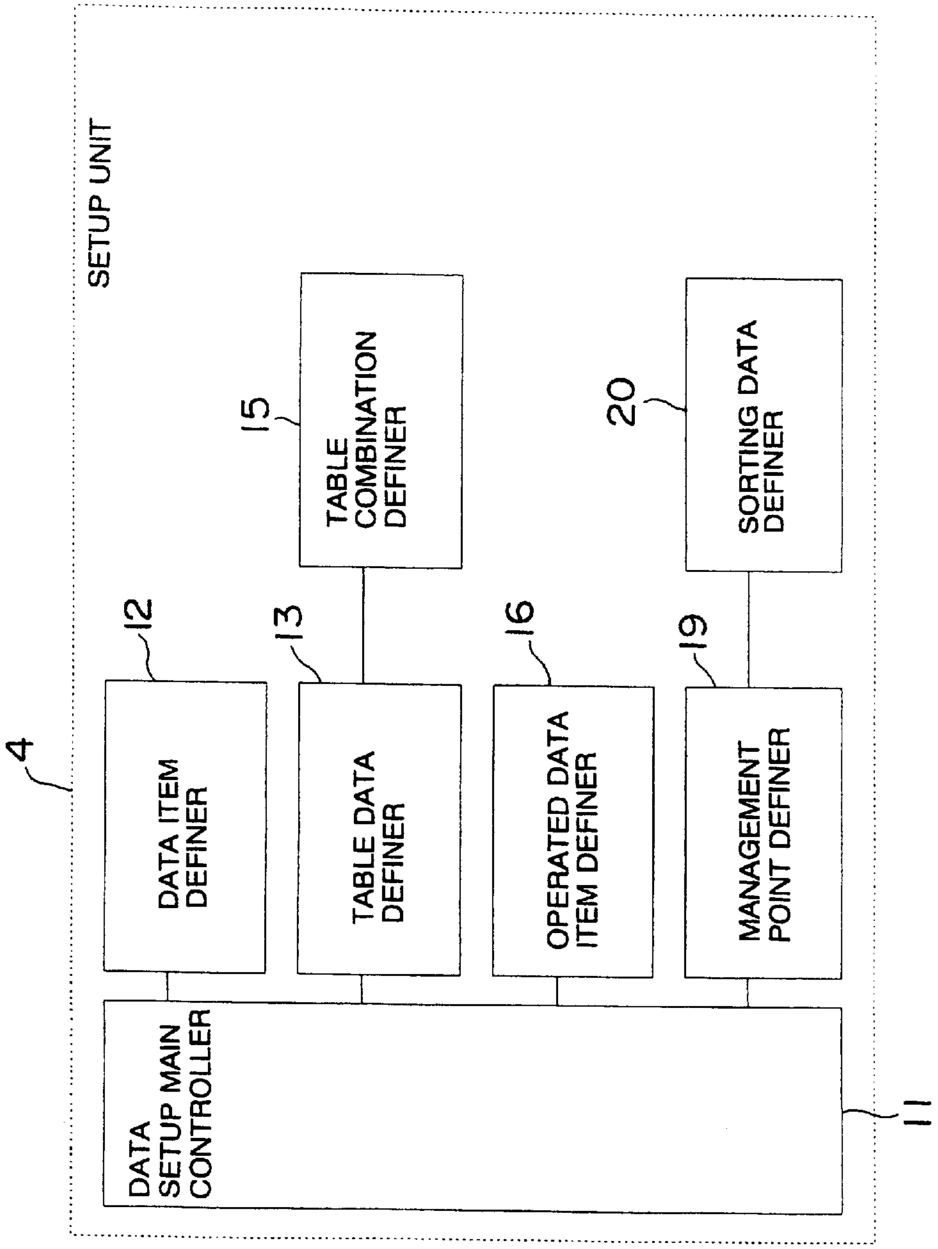
Figure 138:
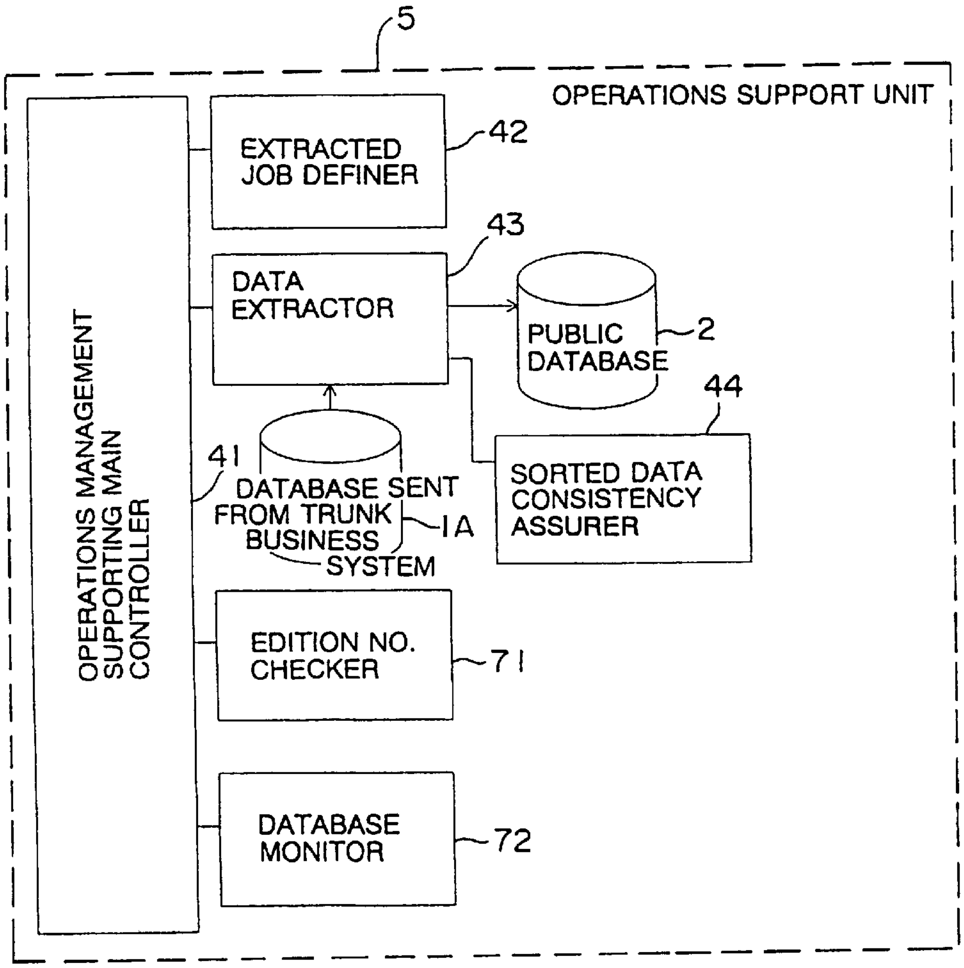
Figure 141:
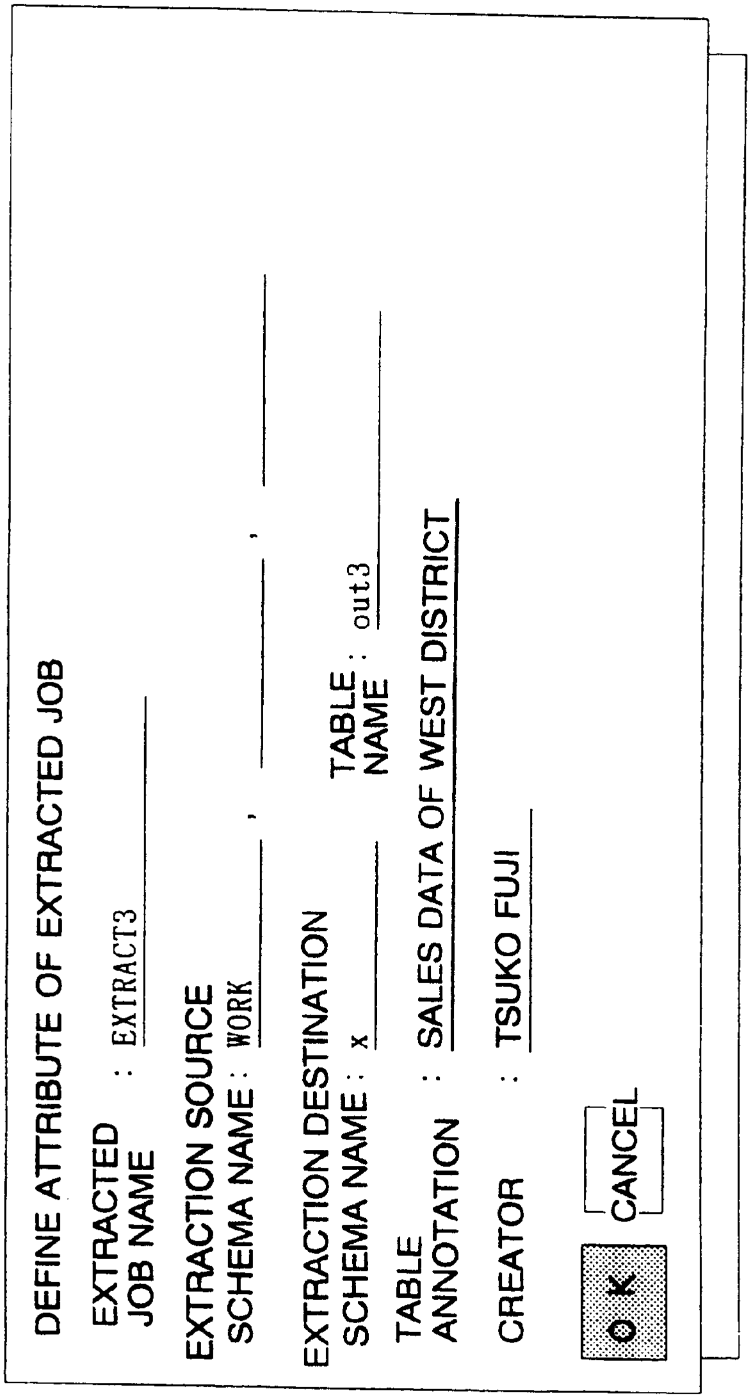
Figure 143:
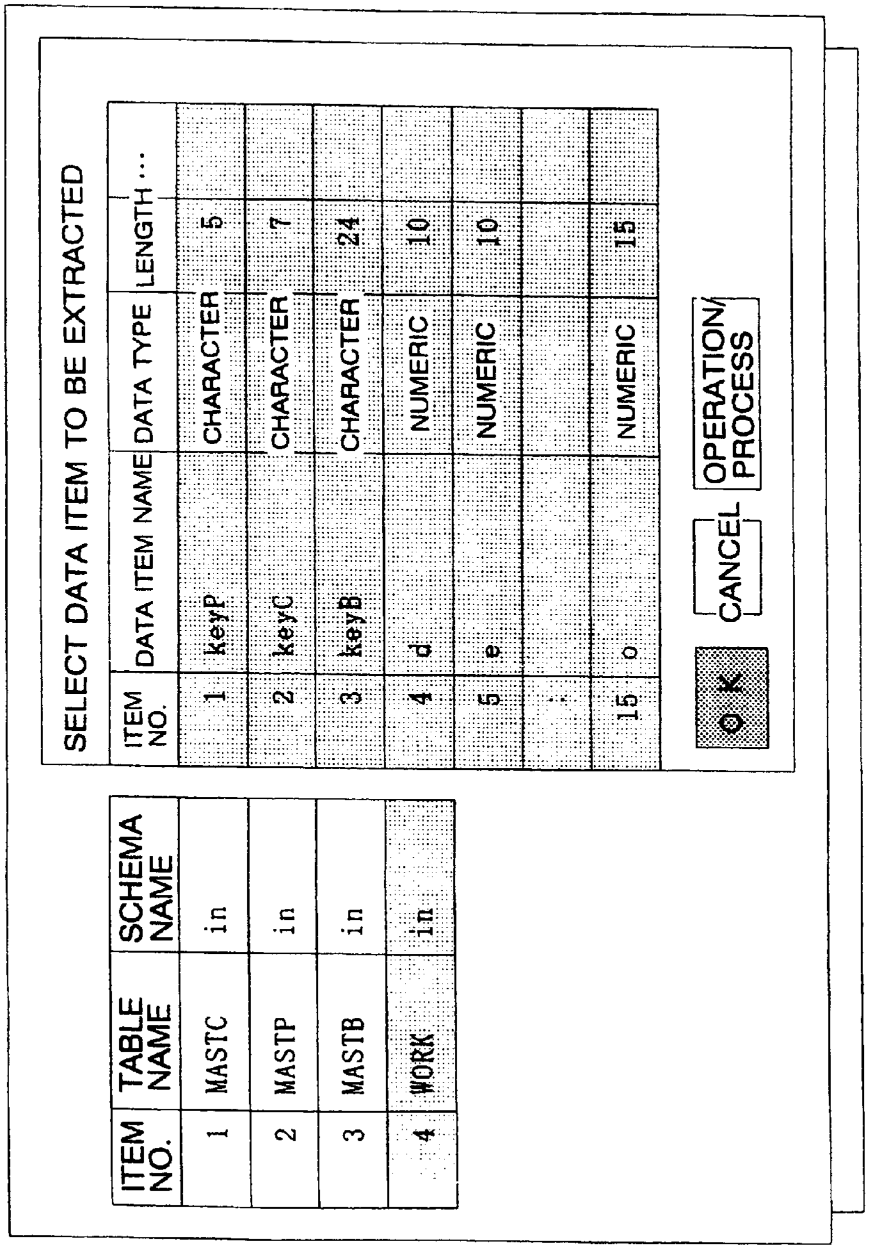
Figures 144, 145:
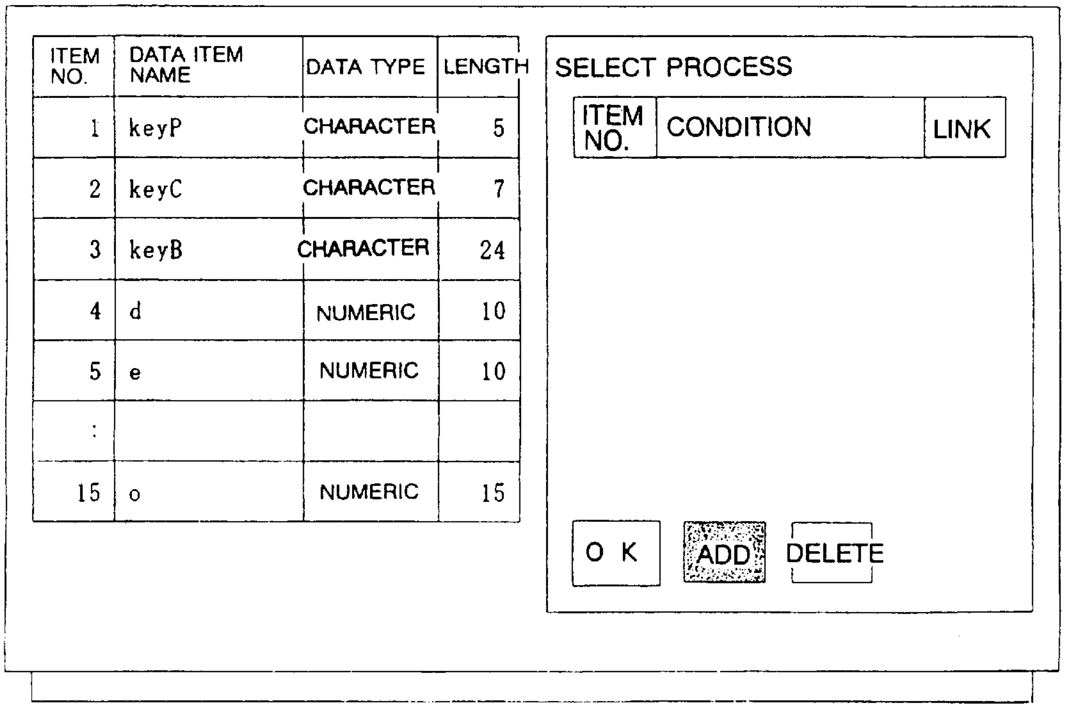
Figure 146:
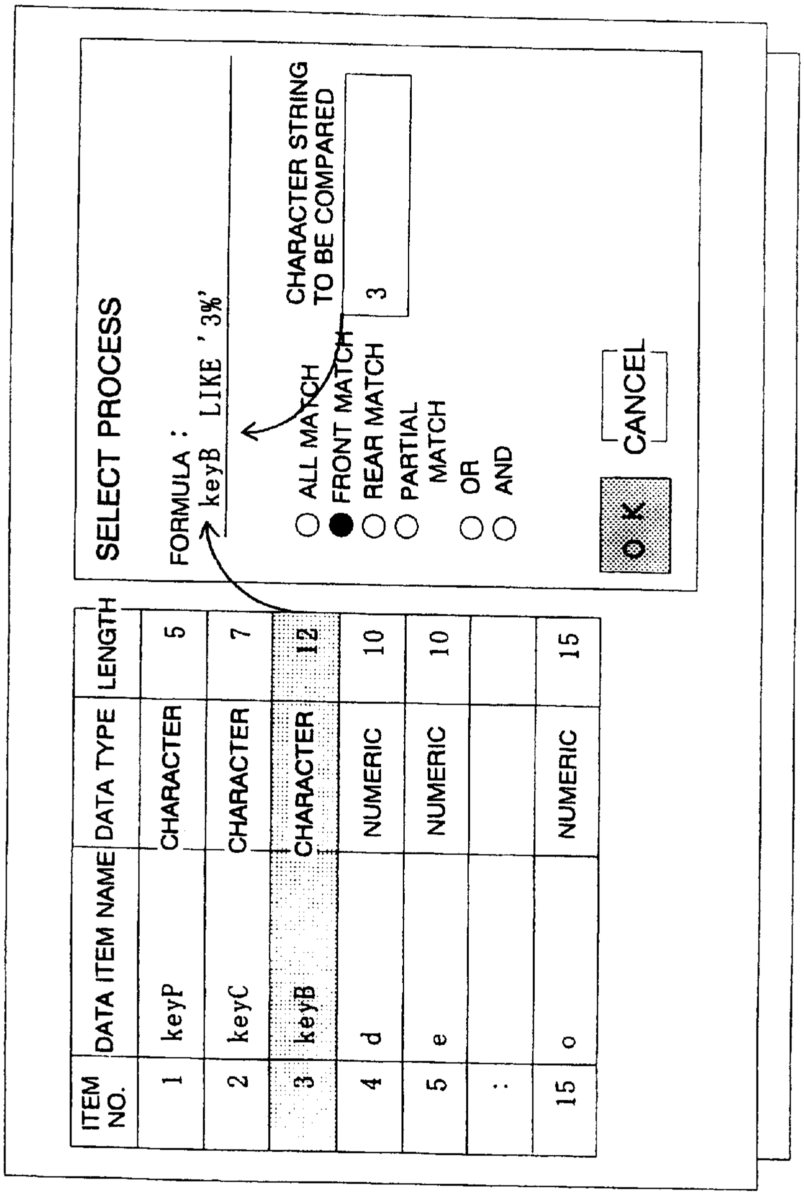
Figure 153:
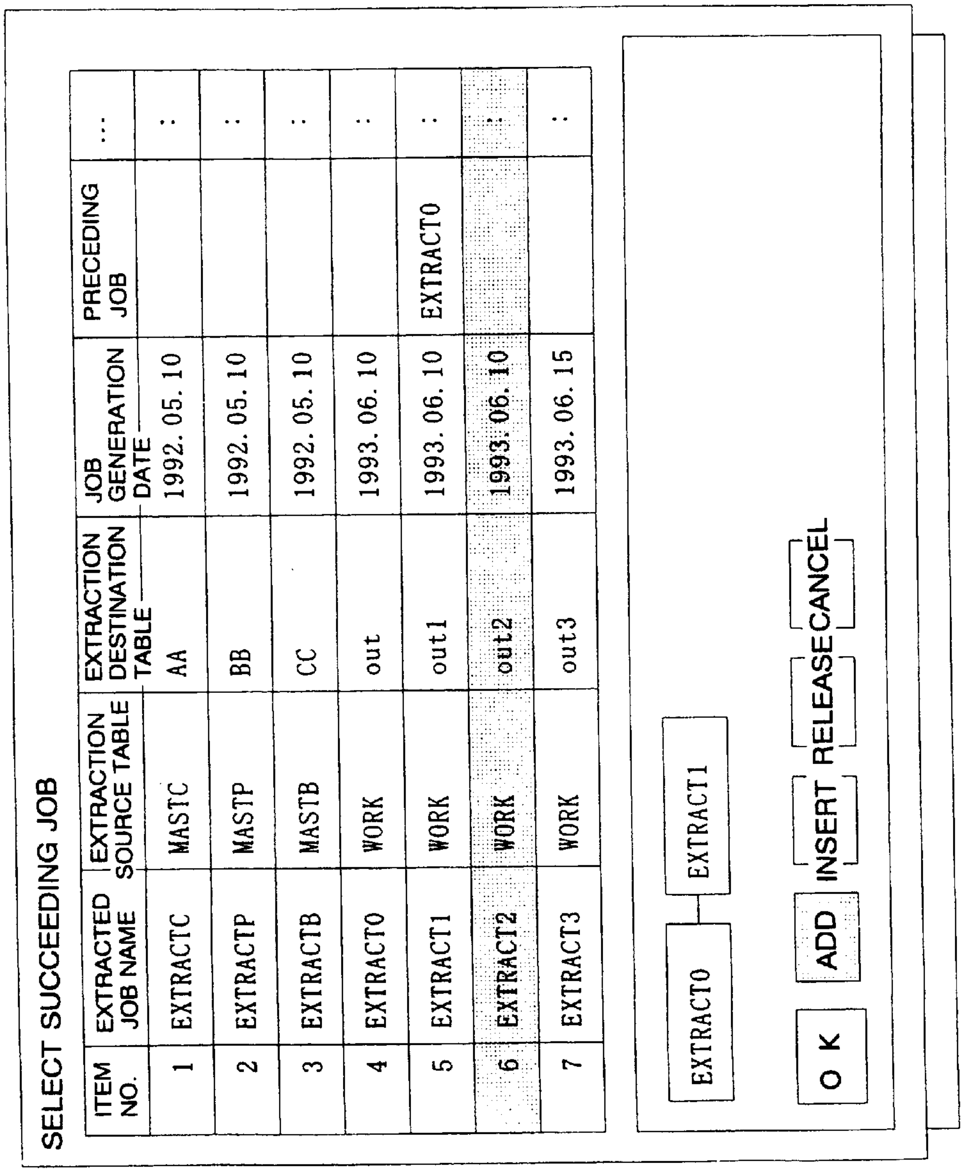
Figure 158:
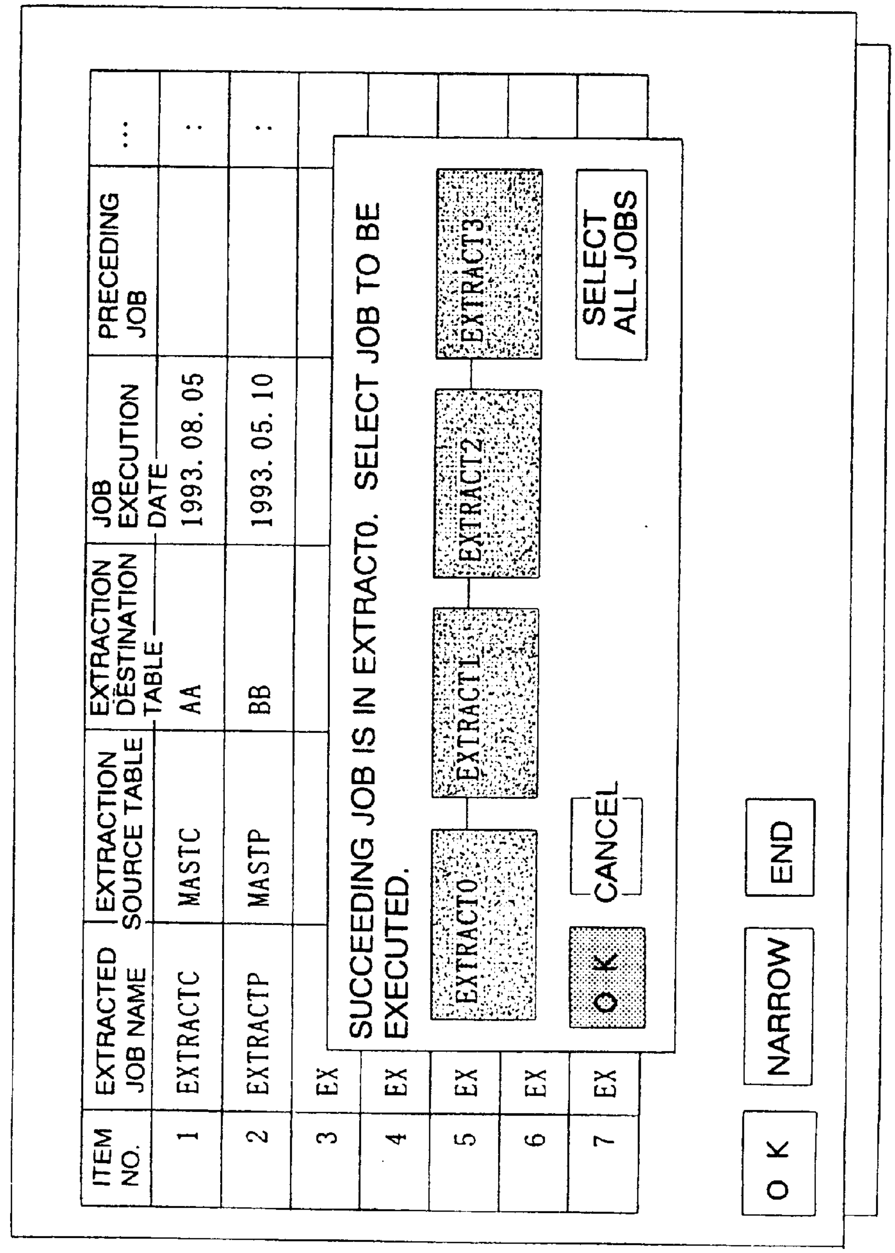
Figure 159:
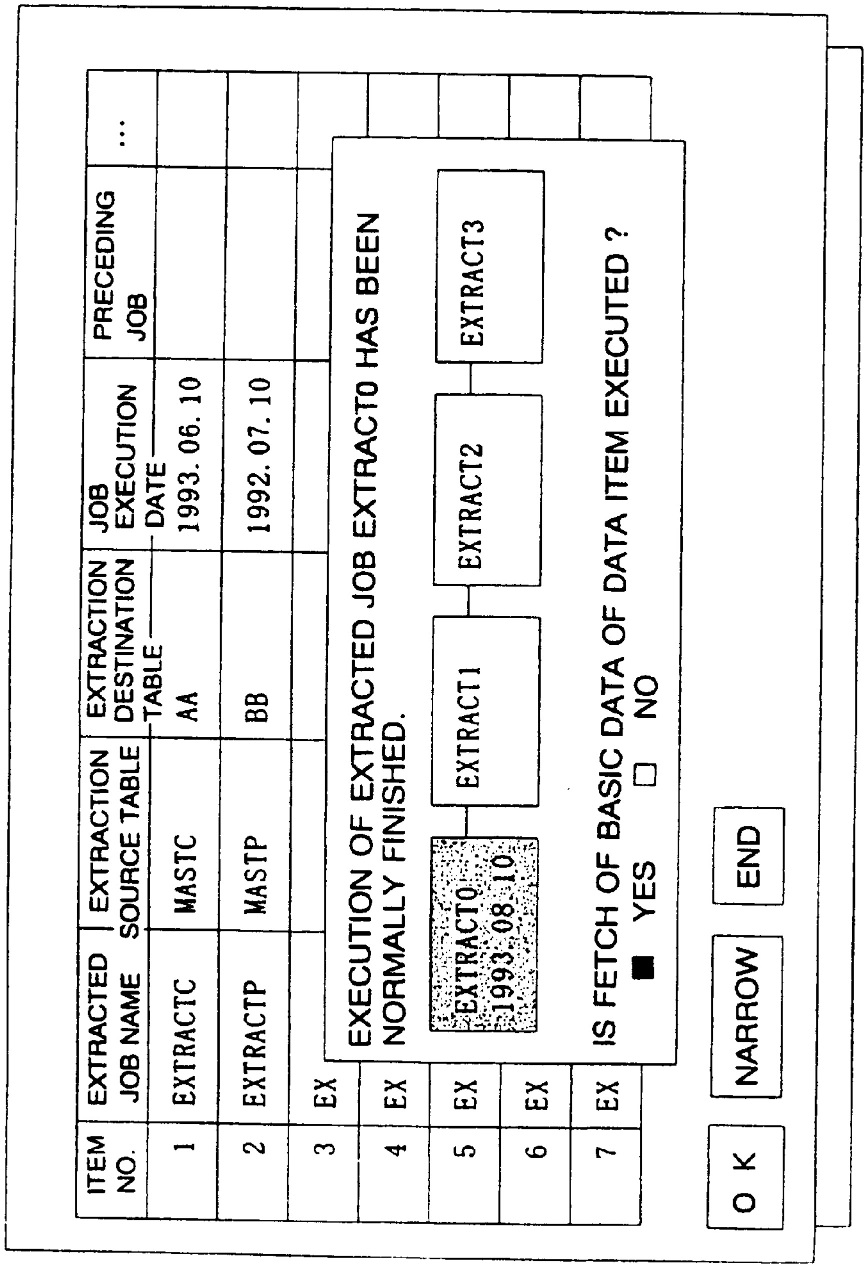
Figure 160:
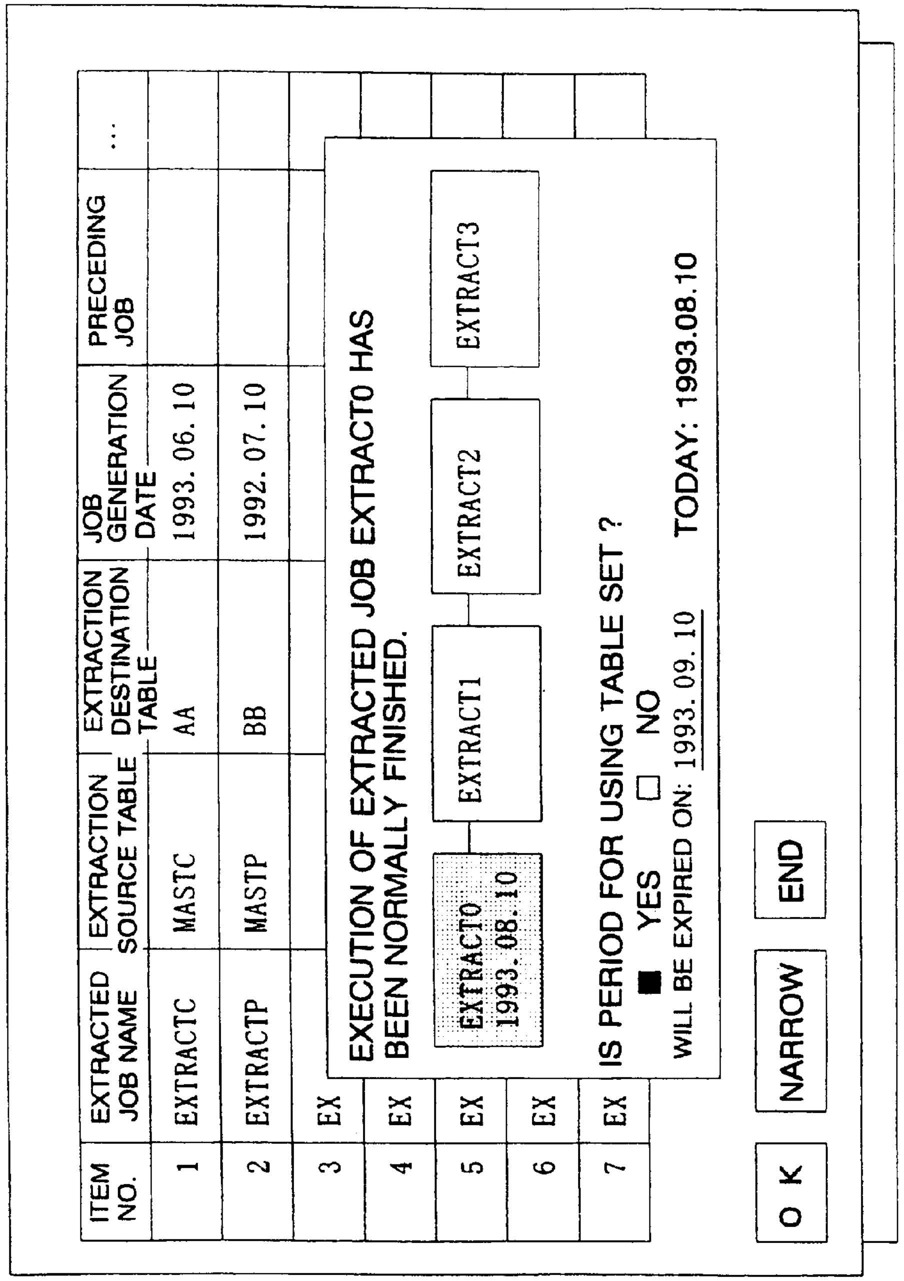
Figure 161:
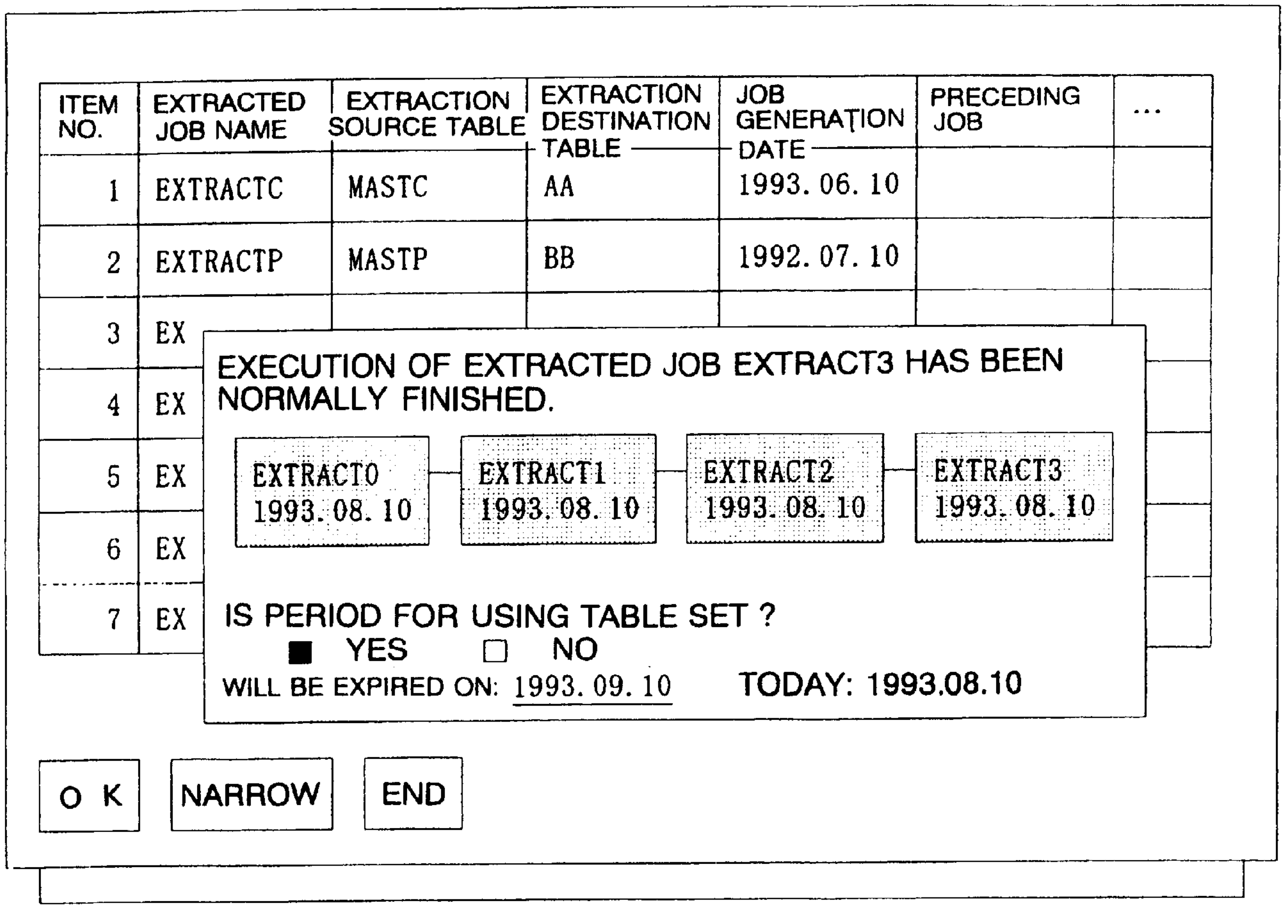
Figure 164:
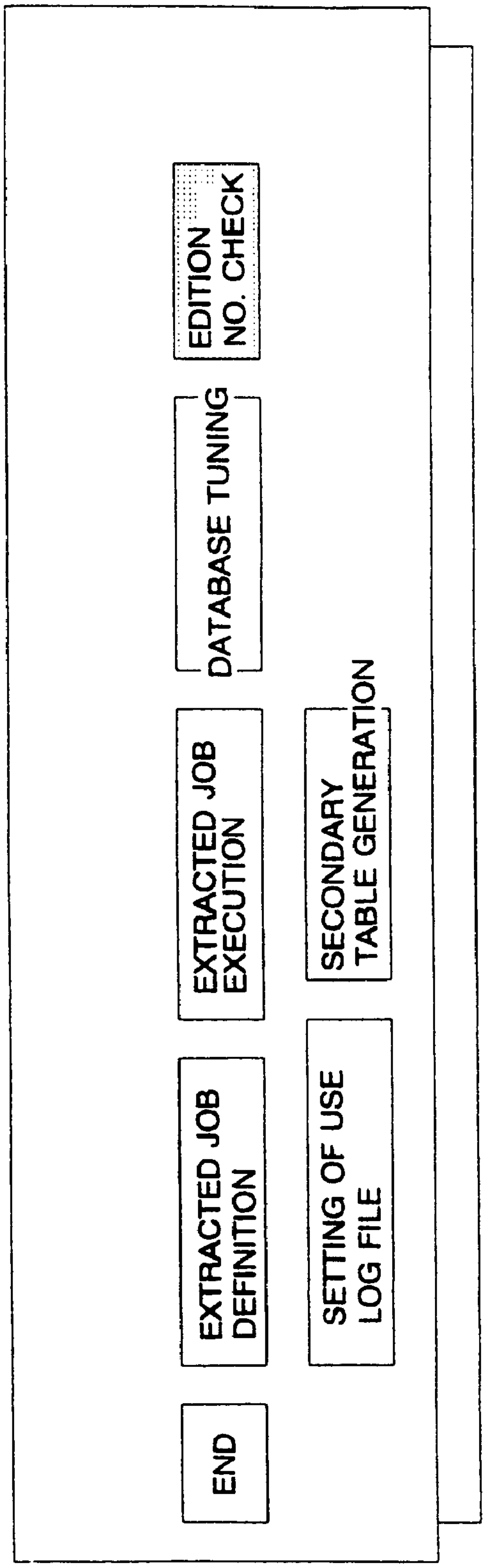
Figure 169:
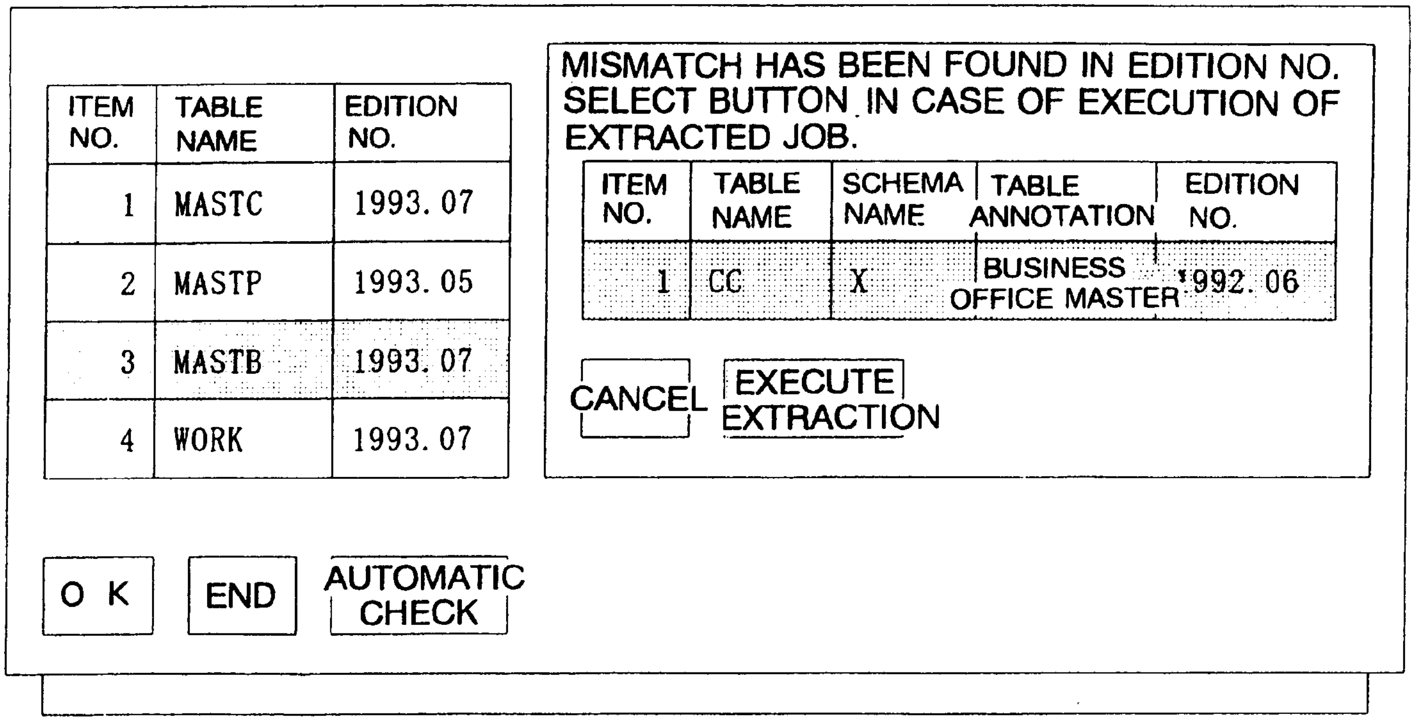
Figure 170:
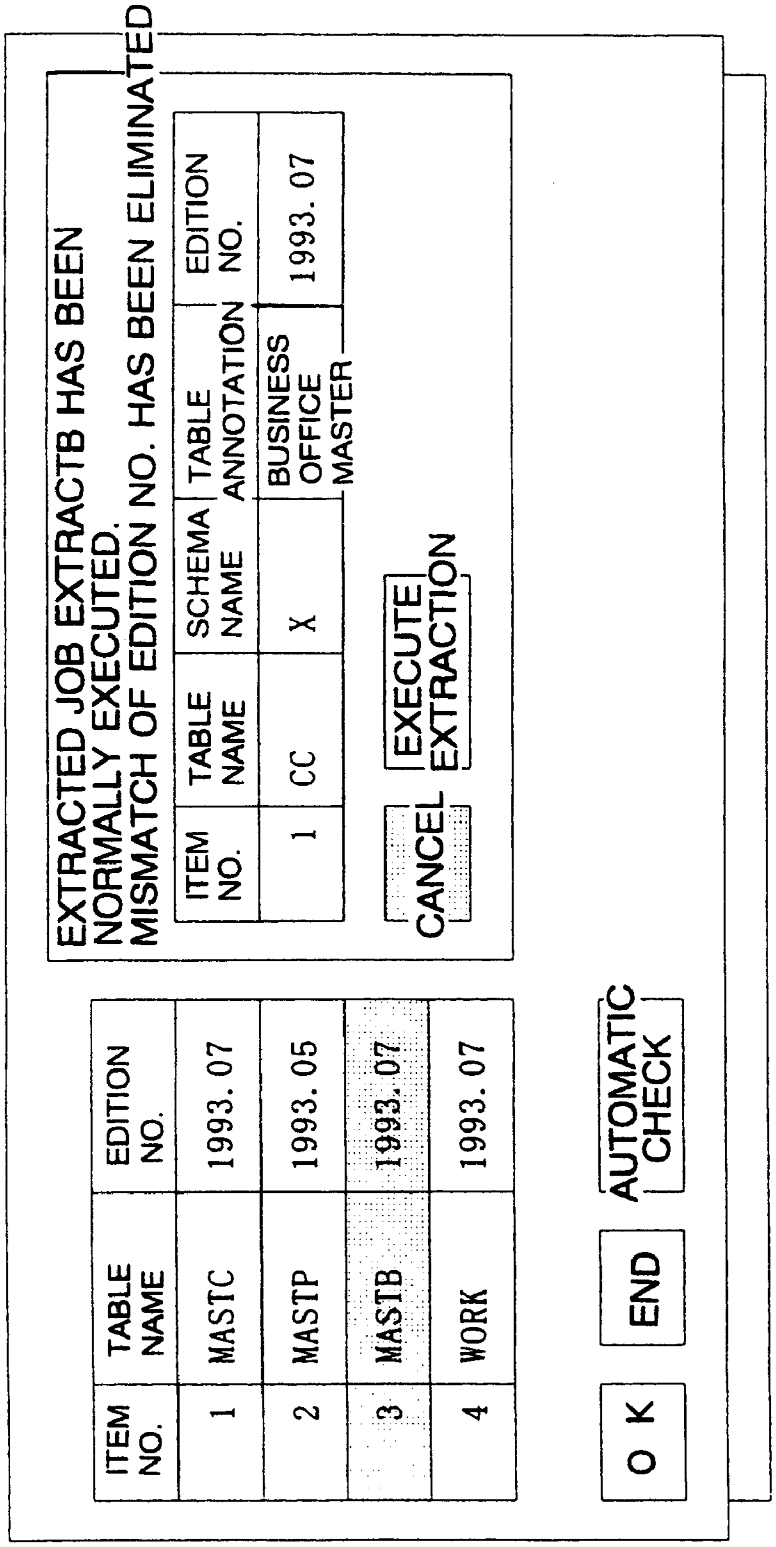
Figure 181:
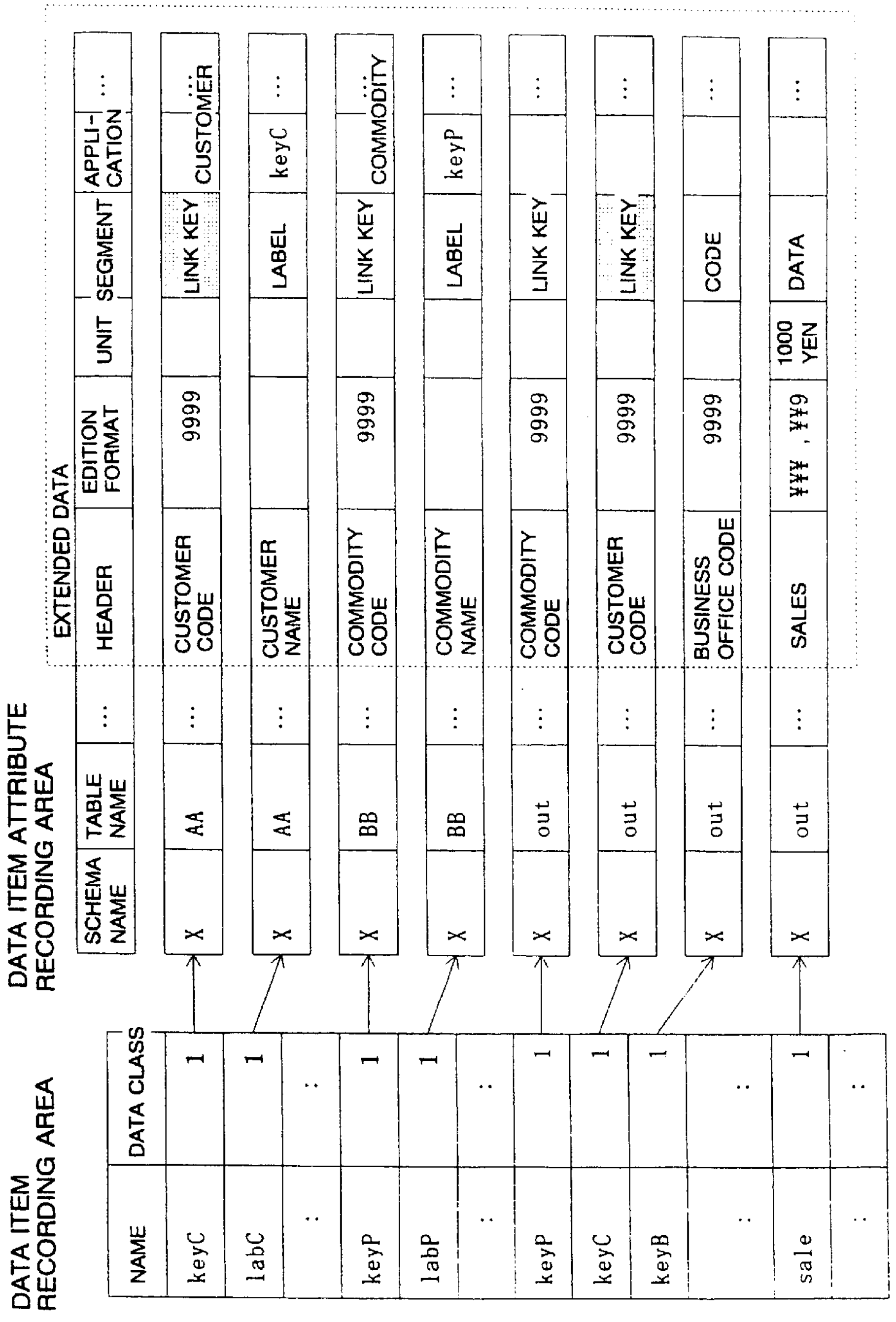
Figure 183:
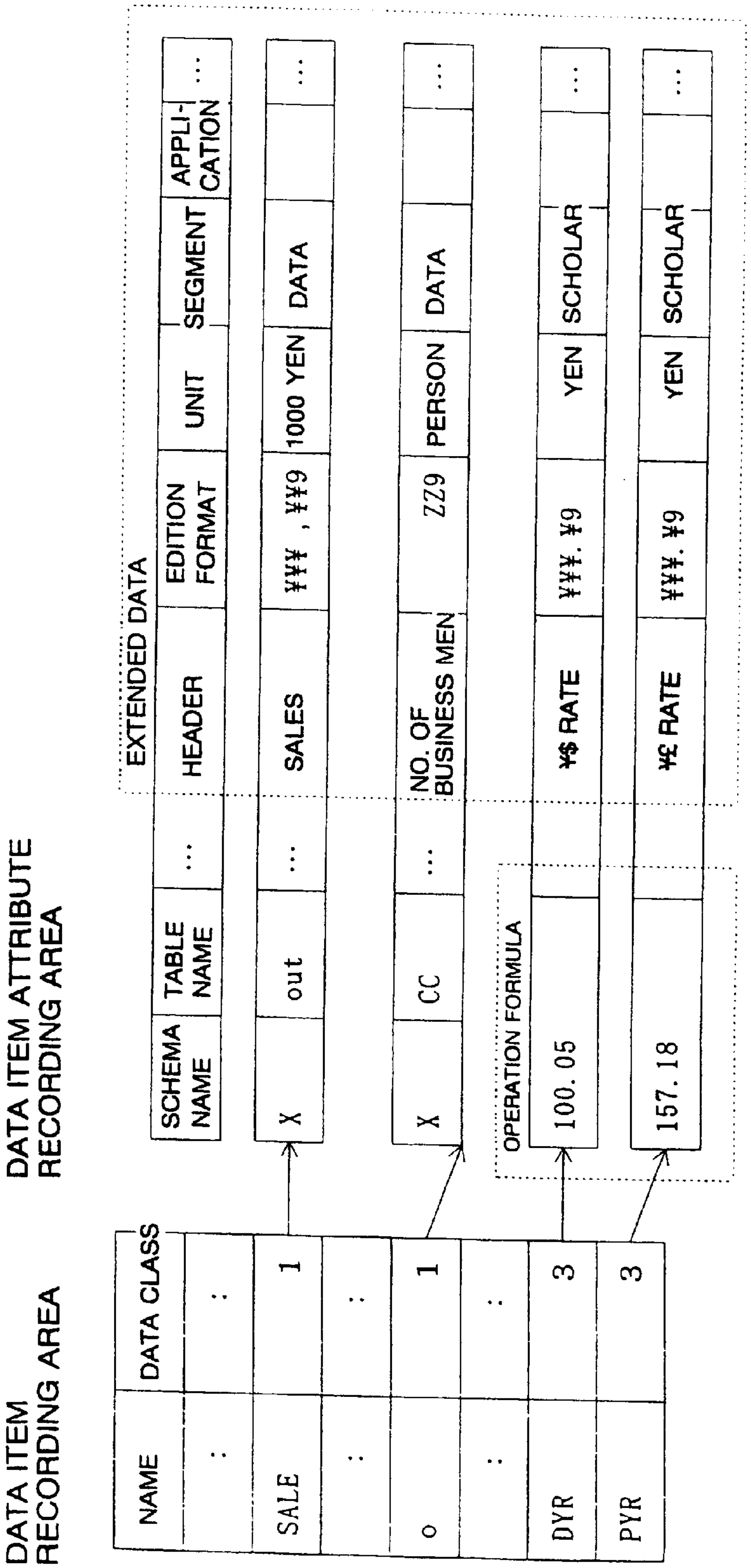
Figure 184:
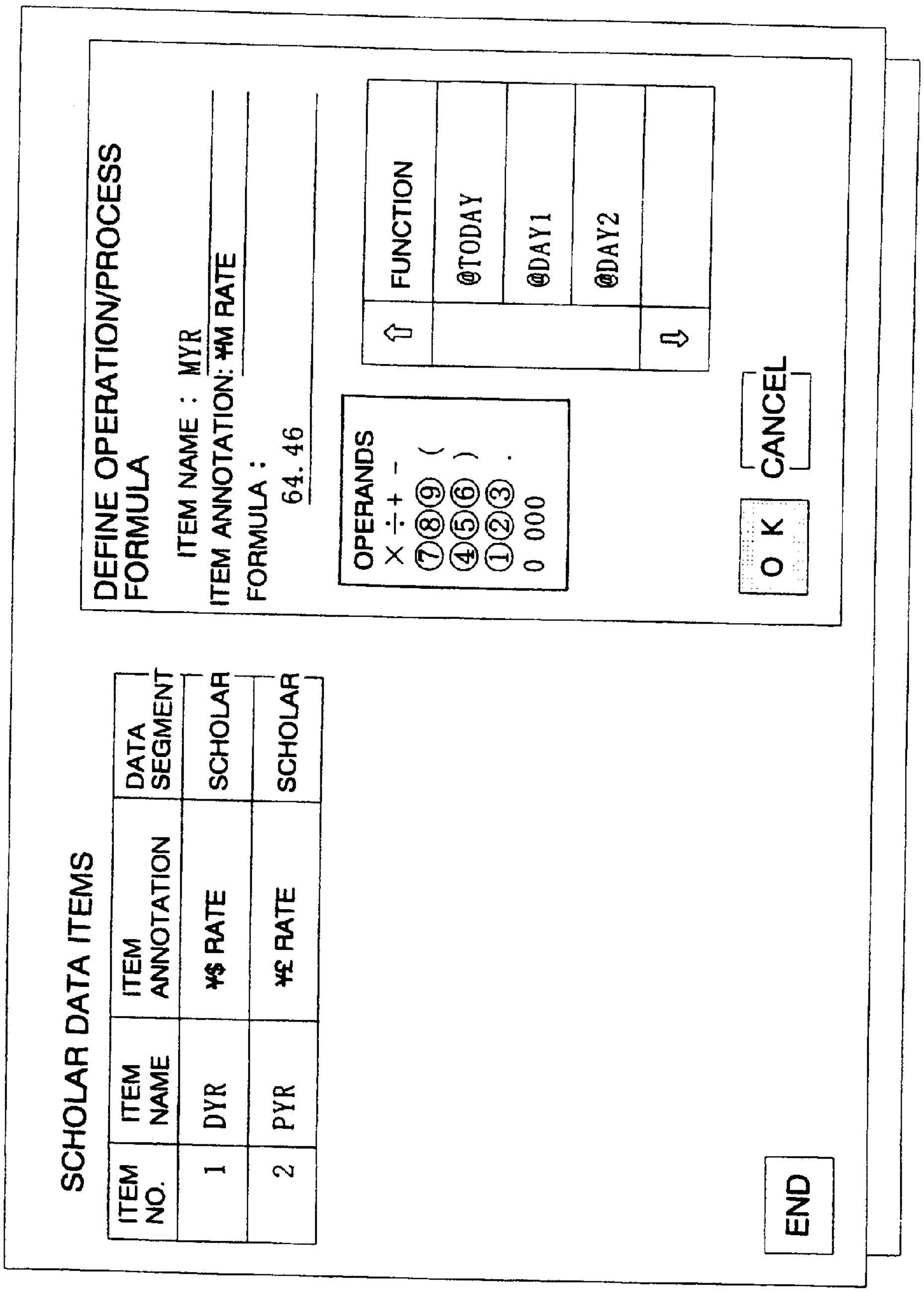
Figure 185:
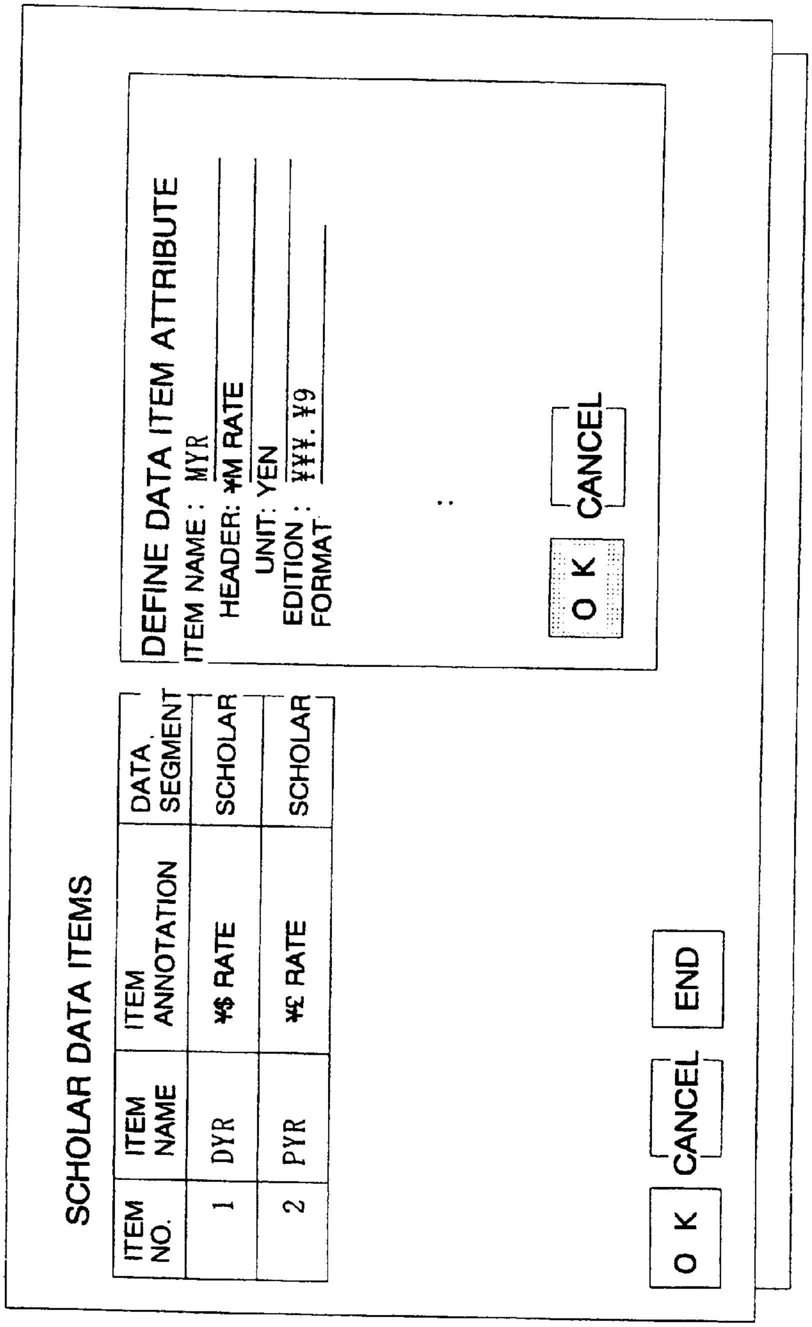
Figure 186:
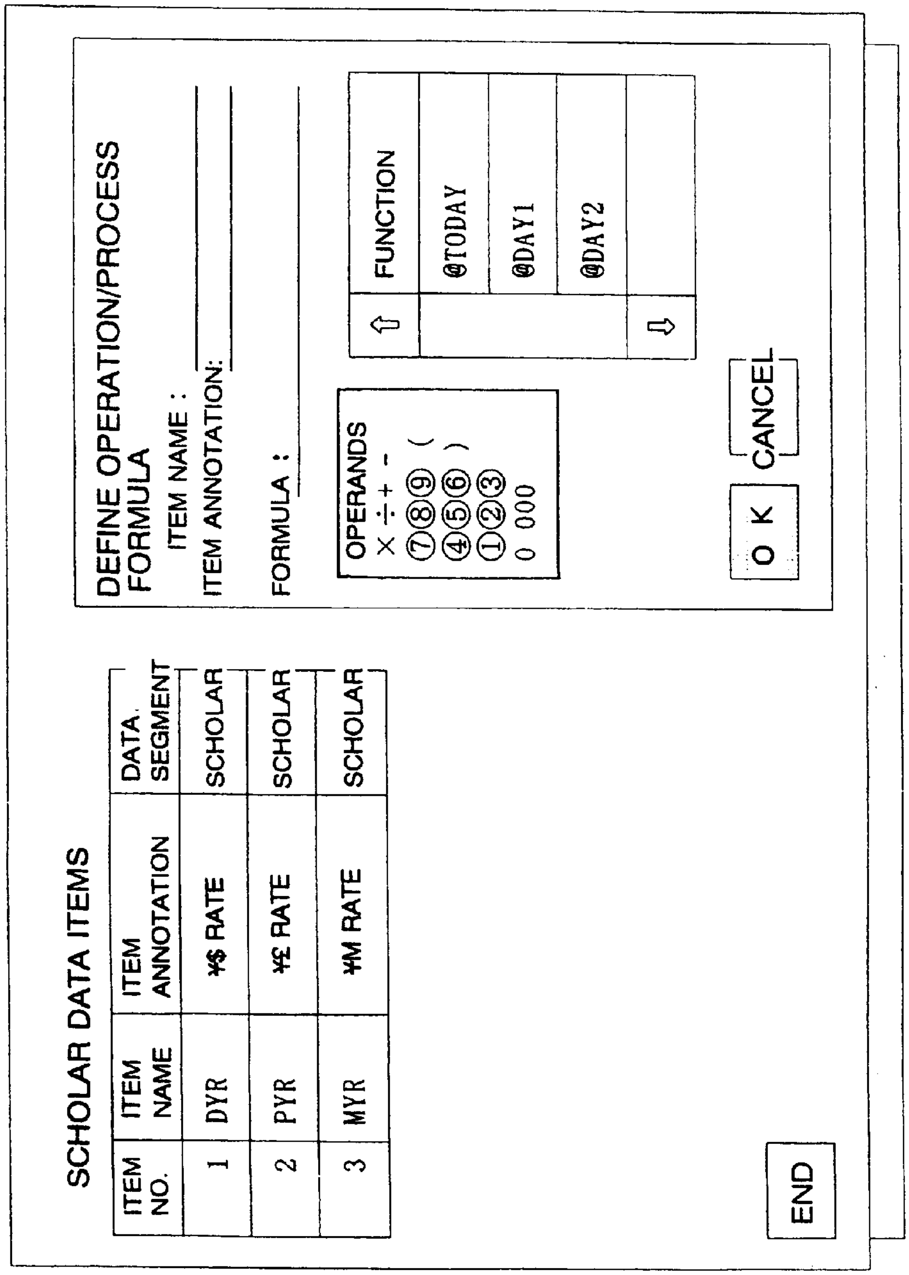
Figure 187:
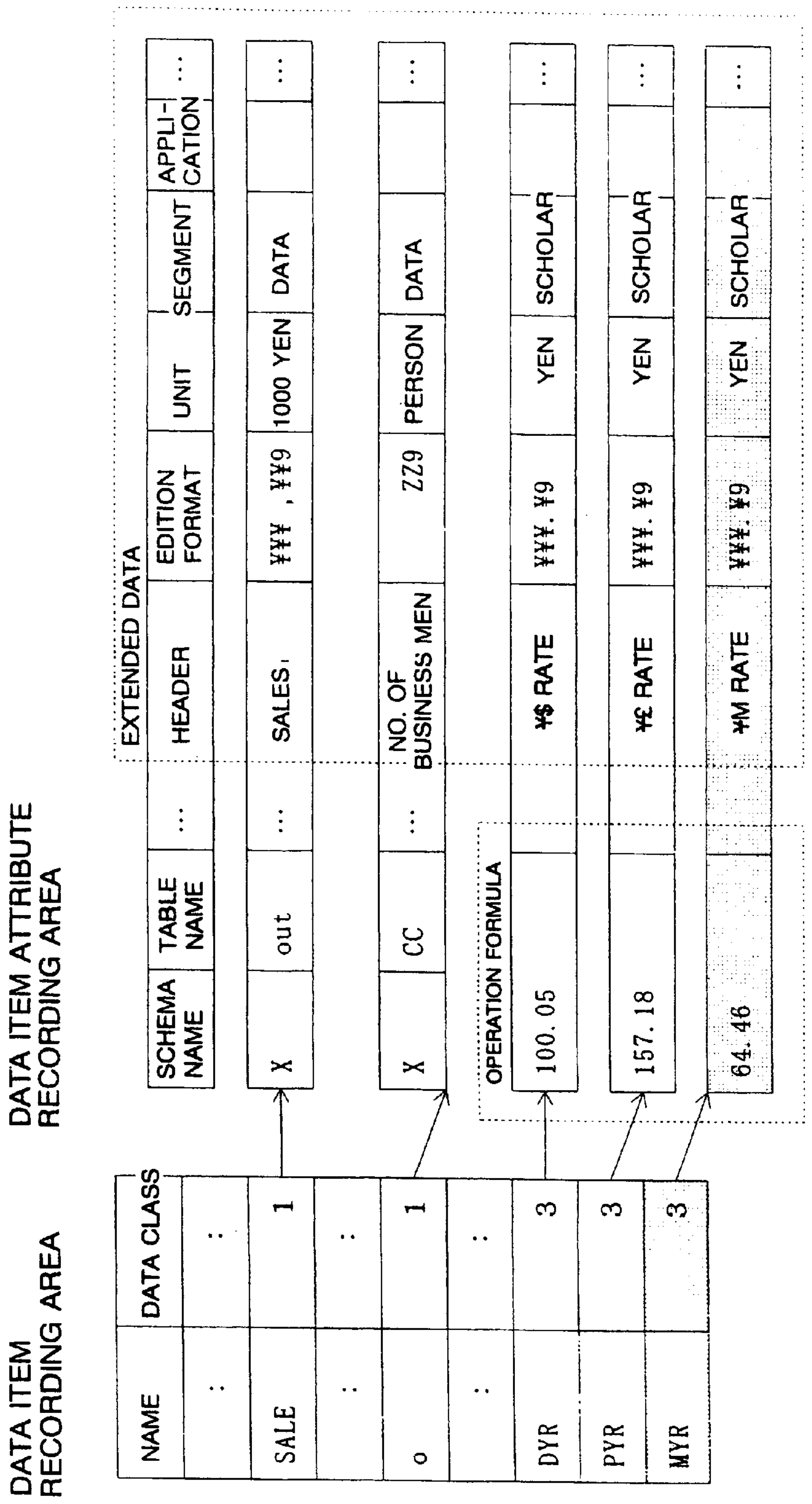
Figure 188:
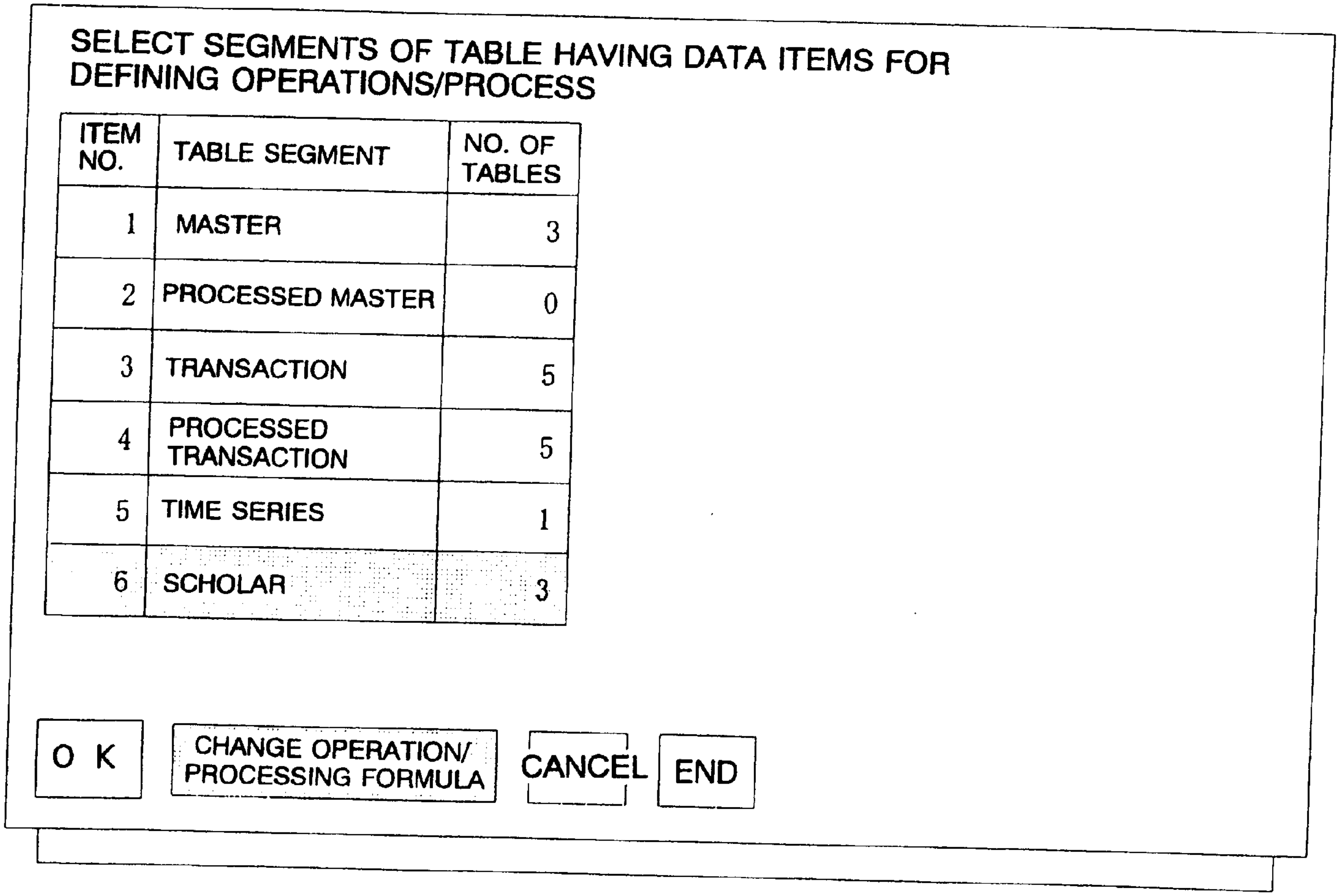
Figure 189:
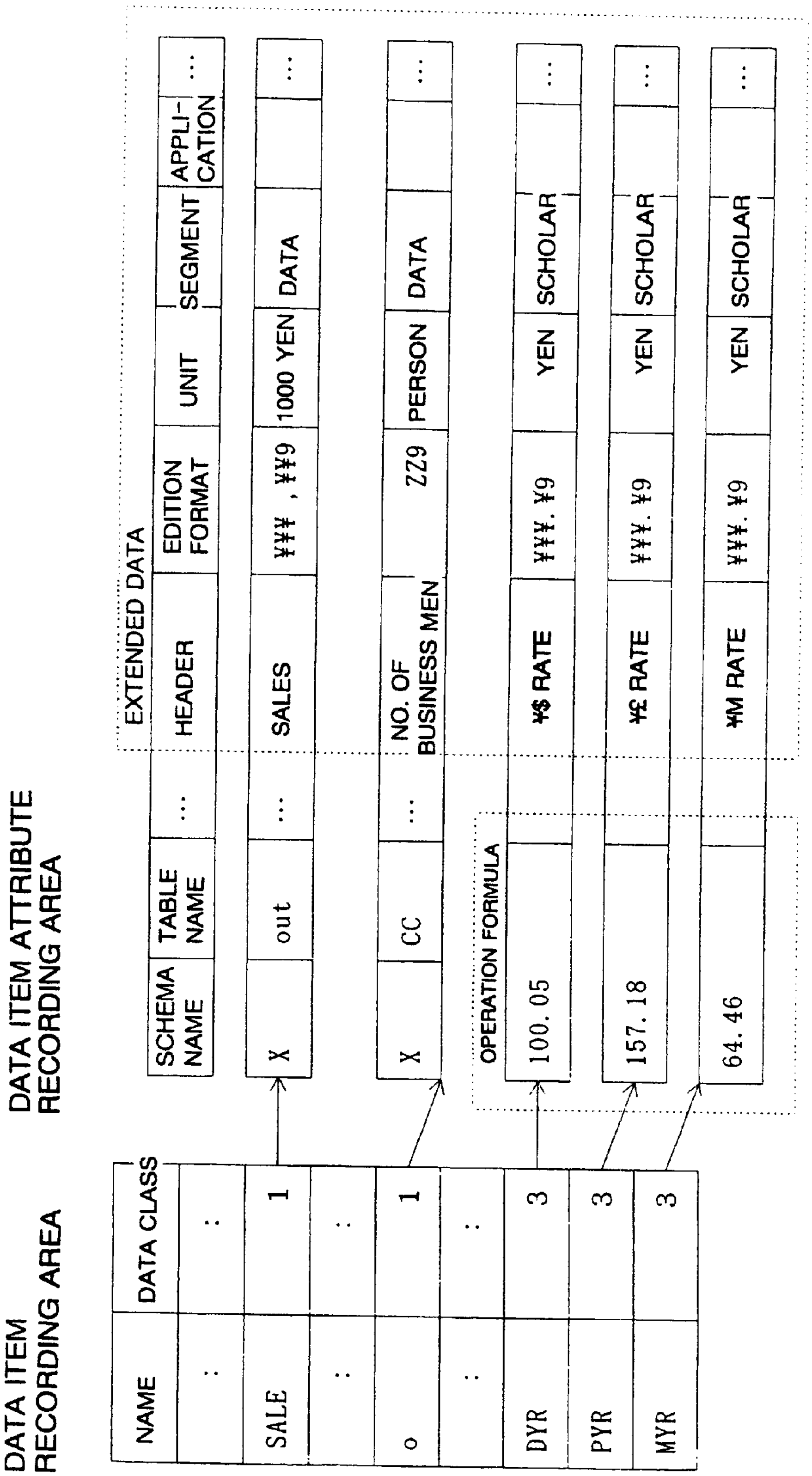
Figure 190:
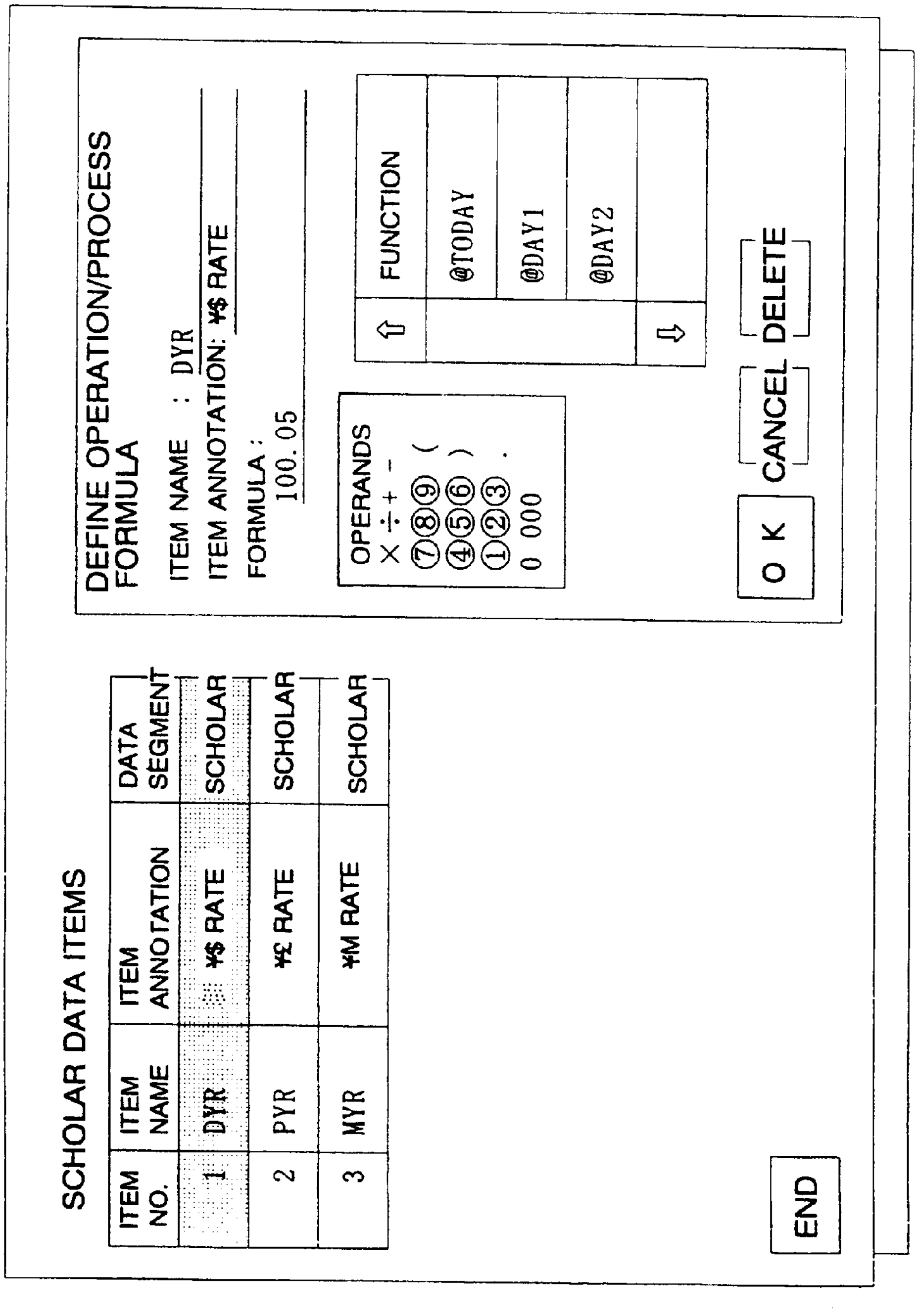
Figure 191:
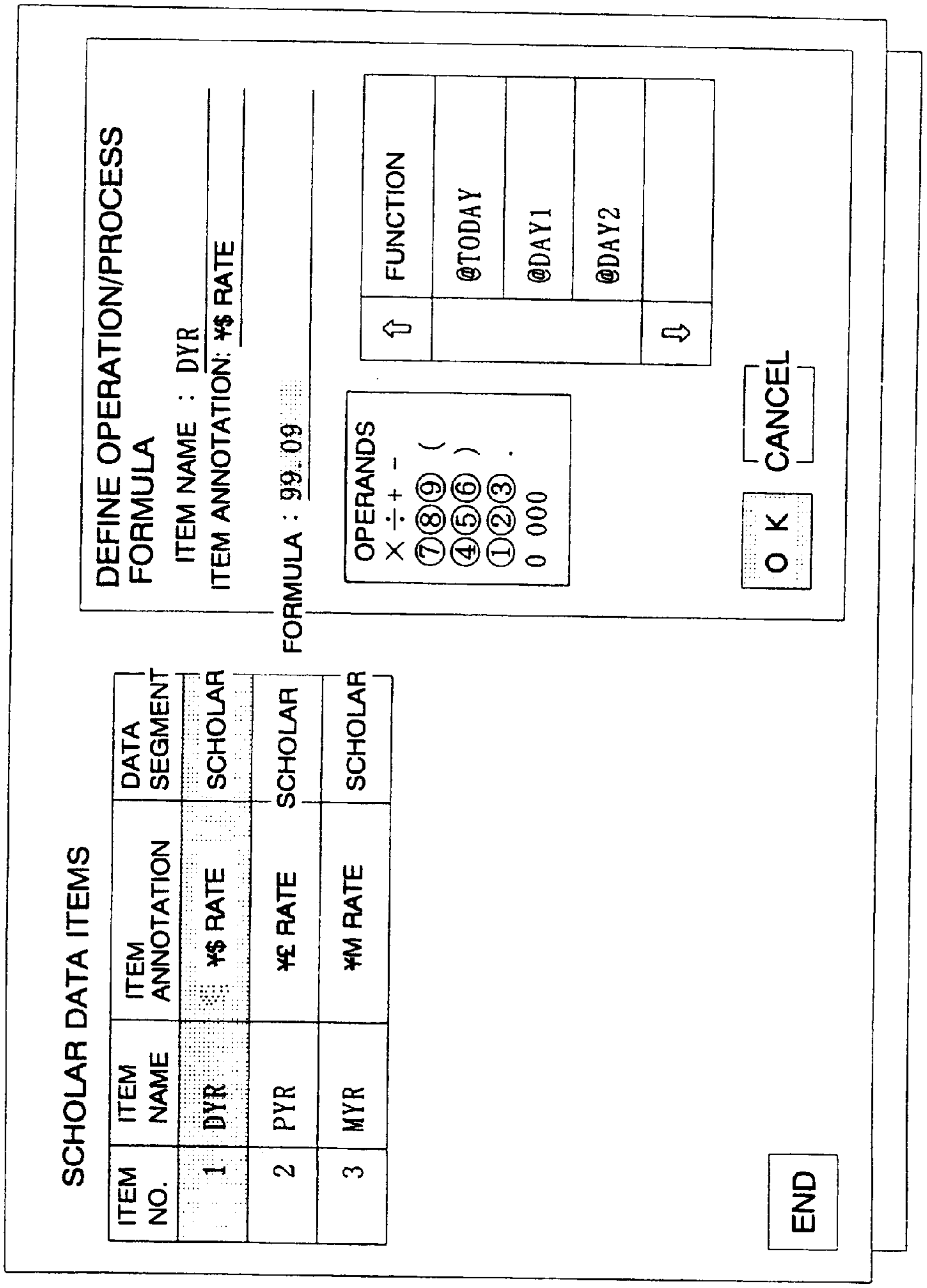
Figure 192:
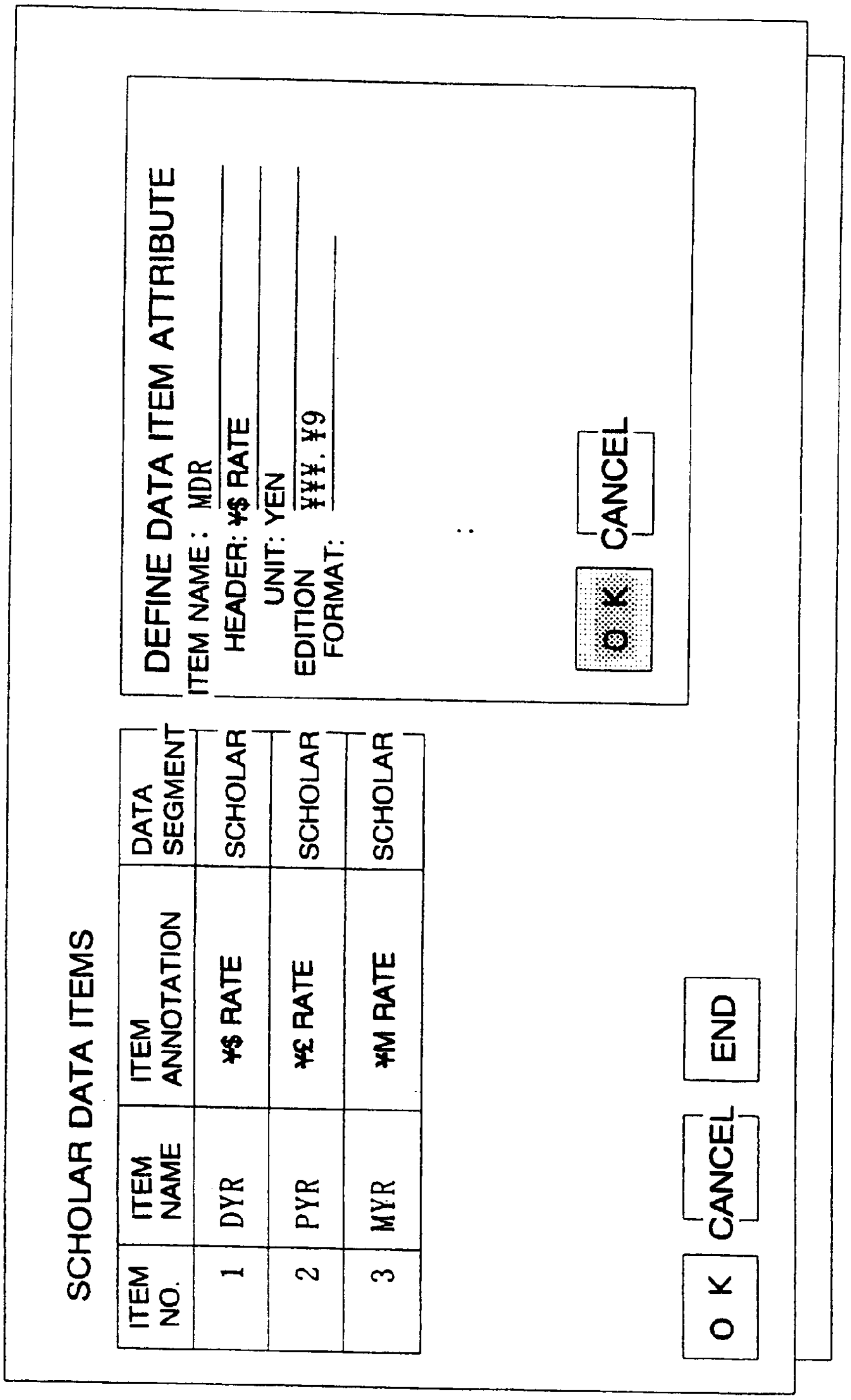
Figure 193:
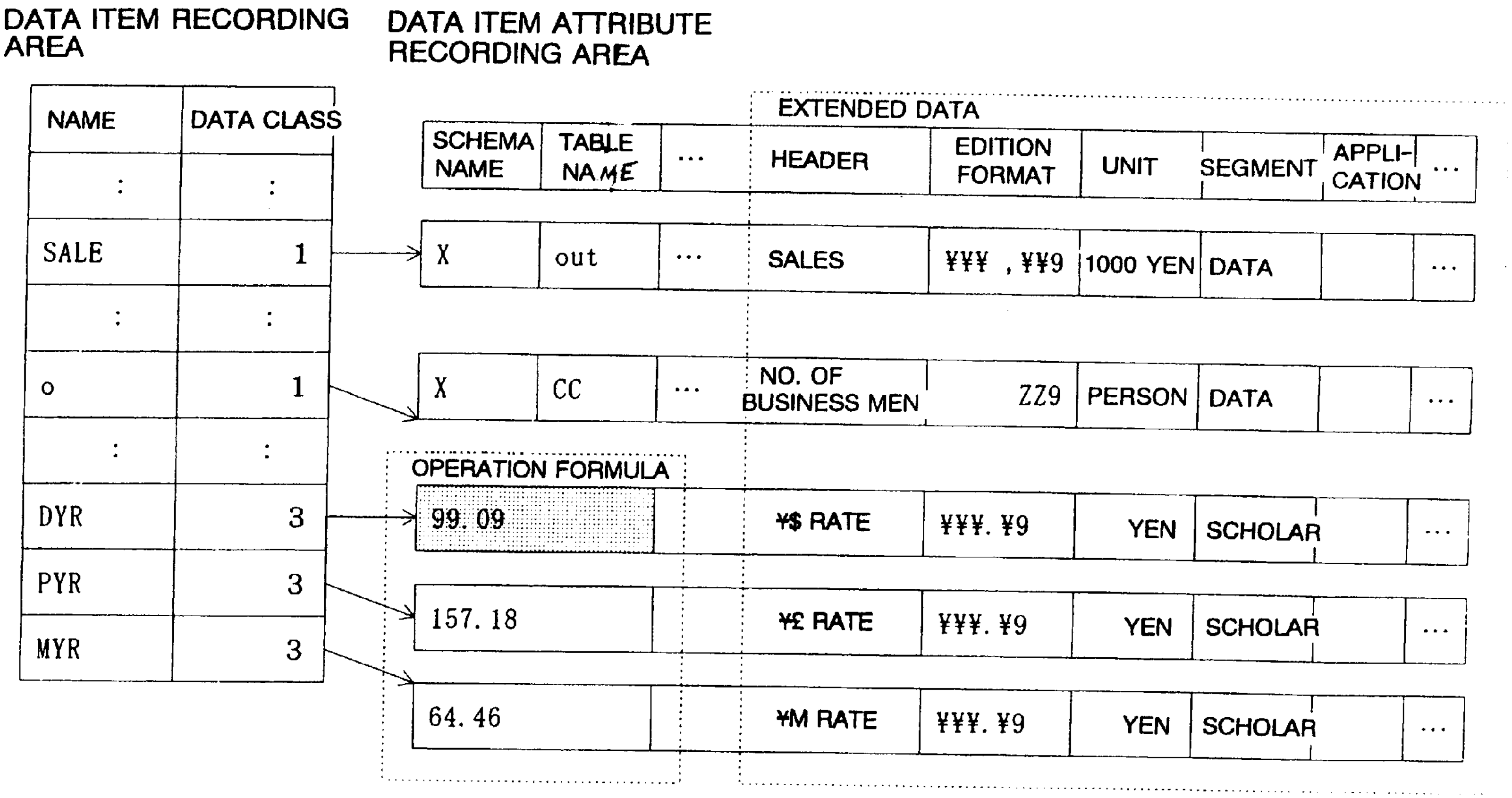
Figure 195:
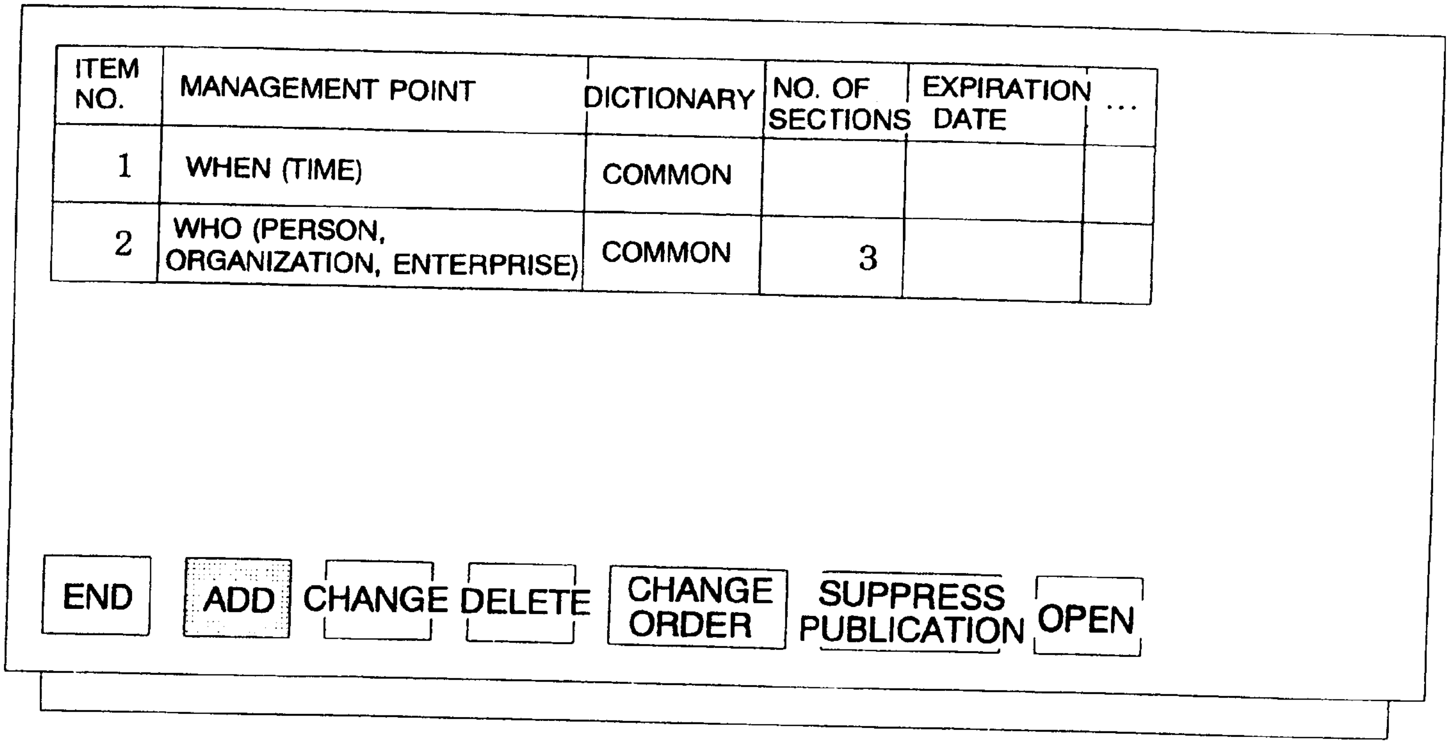
Figure 196:
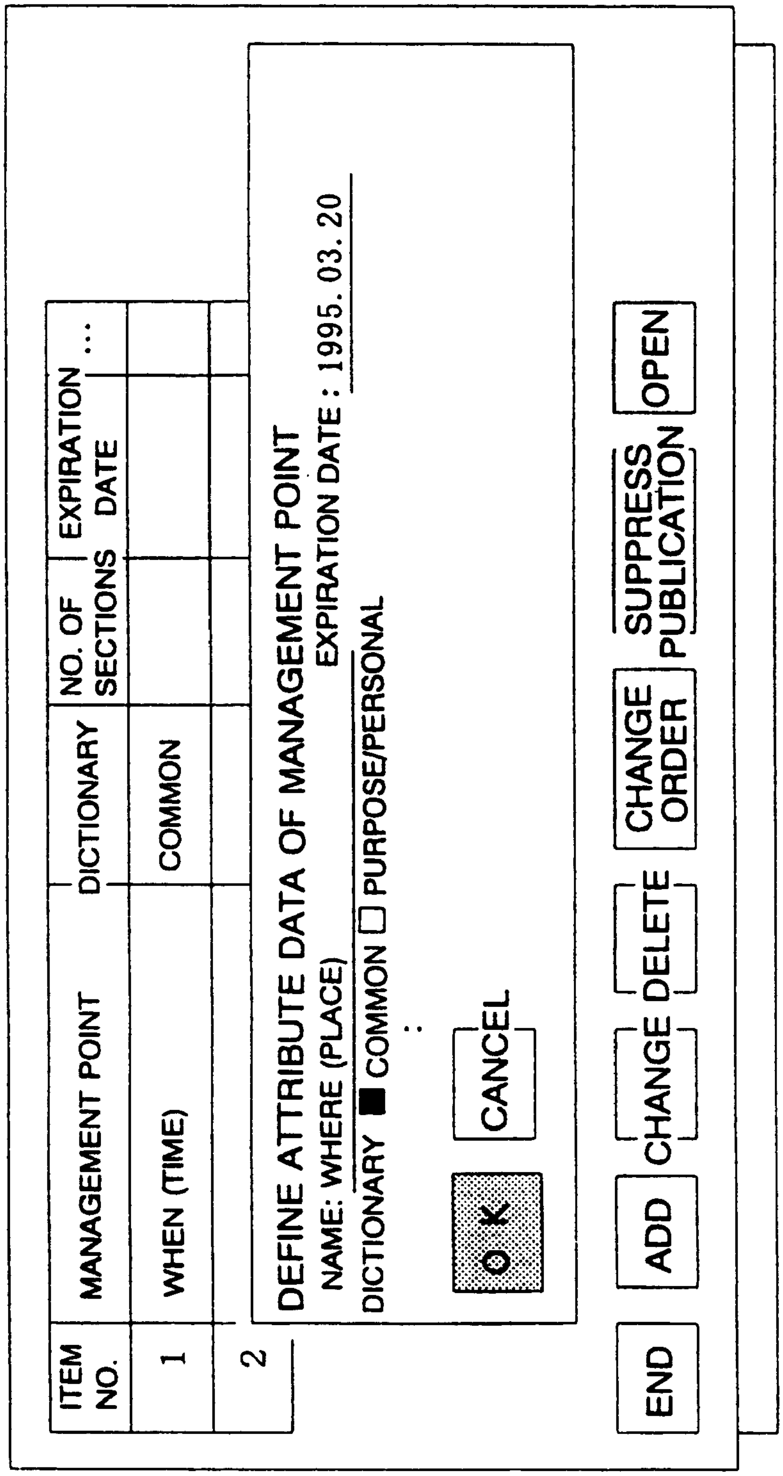
Figure 202:
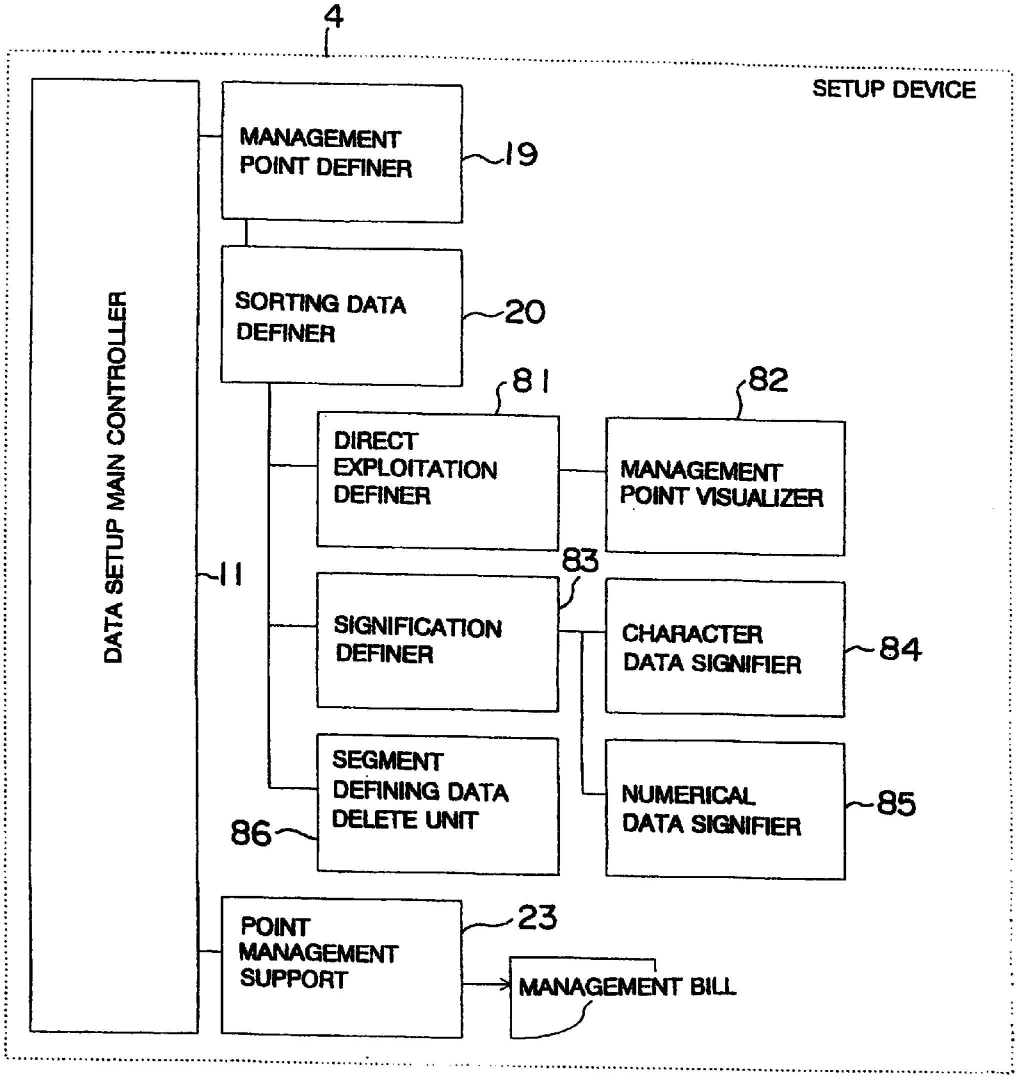
Figure 203:
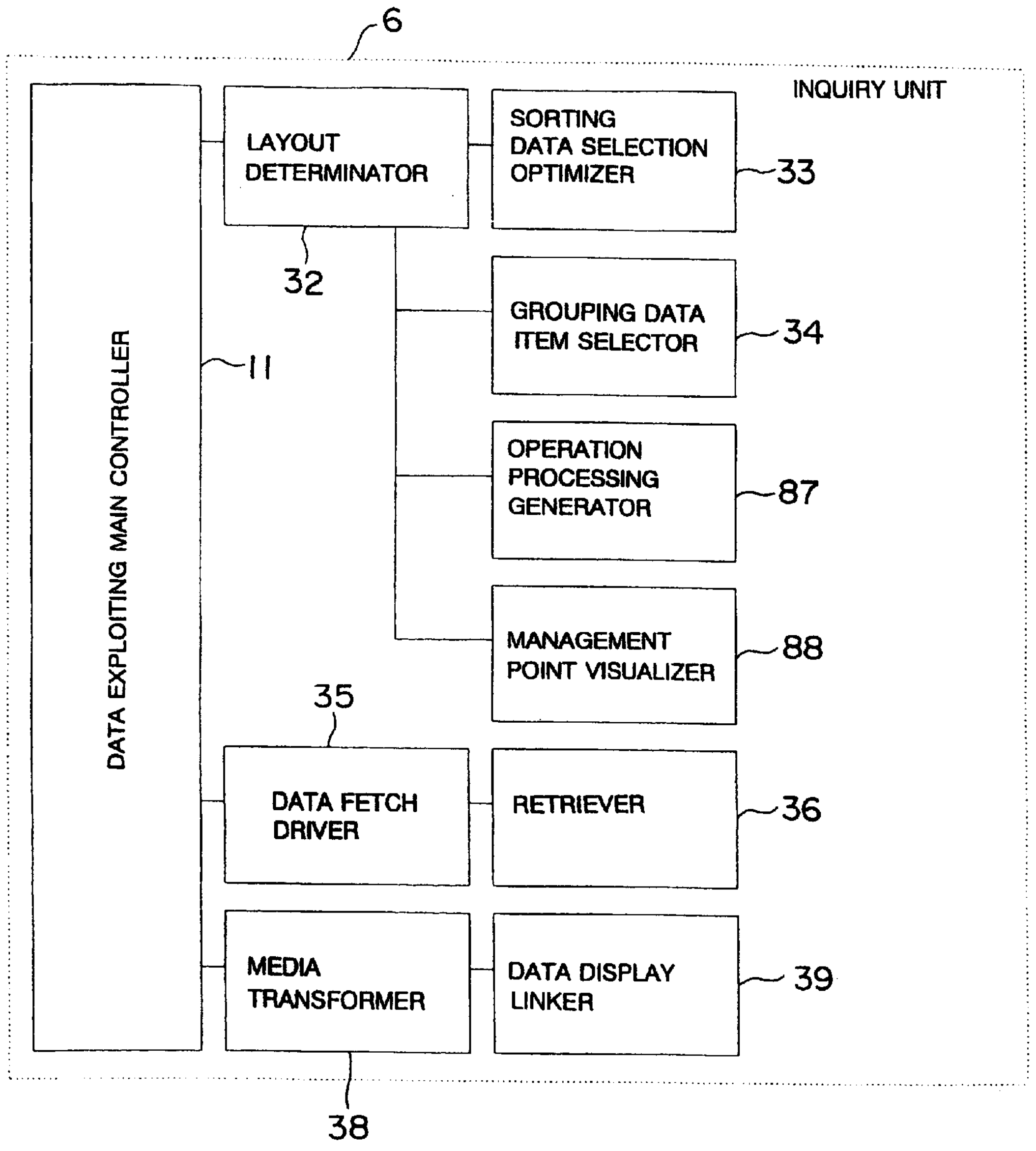
Figure 204:
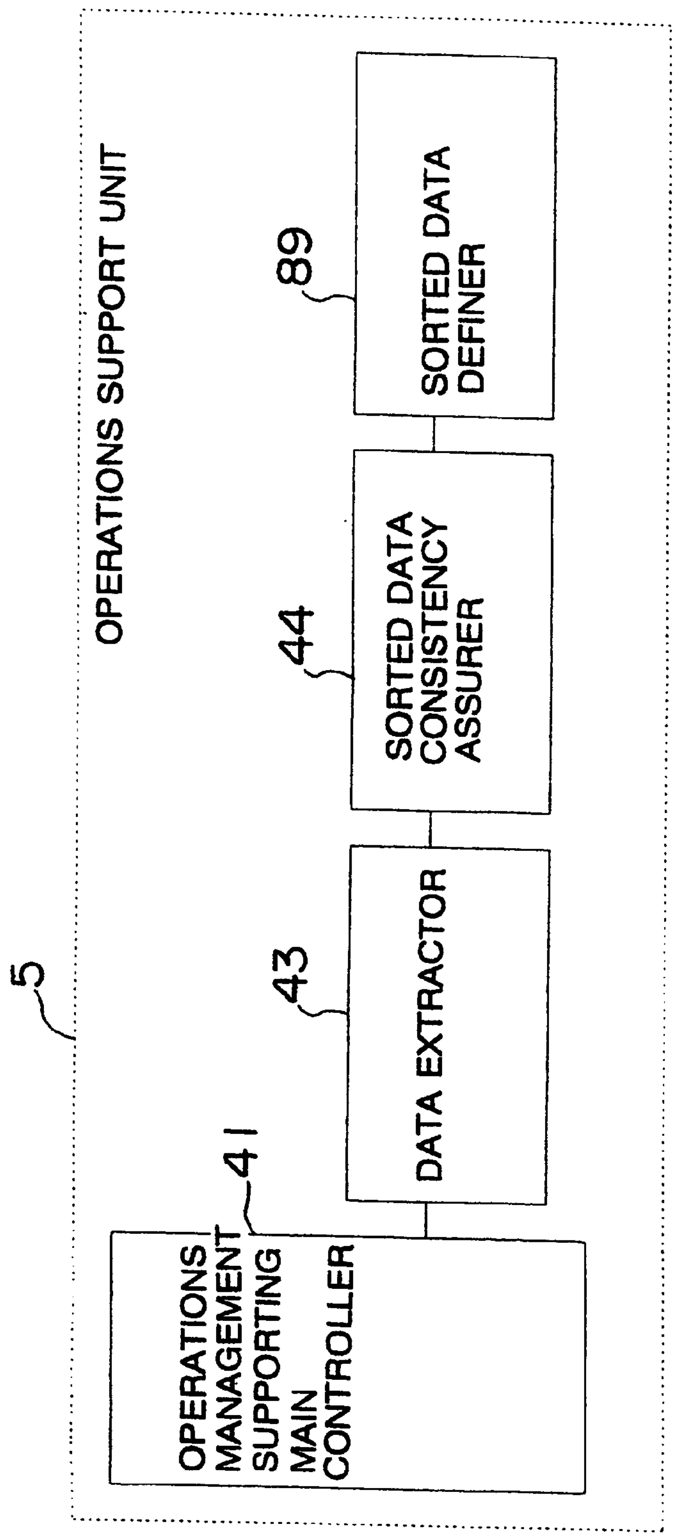
Figure 206:
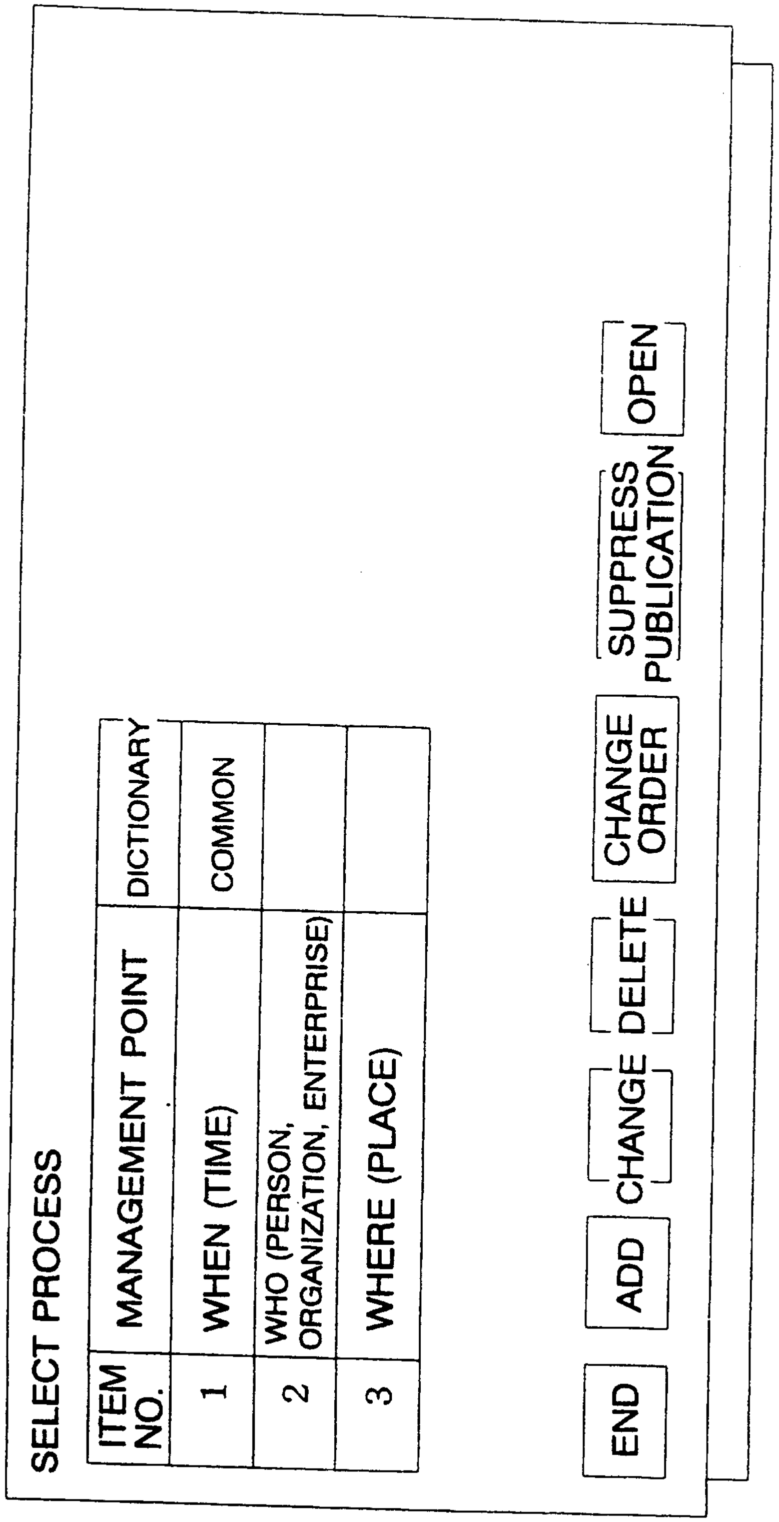
Figure 208:
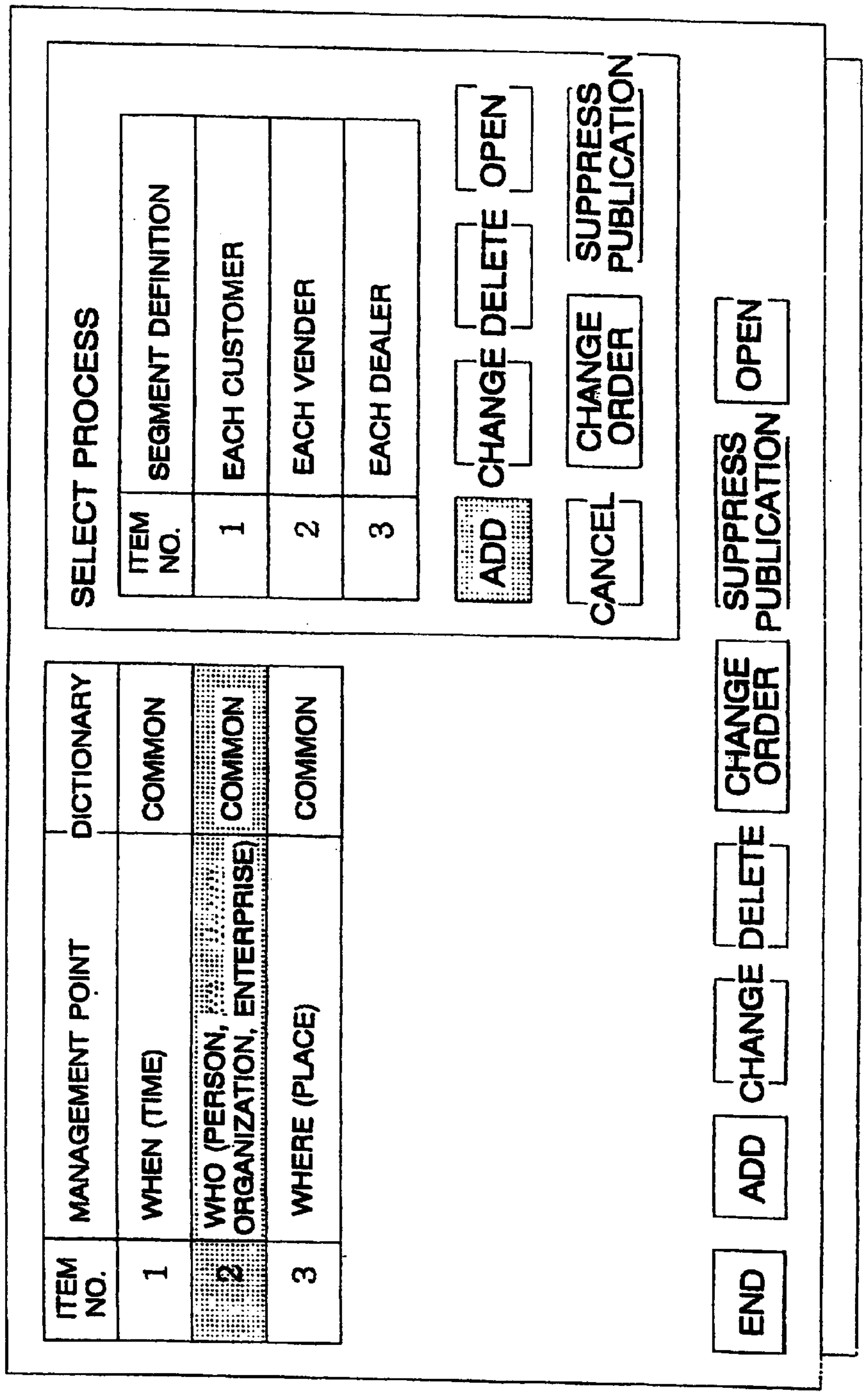
Figure 210:
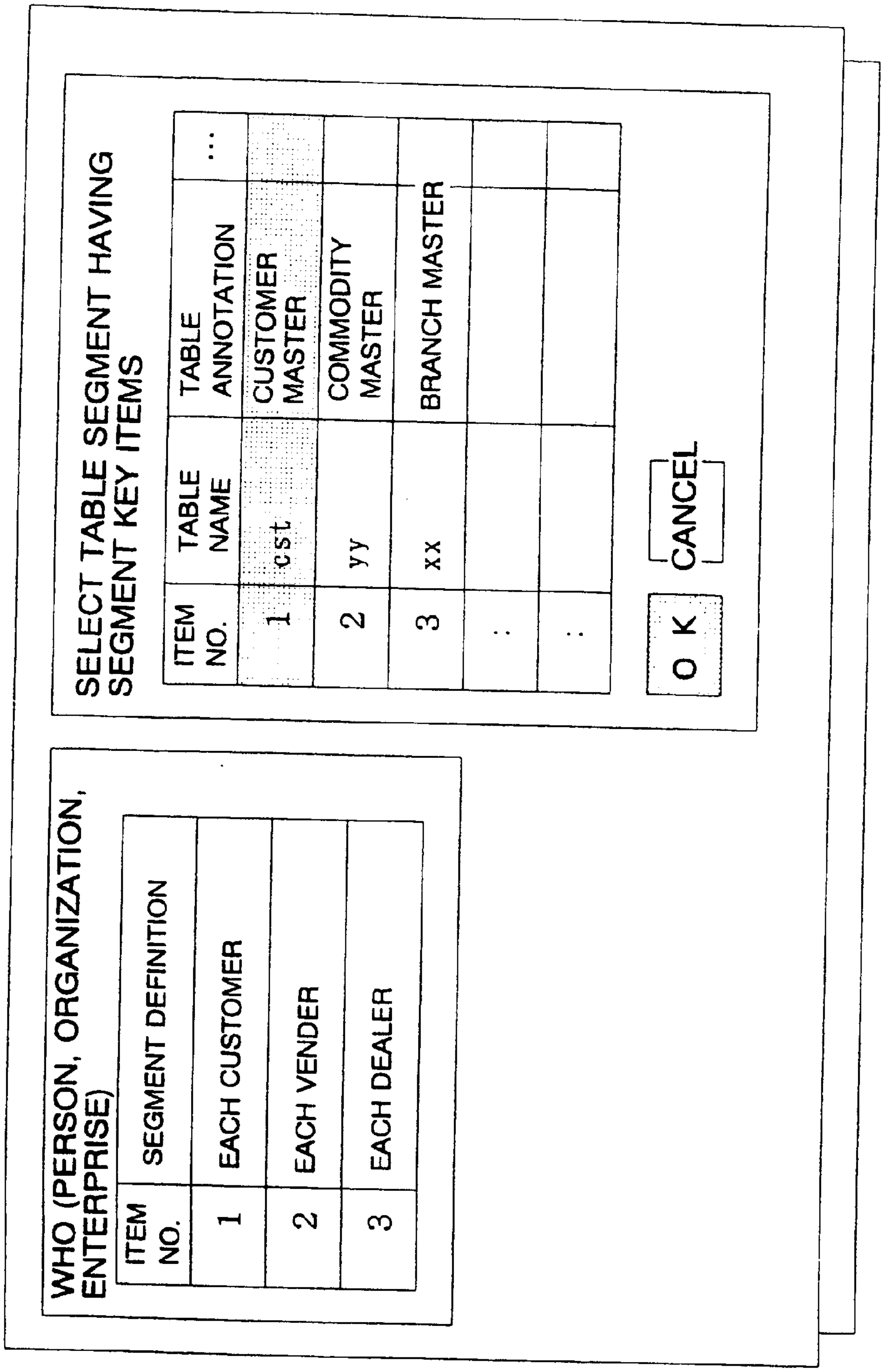
Figure 211:
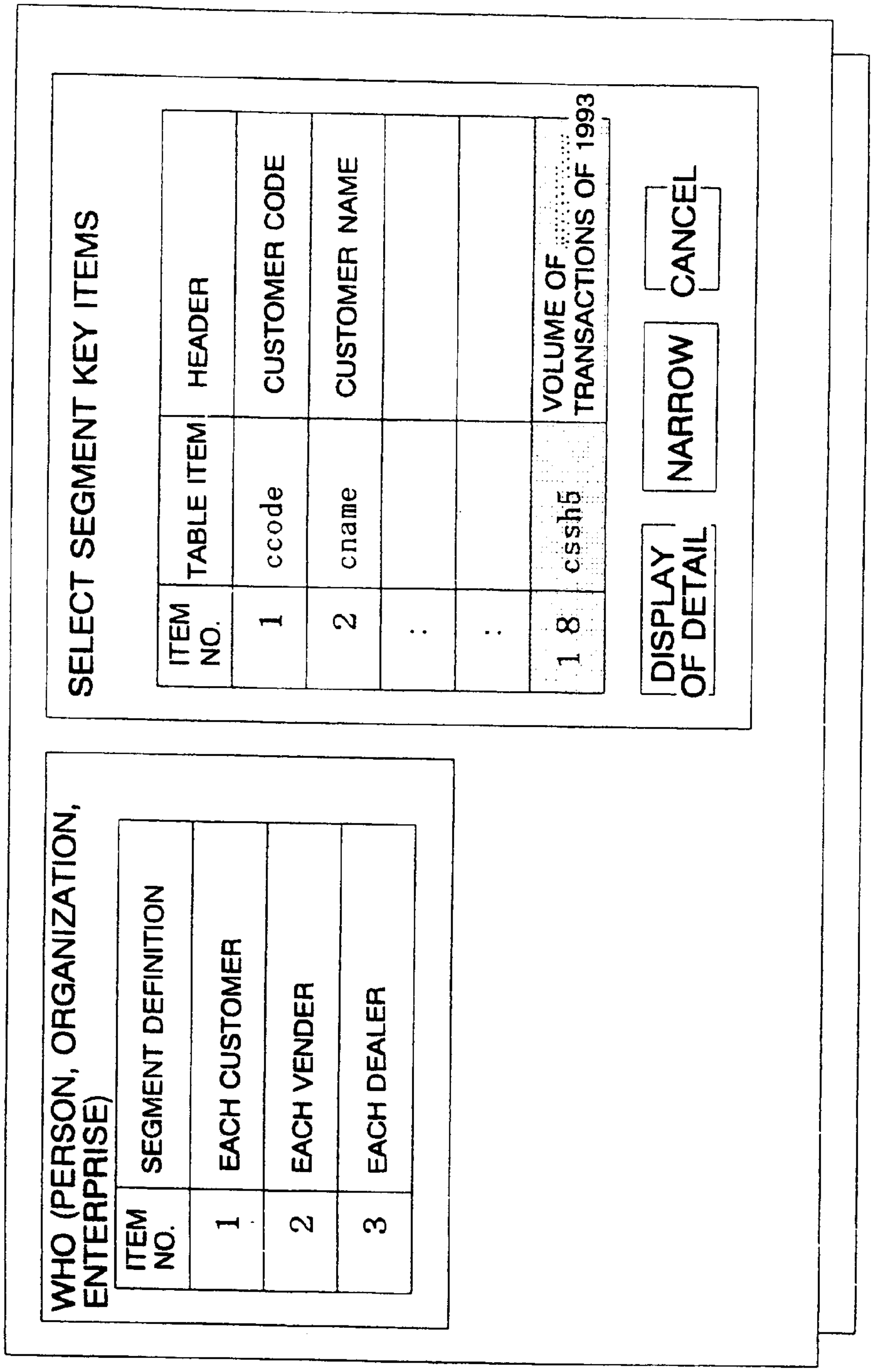
Figure 212:
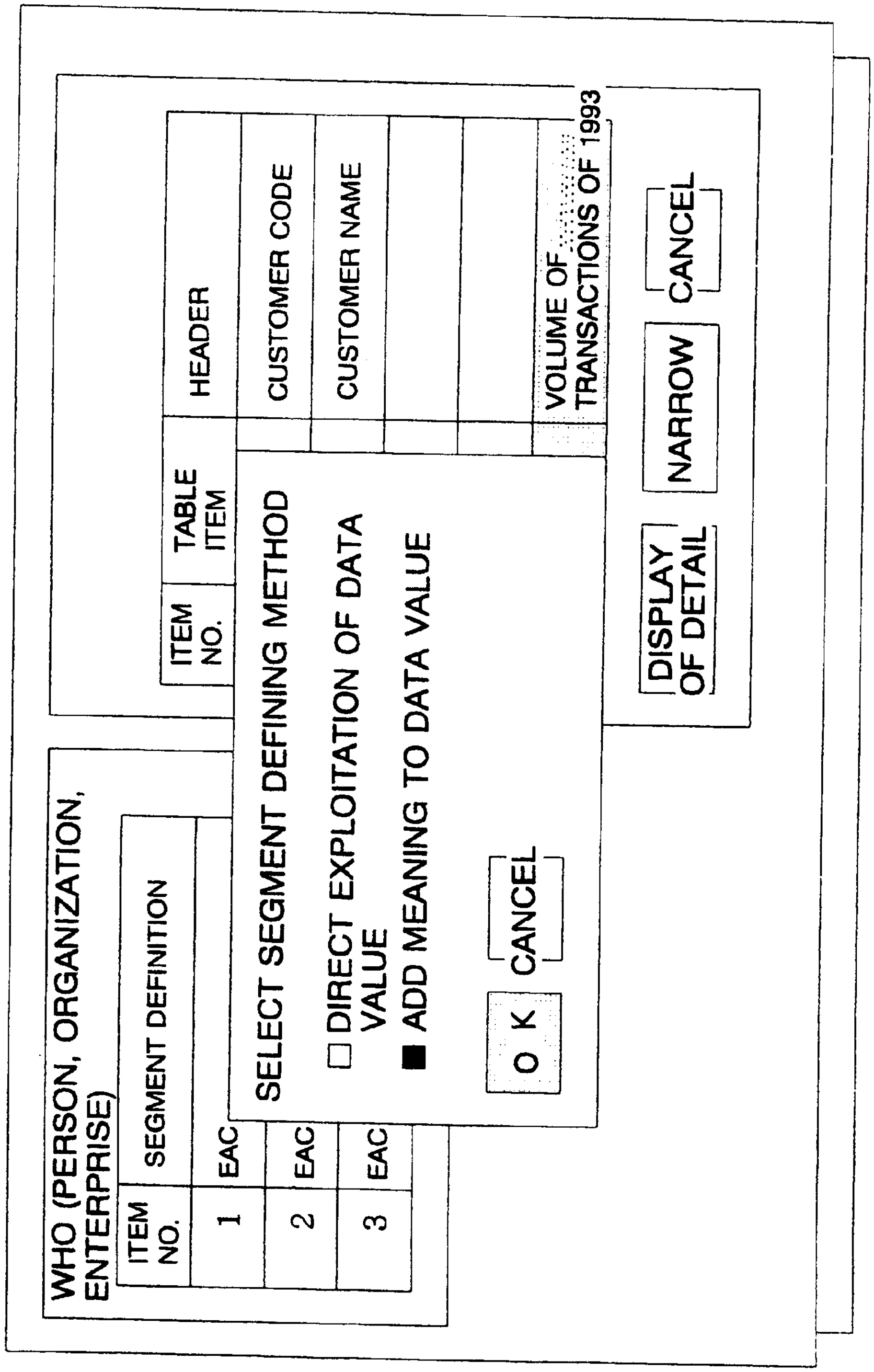
Figure 213:
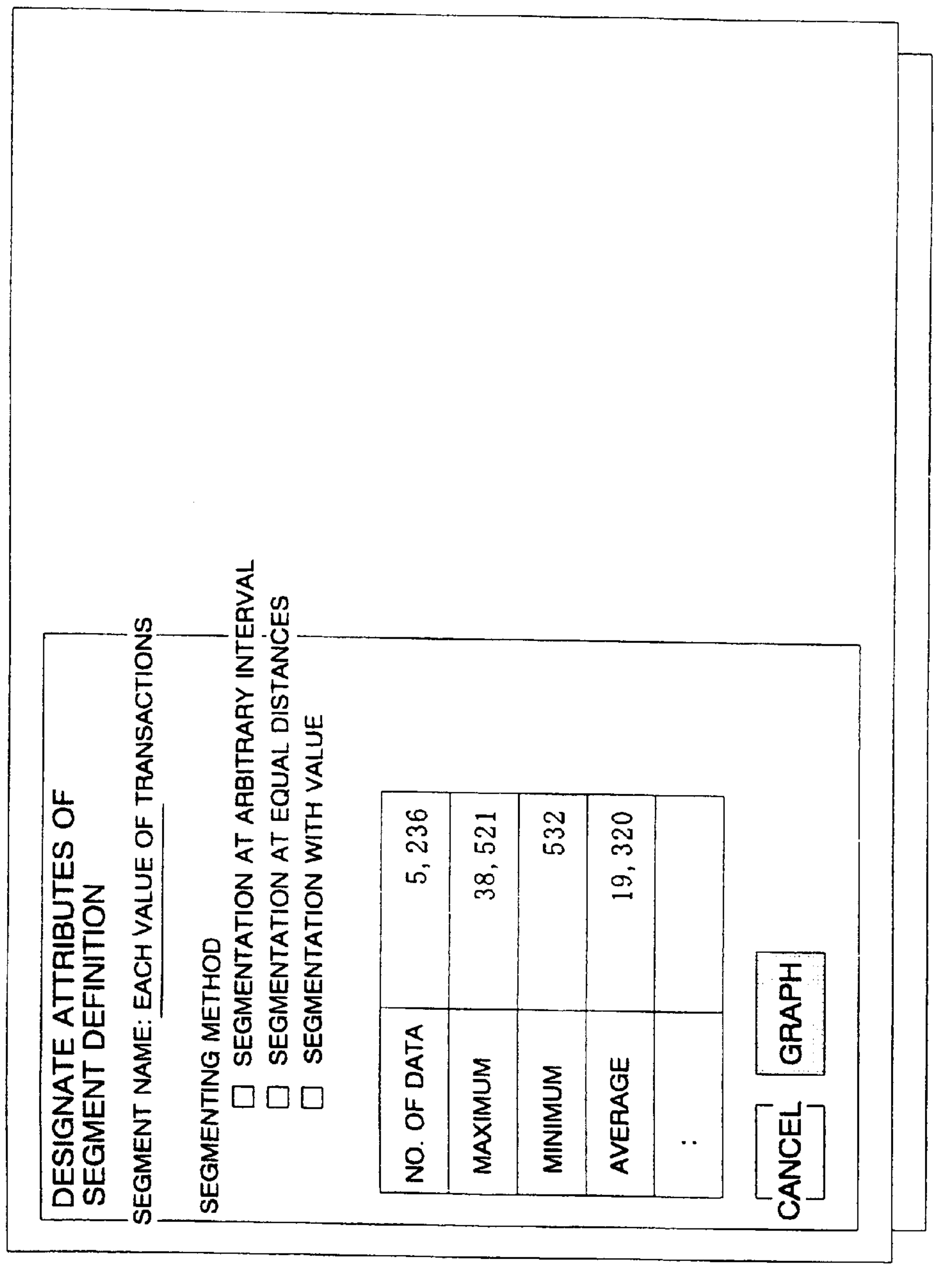
Figure 214:
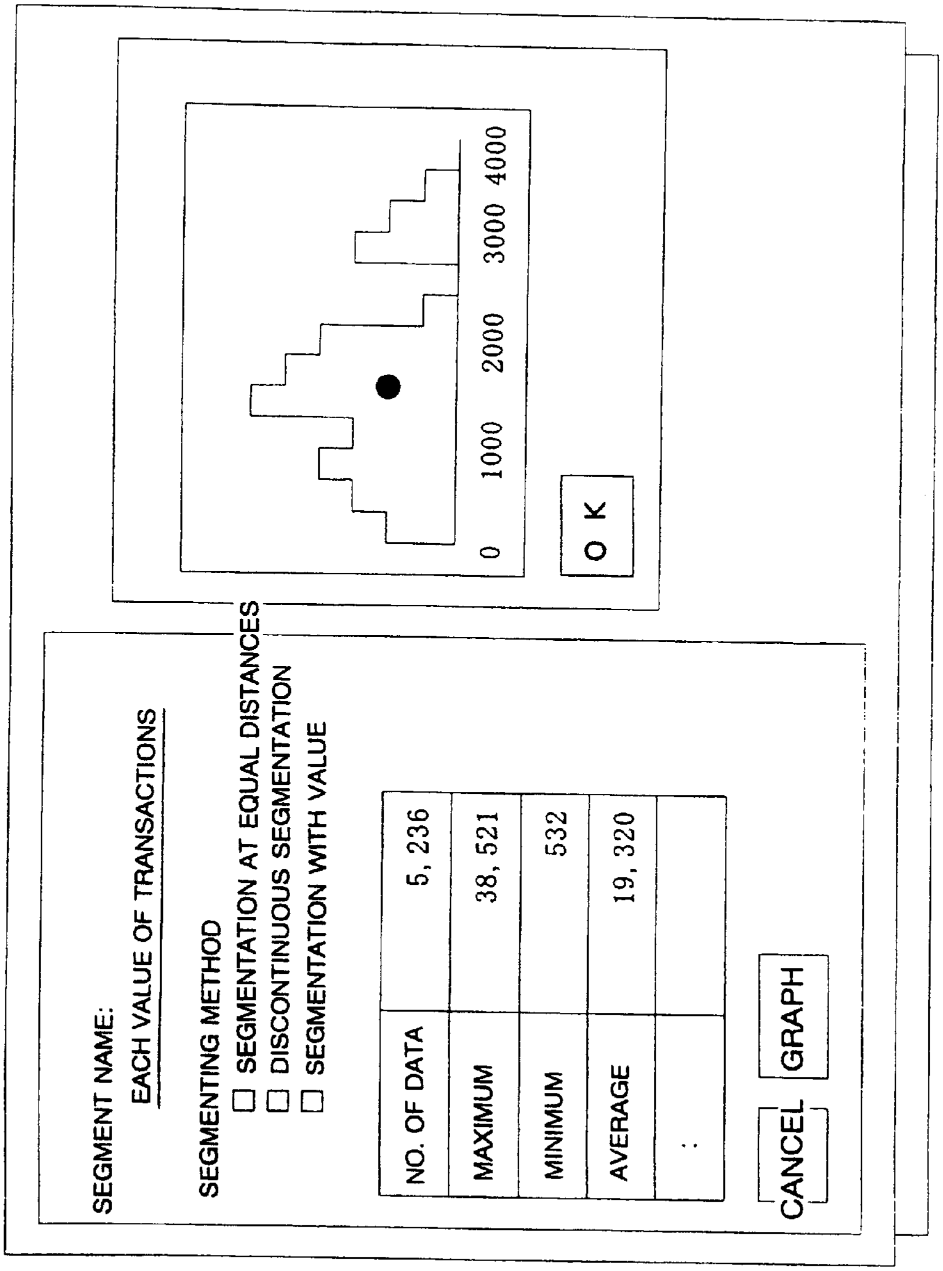
Figure 215:
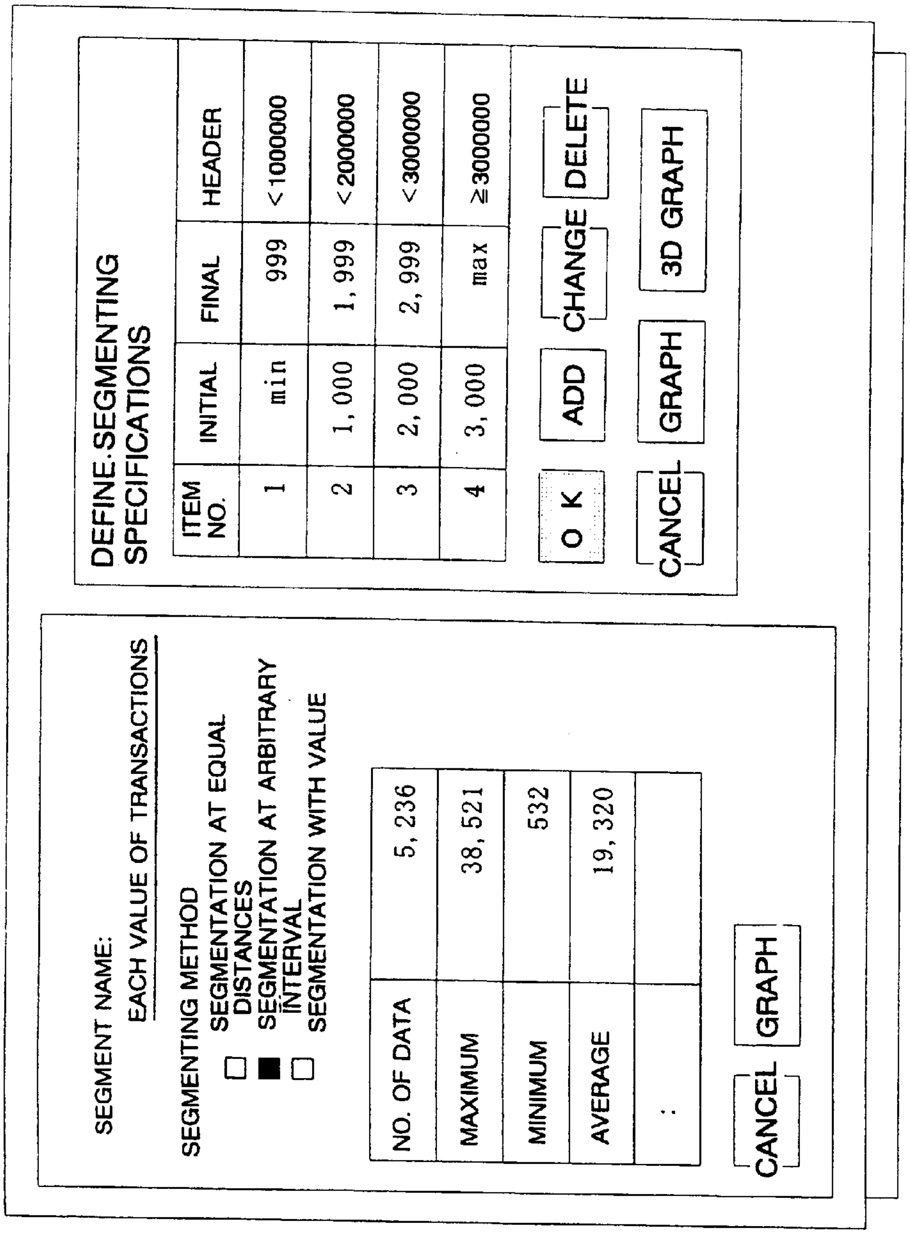
Figure 217:
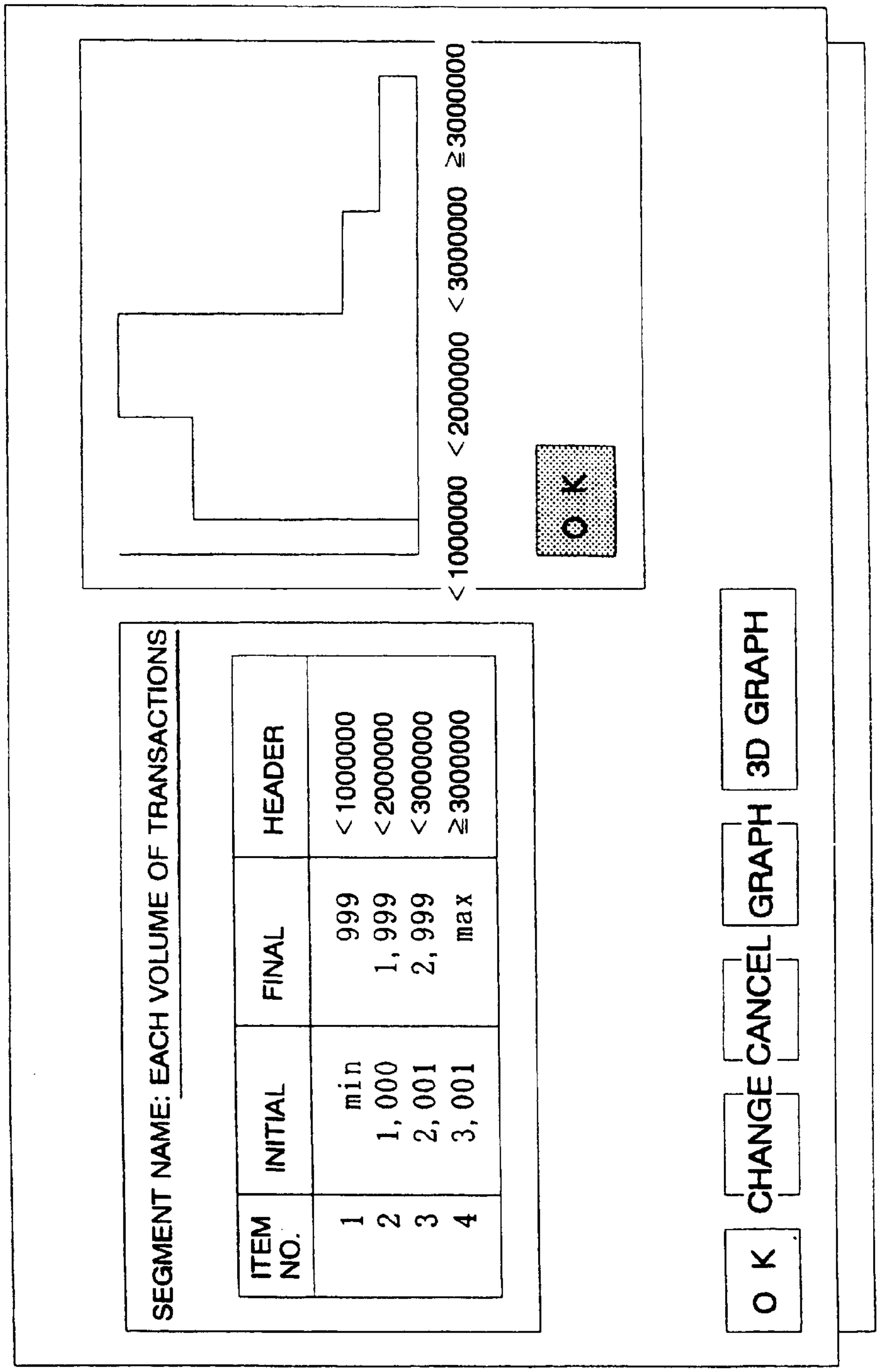
Figure 219:
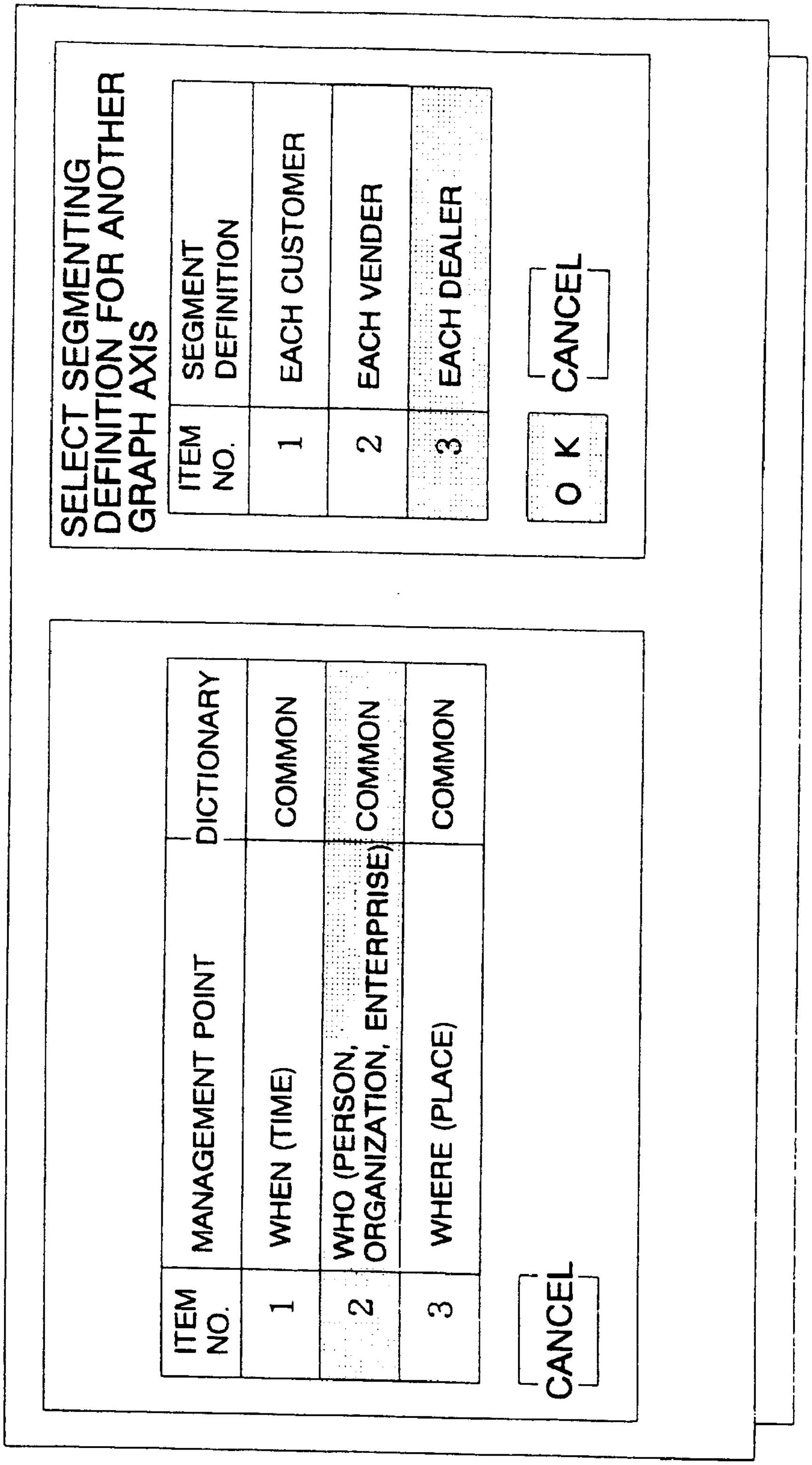
Figure 220:
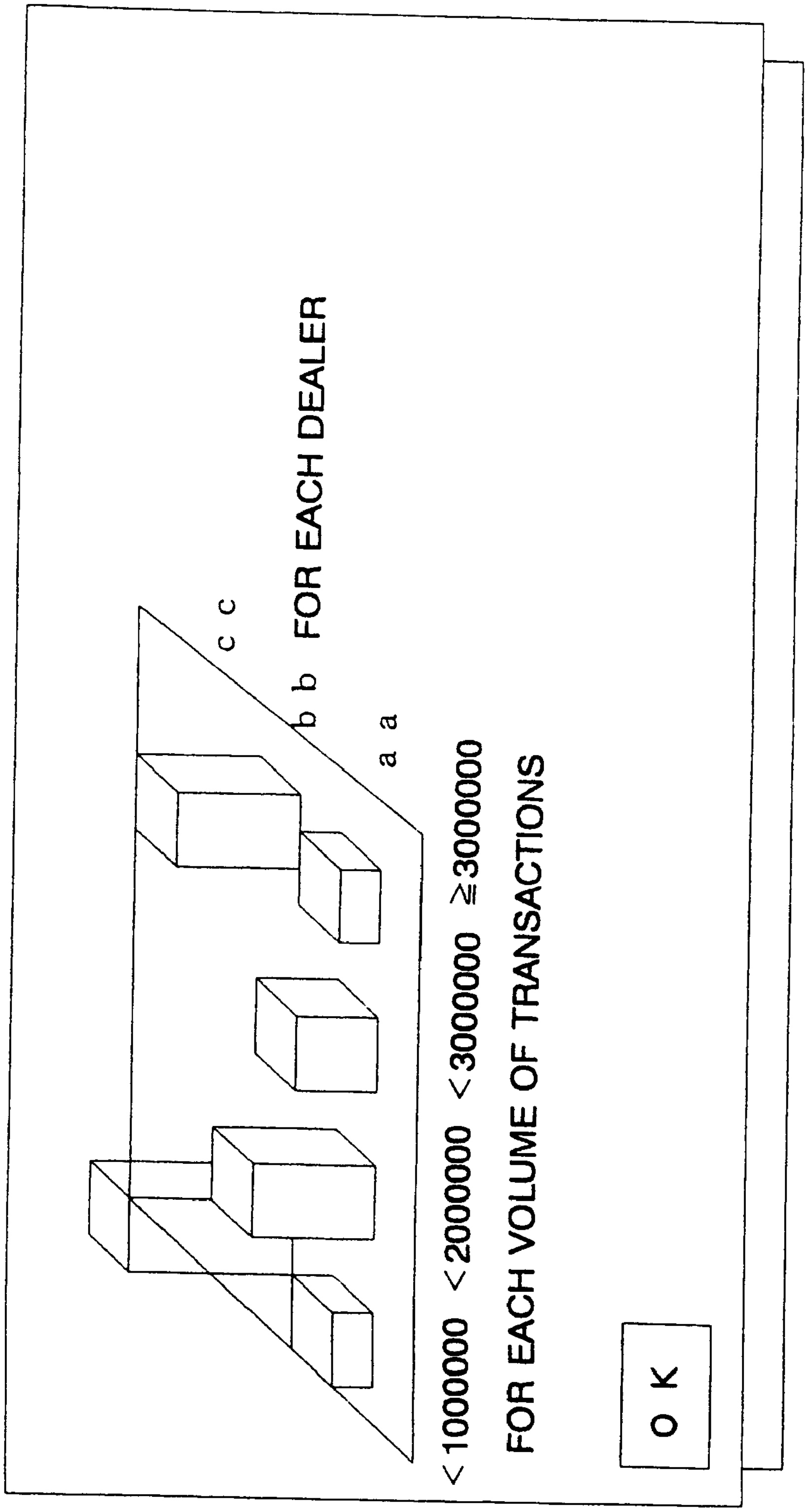
Figure 221:
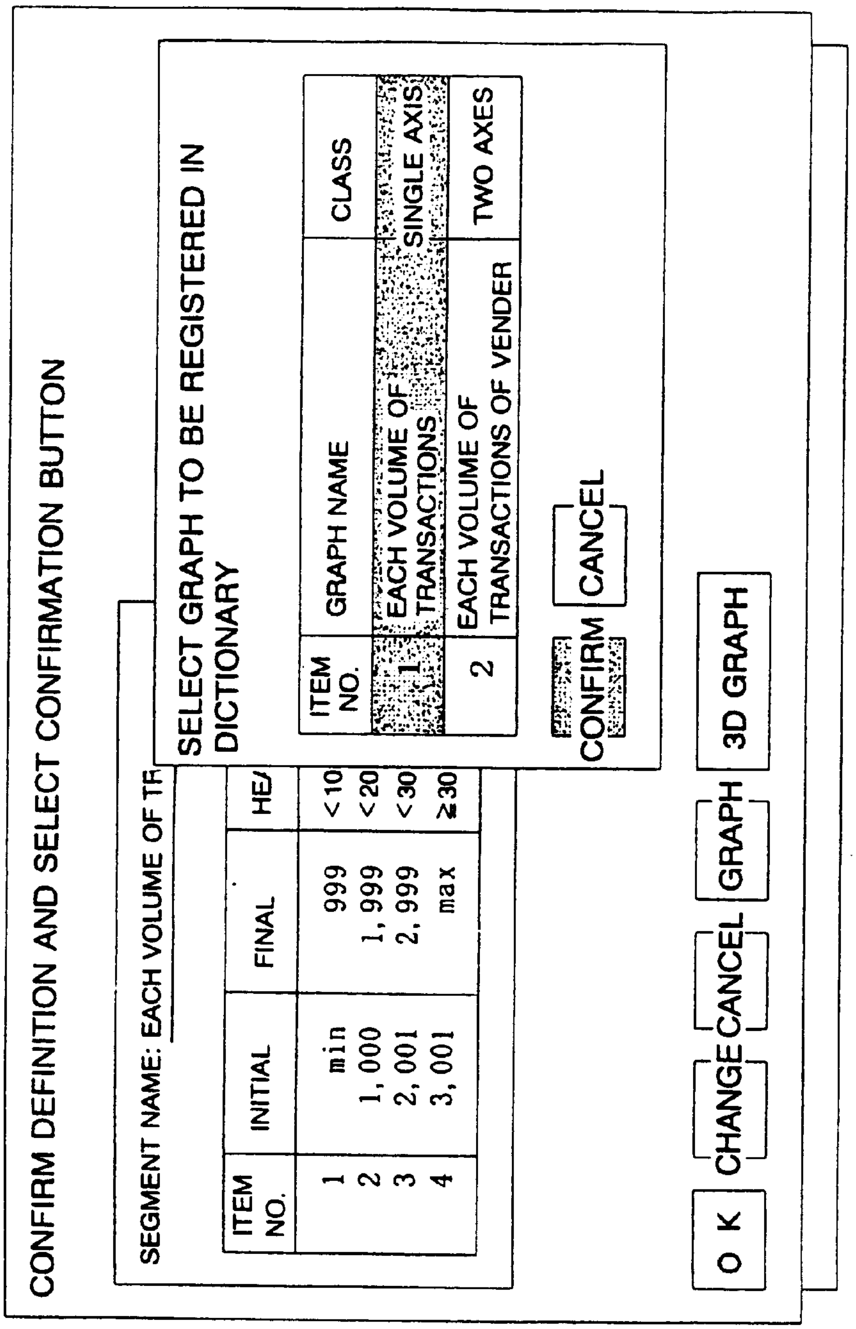
Figures 223, 224:
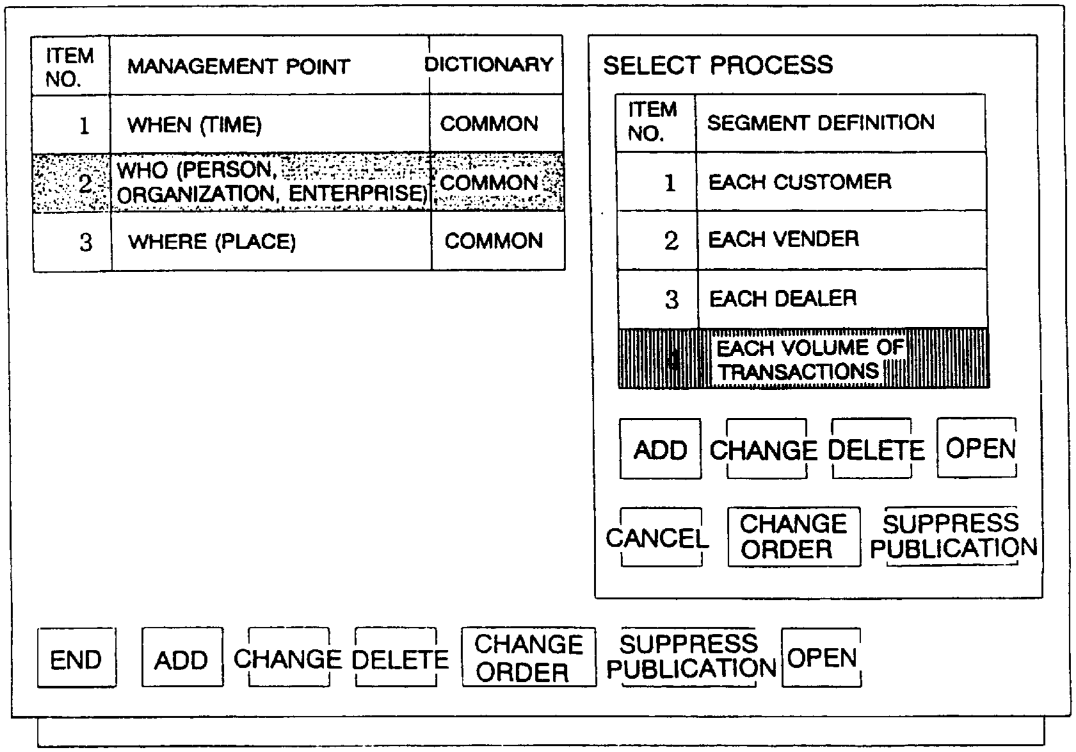
Figure 228:
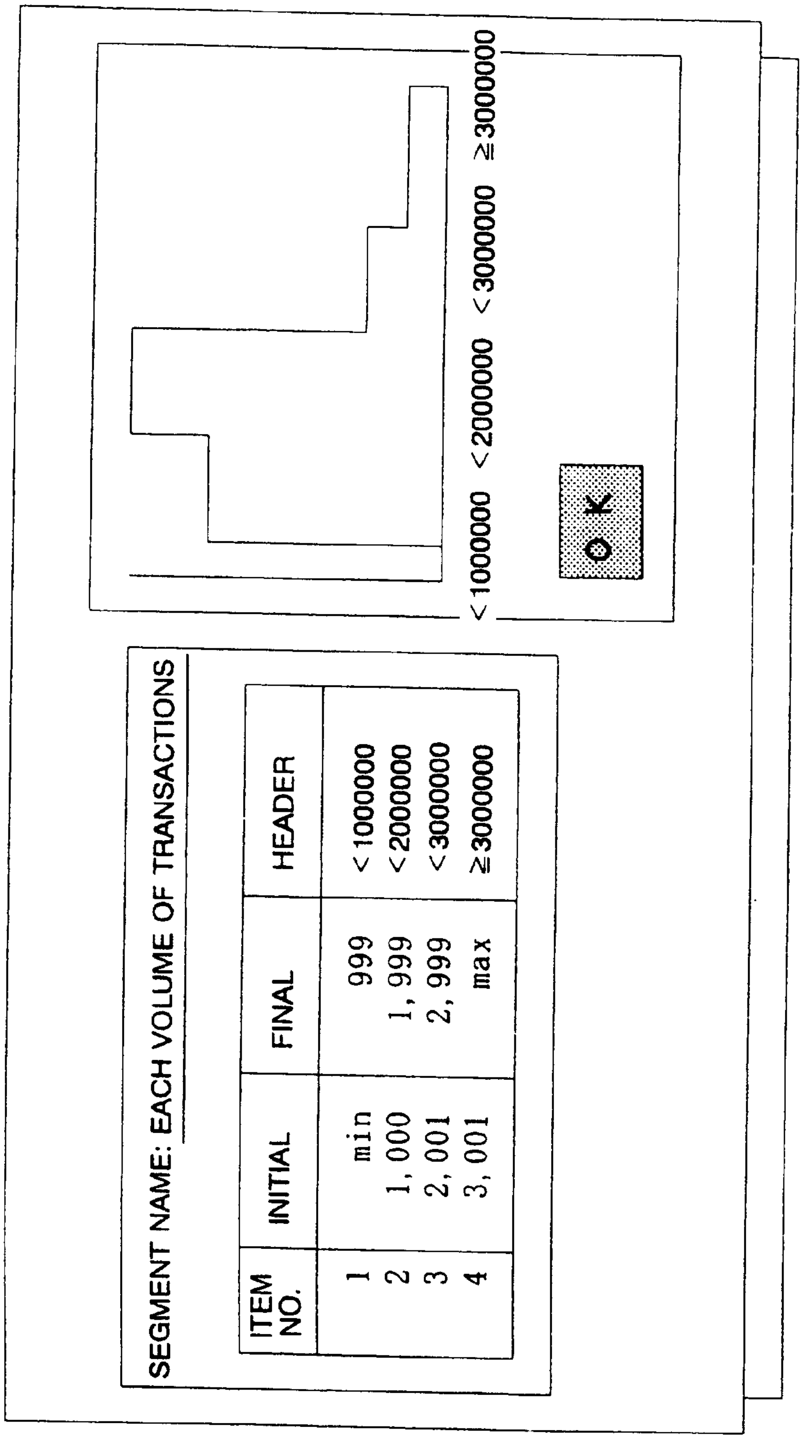
Figure 229:
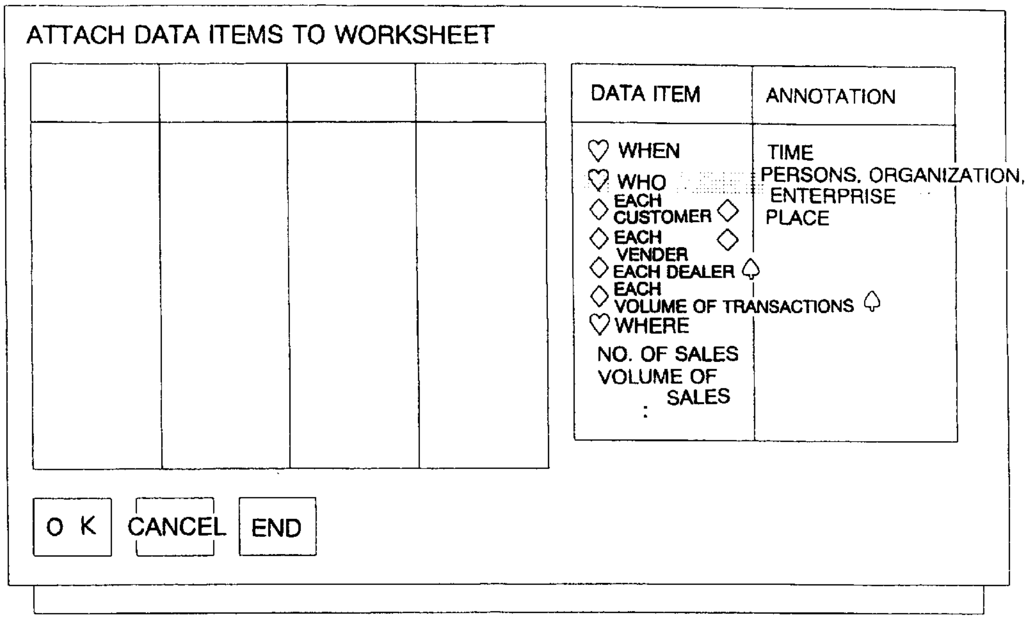
Figure 230:
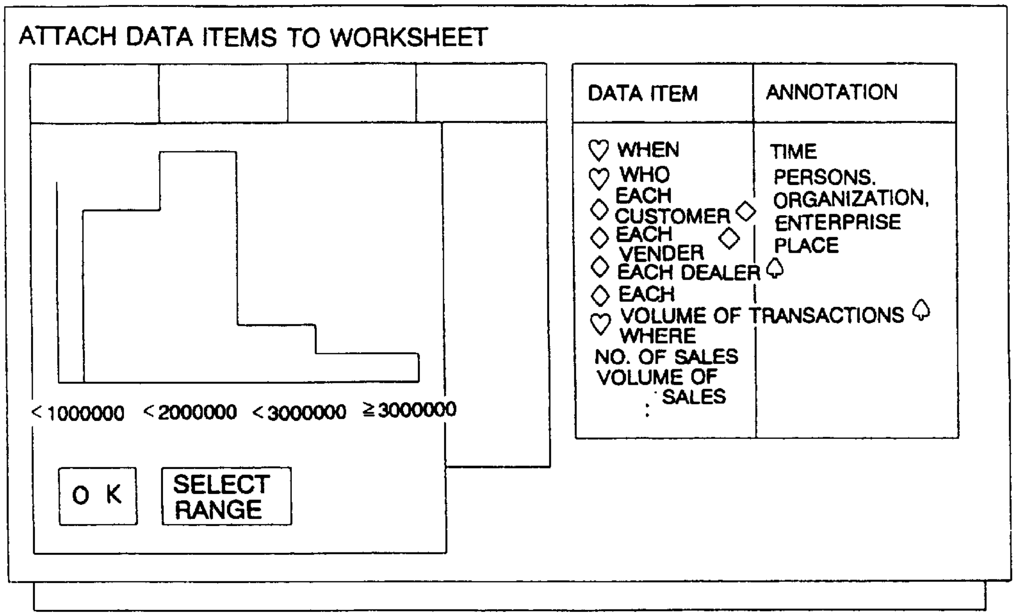
Figure 231:
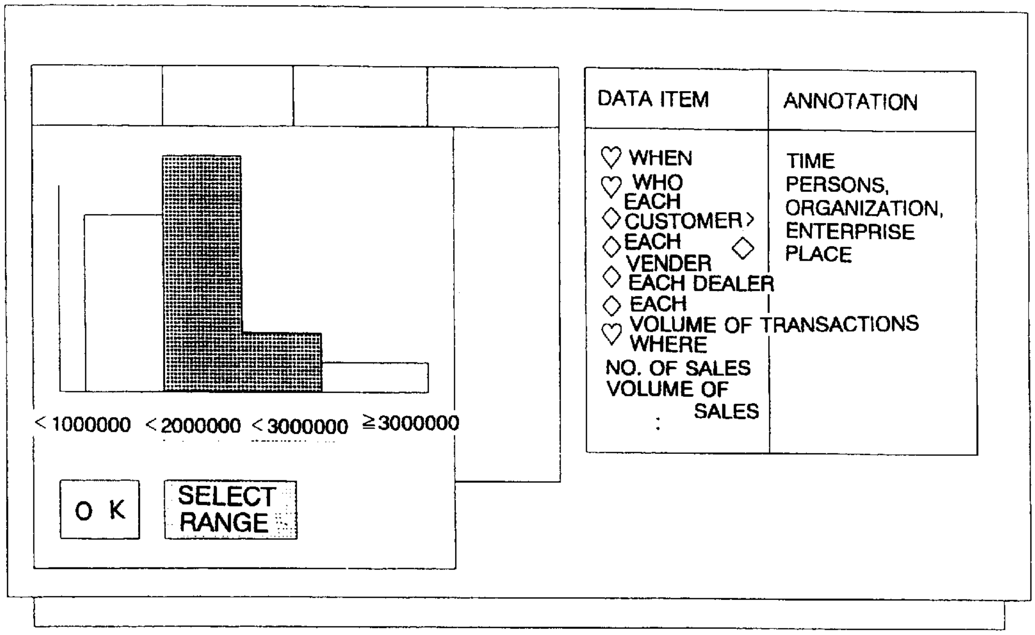
Figure 232:
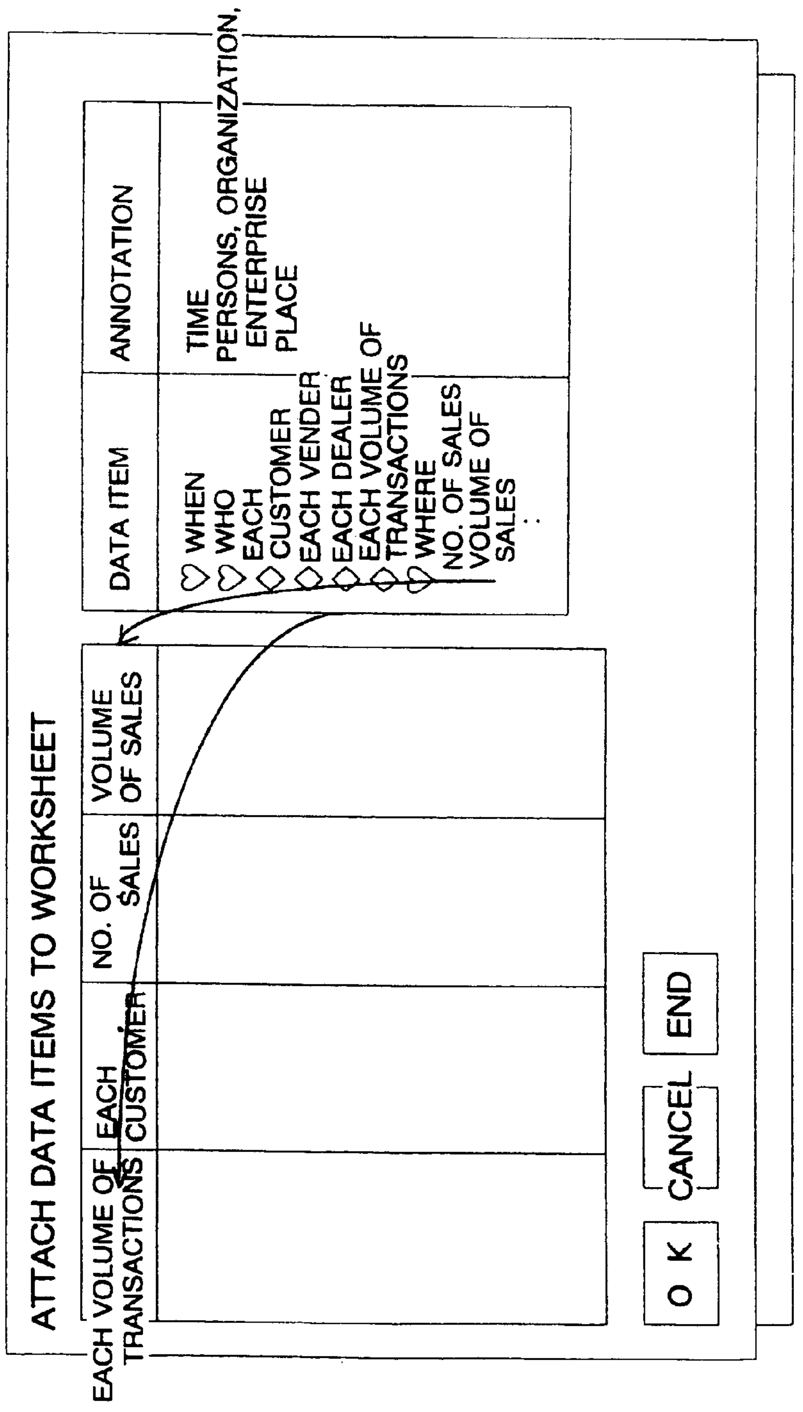
Figure 234:
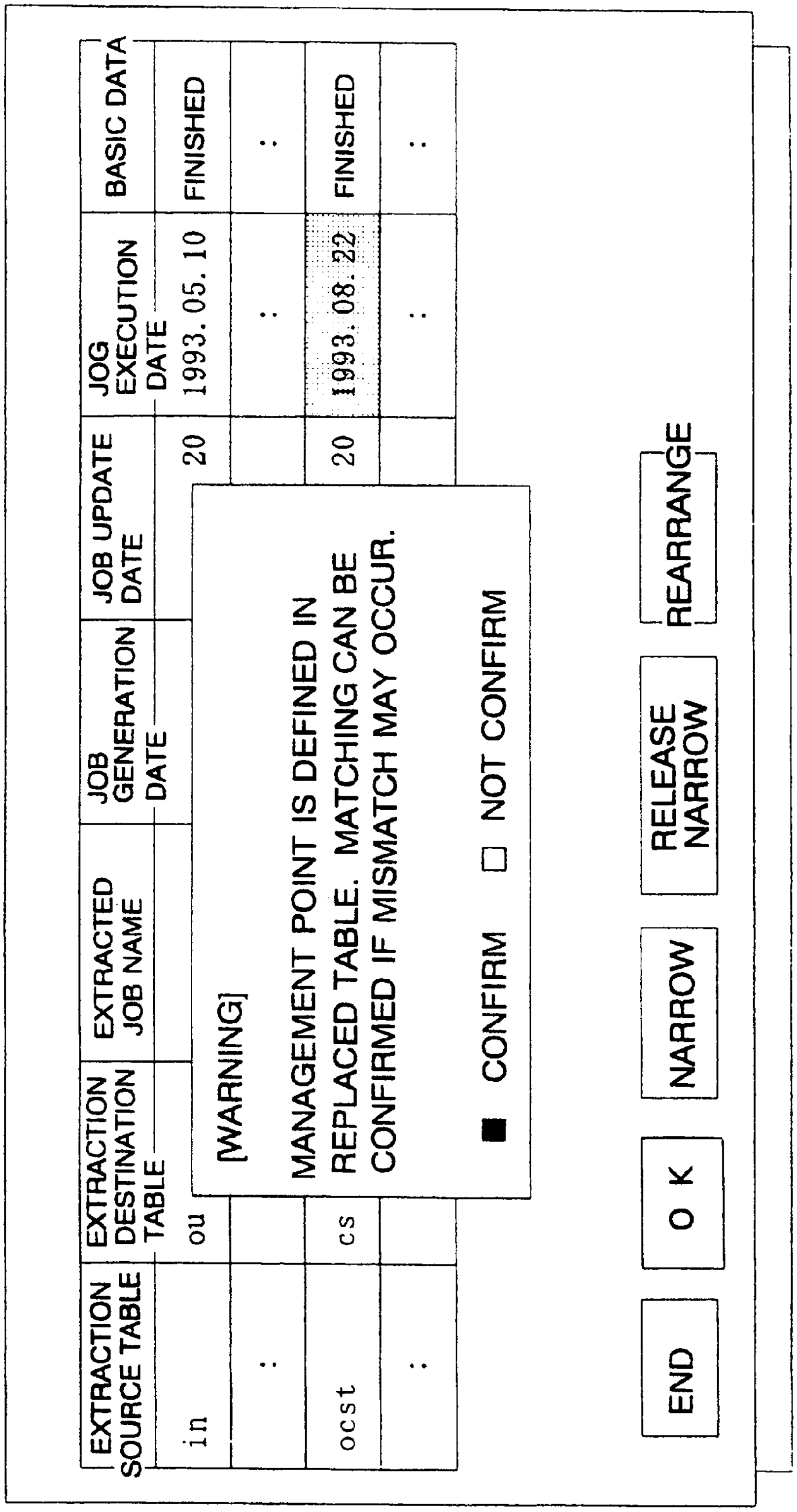
Figure 237:
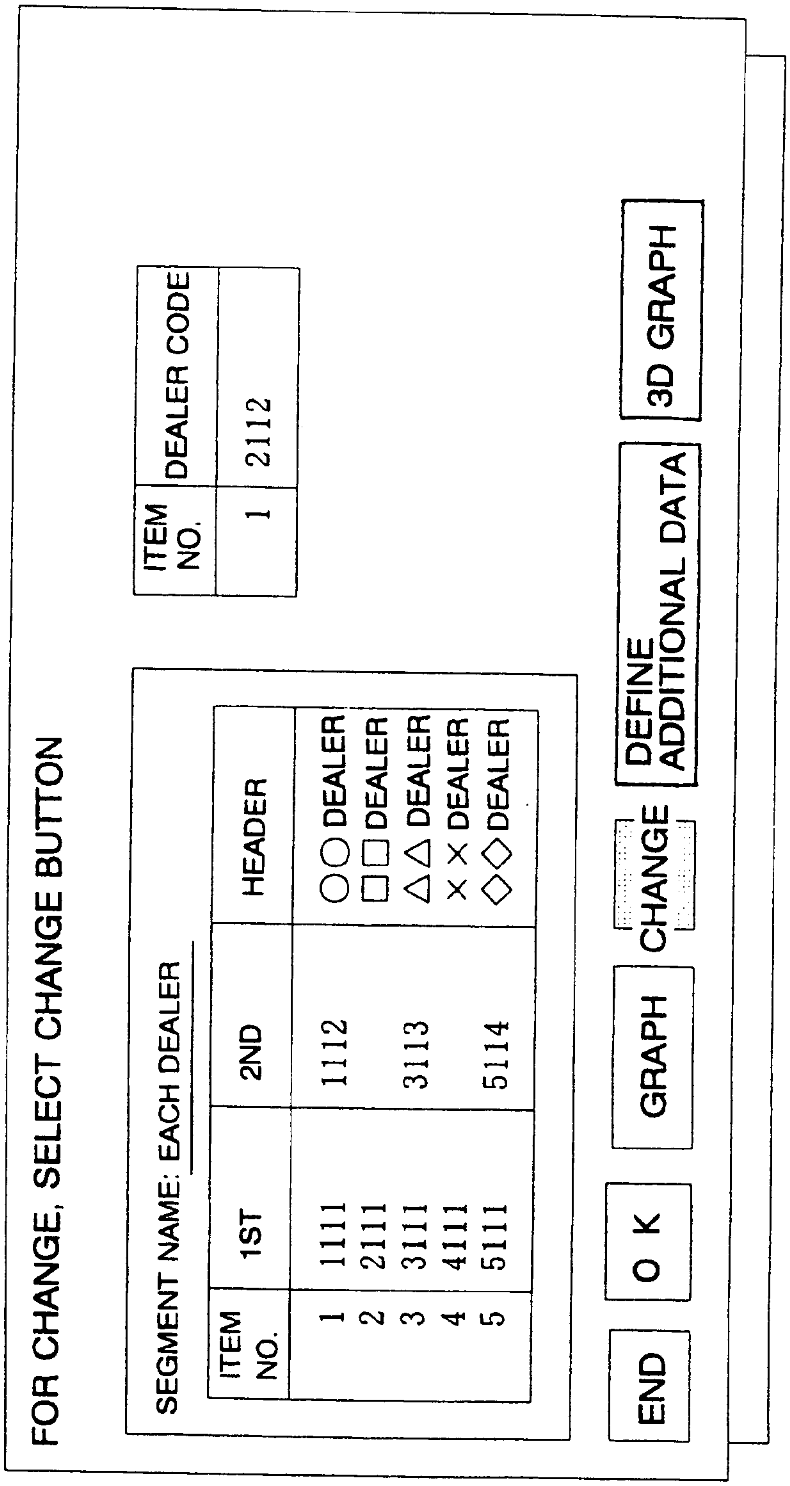
Figure 238:
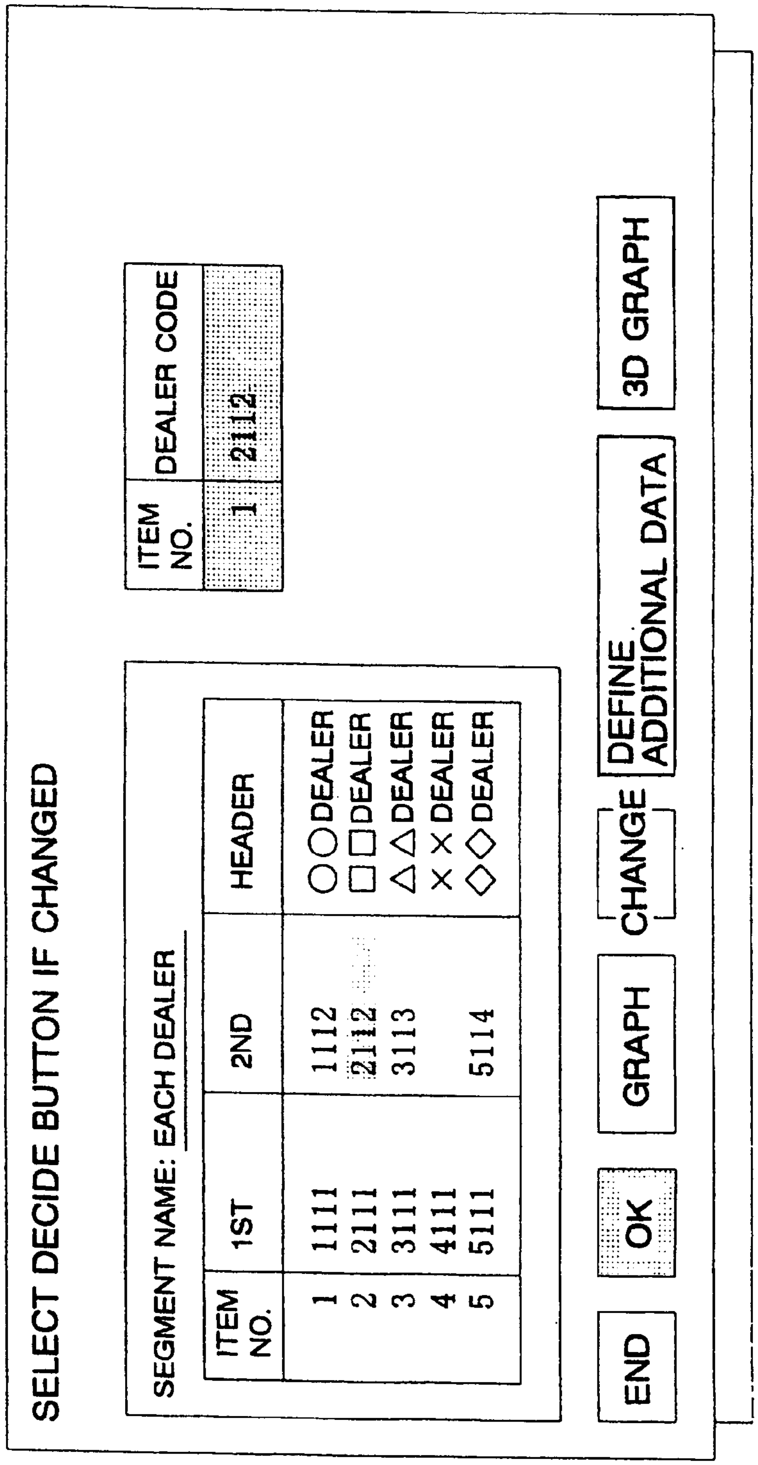
Figure 241:
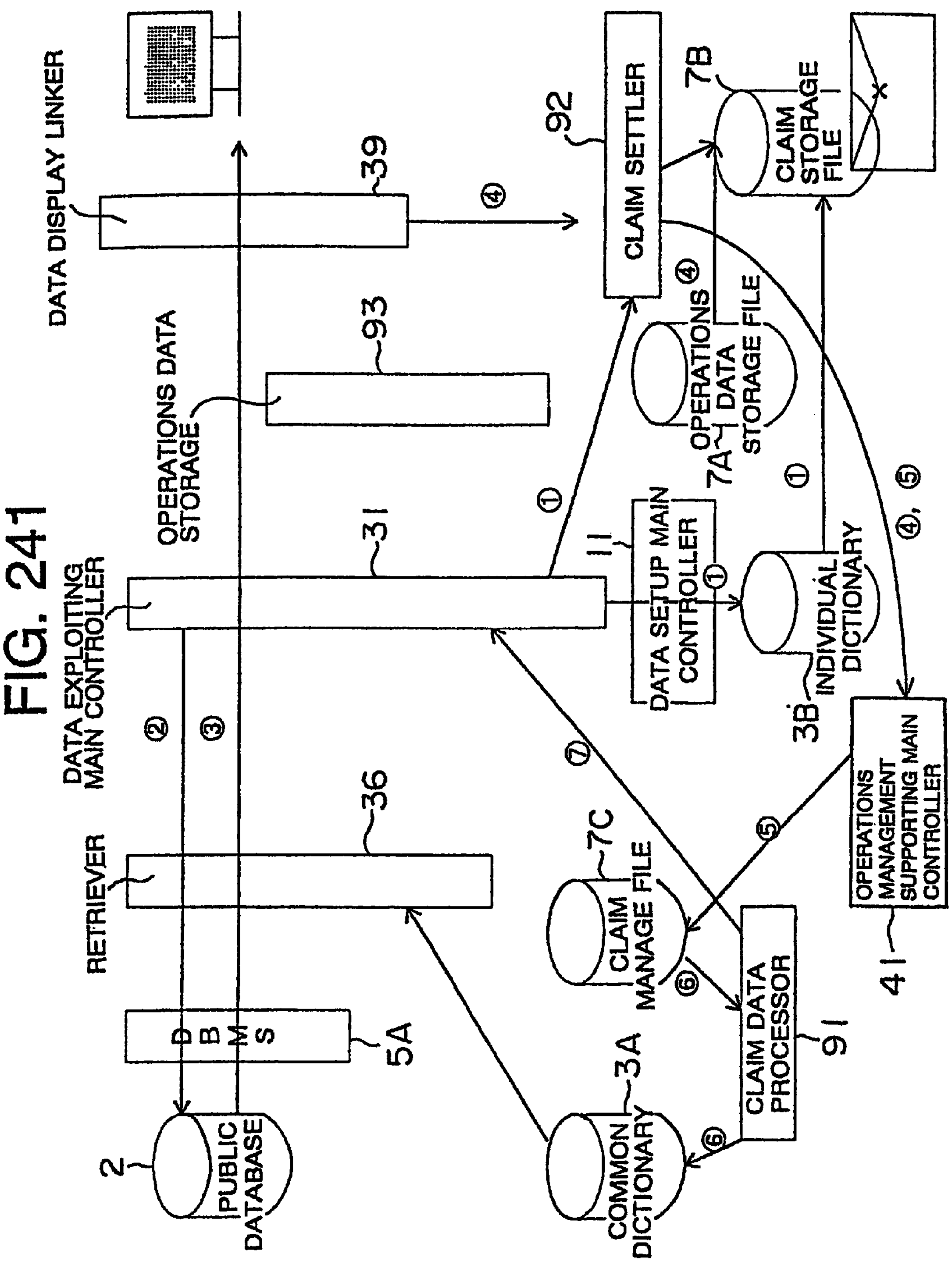
Figure 244:
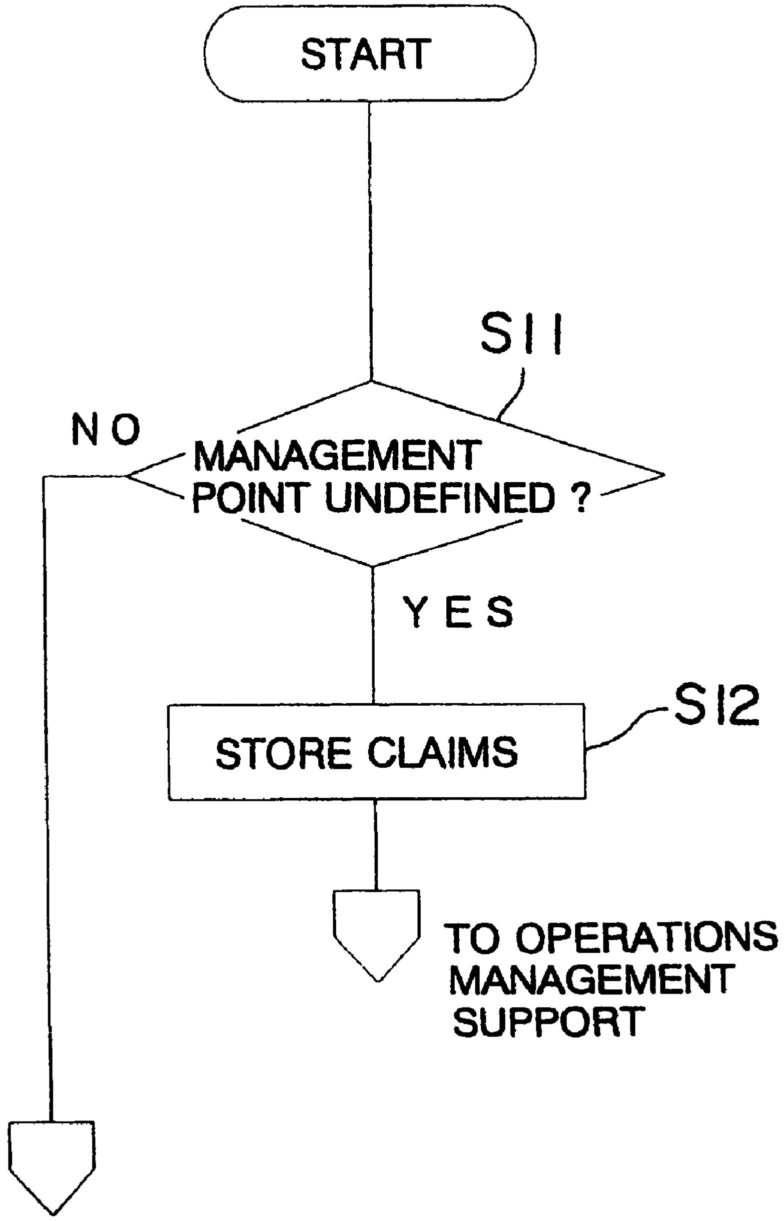
Figure 245:
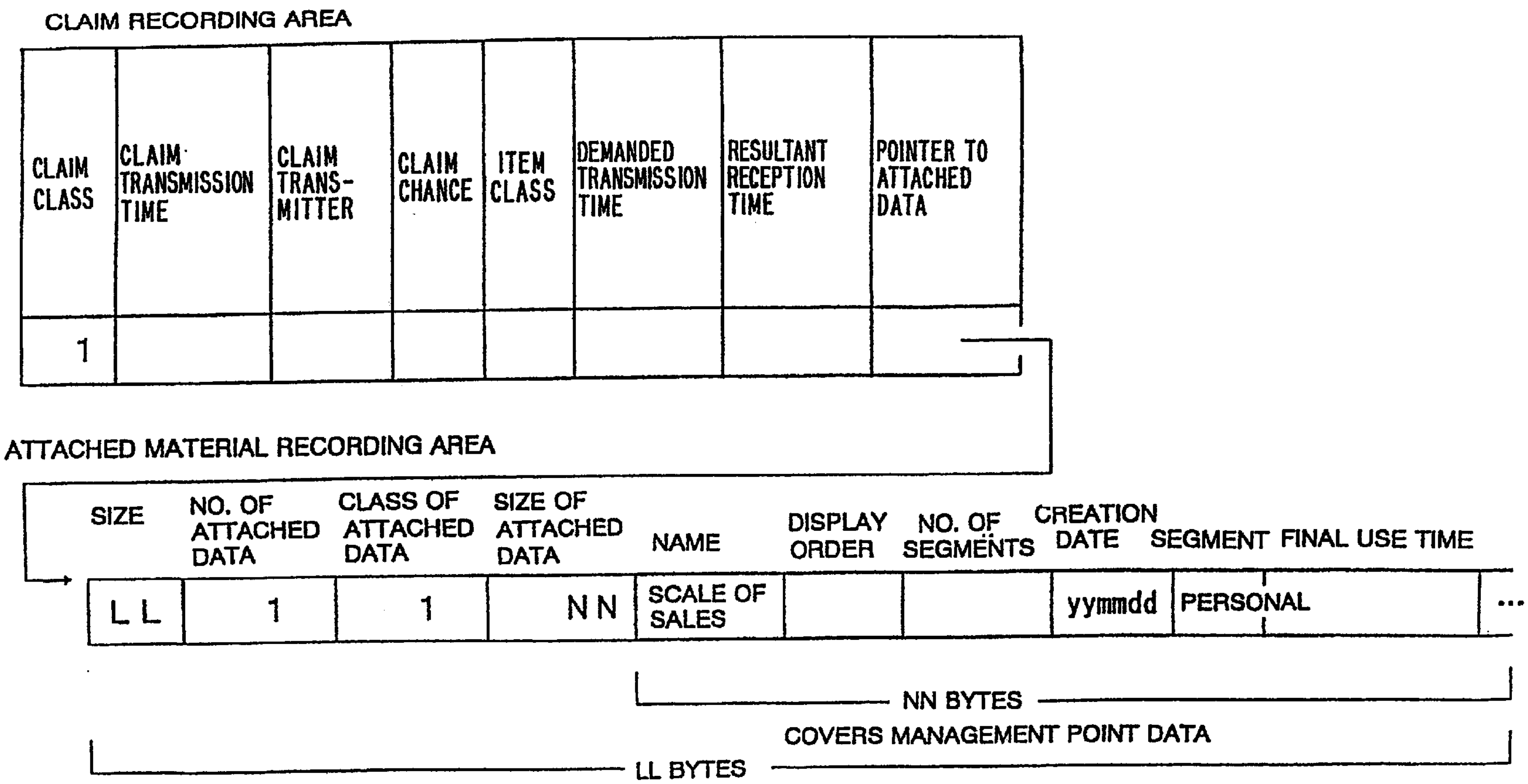
Figure 246:
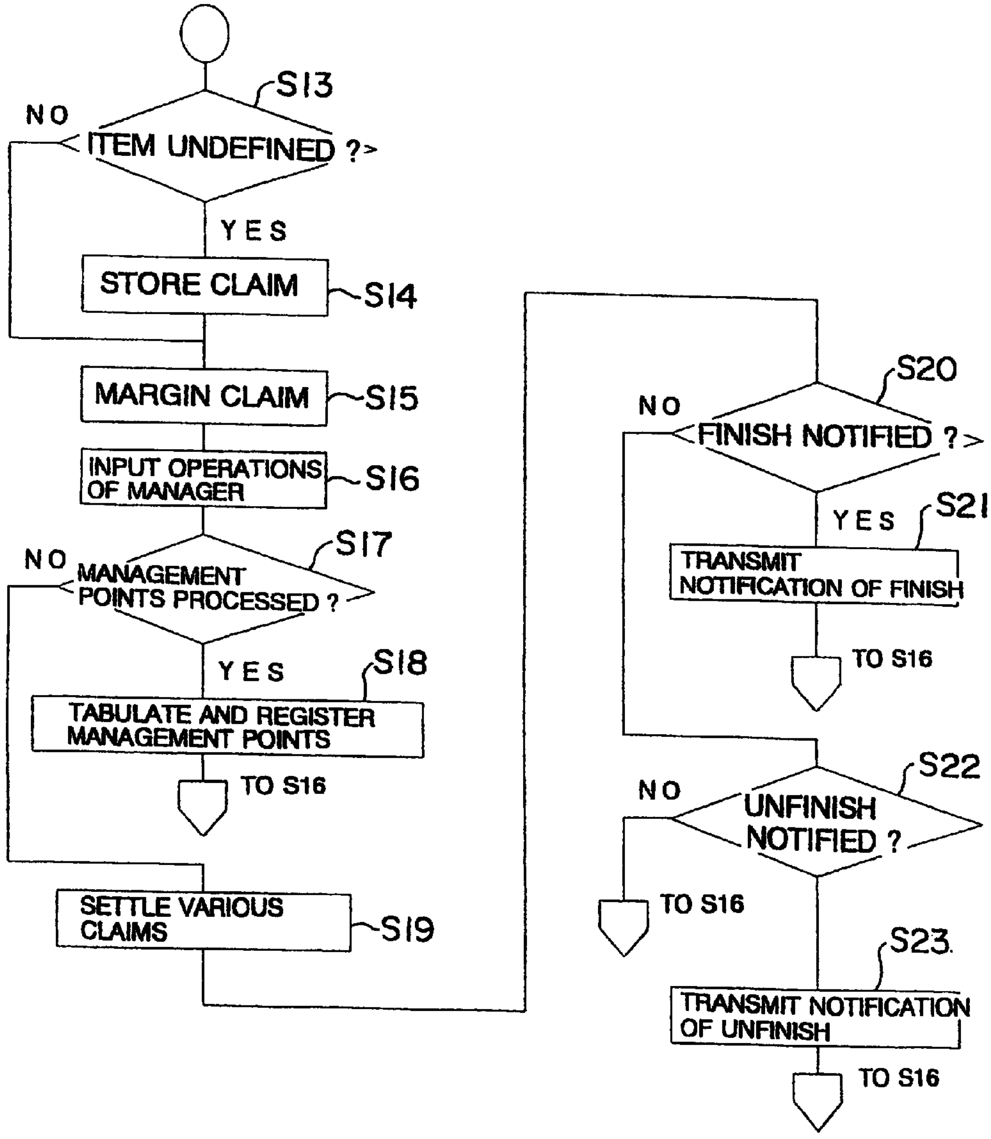
Figure 247:
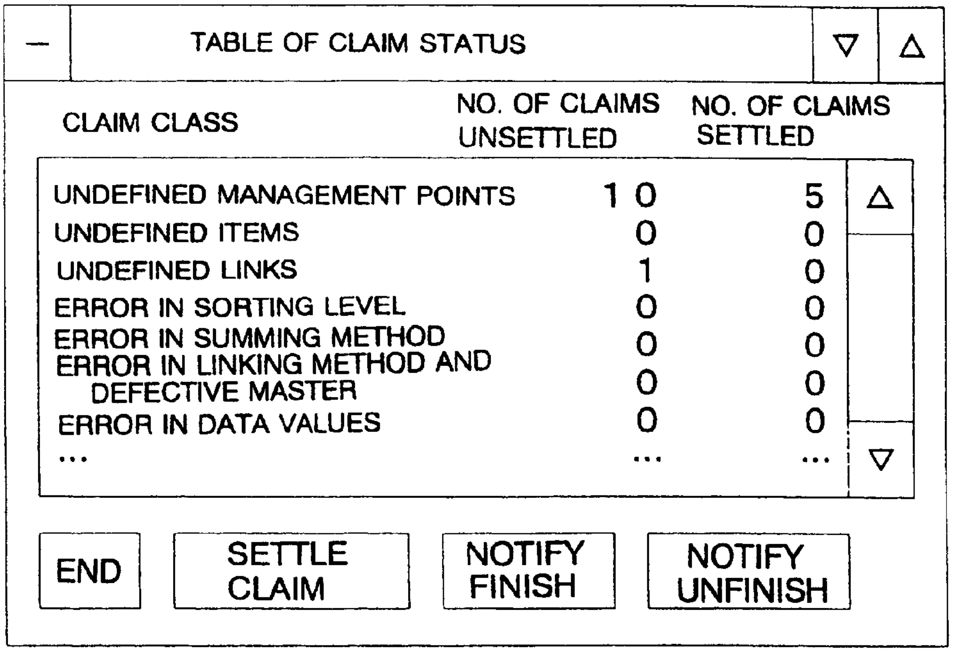
Figure 248:
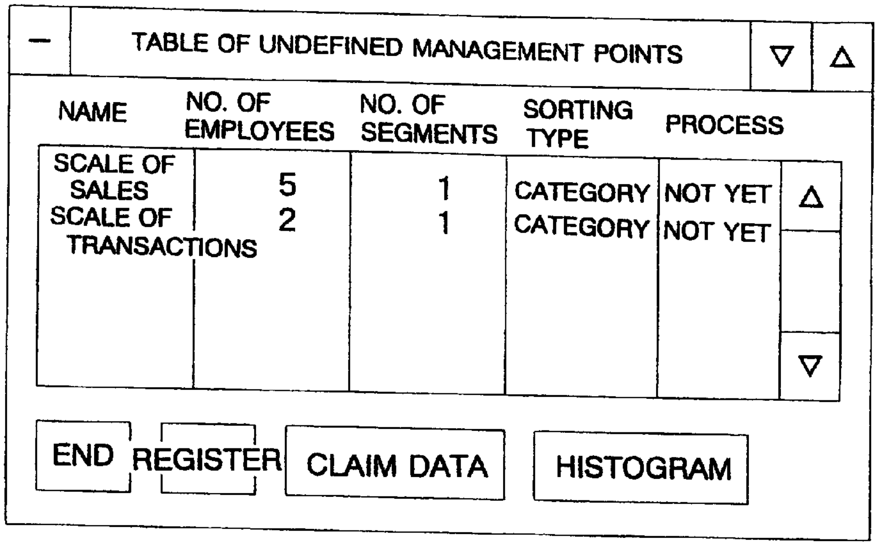

FIG. 131 is a schematic diagram for explaining the time series data storing method of the database system of FIGS. 101 to 103;

FIG. 132 is a schematic diagram for explaining the time series data storing method of the database system of FIGS. 101 to 103;

FIG. 133 is a schematic diagram for explaining the time series data storing method of the database system of FIGS. 101 to 103;

FIG. 134 is a schematic diagram for explaining the time series data storing method of the database system of FIGS. 101 to 103;

FIG. 135 is a schematic diagram for explaining the time series data storing method of the database system of FIGS. 101 to 103;

FIG. 136 is a schematic diagram for explaining an edition for the time series data of the database system of FIGS. 101 to 103;

FIG. 137 is a block diagram showing the functional construction of a setup unit of a database system according to a third embodiment of the present invention;

FIG. 138 is a block diagram showing the functional construction of an operations support unit of a database system according to a third embodiment of the present invention;

FIG. 139 is a schematic diagram for explaining an extracted job data recording area of the database system of FIGS. 137 and 138;

FIG. 140 is a diagram showing an extracted job selecting screen for explaining the database system of FIGS. 137 and 138;

FIG. 141 is a diagram showing the display screen of an extracted job attribute defining worksheet for explaining the database system of FIGS. 137 and 138;

FIG. 142 is a diagram showing an extracted table selecting screen for explaining the database system of FIGS. 137 and 138;

FIG. 143 is a diagram showing a data item selecting screen for explaining the database system of FIGS. 137 and 138;

FIG. 144 is a schematic diagram for explaining an extracted job recording area of the database system of FIGS. 137 and 138;

FIG. 145 is a diagram showing a display screen of an extraction condition table for explaining the database system of FIGS. 137 and 138;

FIG. 146 is a diagram showing the display screen of an extraction condition setting worksheet for explaining the database system of FIGS. 137 and 138;

FIG. 147 is a diagram showing a display screen of the extraction condition table for explaining the database system of FIGS. 137 and 138;

FIG. 148 is a schematic diagram for explaining the extracted job recording area of the database system of FIGS. 137 and 138;

FIG. 149 is a schematic diagram for explaining the extracted job data recording area and the extracted job recording area of the database system of FIGS. 137 and 138;

FIG. 150 is a diagram showing an extracted job selecting screen for explaining the database system of FIGS. 137 and 138;

FIG. 151 is a diagram showing a preceding extracted job selecting screen for explaining the database system of FIGS. 137 and 138;

FIG. 152 is a diagram showing an extracted job order defining screen for explaining the database system of FIGS. 137 and 138;

FIG. 153 is a diagram showing the extracted job order defining screen for explaining the database system of FIGS. 137 and 138;

FIG. 154 is a diagram showing the extracted job order defining screen for explaining the database system of FIGS. 137 and 138;

FIG. 155 is a schematic diagram for explaining the extracted job data recording area of the database system of FIGS. 137 and 138;

FIG. 156 is a diagram showing an extracted job selecting screen for explaining the database system of FIGS. 137 and 138;

FIG. 157 is a diagram showing the extracted job selecting screen for explaining the database system of FIGS. 137 and 138;

FIG. 158 is a diagram showing a succeeding job confirmation screen for explaining the database system of FIGS. 137 and 138;

FIG. 159 is a diagram showing an extracted job execution confirmation screen for explaining the database system of FIGS. 137 and 138;

FIG. 160 is a diagram showing a use limit setting confirmation screen for explaining the database system of FIGS. 137 and 138;

FIG. 161 is a diagram showing a use limit setting confirmation screen for explaining the database system of FIGS. 137 and 138;

FIG. 162 is a schematic diagram for explaining an extracted job data recording area of the database system of FIGS. 137 and 138;

FIG. 163 is a schematic diagram for explaining a table management data recording area of the database system of FIGS. 137 and 138;

FIG. 164 is a diagram showing a display screen of the initial menu of an operations support process for explaining the database system of FIGS. 137 and 138;

FIG. 165 is a schematic diagram for explaining an extraction source table management data recording area of the database system of FIGS. 137 and 138;

FIG. 166 is a diagram showing a table selection screen for explaining the database system of FIGS. 137 and 138;

FIG. 167 is a schematic diagram for explaining an extracted job data recording area of the database system of FIGS. 137 and 138;

FIG. 168 is a schematic diagram for explaining the table management data recording area of the database system of FIGS. 137 and 138;

FIG. 169 is a diagram showing an edition number matching confirmation screen for explaining the database system of FIGS. 137 and 138;

FIG. 170 is a diagram showing the edition number matching confirmation screen for explaining the database system of FIGS. 137 and 138;

FIG. 171 is a schematic diagram for explaining the table management data recording area of the database system of FIGS. 137 and 138;

FIG. 172 is a schematic diagram for explaining the extracted job recording area of the database system of FIGS. 137 and 138;

FIG. 173 is a schematic diagram for explaining the table management data recording area of the database system of FIGS. 137 and 138;

FIG. 174 is a diagram showing the table segment selecting screen for explaining the database system of FIGS. 137 and 138;

FIG. 175 is a diagram showing a table selecting screen for explaining the database system of FIGS. 137 and 138;

FIG. 176 is a diagram showing a link key item selecting screen for explaining the database system of FIGS. 137 and 138;

FIG. 177 is a diagram showing a display screen of a table link defining worksheet for explaining the database system of FIGS. 137 and 138;

FIG. 178 is a diagram showing an edition number check confirmation screen for explaining the database system of FIGS. 137 and 138;

FIG. 179 is a schematic diagram for explaining the table link management data recording area of the database system of FIGS. 137 and 138;

FIG. 180 is a schematic diagram for explaining the table management data recording area of the database system of FIGS. 137 and 138;

FIG. 181 is a schematic diagram for explaining the data item recording area and the data item attribute recording area of the database system of FIGS. 137 and 138;

FIG. 182 is a diagram showing a table segment selecting screen for explaining the database system of FIGS. 137 and 138;

FIG. 183 is a schematic diagram for explaining the data item recording area and the data item attribute recording area of the database system of FIGS. 137 and 138;

FIG. 184 is a diagram showing the display screen of an operation/process defining worksheet for explaining the database system of FIGS. 137 and 138;

FIG. 185 is a diagram showing the display screen of a data item attribute defining worksheet for explaining the database system of FIGS. 137 and 138;

FIG. 186 is a diagram showing the display screen of the operation/process defining worksheet for explaining the database system of FIGS. 137 and 138;

FIG. 187 is a schematic diagram for explaining the data item recording area and the data item attribute recording area of the database system of FIGS. 137 and 138;

FIG. 188 is a diagram showing a table segment selecting screen for explaining the database system of FIGS. 137 and 138;

FIG. 189 is a schematic diagram for explaining the data item recording area and the data item attribute recording area of the database system of FIGS. 137 and 138;

FIG. 190 is a diagram showing the operation/process defining worksheet for explaining the database system of FIGS. 137 and 138;

FIG. 191 is a diagram showing a display screen of an operation/process defining worksheet for explaining the database system of FIGS. 137 and 138;

FIG. 192 is a diagram showing a display screen of a data item attribute defining worksheet for explaining the database system of FIGS. 137 and 138;

FIG. 193 is a schematic diagram for explaining the data item recording area and the data item attribute recording area of the database system of FIGS. 137 and 138;

FIG. 194 is a schematic diagram for explaining the management point recording area of the database system of FIGS. 137 and 138;

FIG. 195 is a diagram showing a display screen of the table of management points for explaining the database system of FIGS. 137 and 138;

FIG. 196 is a diagram showing the display screen of a management point defining worksheet for explaining the database system of FIGS. 137 and 138;

FIG. 197 is a schematic diagram for explaining the management point recording area of the database system of FIGS. 137 and 138;

FIG. 198 is a diagram showing the display screen of the table of management points for explaining the database system of FIGS. 137 and 138;

FIG. 199 is a schematic diagram for explaining the management point recording area and the segment data recording area of the database system of FIGS. 137 and 138;

FIG. 200 is a diagram showing a segment definition confirmation screen for explaining the database system of FIGS. 137 and 138;

FIG. 201 is a schematic diagram for explaining the management point recording area, the segment data recording area and the segment specification recording area of the database system of FIGS. 137 and 138;

FIG. 202 is a block diagram showing the functional construction of a setup unit of a database system according to a fourth embodiment of the present invention;

FIG. 203 is a block diagram showing the functional construction of an inquiry unit of the database system according to the fourth embodiment of the present invention;

FIG. 204 is a block diagram showing the functional construction of an operations support unit of the database system according to the fourth embodiment of the present invention;

FIG. 205 is a schematic diagram for explaining a management point recording area of the database system of FIGS. 202 to 204;

FIG. 206 is a diagram showing the display screen of the table of management points for explaining the database system of FIGS. 202 to 204;

FIG. 207 is a schematic diagram for explaining the management point recording area and the segment data recording area of the database system of FIGS. 202 to 204;

FIG. 208 is a diagram showing the display screen of the table of segment definitions for explaining of the database system of FIGS. 202 to 204;

FIG. 209 is a diagram showing a table segment selecting screen for explaining the database system of FIGS. 202 to 204;

FIG. 210 is a diagram showing a table selecting screen for explaining the database system of FIGS. 202 to 204;

FIG. 211 is a diagram showing a data item selecting screen for explaining the database system of FIGS. 202 to 204;

FIG. 212 is a diagram showing a segment defining method confirmation screen for explaining the database system of FIGS. 202 to 204;

FIG. 213 is a diagram showing the display screen of a segment attribute defining worksheet for explaining the database system of FIGS. 202 to 204;

FIG. 214 is a diagram showing the display screen of a tentative graph display for explaining the database system of FIGS. 202 to 204;

FIG. 215 is a diagram showing the display screen of a segment attribute defining worksheet for explaining the database system of FIGS. 202 to 204;

FIG. 216 is a diagram showing a segment definition confirmation screen for explaining the database system of FIGS. 202 to 204;

FIG. 217 is a diagram showing the display screen of a decision histogram display for explaining the database system of FIGS. 202 to 204;

FIG. 218 is a diagram showing a management point selecting screen for explaining the database system of FIGS. 202 to 204;

FIG. 219 is a diagram showing a segment definition selecting screen for explaining the database system of FIGS. 202 to 204;

FIG. 220 is a diagram showing the display screen of a three-dimensional graph display for explaining the database system of FIGS. 202 to 204;

FIG. 221 is a diagram showing a graph registration confirmation screen for explaining the database system of FIGS. 202 to 204;

FIG. 222 is a schematic diagram for explaining the management point recording area, the segment data recording area, the segment specification recording area and the management point graph data recording area of the database system of FIGS. 202 to 204;

FIG. 223 is a schematic diagram for explaining the graph attribute data of the database system of FIGS. 202 to 204;

FIG. 224 is a diagram showing the display screen of the table of segment definitions for explaining the database system of FIGS. 202 to 204;

FIG. 225 is a diagram showing the display screen of the table of management points for explaining the database system of FIGS. 202 to 204;

FIG. 226 is a schematic diagram for explaining the management point recording area, the segment data recording area, the segment specification recording area and the management point graph data recording area of the database system of FIGS. 202 to 204;

FIG. 227 is a diagram showing the display screen of the table of management points for explaining the database system of FIGS. 202 to 204;

FIG. 228 is a diagram showing the display screen of a three-dimensional graph display for explaining the database system of FIGS. 202 to 204;

FIG. 229 is a diagram showing the display screen of a layout determining worksheet for explaining the database system of FIGS. 202 to 204;

FIG. 230 is a diagram showing the graph display screen of a layout determining worksheet for explaining the database system of FIGS. 202 to 204;

FIG. 231 is a diagram showing the range selecting screen of a layout determining worksheet for explaining the database system of FIGS. 202 to 204;

FIG. 232 is a diagram showing the display screen of a layout determining worksheet for explaining the database system of FIGS. 202 to 204;

FIG. 233 is a diagram showing an extracted job selecting screen for explaining the database system of FIGS. 202 to 204;

FIG. 234 is a diagram showing a mismatch warning screen for explaining the database system of FIGS. 202 to 204;

FIG. 235 is a diagram showing a mismatch warning screen for explaining the database system of FIGS. 202 to 204;

FIG. 236 is a schematic diagram for explaining the management point recording area, the segment data recording area, the segment specification recording area and the management point graph data recording area of the database system of FIGS. 202 to 204;

FIG. 237 is a diagram showing the display screen of the table of the segment definitions for explaining the database system of FIGS. 202 to 204;

FIG. 238 is a diagram showing the display screen of the segment definitions changing worksheet for explaining the database system of FIGS. 202 to 204;

FIG. 239 is a schematic diagram for explaining the management point recording area, the segment data recording area, the segment specification recording area and the management point graph data recording area of the database system of FIGS. 202 to 204;

FIG. 240 is a diagram showing the confirmation screen of a graph update for explaining the database system of FIGS. 202 to 204;

FIG. 241 is a block diagram showing the functional construction of a claim settlement of a database system according to a fifth embodiment of the present invention;

FIG. 242 is a schematic diagram for explaining a claim recording area of the database system of FIG. 241;

FIG. 243 is a schematic diagram for explaining an attached material recording area of the database system of FIG. 241;

FIG. 244 is a flow chart for explaining the claim settlement of the database system of FIG. 241;

FIG. 245 is a schematic diagram for explaining the claim recording area and the attached material recording area of the database system of FIG. 241;

FIG. 246 is a flow chart for explaining the claim storage of the database system of FIG. 241;

FIG. 247 is a diagram showing the display screen of the table of claim states for explaining the database system of FIG. 241;

FIG. 248 is a diagram showing the display screen of the table of undefined management points for explaining the database system of FIG. 241; and FIG. 249 is a diagram showing a notification screen of the finish of a claim settlement for explaining the database system of FIG. 241.

DETAILED DESCRIPTION OF THE PREFERRED EMBODIMENTS

With reference to the accompanying drawings, here will be described an embodiment of a database system which is equipped with a data exploitation support unit of a database according to the present invention.

Figure 1:
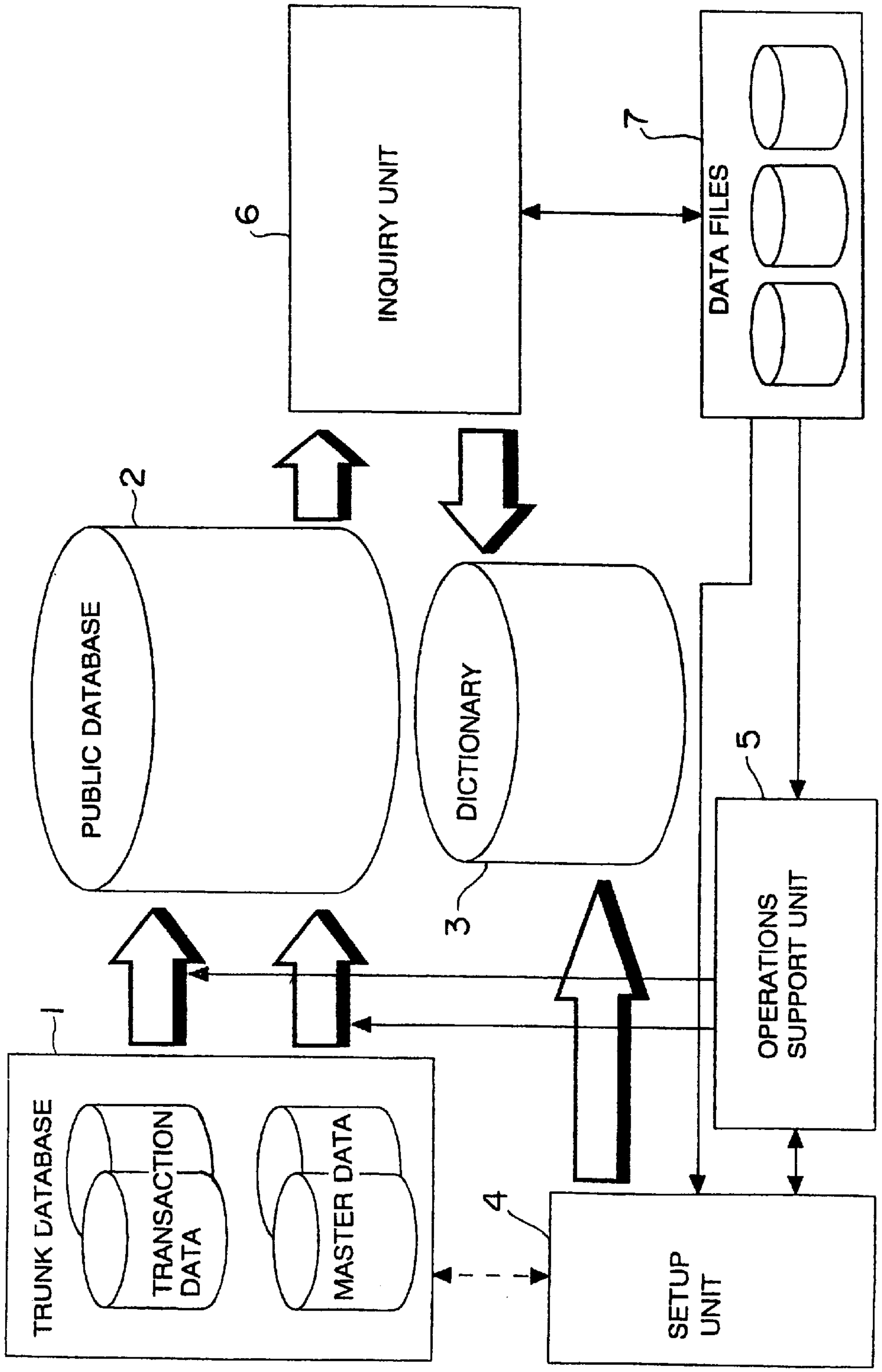
FIG. 1 is a block diagram showing a basic entire construction of a database system according to an embodiment of the present invention.

FIG. 1 shows a basic construction of the database system which is common among the individual embodiments of the present invention.

The database system of FIG. 1 is constructed to include a trunk database 1, a public database 2, a dictionary 3, a setup unit 4, an operations support unit 5, an inquiry unit 6 and data files 7.

This database system has its database composed of the original database or the trunk database 1 and the public database 2. The trunk database 1 stores the master data and the transaction data of the trunk system. The public database 2 is composed of the data which are extracted from the trunk database 1 and subjected to a predetermined processing.

The dictionary 3 stores both the management point data, which are related to the master data of the trunk database 1, and the definition data for management and evaluation references, as its attribute data. The dictionary 3 may store other data as its attribute data.

The setup unit 4, the operations support unit 5 and the inquiry unit 6 are the functions to be realized mainly by the softwares for handling the stored data of the trunk database 1, the public database 2, the dictionary 3 and the data files 7, which have memories stored with the data. The setup unit 4 and the operations support unit 5 construct the data management unit.

The setup unit 4 records and manages the management points, which correspond to the management and evaluation references for exploiting the data, in the dictionary 3 in relation to the data items of the master data. The setup unit 4 records and manages the management points in relation to the data items in accordance with the extraction of at least one of the master data and the transaction data of the trunk database to the public database 2.

The operations support unit 5 monitors the states of and changes the data environment of the aforementioned master data and transaction data based upon the setting by the setup unit 4.

The inquiry unit 6 refers to the management points on the basis of the business dealing operations to extract the data of the final format, that are processed by the setup unit 4 and the operations support unit 5, in a usable mode.

The data files 7 store a variety of data to be used in association with the operations of the system and its individual portions.

<<Embodiment 1>>

The first embodiment of the present invention is characterized by the functional constructions of the setup unit 4, the inquiry unit 6 and the operations support unit 5, which makes the basic construction of the database system, as shown in FIG. 1.

Figure 2:
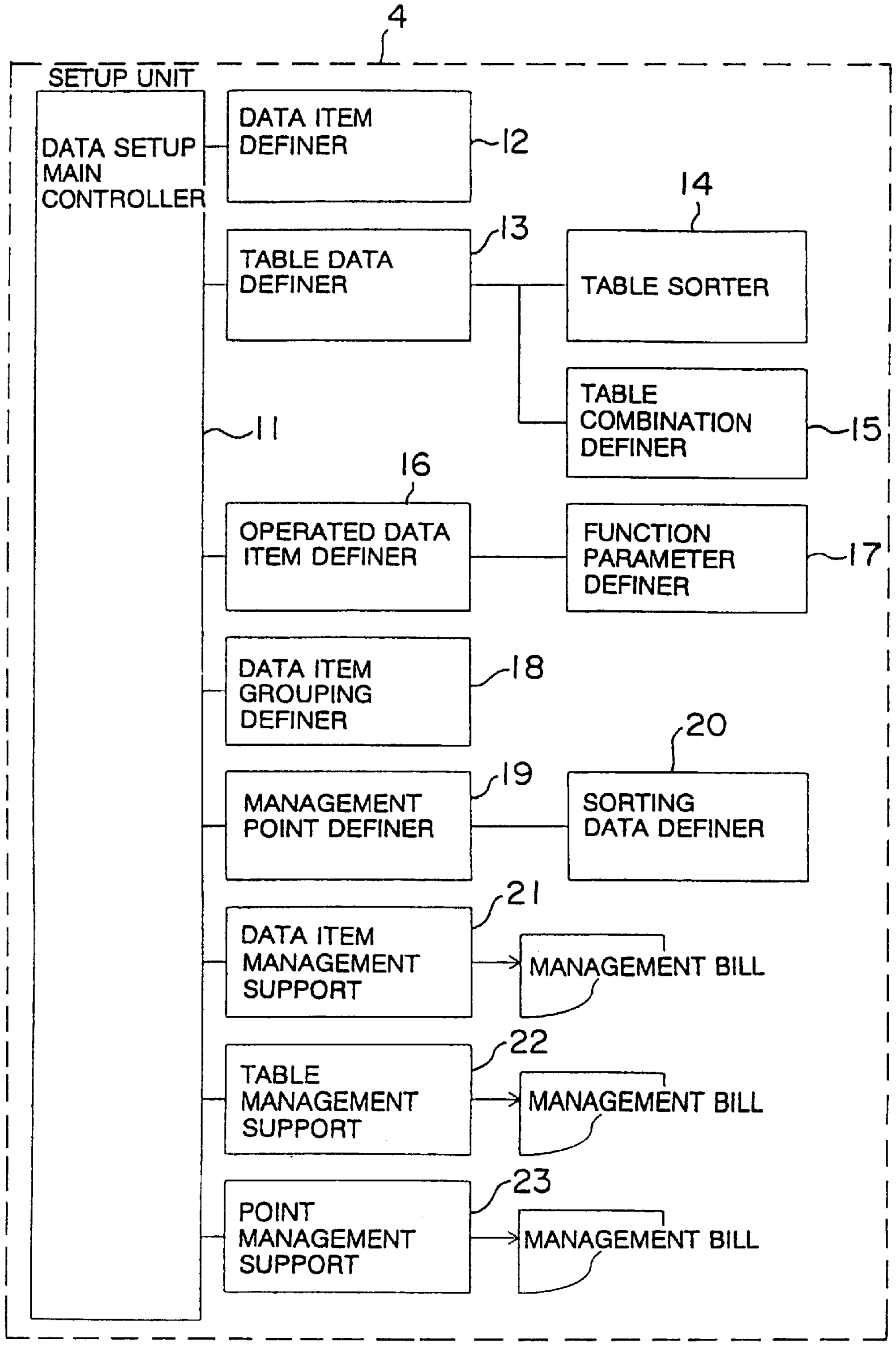
FIG. 2 is a block diagram showing the functional construction of a setup unit of the database system according to a first embodiment of the present invention.
Figure 3:
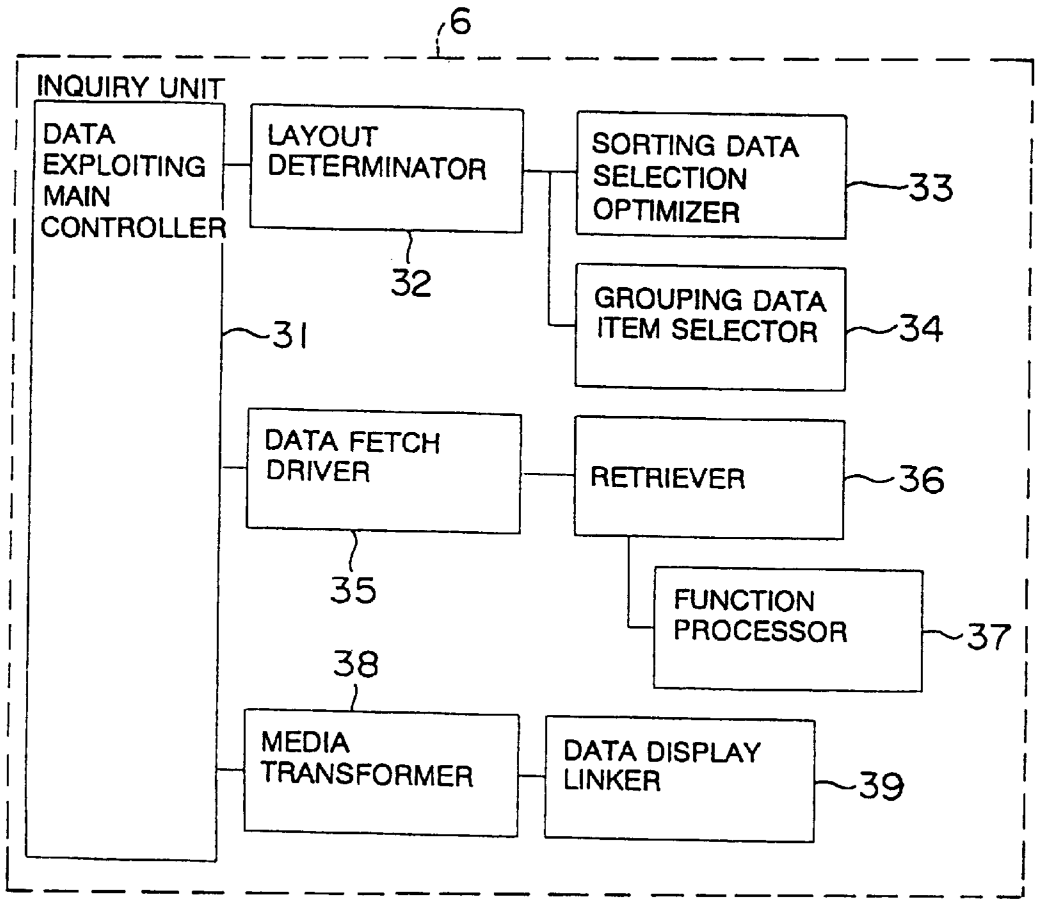
FIG. 3 is a block diagram showing the functional construction of an inquiry unit of the database system according to the first embodiment of the present invention.
Figure 4:
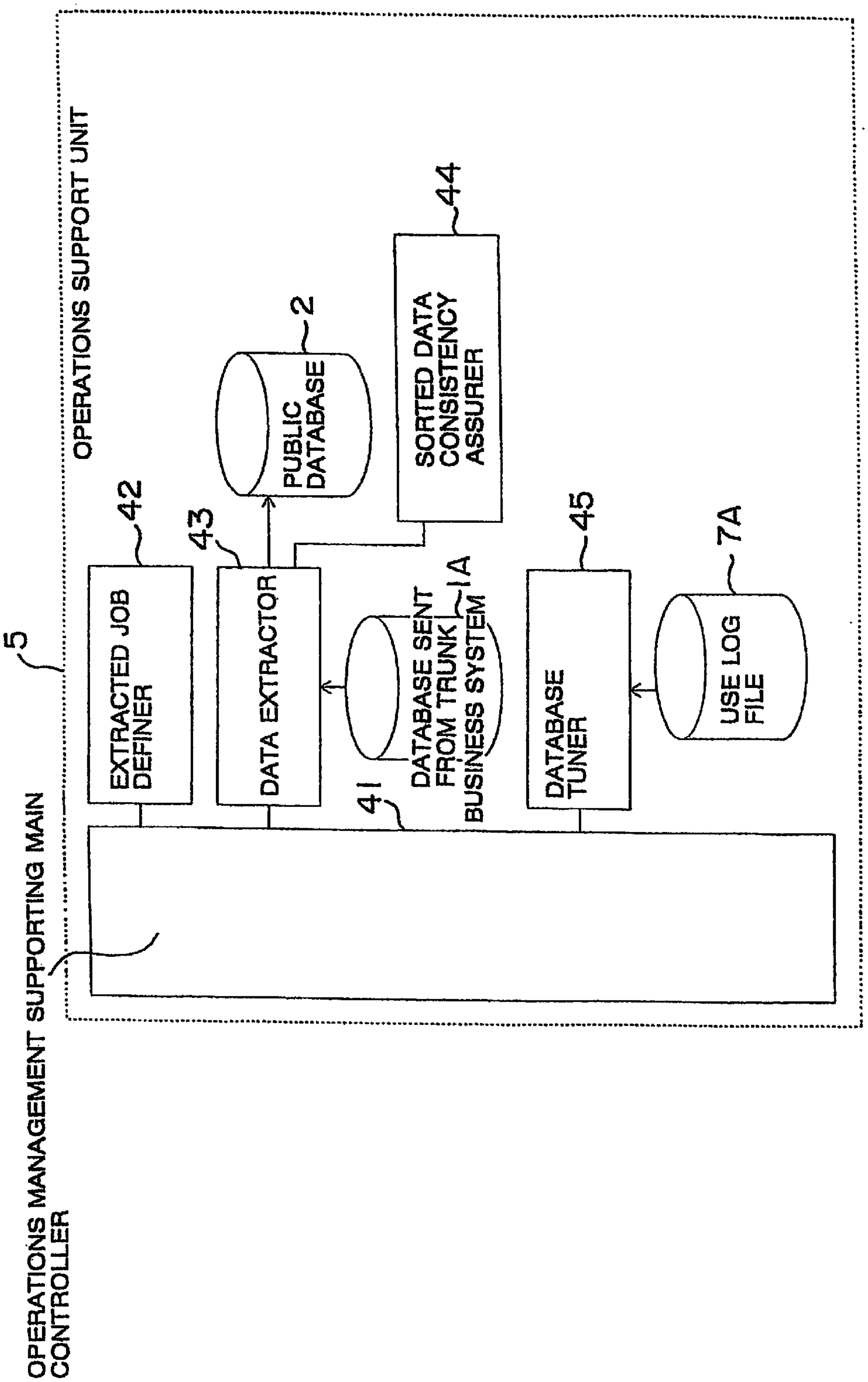
FIG. 4 is a block diagram showing the functional construction of an operations support unit of the database system according to the first embodiment of the present invention.

FIGS. 2, 3 and 4 show the individual details of the functional constructions of the setup unit 4, the inquiry unit 6 and the operations support unit 5 in the database system according to the first embodiment of the present invention.

As shown in FIG. 2, the setup unit 4 is composed of a data setup main controller 11, a data item definer 12, a table data definer 13, a table sorter 14, a table combination definer 15, an operated data item definer 16, a function parameter definer 17, a data item grouping definer 18, a management point definer 19, a sorting data definer 20, a data item management support 22 and a point management support 23.

As shown in FIG. 3, the inquiry unit 6 is composed of a data exploiting main controller 31, a layout determinator 32, a sorting data selection optimizer 33, a grouping data item selector 34, a data fetch driver 35, a retriever 36, a function processor 37, a media transformer 38 and a data display linker 39.

As shown in FIG. 4, the operations support unit 5 is composed of an operations management supporting main controller 41, an extracted job definer 42, a data extractor 43, a sorted data consistency assurer 44 and a database tuner 45.

The data extractor 43 outputs the data, which is sent out from the trunk database 1 of the trunk business system and extracted from sent database 1A, to the public database 2. The database tuner 45 refers to a use log file 7A contained in the aforementioned data files 7.

Next, the functions and operations of the aforementioned individual units will be described in more detail in connection with the specific operations and processings.

(1-1) Generation of Extracted Job from Trunk Database to Public Database

The operations support unit 5 has functions to generate or create (at the extracted job definer 42) an extracted job (or extracted procedure) for fetching the database data (1A) from the trunk database 1 of the trunk business system into the public database 2, to execute (at the data extractor 43) the extracted job, and to tune (at the database tuner 45), and supports the smooth operations of the database. This operations support unit 5 is controlled in its entirety by the operations management supporting main controller 41.

Figure 5:
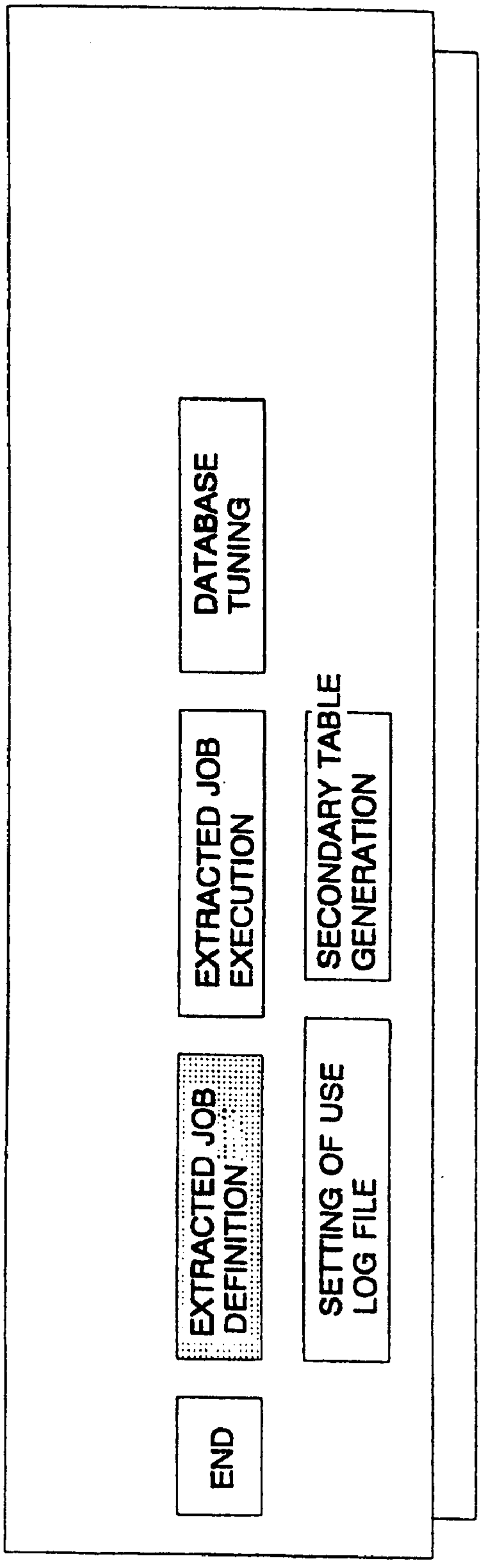
FIG. 5 is a diagram showing the display screen of an initial menu of the operations management for explaining the database system of FIGS. 2 to 4.

In order to start a predetermined processing, the operations management supporting main controller 41 displays an initial menu for the operations management, as shown in FIG. 5, in the display screen of a terminal unit. When the terminal operator selects a menu item corresponding to the extracted job definition, for example, from the menu of FIG. 5 by making use of a mouse or the like, the extracted job definer 42 is controlled to define the extracted job of the trunk database data.

Incidentally, at the time of fetching the data from the trunk database 1 to the public database 2, an extraction intrinsic to time series data may be executed for the time series data. This extraction intrinsic to the time series data will be described in connection with a second embodiment of the present invention.

When a menu item corresponding to the database tuning is selected from the aforementioned menu, the database tuner 45 is controlled so that the database may be tuned for improving the processing efficiency on the basis of the use log data to be recorded with the hysteresis data of using the database.

In order to assure consistency or matching the database information, the order of executing the extracted jobs in association may be regulated, or the restricting conditions for executing the extracted jobs may be defined. The detail of this consistency of the database data will be described in connection a third embodiment of the present invention.

The extracted job definer 42 of the trunk data base data generates and stores in the dictionary 3 the extracted job for fetching the database data of the trunk database 1 from the trunk business system into the public database 2. This extracted job definer 42 also has a function to change or delete the job which is generated and stored in the dictionary 3.

The extracted job definer 42 of the trunk database data tabulates the extracted job data, as recorded/managed by the dictionary 3, in the display screen of the terminal unit.

Figure 6:
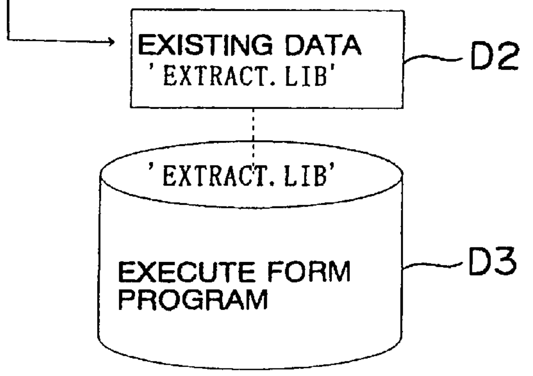
FIG. 6 is a schematic diagram for explaining the extracted job data recording area of the dictionary of the database system of FIGS. 2 to 4.

Specifically, the extracted job data recording area of the dictionary 3 is stored, as shown in FIG. 6, with extracted job data D1, which contain existence data D2 indicating the existence of the extracted job or an execution format program, and the extracted job D3 itself is stored in the extracted job recording area of the dictionary 3.

At the time of the extracted job selection, there are displayed the table of the aforementioned extracted job data and the buttons "END", "ADD", "CHANGE" and "DELETE", as shown in FIG. 7.

By selecting the "ADD" button by the mouse or the like, an extracted job can be newly defined. If, on the other hand, the "CHANGE" button is selected after a certain extracted job has been selected by the mouse or the like, it is possible to change the content of the defined extracted job, as selected. If, on the other hand, the "DELETE" button is selected after a certain extracted job has been selected, it is possible to delete the defined extracted job, as selected.

The definitions of the extracted job are executed by effecting the selection of a table to be extracted from the trunk database 1 of the trunk business system, the selection of a data item and the indication of a retrieving condition and are based by generating as the extracted job the procedure of extracting/registering the desired data as a table in the public database 2. In this case, moreover, a program, as described in a program language such as COBOL, can be allocated as the extracted job.

Figure 8:
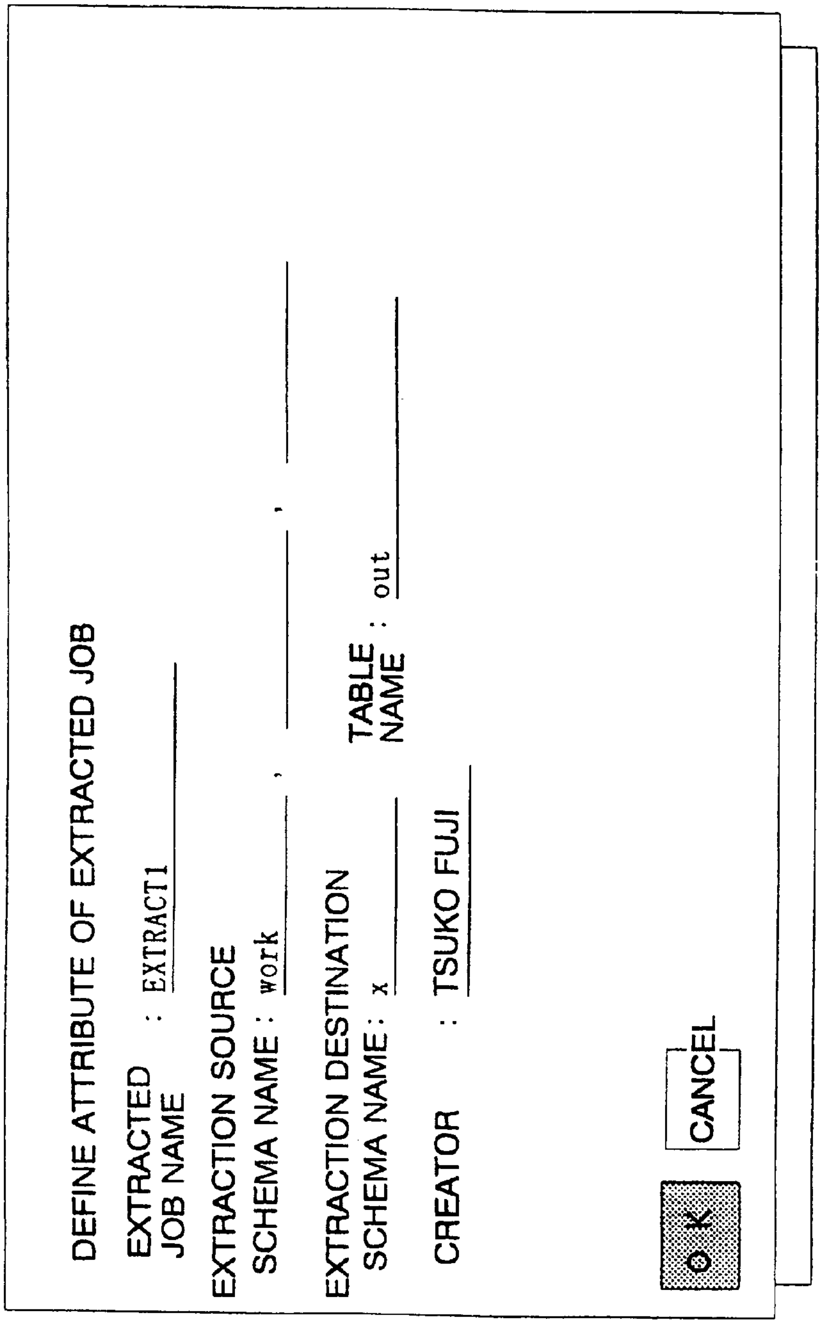
FIG. 8 is a diagram showing a display screen of an extracted job attribute defining worksheet for explaining the database system of FIGS. 2 to 4.

By selecting the "ADD" button, as described above, it is possible to define the extracted job. In this case, the worksheet for defining the attributes of the extracted job, as shown in FIG. 8, is displayed in the screen of the terminal unit so that the attributes of the extracted job such as the extracted job name, the extraction source schema name, the extraction destination schema name, the table name and the creator can be defined by inputting through a keyboard or the like. The screen, as shown in FIG. 8, displays the "OK" and "DELETE" buttons in addition to the attribute defining worksheet.

With the attributes being defined in the worksheet of FIG. 8, the generation of an extracted job is started when the "OK" button is selected.

Figure 9:
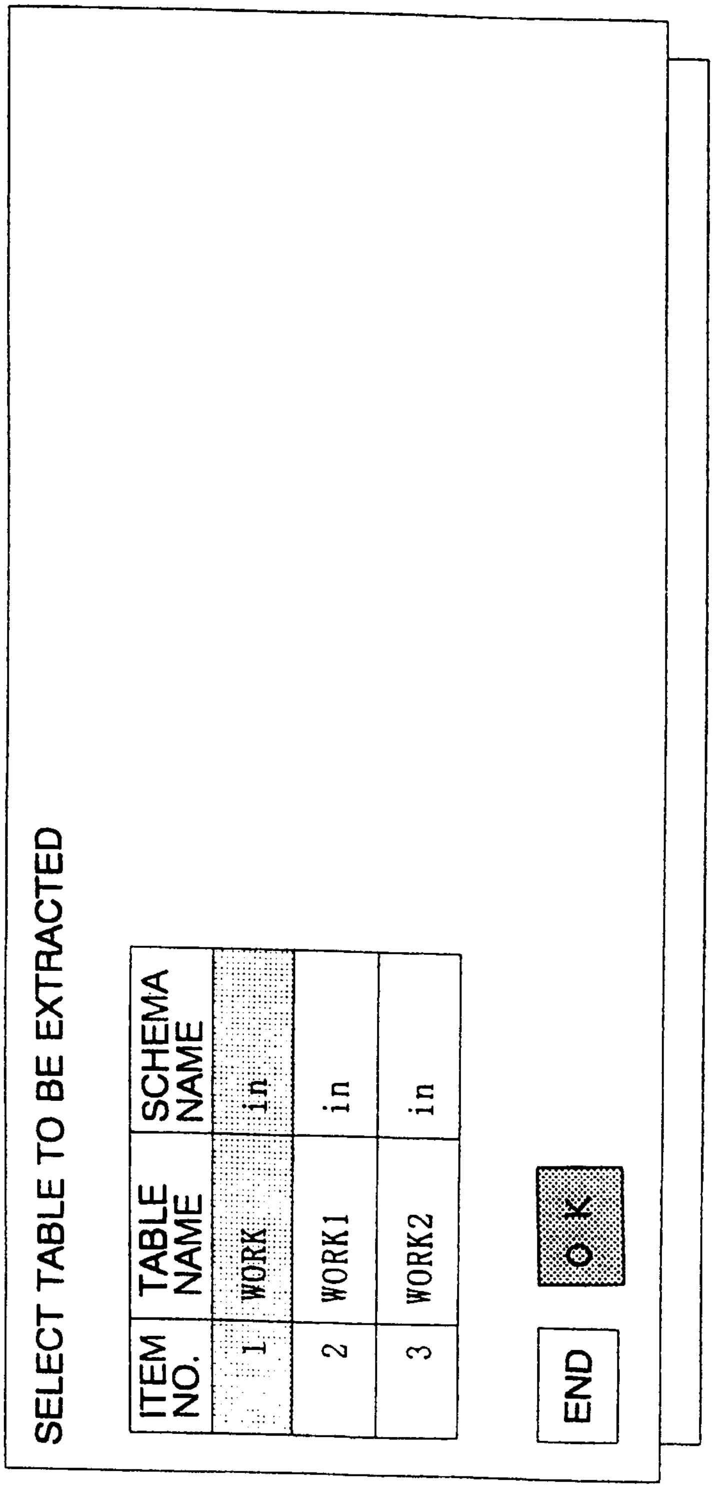
FIG. 9 is a diagram showing an extracted table selecting screen for explaining the database system of FIGS. 2 to 4.

For generating the extracted job, the database data, as sent out from the trunk database 1 of the trunk business system, are tabulated at first at the unit of table in the screen of the terminal unit, as shown in FIG. 9, so that the extracted table can be selected by the mouse or the like. In the screen of FIG. 9, the "END" and "OK" buttons are also displayed.

The table to be extracted is selected in the screen of FIG. 9, and the "OK" button is selected. Then, as shown in FIG. 10, the data items composing the selected table are tabulated in the screen of the terminal unit so that the data item to be extracted can be selected by using the mouse or the like. In the screen of FIG. 10, there are also displayed the "OK", "DELETE" and "OPERATION/PROCESS" buttons.

In case a plurality of tables are selected from the screen of FIG. 9, the table of the data items composing those tables is displayed in the screen of the terminal unit, as corresponds to the screen of FIG. 10, and the linking conditions among those tables are automatically generated by selecting the data items associatively.

By selecting the "OPERATION/PROCESS" button in the screen of FIG. 10 by the mouse or the like, on the other hand, the result of the operation/process between the data items can be extracted. When the "OPERATION/PROCESS" button is selected, the worksheet for defining the operation/process formula is displayed in the screen of the terminal unit so that the desired operation/process formula can be defined by selecting a data item from the table of data items and an operand from the table of operands by using the mouse or the like and by attaching the selected ones to the worksheet.

Figure 12:
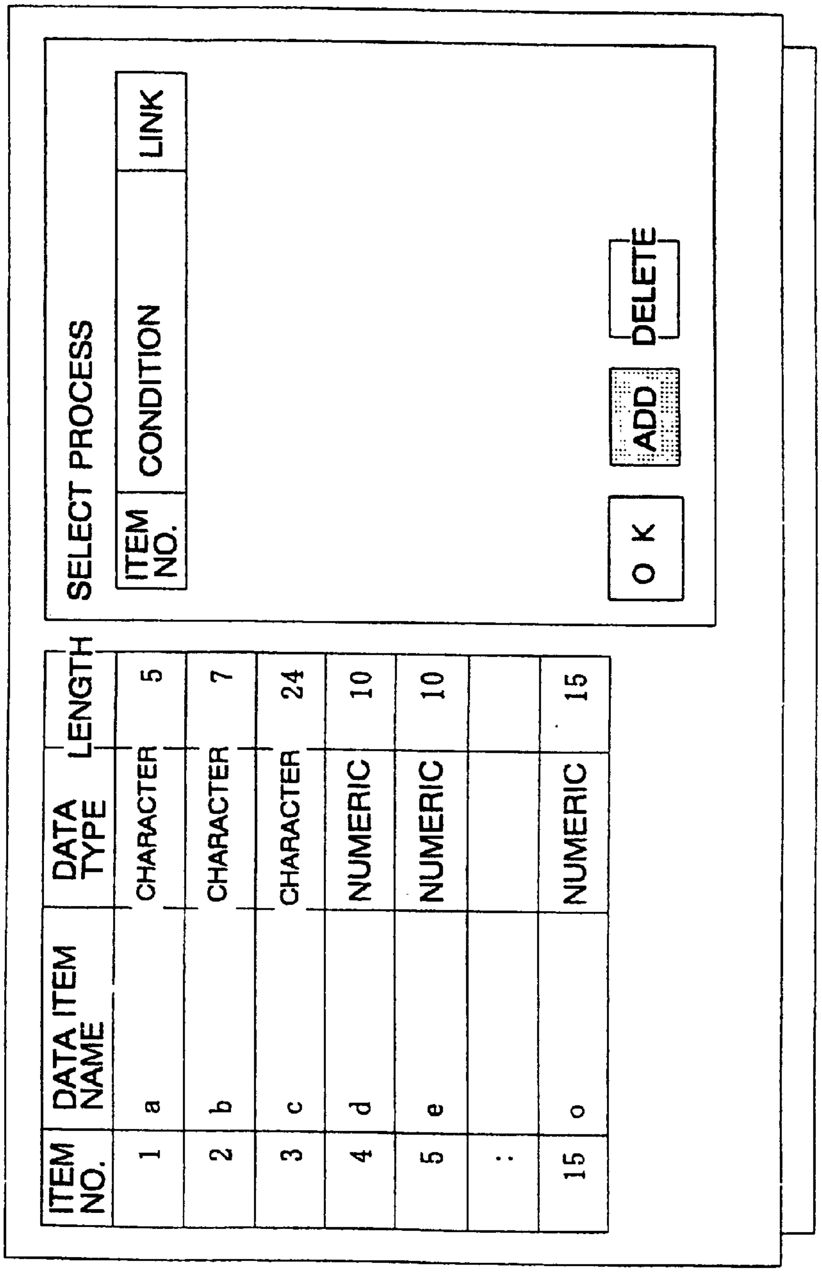
FIG. 12 is a diagram showing an extraction condition table screen for explaining the database system of FIGS. 2 to 4.
Figure 13:
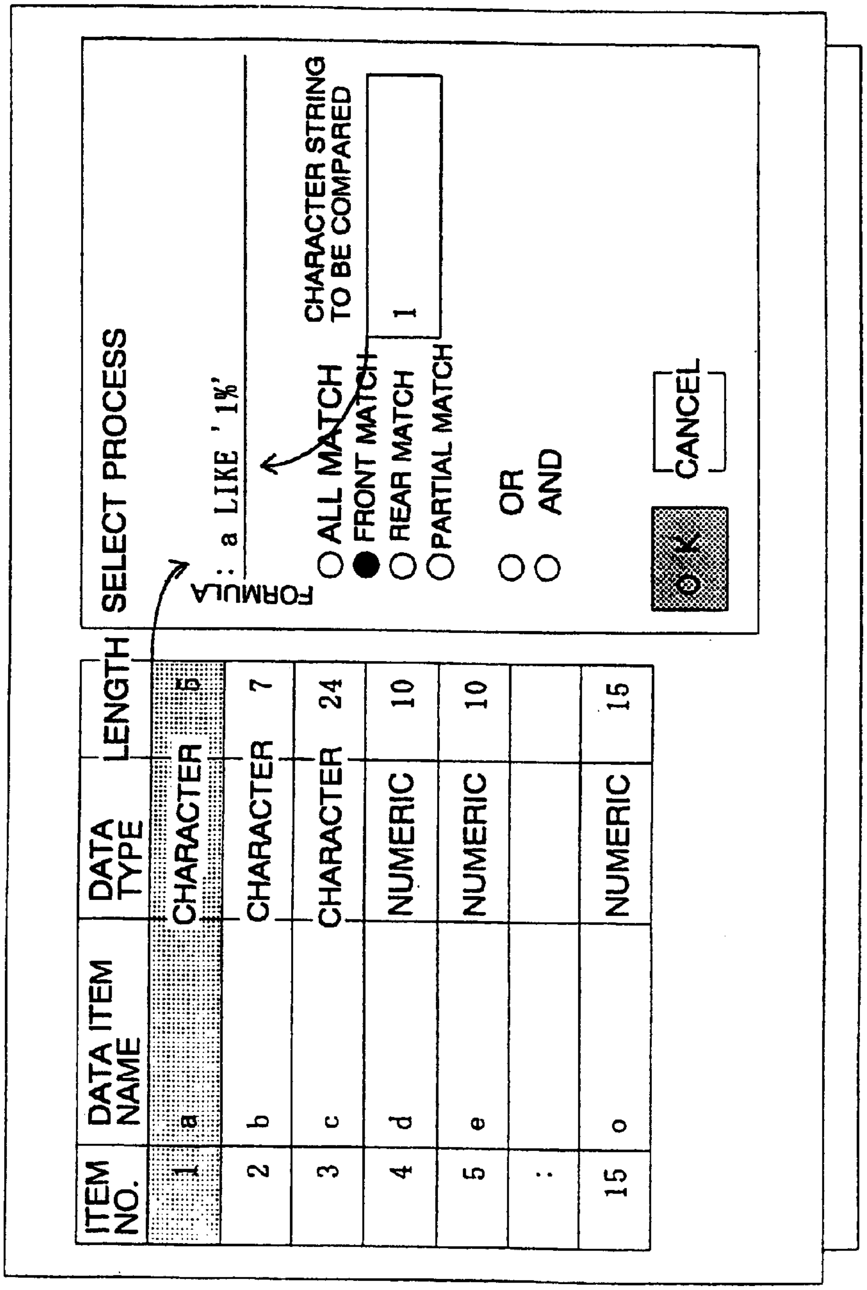
FIG. 13 is a diagram showing a display screen of an extraction condition setting worksheet for explaining the database system of FIGS. 2 to 4.

When the generation of the fundamental procedure is completed, an extraction condition table screen for setting the extraction conditions is then displayed on the screen of the terminal unit, as shown in FIG. 12. The "OK", "ADD" and "DELETE" buttons are also displayed in the screen of FIG. 12. By selecting the "ADD" button by the mouse or the like, the worksheet for setting the individual extraction conditions is displayed in the screen of the terminal unit, as shown in FIG. 13, so that the extraction conditions can be defined. The "OK" and "DELETE" buttons are also displayed in the screen of FIG. 13.

Specifically, by selecting a data item for setting the conditions by the mouse or the like from the table of the lefthand data items of the screen of the terminal unit, as shown in FIG. 13, the data item names are transferred to the righthand worksheet of FIG. 13. In case the data items are composed of characters, operation parts for setting the character type conditions are displayed in the lower rows of the worksheet so that they can be used for the selection to complete the conditional formulas.

Specifically, in FIG. 13, after the data item "a" has been selected from the lefthand side of the screen, and a comparison character row "1" is inputted, and the "FRONT MATCH" is selected to generate "aLIKE'1%'".

Figure 14:
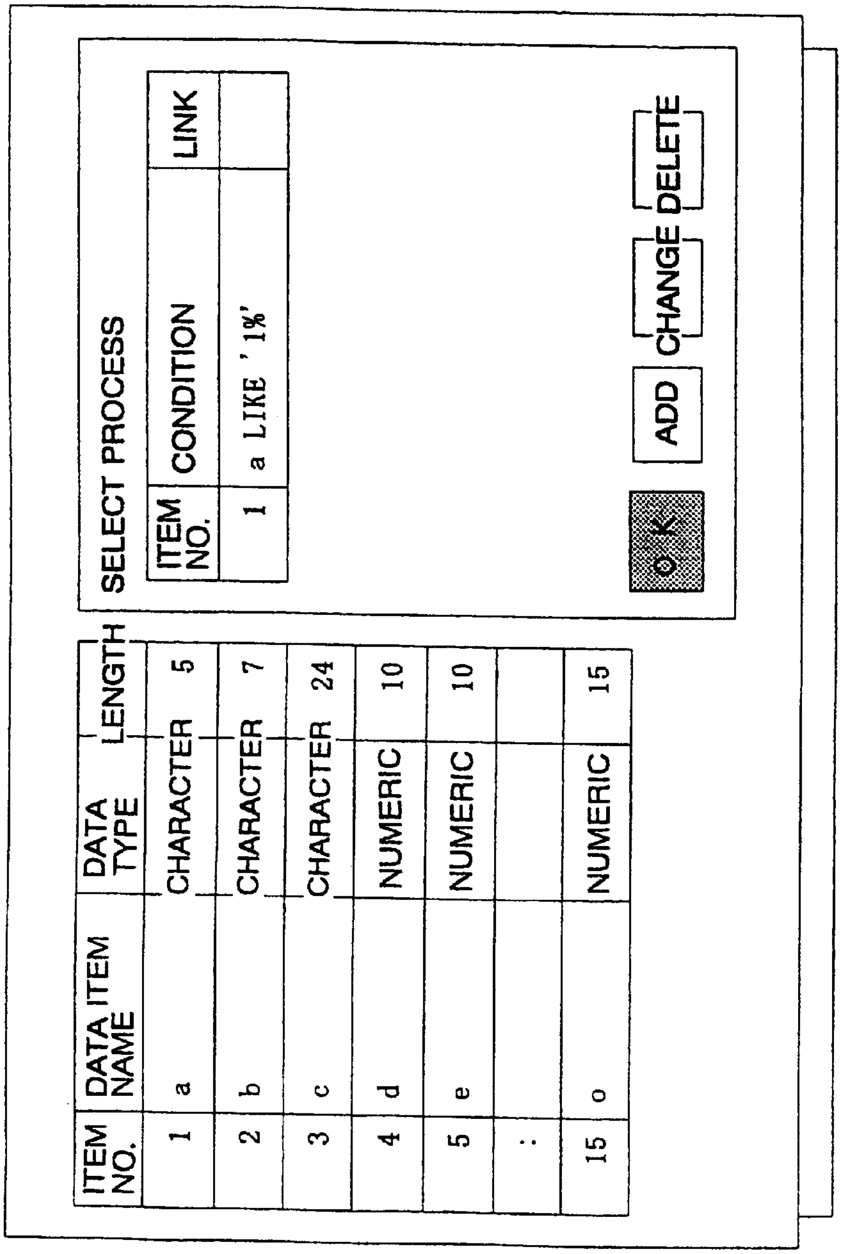
FIG. 14 is a diagram showing an extraction condition table screen for explaining the database system of FIGS. 2 to 4.

When the definition of the conditional formula is completed, the "OK" button is selected in the screen of FIG. 13. Then, the screen of the extraction condition table, as shown in FIG. 14, is restored. Substantially as in the screen of FIG. 12, the above-defined conditional formula is additionally displayed in the table in FIG. 14. In the screen of FIG. 14, there are also displayed the "OK", "ADD", "CHANGE" and "DELETE" buttons.

After the conditional formula has been selected in the screen of FIG. 14 by using the mouse or the like, the "CHANGE" button is selected. Then, the extraction condition setting worksheet, as shown in FIG. 13, is displayed again in the screen of the terminal unit so that the preset conditional formula can be changed. Moreover, the designated conditional formula can be deleted by selecting the "DELETE" button after the conditional formula has been selected.

When the definitions of all extraction conditions are completed, the "OK" is selected. Then, the definitions of the series extraction conditions are completed so that the extracted jobs, as shown in FIG. 11, are changed to those shown in FIG. 15. As to the extracted jobs thus generated, as shown in FIG. 16, the extracted Job data are written in the extracted job data recording area of the dictionary 3, and the extracted jobs are stored in the extracted job recording area of the dictionary 3.

When the write of the extracted job in the dictionary 3 is completed, the extracted job selecting screen, as shown in FIG. 17, is restored. In the extracted job selecting screen of FIG. 17, the extracted job "EXTRACT1" of the series extracted jobs, as added in their definitions, is further added to the table screen of the extracted job selections of FIG. 7.

(1-2) Fetch to Public Database of Trunk Database

The operations management supporting main controller 41 controlling the entirety of the operations support unit 5 displays the initial menu for starting a predetermined processing, as shown in FIG. 5, in the screen of the terminal unit at the start and at the end of another processing (e.g., the aforementioned extracted job definition). The control is transferred to the data extractor 43 to start the extracted job when the terminal operator selects such a menu item by the mouse or the like as corresponds to the extracted job execution for extracting the data from the trunk database 1 to the public database 2.

The data extractor 43 of the trunk database data starts the extracted job which is generated extracted job definer 42 of the trunk database data and extracts predetermined database data from the database 1A, as sent out from the trunk database 1 of the trunk business system, to the public database 2.

At the start of the extracted job, the table of the extracted job data, as recorded/managed by the dictionary 3, is displayed in the screen of the terminal unit, as shown in FIG. 18, by the control of the data extractor 43 so that an arbitrary extracted job can be started when the terminal operator selects the arbitrary extracted job by operating the mouse or the like. In the screen of FIG. 18, there are also displayed the "OK", "NARROW" and "END" buttons. If the "NARROW" button is selected by the mouse or the like, on the other hand, the narrowing worksheet is displayed in the screen of the terminal unit so that the narrowing condition for narrowing the job executing day to a designated date and after can be designated for the worksheet.

Figure 19:
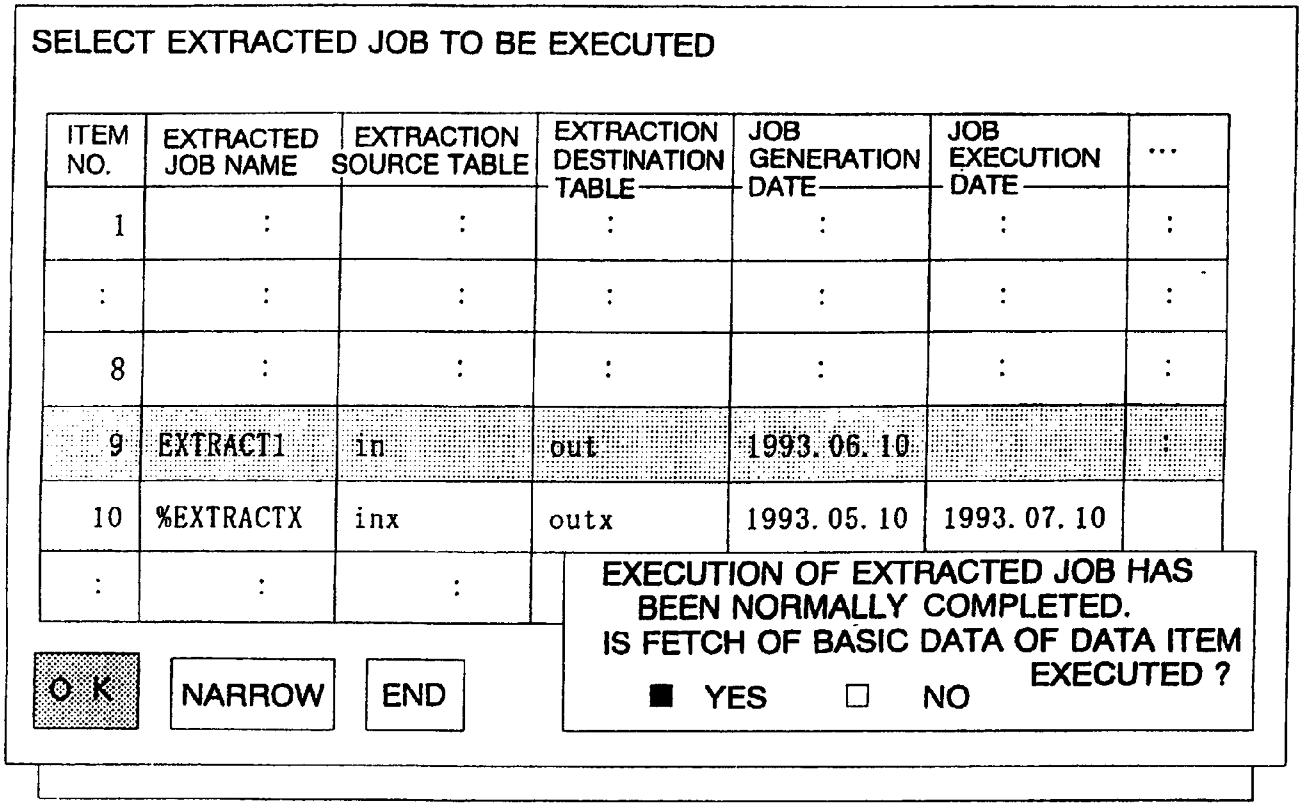
FIG. 19 is a diagram showing an extracted job execution confirming screen for explaining the database system of FIGS. 2 to 4.

By selecting a desired extracted job from the table of FIG. 18 and the "OK" button, the selected job is executed so that the message indicating the result of execution is outputted to the screen of the terminal unit, as shown in FIG. 19.

By executing the extracted job, the table is extracted/registered in the public database 2 so that the job execution date of the extracted job data recording area of the dictionary 3 is updated at that date.

In case the blank of the basic data, as recorded/managed in the extracted job recording area, is "NOT FINISHED", as shown in FIG. 16, the fetch (i.e., the creation/update of the data item attribute data) of the basic data of the data item is executed if it is instructed by the terminal operator.

Figure 21:
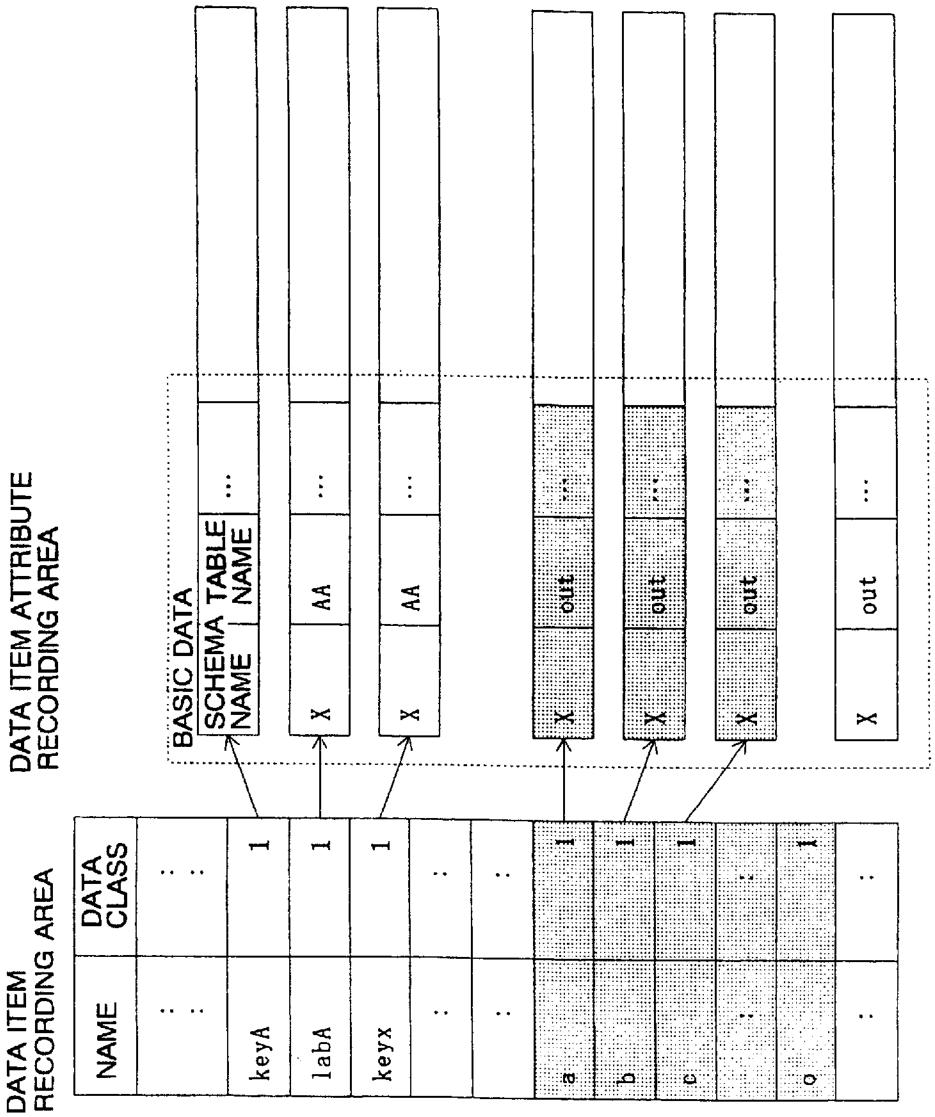
FIG. 21 is a schematic diagram for explaining a data item recording area and a date item attribute recording area of the database system of FIGS. 2 to 4.

The basic data of the data item are recorded/managed together the table management data in the dictionary 3. FIG. 20 shows a recording format of the table management data of the table management data recording area in the dictionary 3, and FIG. 21 shows a recording format of the data item of the data item recording area and the data item attribute (including the basic data).

When the extracted job is executed, its execution date is written in the extracted job table of the extracted job selecting screen, as shown in FIG. 22.

(1-3) Definition of Data Items

The setup unit 4 has functions to define the tables existing in the trunk database 1 and the public database 2 and the various attributes of the data items composing the tables (e.g., the data item definer 12, the table data definer 13, the table sorter 14, the table combination definer 15, the data item management support 21 and the table management support 22) and to define the management points (e.g., the management point definer 19, the sorting data definer 20 and the point management support 23), and sets up the various data to be recorded/managed in the dictionary 3 (e.g., the operated data item definer 16, the function parameter definer 17 and the data item grouping definer 18) so as to facilitate the exploitation of the database data and to enhance the reliability. This setup unit 4 is controlled in its entirety by the data setup main controller 11.

Figure 23:
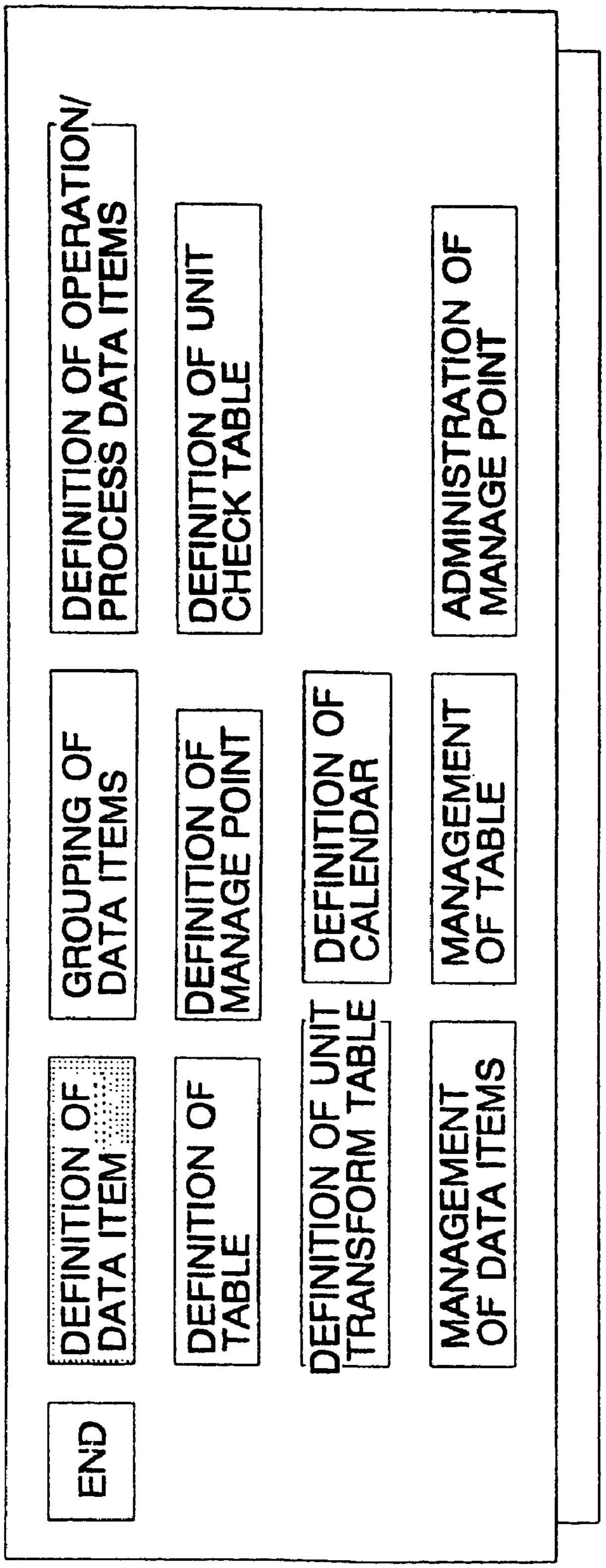
FIG. 23 is a diagram showing a display screen of the initial menu of a setup processing for explaining the database system of FIGS. 2 to 4.

The data setup main controller 11 for controlling the entirety of the setup unit 4 displays the initial menu of the setup processing, as shown in FIG. 23, in the screen of the terminal unit so as to start a predetermined processing relating to the setup. When the terminal operator selects the menu item corresponding to the definition of the data item, for example, from the menu of FIG. 23 by the mouse or the like, the control is transferred to the data item definer 12.

In order to select the data item for defining/changing the attribute data, the data item definer 12 can display the table of the table segments in the screen of the terminal unit, as shown in FIG. 24, to select the table segments by using the mouse or the like. The example of FIG. 24 shows the state in which the table segment of the master is selected.

When the table segment is selected, the table belonging to the selected table segment is displayed in the screen of the terminal unit, as shown in FIG. 25, so that the table can be selected by the terminal operator using the mouse or the like.

In FIG. 25, the table belonging to the table segment of the master is displayed so that the table name "out" (or the business office master) is selected.

Figure 26:
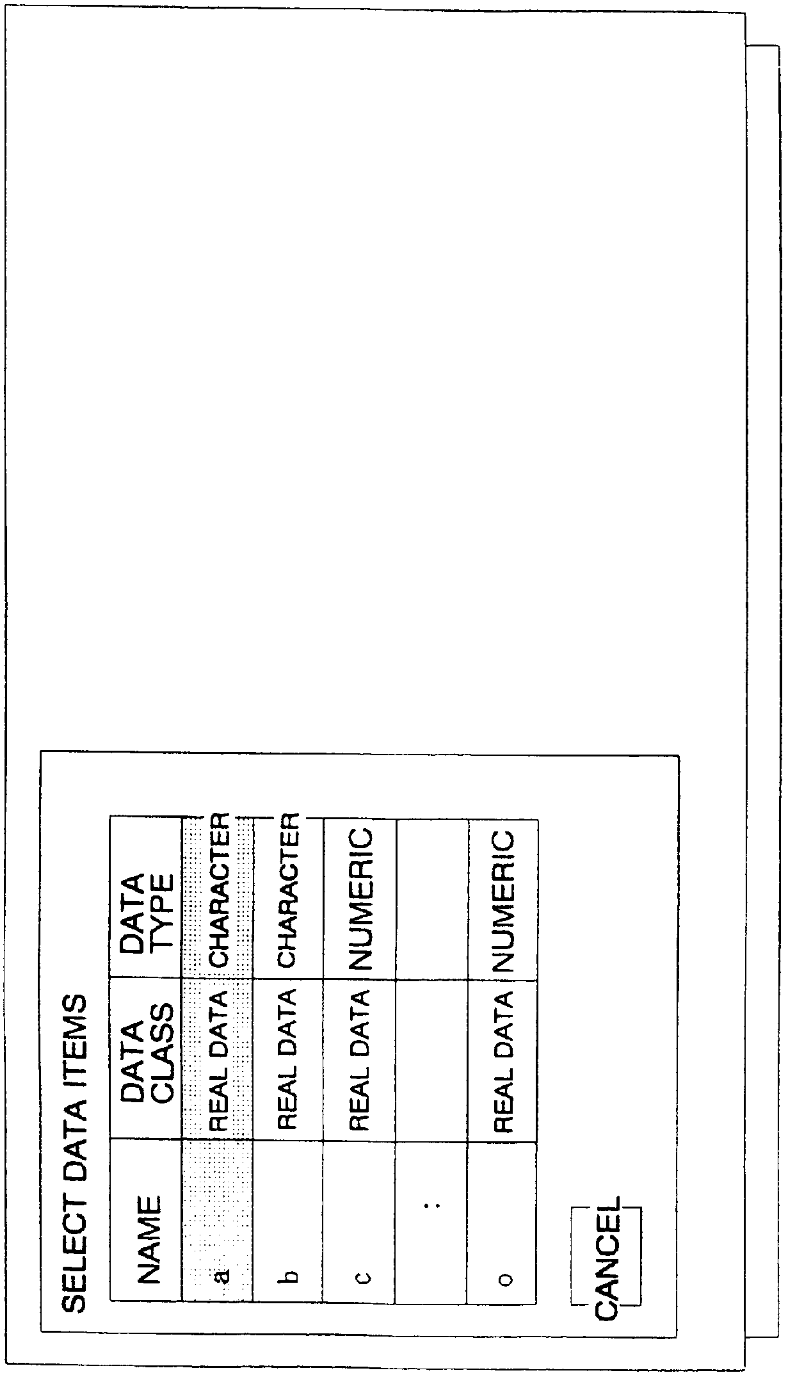
FIG. 26 is a diagram showing a data item selecting screen for explaining the database system of FIGS. 2 to 4.

The data items selected from and composing the aforementioned table are tabulated in the screen of the terminal unit, as shown in FIG. 26, so that the data items to have their attributes defined/changed can be selected.

Figure 27:
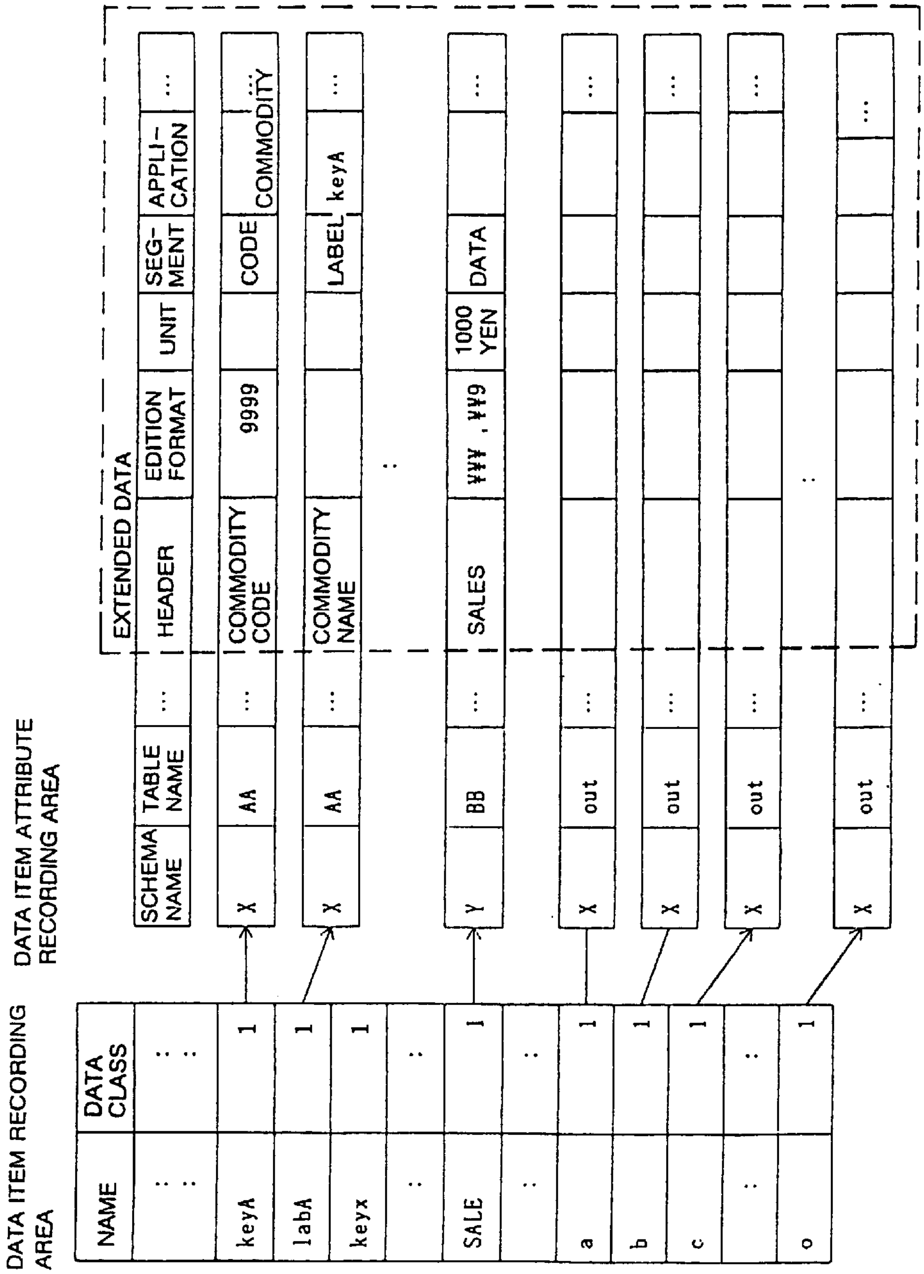
FIG. 27 is a schematic diagram for explaining a data item recording area and a data item attribute recording area of the database system of FIGS. 2 to 4.

The data items composing the table are generated in the dictionary 3 with reference to the data item recording data which are recorded/managed, as shown in FIG. 27. FIG. 27 shows one example of the behavior of the data item recording area and the data item attribute recording area of the dictionary 3.

In this case, in the table of the data items of FIG. 26, the name "a" of the data item, for example, is selected by operating the mouse or the like.

Figure 28:
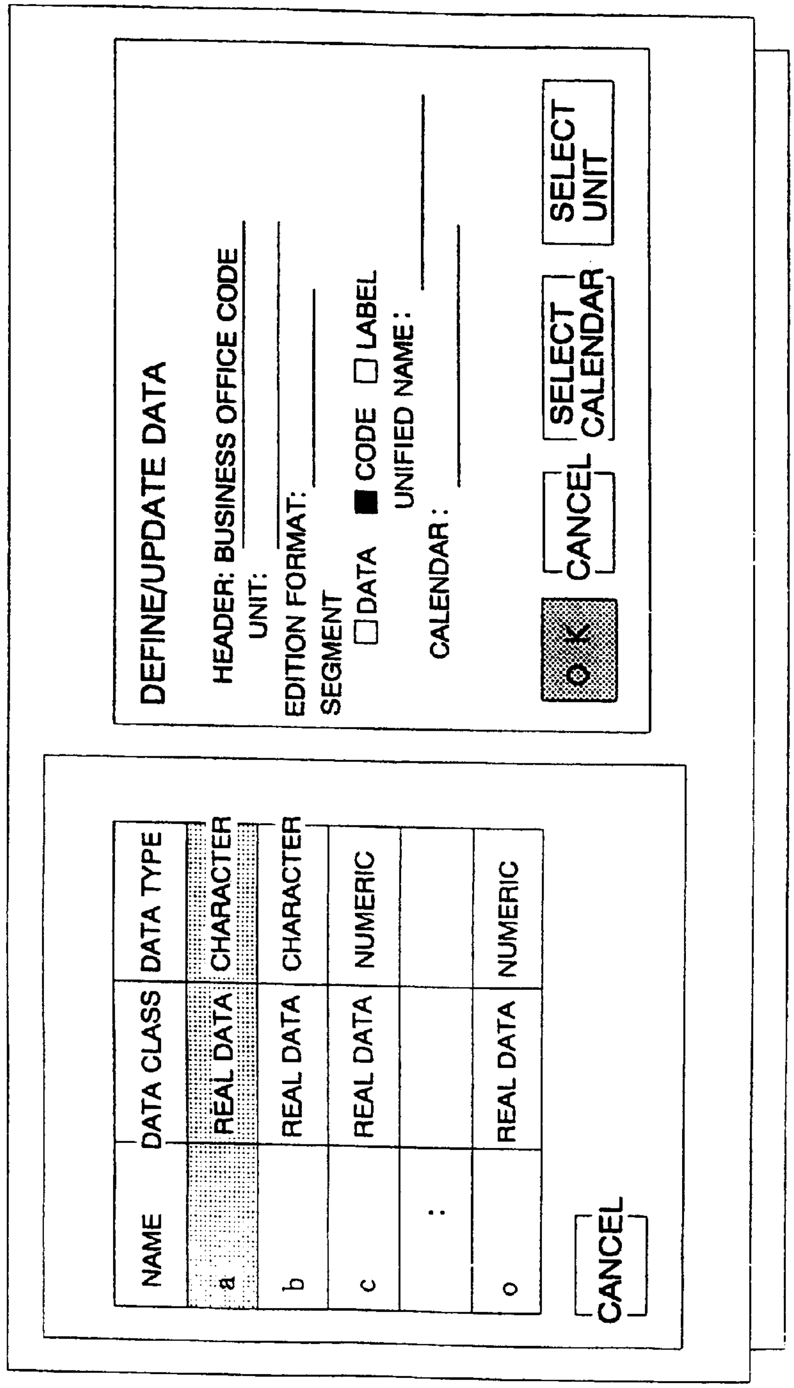
FIG. 28 is a diagram showing the display screen of a data item attribute defining worksheet for explaining the database system of FIGS. 2 to 4.

When the data item is thus selected, the worksheet for defining/updating a portion (i.e., extended data) of the attribute data of the data item can be displayed at the righthand side of the screen of the terminal unit and defined/inputted by using the keyboard or the like, as shown in FIG. 28.

At this time, the attribute data (or the extended data) to be defined/changed are exemplified by the header to be used as a first clue for selecting the data items from the table or as the header for fetching the database data finally, and the units of numerical data.

These units can be utilized in the automatic operations which are based upon the units and the arithmetic rules added to the database data. On the other hand, the calendar can be utilized for exploiting the database data to which each target calendar is applied.

A correlation may exist between the aforementioned data items, e.g., between the business office code item "a" and the business office name item "b". In this case, the items "a" and "b" can be defined as an integral data item by defining the segment "a" with the code, the segment "b" with the label, and the application with "a". Thus, at the time of selecting the data items which are required at the stage of exploiting the database data, the label "b" is excluded from the table of the data items displayed in the screen of the terminal unit, and only the business office or the representative name defined in the application blank "a" is displayed to improve the recognizability of the table display and to allow the system to automatically use the code and the label separately for the application. As a result, the exploiter of the database data need not use the code and the label separately.

Figure 29:
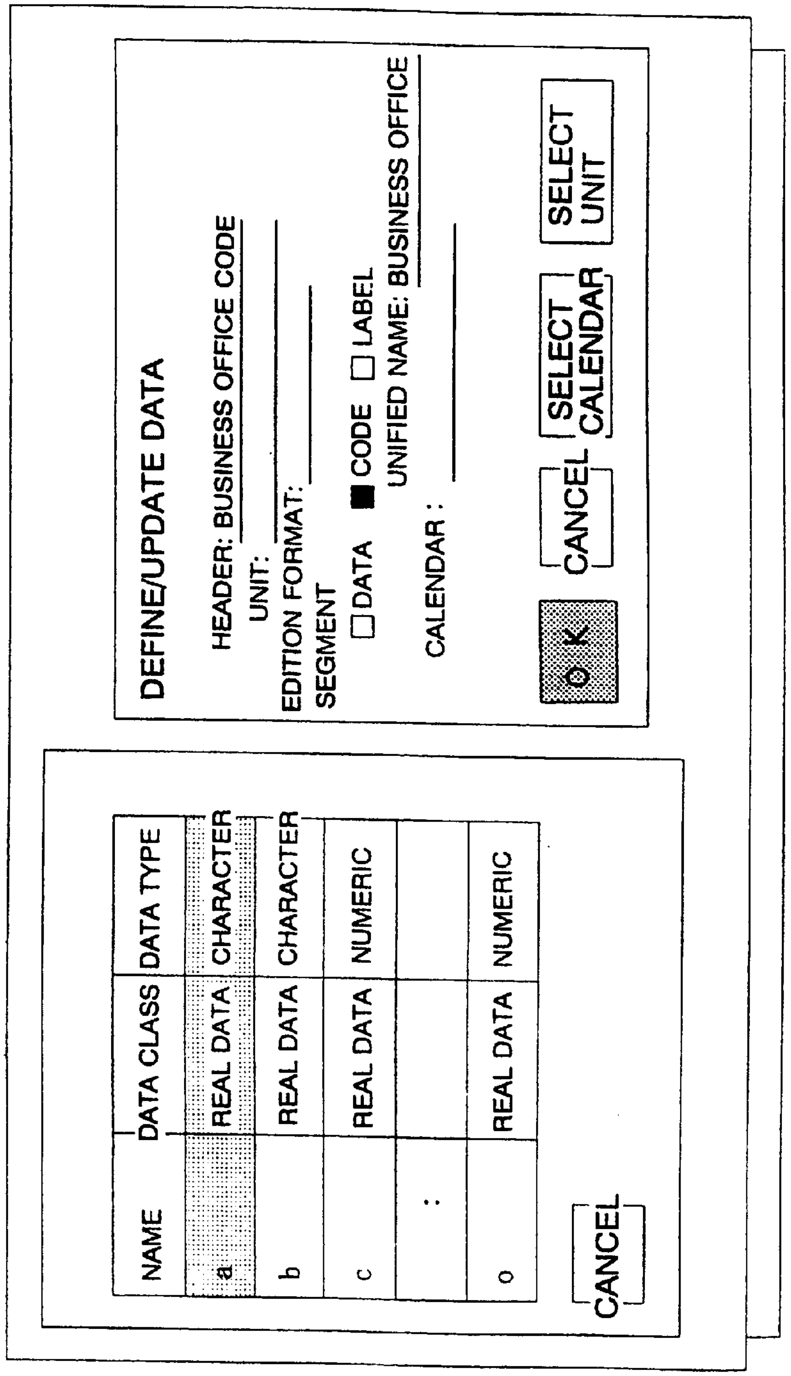
FIG. 29 is a diagram showing the display screen of a data item attribute defining worksheet for explaining the database system of FIGS. 2 to 4.

If the selection of the segment is the "CODE" at the time of defining/updating the extended data of the attributes of the data items, the input blank for the name of the integral data item, i.e., the integral name is additionally displayed in the worksheet, as shown in FIG. 29. In FIG. 29, the "BUSINESS OFFICE" is defined as the integral name.

Into the worksheet, as shown in FIGS. 28 and 29, the terminal operator inputs the attribute data by using the keyboard or the like and selects the "OK" button by using the mouse or the like. Then, the completion of the definition of one data item is recognized to update the corresponding blank of the data item attribute recording area (as shown in FIG. 27) of the dictionary 3. When this updating operation is effected, the worksheet can be deleted from the display screen to select a subsequent data item.

Figure 30:
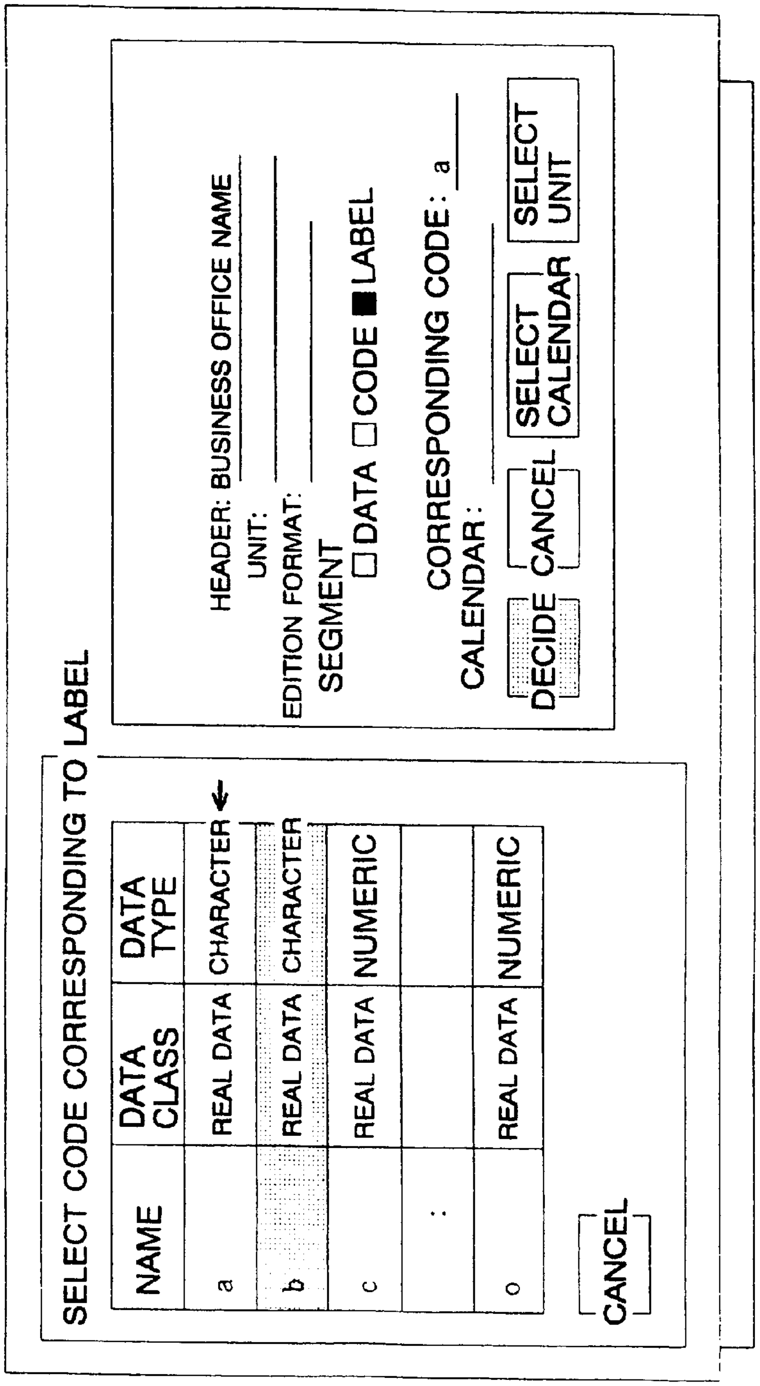
FIG. 30 is a diagram showing the display screen of a data item attribute defining worksheet for explaining the database system of FIGS. 2 to 4.

If, on the other hand, the selection of the segment is set to the "LABEL" at the time of defining/updating the extended data of the attribute data of the aforementioned data item, the input blank of the corresponding code is additionally displayed in the worksheet, as shown in FIG. 30. The corresponding code can be selected from the data item table at the lefthand side of the screen by using the mouse or the like. In FIG. 30, the data item "a" is defined as the code corresponding to the data item "b" or the label.

Figure 31:
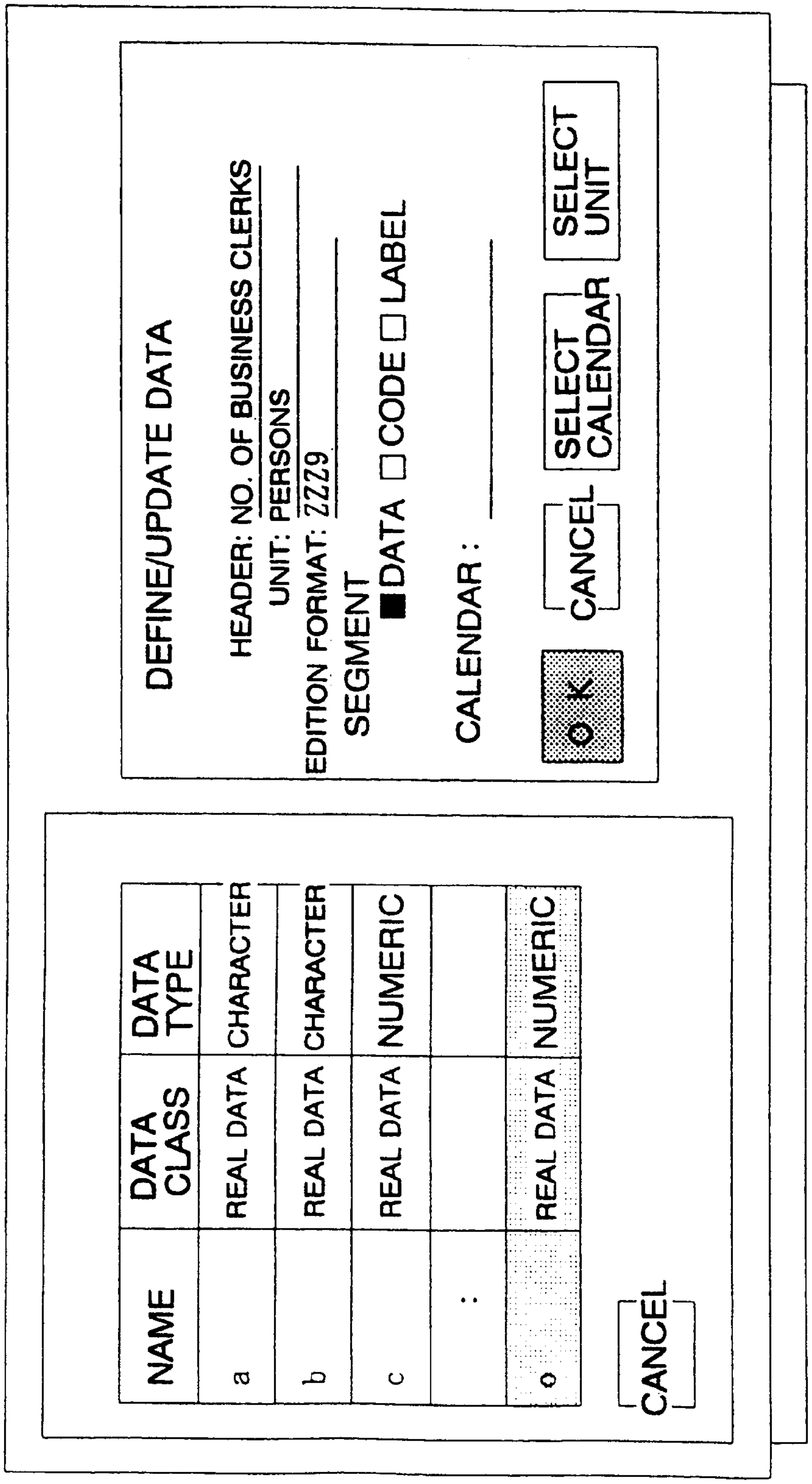
FIG. 31 is a diagram showing the display screen of a data item attribute defining worksheet for explaining the database system of FIGS. 2 to 4.
Figure 32:
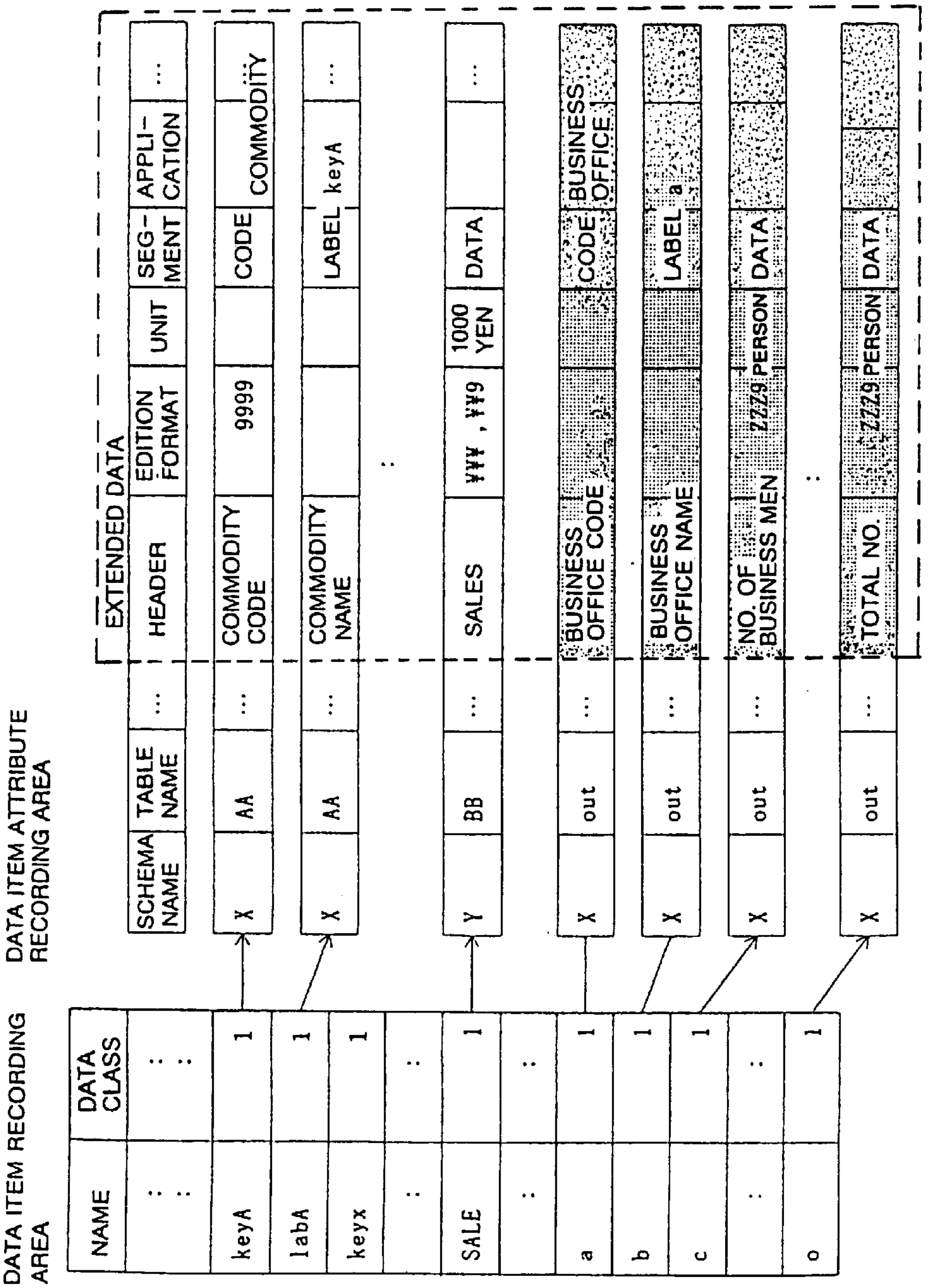
FIG. 32 is a diagram for explaining the data item recording area and the data item attribute recording area of the database system of FIGS. 2 to 4.

The extended data of the data item recording area the data item attribute recording area of the dictionary at the completion stage of the definition of all the data items "a" to "o" of the table "out", as shown in FIG. 31, take the state, as shown in FIG. 32.

(1-4) Definition of Table Data (Segments of Table)

By the control of the data setup main controller 11 of the setup unit 4, the initial menu of the setup operation, as shown in FIG. 23, for starting a predetermined operation for the setup is displayed in the screen of the terminal unit. When the terminal operator selects a menu item corresponding to the definition of the table data, i.e., to the table definition from the menu of FIG. 23 by the mouse or the like, the control is transferred to the table data definer 13.

Figure 33:
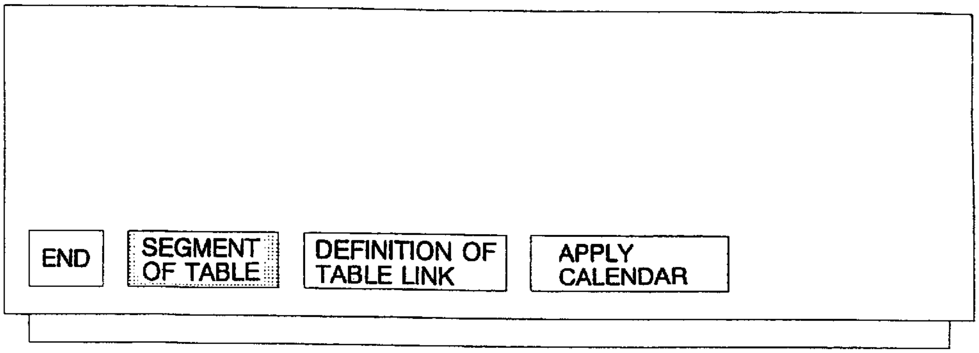
FIG. 33 is a diagram showing the display screen of the initial menu of a table defining processing for explaining the database system of FIGS. 2 to 4.

The table data definer 13 defines the table segment (or meaningful sorting) for facilitating the set up operation of the table, the linking condition between the tables, and the application of the calendar to the table. For these operations, the table data definer 13 displays the menus for starting the individual defining functions of the table segment, the table linking definition and the calendar application, as shown in FIG. 33, in the screen of the terminal unit. When the terminal operator selects a menu item corresponding to the segment of the table in this menu by using the mouse or the like, the table data definer 13 transfers the control to the table sorter 14. As a result of the calendar application to the table, the database data, to which each target calendar is applied, can be exploited on the basis of the calendar.

The table sorter 14 sorts the tables which are registered/managed by the public database 2. The tables, as registered/managed by the public database 2, can be sorted into the master data, the processed master data, the transaction data, the processed transaction data, the time series data, the secondary table, and so on.

The table sorter 14 sorts and lists the tables in the screen of the terminal unit, as shown in FIG. 35, with reference to the table management data which are recorded/managed by the table management data recording area of the dictionary 3, as shown in FIG. 34. In FIG. 35, there is shown the case in which the "MASTER" button is selected from the lefthand table of the screen, and the "OK" button is then selected.

Figure 36:
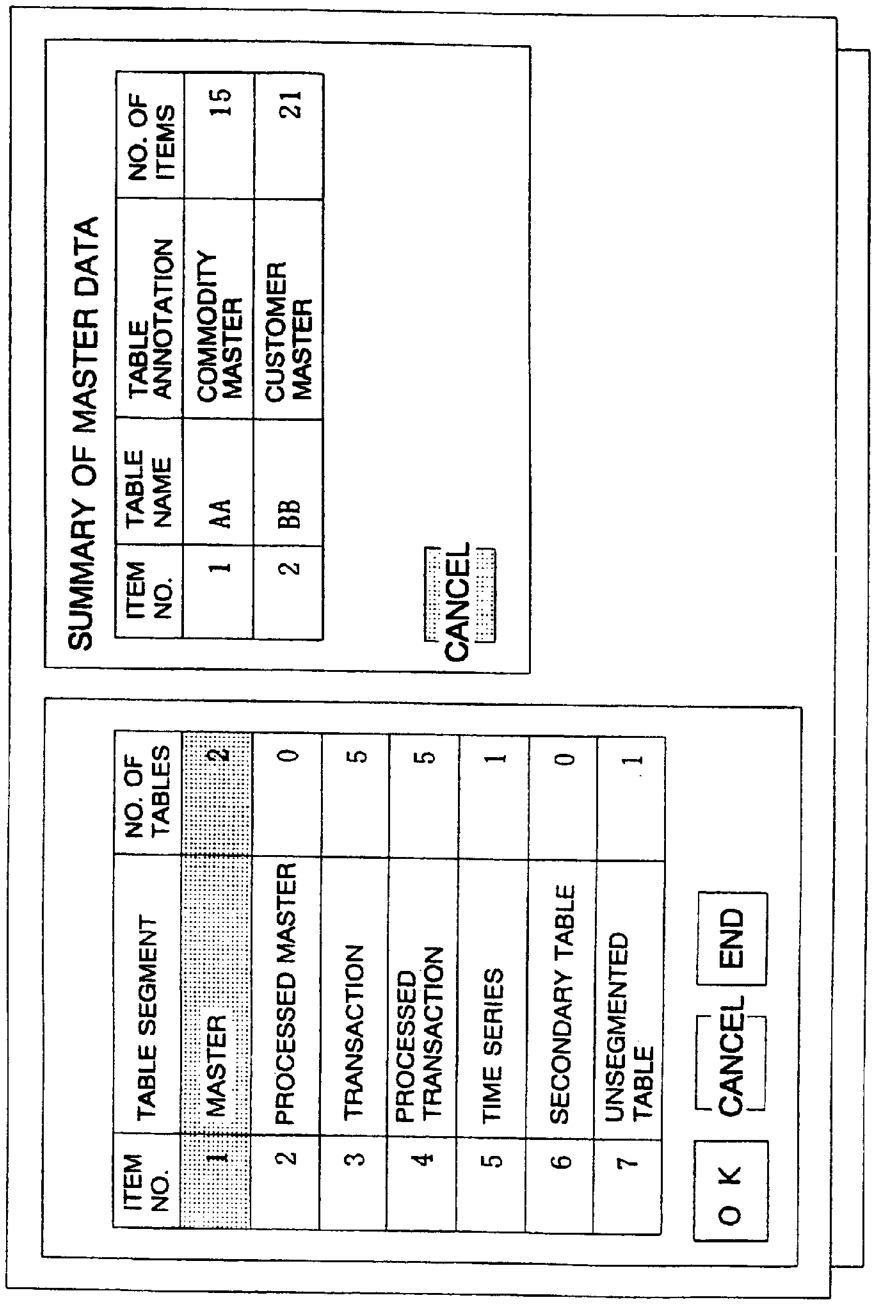
FIG. 36 is a diagram showing a table selecting screen for explaining the database system of FIGS. 2 to 4.

When the "OK" button is selected, there is displayed the table which belongs to the righthand segments of the screen of the terminal unit, as shown in FIG. 36. The list display of this table makes it possible to know the tables of every segments. By selecting the "DELETE" button in the screen of FIG. 36, the list display of the tables is deleted from the screen of the terminal unit and restores the state for selecting the table segments of FIG. 35.

From the table number of the "UNSEGMENTED TABLES" in the list of the table segments, as displayed in the selecting screen of the table segments of FIG. 35, it is found that there is one unsegmented table.

Figure 37:
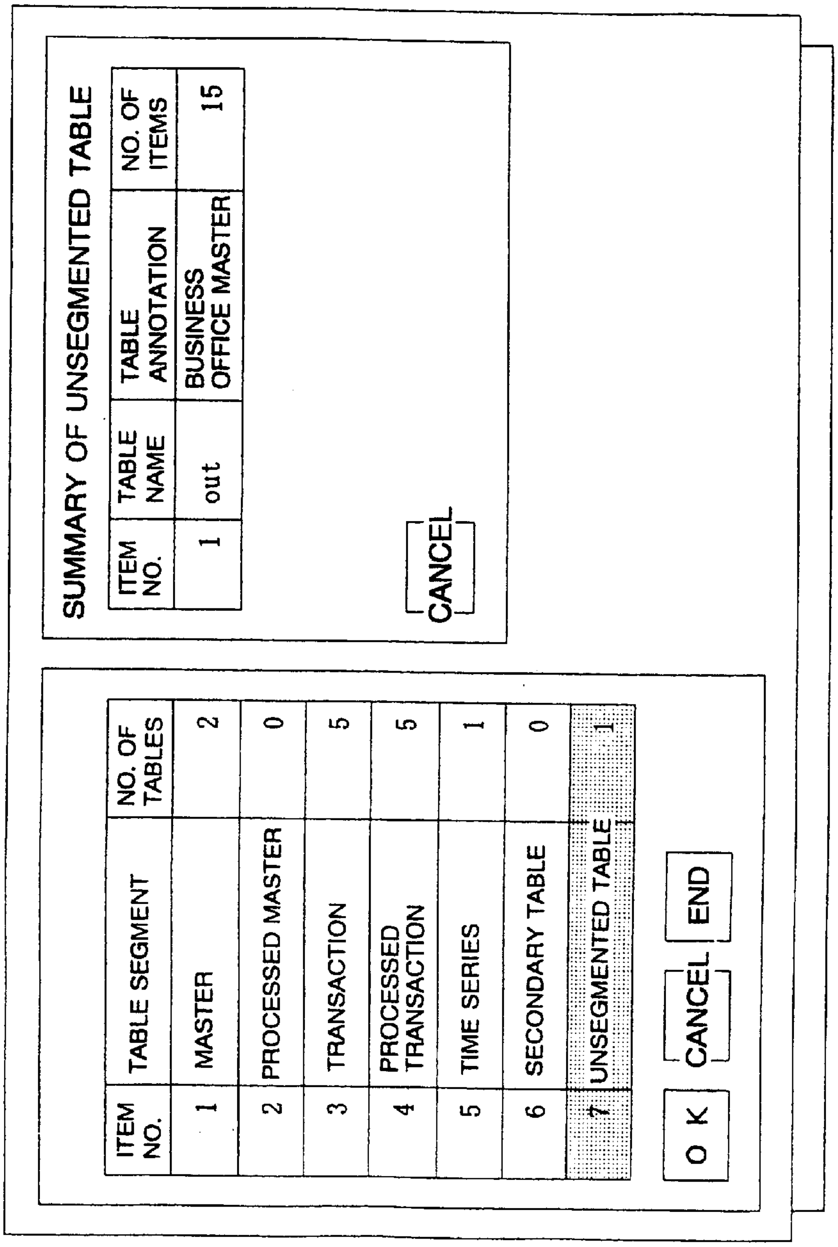
FIG. 37 is a diagram showing the selecting screen for explaining the database system of FIGS. 2 to 4.

When the "OK" button is selected after the "UNSEGMENTED TABLE", the list of unsegmented tables is displayed at the righthand side of the screen of the terminal unit, as shown in FIG. 37. In FIG. 37, it is displayed that the table having the name "out" exists as the unsegmented table.

Figure 38:
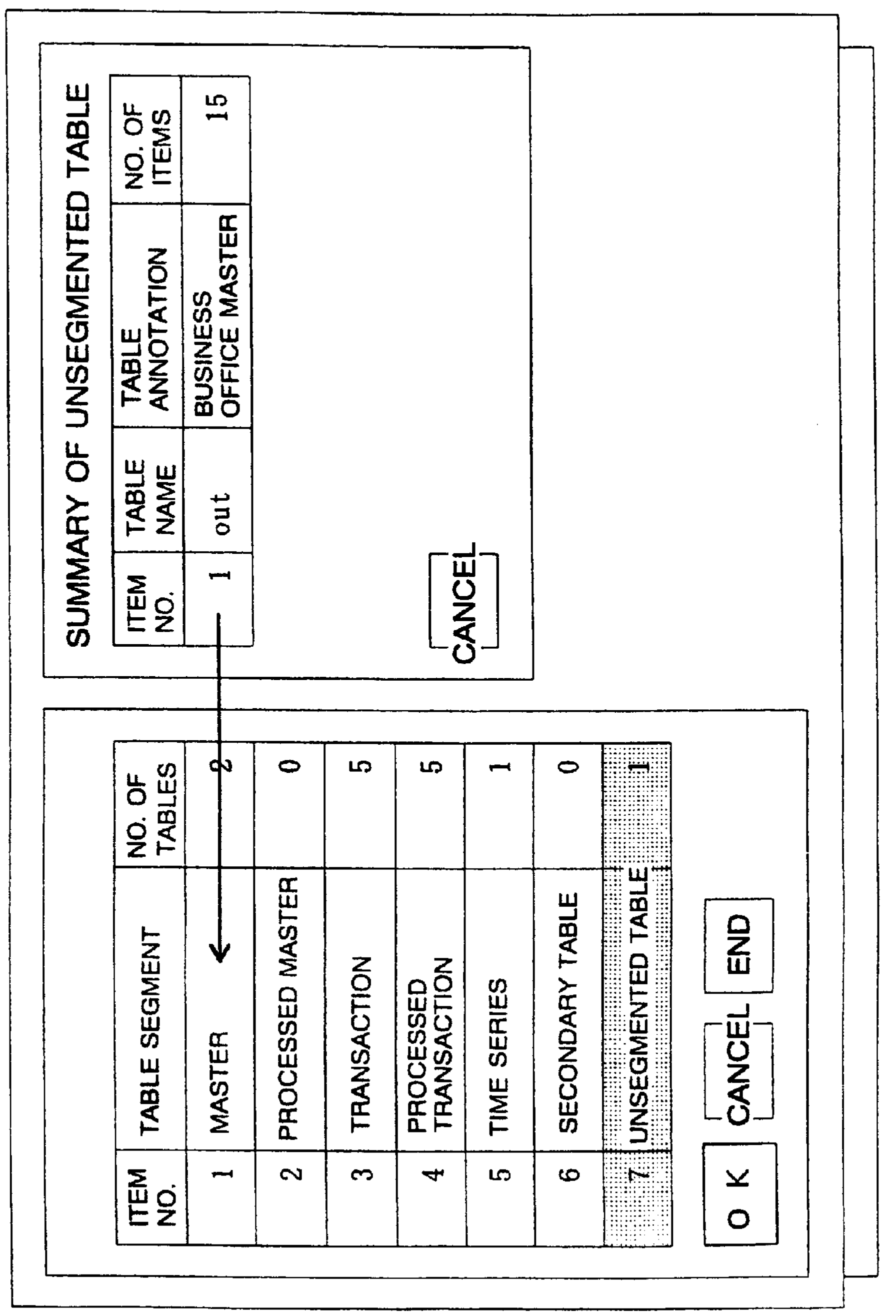
FIG. 38 is a diagram showing a table selecting screen for explaining the database system of FIGS. 2 to 4.

In this state, the segment can be set/changed by selecting the unsegmented table in the list of the un segmented tables at the righthand side of the screen of the terminal unit and by attaching it to the location of the segment corresponding to the list of the table segments at the lefthand side. FIG. 38 schematically shows the case in which the table "out" is sorted to the table segment "MASTER".

In the list of the table segments, the display of tables is moved according to the aforementioned setting, and the table segment columns of the table management data area on the dictionary 3 are updated by the codes corresponding to the set table segments.

Figure 39:
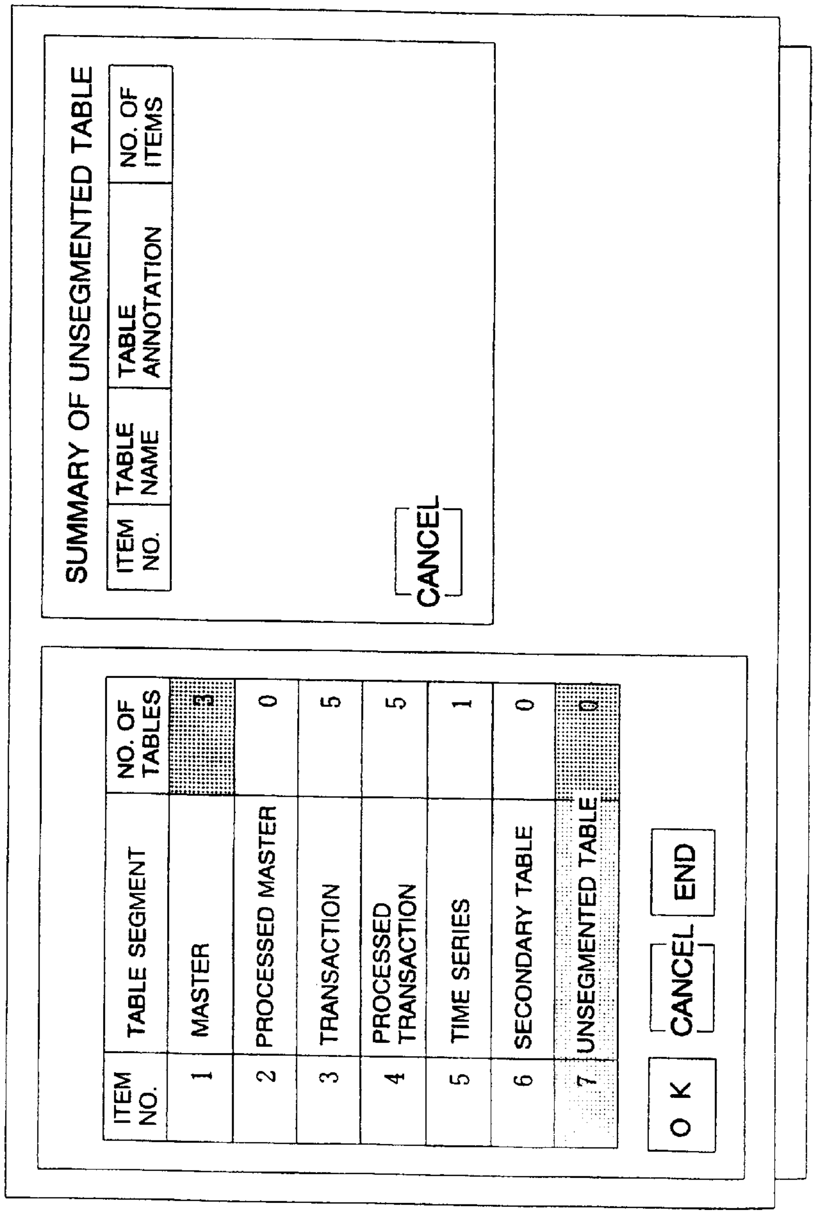
FIG. 39 is a diagram showing a table selecting screen for explaining the database system of FIGS. 2 to 4.

Specifically, by the attaching operation, the segment of the table is decided, and this table is erased from the list of the unsegmented tables at the righthand side of the screen of the terminal unit, as shown in FIG. 39, so that the number of tables in the list of the table segments at the lefthand side of the screen is changed. In FIG. 39, the table number of the table segments "MASTER" is changed from "2" to "3", and the table number of the "UNSEGMENTED TABLES" is changed from "1" to "0". Simultaneously with this change of display, the table segment column of the table management data recording area of the dictionary 3 is also rewritten, as shown in FIG. 40.

At this time, by displaying the table list of the table segments "MASTER", as shown in FIG. 41, it can be confirmed that the unsegmented table "out" has been segmented as the "MASTER".

(1-5) Definition of Table Data (Link Definition of Tables)

Here will be described the definitions of the linking conditions between the tables for facilitating the setup operations of tables by the table data definer 13. This table definer 13 transfers the control to the table combination definer 15 when the terminal operator selects the menu item corresponding to the table linking definition from the menu shown in FIG. 33, for example.

The table combination definer 15 defines the table linkages which are registered/managed by the public database 2. By defining the table linkages, the user need not input the table linking conditions each time a data item covering a plurality of tables is selected at the stage of exploiting the database data.

Whether or not the tables are linked is recorded/managed by the table management data recording area of the dictionary 3, as shown in FIG. 42. Moreover, the linking conditions are recorded/managed by the table link management data table which contains the data items composed of codes to be used for physically linking the tables and the linking method, as will be described hereinafter. This table link management data table is stored in the table link management data area of the dictionary 3.

The table combination definer 15 displays two lists for selecting the table segments at the righthand and lefthand sides of the screen of the terminal unit, as shown in FIG. 43, so as to facilitate the selection of the tables to be linked, so that the table segments can be selected by means of the mouse or the like.

In the aforementioned two lists, as shown in FIG. 43, it is assumed that the table segments such as the "MASTER" and "TRANSACTION" be selected.

As shown in FIG. 44, the tables, which individually belong to the selected table segments "MASTER (DATA)" and "TRANSACTION (DATA)", are tabulated at the righthand and lefthand sides of the screen of the terminal unit, and the terminal operator selects the table to be linked. In FIG. 44, the tables "BB" and "CC" are selected, for example.

When a table is thus selected, the data items composing each table are individually tabulated at the righthand and lefthand sides of the terminal unit so that the data items or the link keys can be selected. In this case, the data items are stepwise selected and displayed according to the instruction of the terminal operator.

In case there is displayed at first a data item, in which the segment column of the data item attribute recording area on the dictionary 3 is a link code or a code, but the desired link key is not displayed in this state, the remaining data items can be displayed by selecting the "DETAIL DISPLAY" button for displaying the data items in detail.

In FIG. 45, it is assumed that the item name keyx of the table "BB" and the item name keyx of the table "CC", for example, be selected as the link key.

If the "OK" button is selected after the link key has been selected from the righthand and lefthand lists of the screen, the worksheet for defining the linking method is displayed in the screen of the terminal unit, as shown in FIG. 46, so that the linking method can be defined.

The linking method is divided into four linking methods, as shown in FIG. 47, by which the codes corresponding to the jointing methods are recorded in the linking method columns in the table link management data tables of the table link management data ares to be recorded/managed by the dictionary 3, as shown in FIG. 48.

The selection of the linking methods is executed by selecting a desired linking method on the worksheet for selecting/defining the linking methods, as shown in FIG. 46. For example, FIG. 46 indicates that the "OK" button is selected after the "TRANSVERSE LINK OF EQUAL TABLES" has been selected as the linking method by using the mouse or the like.

Figure 50:
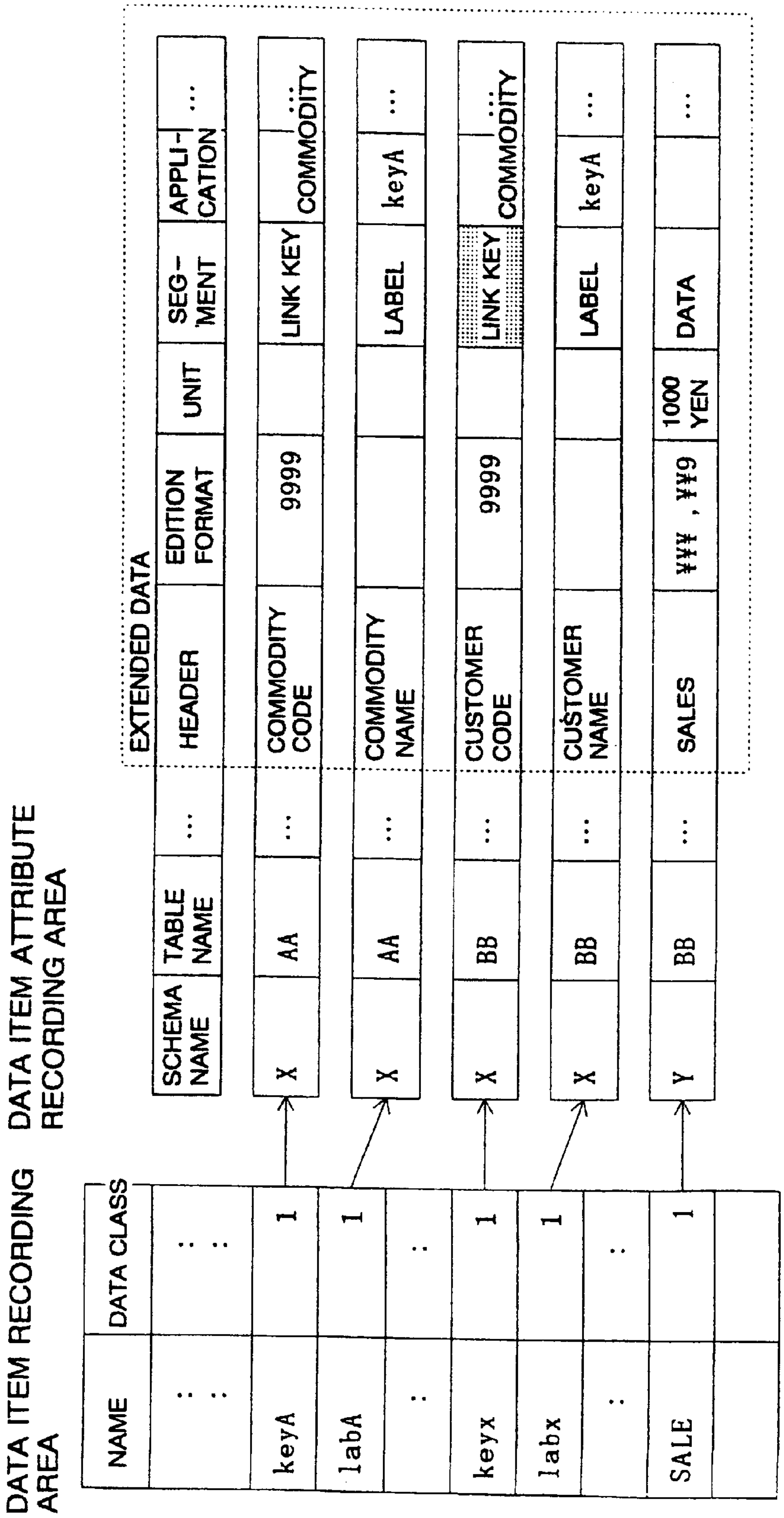
FIG. 50 is a schematic diagram for explaining the data item recording area and data item attribute recording area of the database system of FIGS. 2 to 4.

By selecting the "OK" button, the link definitions of a group of tables are completed, and the corresponding columns of the table link management data, the table management data and the data item attribute data, which are recorded/managed by the dictionary 3, are individually updated, as shown in FIGS. 48, 49 and 50. In the data item attribute area of FIG. 50, for example, the code of the segment column is changed to the link key.

(1-6) Definitions of Operation/Process Data Items

By the control of the data setup main controller 11 of the setup unit 4, the initial menu of the setup operations, as shown in FIG. 23, for starting a predetermined operation for the setup is displayed in the screen of the terminal unit. When the terminal operator selects the menu item corresponding to the definition of the data item, for example, from the menu of FIG. 23 by the mouse or the like, the control is transferred to the operated data item definer 16.

This operated data item definer 16 defines the method of generating the data item which does not exist in the public database 2, by operating/processing the data item which exists in the public database 2. The data item, as defined by this operated data item definer 16, is recorded/managed like the existing data item by the data item recording area and the data item attribute recording area of the dictionary 3.

This system can be given a function to execute the operations/processings by applying a calendar for each object/business.

Figure 51:
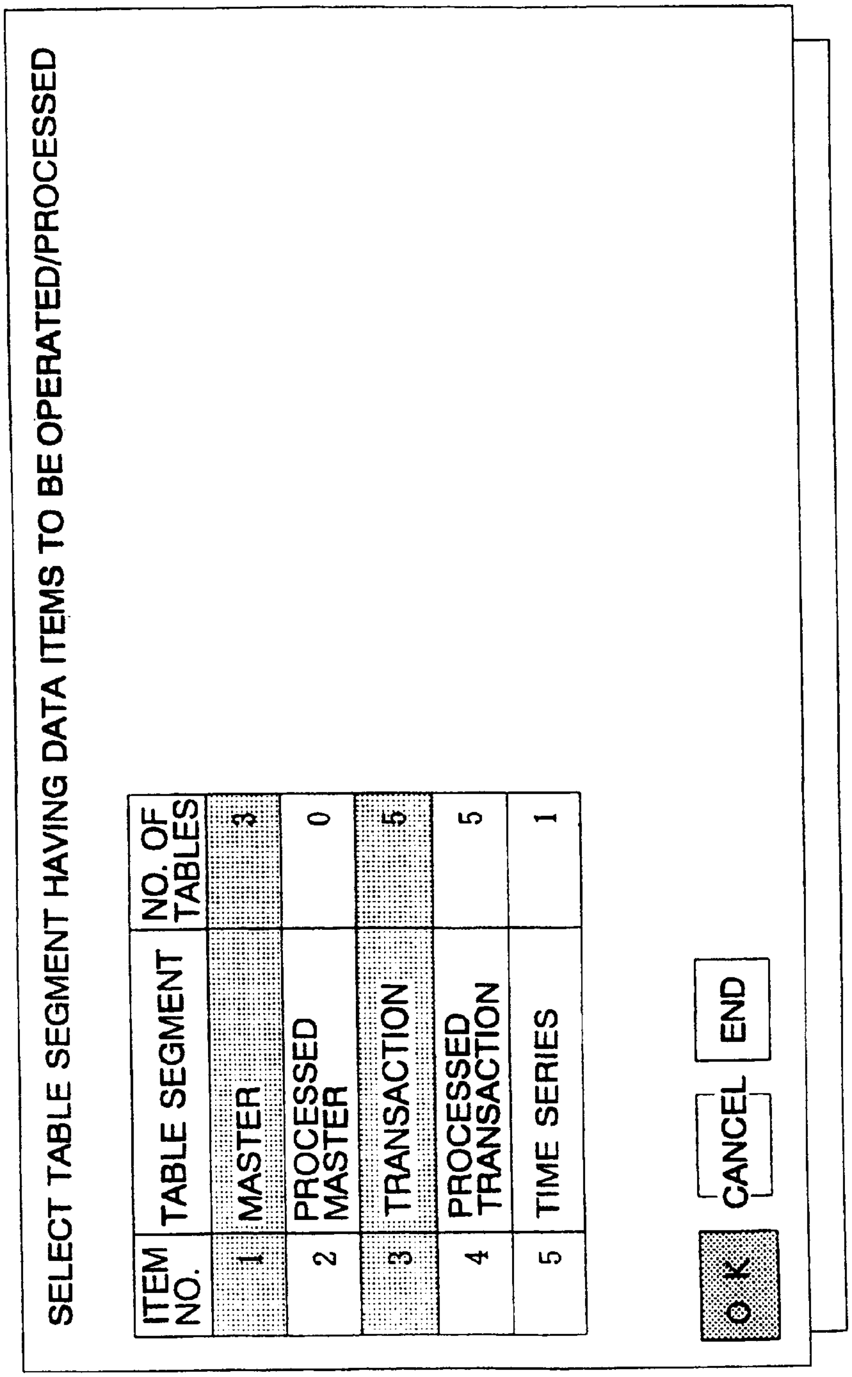
FIG. 51 is a diagram showing a table segment selecting screen for explaining the database system of FIGS. 2 to 4.

In order to facilitate the selection of the data item for defining the operations/processings, the operated data item definer 16 displays the list of table segments in the screen of the terminal unit, as shown in FIG. 51, so that the table segments can be selected by using the mouse or the like. In this case, for example, the table segments "MASTER" and "TRANSACTION" are selected in FIG. 51.

Next, as shown in FIG. 52, the tables belonging to the table segments, as selected, are tabulated in the screen of the terminal unit so that the terminal operator can select the tables by using the mouse or the like. In this case, for example, the tables "out" and "CC" are selected in FIG. 52.

Figure 53:
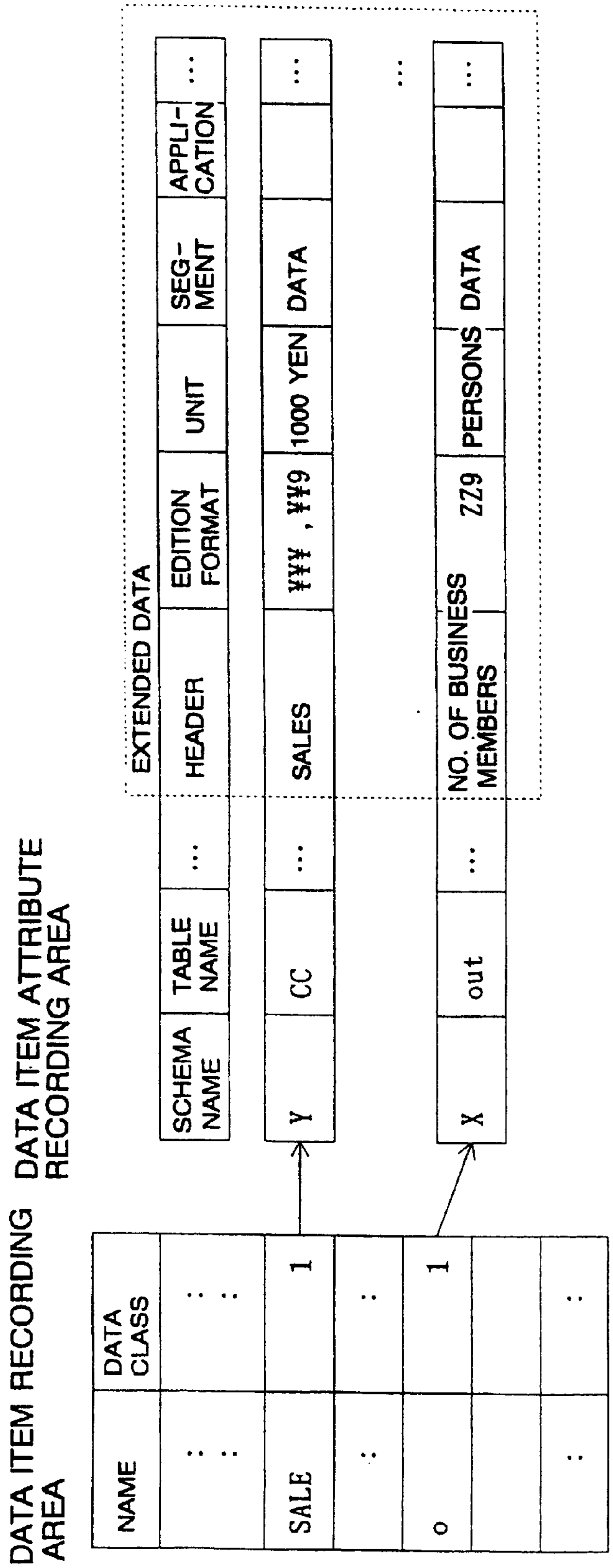
FIG. 53 is a schematic diagram for explaining the data item recording area and the data item attribute recording area of the database system of FIGS. 2 to 4.

When a table is selected, the operated data item definer 16 refers to the data item recording area, which is recorded/managed by the data item recording area and the data item attribute recording area (as shown in FIG. 53) of the dictionary 3, to display a list of the data items composing the selected table in the screen of the terminal unit and to display a worksheet for defining the operation/process formula at the righthand side of the screen.

In this worksheet for defining the operation/process formula, the operation/process formula can be generated by selecting the data items from the table list and by suitably repeating the selections of the operands (+, −, ×, ÷), the numerical values and the functions.

The operation/process formula can also be generated by quoting the function.

Figure 54:
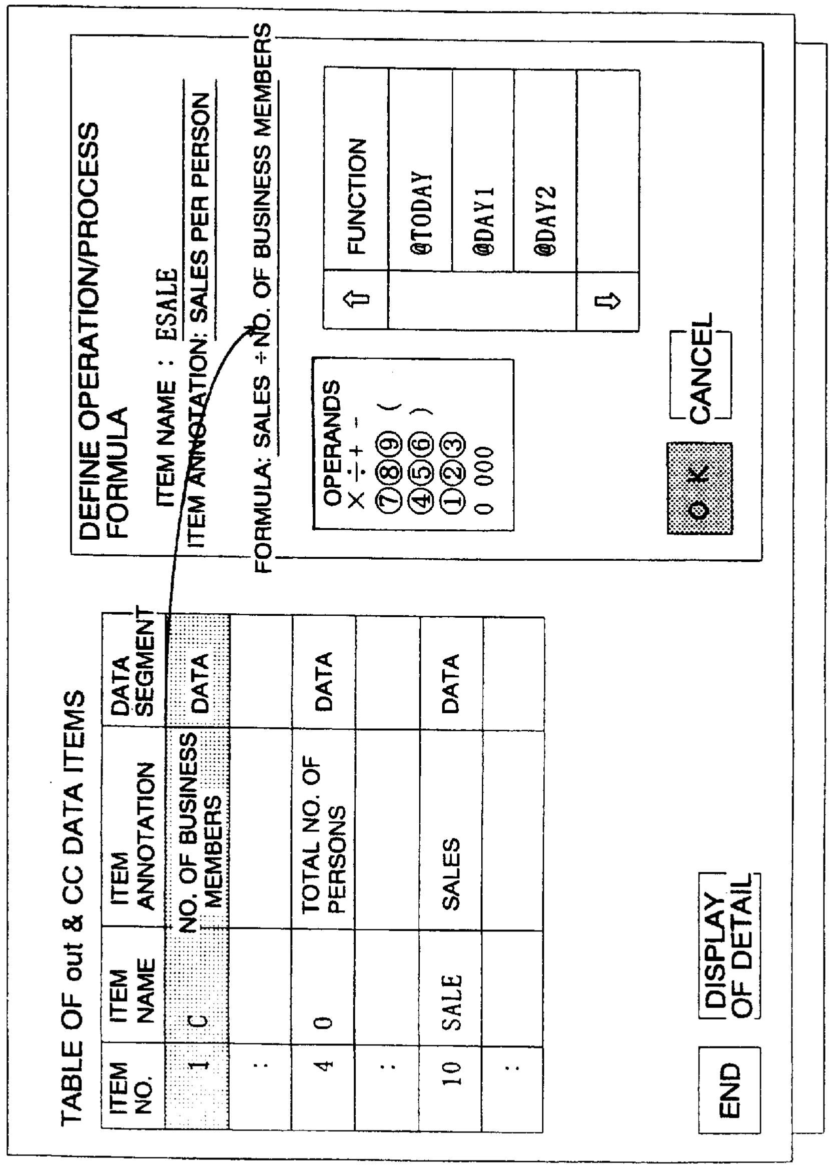
FIG. 54 is a diagram showing the display screen of an operation/process defining worksheet for explaining the database system of FIGS. 2 to 4.

FIG. 54 shows the situation in which a formula for calculating the volume of sales for each person is defined by dividing the volume of sales or the existing data item by the number of business members.

The data items this defined are tabulated while including the data items existing at the stage of exploiting the database data, so that the operations can be automatically scheduled merely by selecting the corresponding data items to extract the desired data value. As a result, the database data user can receive the benefits of the improvement in the operability with a reduced frequency of considering the operations/processings. Moreover, the operated data items need not exist on the database so that the volume of the database can be reduced.

As shown in FIG. 54, the data items to be tabulated at the lefthand side of the screen are stepwise selected/displayed by the instruction of the terminal operator. First of all, there are displayed the data items in which the segment columns of the data item attribute recording area on the dictionary 3 are data. In case the data item for defining the operations/processings cannot be found out, the remaining data items can be displayed by selecting the "DETAIL DISPLAY" button corresponding to the detail display of the data item by means of the mouse or the like.

Figure 55:
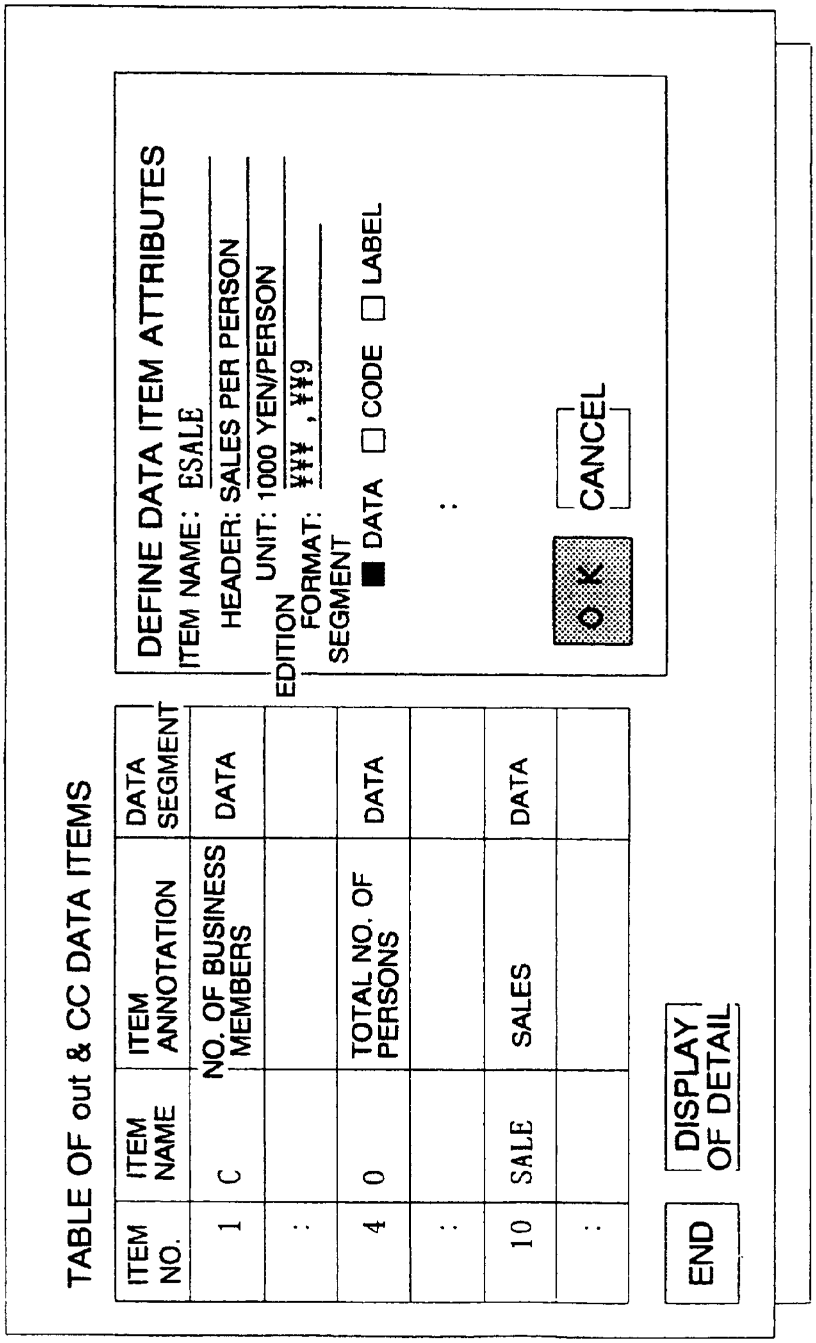
FIG. 55 is a diagram showing a data item attribute defining worksheet for explaining the database system of FIGS. 2 to 4.

By selecting the "OK" button in the worksheet of FIG. 54, moreover, the worksheet for defining the attribute data of the operated data items defined can be displayed, as shown in FIG. 55, to define the attribute data by using the keyboard or the like.

Figure 56:
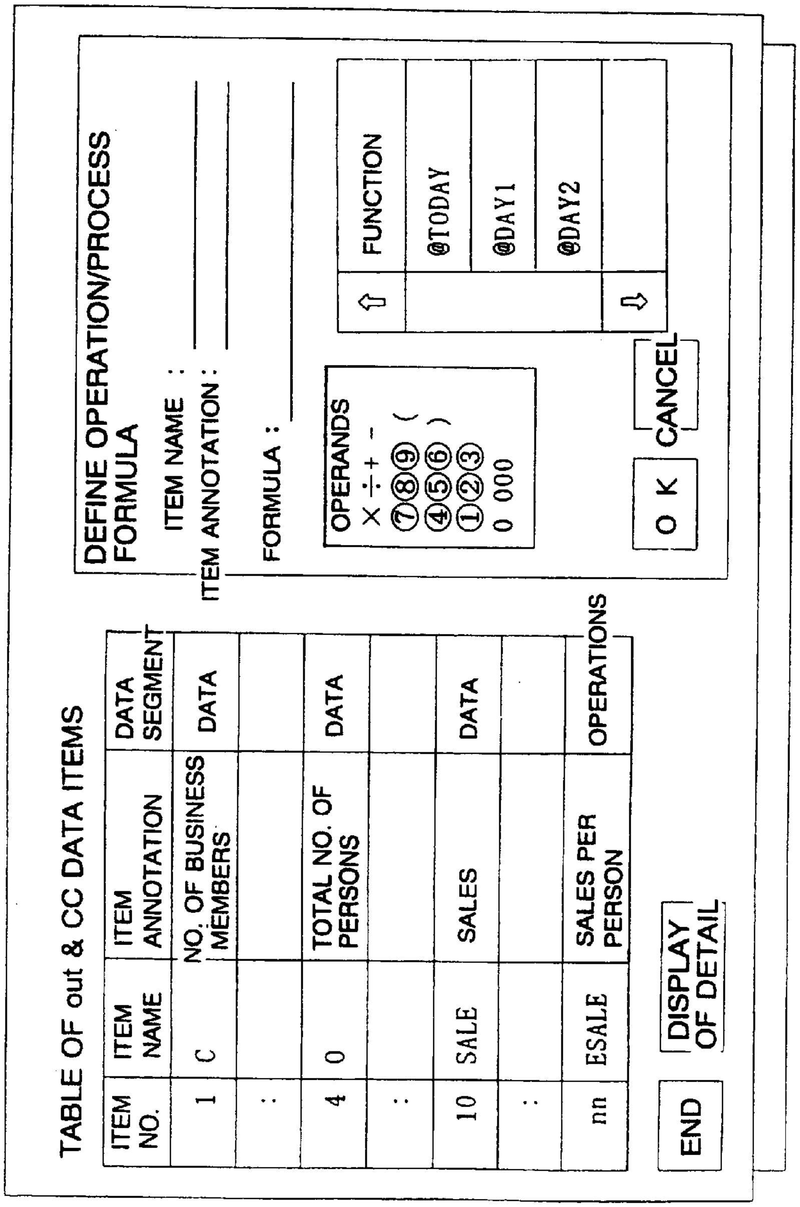
FIG. 56 is a diagram showing the display screen of the operation/process defining worksheet for explaining the database system of FIGS. 2 to 4.
Figure 57:
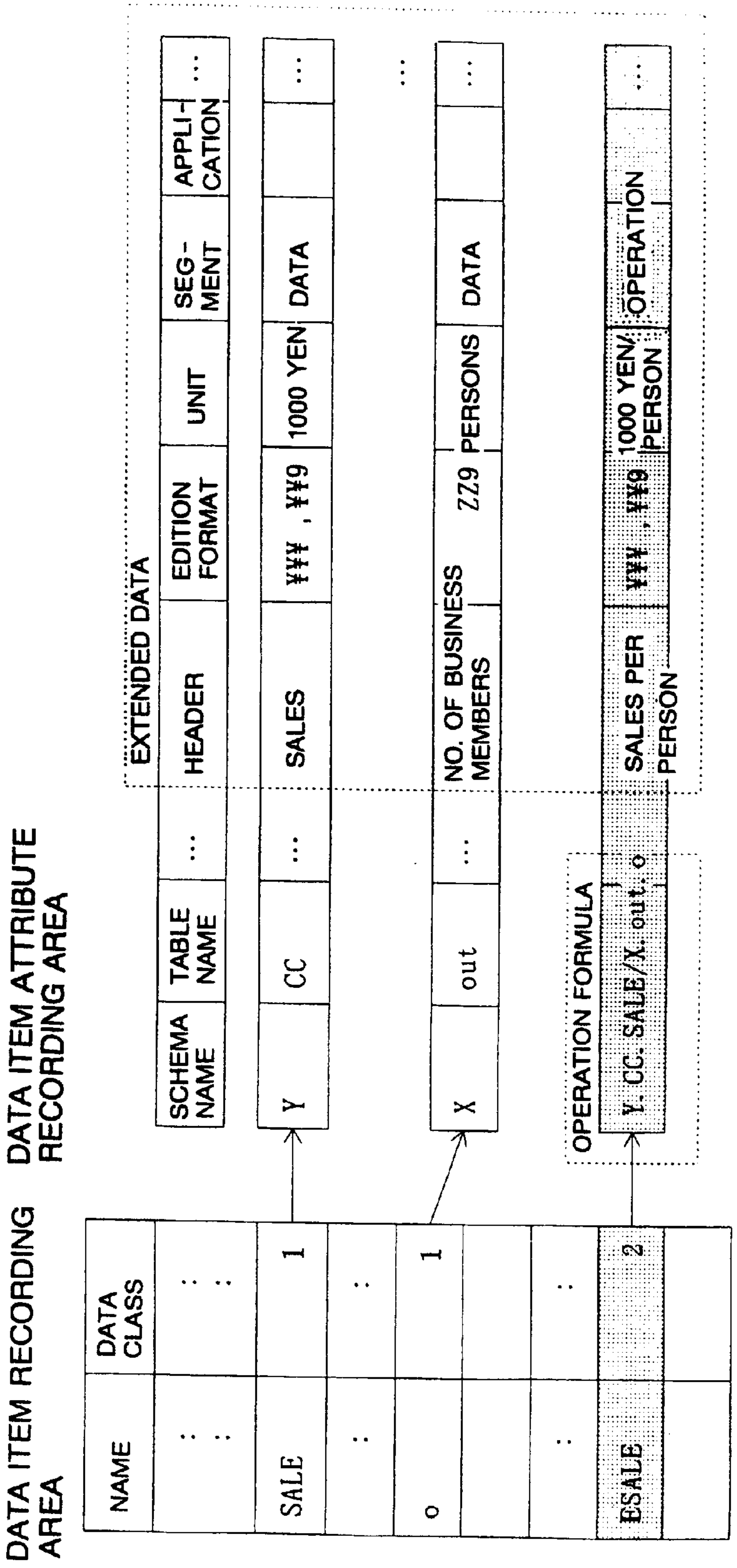
FIG. 57 is a schematic diagram for explaining a data item recording area and a data item attribute recording area of the database system of FIGS. 2 to 4.

By selecting the "OK" button by the mouse or the like in the screen of the data item attribute defining worksheet of FIG. 55, the definitions of the operated data items are completed and additionally displayed in the list of the data items, as shown in FIG. 56, and the defined data items are added like the existing data items to the data item recording area and the data item attribute recording area of the dictionary 3, as shown in FIG. 57. Of the "DATA CLASS" of the data item recording area of FIG. 57, "1" implies the existing data item, and "2" implies the operated data item.

(1-7) Grouping Definitions of Data Items

By the control of the data setup main controller 11 of the setup unit 4, the initial menu, as shown in FIG. 23, for starting a predetermined processing for the setup is displayed in the screen of the terminal unit. When the terminal operator selects the menu item corresponding to the grouping of the data items from the menu of FIG. 23 by the mouse or the like, the control is transferred to the data item grouping definer 18.

Figure 58:
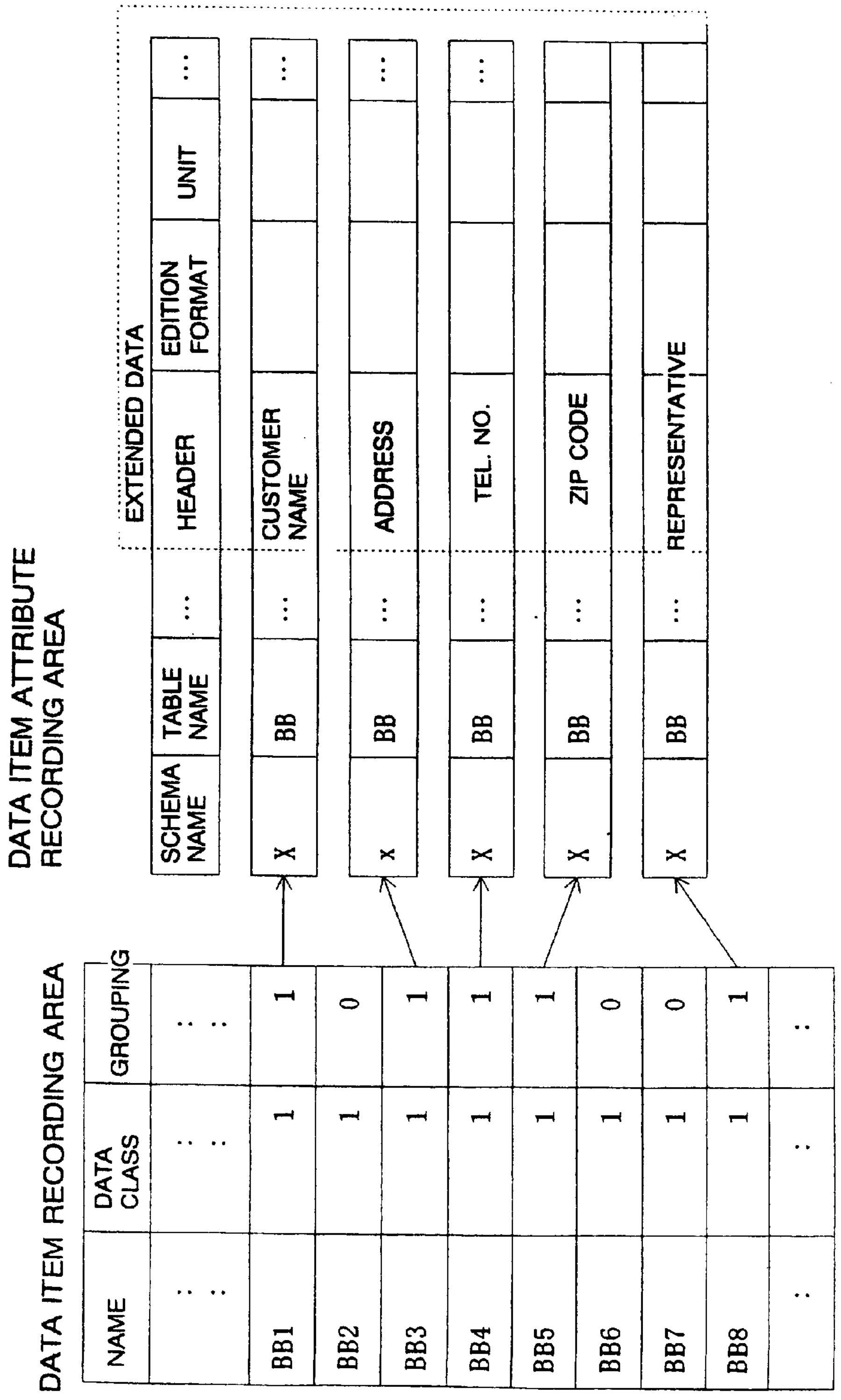
FIG. 58 is a schematic diagram for explaining a data item recording area and a data item attribute recording area of the database system of FIGS. 2 to 4.

This data item grouping definer 18 has a function to define the data items as a group in the sense of the exploiting stage of the database data. By this grouping, the data items to be tabulated at the time of exploiting the database data can be stepwise displayed to facilitate their retrieval. The data item grouping definition data are linked to the data item recording area in the dictionary 3, as shown in FIG. 58, and are recorded/managed by the data item grouping definition data recording area of FIG. 59. Of the "GROUPING" of the data item recording area of FIG. 58, "0" implies that the grouping data item is undefined, and "1" implies that the grouping data item is defined.

Figure 60:
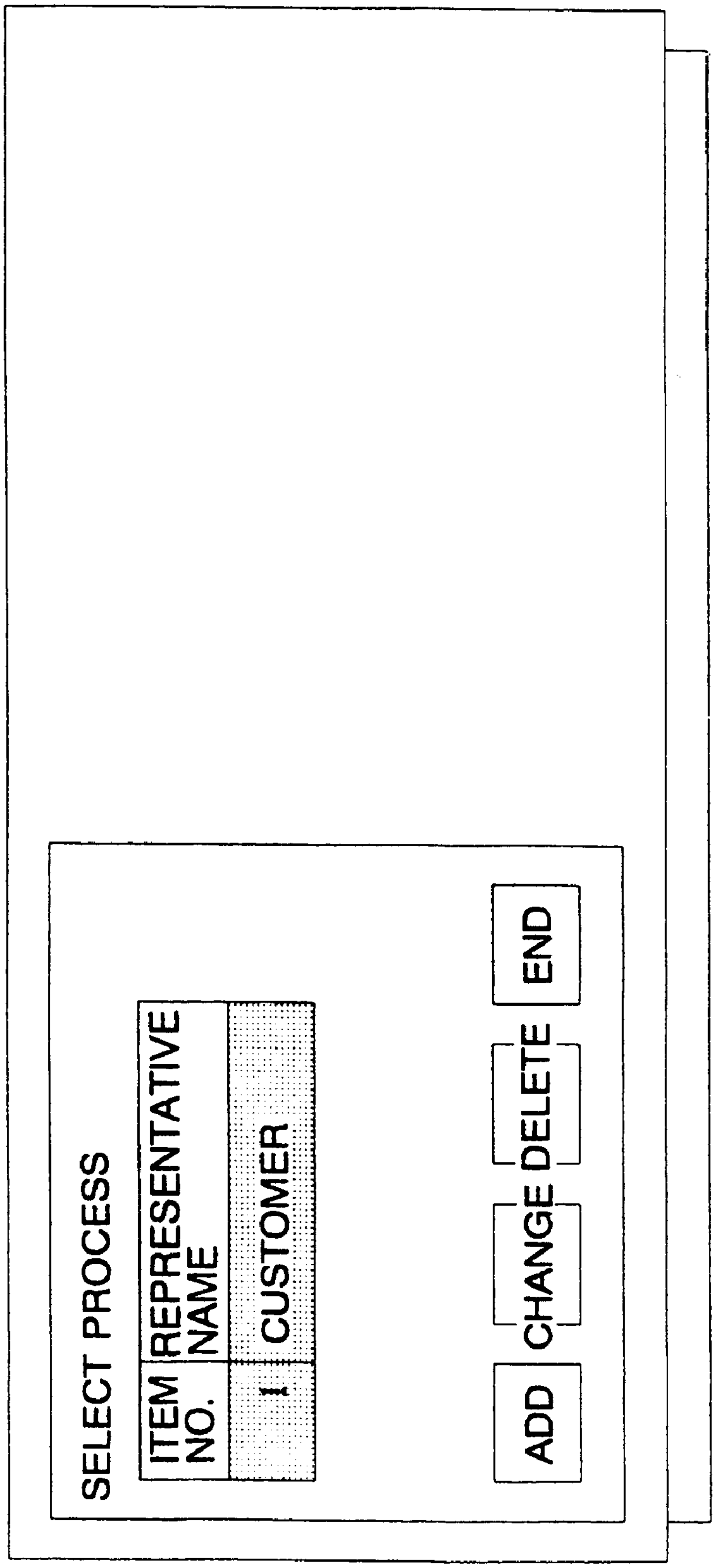
FIG. 60 is a diagram showing a representative name selecting screen for explaining the database system of FIGS. 2 to 4.

The data item grouping definer 18 refers to the data item grouping definition data recording area, as recorded/managed by the dictionary 3, to list up the representative names in the screen of the terminal unit, as shown in FIG. 60.

Figure 61:
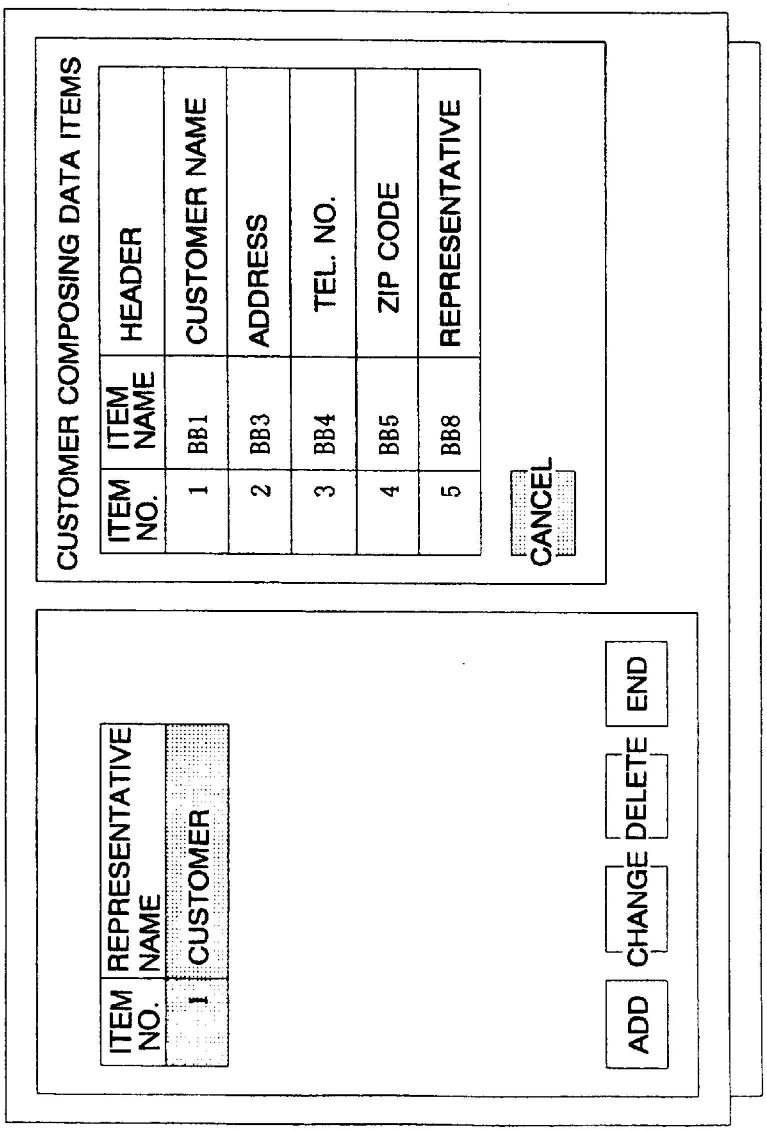
FIG. 61 is a diagram showing the display screen of the table of grouping data items for explaining the database system of FIGS. 2 to 4.

When a desired representative name is selected, the data items composing the group having the selected representative names are displayed in a list at the righthand side of the screen, as shown in FIG. 61. FIG. 61 shows that it is displayed by selecting the representative name "CUSTOMER" that the grouping data items of the representative name "CUSTOMER" are composed of the data items "CUSTOMER NAME", "ADDRESS" and so on.

In the screen of FIG. 61, the display of the list of the grouping data items is deleted to restore the representative name selecting screen of FIG. 60 by selecting the "DELETE" button in the screen of FIG. 61.

Figure 62:
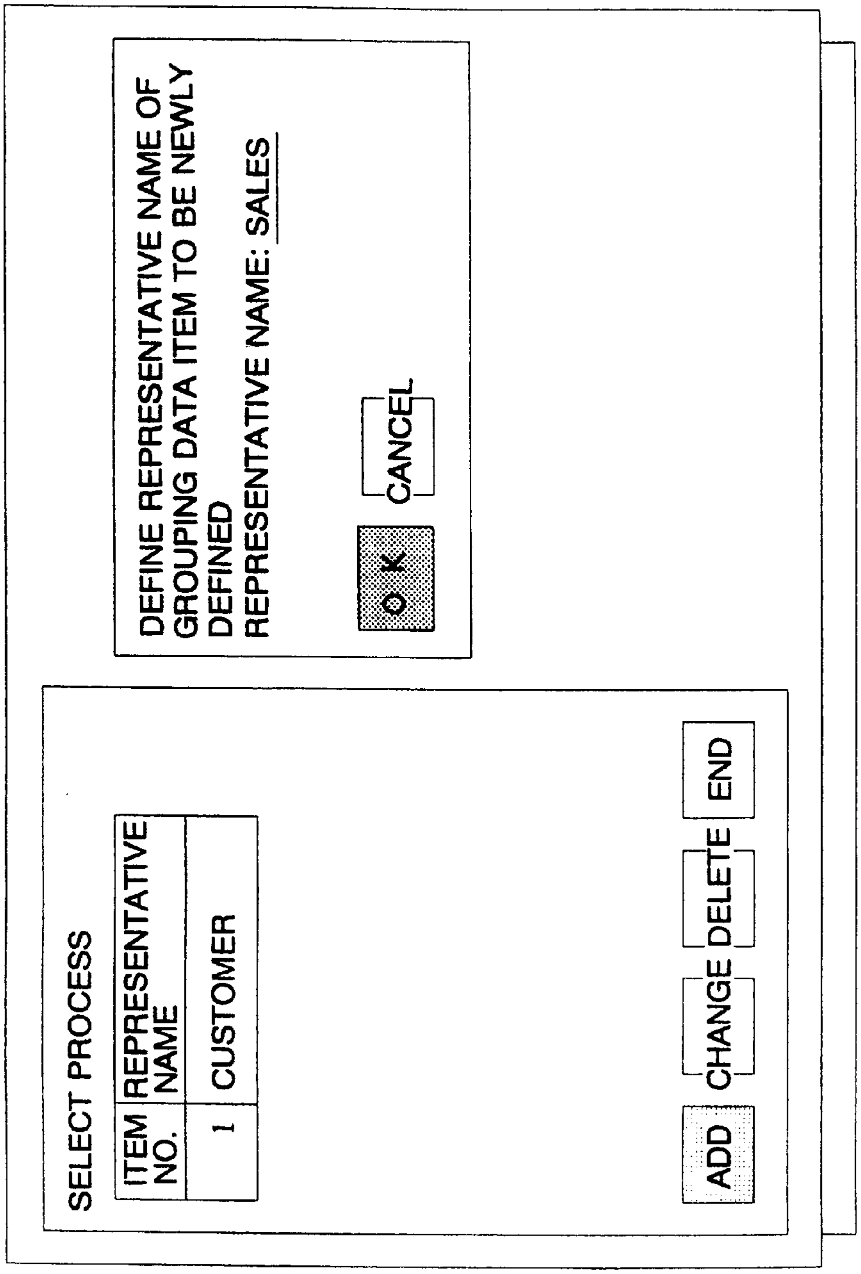
FIG. 62 is a diagram showing the display screen of a representative name defining worksheet for explaining the database system of FIGS. 2 to 4.

If the "ADD" button is selected in the screen of FIG. 60 without selecting the representative name, the data item grouping definer 18 can display the worksheet for defining the representative name at the righthand side of the terminal screen, as shown in FIG. 62, to define the representative name.

Figure 63:
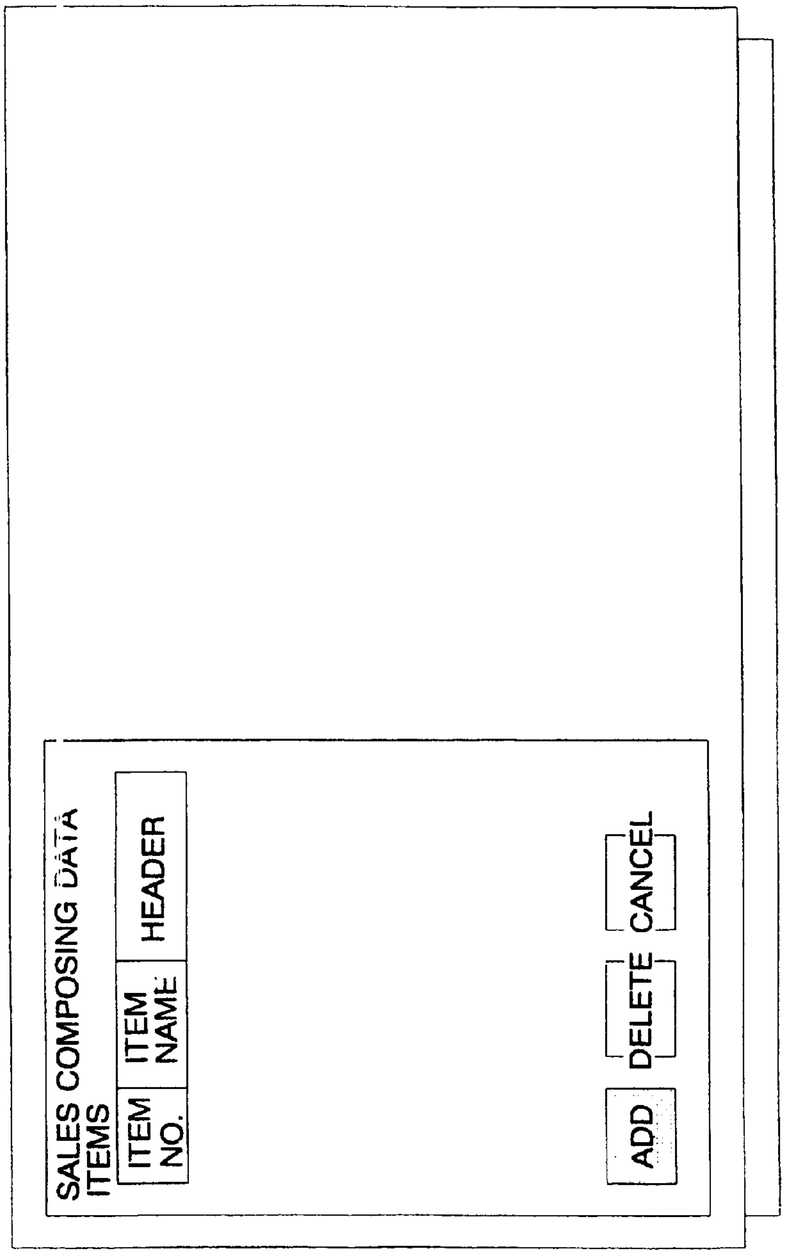
FIG. 63 is a diagram showing the display screen of the table of grouping data items for explaining the database system of FIGS. 2 to 4.

When the terminal operator inputs the representative name to the worksheet for defining the representative name at the righthand side of the terminal screen shown in FIG. 62 by using the keyboard or the like and selects the "OK" button by the mouse or the like, the data item grouping definer 18 displays the list of the grouping data items at the lefthand side of the screen of the terminal unit. In this case, however, the list of the data items is not displayed unlike FIG. 63, because of the novel definition.

Figure 64:
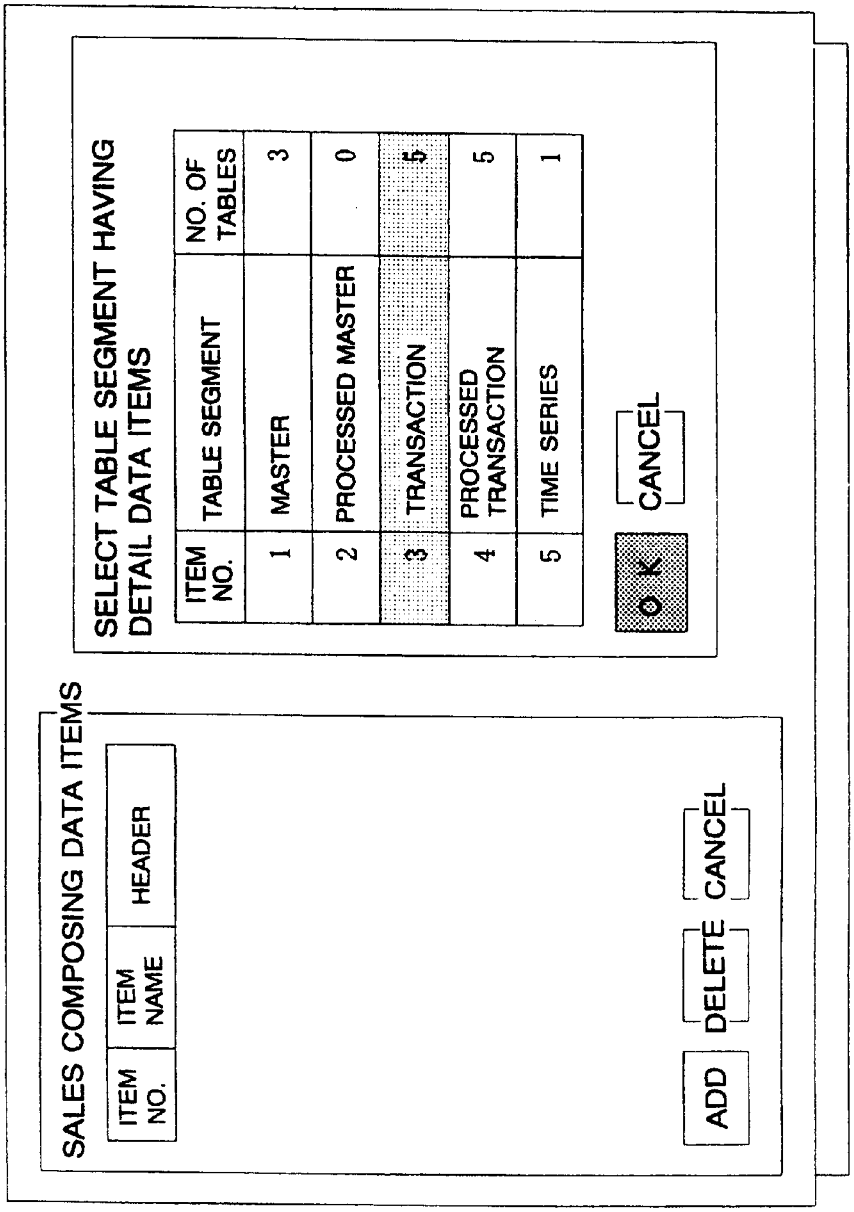
FIG. 64 is a diagram showing a table segment selecting screen for explaining the database system of FIGS. 2 to 4.

By selecting the "ADD" button by the mouse or the like, the selecting screen of the table segments is displayed at the righthand side of the screen, as shown in FIG. 64, so that the selection of the listed data items is started.

Specifically, in order to facilitate the selection of the data items, the list for selecting the table segments is displayed in FIG. 64 at the righthand side of the screen of the terminal unit so that the table segments can be selected by using the mouse or the like. For example, the "TRANSACTION" is selected as the table segment.

Figure 65:
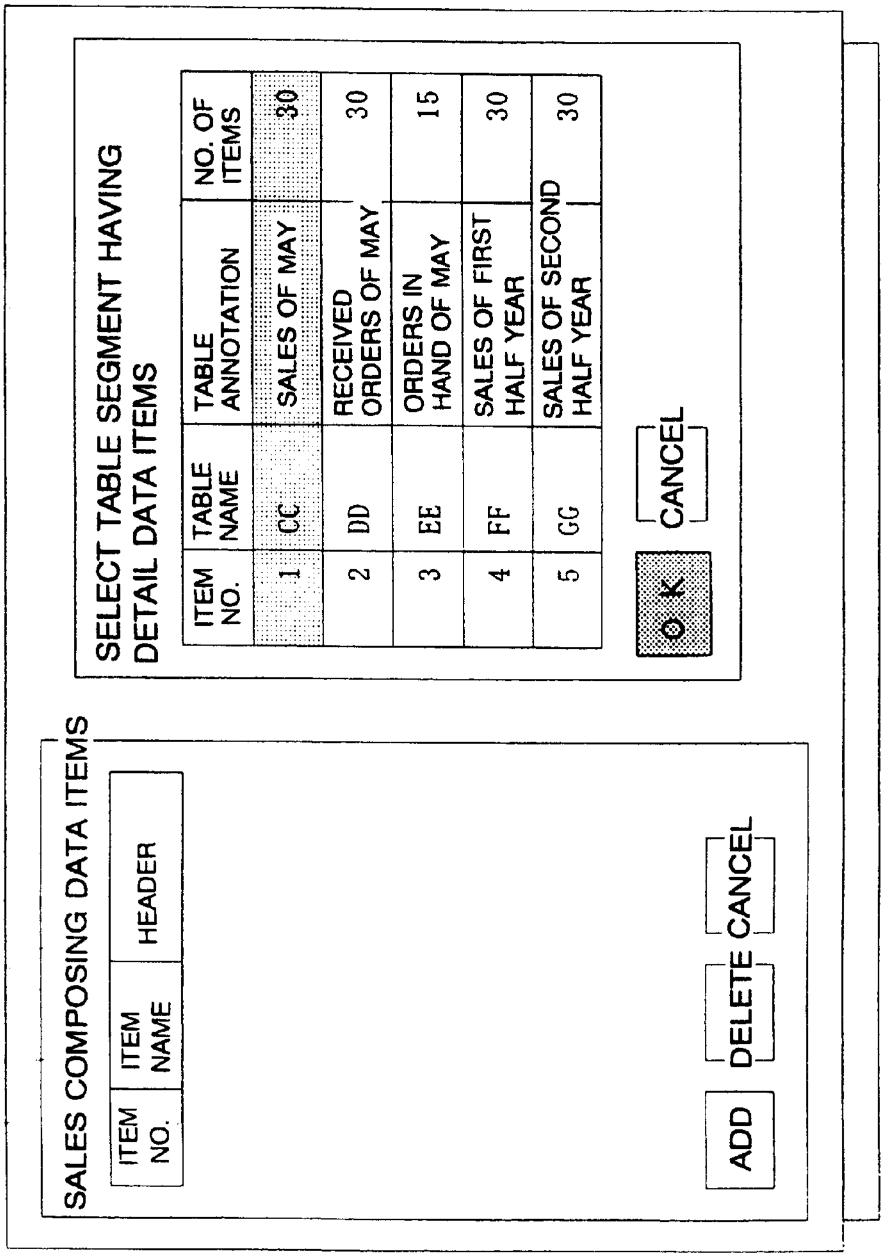
FIG. 65 is a diagram showing a table selecting screen for explaining the database system of FIGS. 2 to 4.

When a table segment is selected, the data item grouping definer 18 displays the table list of the selected table segment, as shown in FIG. 65, so that the table such as the "CC" can be selected by the terminal operator using the mouse or the like.

Figure 66:
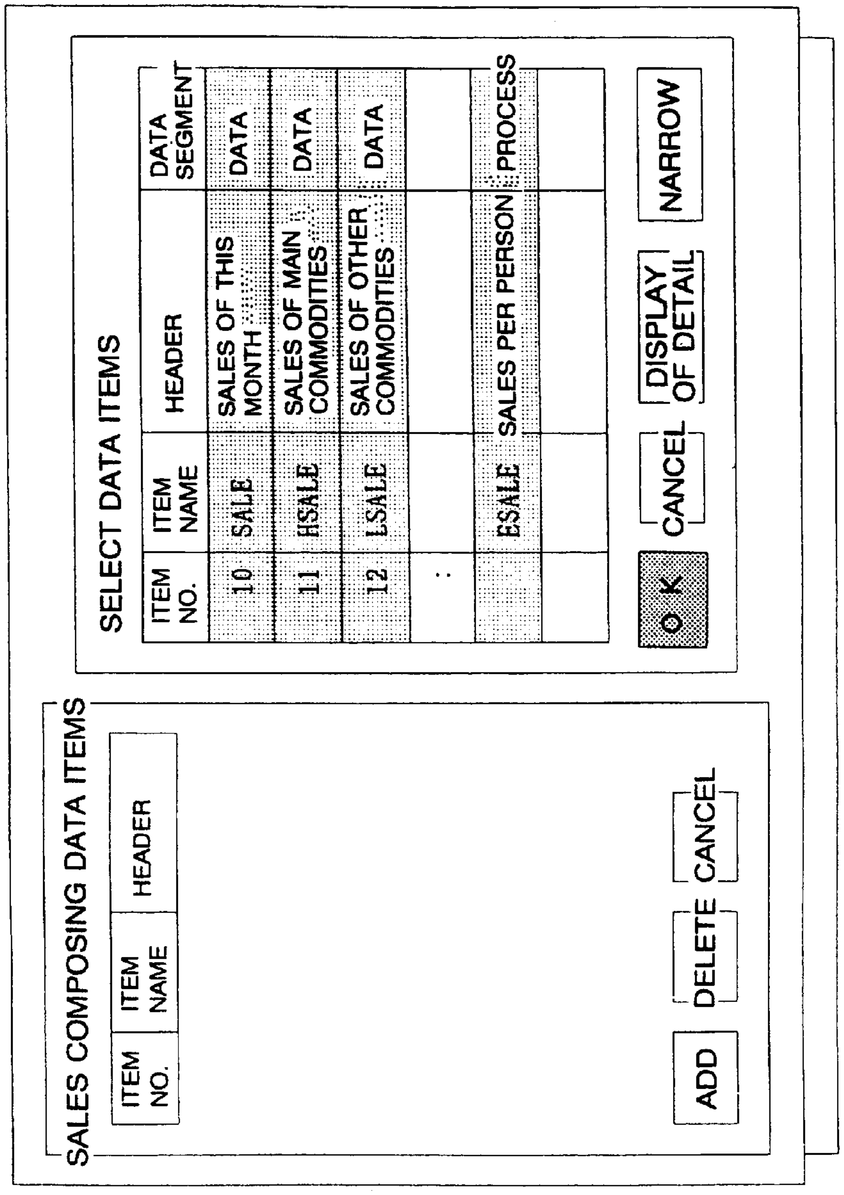
FIG. 66 is a diagram showing a data item selecting screen for explaining the database system of FIGS. 2 to 4.

As to the selected table, the data item attribute data, as recorded/managed by the dictionary 3, are referred to list up the data items composing the selected table at the righthand side of the screen of the terminal unit, as shown in FIG. 66, so that the data items can be selected by the terminal operator.

The listed data items can be selected by selecting the data item by the mouse or the like from the list of the data items at the righthand side of the screen of FIG. 66. In this case, for example, there are selected the "SALES OF THIS MONTH", "SALES OF MAIN COMMODITIES", "SALES OF OTHER COMMODITIES" and "SALES PER PERSON".

The data items are stepwise selected/displayed by the instruction of the terminal operator. First of all, there is displayed the data item in which the segment column of the data item attribute recording area on the dictionary 3 is the "DATA" or "OPERATION". If no data item defined as a list item is found out, the remaining data items can be displayed by selecting the "DETAIL DISPLAY" button by the mouse or the like.

By selecting the "NARROW" button, moreover, it is possible to restrict the data items to be displayed, for example, to the data items having "SALES" headers. In this case, the target data items are "○○ SALES", "SALES ○○" and "○○ SALES ○○".

Figure 67:
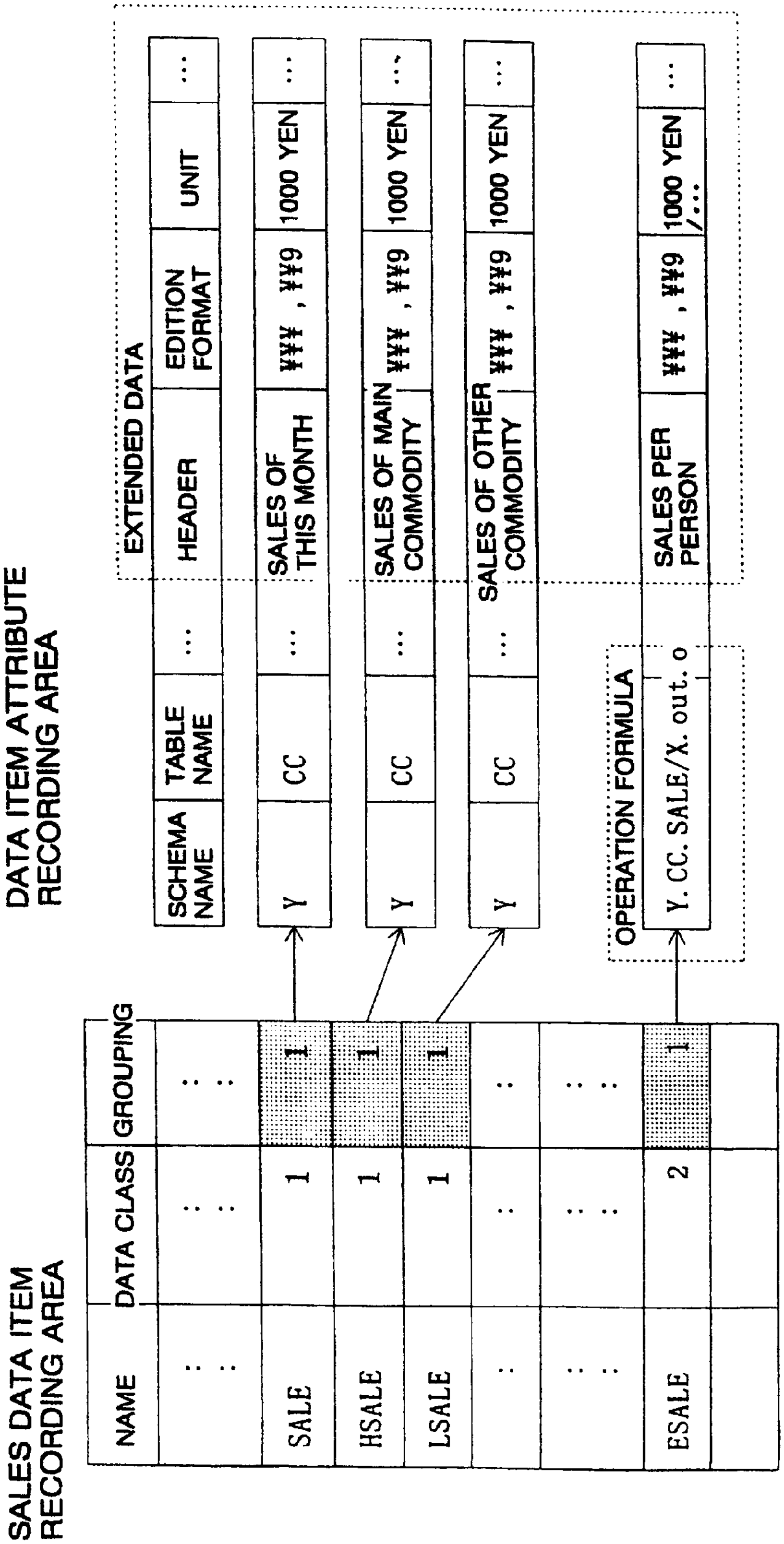
FIG. 67 is a schematic diagram for explaining a sales data item recording area and a data item attribute recording area of the database system of FIGS. 2 to 4.

By selecting the "OK" button, the definition of the grouping data items is completed. Then, the corresponding grouping columns of the data item recording area, as recorded/managed by the dictionary 3, are changed from "0" to "1", as shown in FIG. 67, and the data relating to the grouping data item "SALES", as newly defined, are additionally written in the data item grouping definition data recording area, as shown in FIG. 68.

Figure 69:
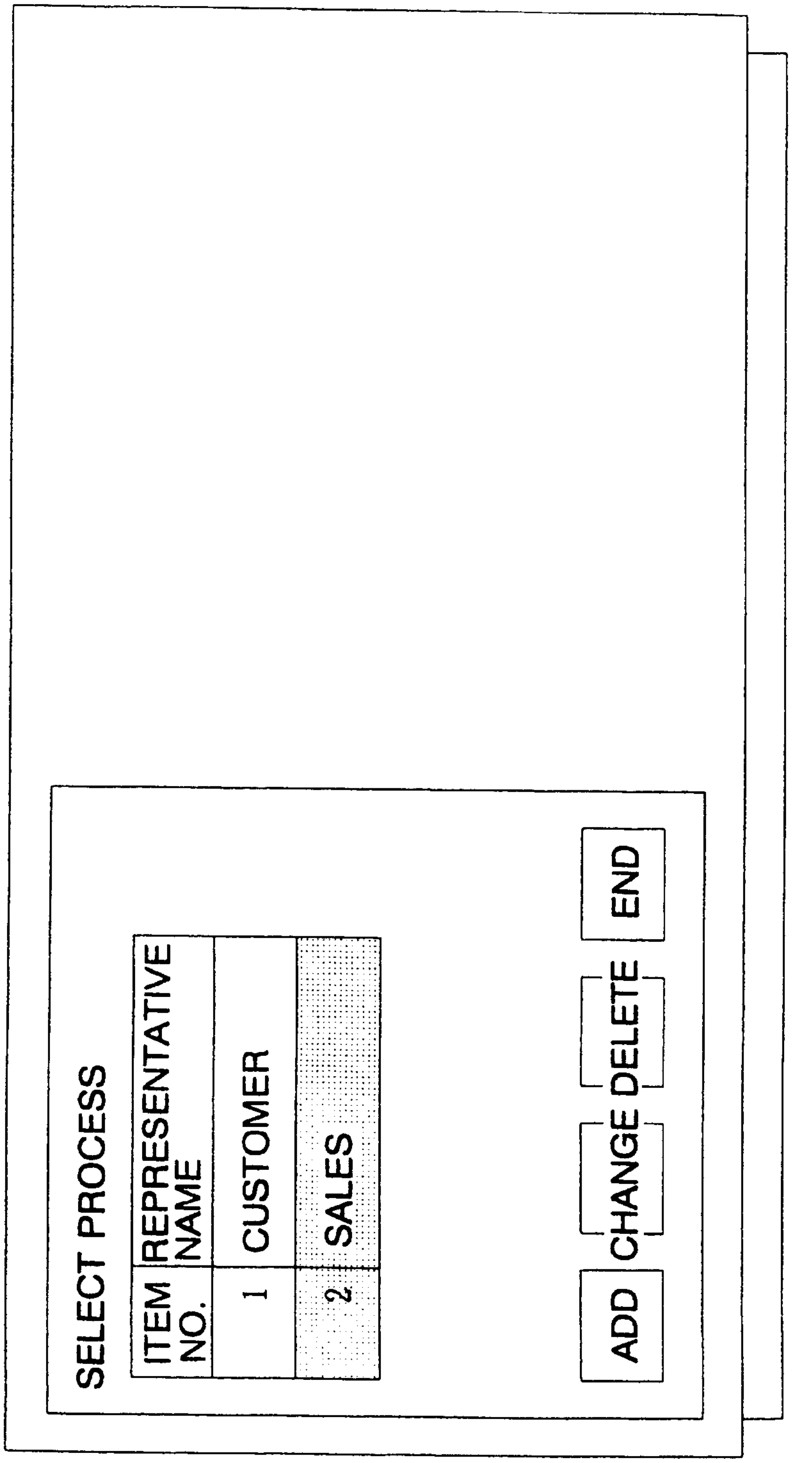
FIG. 69 is a diagram showing a representative name selecting screen for explaining the database system of FIGS. 2 to 4.

When this updating of the dictionary 3 is completed, the representative name selecting screen is restored, as shown in FIG. 69. In FIG. 69, the newly defined grouping data item "SALES" is additionally displayed in the list table.

Figure 70:
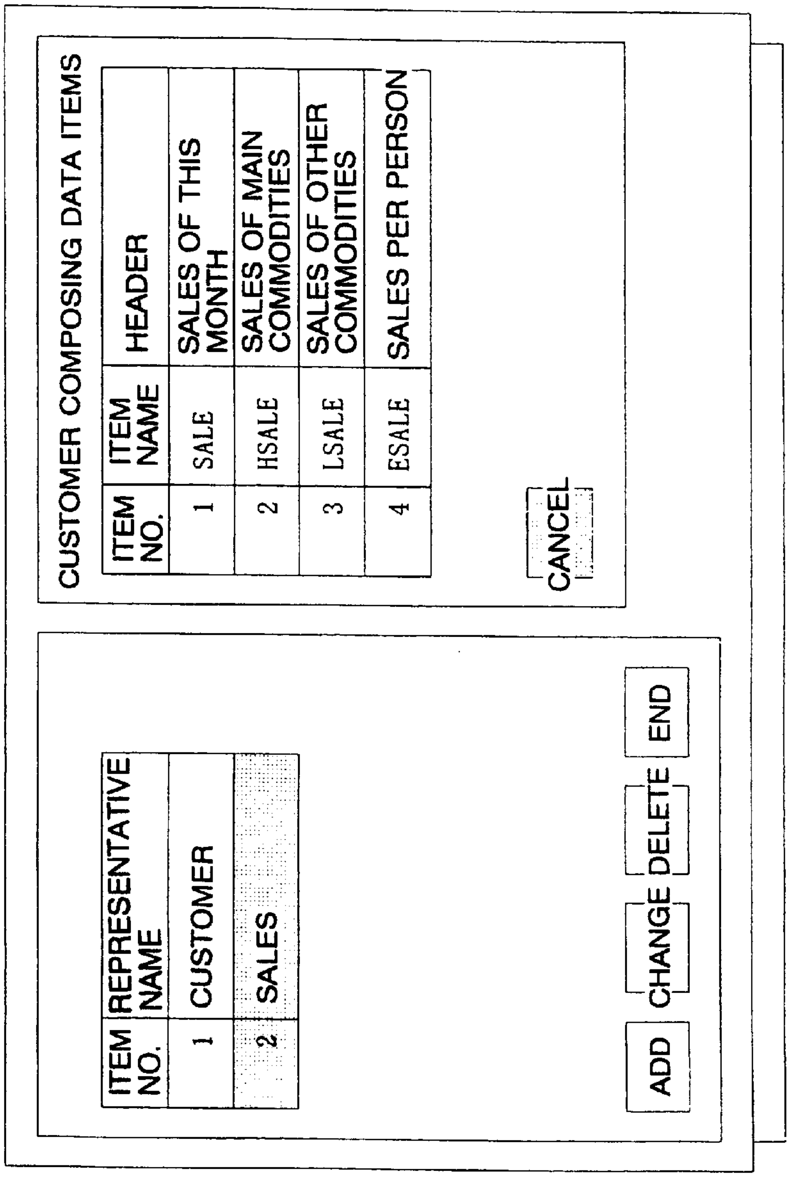
FIG. 70 is a diagram showing the display screen of the table of grouping data items for explaining the database system of FIGS. 2 to 4.

If the representative name "SALES" is selected by using the mouse or the like in the screen of FIG. 69, the data items composing the grouping data items are displayed as a list table, as shown in FIG. 70.

(1-8) Definitions of Management Points

By the control of the data setup main controller 11 of the setup unit 4, the initial menu for the setup operation, as shown in FIG. 23, for starting a predetermined operation for the setup is displayed in the screen of the terminal unit. When the terminal operator selects the menu item corresponding to the definition of the management point from the menu of FIG. 23 by operating the mouse or the like, the control is transferred to the management point definer 19.

This management point definer 19 defines the points of management, i.e., the management points. By this management point definer 19, it is possible to add the management points, to change the defined management points and to delete the defined management points.

The management points are recorded/managed by the management point recording area of the dictionary 3, as shown in FIG. 71. The common management point is recorded/managed by the common dictionary, and the management point for each person or target is recorded/managed by the personal dictionary. The input/output to/from the dictionary are effected in relation to the layout determination of the database data to be fetched.

The management point definer 19 fetches the management points, as recorded/managed by the dictionary 3, from the dictionary and lists up them in the screen of the terminal unit, as shown in FIG. 72, in accordance with the predetermined display order.

The "WHEN (TIME)" of the management point is a management point to be automatically set by the system. The detail of the management points relating to the time will be described in the second embodiment of the present invention in connection with the storage/management of the time series data.

Figure 73:
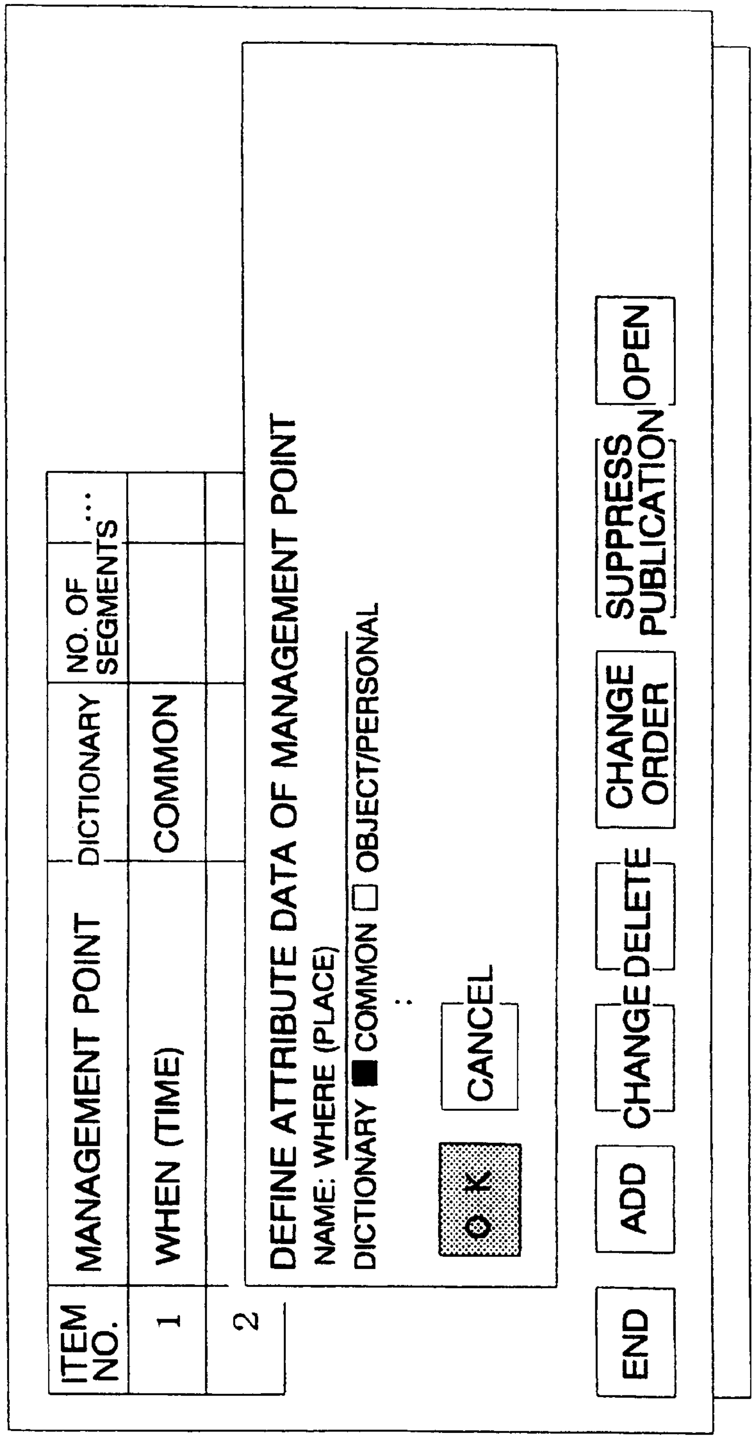
FIG. 73 is a diagram showing the display screen of a management point defining worksheet for explaining the database system of FIGS. 2 to 4.

When the terminal operator selects the "ADD" button by the mouse or the like, the management point definer 19 displays the worksheet for defining the management points in the screen of the terminal unit, as shown in FIG. 73, to allow the terminal operator to define the management points through the keyboard or the like.

The terminal operator inputs the necessary data into the worksheet shown in FIG. 73 through the keyboard or the like and then selects the "OK" button by the mouse or the like. Then, the management point definer 19 inspects whether or not the definition is proper. If this answer is YES, the management point definer 19 additionally writes the data of the newly defined management point into the management point recording area of the dictionary, as shown in FIG. 74, and additionally displays the defined management point in the list screen.

On the other hand, if the terminal operator selects the "CHANGE" button after the management point by using the mouse or the like, the worksheet is displayed as in the "ADD" case in the screen of the terminal unit so that the attribute data can be changed. If the "DELETE" button is selected, on the other hand, it is possible to delete the corresponding management point. If the "DISPLAY ORDER CHANGE" is selected, it is possible to change the display of the list table. By selecting the "SUPPRESS PUBLICATION" or "OPEN" button, moreover, it is possible to suppress the use of the database data temporarily at the exploiting stage or to release the suppression.

(1-9) Definitions of Sorting Data

Figure 75:
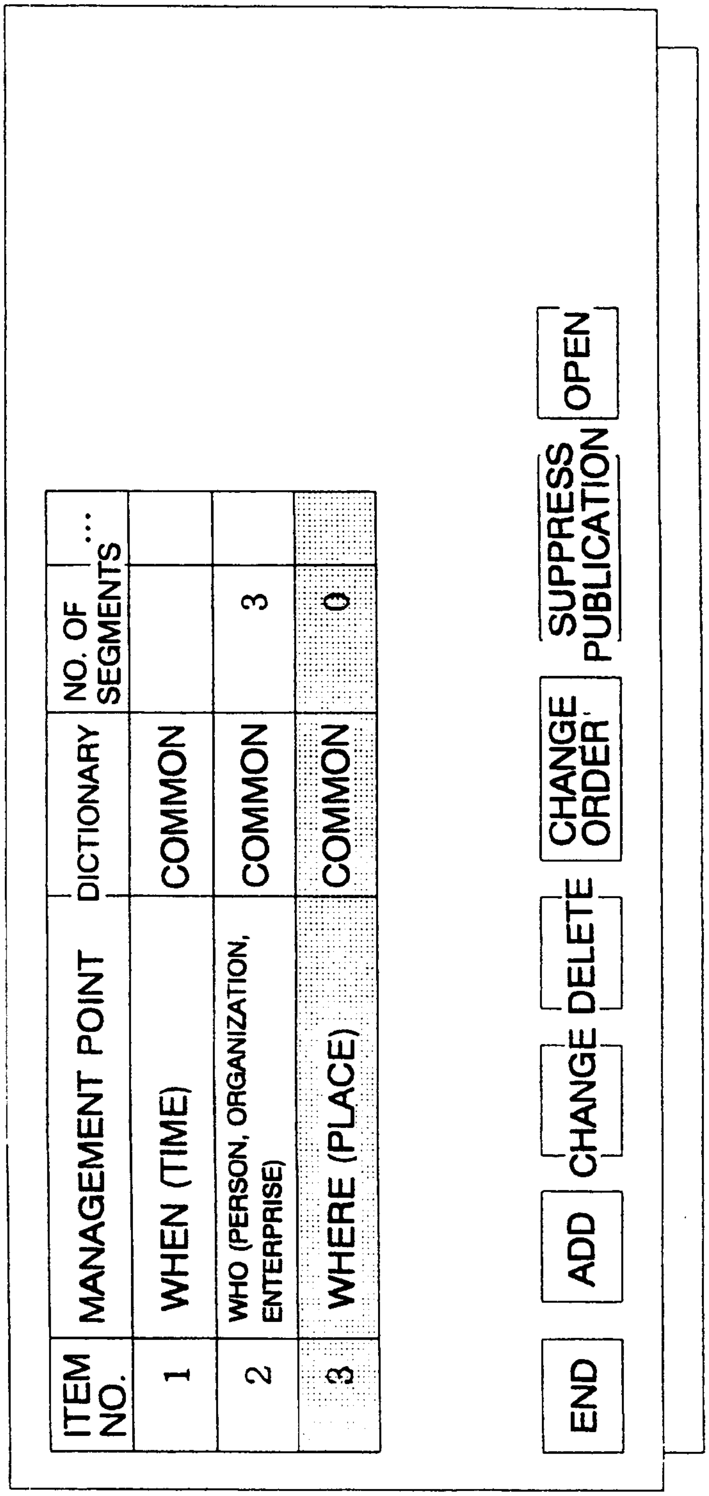
FIG. 75 is a diagram showing the display screen of the table of management points for explaining the database system of FIGS. 2 to 4.

The management point definer 19 fetches the management points, as recorded/managed by the dictionary 3, from the dictionary 3 and lists up them in the screen of the terminal unit, as shown in FIG. 75, in accordance with a predetermined display order.

Figure 77:
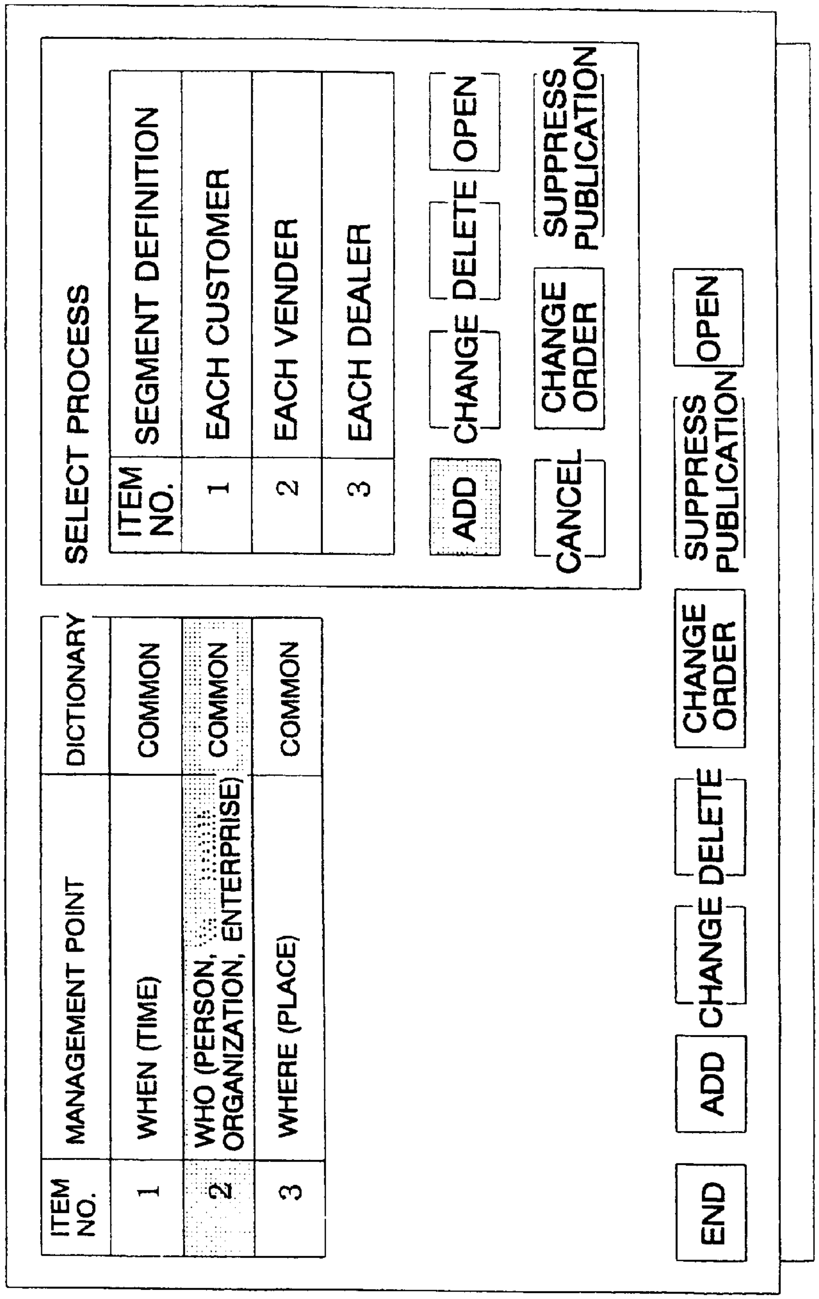
FIG. 77 is a diagram showing the display screen of the table of segment definitions for explaining the database system of FIGS. 2 to 4.

By selecting the management point to have the sorting data definition data or the sorting data attached thereto by the mouse or the like, as shown in FIG. 76, the sorting data, as hierarchized for the selected management point and relatively recorded/managed by the dictionary 3, are fetched and displayed in the list screen in accordance with the predetermined display order, as shown in FIG. 77.

Incidentally, the definition of the sorting data is effected in relation to the layout determination of the database data to be fetched.

By selecting the "ADD", "CHANGE", "DELETE" and "CHANGE ORDER" buttons by the mouse or the like, the control is transferred to the sorting data definer 20.

The sorting data definer 20 controls the addition, change, deletion and so on of the sorting data as a whole. In FIG. 77, for example, the management point "WHO (PERSON, ORGANIZATION, ENTERPRISE)" is selected to display a list of sorting data, and the "ADD" button is then selected.

By selecting the "ADD" button by the mouse or the like, the selection of the data item (segment key item) for setting the segmenting definition is started. In order to facilitate the selection of the segment key item, a list of table segments for narrowing the table containing the segment key items is displayed at first in the terminal screen, as shown in FIG. 78, so that the table segments can be selected.

The table segment such as "MASTER" is selected by the mouse or the like, and the "OK" button is selected. Then, the tables belonging to the selected segment such as "MASTER" can be listed up in the screen of the terminal unit, as shown in FIG. 79, to select the table in which the segment key items exist.

Figure 79:
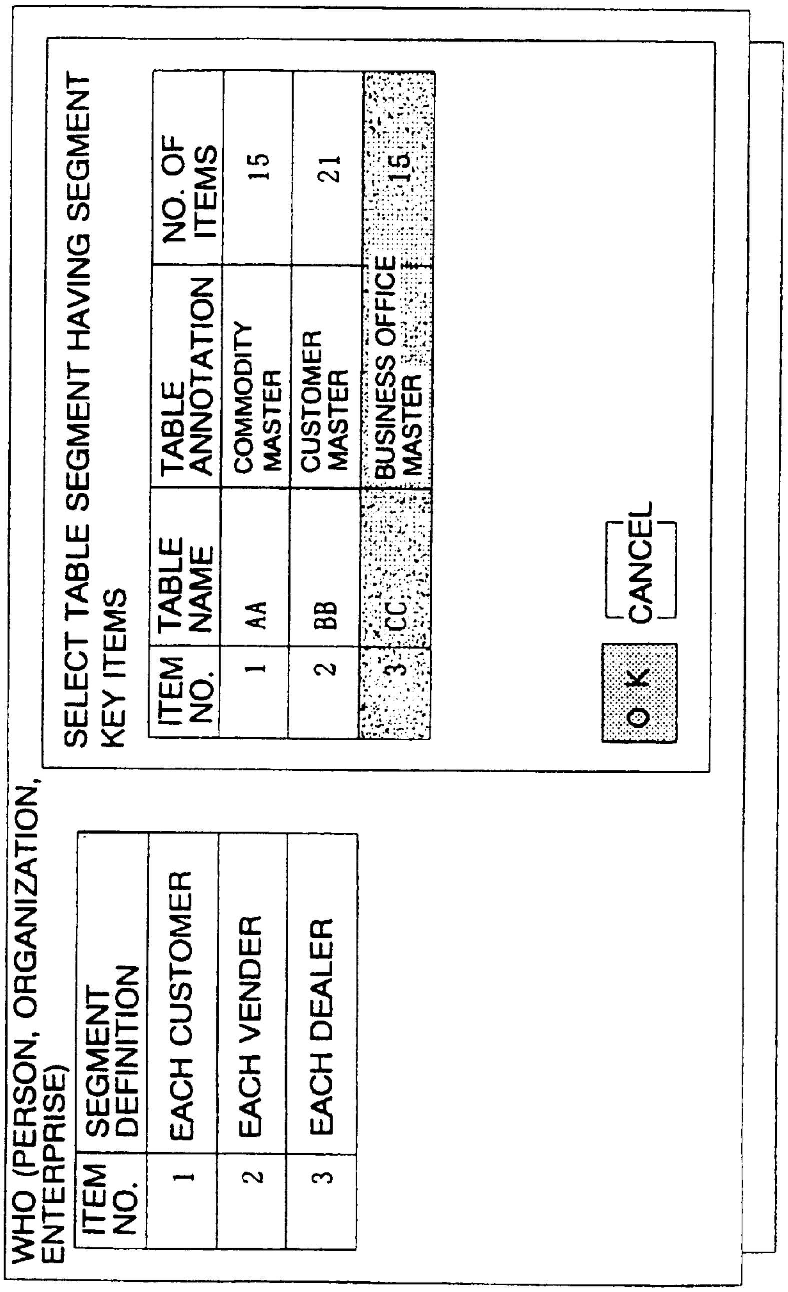
FIG. 79 is a diagram showing a table selecting screen for explaining the database system of FIGS. 2 to 4.

In the screen of FIG. 79, a desired table such as "CC (BUSINESS OFFICE MASTER)" is selected, and the "OK" button is selected. Then, the list of the data items composing that table can be displayed in the screen of the terminal unit, as shown in FIG. 80, to select the segment key items.

The data items to be displayed are those in which the date segments are data or codes. By selecting the "DETAIL DISPLAY" or "SUPPRESS DETAIL DISPLAY" button in the screen of FIG. 77, it is possible to switch whether or not the data items are to be displayed within a restricted range. By selecting the "NARROW" button in the screen of FIG. 80, it is possible to narrow the data items to be displayed according to a desired condition. In case this narrow is to be returned, the (not-shown) "RELEASE NARROW" button to be displayed at the narrowing time is selected.

Figure 80:
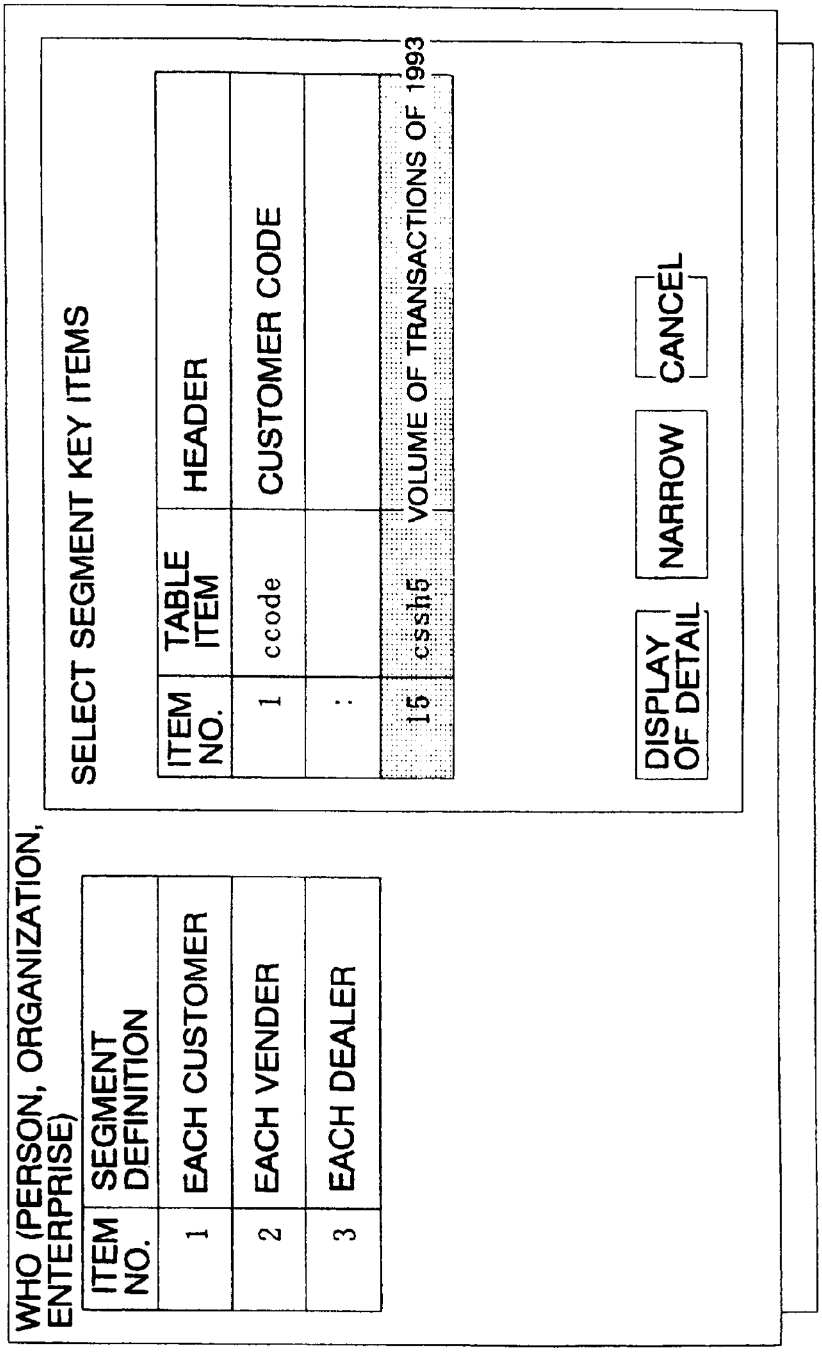
FIG. 80 is a diagram showing a table selecting screen for explaining the database system of FIGS. 2 to 4.
Figure 81:
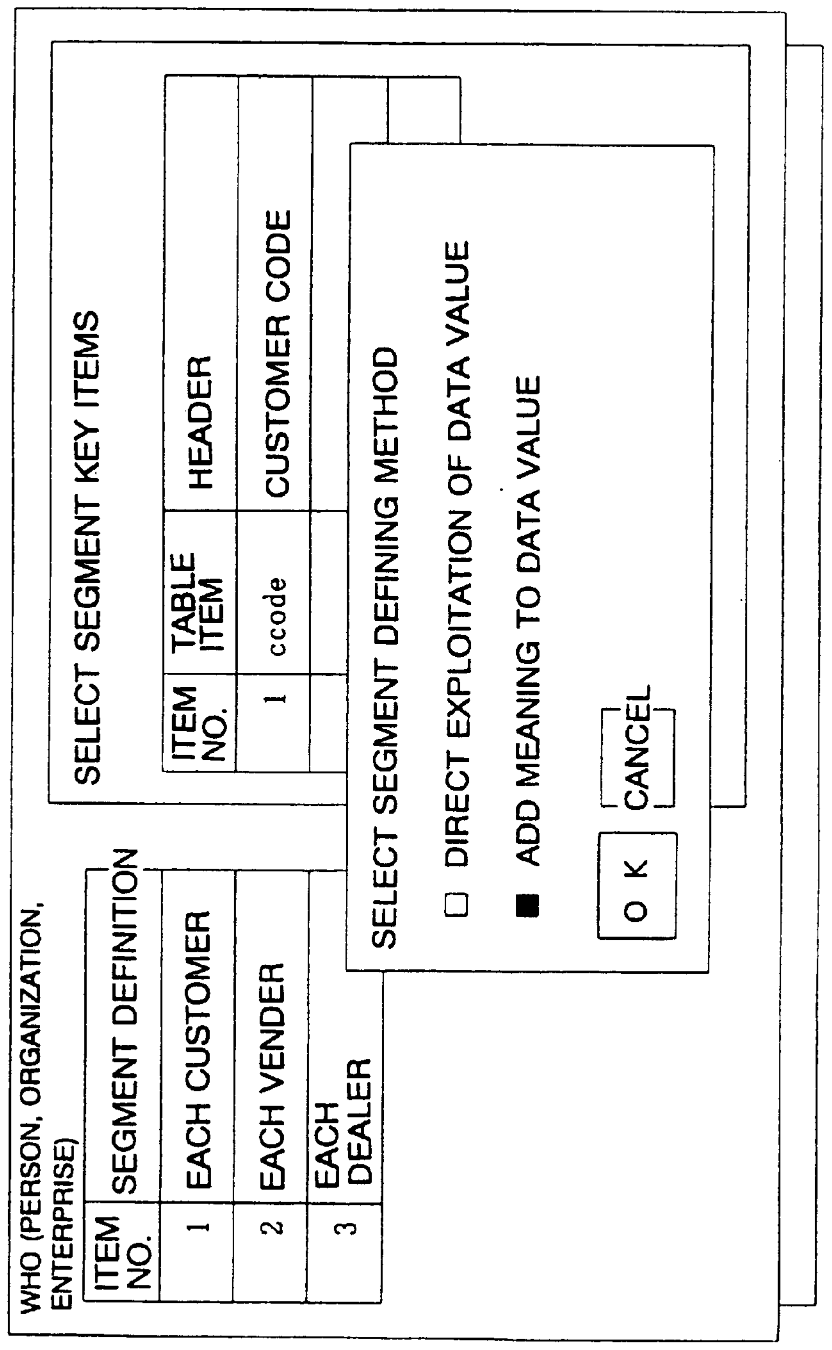
FIG. 81 is a database system showing a confirmation screen of a segment defining method for explaining the database system of FIGS. 2 to 4.

If, moreover, the segment key item such as the "cssh5 (VOLUME OF TRANSACTIONS OF 1993)" is selected in the screen of FIG. 80, the worksheet for selecting the segmenting definition method can be displayed in the screen of the terminal unit, as shown in FIG. 81, to perform the selection by the mouse or the like.

After the segmenting definition method has thus been selected, the "OK" button is selected. Then, the control is transferred to the direct exploitation definer for exploiting the data values directly, the character data signifier for signifying character data or the numerical data signifier for signifying the numerical data, in accordance with the selected defining method. Incidentally, in case the "ADD MEANING TO DATA VALUE" is selected as the defining method, it is decided according to the type of the data of the segment key item which of the character data signifier or the numerical data signifier the control is to be transferred.

Figure 82:
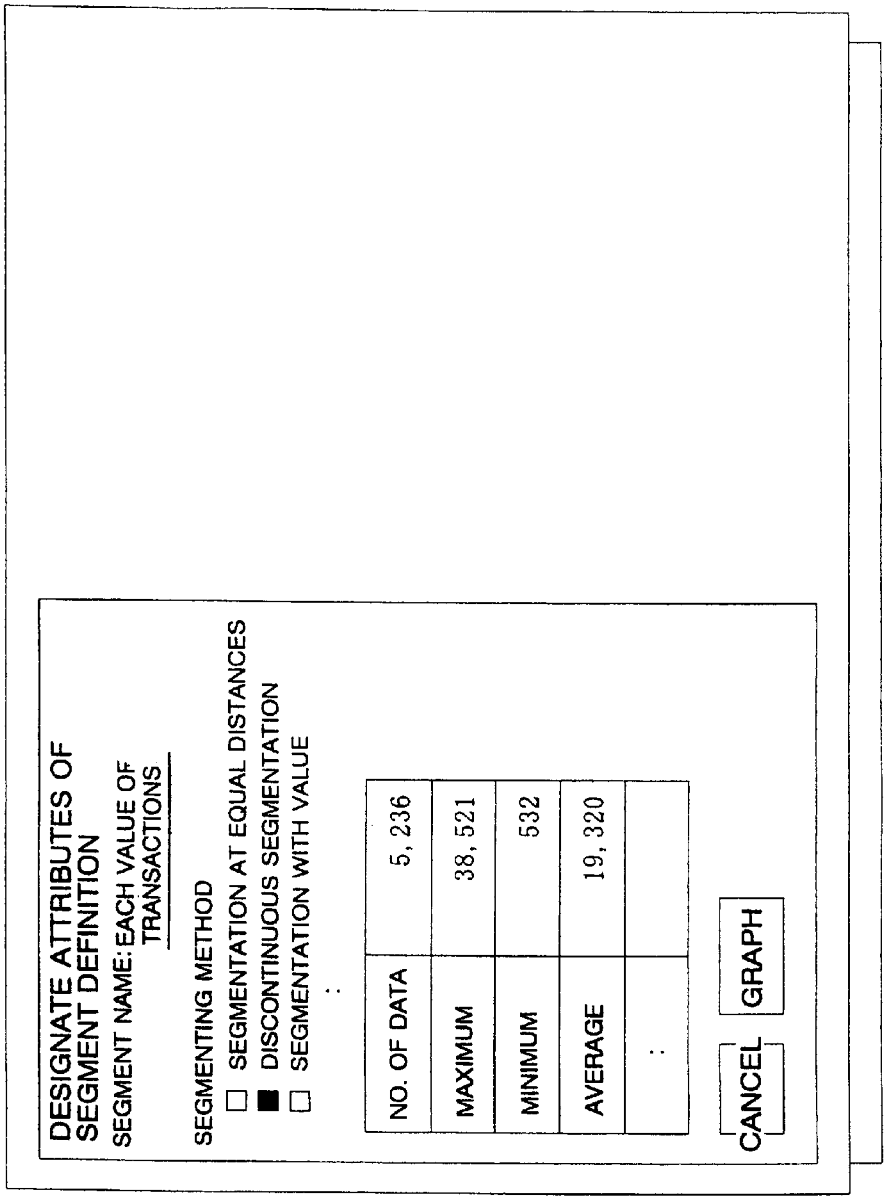
FIG. 82 is a diagram showing the display screen of a segment attribute defining worksheet for explaining the database system of FIGS. 2 to 4.

The direction exploitation definer and the character data signifier are used in relation to the layout determination of the database data to be fetched. The numerical data signifier displays the worksheet for defining the segmenting definition attributes in the screen of the terminal unit, as shown in FIG. 82, so that the definitions can be made by the terminal operator through the keyboard or the like. With reference the data values of the segment key items from the database, statistical values such as the maximum, the minimum, the average and the most frequent value are calculated and displayed in the worksheet.

When the sorting method is selected, the worksheet for defining the specific segmentations at the righthand side of the screen of the terminal unit, as shown in FIG. 83, so that the terminal operator can define the segmenting specifications.

Figure 84:
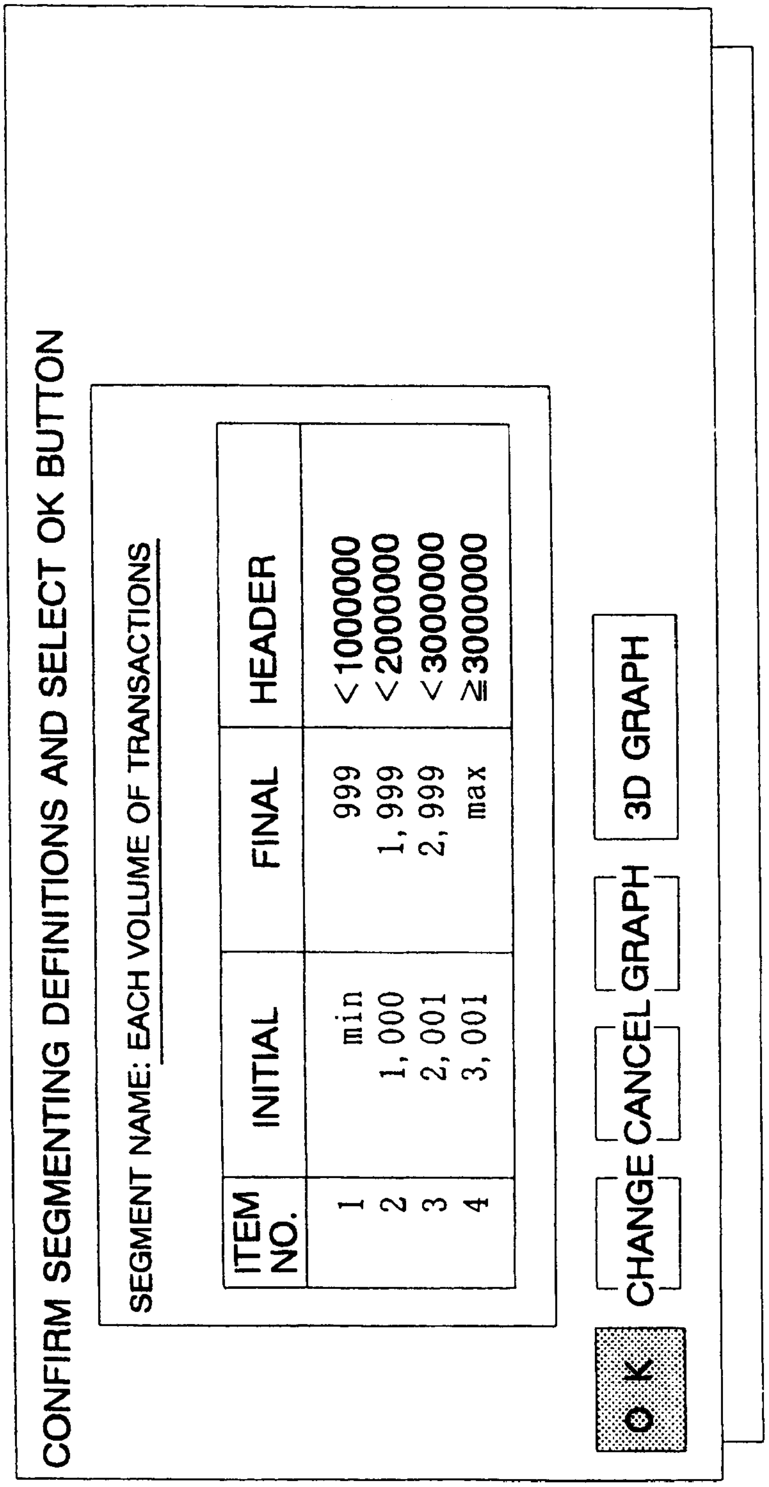
FIG. 84 is a diagram showing the confirmation screen for explaining the database system of FIGS. 2 to 4.

When the definitions in the screen of FIG. 83 are completed to select the "OK" button, there is displayed a screen for confirming the segmenting definitions, as shown in FIG. 84.

When the "GRAPH" button is selected in the screen of FIG. 83 or FIG. 84, the control is transferred to the (not-shown) management point visualizer for graphing the management points. This management point visualizer refers to the values of the data items, to which the segmenting definitions are to be added, from the database to display the distribution of data values in a histogram. As a result, the terminal operator can grasp the data distribution in advance. The graphing operations of the management points will be described in detail in connection with a fourth embodiment of the present invention with reference to the visualization making use of the management points of the database data.

By selecting the "OK" button in the screen of FIG. 84 by the mouse or the like, the addition of a series of segmenting definitions is completed to execute the change of the columns of the segment number of the management point recording area of the dictionary 3, the addition of the data to the sorting data recording area, and the addition of the data to the segmenting specification area.

Figure 86:
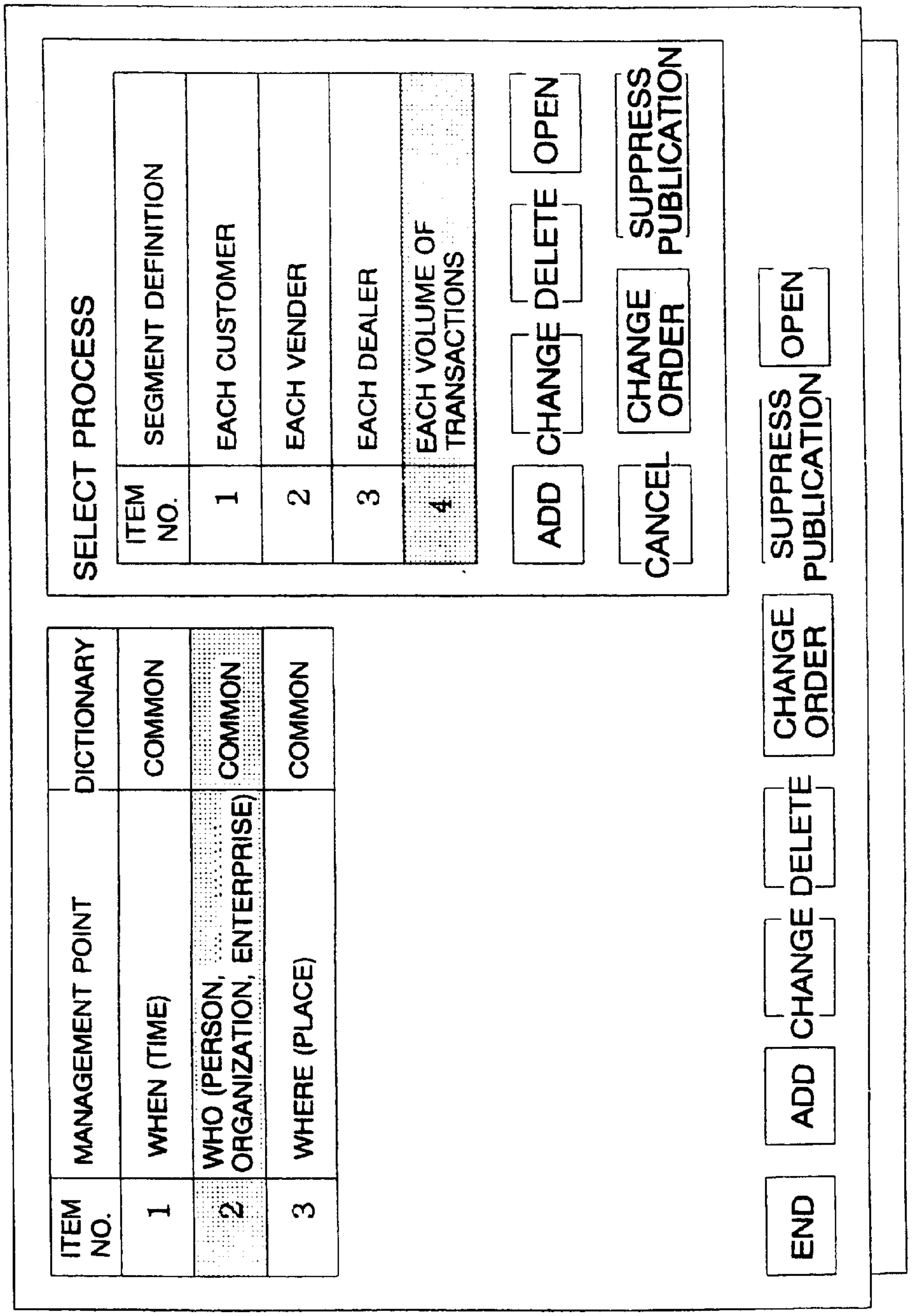
FIG. 86 is a diagram showing the display screen of the table of segment definitions for explaining the database system of FIGS. 2 to 4.

When the write of the dictionary is completed, the screen is returned to that for the list of segmenting definitions, as shown in FIG. 86. According to the screen of FIG. 86, it can be confirmed that the renewed segmenting definitions are added as the fourth segment of "WHO (PERSON, ORGANIZATION, ENTERPRISE)". The display order of the sorting data can be changed by selecting the "CHANGE ORDER" button for changing the display order of the segmenting definitions, and the open level can be changed by the "OPEN" and "SUPPRESS PUBLICATION" buttons.

(1-10) Management of Dictionary Defining Data

By the control of the data setup main controller 11 of the setup unit 4, the initial menu for the setup operations, as shown in FIG. 23, for starting a predetermined operation for the setup is displayed in the screen of the terminal unit. When the terminal operator selects the menu items for the management of the data items, the management of the tables or the management of the management points from the menu of FIG. 23 by operating the mouse or the like, the control is transferred to the data item management support 21 for supporting the management of the data items, the table management support 22 for supporting the tables or the point management support 23 for supporting the management of the management points.

The data item management support 21 can narrow the data relating to the data items, which are recorded/managed by the dictionary 3, by designating a specific condition, to display them in the screen of the terminal unit and to prepare them into a document for mat for the management thereby to print the same in a printer unit. By making use of this function of the data item management support 21, it is possible to easily know which database or table a data item exists in, what attribute the data item exists with, and what relation the data item and the management point have.

The data management support 22 can narrow the data relating to the tables, which are recorded/managed by the dictionary 3, by designating a specific condition, to display them in the screen of the terminal unit and to prepare them into a document format for the management thereby to print the same in the printer unit. By making use of this function of the data management support 22, it is possible to easily know what attribute the table exists in the database with, and what relation the tables have.

The point management support 23 can narrow the data relating to the management points, which are recorded/managed by the dictionary 3, by designating a specific condition, to display them in the screen of the terminal unit and to prepare them into a document format for the management thereby to print the same in the printer unit. By making use of this function of the point management support 23, it is possible to easily know the sorting data which are hierarchized and added to the management points.

The point management support 23 fetches the management points, which are recorded/managed by the dictionary 3, as shown in FIG. 71 or FIG. 85, from the dictionary 3 and lists up the management points in the screen of the terminal unit in accordance with a predetermined display order, as shown in FIG. 87.

When the "DOCUMENT" button is selected in the screen of FIG. 87 by the mouse or the like, the list of the management points is printed by the printer unit. At this time, by selecting a specific management point by the mouse or the like, the sorting data, which are hierarchized in relation to the selected management point and recorded/managed in the dictionary 3, as shown in FIG. 85, are fetched so that the list screen, as shown in FIG. 88, is displayed in accordance with a predetermined display order.

Figure 88:
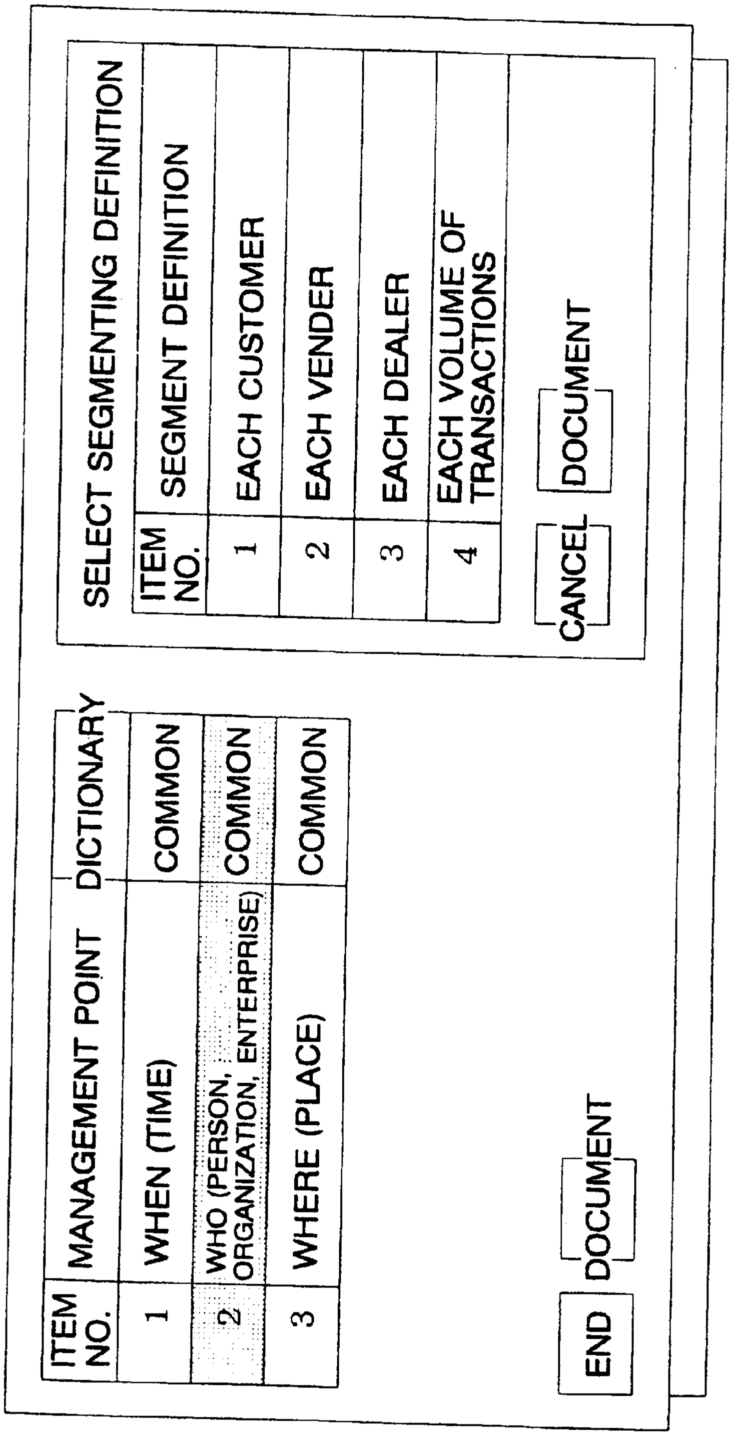
FIG. 88 is a diagram showing the display screen of the table of segment definitions for explaining the database system of FIGS. 2 to 4.

When the "DOCUMENT" button is selected in the screen of FIG. 88, the detailed data relating to the selected management point are printed in the document format by the printer unit.

(1-11) Exploitation of Database Data

On the basis of the data recorded/managed by the dictionary 3, the inquiry unit 6 processes the database data into the format demanded by the exploiter of the database data. This inquiry unit 6 is controlled as a whole by the data exploitation main controller 31.

In case a problem that no necessary data is found arises at the stage of exploiting the database data, this system is given a function to fetch claim data and a function to support the re-design of the database on the basis of the claim. These functions will be described in detail in a fifth embodiment of the present invention in connection with the database re-design support based upon the claim data of the database.

At the time of exploitation of data by the inquiry unit 6, the control is transferred from the data exploitation main controller 31 to the layout determinator 32. This layout determinator 32 having received the control from the data exploitation main controller 31 displays the worksheet for deciding the final layout of the database data in the terminal screen and the data items as a list in the terminal screen with reference to the data relating to the management points and the data items, as are recorded/managed by the dictionary 3.

By indicating a management point (as discriminated by a "heart mark" in FIG. 89 and so on) by the mouse or the like and by double-clicking it, the control is transferred to the sorting data selection optimizer 33. This sorting data selection optimizer 33 additionally displays the hierarchized sorting data which are added to the indicated management point. If the management point "WHO" is indicated and double-clicked in FIG. 89, the segmenting definitions are inserted and displayed (as discriminated by a "diamond" mark in FIG. 90 and so on) next to the data item "WHO", as shown in FIG. 90.

Each of the data items, as defined as the integral data items and the grouping data items, is not displayed in the list of the data items, but the representative name of the integral data items or the group name of the grouping data items is displayed in the aforementioned list. By indicating the representative name or the group name and double-clicking it, the transfer is transferred to the grouping data item selector 34. This grouping data item selector 34 additionally displays each of the data items composing the integral data item or the grouping data items.

Figure 90:
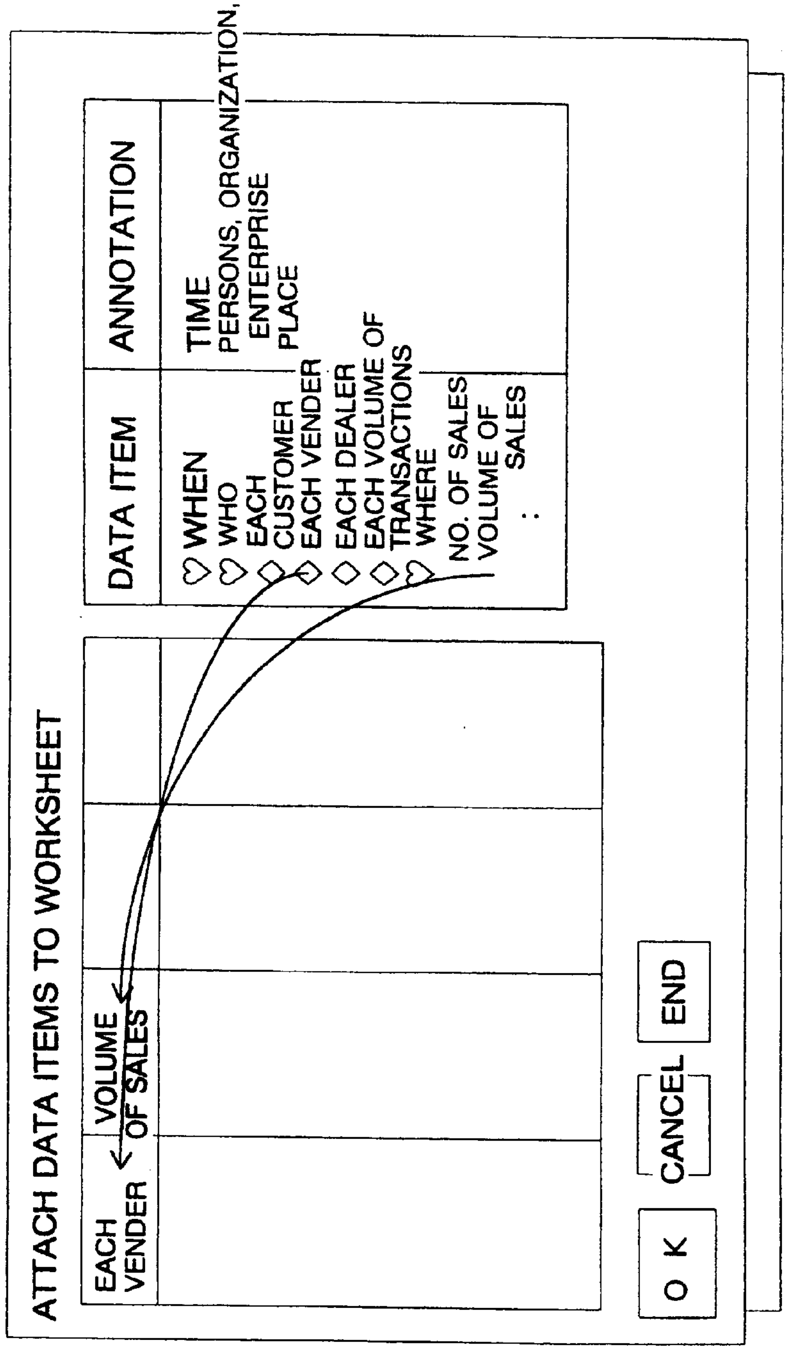
FIG. 90 is a diagram showing the display screen of a layout determination worksheet for explaining the database system of FIGS. 2 to 4.

A desired item is selected by the mouse or the like from the sorting data and the data item list (including the data item list displayed by selecting the integral data item or the grouping data item), as displayed by the selection from the management point list, and is adhered to the worksheet by the dragging so that the layout of the output of the inquiring operation can be determined (as shown in FIG. 90).

In case a management point is selected with its segmenting definitions being neither inserted nor displayed, the hierarchized sorting data, as recorded/managed by the dictionary 3 in relation to the management point, are fetched and listed in the terminal screen in accordance with a predetermined display order. When the terminal operator selects the management point from the list by the mouse or the like, the selecting operation of the management point is completed. In case the sorting data are to be confirmed, they can be displayed in the terminal screen by indicating the target sorting data from the list by the mouse and double-clicking them.

Incidentally, in case the final fetching type cannot be uniquely decided (e.g., in case the definition of the dictionary 3 is insufficient or intrinsic), this system is also devised for the terminal operator to confirm the intention or navigate.

When the "OK" button is selected so that the layout determinator 32 is caused by the terminal operation of the terminal user to recognize the completion of the layout operation and to confirm no significant conflict, the control is transferred to the data fetch driver 35. This data fetch driver 35 generates a procedure instruction for driving the retriever 36 to transfer the control to the retriever 36. In case the selected data item covers a plurality of tables when the procedure instruction is to be generated, the linkage among the tables is automatically made with reference to the content of the table combination defining area which is recorded/managed by the dictionary 3. On the other hand, in case the selected data item is the operated data item, the procedure including the operation formula is also generated with reference to the operation formula of the data item attribute data recording area which is recorded/managed by the dictionary.

Figure 91:
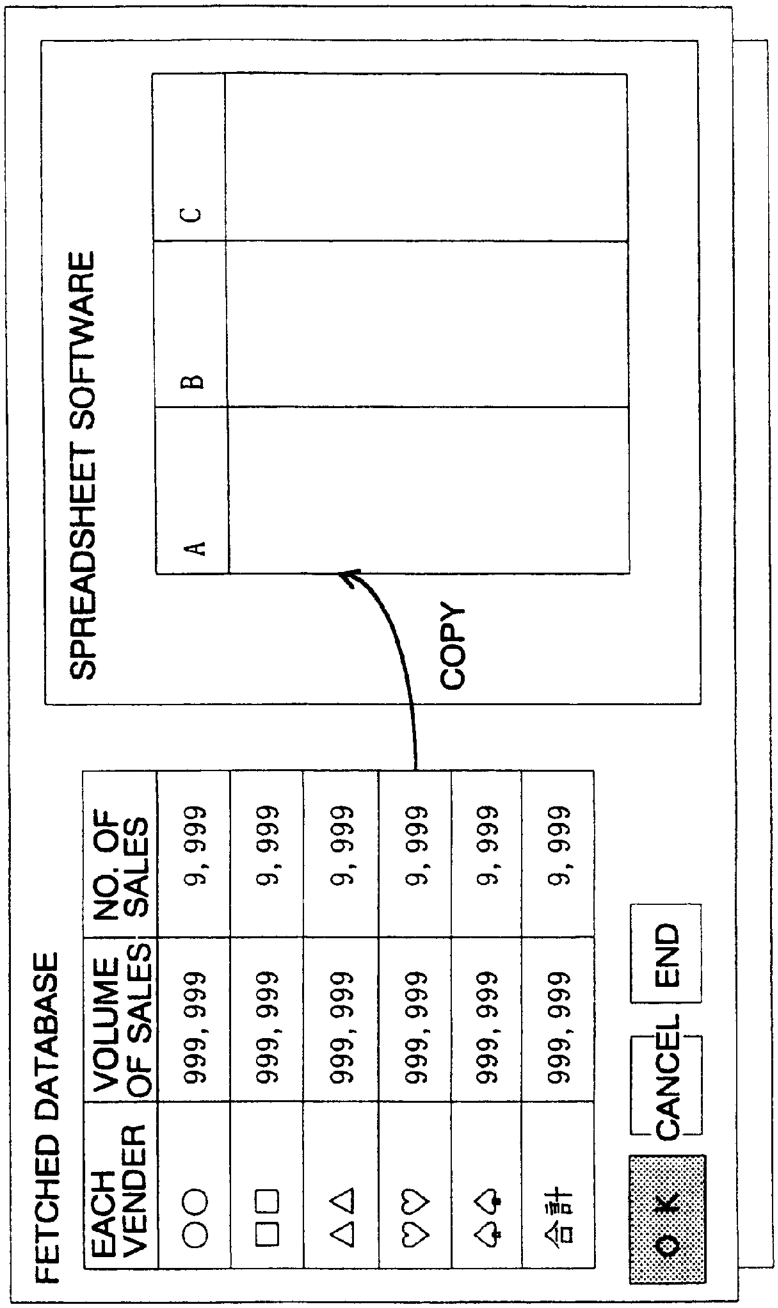
FIG. 91 is a diagram showing the display screen of a layout determination worksheet for explaining the database system of FIGS. 2 to 4.
Figure 92:
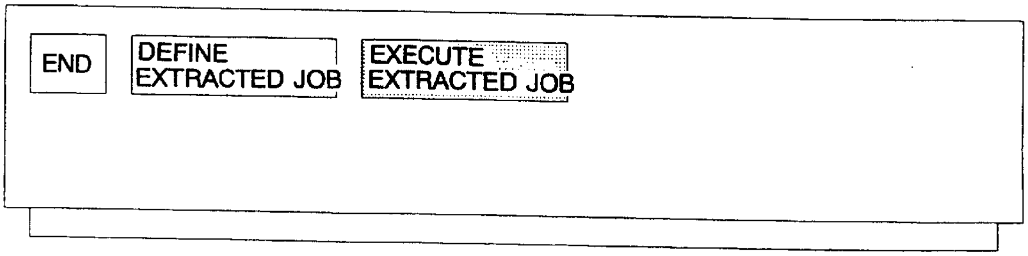
FIG. 92 is a diagram showing the display screen of an extracted job processing menu for explaining the database system of FIGS. 2 to 4.

The retriever 36 interprets the generated procedure instruction to execute the retrieval of the database data and transforms the retrieval result through the media transformer 38 into the format in which the result can be displayed in the screen of the terminal unit. After this, the retriever 36 displays the retrieval result in the screen of the terminal unit by the data display linker 39, as shown in FIG. 91, to realize the data linkage with the spreadsheet soft ware.

(1-12) Match Assurance of Management Point with Update of Master Data

In case the master data sent out from the trunk business system are changed, a corresponding extracted job has to be executed to replace the data of the public database 2 by a new content. The operations management supporting main controller 41 controlling the entirety of the operations support unit 5 displays a menu for starting the processing functions such as the extracted job definitions or the extracted job executions in the screen of the terminal unit. When the terminal operator selects the menu item corresponding to the extracted job executions by using the mouse or the like, the control is transferred to the data extractor 43 for extracting the trunk database data.

The data extractor 43 starts the extracted job, which is generated by the extracted job definer 42 of the trunk database data, to extract and transfer the database data from the trunk business system to the public database 2.

Figure 93:
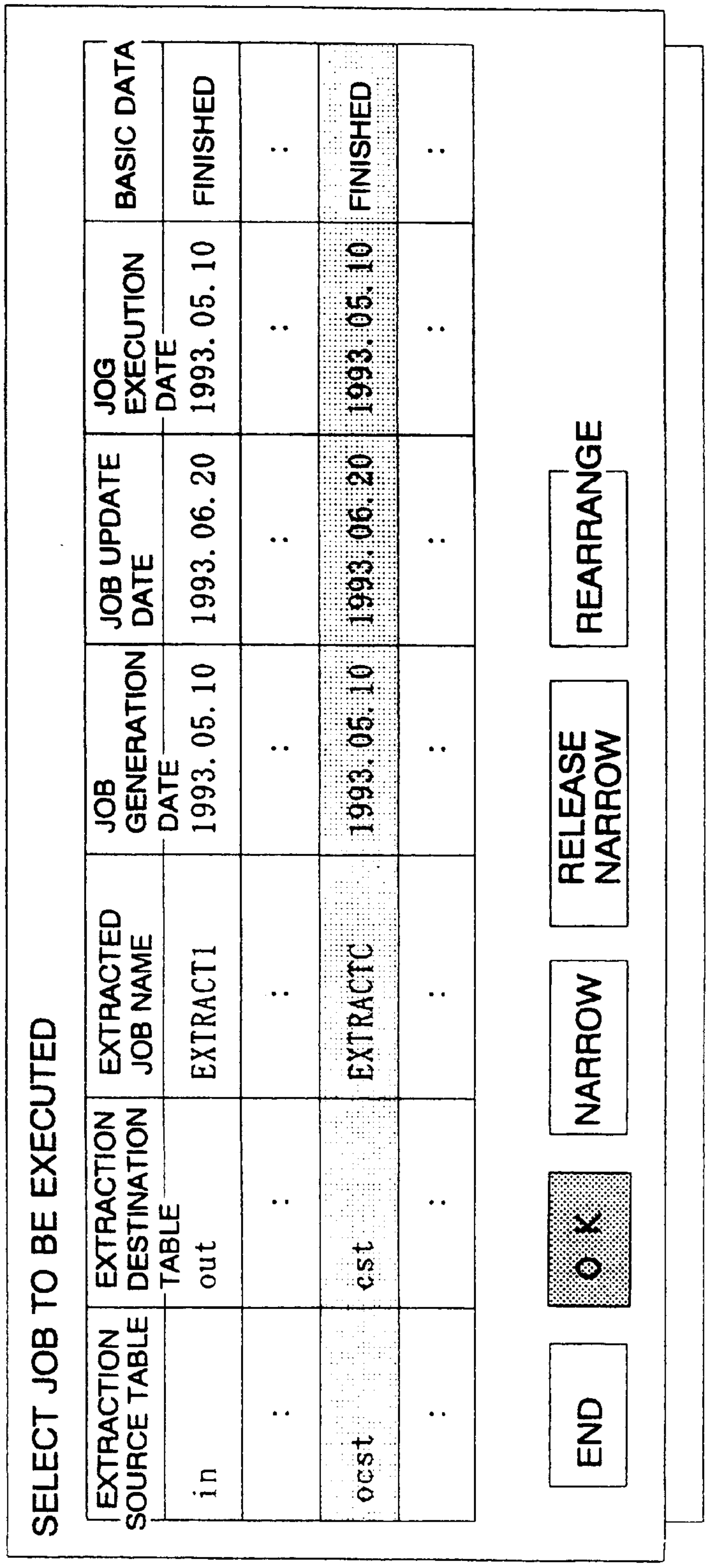
FIG. 93 is a diagram showing the display screen of the table of extracted jobs for explaining the database system of FIGS. 2 to 4.

When the corresponding extracted job is selected by the data extractor 43 from the list displayed on the screen of the terminal unit, as shown in FIG. 93, by using the mouse or the like, the extracted job is started so that the database data are replaced by the new content. When this extracted job is ended, the message of the end of the execution of the extracted job is displayed in the screen of the terminal unit, as shown in FIG. 94.

Figure 95:
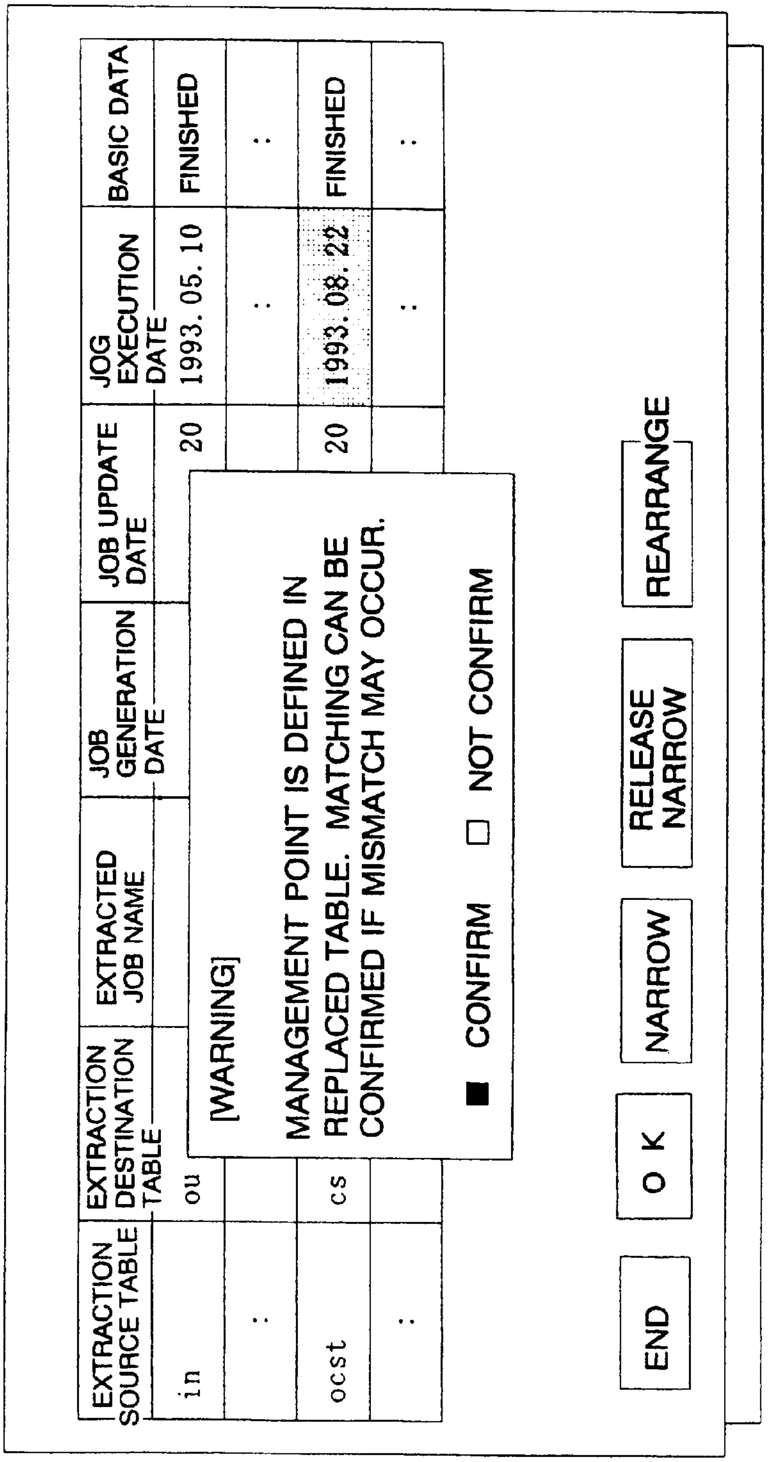
FIG. 95 is a diagram showing a mismatch warning screen for explaining the database system of FIGS. 2 to 4.

The sorting data match assurer 44 confirms, when the control is transferred thereto from the data extractor 43, that the sorting data of the management points are defined in the replaced database data, by retrieving the segment specification recording area, the data item recording area and the data item attribute recording area of the dictionary 3. In case relating sorting data exist, the terminal unit is informed of the warning of the existence by the message or the like, as shown in FIG. 95. It is further confirmed whether or not it is desired to examine that the application of the sorting data to the replaced database data raises any conflict. If desired (i.e., in case the "confirmation" is selected), the sorting data of the corresponding segment specification data recording area are referred to, and the sorting operations are executed by applying the segmenting definitions to the values of the data items of the table, as extracted.

Figure 96:
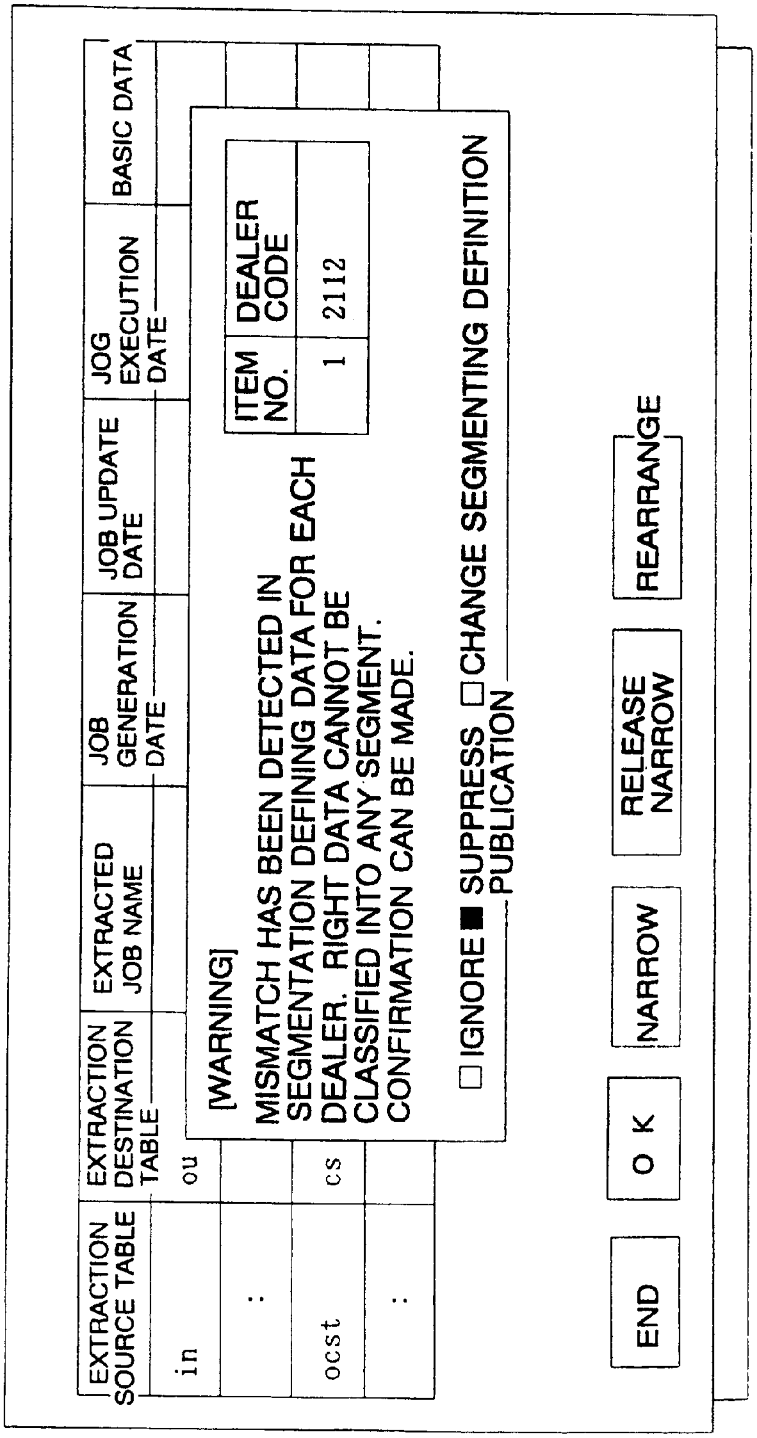
FIG. 96 is a diagram showing a mismatch warning screen for explaining the database system of FIGS. 2 to 4.

In case a conflict is caused by the execution (i.e., in case a new dealer code failing to corresponding to the sorting is added), a message is outputted to make a warning, as shown in FIG. 96.

In the case of FIG. 96, the terminal operator can select any of the ignorance of the warning, the temporary publication suppression of the segmenting definitions, and the change in the segmenting definitions.

If the "IGNORE" button is selected in this case, the operations transfer to the subsequent matching check while ignoring the warning.

In case the "SUPPRESS PUBLICATION" button is selected, the item of the public segment of the sorting data recording area, as recorded/managed by the dictionary, as shown in FIG. 97, is updated (from "0" to "1"). As a result, there is suppressed a list for selecting the stage of exploiting the database data.

Figure 98:
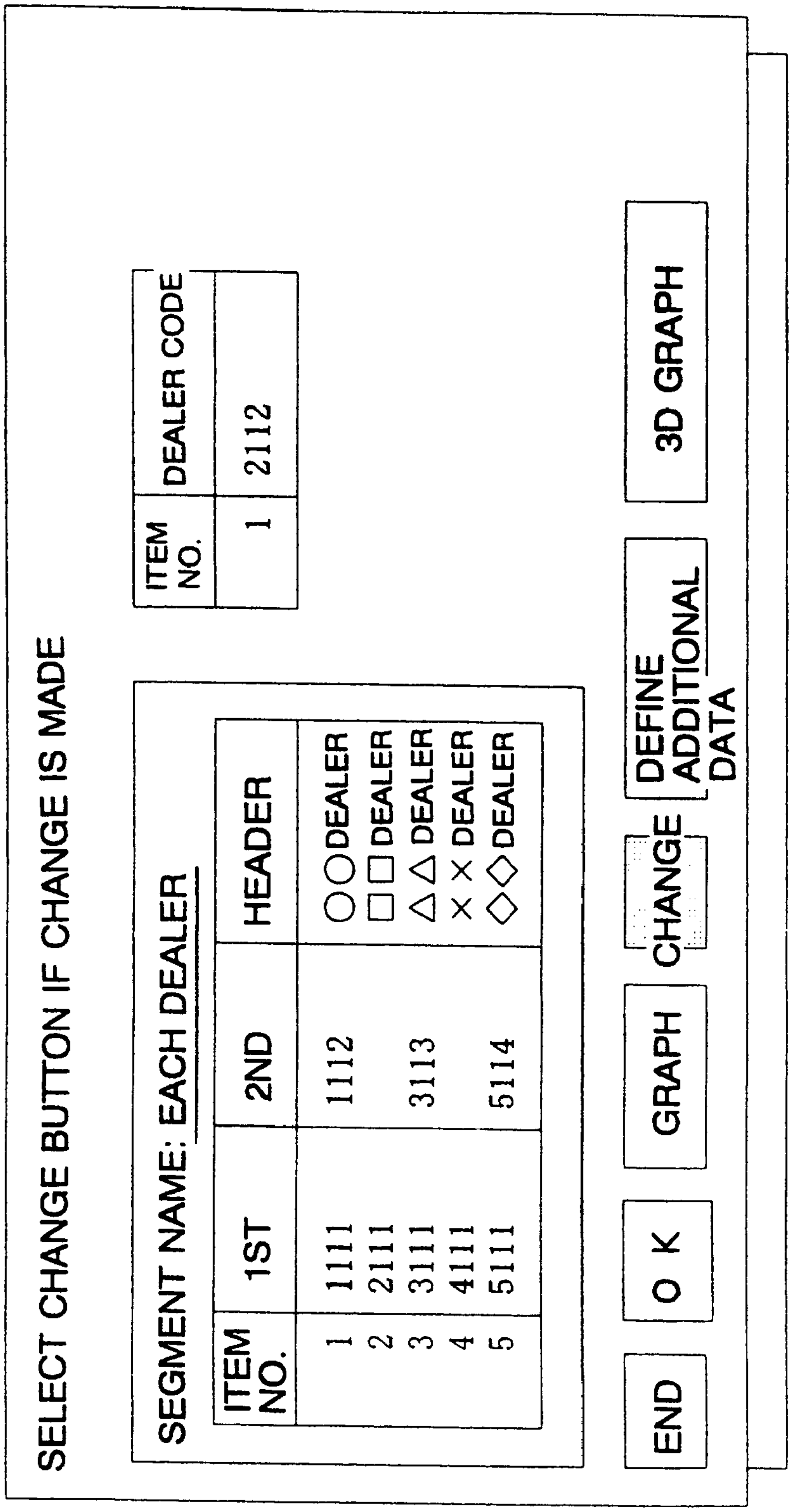
FIG. 98 is a diagram showing the display screen of segment data changes for explaining the database system of FIGS. 2 to 4.

If the "CHANGE SEGMENTING DEFINITION" button is selected, the control is transferred to the sorting data definer 20, and the screen, as shown in FIG. 98, can be displayed to correct the sorting data.

Figure 99:
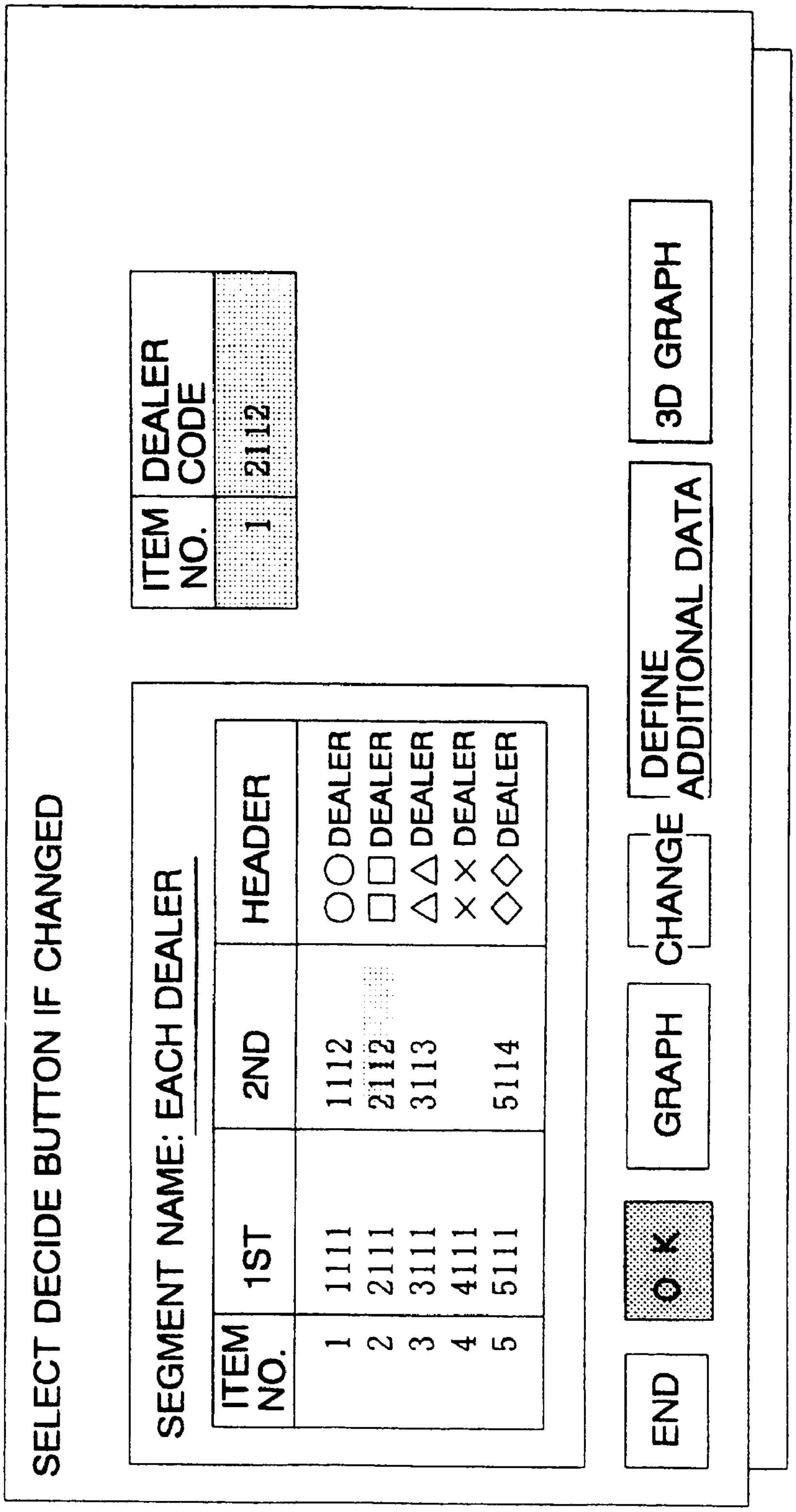
FIG. 99 is a diagram showing the display screen of the segment data changes for explaining the database system of FIGS. 2 to 4.

If the "CHANGE" button is selected, the screen, as shown in FIG. 99, can be displayed to change the worksheet of the sorting definitions. The terminal operator can change the definitions while observing such data values displayed at the righthand side of the terminal screen as have a problem in the consistency or an unmatching.

In the screen of FIG. 99, the row of the dealer code "2112" is selected and is then attached to the second column of the □□ dealer of the worksheet so that the dealer code "2112" can be added to the segment of the □□ dealer.

If the "OK" button is selected, it is deemed that a series of changes have been completed, and the confirmation of matching is executed again. If there is no problem, the segmenting specification recording area of the dictionary is updated, as shown in FIG. 100.

<<Embodiment 2>>

The second embodiment of the present invention relates to a function to support the data exploitations to which are applied the management points of the database system shown in FIG. 1, and is characterized in the storage management of the time series data.

The transaction data to be managed by the trunk business system for the sales management or the like are recorded/managed as a record of bill data so that the values of the data items corresponding to the date are updated at the timings of receipt of orders, delivery, demand for payment and receipt of money. In case, therefore, the sales data are to be fetched at the unit of month, week, day and so on, the necessary records, as correspond to the counting unit of the receipt of orders or sales, are extracted to create new data such as the sales of ○○ month of ○○ year or the receipt of orders of ○○ date, ○○ month of ○○ year.

For the data exploitations, on the other hand, not only the new data, as generated as the latest data, are exploited, but also the preceding data are frequently exploited with a view to examining the elongation rate of the volume of sales, evaluating the season fluctuations and managing the promising results. For these operations, the data to be periodically sent out from the trunk business system have to be stored/managed as the time series data.

The time series data to be stored/managed are frequently coped with by application programs for different applications because the data periods and the data grouping levels are different (as to the time interval of day or month, the specifications of every commodities, or the accumulations of every commodity groups). In the applications of this case, the aspects of operating/managing the data by the applications are troubled at the stage of arrival at the maximum storage period by deleting the oldest data and adding new data thereby to leave the period number unchanged, or by rewriting the processing logic from that at the initial stage of arriving at the maximum storage period. For the applications, moreover, the programs have to be newly made so as to satisfy the demand of the new time series data.

If the time series data are edited on the basis of the data sent out from the trunk business system, the direction of time is vertical or exemplified by the column (in which the records express the time period of one unit) because of the characteristics of the database system. In the final mode of the data exploitations, however, the time direction is generally taken in the horizontal direction, i.e., in the figure direction. Therefore, the user has to change the vertical and horizontal directions after the data have been fetched from the database.

In the second embodiment of the present invention, the time series data are processed in the following manner.

The definition data for regulating the grouping type (e.g., the starting point of the grouping, or the accumulating process for the summing or the term end) to make the data sent out from the trunk business system into the time series data are managed by the dictionary accompanying the database in relation to the database data. The managed data are processed by the time series data generating function of the time series data managing function, which are contained by the system. By adopting this method, the time series data are generated and stored/managed not through the application programs or the like.

At the data exploiting time, the system has functions: to automatically determine the corresponding time series data with reference to the time series definition data of a dictionary on the basis of the minimum instruction (e.g., the instruction of the data exploiter to select the necessary items from the list of data items displayed in the screen of the terminal unit of the data exploiter; and to deduce a time series editing formula to determine the final data fetching type in case the corresponding time series data are unedited (e.g., in case the time series data at the unit of month exist but the time series data at the unit of half term do not). If, in this case, the final fetching type cannot be uniquely determined, the system has a function to confirm the intention of the user or to navigate. As a result, the highly frequently used time series data can be operated to exist as the actual data on the database whereas the lowly frequent time series data can be operated to be processed each time, so that the data storage efficiency of the database can be improved.

In dependence upon what location of the layout screen of the terminal screen the data items for expressing the time are assigned to, the vertical-horizontal changing functions of the time series data, as packaged in the system, can be automatically scheduled so that the user can fetch the time series data without being conscious of the structure of the database.

Incidentally, the system can also be given a management support function to prevent no mismatch between the data sent out from the trunk business system and the time series data.

The second embodiment of the present invention thus constructed is characterized, as in the preceding first embodiment, in the functional constructions of the setup unit 4, the inquiry unit 6 and the operations support unit 5 in the basic construction of the database system, as shown in FIG. 1.

FIGS. 101, 102 and 103 show the details of the respective functional constructions of the setup unit 4, the inquiry unit 6 and the operations support unit 5 of the database system according to the second embodiment of the present invention. These FIGS. 101, 102 and 103 such portions of the setup unit 4, the inquiry unit 6 and the operations support unit 5 of the database system of the present invention as have relations mainly to the second embodiment. The portions shared with FIGS. 2, 3 and 4, respectively, are designated at the common reference numerals.

As shown in FIG. 101, the setup unit 4 is constructed to include a data setup main controller 11, a data item definer 12, an operated data item definer 16 and a management point definer 19. These data item definer 12, operated data item definer 16 and management point definer 19 feed their individual defined data to the dictionary 3.

As shown in FIG. 102, the inquiry unit 6 is constructed to include a data exploiting main controller 31, a layout determinator 32, a sorting data selection optimizer 33, a data fetch driver 35, a retriever 36, a media transformer 38, a data display linker 39, a time series data function processor 51 and a data invertor 52. Moreover, a time series data editor 63 also operates with the operation of the inquiry unit 6. The sorting data selection optimizer 33 operates with reference to the dictionary 3. The time series data function processor 51 operates with reference to the dictionary 3 to output the processed data to the public database 2.

As shown in FIG. 103, the operations support unit 5 is constructed to include an operations management supporting main controller 41, a time series extracted job definer 61, a time series data extractor 62 and a time series data editor 63. The time series extracted job definer 61 defines the time series extracted job for extracting the time series data to record/manage the defined job in the dictionary 3. The time series data extractor 62 outputs the time series data, as are extracted from the sent database 1A sent out from the trunk database 1 of the trunk business system, to the public database 2 through the time series data editor 63. In other words, the time series data editor 63 edits the time series data, which are extracted from the time series data extractor 62, with reference to the dictionary 3 and feeds the edited data to the public database 2.

Here will be described the functions and operations of the aforementioned individual portions in detail in connection with the specific operations and processings.

(2-1) Generation of Jobs Fetched to Public Database of Trunk Database

The operations support unit 5 has functions to generate (at the time series extracted job definer 61) the extracted job (or procedure) for fetching the database data (1A) sent out from the trunk database 1 of the trunk business system to the public database 2, to execute (at the time series data extractor 62) the generated job, and to tune the same. In short, the operations support unit 5 supports the smooth operations of the database. This operations support unit 5 is controlled in its entirety by the operations management supporting main controller 41.

Figure 104:
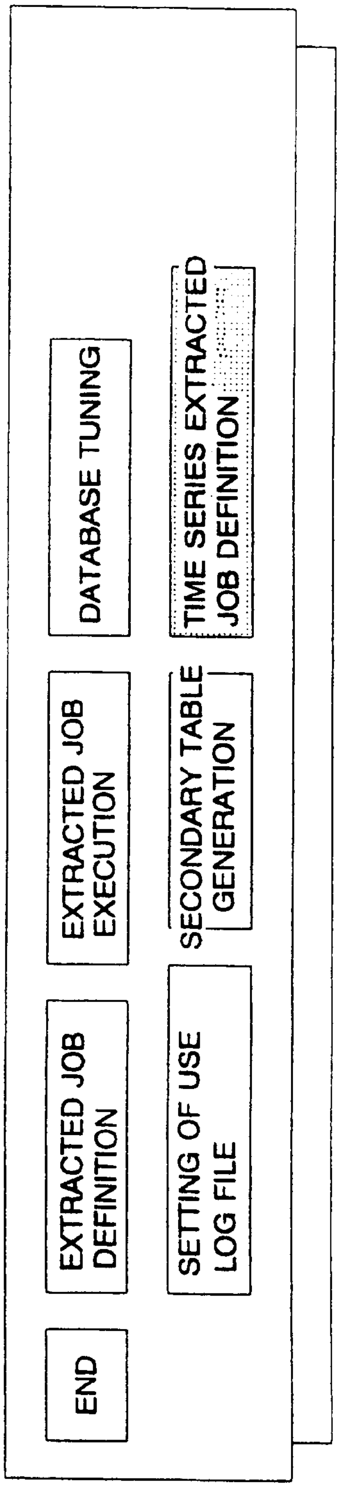
FIG. 104 is a diagram showing the display screen of the initial menu of the operations management for explaining the database system of FIGS. 101 to 103.

This operations management supporting main controller 41 displays the initial menu of the operations management, as shown in FIG. 104, in the screen of the terminal unit so as to execute a predetermined processing. When the terminal operator selects the menu item corresponding to the time series extracted job definition, for example, from the menu of FIG. 104 by using the mouse or the like, the control is transferred to the time series extracted job definer 61 of the trunk database data.

The time series extracted job definer 61 generates the job for executing the operation to fetch the database data 1A sent out from the trunk business system as the time series data to the public database 2. At this time, the time series extracted job definer 61 also has a function to change or delete the generated job. At this time, the time series extracted job definer 61 is constructed to form part of the extracted job definer 42, as shown in FIG. 4, and this extracted job definer 42 has a function to generate the processing procedure to extract and register the public database 2 as the table, as the extracted job, by selecting the data item for the trunk database 1 and by setting the retrieval condition.

In case the data to be extracted are the time series data, the accumulating method can be set subsequent to the item selection. The time series data are exemplified by the data of day unit, the data of month unit, the data of quarter term unit, the data of half term unit and the data of year unit. These time series data are the data which are collected at a predetermined time interval, accumulated and significantly arranged consecutively in the order of time proceeding. Moreover, the accumulating method is divided into the summing, the term beginning, the term end, the maximum, the minimum and the difference between the term beginning and end, so that the type of the data items composing the table to be extracted is determined by the accumulating method.

Figure 105:
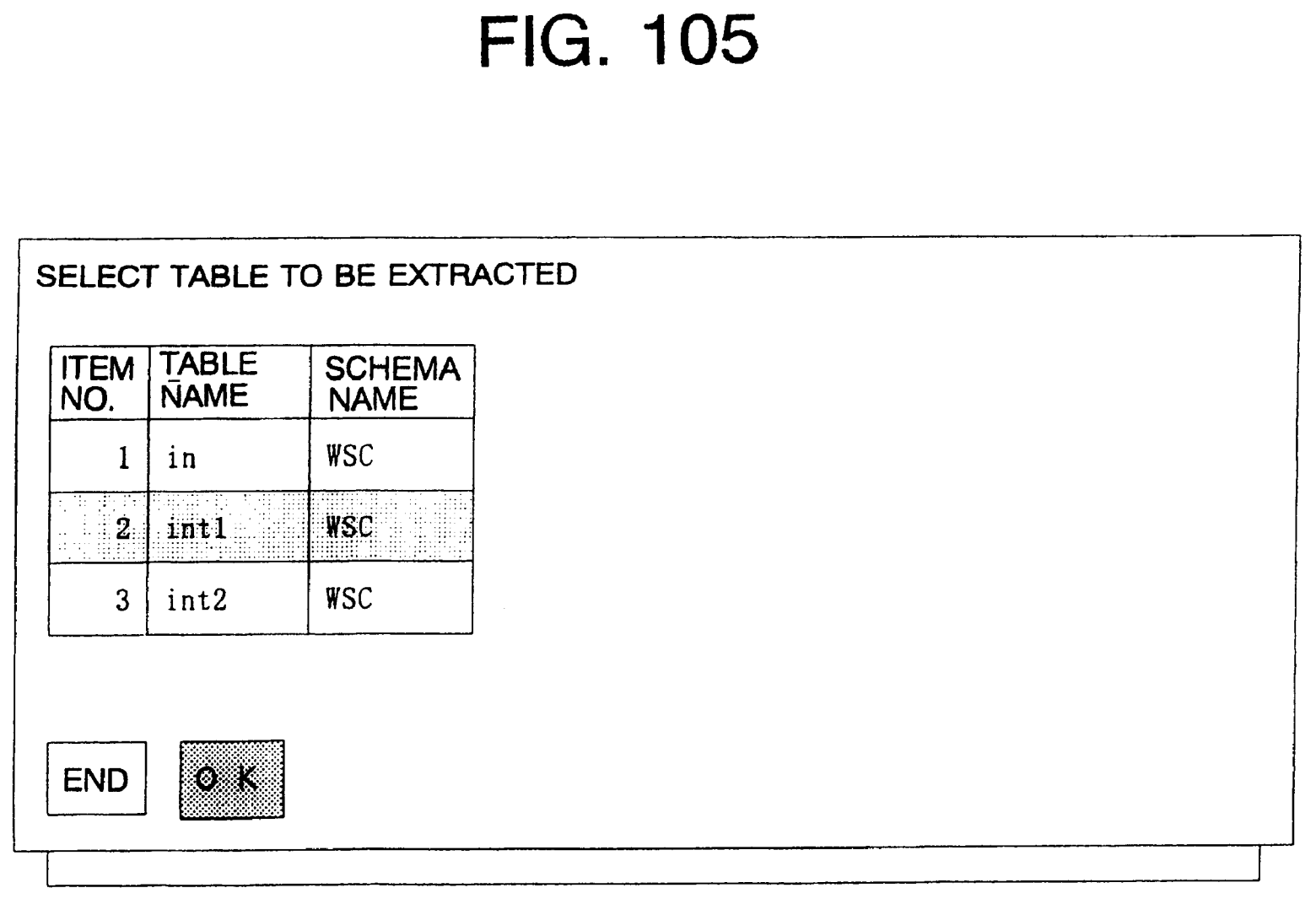

At the time of generating the extracted job, the database data to be sent out from the trunk business system are listed up at the table unit in the terminal screen, as shown in FIG. 105, so that the terminal operator can set the table to be extracted by the extracted job, by selecting a desired table by the mouse or the like.

If the desired table is selected and if the "OK" button is selected by the mouse or the like, as shown in FIG. 105, a list of data items composing the selected table is displayed, as shown in FIG. 106, so that the time series key items (i.e., the data items stored with the data relating to the time) can be selected.

If the desired item such as "time" is selected and if the "OK" button is selected, as shown in FIG. 106, there is displayed in the screen of the terminal unit the worksheet for designating the attribute data such as the data format of the time series key item, the data class of the extraction source and the extraction destination, and the storage segment.

Figure 107:
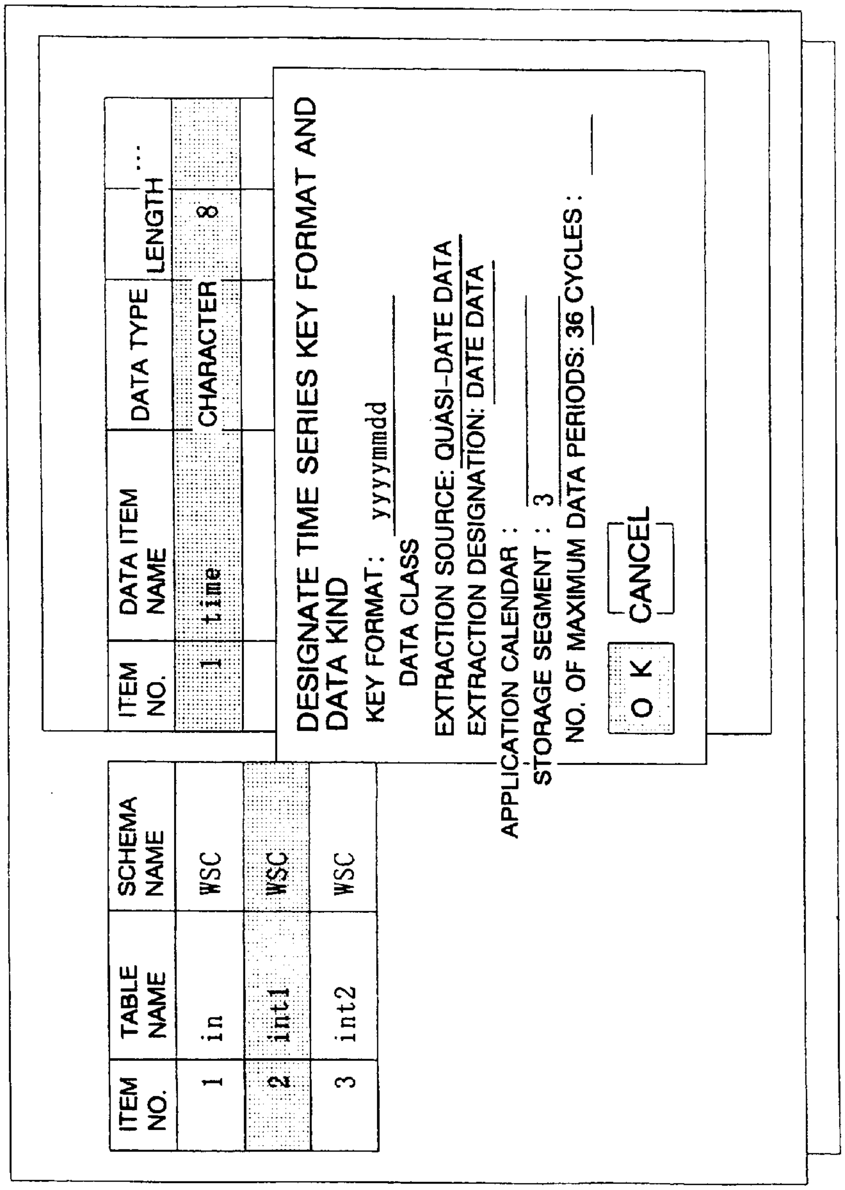
FIG. 107 is a diagram showing a display screen of a time series key item data determining worksheet for explaining the database system of FIGS. 101 to 103.

The attribute data are decided by inputting the desired items to the worksheet of FIG. 107 through the keyboard or the like-and by selecting the "OK" button. These attribute data are recorded/managed in the extracted job data recording area of the dictionary 3, as will be described in more detail.

Figure 108:
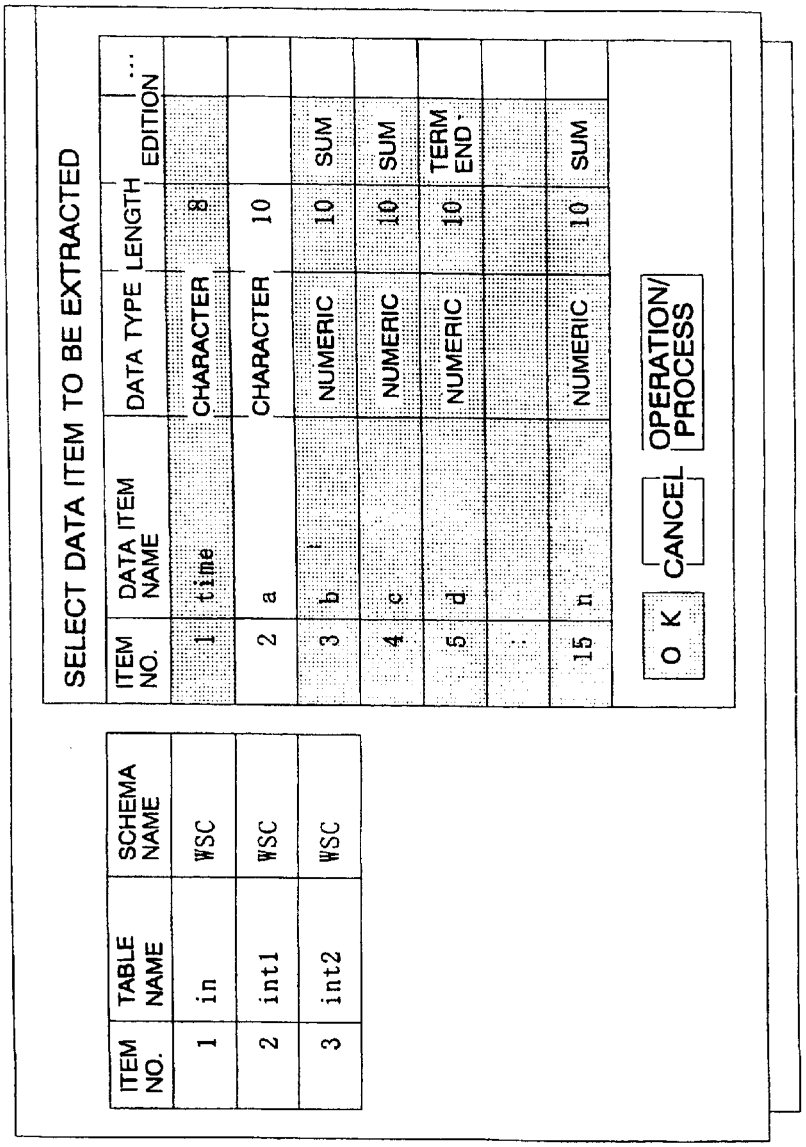
FIG. 108 is a diagram showing a display screen of the table of data items to be extracted for explaining the database system of FIGS. 101 to 103.

When the attribute data are decided, the screen of the terminal unit is changed to that shown in FIG. 108, so that the data item to be extracted can be selected. The "EDITION" column of FIG. 108 indicates the accumulating method of the case of editing as the time series data and can be selected from the "SUM", "TERM END", "MAXIMUM", "MINIMUM" and "DIFFERENCE BETWEEN TERM BEGINNING & END".

The data item to be extracted in the extracted job is decided by selecting the data item to be selected in the screen of FIG. 108, to designate the edition format and by selecting the "OK" button. In FIG. 108, for example, the data items "b" to "n" are selected in addition to the time series key item "time", and the edition format adopted is exemplified by the "TERM END" for "d" and the "SUM" for the remaining data items.

Figure 109:
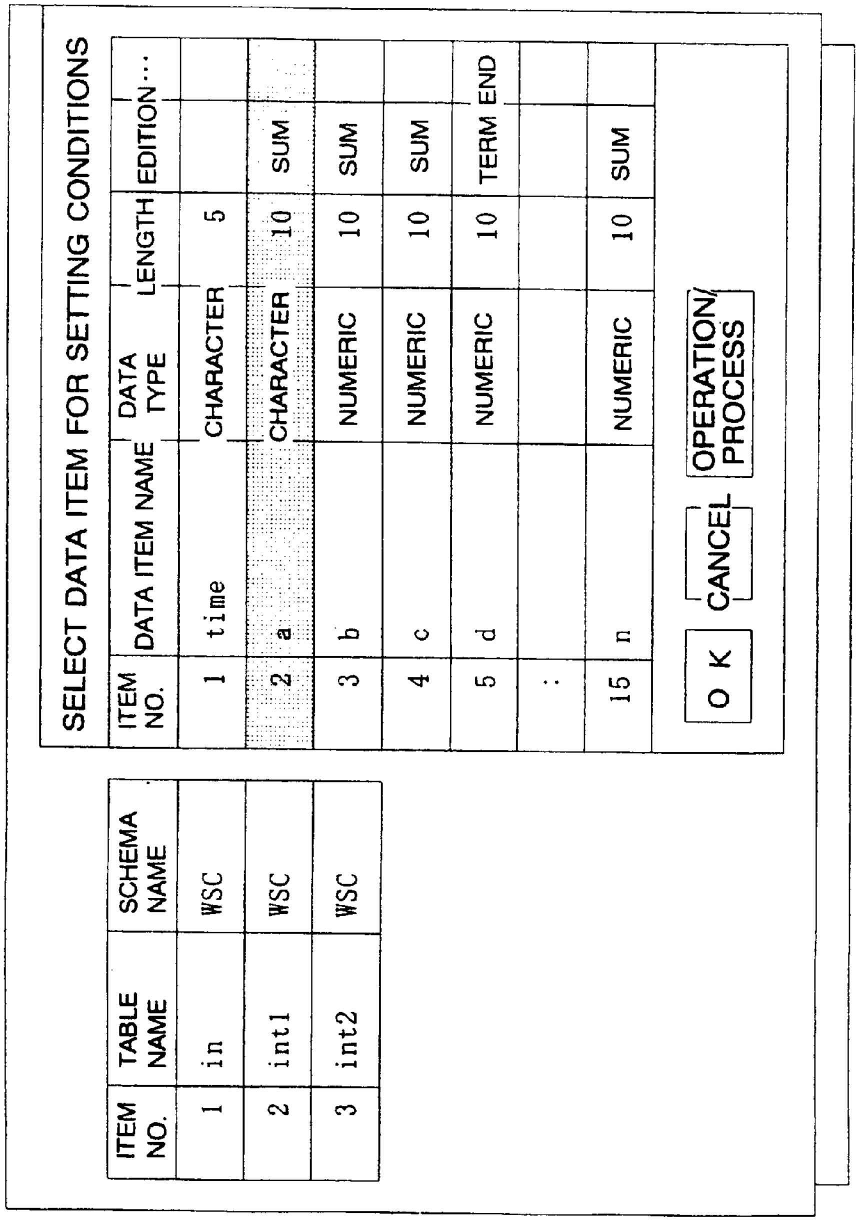
FIG. 109 is a diagram showing the display screen of the table of the data items to be extracted for explaining the database system of FIGS. 101 to 103.

After a specific data item has been selected from the list of data items of FIG. 108, the retrieval conditions can be designated. In FIG. 109, for example, the conditions can be set by selecting the "a", for example, as the data items for setting the conditions.

Figure 110:
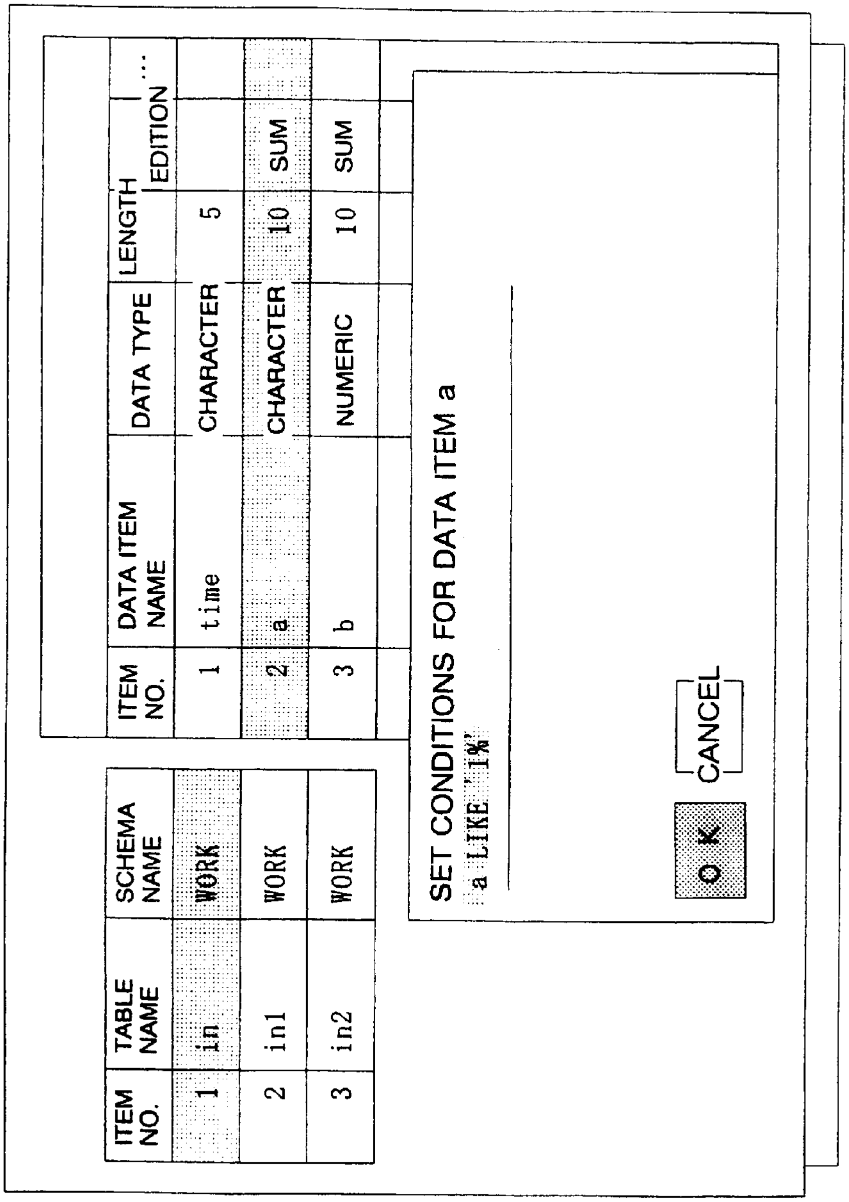
FIG. 110 is a diagram showing the display screen of a retrieving condition setting worksheet for explaining the database system of FIGS. 101 to 103.

When the data items for setting the conditions are selected, there is displayed the worksheet for designating the retrieval conditions, as shown in FIG. 110.

Incidentally, the result, as operated/processed between the data items, can be extracted by selecting the "OPERATION/PROCESS" button. When the "OPERATION/PROCESS" button is selected, the worksheet for defining the operating/processing formula is displayed in the terminal screen so that the operating/processing formula can be defined by selecting the data items from their list and the operands from their operands and by attaching the selected ones to the worksheet.

The extracted job thus generated are relatively recorded/managed in the extracted job data recording area and the extracted job recording area of the dictionary 3, as shown in FIG. 111.

(2-2) Fetch to Public Database of Trunk Database

The operations management supporting main controller 41 controlling the entirety of the operations support unit 5 displays the menu for executing a predetermined processing, as shown in FIG. 104, in the screen of the terminal unit. When the terminal operator selects the menu item corresponding to the "EXTRACTED JOB EXECUTION" by the mouse or the like, the control is transferred to the time series data extractor 62 for extracting the time series data of the trunk database data in case the extracted job is the time series extracted job.

The time series data extractor 62 starts the extracted job, which has been generated by the time series extracted job definer 61, and extracts the database data from the trunk business system and outputs them to the public database 2.

At the start of the extracted job, the extracted job data, as recorded/managed by the dictionary, are listed up in the terminal screen, as shown in FIG. 112, so that an arbitrary extracted job can be started when the terminal operator selects it by the mouse or the like. If the "NARROW" button is selected in the screen of FIG. 112, on the other hand, the worksheet for the narrowing operation is displayed in the screen of the terminal unit so that the conditions for the extracted jobs having the job execution date on or after ○○ date of ○○ month of ○○ year can be designated for the worksheet.

If the desired job such as "EXTRACT3" button is selected and if the "OK" button is selected, as shown in FIG. 112, the selected extracted job is executed so that the executed result is outputted as a message to the screen of the terminal unit.

The time series data extractor 62 transfers the control to the time series data editor 63, in case the extraction destination is time series data. With reference to the extended data of the job of the extracted job data recording area recorded/managed by the dictionary, the time series data editor 63 edits the time series data and then executes the write of the edited data in the public database 2 according to the storage segments. The edition of the time series data by the time series data editor 63 will be described in more detail.

When the extracted job is normally completed, the table is extracted/registered in the public database 2 so that the jog execution column of the extracted job recording area of the dictionary 3 is updated at that date.

Figure 114:
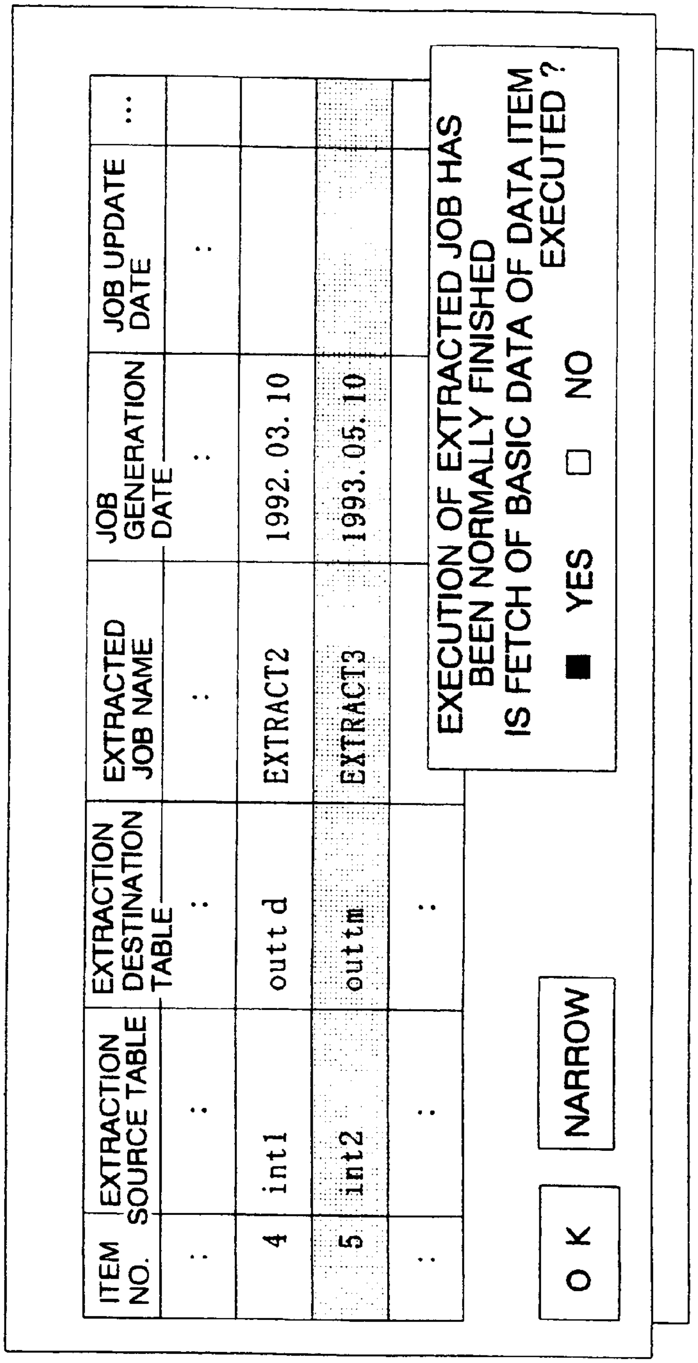
FIG. 114 is a diagram showing the confirmation screen of the finish of an extracted job for explaining the database system of FIGS. 101 to 103.
Figure 116:
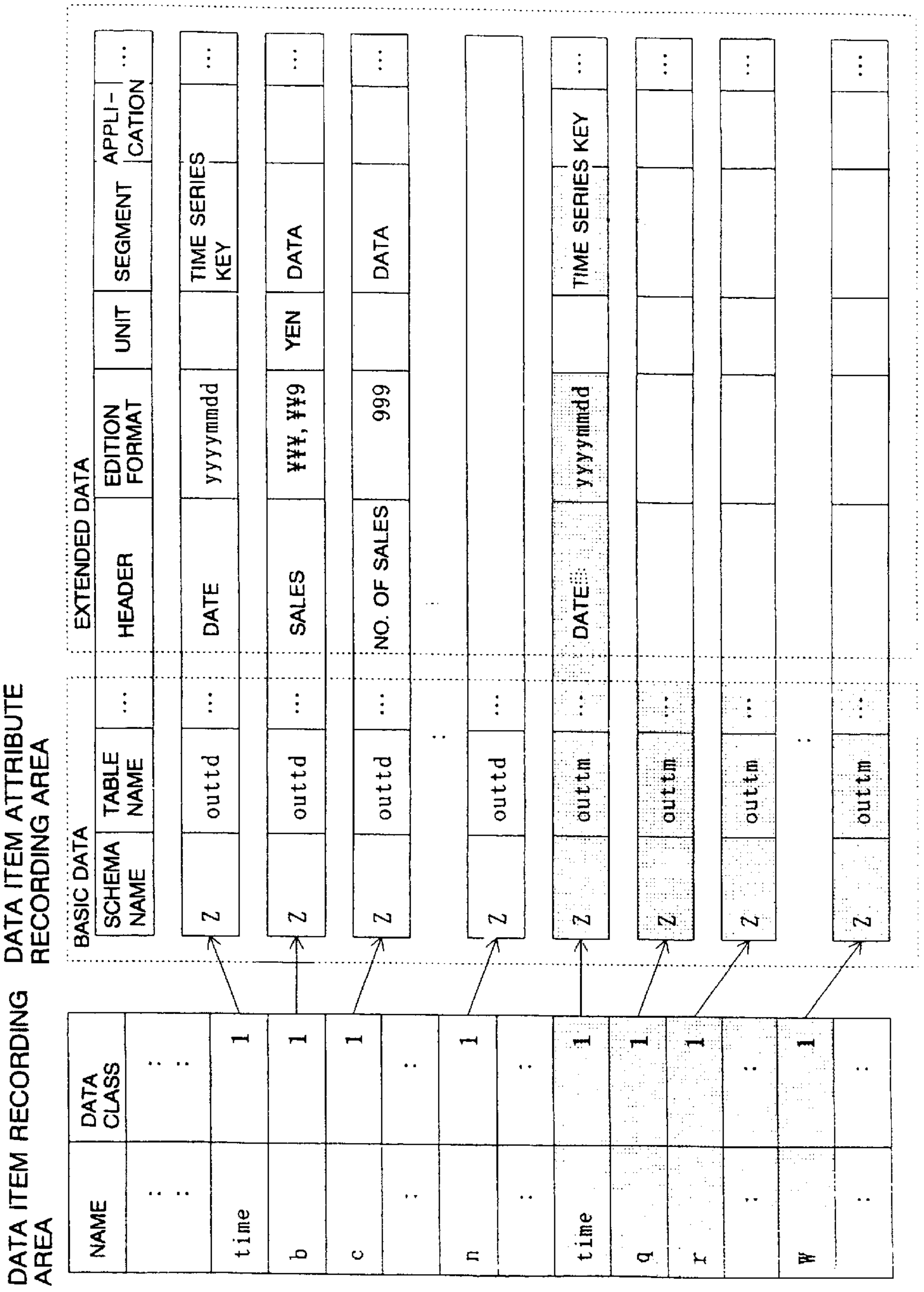
FIG. 116 is a schematic diagram for explaining the data item recording area and the data item attribute recording area of the database system of FIGS. 101 to 103.

At this time, the fetch of the basic data in the data items, as recorded/managed by the extracted job recording area, that is, the generation/update of the data item attribute data is not executed yet so that the fetch of the basic data of the data items is effected in case the "BASIC DATA" column is "NOT YET". Specifically, in case the fetch of the basic data is not executed yet so that the "BASIC DATA" column is "NOT YET", the message, as indicated in FIG. 114, is displayed so that the fetch of the basic data is executed in accordance with the instruction of the terminal operator. Even if, on the other hand, the fetch of the basic data has already been executed so that the "BASIC DATA" column is filled with "FINISHED", it can be executed likewise by the instruction of the terminal operator. When the fetch of the basic data is thus executed, the "FINISHED" is set in the "BASIC DATA" column, as shown in FIG. 113. In case, moreover, the fetch of the basic data has already been executed so that the "BASIC DATA" column is filled with "FINISHED", the message shown in FIG. 114 is not displayed so that the fetch of the basic data is not executed. The basic data of the data items are recorded/managed by the table 3 together with the table management data in the format shown in FIG. 115. In case the table segment is "5" in FIG. 115, it indicates the time series data. Incidentally, for the time series key items, as shown in FIG. 116, there are set at this stage the header, the edition format and the segment of the extended data in addition to the basic data of the data items.

(2-3) Data Definitions of Data Items

The setup unit 4 has functions to define the tables existing in the database and the various attributes of the data items composing each table and to define the management points and so on, and sets up the various data to be recorded/managed by the dictionary 3 so as to facilitate the exploitations of the database data and maintain the high reliability. This setup unit 4 is controlled in its entirety by the data setup main controller 11.

This data setup main controller 11 displays the initial menu for the setup operation, as shown in FIG. 23, in the display of the terminal unit so as to execute a predetermined operation for the setup. When the terminal operator selects a menu item corresponding to the definition of the data item, for example, from that menu, the control is transferred to the data item definer 12.

This data item definer 12 displays the list of the table segments (as shown in FIG. 24), as based upon the table management data recorded/managed in the table management data recording area of the dictionary 3, in the screen of the terminal unit and then the list of the tables (as shown in FIG. 25) belonging to the selected table segment. The terminal operator selects the table for defining/updating the extension data of the data item while confirming the "DATA UPDATE DATE OF DATA ITEMS" (nothing but the basic data is defined in the data item of the table if the "DATA UPDATE DATE OF DATA ITEMS" column is blank).

When the table for defining/updating the extension data of the data items is selected, the worksheet for defining the data of the data items composing the selected table is displayed (as shown in FIG. 28) in the screen of the terminal unit so that the extension data can be defined/updated. Incidentally, for the time series key items of the time series data, the definitions have been completed in advance by the system at the time of fetching the basic data. The detail of these data definitions of the data item data has already been described in connection with the first embodiment.

Figure 117:
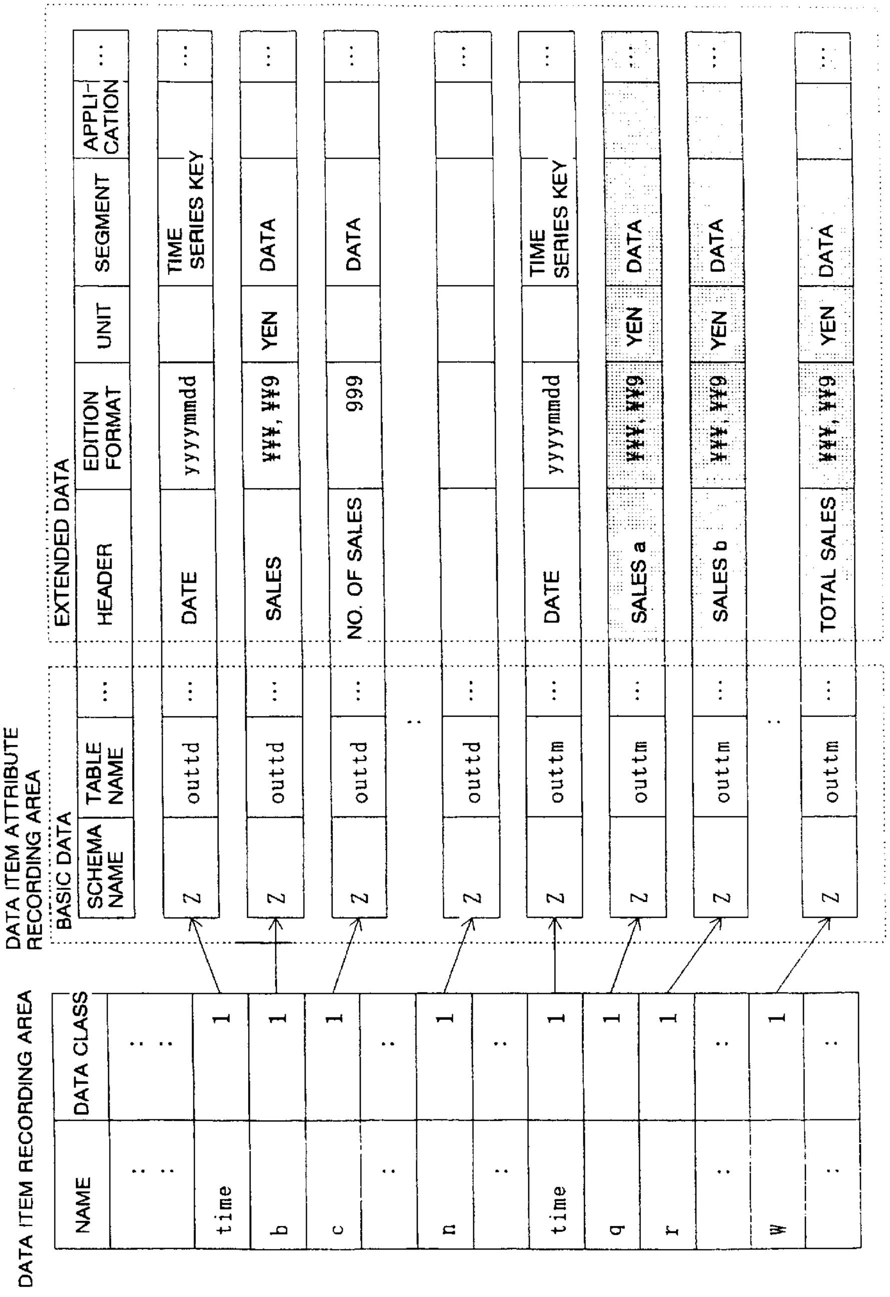
FIG. 117 is a schematic diagram for explaining the data item recording area and the data item attribute recording area of the database system of FIGS. 101 to 103.

On the basis of the data inputted to the aforementioned worksheet, the extension data column of the data item attribute recording area of the dictionary 3 is updated, as shown in FIG. 117.

(2-4) Definitions of Operated Data Items

Figure 118:
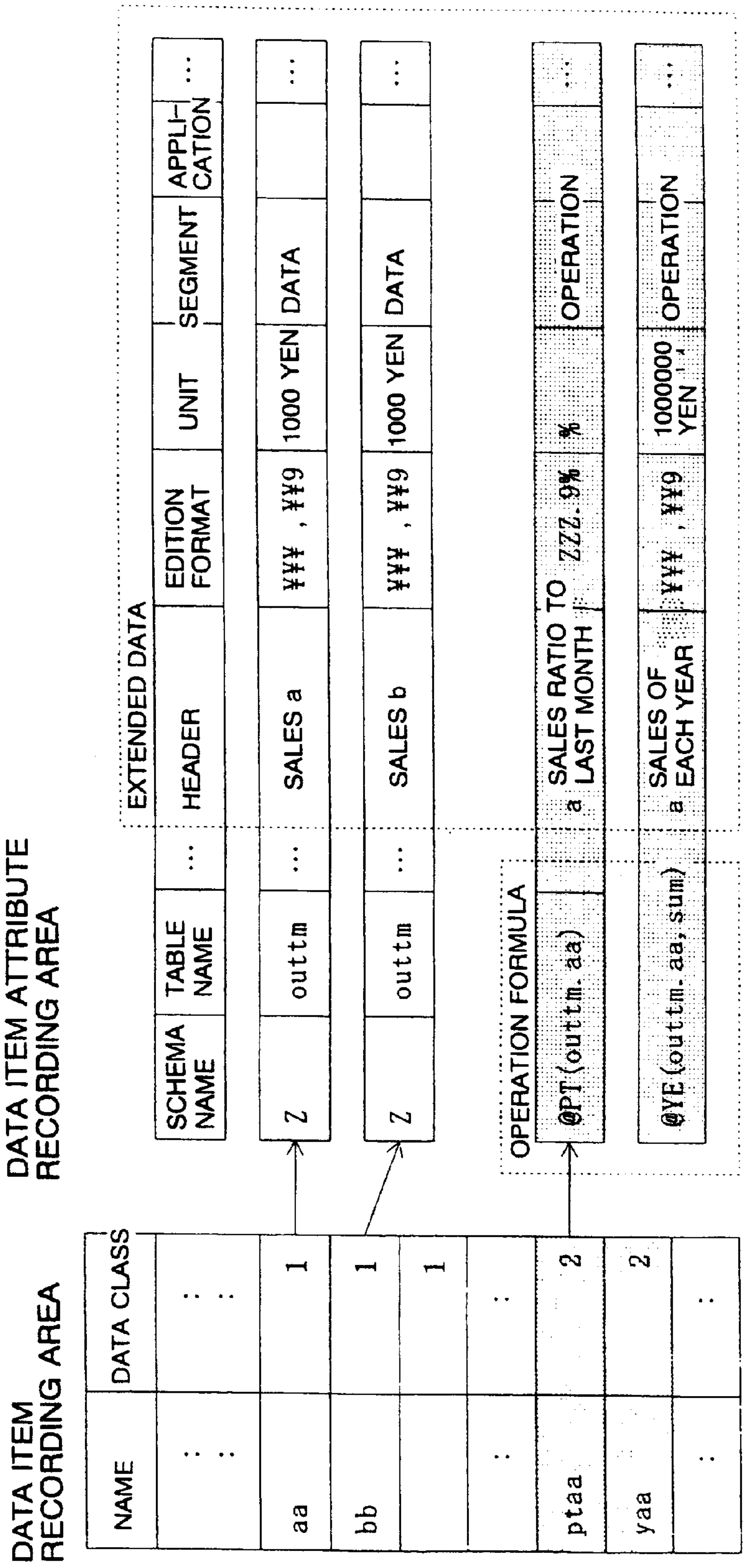
FIG. 118 is a schematic diagram for explaining the data item recording area and the data item attribute recording area of the database system of FIGS. 101 to 103.

As has been described in the first embodiment, the operated data item definer 16 of the setup unit 4 defines the data items, which do not actually exist in the public database 2, by operating/processing the data item which actually exist in the public database 2. The data items thus defined by the operated data item definer 16 are recorded/managed like the actually existing data items in the data item recording area and the data item attribute recording area of the dictionary 3. FIG. 118 shows the case in which it is defined to generate the sales ratio to the last month from the existing data item "SALESa" or the existing data item by the arithmetic operation. In the arithmetic formula of the data item attribute recording area of FIG. 118, the "@PT" expresses a function for calculating the sales ratio to the last month, and the "@YE" expresses a function for editing the annual data, which are accumulated by summing because it has a second parameter "SUM".

The data items thus defined are listed up while including the existing data items at the stage of exploiting the database data, so that the arithmetic operations can be automatically scheduled merely by making a selection from the list to fetch the operated data values. As a result, the database data user can receive the benefit of improvements in the operability while less frequently considering the operations/processings. Moreover, the operated/processed data items need not exist in the database so that the volume of the database can be reduced.

(2-5) Definitions of Management Points

As has been described in the first embodiment, the management point definer 19 of the setup unit 4 defines the management points. By this management point definer 19, it is possible to add a management point, to change a defined management point, and to delete a defined management point. The management points are recorded/managed in the management point recording area of the dictionary 3. A common management point is recorded/managed by a common dictionary, and a management point for each person or object is recorded/managed by a personal dictionary.

For defining the management points, the management point definer 19 displays the list of the contents, which are recorded/managed in the management point recording area of the dictionary 3, in the screen of the terminal unit, as shown in FIG. 72. If, in the terminal screen of FIG. 72, the displayed button corresponding to "ADD" is selected by the mouse or the like, the addition of the management point is started, and the screen defining the attribute data of the management point is displayed in the screen of the terminal unit (as shown in FIG. 73) so that the attribute such as the name can be inputted through the keyboard or the like. When the inputting of the attribute data of the management point is complete, a message inquiring whether or not the definition of the sorting data is subsequently executed is outputted to the screen of the terminal unit. When the will of the terminal operator can be confirmed, the control is transferred to the sorting data definer 20 (as shown in FIG. 2) so that the sorting data to be added to the management points can be defined.

For the time series data, there is adopted a method which the time is automatically adopted as the management point, so that no consciousness is required of the terminal operator so long as the management points other than the time are not defined.

In the example of the management point recording area and the sorting data recording area, as shown in FIG. 119, there is shown an example, in which the display order of the management points relating to the time, as has been implicitly set at the initial stage by the system, is changed. The time management points are expanded in the "sections" of the data kinds of the time series data. At the time of exploiting the database data, the management points and the "sections" are listed up in the terminal screen, but the aforementioned display order is one for that time so that it can be arbitrarily set/changed while considering the using frequency.

(2-6) Managements of Dictionary Defining Data

As has been described in the first embodiment, the data item management support 21 of the setup unit 4 narrows the data on the data items, as recorded/managed by the dictionary 3, by designating a specific condition, displays the data item satisfying the specific condition in the screen of the terminal unit, and prepares the data item into the document format to be managed, to print it by the printer unit. By this data item management support 21, it can be easily grasped what database or table a data item exists in and what attribute the same exists with, such as the relation between the data items or the relation between the data item and the management point.

Likewise, the table management support 22 of the setup unit 4, as has been described in the first embodiment, narrows the data on the tables, as recorded/managed by the dictionary 3, by designating a specific condition, displays the table satisfying the specific condition in the screen of the terminal unit, and prepares the table into the document format to be managed, to print it by the printer unit. By this table management support 22, it can be easily grasped what attribute a table exists with, such as the relation between the tables.

Likewise, the point management support 23 of the setup unit 4, as has been described in the first embodiment, narrows the data on the management points, as recorded/managed by the dictionary 3, by designating a specific condition, displays the management point satisfying the specific condition in the screen of the terminal unit, and prepares the management point into the document format to be managed, to print it by the printer unit. By this point management support 23, the sorting data or the like, as are hierarchized and added to the management point, can be grasped.

(2-7) Exploitations of Database Data

On the basis of the data recorded/managed by the dictionary 3, the inquiry unit 6 processes the database data into the format which is demanded by the exploiter of the database data. This inquiry unit 6 is controlled in its entirety by the data exploiting main controller 31.

Figure 120:
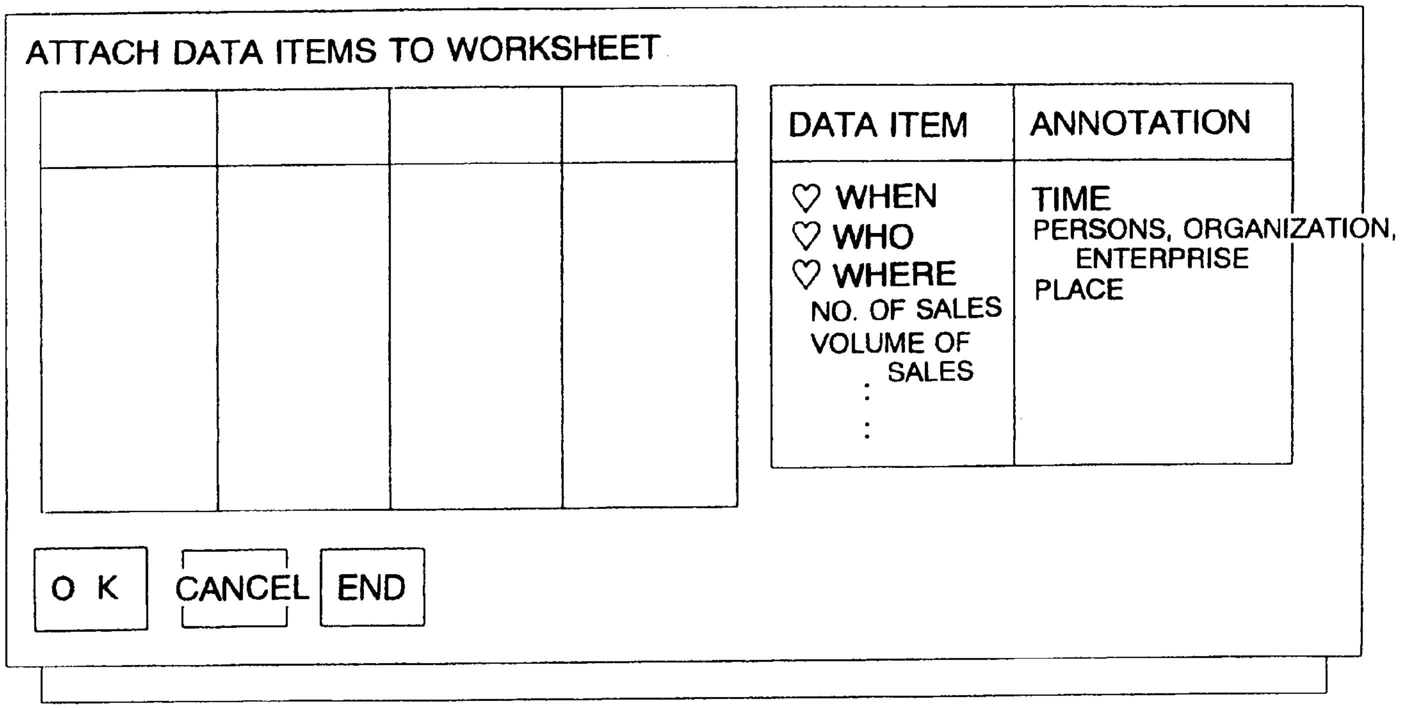

When the control is transferred to the layout determinator 32 by the layout setting demand of the database data exploiter from the data exploiting main controller 31, the layout determinator 32 displays the worksheet for determining the final layout of the database data and the lists of the management points and the data items in the terminal screen, as shown in FIG. 120, with reference to the data on the management points and the data items, as recorded/managed by the dictionary.

Figure 121:
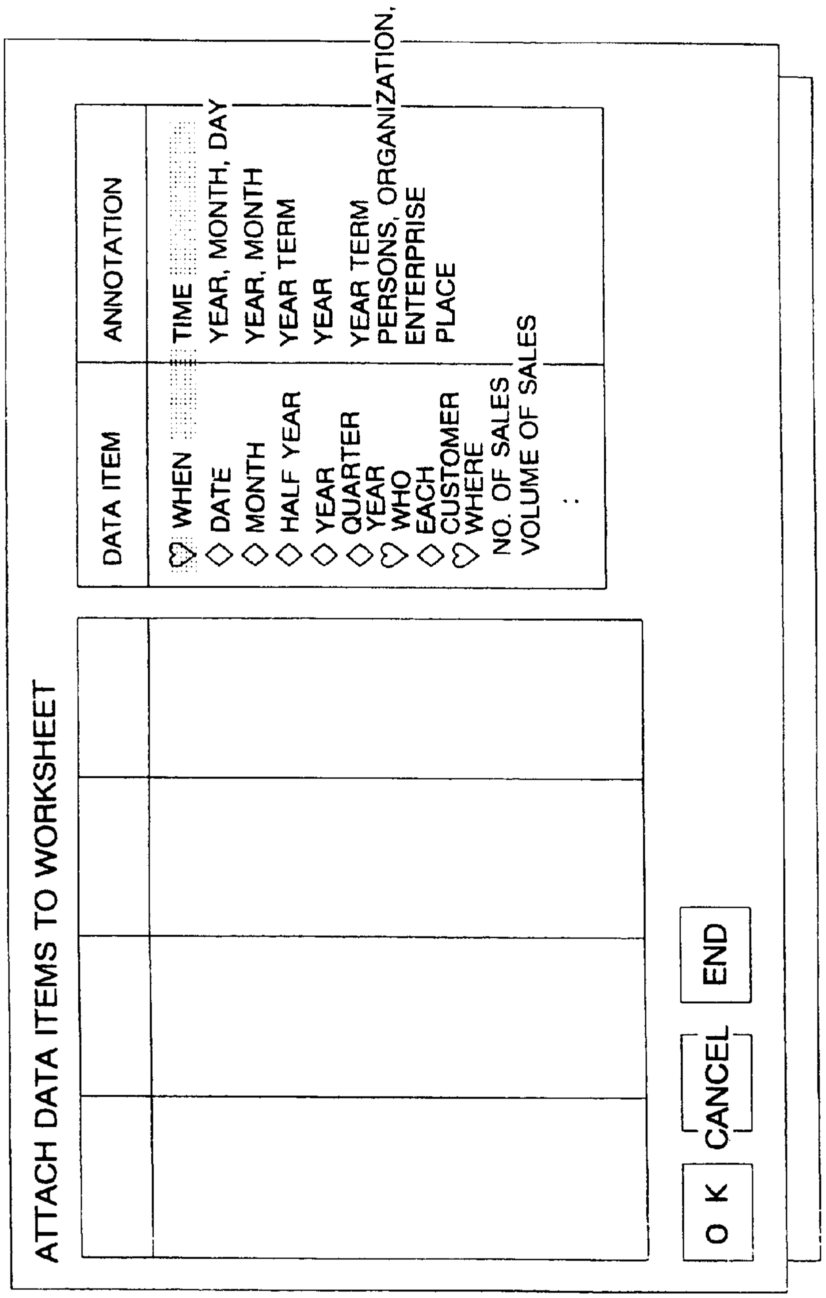

If, in the screen of FIG. 120, a management point (as discriminated by the "heart mark") is selected by double-clicking the mouse, the control is transferred to the sorting data selection optimizer 33 to additionally display the hierarchized sorting data which are attached to the selected management point. In FIG. 121, the management point "WHEN" is double-clicked so that the segment definitions (as discriminated by the "diamond mark") are inserted and displayed below the management point.

Figure 122:
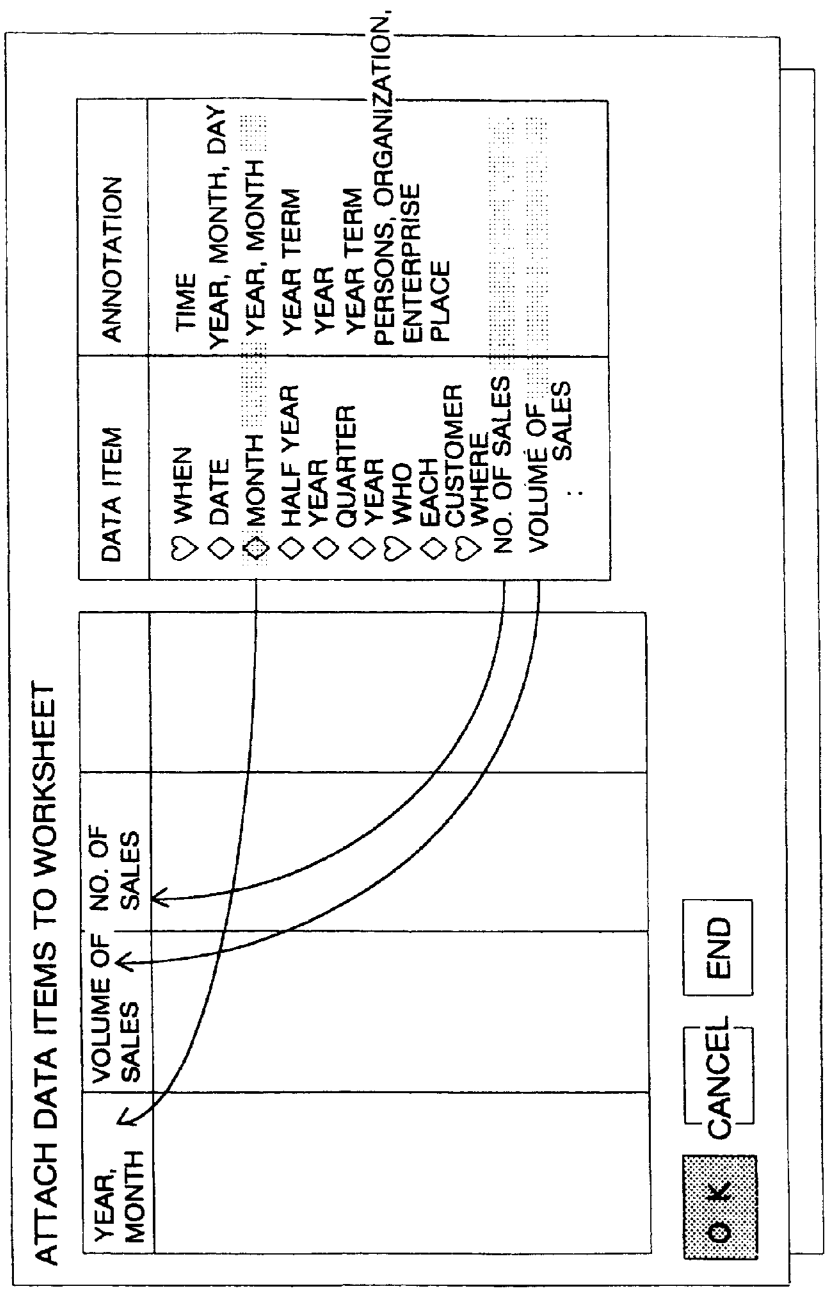

The layout is determined, as shown in FIG. 122, by selecting a desired data item by dragging the mouse from the list of data items containing the sorting data, which are displayed by selecting the list of management points, and the list of data items, which are displayed by selecting the integral data items and the grouping data items, and by pasting the selected data item to the worksheet.

In case a management point is so selected that its sorting definitions are neither inserted nor displayed, the hierarchized sorting data, as recorded/managed by the dictionary 3 in relation to that management point, are listed up in the terminal screen in accordance with the display order. The terminal operator completes the operation of selecting the management points, by making the selection from the list by the mouse or the like. In case the sorting data are to be confirmed at this time, they can be displayed in the terminal screen and confirmed by double-clicking the target sorting data from the list by the mouse.

When the pasting of the data item is completed, the layout of the table is decided if the "OK" button is selected by using the mouse or the like. The layout determinator 32 transfers the control to the data fetch driver 35 after it has been confirmed that no significant inconsistency is in the layout of the table having the data items pasted thereto.

The data fetch driver 35 generates a procedure instruction for driving the retriever 36 on the basis of the layout data which have been decided by the layout determinator 32. In case the selected data item is the operated/processed data item, the data fetch driver 35 generates a procedure containing the operation formula by referring to the operation formula of the data item attribute data recording area, as recorded/managed by the dictionary.

In case there are a plurality of links of time series tables, a linking condition formula for linking the tables is generated by using the individual time series key items as the linking keys.

In case the data classes of the time series tables to be liked are different, there is generated a procedure instruction for executing the time series edition (in which the date data are edited into the month data so that the linked data may be processed as the month data in case the date data and the month data are to be linked) for effecting the linkages.

In case the management point "WHEN" is selected as a horizontal repetition of the table, there is generated a procedure instruction for inverting the data in the vertical-horizontal transformations (or inversions). This point will be later described in more detail in connection with the fetch of the inverted time series data.

When the generation of the procedure instruction by the data fetch driver 35 is completed, the control is transferred to the retriever 36.

This retriever 36 interprets the generated procedure instruction to execute the retrieval/processing of the database data.

In case there exists a functional processing intrinsic to the time series data at the time of the operation/processing, the control is transferred to the time series data function processor 51 to execute the functional processing. In case there exists the edition processing intrinsic to the time series data, the control is transferred to the time series data editor 63. In case there exists the processing of the vertical-horizontal data transformations, on the other hand, the control is transferred to the data invertor 52 to execute the vertical-horizontal transformations of the data.

When the executions of all procedure instructions are completed, the control is transferred to the media transformer 38.

This media transformer 38 transforms the retrieved/processed results into the format which can be displayed in the screen of the terminal unit, and transfers the control to the data display linker 39.

Figure 123:
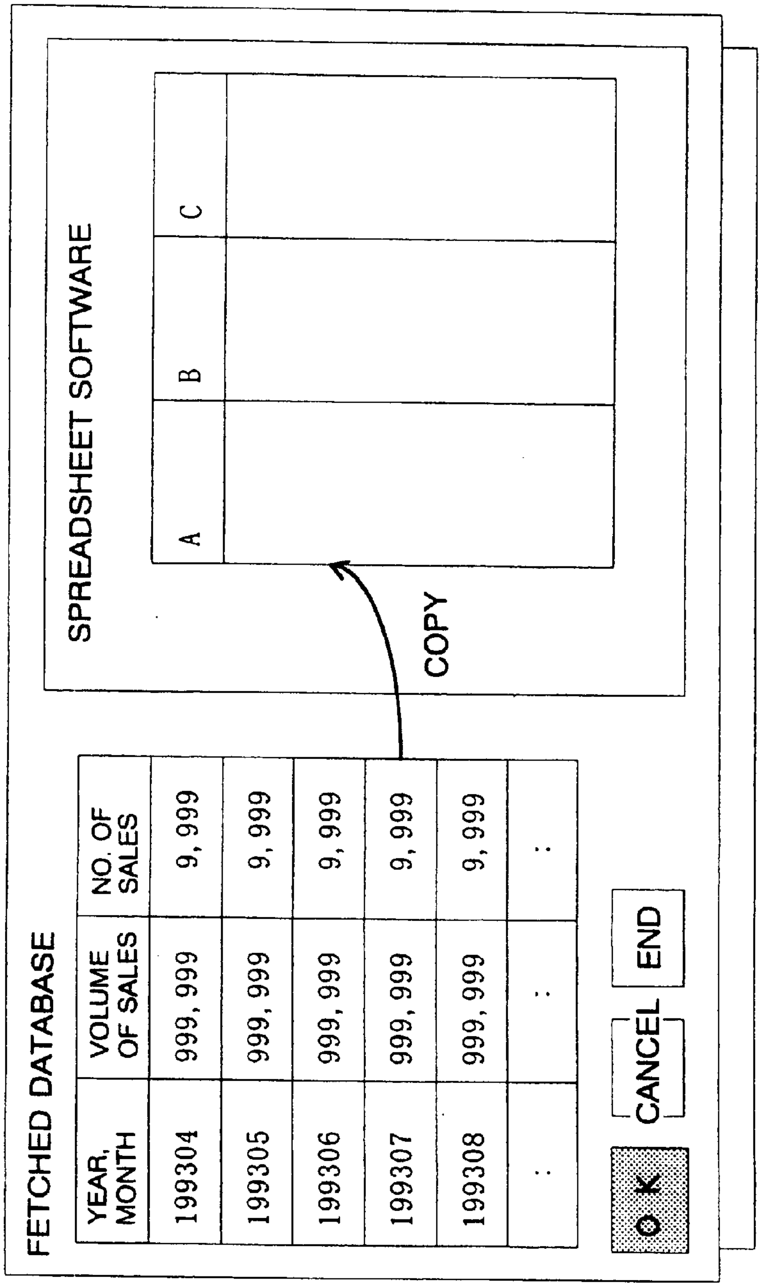

This data display linker 39 makes it possible to effect the data linkage with an application software such as a spreadsheet software, as shown in FIG. 123, by displaying the operated/processed results in the screen of the terminal unit, by displaying the application software such as the spreadsheet software together with the operated/processed results in the screen of the terminal unit, and by copying the operated/processed results onto the spreadsheet software on the screen.

(2-8) Fetch of Inverted Type Time Series Data

In the table containing the time series data, the time axis is frequently taken in the horizontal direction with a view to making understandable the transition of the data value according to the lapse of time. From the standpoint of facilitating the maintenance/management of the database, however, most of the time series data are arranged in the vertical direction on the database.

The problem of these contradictory arrangement relation, the time axis can be directed either vertically or horizontally by making a linkage to the layout mechanism.

Figure 124:
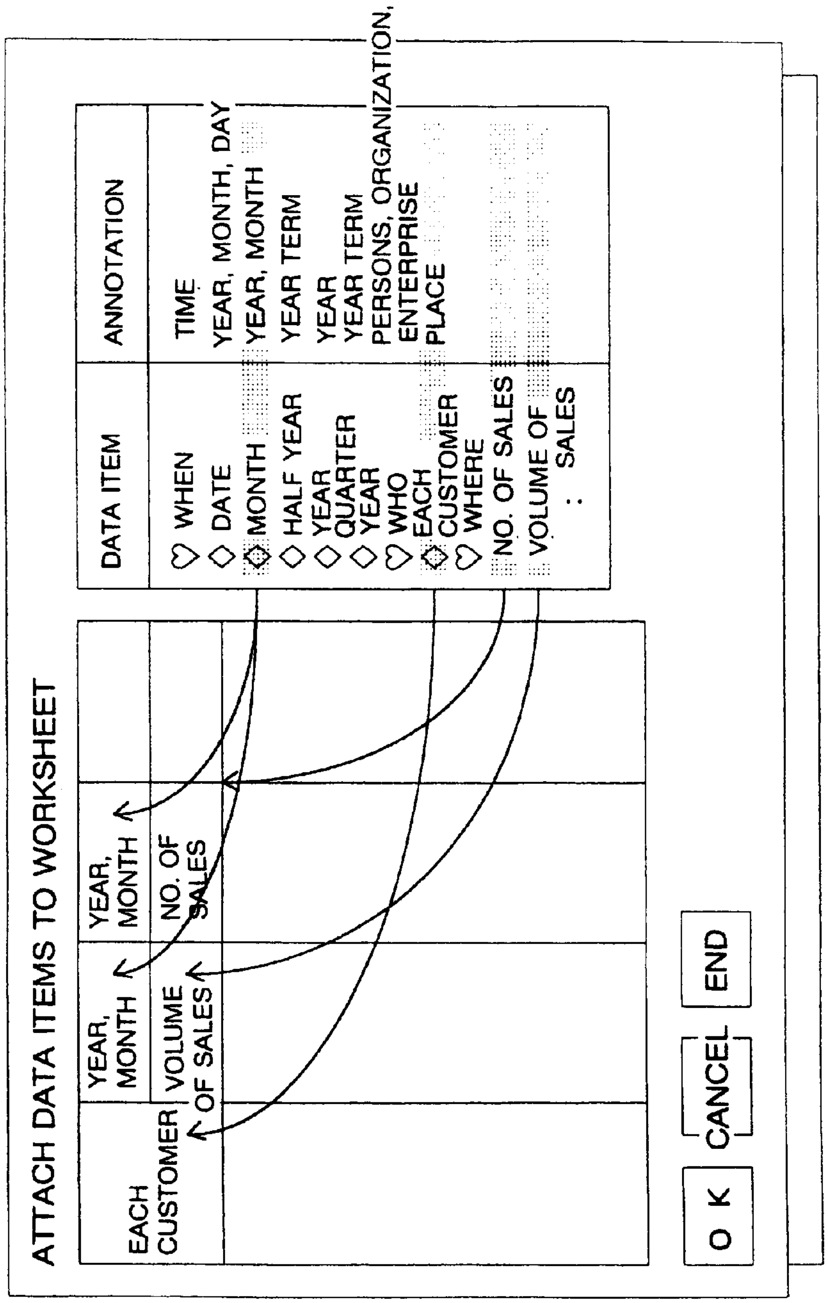

Specifically, in case the management point "WHEN" is selected as the horizontal repetitions of the table, as shown in FIG. 124, at the stage of determining the layout, the data fetch driver 35 generates a procedure instruction for vertically-horizontally transforming or inverting the data.

Figure 125:
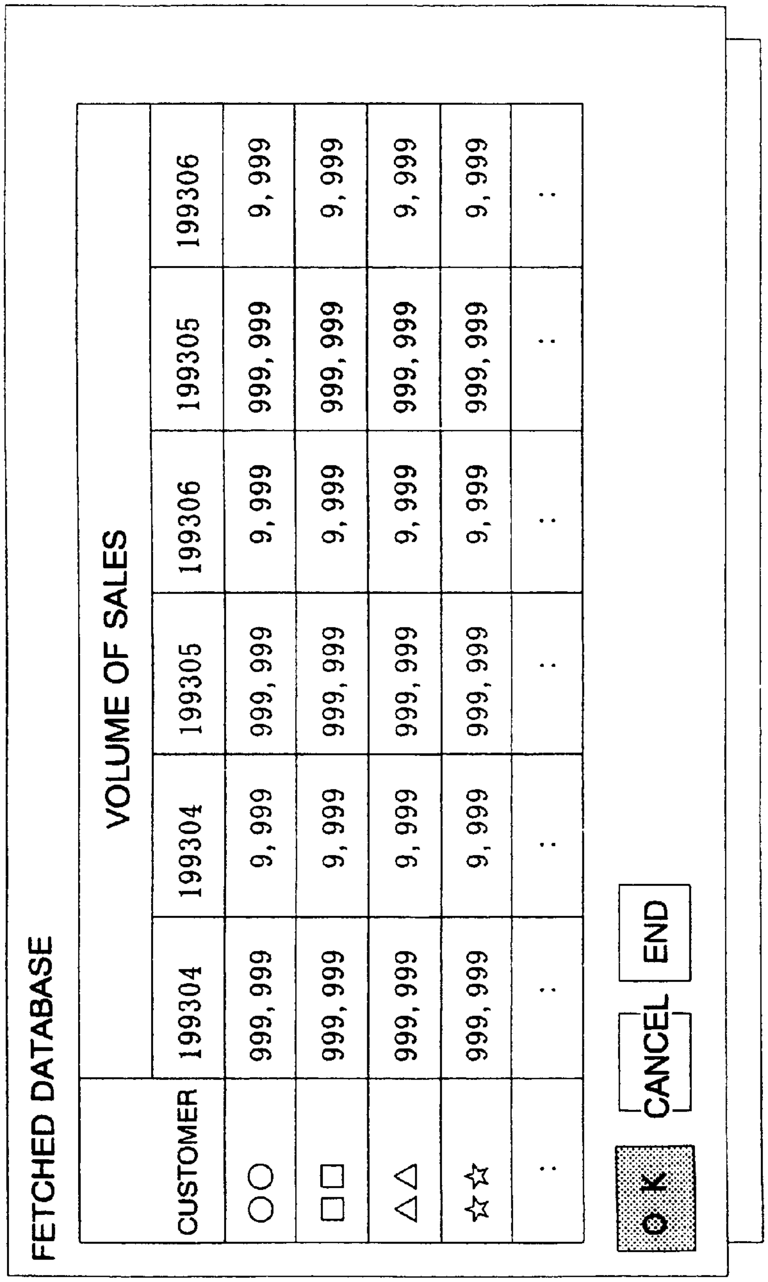

The procedure instruction for the vertical-horizontal transformations (or inversions) of data is processed by the data invertor 52. The result of these vertical-horizontal transformations is sent through the media transformer 38 and is displayed in the screen of the terminal unit by the data display linker 39. The behavior of the display screen is shown in FIG. 125.

(2-9) Detail of Attribute Data of Time Series Extracted Jobs (2-9-1) Recording/Management The attribute data, as required for extracting the time series data, are generated on the basis of the input to the worksheet, as displayed in the screen of the terminal unit, and are recorded/managed by the extension column of the extracted job data recording area of the dictionary 3, as shown in FIG. 126.

(2-9-2) Attribute Data

The detail of the attribute data is shown in FIG. 127. The annotations "*1" and "*2" in FIG. 127 have the following meanings.

*1: Some time series data are headed or not by "QUASI-" as in the quasi-date data or the date data. The former, i.e., the "QUASI-" is the mode, in which a plurality of data exist for one time period (e.g., Dec. 15, 1993), as shown in FIG. 128, and this mode is taken by most of the database data sent out from the trunk business system. The latter is the mode, in which only one data exist for one time period, as shown in FIG. 129, and this mode is taken by most time series data which are registered/managed by the public database. In case the former data are extracted by the public database, they are accumulated (or summed) while achieving the confirmation of the terminal operator at the data exploiting stage so that the function to edit one time period into single data is effected.

*2: By designating the application calendar, the starting day and month, as required as the data for editing the time series data, can be set for every data.

(2-9-3) Storage Segments

The storage segments are data for regulating the method of storing the time series data in the public database.

Figure 130:
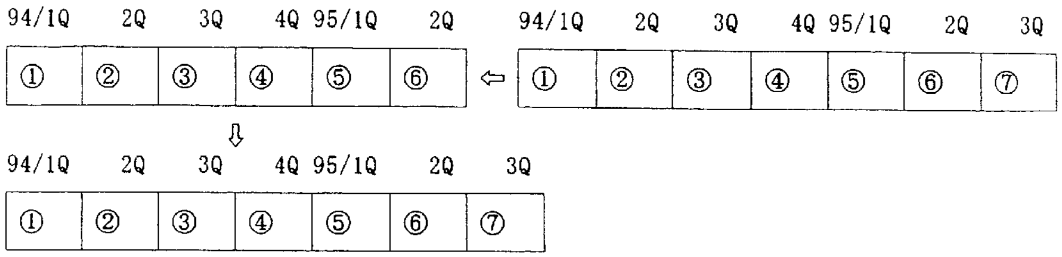

In case the storage segment is 1, as shown in FIG. 130, the new data contain the already stored past data and make the replacement with the past data.

In case the storage segment is 2, as shown in FIG. 131, new data are unconditionally added to and stored at the tail of the already stored data.

In case the storage segment is 3, the storing method is divided into the following two, depending upon whether or not the maximum register period has been reached. Let it be assumed that the maximum register period No. is 8 for the quarter year period. In case the maximum register period is not reached, as shown n FIG. 132, the new data are added to and stored at the rail of the already stored data.

In case the maximum register period is reached, as shown in FIG. 133, the data are sequentially deleted from the already stored oldest one, and the new data are added to and stored at the tail of the stored data so that the data for the maximum register period may always be held.

In the case of the storage segment of 4, the storing method is also divided into the following two in dependence upon whether or not the maximum register period has been reached. It is assumed that the maximum register period No. for the quarter year data is 8 and that the cycle period is 2.

In case the maximum register period is not reached, as shown in FIG. 134, the new data are added to and stored at the tail of the already stored data.

In case the maximum register period is reached, as shown in FIG. 135, the data of an extent, as has been caused to exceed the maximum register period by adding the new data, are deleted at the unit of cycle period from the already stored oldest data, and the new data are added to and stored at the tail of the stored data so that the data for the maximum register period may always be held at the unit of cycle period.

(2-10) Detail of Time Series Editions

The edition of the time series data is divided into the kinds, as shown in FIG. 136. This edition of the time series data is determined by the data kinds of the input table, as contained in the extension column of the extracted jobs of the extracted job data recording area recorded/managed by the dictionary 3, and the data kinds of the output table.

In case the data kinds of the input and output tables are identical, as indicated by the "Δ" in FIG. 136, the term kind edition is not performed (or unnecessary). However, this term kind edition is executed only in case the data kinds of the input and output kinds are not identical, as indicated by the "○" in FIG. 136. In the case of either the "○" or the "Δ", the accumulations are executed to decide the values of the individual terms. The accumulations are the calculations of the summation, average, minimum, maximum, term head and term end of a term, and the difference between the term head and end and are determined by the instruction of the terminal operator at the stage of selecting the data items to be extracted. The term kind edition is a transformation into the time series data of different time intervals, as effected by editing and transforming the day data into the month data, and the accumulations are carried out for this edition.

<<Embodiment 3>>

A third embodiment of the present invention relates to a function to support the data exploitations to which are applied the management points of the database system shown in FIG. 1, and is characterized in a function to assure the consistency of the database data.

Generally speaking, the data of a plurality of asynchronously made may be used in case the data of a database are referred/retrieved and are outputted to the screen or document or inputted to another table.

In case simultaneous inquiries are made from a plurality of tables even if they can be made from the individual tables, any correctly matched data may not be generated/displayed for the following reasons (a) to (d). As a result, there arises a disadvantage that the database user uses the erroneous data while being unacquainted with the error.

(a) Time Mismatch: A discrepancy in the data collecting time is between a plurality of transaction data (or tables).

(b) Version Mismatch: A discrepancy is in the version No. of the master data (or tables) to correspond to the transaction data (or tables).

(c) Mismatch of Processed Data due to Inexecution of Secondary Processed Jobs: The processed data fail to match because no secondary processed job is executed.

(d) Mismatch of Management Reference Versions: A discrepancy occurs in case the segments of the management points are changed.

In order to avoid these mismatches, there has been realized in the prior art the system for automatically executing the data update of the reference destination tables while taking an opportunity of the reference source tables. However, this system still has the following problems.

(1) Improper data may be generated in case a plurality of reference source tables are to be synchronously updated.

(2) In case the tables are to be updated by the fixed (or periodic) jobs, the consistency of the data can be maintained by setting the opportunity of execution. However, this data mismatch is not checked in case the reference source tables are used by a temporary inquiry such as SQL (i.e., Structured Query Language) or the like.

(3) Even in the case of the fixed (or periodic) jogs, the definitions of the order of executing the jobs are so complicated as to make it difficult to take a proper and reliable consistency.

The third embodiment of the present invention assures the consistency of the database in the following manner.

The restricting conditions for assuring the consistency of the database data and their setup jobs can be defined in the dictionary in relation to the database data. On the basis of the definitions of those restricting conditions, moreover, the erroneous use of the database by the user is prevented, which might otherwise be caused by the time inconsistency (or the discrepancy of the collecting time between the collected transaction data) of the public database, the edition inconsistency (or the discrepancy of the edition No. of the master data to correspond to the collected transaction data), and the inconsistency (which occurs because of failure of the execution of the setup job to be executed promptly after the exchange of the extracted transaction data) of the processed data due to failure of the execution of the secondary processed jobs.

When the operations manager of the database adds the execution date of the aforementioned setup jobs to the calendar for the operations management, the data setup jobs are automatically executed. In case, however, the restricting conditions for executing the jobs are defined in the dictionary, their satisfactions are preferred to the setup jobs. The database user is enabled to know in advance when the database data are to be updated, by referring to the operations calendar.

If the data for associating the database data at the unit of table are managed by the dictionary, the associations can be displayed in the terminal screen and visually grasped. In addition, the public range can be restricted or restored by the operations using the mouse or the like.

In case it is found out that the setup of the data of the relating table is partially delayed or that the data themselves have a problem, the misuse of the database data by the database user can be prevent ed such that the range for holding the publication is instructed by operating the mouse or the like while confirming the influence range in the terminal screen. In case the database data are restored, the publication can be achieved by releasing the held status from the terminal screen.

When the database data, as held from its publication, are to be used by the user, the system issues a message that the publication is held to permit no use, and displays the present status of the public range in the terminal screen.

The third embodiment of the present invention thus constructed is characterized in the functional constructions of the setup unit 4 and the operations support unit 5 in the basis construction of the database system shown in FIG. 1.

FIGS. 137 and 138 show the details of the respective functional constructions of the setup unit 4 and the operations support unit 5 of the database system according to the third embodiment of the present invention. What is shown in these FIGS. 137 and 138 is those portions of the setup unit 4 and the operations support unit 5 of the database system of the present invention, which are related mainly to the third embodiment, and the portions common with those of FIGS. 2 and 4 are designated at the common reference numerals.

As shown in FIG. 137, the setup unit 4 is constructed to include a data setup main controller 11, a data item definer 12, a table data definer 13, a table combination definer 15, an operated data item definer 16, a management point definer 19 and a sorting data definer 20.

As shown in FIG. 138, the operations support unit 5 is constructed to include an operations management supporting main controller 41, an extracted job definer 42, a data extractor 43, a sorting data consistency assurer 44, an edition No. checker 71 and a database monitor 72. The data extractor 43 outputs the data, as extracted from the database 1A sent out from the trunk database 1 of the trunk business system, to the public database 2.

Next, the functions and operations of the aforementioned individual portions will be described in detail in connection with the specific operations and processings.

(3-1) Generation of Jobs Fetched to Public Database of Trunk Database

The operations support unit 5 has functions to generate the extracted job (or procedure) for fetching the database data (1A), as sent out from the trunk database 1 of the trunk business system, to the public database 2, to execute the extracted job and to tune, and support the smooth operations of the database. This operations support unit 5 is controlled in its entirety by the operations management supporting main controller 41.

This operations management supporting main controller 41 displays the initial menu of the operations management for executing a predetermined processing, as shown in FIG. 5, in the screen of the terminal unit. When the terminal operator selects the menu item corresponding to the extracted job definitions, for example, from the menu of FIG. 5 by the mouse or the like, the operations management supporting main controller 41 transfers the control to the extracted job definer 42 of the trunk database data.

The system of this embodiment is given functions to regulate the execution order in relation to the extracted jobs for assuring the consistency of the database data and to define the restricting conditions for the executions.

The extracted job definer 42 of the trunk database data generates the job for fetching the database data (1A), as sent out from the trunk business system, to the public database, and changes or deletes the generated job.

The extracted job definer 42 lists up the extracted job data, which are recorded/managed in the extracted job data recording area of the dictionary 3, as shown in FIG. 139, in the screen of the terminal unit, as shown in FIG. 140.

By selecting the "ADD" button in the screen of FIG. 140 by the mouse or the like, the extracted job can be newly defined. When the "CHANGE" button is selected after the extracted job has been selected by the mouse or the like, the defined extracted job can be changed. By selecting the "DELETE" button after the extracted job, moreover, the defined extracted job can be deleted.

The definitions of the extracted jobs are based upon the fact that the data are extracted from the trunk database 1 to generate the processing procedure for registering the extracted data as the table in the public database 2, by executing from the terminal unit the selection of the tables sent out from the trunk business system, the selection of the data items or the instruction of the retrieving conditions. For these extracted jobs, the program, as described in the program language such as COBOL, can be assigned to the extracted jobs.

By selecting the "ADD" button from the screen of FIG. 140 by using the mouse or the like, as described hereinbefore, the extracted jobs can be newly defined, and the worksheet for defining the attributes of the extracted jobs is displayed in the screen of the terminal unit, as shown in FIG. 141, so that the attributes of the extracted jobs can be defined through the keyboard or the like.

When those attributes are defined in the worksheet of FIG. 141 so that the "OK" button is selected, the generation of the extracted jobs is started.

At the time of generating the extracted jobs, the extraction source table management data recording area (as shown in FIG. 165), as recorded/managed by the dictionary 3, is referred to at first, and the database data, as sent out from the trunk database 1 of the trunk business system, are listed at the unit of table in the screen of the terminal unit, as shown in FIG. 142, so that the table to be extracted can be selected by the mouse or the like.

When the table to be extracted is selected so that the "OK" button is selected, the data items composing the selected table are listed up in the screen of the terminal unit, as shown (at the righthand side) in FIG. 143, so that the data items to be extracted can be selected by using the mouse of the like.

In case a plurality of tables are selected as the tables to be selected, a list of data items composing those tables is displayed in the screen of the terminal unit so that the linking conditions between the tables can be automatically created by selecting the data items associatively.

By selecting the "OPERATION/PROCESSING" button by using the mouse or the like, moreover, the result of the operation/processing between the data items can be extracted. When the "OPERATION/PROCESSING" button is selected, the worksheet for defining the operation/processing formula is displayed in the screen of the terminal unit, so that the desired operation/processing formula can be defined by selecting the data items from their list and the operands from their list by using the mouse or the like.

When the data item to be extracted is selected so that the "OK" button is selected, the data item to be extracted is decided so that the basic extracted job is generated, as shown in FIG. 144.

When the generation of the basic procedure is completed, the list of extracting conditions, as shown in FIG. 145, for setting them is then displayed in the screen of the terminal unit. When the "ADD" button is selected by the mouse or the like, the worksheet, as shown in FIG. 146, for setting the individual extracting conditions is displayed in the screen of the terminal unit so that the definitions can be executed.

By selecting the data items for setting the conditions in the screen of FIG. 146 from the list of the data items at the lefthand side of the screen of the terminal unit, the data item names can be posted to the righthand worksheet. In case the data items are of character type, the operation parts for setting the character type conditions are displayed in the lower portion of the worksheet so that the conditional forma can be completed by selecting the operation parts by the mouse or the like.

After the data item "keyB" has been selected from the lefthand side of the screen of FIG. 146, the "keyB LIKE '3%'" is generated by inputting "3" as a reference character series and by selecting the "FRONT MATCH".

When the definitions of the conditional formula is completed so that the "OK" button is selected in the screen of FIG. 146, the screen returns to the list screen of the extraction conditional formula, in which a newly defined conditional formula is added to and displayed, as shown in FIG. 147.

If the "CHANGE" button is selected in the screen of FIG. 147 with the conditional formula being selected, the worksheet for setting the extracting conditions like before is displayed so that the conditional formula can be changed. If, on the other hand, the "DELETE" button is selected in FIG. 147 with the conditional formula being selected, the selected conditional formula can be deleted.

After the definitions of all the extracting conditions have been completed, the "OK" button is selected in the screen of FIG. 147. Then, the definitions of a series of extracting conditions are completed, and the extracted jobs of FIG. 144 are changed to those of FIG. 148 so that the extracted jobs, as generated, are written in the extracted job data recording area and the extracted job recording area of the dictionary 3, as shown in FIG. 149.

When the extracted jobs are completely written in the dictionary 3, the screen returns to the extracted job selecting screen, in which the extracted job "EXTRACT3", as added in the definitions of the series extracted jobs, is added to the list screen.

By selecting the "DEFINE JOB LINK" button in the screen of FIG. 150 by the mouse or the like, moreover, it is possible to define the order of the case in which the extracted jobs are batch-executed.

If the order for the batch execution is thus defined, it is possible to prevent in advance the erroneous use of the database data, which might otherwise be caused by a partial failure to execute the extracted jobs.

Specifically, as to the definitions of the batch execution order, the "EXTRACT0" is selected as the extracted job to be executed at first, from the list of the screen of the terminal unit, as shown in FIG. 151, so as to define the execution order of the extracted jobs, and the "OK" button is selected. By selecting the extracted job to be executed subsequent to the extracted job to be executed at first, from the list of the screen of the terminal unit, moreover, the link of the extracted job can be defined.

If, in this case, the succeeding job is selected so that the "ADD" button is selected, as shown in FIGS. 152 and 153, the subsequent job is added to the block diagram for clarifying the order of the extracted jobs shown in the lower portion of the screen of the terminal unit. As a result, the terminal operator can determine the execution order while confirming the relation of the extracted jobs in the block diagram.

In FIGS. 152 and 153, the definitions are made to execute the "EXTRACT1" subsequent to "EXTRACT0".

If the RELEASE button is selected after the block of the block diagram has been selected by the mouse or the like, the extracted job, as selected, can be released from the link. On the other hand, the succeeding job is selected, and the block just after the additional insertion of the succeeding job is selected. When this INSERTION button is selected, the extracted job can be linked to the just front of the selected block.

The status, in which the extracted jobs are linked in the order of "EXTRACT1", "EXTRACT2", "EXTRACT3" and "EXTRACT4" by the similar operations, is shown in FIG. 154. In this case, merely by instructing the execution of the job "EXTRACT0", the remaining three succeeding extracted jobs can be executed altogether. By selecting the "OK" button in the screen of FIG. 154, it is assumed that the link definitions of the extracted jobs have been completed. As a result, the preceding job column of the extracted job of the extracted job data recording area, as recorded/managed by the dictionary 3 in FIG. 155, is changed, and the extracted job selecting screen is displayed, as shown in FIG. 156.

(3-2) Fetch to Public Database of Trunk Database

The operations management supporting main controller 41 controlling the entirety of the operations support unit 5 displays the initial menu for starting a predetermined processing, as shown in FIG. 5, in the screen of the terminal unit. When the terminal operator selects the menu item corresponding to the extracted job execution by the mouse or the like, the main controller 41 transfers the control to the data extractor 43.

This data extractor 43 starts the extracted jobs, which are generated by the extracted job definer 42 of the trunk database data, and extracts the database data (1A), as sent out from the trunk business system, and feeds them to the public database 2.

At the start of the extracted jobs, the extracted job data, as recorded/managed by the dictionary 3 in the terminal screen, are listed up in FIG. 157. When the terminal operator selects a desired extracted job by the mouse or the like, the corresponding job can be started. In case an extracted job to be executed subsequent to the selected extracted job, as described above, the succeeding extracted jobs are consecutively started. If, on the other hand, the "NARROW" button is selected by the mouse or the like, the worksheet for the narrowing operation is displayed in the screen of the terminal unit so that a condition such as "JOB EXECUTION DATA ON AND AFTER ○○ DAY OF ○○ MONTH OF ○○ YEAR" can be designated for the worksheet.

In other words, an extracted job can be executed by selecting the extracted job and the "OK" button. In case a succeeding extracted job is linked to the selected extracted job, the linked job can be selected or confirmed on the screen of the terminal unit.

For example, if the "EXTRACT0" is selected in the screen of FIG. 157 and if the "OK" button is selected, there is displayed in the terminal unit the screen for selecting and confirming the execution of the succeeding extracted job, as linked to the "EXTRACT0", as shown in FIG. 158.

In case the linked jobs are batch-executed in the screen of FIG. 158, the "SELECT ALL JOBS" button is selected, and the "OK" button is then selected. In case only a specific extracted job is to be executed, the extracted job is clarified, if selected, by making its display attributes such as colors different from others, and the "OK" button is selected so that only the clarified extracted job is executed.

When the executions are normally completed, the execution procedure is displayed in the block diagram together with the sequential messages. Specifically, it is displayed in FIG. 159 that the execution of "EXTRACT0" has been completed, and the terminal operator is requested to confirm the propriety of the fetch of the basic data of the data items. The basic data have been described in detail in connection with the first embodiment.

On the other hand, the table can also be set with the using period. FIG. 160 shows the case in which the use of table "out" is expired on Sep. 10, 1993. In the exploitations of the database data, when the reference to the table occurs, the inquiry unit 6 executes whether or not the use period has been expired by checking the using period column of the table of the table management data recording area, which is recorded/managed by the dictionary 3, and the date of the day. If the using period is expired, the terminal user is required to confirm whether the execution is made while ignoring the expiration or the use is interrupted, and the subsequent processing is determined.

As a result of the execution of the extracted jobs, the table, as registered in the public database, is replaced. In the case of this updating, the control is transferred to the sorting data consistency assurer 44. It is then checked whether or not there is a contradiction between the value of the replaced table and the defined sorting definition data. By this check, there is assured the consistency of the management points accompanying the updating of the master data or the like.

In case a secondary table for improving the processing efficiency is set for the table which is replaced by executing the extracted jobs, the reproduction of the secondary table is automatically executed subsequent to the extracted jobs to assure the consistency.

As described above, subsequent to the "EXTRACT0", the "EXTRACT1", "EXTRACT2" and "EXTRACT3" are consecutively executed, and the executions of a series of processings are completed after it has been confirmed whether or not the table is set with the using period for the "EXTRACT3", as shown in FIG. 161.

The tables are extracted/registered in the public database 2, the job execution date column of the extracted job recording area of the dictionary 3 is updated with the date of the day. On the other hand, the edition No. column is updated in the form of heredity of the edition No. of the extraction source tables.

In case the table using period is set, there is updated the expiration date column of the table of the table management data recording area, as recorded/managed by the dictionary 3, as shown in FIG. 163.

In case there is the instruction of the terminal operator, or in case the items, as recorded/managed in the extracted job recording area, i.e., the item of fetching (or generating/updating the data item attribute data) of the basic data of the data items are "NOT YET", the fetch of the basic data of the data items is executed. The basic data of the data items are recorded/managed together with the table management data by the dictionary.

(3-3) Check of Consistency of Edition No. of Tables

The operations management supporting main controller 41 controlling the entirety of the operations support unit 5 displays the initial menu for selecting the processing containing the edition No. checking item in the screen of the terminal unit, as shown in FIG. 164, and the terminal operator selects the menu item corresponding to the edition No. check by the mouse or the like, to transfer the control to the edition No. checker 71.

This edition No. checker 71 checks whether or not there is an inconsistency in the edition No. between the data of the database 1A, as sent out from the trunk business system, and the data of the public database 2. If an inconsistency is found out, the extracted job for eliminating the inconsistency is started by the instruction of the terminal operator.

The processing of the edition No. checker 71 is started by listing up the data of the extraction source table, as recorded/managed by the extraction source table management data recording area (as shown in FIG. 165) of the dictionary 3, in the screen of the terminal unit, as shown in FIG. 166, and by selecting an arbitrary table by the terminal operator using the mouse or the like.

In FIG. 166, for example, the edition No. relating to the business office master is checked by selecting the "BUSINESS OFFICE MASTER" as an object to be checked and by selecting the "OK" button.

When the object of the check is thus decided, the extracted job data recording area (as shown in FIG. 167), as recorded/managed by the dictionary 3, is referred to thereby to fetch the table data, in which the extraction source column corresponds to the extracted job to be checked. On the basis of the name of the extraction source table column of the table data, as fetched, the corresponding table data are fetched from the table management data recording area (as shown in FIG. 168), as recorded/managed by the dictionary 3. These two kinds of data thus fetched are merged and listed up at the righthand side of the screen of the terminal unit. In, at this time, there is a consistency between the edition Nos. of the extraction source and destination, the data are clarified by changing the display attributes such as colors of the display column of the table, while displaying a warning message.

In FIG. 169, it is warned to the terminal operator that the table derived from the table "MASTB" of the destination source has the "CC" and that its edition No. is inconsistent.

When the terminal operator selects the "EXECUTE EXTRACTION" button by the mouse or the like to instruct the execution of the extracted job, this extracted job is executed.

This execution of the extracted job is effected after the control is transferred to the data extractor 43. In case the control is transferred from the edition No. checker 71 to the data extractor 43, the selection of the extracted job to be executed is bypassed, and the start of the extracted job is directly begun. Incidentally, the processings, as accompanying the execution, of writing the data in the dictionary 3 and assuring the various consistencies are executed as in the ordinary case of extracted job executions.

If the extracted job "EXTRACTC" is normally executed to eliminate the inconsistency in the edition No. between the extraction source and destination tables, the display is that shown in FIG. 170. In this case, the contents of the table management data recording area and the extracted job data recording area of the dictionary 3 are shown in FIGS. 171 and 172, respectively.

(3-4) Assurance of Edition Nos. between Tables

The data setup main controller 11 controlling the entirety of the setup unit 4 displays the initial menu for the setup processing to start a predetermined processing, in the screen of the terminal unit, as shown in FIG. 23. When the terminal operator selects the menu item corresponding to the definitions of the table data by the mouse or the like, the control is transferred to the table data definer 13.

This table data definer 13 displays the initial menu of the table definitions for starting a predetermined processing relating to the table definitions, in the screen of the terminal unit, as shown in FIG. 33. When the terminal operator selects the menu item corresponding to the link definitions of the table by the mouse or the like, the control is transferred to the table combination definer 15.

This table combination definer 15 defines the link of the tables, as registered/managed by the public database 2. By defining the table links, the conditions for the user to link the tables need not be inputted in each case, in which the data items over a plurality of tables are selected at the stage of exploiting the database data.

The table linking conditions are composed of the data items, in which the codes to be used for linking the tables physically are stored, and the linking methods, and are recorded/managed by the table link management data recording area of the dictionary 3, as shown in FIG. 173.

In order to facilitate the selection of tables to be linked, a list of table segments is displayed in the screen of the terminal unit, as shown in FIG. 174, so that the selection can be effected by using the mouse or the like.

If the "MASTER" and "TRANSACTION" are selected as the table segments of the tables to be linked, as shown in FIG. 174, the tables belonging to the segments of the selected table are listed at the righthand and lefthand sides of the screen of the terminal unit, as shown in FIG. 175, so that the tables to be linked can be selected by the mouse or the like.

When a table is selected, the data items composing each table are listed at the righthand and lefthand sides of the screen so that the data item for the link key can be selected by the mouse or the like. In this case, the data items are stepwise selected and display by the instruction of the terminal operator. At first, there is displayed the data item in which the segment column in the data item attribute recording area on the dictionary 3 is the link code or the code. If the link key cannot be found out, the remaining data items are displayed by selecting the "DETAIL DISPLAY" button, as correspond to the display of the detailed data items, by the mouse or the like.

Specifically, if "AA" and "out" are selected in FIG. 175, for example, the lists of data items of the table "AA" and the table "out" are displayed. The "keyC" of the table "AA" and the "keyc" of the table "out" are selected, for example, as the link keys from those data item lists.

Thus, the "OK" button is selected after the link keys have been selected by the mouse or the like, the worksheet for defining the linking method is displayed in the screen of the terminal unit, as shown in FIG. 177, so that the linking method can be defined.

There are four linking methods, as shown in FIG. 47. The linking method columns of the table combination management data recording area, as recorded/managed by the dictionary 3, are recorded with the codes corresponding to the linking methods.

As the linking method using the "keyC" of the table "AA" and the "keyc" of the table "out", as selected before, as the link keys, there is selected the "TRANSVERSE LINK OF EQUAL TABLES", followed by the selection of the "OK" button.

Next, the screen, as shown in FIG. 178, is displayed in the terminal unit, and it is defined whether or not it is executed to check the consistency of the edition No. between the tables to be linked in case a retrieval followed by the link of the tables occurs at the stage of exploiting the database data. In case the check is to be executed by selecting "YES" and the "OK" button in the screen of FIG. 178, the confirmation of the consistency is executed by the inquiry unit 6 with reference to the edition No. column of the table management data recording area, as recorded/managed by the dictionary 3, prior to the linking of the tables. Otherwise, the terminal user is inquired whether the retrieval is to be continued while ignoring the inconsistency or interrupted. The subsequent processing is determined in accordance with the input of the operation by the terminal operator.

When the "OK" button is selected in the screen of FIG. 178, the link definitions of one set of tables is completed to update the corresponding columns of the table combination management data recording area (as shown in FIG. 179), the table management data recording area (as shown in FIG. 180) and the data item attribute date recording area (as shown in FIG. 181), as recorded/managed by the dictionary 3.

Incidentally, the edition No. is checked at the table linking time, in case the "EDITION NO. CHECK" column is "1" in the table combination management data recording area of FIG. 179, but not at the table linking time in case the "EDITION NO. CHECK" column is "0".

(3-5) Definitions of Scalar Data Items

The occurrence of the different evaluations of the database data is suppressed by managing the fluctuating common data such as the exchange rate or the quality reference while containing the values to be applied at that time, by the dictionary 3 and by referring the managed data uniformly at the stages of setting up and exploiting the database. The common data such as the exchange rate or the quality reference are called the scalar data items and can be quoted into the operation/processing formula or the like merely by selecting their names like the general data items of the database without any special consciousness.

The data setup main controller 11 controlling the entirety of the setup unit 4 displays the initial menu of the setup processing for starting a predetermined processing for the setup, as shown in FIG. 23, in the screen of the terminal unit. When the terminal operator selects the menu item corresponding to the definitions of the operated data items by the mouse or the like, the control is transferred to the operated data item definer 16.

This operated data item definer 16 defines a method for generating the data item, which are not present in the public database 2, by operating/processing the existing data items. The data items thus defined by the operated data item definer 16 are recorded/managed like the existing data items by the data item recording area and the data item attribute recording area of the dictionary 3.

This system can be given a function to execute the operation/processing by applying calendars of different objects/businesses.

In order to facilitate the selection of the data items for defining the operations/processings, the operated data item definer 16 displays a list of table segments in the screen of the terminal unit, as shown in FIG. 182, so that the table segments can be selected by using the mouse or the like. If the "SCALAR" table segment is selected in FIG. 182, the scalar data item can be defined.

If the "SCALAR" table segment and the "OK" button are selected in FIG. 182, the operated data item definer 16 decides that the new definitions of the scalar data items are demanded. With reference to the data of the data item recording area (as shown in FIG. 183) of the dictionary 3 recording/managing the scalar data items, the operated data item definer 16 displays the list of scalar data items in the screen of the terminal unit, as shown in FIG. 184, and the worksheet for defining the operations/processings at the righthand side of the screen.

In this case, in the data item recording area of FIG. 183: the ordinary data items (as existing in the public database) are meant in case the "DATA CLASS" is "1"; the data items (not existing in the public database), as defined by the operations/processings, are meant in case the "DATA CLASS" is "2"; and the scalar data items are meant in case the "DATA CLASS" is "3".

In the worksheet for defining the operations/processings, the operation/processing formula can be created not only by designating constants directly but also by selecting the scalar data items from the list by repeating the selections of the operands (+, −, ×, ÷) and the functions. In this case, it is also possible to generate the operation/processing formula quoting the functions.

FIG. 184 shows the case in which the Yen rate (64.46 Yens for 1 Mark) of Deutschemark is to be defined as the scalar data item.

The scalar data items, as defined herein, are listed while containing the data items, which exist at the stage of exploiting the database data, so that the arithmetic operations can be automatically scheduled to fetch the data values merely by selecting them.

By selecting the "OK" button in FIG. 184, the worksheet for defining the attribute data of the defined scalar data items is displayed, as shown in FIG. 185, so that the attribute data can be defined through the keyboard or the like.

By selecting the "OK" button in the screen of FIG. 185 by the mouse or the like, the definitions of the scalar data items are completed. The scalar data items thus defined are added to and display in the list of the data items in FIG. 186 and are added like the existing data items to the data item recording area and the data item attribute recording area of the dictionary 3 (as shown in FIG. 187).

(3-6) Change of Scalar Data Items

As described above, the occurrence of the different evaluations of the database data is suppressed by managing the fluctuating common data such as the exchange rate or the quality reference while containing the values to be applied at that time, by the dictionary 3 and by referring the managed data uniformly at the stages of setting up and exploiting the database. The common data or the scalar data items such as the exchange rate or the quality reference are called the scalar data items and can be quoted into the operation/processing formula or the like merely by selecting their names like the general data items of the database without any special consciousness. This change of the scalar data items is effected by changing the operation/processing formula, as regulating the scalar value data managed by the dictionary 3, to reflect the change upon the dictionary 3.

Specifically, the data setup main controller 11 controlling the entirety of the setup unit 4 displays he initial menu of the setup processing for starting a redetermined processing for the setup, as shown in FIG. 23, in the screen of the terminal unit. When the terminal operator selects the menu item corresponding to the definitions of the operated data items, the control is transferred to the operated data item definer 16.

This operated data item definer 16 defines a method for generating the data item, which are not present in the public database 2, by operating/processing the existing data items. The data items defined here are recorded/managed like the existing data items by the data item recording area and the data item attribute recording area of the dictionary 3.

Incidentally, the operation/processing can also be executed by applying calendars of different objects/businesses.

In order to facilitate the selection of the data items for defining the operations/processings, the operated data item definer 16 displays a list of table segments in the screen of the terminal unit, as shown in FIG. 188, so that the table segments can be selected by using the mouse or the like. In order to change the values of the scalar data items, the "SCALAR" is selected, and the "CHANGE OPERATION/PROCESSING FORMULA" button is selected in FIG. 188.

If the "CHANGE OPERATION/PROCESSING FORMULA" button is selected in FIG. 188, the operated data item definer 16 decides that the definition change of the scalar data items is demanded, and displays the list of the scalar data items in the screen of the terminal unit, as shown in FIG. 190, with reference to the data of the data item recording area (as shown in FIG. 189) of the dictionary 3 recording/managing the scalar data items, so that the scalar data items to be changed can be selected. This operated data item definer 16 further displays the worksheet for changing the operations/processings at the righthand side of the screen of FIG. 190 which displays the list of the scalar data items. This worksheet displays the definition data, which are managed at this time by the dictionary 3, as the initial values.

In this case, like the new definitions, the operation/processing formula can be created not only by designating constants directly but also by selecting the scalar data items from the list by repeating the selections of the operands (+, −, ×, ÷) and the functions. In this case, it is also possible to generate the operation/processing formula quoting the functions.

In FIG. 191, the Yen rate of U.S. dollar is changed from (100.05 Yens for 1.00 Dollar) to (99.09 Yens for 1.00 Dollar).

By selecting the "OK" button in FIG. 191, the worksheet for defining the attribute data of the defined/changed scalar data items is displayed, as shown in FIG. 192, so that the attribute data can be defined through the keyboard or the like. At this time, the worksheet displays in advance the attribute data, as managed by the dictionary, as the initial values, and the "OK" button may be simply selected if no special change is required.

By selecting the "OK" button in the screen of FIG. 192 by the mouse or the like, the definition changes of the scalar data items are completed, and the corresponding columns of the data item recording area and the data item attribute recording area of the dictionary 3 are rewritten to those, as shown in FIG. 193.

(3-7) Management of Using Period of Management Points

The data setup main controller 11 controlling the entirety of the setup unit 4 displays the initial menu of the setup processing for starting a predetermined processing for the setup, as shown in FIG. 23, in the screen of the terminal unit. When the terminal operator selects the menu item corresponding to the definitions of the management points, the control is transferred to the management point definer 19.

This management point definer 19 defines the management points. The management point definer 19 can also add a management point, change the defined management point and delete the defined management point.

The management points are recorded/managed by the management point recording area (as shown in FIG. 194) of the dictionary 3. The common management points are recorded/managed by the common dictionaries, and the management points for different persons and objects are recorded/managed by personal dictionaries.

The management point definer 19 fetches the management points, as recorded/managed by the dictionary 3, from the dictionary 3 and the management points in a list, as shown in FIG. 195, in accordance with a predetermined display order in the screen of the terminal unit.

The management point "WHEN (TIME)" is one to be automatically set by the system. The detail of these management points has been described in the second embodiment of the present invention in connection with the storage/management of the time series data.

If the "ADD" button is selected in the screen of FIG. 195, the worksheet for defining the management points is displayed, as shown in FIG. 196, in the screen of the terminal unit so that the management points can be defined through the keyboard or the like.

At this time, the expiration date can be set for a management point. In FIG. 196, the expiration date for the point "WHERE (PLACE)" is set at Mar. 20, 1995. At the stage of exploiting the database data, when the reference to the sorting definitions belonging to the management points occurs, the inquiry unit 6 checks whether or not the use period has been expired by comparing the using period column of the table of the management point recording area, which is recorded/managed by the dictionary 3, and the date of the day. If the using period is expired, the terminal user is required to confirm whether the execution is made while ignoring the expiration or the use is interrupted, and the subsequent processing is determined.

After the data necessary for the worksheet have been inputted in the screen of FIG. 196, the "OK" button is selected by using the mouse or the like, and it is examined whether or not the definitions are proper. If this answer is YES, the data of the newly defined management point is additionally written, as shown in FIG. 197, in the management point recording area of the dictionary 3, and the newly defined management point is additionally displayed in the list screen, as shown in FIG. 198.

After a management point has been selected in the screen of FIG. 195, FIG. 198 or the like, the "CHANGE" button is selected. Then, the worksheet is displayed in the screen of the terminal unit as in the "ADD" case, so that the attribute data can be changed. If the "DELETE" button is selected, on the other hand, the corresponding management point can be deleted. If the "CHANGE DISPLAY ORDER" button is selected, the display order of the list can be changed. If, moreover, the "SUPPRESS PUBLICATION" or "OPEN" button is selected, the use at the database data exploiting stage can be temporarily suppressed, or this suppression can be released.

(3-8) Definitions of Sorting Data

The management point definer 19 fetches the management points, as recorded/managed by the dictionary 3, from the dictionary 3 and lists up the fetched management points in a predetermined order in the screen of the terminal unit.

If a management point for adding the sorting data is selected in the screen of FIG. 198 by the mouse or the like, the management point definer 19 fetches the sorting data, which are recorded/managed in the dictionary 3 in a hierarchized and related manner in FIG. 199, and displays the fetched data in a list, as shown in FIG. 77, in accordance with a predetermined order.

If the "ADD", "CHANGE", "DELETE" and "CHANGE ORDER" button is selected in FIG. 77 by the mouse, the management point definer 19 transfers the control to the sorting data definer 20.

The sorting data definer 20 controls the operations of adding, changing or deleting the sorting definition data as a whole. The management point "WHO (PERSON, ORGANIZATION, ENTERPRISE) is selected in the screen of FIG. 77 to display a list of segment definition data. If the "ADD" button is then selected, the selection of the data items (segment key items) for setting the segment definitions is started. In order to facilitate the selection of the segment key items, first of all, the list of table segments for narrowing the tables containing the segment key items is displayed, as shown in FIG. 78, to select the table segments.

When the "MASTER" is selected as the table segment in the screen of FIG. 78 and if the "OK" button is selected, the table belonging to the selected segment is listed in the screen of the terminal unit, as shown in FIG. 79, so that the table having the segment key items can be selected. If the "BUSINESS OFFICE MASTER" is selected, as shown in FIG. 79, and if the "OK" button is selected, the list of the data items composing the corresponding table is displayed in the screen of the terminal unit so that the segment key items can be selected.

The data items to be displayed are those having the data or codes as their data segments. By selecting the "DISPLAY DETAIL" and "SUPPRESS DETAIL DISPLAY" buttons, it is possible to switch whether or not the data items are to be displayed within a restricted range. By selecting the "NARROW" button, moreover, the data items to be displayed can be narrowed according to the conditions. In case the narrowing operation is to be released, the "RELEASE NARROW" button may be selected.

If the segment key item such as the "VOLUME OF TRANSACTIONS OF 1993" is selected in FIG. 80, the worksheet for selecting the segment definition method is displayed in the screen of the terminal unit, as shown in FIG. 81, so that the segment definition method can be selected by the mouse or the like.

If the "OK" button is selected after the segment definition method has been selected by using the mouse or the like, the control is transferred in accordance with the selected definition method to a direct exploitation definer (81) for exploiting the data values directly, a character data signifier (84) for signifying the character data or a numerical data signifier (85) for signifying the numerical data. Incidentally, in case the "ADD MEANING TO DATA VALUE" is selected as the definition method, it is determined according to the type of the data of the segment key items which of the character data signifier or the numerical data signifier the control is to be transferred.

The numerical data signifier displays the worksheet for defining the attributes of the segment definitions, in the screen of the terminal unit, as shown in FIG. 82, to enable the terminal operator to define through the keyboard or the like. In the worksheet, the statistical values such as the maximum, minimum, average or most frequent value are calculated and displayed by referring the data values of the segment key items from the database.

When the segment method is selected, the worksheet for defining the specific segments is displayed at the righthand side of the screen of the terminal unit so that the segment specifications can be defined.

When the definitions in the screen of FIG. 83 are completed so that the "OK" button is selected by the mouse or the like, a screen for confirming the segment definitions is displayed in FIG. 200. The expiration date can be set in this screen. In FIG. 200, the expiration data of "MAR. 20, 1994" is set for the segment definitions of the "EACH VOLUME OF TRANSACTIONS". At the stage of exploiting the database data, when the reference to the sorting definitions occurs, the inquiry unit 6 checks whether or not the use period has been expired by comparing the using period column of the table of the segment data recording area, which is recorded/managed by the dictionary 3, and the date of the day. If the using period is expired, the terminal user is required to confirm whether the execution is made while ignoring the expiration or the use is interrupted, and the subsequent processing is determined. Incidentally, in case the expiration date is set in the management point to which the segment definition belongs, it is applied without setting it for each segment definition.

By selecting the "OK" button in the screen of FIG. 200, the additions of the series segment definitions are completed to execute the change in the segment No. columns of the management point recording area of the dictionary 3, the additions of the data to the segment data recording area, and the additions (as shown in FIG. 201) of the data to the segment specification recording area.

When the write of the dictionary 3 is completed, the segment definition listing screen is restored, as shown in FIG. 86. It can be confirmed from this screen that the newly defined segment definition is added as the fourth segment of the "WHO (PERSON, ORGANIZATION, ENTERPRISE)". Moreover, the display order of the segment definition data can be changed by selecting the "CHANGE ORDER" button, and the publication level can be changed by the "OPEN" and "SUPPRESS PUBLICATION" button.

<<Embodiment 4>>

The fourth embodiment of the present invention relates to a data exploitation supporting function, to which are applied the management points of the database system shown in FIG. 1, and is characterized in the function to visualize the database data by making use of the management points.

The method for designing the public database on the basis of the data sent out from the trunk business system has not been established in the prior art so that an efficient public database cannot be designed. Specifically, in order to design the efficient public database on the basis of the data sent out from the trunk business system, the only method existing per se is to make the public database efficient by restricting the database using range in advance or to reflect the exploitation patterns of the database, which have been collected as much as possible from the user, upon the design of each database. Moreover, it has also been difficult to re-design the database capable of satisfying the demands which have been called at the data exploitations.

Therefore, the database user can fetch the target data by repeating in a trial-and-error manner the setting of retrieving conditions for fetching the database data and the confirmation of the hit No. by the retrievals. In case, however, the empirical knowledge for defining the conditions efficiently is poor, a long period is required at the trial-and-error stage to increase the processing load upon the computer.

In the accumulation case of accumulating the volume of sales for each commodity group separately, too, the trial-and-error are repeated if the empirical knowledge for setting the segmenting references. These segment accumulations are frequently directed to all the record cases to seriously increase the loads upon the computer.

Another method is to prepare a manual for setting the retrieving conditions and the segmenting conditions. This is troubled not only by the maintenance, which is required by the revision of the database data, but also by the difficulty to cover the using methods for different applications in combination of manuals.

According to the fourth embodiment of the present invention, therefore, a flexible and efficient public database can be provided by defining the management points in the public database.

Specifically, since the using pattern of the database can be imagined in advance at the database designing stage by defining the management points, the design can be not only facilitated but also enabled to softly cope with the demand at the time of exploiting the public database by extending the management points to be added to the database data.

The database data can be visually grasped by graphing them into multidimensional graphs on the axes of management points and by visualizing the characteristics such as scales or distributions of the database data at the time of designing the database and exploiting the data. Incidentally, the multidimensional graphs on the axes of the management points of the database data are exemplified by those which can rank the districts for a first axis of the management point corresponding to the shop and for a second axis of the management point corresponding to the volume of sales and which can express the number of shops corresponding to the intersections of axes in terms of the heights of rods.

Moreover, the database designer can provide references for the arrangement and design of the effective database and can help the evaluations of management points by graphing the database data being set up. For the arrangement and design of the effective database, the space efficiency of the database can be improved by visually evaluating the distribution of the data to be opened thereby to divide the data for different items so as to improve the operability and retrieval efficiency and by grouping the massive data, which are outside of the individual analysis, into another group. For evaluating the management points, moreover, it is possible to visually evaluate the combination of management points as to whether the set grouping unit is coarser or finer.

Moreover, the database user can fetch the graphed database data from the dictionary by selecting an arbitrary management point to display it in a terminal screen so that he can grasp the data characteristics in advance. In other words, the user can be acquainted with how the retrieval conditions and the segmenting conditions for the accumulations should be set for fetching the target data. Thus, the time period for the trial-and-error method to fetch the data can be drastically shortened.

Moreover, the database data having restricted ranges can be fetched by indicating the graph, as displayed in the terminal screen, by means of the mouse or the like. In case the graph corresponding to the selected management point is not registered in the dictionary, the graphing mechanism is automatically scheduled to display the graph in the terminal screen and to register it in the dictionary.

This fourth embodiment of the present invention is characterized in the functional constructions of the setup unit 4, the inquiry unit 6 and the operations support unit 5 in the basic construction of the database system, as shown in FIG. 1.

FIGS. 202, 203 and 204 show the respective details of the setup unit 4, the inquiry unit 6 and the operations support unit 5 of the database system according to the fourth embodiment of the present invention. These FIGS. 202, 203 and 204 show only those portions of the setup unit 4, the inquiry unit 6 and the operations support unit 5 of the database system of the present invention, which are related mainly to this fourth embodiment, and the portions common to those of FIGS. 2, 3 and 4 are individually designated at the identical reference numerals.

As shown in FIG. 202, the setup unit 4 is constructed to include a data setup main controller 11, a management point definer 19, a sorting data definer 20, a point management support 23, a direction exploitation definer 81, a management point visualizer 82, a signification definer 83, a character data signifier 84, a numerical data signifier 85 and a segment definition data delete unit 86.

As shown in FIG. 203, the inquiry unit 6 is constructed to include a data exploitation main controller 31, a layout determinator 32, a sorting data selection optimizer 33, a grouping data item selector 34, a data fetch driver 35, a retriever 36, a media transformer 38, a data display linker 39, a operation processing generator 87 and a management point visualizer 88.

As shown in FIG. 204, the operations support unit 5 is constructed to include an operations management supporting main controller 41, a data extractor 43, a sorting data consistency assurer 44 and a sorting data definer 89.

Next, the functions and operations of the individual portions described above will be described in more detail in connection with the specific operations and processings.

(4-1) Graphing of Management Points

The setup unit 4 has functions to define the various attributes of the tables existing in the database and the data items composing each table and to define the management points. In other words, the setup unit 4 sets up the various data to be recorded/managed by the dictionary 3, so as to facilitate the exploitation and enhance the reliability of the database data. This setup device 4 is controlled in its entirety by the data setup main controller 11.

This data setup main controller 11 controlling the entirety of the setup unit 4 displays the initial menu of the setup processing for starting a predetermined processing of the setup, in the screen of the terminal unit, as shown in FIG. 23. When the terminal operator selects the menu item corresponding to the definition of the management point by the mouse or the like, the data setup main controller 11 transfers the control to the management point definer 19.

This management point definer 19 fetches the management point data, as recorded/managed by the management point recording area of the dictionary 3, as shown in FIG. 205, from the dictionary 3 and lists up the fetched data in the screen of the terminal unit, as shown in FIG. 206, in accordance with a predetermined display order.

When a management point is selected by the mouse or the like in the screen of FIG. 206, the definer 19 fetches the sorting definition data (as shown in FIG. 207), as hierarchized in the selected management point and recorded/managed in relation in the dictionary 3, and lists the fetched sorting definition data at the righthand side of the screen of the terminal unit in accordance with the predetermined display order.

Moreover, when the "ADD" button is selected in the screen of FIG. 208, the management point definer 19 transfers the control to the sorting data definer 20.

This sorting data definer 20 displays a list of table segments at the righthand side of the screen of the terminal unit, as shown in FIG. 209, so as to facilitate the selection of the data items for adding the segment definitions.

When the table segment such as "MASTER" and then the "OK" button are selected are selected in the screen of FIG. 209, the sorting data definer 20 displays a list of the tables belonging to the table segment, as shown in FIG. 210, so that the table having the segment key items can be selected.

If the table having the segment key item such as the "CUSTOMER MASTER" and then the "OK" button are selected in the screen of FIG. 210, the sorting data definer 20 lists up the data items composing the table, as shown in FIG. 211, so that the segment key items can be selected. In the screen of FIG. 211, moreover, a desired segment key item such as "VOLUME OF TRANSACTIONS OF 1993" is selected.

If the terminal operator selects the "NARROW" button in the screen of FIG. 211, he can narrow the listed data items according to the conditions. If the "DETAIL DISPLAY" button is selected, on the other hand, the data items, in which the data segments are restricted to the "data" or "code", can be displayed in place of all data items.

If a segment key item is selected in the screen of FIG. 211, the sorting data definer 20 displays the worksheet for selecting the segment defining method, in the screen of the terminal unit, as shown in FIG. 212. If the defining method is selected in the screen of FIG. 212 by using the mouse or the like, the sorting data definer 20 transfers the control, in accordance with the selected defining method, to the direct exploitation definer 81 for exploiting the data value directly, or through the signification definer 83 for signifying the data value to the character data signifier 84 for signifying the character type data value or the numerical data signifier 85 for signifying the numerical type data value.

The numerical data signifier 85 for signifying the numeral data adds the meaning data for segmenting the values of the data items on the database. This numerical data signifier 85 displays the worksheet for defining/changing the attribute data, in the screen of the terminal unit, as shown in FIG. 213, so that the attribute data can be defined/changed by the terminal operator. At this time, by referring to the values of the data items, to which the segment definitions are to be added, from the database, the statistical values such as the maximum, minimum, average or most frequent values are calculated and displayed in the worksheet.

On the other hand, the numerical data signifier 85 for signifying the numerical data displays the worksheet for defining the attributes of the segment definitions, as shown in FIG. 213, in the screen of the terminal unit so that the segment definition attributes can be defined through the keyboard or the like. The worksheet displays the statistical values such as the maximum, minimum and averages which are calculated by fetching the data values of the segment key items from the database.

If the "GRAPH" button is selected in the display screen of the segment attribute defining worksheet, as shown in FIG. 213, the control is transferred to the management point visualizer 82 so that the histogram is made in the screen of the terminal unit, as shown in FIG. 214.

The management point visualizer 82 display the distribution of the data values in the histogram by referring the values of the data items for adding the segment definitions from the database. By this histogram, the terminal operator is enabled to grasp the distribution of the data before the segment definitions are added.

Incidentally, since the segment specifications are not decided at this stage, the segmenting classes are tentatively determined to calculate the frequencies. If the "OK" button is selected in the screen of FIG. 214 by using the mouse or the like, the graph is made to disappear thereby to restore the state in which the graph is not displayed.

If the segmenting method is selected in the screen of FIG. 213 by the mouse or the like, the worksheet for defining the segment specifications is displayed at the righthand side of the screen of the terminal unit, as shown in FIG. 215, so that the specifications can be defined.

If the "OK" button is selected after the completion of the definitions of the segment specifications, the screen for confirming the segment definitions is displayed, as shown in FIG. 216.

If the "GRAPH" button is selected in the screen of FIG. 216 by the mouse or the like, the control is transferred to the management point visualizer 82 so that the histogram according to the defined segment specifications (or classes) is displayed in the screen of the terminal unit, as shown in FIG. 217. In other words, the management point visualizer 82 displays the distribution of the data values, to which the defined segment specifications (or classes) are applied, in the form of the histogram by referring the values of the data items, to which the segment definitions are added, from the database.

The terminal operator can observe the distribution graph, in which the segment definitions, as made, are applied to the actual data, so that he can instantly judge whether or not the definitions of the management point are proper. If the terminal operator is dissatisfied by the set segment definitions at a glance of the distribution graph, he can change the worksheet which is displayed at the lefthand side of the screen of the terminal unit. When this change is made, the righthand graph is replaced by the segment definitions after changed, so that the definitions/changes can be effected in the trial-and-error manner.

By selecting the "OK" button by the mouse or the like, the graph can be made to disappear thereby to restore the status (as shown in FIG. 216) before the graph is displayed.

Even if the "3D GRAPH" button is selected in the screen of FIG. 216 by the mouse or the like, the control is also transferred to the management point visualizer 82. This management point visualizer 82 lists up the management points, as shown in FIG. 218, to allow another graph axis to be selected. In short, two graph axes are selected in the case of the 3D graph.

When the management point for another graph axis is thus selected, the management point visualizer 82 fetches and displays the segment definition data, which are hierarchized for the management point and recorded/managed by the dictionary 3, at the righthand side of the screen of the terminal unit, as shown in FIG. 219, so that another segment definition can be selected.

When the segment definition and then the "OK" button are selected, another graph axis is determined so that the graph having two axes, i.e., the 3D graph is displayed, as shown in FIG. 220.

In view of this 3D graph, the relation between the two management points can be visually observed. In FIG. 220, there is displayed the graph which has the axes of the "FOR EACH DEALER" of WHO (PERSON, ORGANIZATION, ENTERPRISE), as defined as the management point, and the "EACH VOLUME OF TRANSACTIONS" of WHO (PERSON, ORGANIZATION, ENTERPRISE) as the management point. Incidentally, the heights of the rods indicate the numbers. If the "OK" button is selected in the screen of FIG. 220, the graph can disappear to restore the status (as shown in FIG. 216) before the graph is displayed.

By selecting "OK" button in the screen of FIG. 216 by the mouse or the like, a series of segment definition adding operations are completed so that the defined data are written in the dictionary 3. In case, at the writing time, the graph (excepting the tentative graph shown in FIG. 214) is prepared in the course of the segment definitions, the screen of the terminal unit displays (in FIG. 221) the confirmation screen for confirming whether or not the already made graph is to be recorded/managed in the dictionary 3 in relation to the segment definition data.

The segment definitions, as newly made, i.e., the segment definitions, as added as the fourth segment of the WHO (PERSON, ORGANIZATION, ENTERPRISE) are written in the management point recording area, the sorting data recording area, the segment specification recording area and the management point graph data recording area (as shown in FIG. 222) of the dictionary 3.

The graph data of the management points are recorded/managed in the management point graph data recording area of the dictionary 3 in relation to the segment data which are recorded/managed in the sorting data recording area. The data for one graph are composed of the attribute data and the graphic data for displaying the graph quickly in the screen of the terminal unit. In case a plurality of graphs are associated with each other, two data are repeated in pair so that they are recorded/managed in the number of the columns of the graph No. in the sorting data recording area.

The graph attribute data are composed of the data of FIG. 223 and act as the basic data for exploiting the graph.

The "TYPE" item of FIG. 223 is a single histogram for "1". For the "TYPE" of "2", the graph has two axes, the second one of which is recorded at its name of management point with the segment name.

When the write of the dictionary is completed, the screen of the list of the segment definitions is restored, as shown in FIG. 224.

It can be confirmed from the screen of FIG. 224 that the newly defined segment definition is added as the fourth segment of the WHO (PERSON, ORGANIZATION, ENTERPRISE). At this time, by selecting the "CHANGE ORDER" button for the segment definitions, the display order of the segment definitions can be changed.

(4-2) Managements of Management Points

The data setup main controller 11 displays the initial menu for the setup operation, as shown in FIG. 23, for staring a predetermined processing for the setup, in the screen of the terminal unit. When the terminal operator selects the menu item corresponding to the management processing of the management points by the mouse or the like, he transfers the control to the point management support 23.

This point management support 23 displays the management point, as recorded/managed by the dictionary 3, in the screen of the terminal unit, and prepares them into the document format to be managed, and prints them by the printer unit. The management points, as recorded/managed by the management point recording area (as shown in FIG. 226) of the dictionary 3, are fetched and listed up in the screen of the terminal unit in accordance with a predetermined display order, as shown in FIG. 225.

If the "DOCUMENT" button is selected in the screen of FIG. 225 by the mouse or the like, the list of management points is printed by the printer unit.

By selecting a specific management point in the screen of FIG. 225 by the mouse or the like, the point management support 23 fetches the sorting data, as hierarchized in relation in the selected management point and recorded/managed by the dictionary 3, and display them in a list, as shown in FIG. 227, in accordance with the predetermined display order.

If the segment definitions are selected in the screen of FIG. 227 by the mouse or the like, their detail can be displayed in the terminal unit.

In the screen of FIG. 227, on the other hand, a specific segment definition is selected, and the "DOCUMENT" button is then selected. The list of the sorting definition data is printed by the printer unit. If the "GRAPH" button is selected in the screen of FIG. 227, the graph expressing the characteristics of the management points and the relations between the management points is displayed in the terminal screen, as shown in FIG. 228.

(4-3) Exploitations of Database Data

The inquiry unit 6 processes the database data into the format, which is demanded by the exploiter of the database data, on the basis of the data recorded/managed by the dictionary 3. This inquiry unit 6 is controlled in its entirety by the data exploitation main controller 31.

Figure 89:
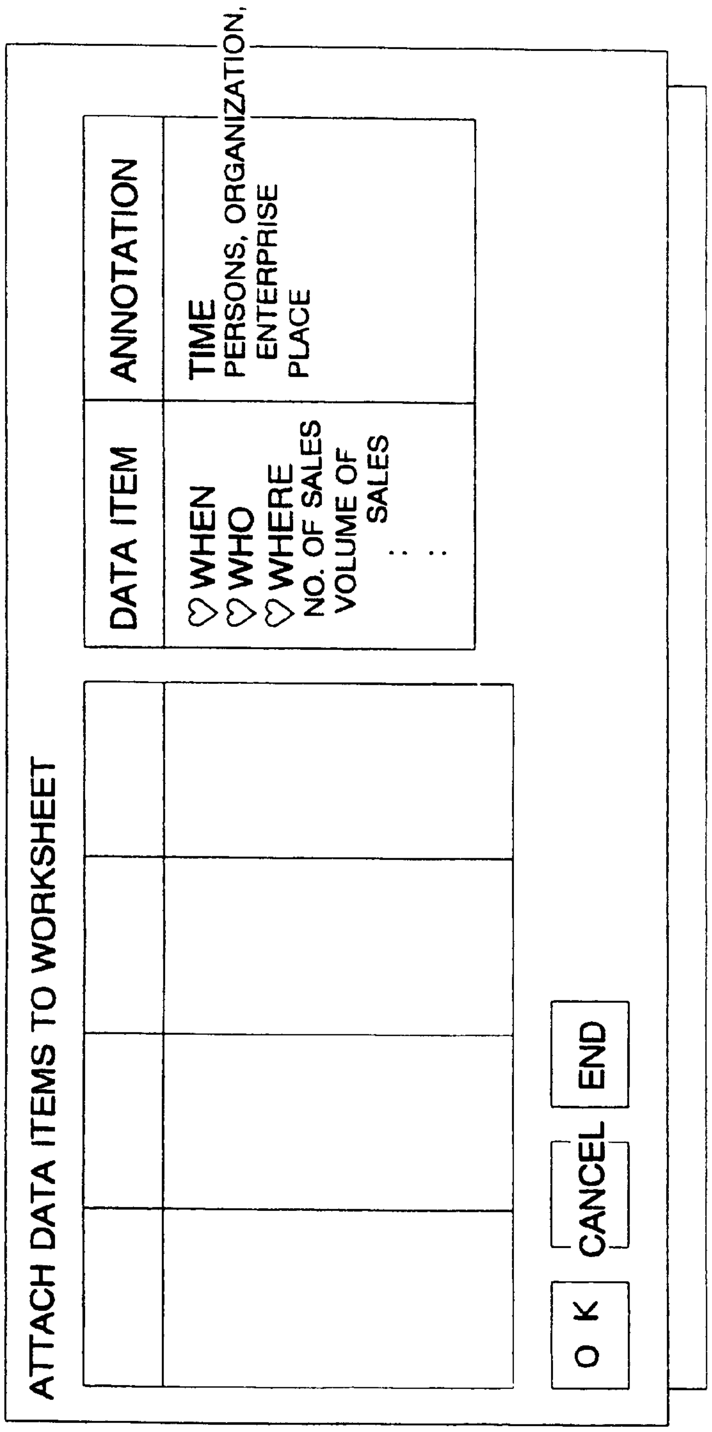
FIG. 89 is a diagram showing the display screen of a layout determination worksheet for explaining the database system of FIGS. 2 to 4.

The layout determinator 32, as has received the transfer from the data exploitation main controller 31, displays both the worksheet for determining the final layout of the database data and the list of the data items, which are formed by referring the data on the management points and the data items recorded/managed by the dictionary 3, in the terminal screen, as shown in FIG. 89.

By double-clicking the management point (as discriminated by attaching "heart mark" in FIG. 89) by the mouse, the control is transferred to the sorting data selection optimizer 33 so that the hierarchized sorting data, as added to the management point, are additionally displayed. By double-clicking the management point "WHO" (in the status of FIG. 89), the segment definition (as discriminated by attaching "diamond mark" in FIG. 229) is inserted and displayed below the "WHO" in FIG. 229. In case the "spade mark" is displayed at the tail of the name of the segment definition, it is indicated that the graph of the management points is recorded/managed by the dictionary 3. In case the "diamond mark" is displayed at the tail of the name of the segment definition, it is indicated that the graph is not recorded/managed by the dictionary 3.

By selecting the specific segment definition "spade mark" or "diamond mark" (e.g., the "spade mark" for "EACH VOLUME OF TRANSACTIONS") by the mouse or the like, the corresponding graph can be displayed in the screen of the terminal unit, as shown in FIG. 230. If, in this case, the "spade mark" is selected, the corresponding graph data are read from the dictionary 3 to display the graph quickly. In case a plurality of graphs are present, the list for selecting the graphs is displayed in the screen of the terminal unit so that the graphs can be selected by the mouse or the like. If the "diamond mark" is selected, a new graph is prepared and displayed on the basis of the sorting definition data.

If the "OK" button is selected in the screen of FIG. 230 by the mouse or the like, the graph is returned to the status (as shown in FIG. 229) of the screen before it is displayed. If the "SELECT RANGE" button is selected in the screen of FIG. 230, the header, as displayed below the graph, can be selected. If this header is selected, the selection range is clarified by changing the color of the selected portion of the graph, as shown in FIG. 231.

In FIG. 231, what is selected is the range in which the volume of transactions is "NO LESS THAN 1000000 AND LESS THAN 3000000". If the management point having its range selected is pasted to the worksheet, the data for the selected range are fetched.

The individual data items, as defined as the integral data items or the grouped data items, are not displayed in the list of the data items, but the representative name of the integral data items or the group name of the grouped data items is displayed in the list of the data items. If this representative or group name is double-clicked by the mouse, the control is transferred to the grouping data item selector 34 so that the individual data items composing the integral data items or the grouping data items are additionally displayed.

By the mouse operation of selecting and dragging the desired data from the sorting data or the list of data items (containing the data item list, as displayed by selecting the integral data items and the grouping data items), as displayed by selecting the management point list, the desired data are pasted to the worksheet (as shown in FIG. 232) so that the layout is decided.

In case the management point is selected with its segment definition being neither inserted nor displayed, the hierarchized sorting data, as recorded/managed in the dictionary 3 in relation to that management point, are fetched and listed up in the terminal screen in accordance with the display order. The terminal operator completes the selecting operations for the management points by selecting the sorting data from the list by the mouse or the like. In case the sorting data are to be confirmed at this time, they can be displayed in the terminal screen and confirmed by selecting the desired sorting data from the list and double-clicking it by the mouse.

The layout determinator 32 receives the terminal operation of completing the layout operation by the terminal user and confirms the absence of significant inconsistency. After this, the layout determinator 32 transfers the control to the data fetch driver 35 to generate a procedure instruction for driving the retrieving/processing mechanism until it transfers the control to the retriever. If, in the generation of the procedure instruction, the selected data item extends over a plurality of tables, the link between the tables is automatically made by referring to the content of the table link defining area which is recorded/managed by the dictionary 3. In case, on the other hand, the selected data item is the operated one, a procedure including an arithmetic formula is created with reference to the arithmetic formula for the data item attribute data recording area which is also recorded/managed by the dictionary 3.

In case the management point having the selected range (as selected by the graph) is present, the procedure for restricting the exploitation of the segment definition data is created together.

The retriever 36 interprets the created procedure instruction to execute the retrieval/processing for the database data and transfers the control to the media transformer 38. After the retrieval/processing result has been transformed into the format, in which it can be displayed in the screen of the terminal unit, it is displayed in the screen of the terminal unit by the data display linker 39 to realize the data linkage with other spreadsheet softwares or the like (as shown in FIG. 91).

(4-4) Consistency Assurance of Management Points Accompanying Update of Master Data In case the master data to be sent out from the trunk business system are to be changed, the corresponding extracted job has to be executed to update the data of the public database.

The operations management supporting main controller 41 controlling the entirety of the operations support unit 5 displays the initial menu of the operations management for starting a predetermined processing for the operations management, in the screen of the terminal unit, as shown in FIG. 5. The terminal operator transfers the control to the data extractor 43 by selecting the menu item corresponding to the extracted job execution by the mouse or the like.

The data extractor 43 starts the extracted job, which is generated by the extracted job definer 42 (as shown in FIG. 4) for defining the extracted job of the trunk business database data, and extracts the database data from the trunk business system and registers them in the public database 2.

By selecting the corresponding extracted job from the list (as shown in FIG. 233) of the extracted jobs, as displayed by the data extractor 43, by the mouse or the like, the extracted job is started so that the database data are replaced/updated by the new content.

The sorting data consistency assurer 4 confirms, when it receives the control from the data extractor 43, that the sorting data of the management points have been defined in the replaced database data, by retrieving the segment specification recording area, the data item recording area and the data item attribute recording area of the dictionary 3 sequentially. If related sorting data are present, the consistency assurer 44 informs the terminal unit of the warning of the existence by a message, as shown in FIG. 234. Moreover, the consistency assurer 44 confirms the terminal operator whether or not he desires to examine that an inconsistency is caused if the sorting data are applied to the replaced database data, i.e., whether or not the consistency is to be confirmed. If the terminal operator desires the confirmation (that is, the "CONFIRM" is selected), the segmenting operation is executed by applying the segment definition to the values of the data item of the extracted table with reference to the segment definition data of the corresponding segment specification data recording area.

In case the execution causes an inconsistency (in case a new dealer code other than the segment or the like is added), the warning message is outputted to make a caution, as shown in FIG. 235.

With this warning, the terminal operator can select one of the ignorance of the warning, the temporary suppression of the publication of the segment definition and the change of the segment definition.

If the "IGNORE" button is selected, the warning is ignored to check the subsequent consistency.

In case the "SUPPRESS PUBLICATION" button is selected, the public segment of the sorting data recording area, as recorded/managed by the dictionary 3, is updated (or changed from "0" to "1"), as shown in FIG. 236. As a result, at the stage of exploiting the database data, the display of the list for selecting an allocation to the layout is suppressed.

If the "CHANGE SEGMENT DEFINITION" button is selected, the control is transferred to the sorting data definer 89 so that the sorting data can be corrected by displaying the screen of FIG. 237.

If the "CHANGE" button is selected in the screen of FIG. 237, the segment definition worksheet can be changed. The terminal operator can suitably change the definitions while observing the data value having a problem in the consistency such as the unmatch, as displayed at the righthand side of the terminal screen.

In the screen of FIG. 238, the row, in which the "DEALER CODE" of the righthand side of the screen is at "2112", is selected by the mouse, and the "□□ DEALER" of the worksheet is pasted to the second column, so that the dealer having the dealer code of "2112" can be added to the segment of "□□ DEALER".

If the "OK" button is selected, it is deemed that a series of changes have been completed, and the confirmation of the consistency is executed again. If no problem is found, the corresponding segment specification recording area of the dictionary 3 is updated (as shown in FIG. 239).

In case the management point graph is defined in relation to the changed segment definition, the confirmation message is displayed, as shown in FIG. 240, and it becomes possible to select whether or not the graph is to be updated (that is, the graph is created again with the changed new segment definitions and reflected upon the dictionary).

<<Embodiment 5>>

The fifth embodiment of the present invention relates to a function to supporting the data exploitations, to which the management points in the database system shown in FIG. 1 are applied, and is characterized by the function for supporting the re-design of the database based upon the claim data of the database.

Upon the exploitations of the database data by the end user, the operations are performed according to the level of the skills or skill degrees of the end user. In the prior art, however, the following operations are ordinarily performed.

(a) The system branch cannot recognize the data desired by the individual end users in advance. In the ordinary cases, therefore, public tables, as summarized to some extent (closer to the transaction data), are prepared, and the subsequent processings are entrusted upon the end users (having relatively high skills).

(b) The target tables, as having data close to those desired by the individual users, are prepared in advance so that what is required of the users is to perform retrievals (for medium class users).

(c) Programs and menu for routine works are prepared (for beginners).

In any of the cases (a) to (c), however, various problems arise.

Specifically, in the aforementioned operations, the users have frequently made the following claims.

(a) Desired data are not achieved or found out.

In other words, the data, as prepared in advance in the system branch, have failed to satisfy the demands of the users.

(b) The expected results cannot be obtained.

Specifically, the data, as prepared in the system branch, are different from those expected by the users. Because of insufficient preparations of data, the users use the data different from the expected ones. Alternatively, the prepared data themselves are as expected, but unexpected results are caused by the erroneous processing methods of the users.

(c) The processing time period is extremely long.

Specifically, the cases to be actually processed are so many that a long time period is required. This long time period may be invited because the users have such low skills that take a time taking processing such as the direct product or the Cartesian product.

Therefore, the fifth embodiment of the present invention is enabled to make the public database capable of flexibly matching the desires of the end users by collecting the claims automatically from the users and by preparing or re-designing the database data on the basis of the collected data.

To the operating function for the user to utilize the database data, there is added the memo processing function to describe the aforementioned claims. Here, the data input to the claim memo processing functions by the users are divided into the following cases.

(1) Case of No Item Found

In case no item is found, there is inputted a memo of document format such as the item name or the item meaning (e.g., the detail name annotation, a use object, a data type, a data unit and a numerical measure).

(2) Case of Different Results

In case the results are different, a memo of document format or a file of spreadsheet data format is inputted as above as the final data format that is desired by the user.

(3) Case of Long Time Period

In the case of a long time period, only the claim of the long time is inputted because the operation data and the processing time period are held at the system side on the basis of the operations.

The memo processing function unit attaches the operation data of the user to the aforementioned claim data, and stores the data in the claim storage unit prepared in advance or sends the same to the database manager.

The claim processing unit monitors the claim storage unit and informs the arrival of the claim from the user, of the database manager to extract the problems.

On the basis of the claim data, the database manager performs the following operations to prepare the database environments through the claim processing unit having the re-designing function.

(1) Case of No Data Found

In case no data is found, the preparation of data is sufficient, or the data themselves are short. Therefore, the data are re-designed in case the preparation of the data is insufficient. In case, on the other hand, the data in the environments of the database system of the company are short, the external data are fetched.

(2) Case of Different Results

In case the results are different from the expected ones, the preparation of data is insufficient, or the using method is mistaken. Therefore, the data are re-designed in the case of insufficient data preparation. In the case of mistaken using method, virtual items or the like are defined in the common dictionary, or a processed object table is made, if identical errors frequently occur.

(3) Case of Long Processing Time

In the case of long processing time, the using frequency is high, or the direct product is processed by the user's error. Therefore, preparations such as creations of secondary tables are made in the case of high using frequency. On the other hand, the erroneous definitions of logical coupling relations are corrected in case a long time period is taken by the direct product due to the user's error.

The fifth embodiment of the present invention thus constructed is characterized in the functional constructions of the setup unit 4, the inquiry unit 6 and the operations support unit 5 in the basic construction of the database system shown in FIG. 1.

FIG. 241 schematically shows the functional portions for the claim processing according to the database system of the fifth embodiment of the present invention, in relation to the operations. In FIG. 241, there are shown only those portions of the setup unit 4, the operations support unit 5 and the inquiry unit 6 of the database system of the present invention, which are related mainly to the fifth embodiment.

In FIG. 241, the portions belonging to the setup unit 4 are a data setup main controller 11 and a claim data processor 91. The portion belonging to the operations support unit 5 is a operations management supporting main controller 41. The portions belonging to the inquiry unit 6 are a data exploitation main controller 31, a retriever 36, a data display linker 39, a claim settler 92 and an operations data storage 93. The public database 2 is managed by the database manager 5A or the portion of the data base management system (DBMS) function contained in the operations support unit 5. Moreover, a common dictionary 3A and an individual dictionary 3B forms together a portion of the dictionary 3. A operations data storage file 7A, a claim storage file 7B and a claim management file 7C form altogether a portion of the data file 7.

Next, the functions and operations of the aforementioned individual portions will be described in detail in connection with the specific operations and processings.

(5-1) Automatic claim settlements (as indicated at ① in FIG. 241) in case the user uses the setup function while the inquiry unit 6 is selecting the items.

Specifically, in case the user uses the setup function during the item selection in the inquiry unit 6, the control is transferred to the claim settler 92 from the data exploitation main controller 31 of the inquiry unit 6. Then, the contents of the setup operations are stored in the claim storage file 7B in relation to the contents of the operations data storage file (i.e., the use log file) 7A which is sequentially stored with the history of the operations data by the operations data storage 93. In case the management point is not set, the management points are stored in the individual dictionary 3B through the data setup main controller 11 of the setup unit 4 and together with the content of the setup operations in the claim storage file 7B.

(5-2) The retrievals are demanded (as indicated at ② in FIG. 241) by the instruction from the user.

Specifically, when the user instructs the retrieval of the data of the database, the control is transferred from the data exploitation main controller 31 to the retriever 36 of the inquiry unit 6, so that the retriever 36 retrieves the data of the public database 2 through the database manager 5A.

(5-3) The retriever 36 notifies the processed results to the data exploitation main controller 31 of the inquiry unit 6 and displays the processed results in the screen of the terminal unit through the data display linker 39 thereby to report them to the user (as indicated at ③ in FIG. 241).

(5-4) In response to the claim from the user, the claim settler 92 writes the claim data in the claim storage file 7B or sends the claim data as a mail or the like to the database manager (as indicated at ④ in FIG. 241).

Specifically, in response to the claim of the user from the data display linker 39 or the data exploitation main controller 31, the claim settler 92 writes the claim data in the claim storage file 7B or sends them as a mail or the like to the database manager.

(5-5) In response to the main or in accordance with the monitoring situation of the claim storage file 7B, the operations management supporting main controller 41 rearranges those log data and delivers them to the claim data settlements for re-designing and tuning (as indicated at ⑤ in FIG. 241).

Specifically, in response to the mail or in accordance with the monitoring situation of the claim storage file 7B, the operations management supporting main controller 41 for monitoring the claim storage file 7B rearranges those log data and delivers them to the claim data processor 91 for the claim data settlements for the re-designing and turning.

(5-6) The database manager reflects the re-designed results or the tuned results, as obtained by the settlements of the claim data processor 91, upon the public database 2 (as indicated at ⑥ in FIG. 241).

Specifically, when the re-designing or tuning is performed by the claim data processor 91, the database manager is based upon the results to update the public database 2 through the common dictionary 3A and the retriever 36.

(5-7) The data of the completed claim settlement and the data relating to the uncorresponding claim data are reported to the user (as indicated at ⑦ in FIG. 241).

Specifically, the database manager sends the claim settlement data indicating the result of the completed claim settlement and the claim data unsettled for the claim, by the mail to the user of the claim source.

Incidentally, the opportunities for the claims from the user are divided into the following two cases. (1) Because of no necessary item in the course of the item selecting operation, the user himself defines the items.

In this case, the claim settlement is automatically executed without awaiting the instruction of the user. (2) As a result of the final inquiry processing, the user detects the deficiency of data or the abnormal data value.

In this case, the system processes in response to the claim instruction from the user because it cannot automatically recognize.

In either of these cases, the claim settling mechanism according to the present embodiment performs identical operations.

The data to be stored in the claim recording area of the claim storage file 7B are enumerated, as follows (as shown in FIG. 242).

(A) Claim Classes

1: Undefined Management Point

2: Undefined Item

3: Undefined Linkage

4: Segment Level Error

5: Accumulating Method Error

6: Linking Method Error/Insufficient Master

7: Data Value Error (B) Claim Transmission Time

The claim transmission time is recorded in the format of yy/mm/dd hh:mm:ss (i.e., year/month/day, hour:minute:second), for example. This is used for determining the priority for adding the claim transmission date to a return mail or for settling the claim when the claim is solved.

(C) Claim Transmitter

The user ID (or identifier) of the claim transmitter is recorded.

(D) Claim Opportunity

The claim occurrence opportunity is recorded.

1: At the item selecting time, the user performed the setup operation.

2: At the item selecting time, the user could not find the items and performed the claim processing.

3: At the time of confirming the processed result, the user detected the error in the data.

(E) Demand Transmission Time (F) Result Reception Time

The time period required for the inquiry is recorded as the data for the analysis.

(G) Pointer to Attached Data

In the presence of attached data, the pointer to the attached data recording file is recorded.

The data to be stored in the attached material recording area of the claim storage file 7B are enumerated, as follows (as shown in FIG. 2443).

(A) Size

The overall size of the data, as attached to one claim, is recorded.

(B) Attached Data No.

The number of attached data, if in plurality, is recorded.

(C) Class of Attached Data

1: Memo

What the user sent to the manager is recorded if it is a comment.

2: Management Point Data, as Set

In case the user himself set up the management points, these management point data (as should be referred to the first embodiment of the present invention) are recorded.

3: File

The sample or the like (e.g., a file of csv format) of a desired result file is recorded.

4: Operation Content

If the data were erroneous or took a long processing time, the operation content of the user is restored, and its data is recorded for the analysis.

(D) Attached Data Size

The size of the attached data, as follows, is recorded.

(E) Attached Material

The content of the attached data is recorded depending upon their classes such that the test is recorded for the memo data whereas the table itself is recorded for the management point data.

When the operations of this system are started, the claim settler 92, to which the control is transferred from the data exploitation main controller 31 or the data display linker 39, performs various claim settlements according to the claim classes, as shown in the flow chart of FIG. 244.

First of all, it is checked (at step S11) whether or not the management point is undefined. If the management point is undefined, the claim class is set at 1, and the remaining data are recorded in the claim recording area. At the same time, the management point data, as registered in the personal dictionary by the data setup main controller 11, are recorded in the attached data recording area and are individually stored in the claim storage files (at step S12). Depending upon the environment setting, moreover, the mail is directly sent to the operations management main controller 41.

At this time, the claim data and the attached material data are written, as shown in FIG. 245, in the claim recording area and the attached data recording area of the claim storage file 7B.

Next, the claim storage procedure according to the claim classes is executed as in the above, as shown in FIG. 246. Specifically, it is checked (at step S13) whether or not the item is undefined. If the item is undefined, the claim storage operation is executed (at step S14).

The operations management main controller 41 scans the individual personal claim storage files. If a claim is newly added, the individual claim data are merged to the claim management file (at step S15).

When this merge is completed, the operations management main controller 41 transfers the control to the data setup main controller 11.

This data setup main controller 41 thus having received the control transfers the control to the claim data processor 91. This claim data processor 91 analyzes the individual claims to list up the claim states in FIG. 247 (at step S16).

Now, the claim classes are selected, and the "SETTLE CLAIM" button is selected to transfer the control to each claim settlement.

In case there is a claim having its management point undefined (at step S17), the claim data processor 91 accumulates the management points, which have identical names and meanings, as the identical management points, and lists up the undefined management points, as shown in FIG. 248. By selecting the "HISTOGRAM" button, the using frequency of each undefined management point is displayed as a histogram graph, for example (at step S18).

By selecting each row by the mouse or the like and by selecting the "CLAIM DATA" button, as shown in FIG. 248, reference can be made to all the data which are stored as the claim data.

Moreover, when the operator selects any row and the "REGISTER" button in FIG. 248, the claim data processor 91 transfers the control together with the management point data to the management point definer 19 (at step S18).

If there is a management point in a more significant segment of the management point corresponding to the management point data transferred, the management point definer 19 registers the transferred management point data, as the component of the more significant management point, in the segment data recording area of the dictionary 3 (at step S18).

If no more significant segment is in the management point corresponding to the transferred management point data, the management point definer 19 newly registers the management point corresponding to the transferred management point data, in the management point recording area, and records the management point data in the segment data recording area of the dictionary 3 (at step S18).

The remaining claims are subjected to various definitions/registrations as in the above (at step S19).

The claim data processor 91 transmits the finish to each of the users having transmitted the claim, as to the claims which have been settled (at steps S20 and S21). The transmission of this finish notification is executed by depressing the "NOTIFY FINISH" button in the screen of FIG. 247, for example.

If notified from the claim data processor 91, the data exploitation main controller 31 notifies the user of the registration finish by the pop-up display, as shown in FIG. 249. In case the user defines the management point at the item selecting time by using the setup function, the registration finish of the management points is notified, as shown in FIG. 249.

If the "NOTIFY UNFINISH" button is depressed in the screen of FIG. 247 (at step S22), the notification of unfinish is transmitted to the user having transmitted the claim (at step S23).

The transmission of the notification of unfinish without settling the claims from the users is executed in the following cases:

the case, in which it takes a long time to take the consensus for the management points or the like from the branch or entirety of a company or in which the consensus cannot be achieved; and the case, in which the data in the branch or entirety of a company cannot satisfy the data desired by the user.

In these cases, the notification of unfinish is transmitted to each user as in the notification of claim settlement.

If the mail notifying the unfinish comes from the claim data processor 91, the data exploitation main controller 31 performs the pop-up displays to inform the user of it as in the notification of finish.

Thus, the claims of the users can be promptly analyzed to perform the proper data re-design so that the data desired by the users can be promptly prepared.

<<Other Embodiments>>

Incidentally, the present invention should not be limited to the foregoing first to fifth embodiments but can be modified in various manners without departing from the gist thereof.

For example, first another database system may comprise:

a trunk database for storing the master data and the transaction data of a trunk system;

a public database extracted from said trunk database and subjected to a predetermined processing for an information system;

a dictionary for storing the data containing secondary table definition data for defining a job for generating a processed secondary table, in said public database in a manner to correspond to database data;

setup section for recording/managing the data items of the database data of said public database and the management points corresponding to references of managements and evaluations for data exploitations, by said dictionary in a corresponding manner and for recording/managing said secondary table definition data by said dictionary;

inquiry section for fetching the data of the final type, which have been subjected to a predetermined processing, in accordance with a demand of a user and for acquiring an operation log indicating the operation history of the user; and operations support section for extracting said master data and said transaction data from said trunk database to generate a public database, for monitoring the status of said public database and changing the data environments, and for making/arranging the processed secondary table on said public database on the basis of said operation log and with reference to the secondary table definition data of said dictionary.

In this case, the data containing the secondary table definition data are stored in a manner to correspond to the database data in the dictionary. These secondary table definition data define the jobs for generating the processed secondary table in the public database. Moreover, the setup unit records/manages the secondary table definition data by the dictionary, and records/manages the data items of the database data of the public database and the management points corresponding to the references for the managements and evaluations for the data exploitations in a corresponding manner by the dictionary. In accordance with the demand of the user, moreover, the inquiry unit fetches the data of the final format, which has been subjected to a predetermined processing, in a usable mode and acquires the operation log indicating the operation history of the user. The operations support unit generates the public database by extracting the master data and the transaction data from the trunk database, monitors the status of the public database and changes the data environments, and creates/arranges the processed secondary table over the public database by referring the secondary table definition data of the dictionary on the basis of the operation log.

Moreover, said operations support section may include: range setting section for specifying the range for a secondary table on said operation log on the screen of a terminal unit by displaying said operation log in said screen; and secondary table generating section for generating a secondary table corresponding to the content of the range of said operation log, as specified by said range setting section.

The inquiry section may include processing transformation section for transforming the processing of said operations support section into the processing corresponding to a secondary table, if any, by referring the secondary table definition data of said dictionary in accordance with the demand of the user.

Moreover, another first database data exploitation support apparatus for constructing a similar database system may comprise:

setup section for storing and recording/managing the secondary table data definition data for defining the management points corresponding references of managements and evaluations for data exploitations and the jobs for generating a secondary table processed in a public database, as the data containing said management point data, the definition data for the references of the managements and evaluations, and said secondary table definition data, by a dictionary in a manner to correspond to the data items of the database data stored in said public database;

inquiry section for fetching the data of the final type, which have been subjected to a predetermined processing, in accordance with a demand of a user and with reference to said dictionary and for acquiring an operation log indicating the operation history of the user; and operations support section for extracting said master data and said transaction data from the trunk database of a trunk system to generate said public database, for monitoring the status of said public database and changing the data environments, and for making/arranging the processed secondary table on said public database on the basis of said operation log and with reference to the secondary table definition data of said dictionary.

Moreover, the operations support section may include: range setting section for specifying the range for a secondary table on said operation log on the screen of a terminal unit by displaying said operation log in said screen; and secondary table generating section for generating a secondary table corresponding to the content of the range of said operation log, as specified by said range setting section.

The inquiry section may include processing transformation section for transforming the processing of said operations support section into the processing corresponding to a secondary table, if any, by referring the secondary table definition data of said dictionary in accordance with the demand of the user.

Second another database system may comprise:

a trunk database for storing the master data and the transaction data of a trunk system;

a public database extracted from said trunk database and having been subjected to a predetermined processing for a data system;

a dictionary for storing the data containing at least any of calendar data intrinsic to a branch and a business and common to the entirety, as corresponds to the database data of at least one of said trunk database and said public database;

setup section for recording/managing said calendar data by said dictionary in a manner to correspond to said database data;

inquiry section for fetching the data of the final type, which have been subjected to a predetermined processing, in accordance with a demand of a user and on the basis of the calendar data stored in said dictionary; and operations support section for extracting said master data and said transaction data from said trunk database to generate said public database and for monitoring the status of said public database and changing the data environments.

In this case, the dictionary stores the data containing the calendar data. These calendar data are the calendar data which are intrinsic to a branch or a work or common to the entirety, as made to correspond to the database data. Moreover, the setup unit records/manages the calendar data in the dictionary in a manner to correspond to the database data. Moreover, the inquiry unit fetches the data of the final type, which has been subjected to a predetermined processing, in accordance with the demand of the user and on the basis of the calendar data stored in the dictionary.

Moreover, the setup section may include formula definition section for storing said dictionary with definition data for defining an operation/processing formula using a calendar for a desired data item, and wherein said inquiry section may include calculation processing section for executing calculation processings according to said operation/processing formula, when it refers to the data item for said operation/processing formula defined in said dictionary, on the basis of the definition data of said dictionary.

Moreover, second another database data exploitation support apparatus for constructing a similar database system may comprise:

setup section for recording/managing the data containing at least any of calendar data intrinsic to a branch and a business and common to the entirety, as corresponds to the database data of at least one of a trunk database and a public database, in a manner to correspond to said database data by a dictionary for storing the data containing said calendar data;

inquiry section for fetching the data of the final type, which have been subjected to a predetermined processing, in accordance with a demand of a user and on the basis of the calendar data stored in said dictionary; and operations support section for extracting said master data and said transaction data from said trunk database to generate said public database and for monitoring the status of said public database and changing the data environments.

Moreover, the setup section may include formula definition section for storing said dictionary with definition data for defining an operation/processing formula using a calendar for a desired data item, and wherein said inquiry section may include calculation processing section for executing calculation processings according to said operation/processing formula, when it refers to the data item for said operation/processing formula defined in said dictionary, on the basis of the definition data of said dictionary.

Third another database system may comprise:

a trunk database for storing the master data and the transaction data of a trunk system;

a public database extracted from said trunk database and having been subjected to a predetermined processing for a data system;

a dictionary for storing the data containing the unit data as the attributes of the data items of the database data of the database data of at least one of said trunk database and said public database;

setup section for recording/managing said unit data by said dictionary in a manner to correspond to the data items of said database data;

inquiry section for fetching the data of the final type, which have been subjected to a predetermined processing, in accordance with a demand of a user and for generating the data of the final type of said data items by calculating the unit based upon said unit data, with reference to the unit data stored in said dictionary; and operations support section for extracting said master data and said transaction data from said trunk database to generate said public database and for monitoring the status of said public database and changing the data environments.

In this case, the dictionary stores the data containing the unit data as the attributes of the data items of the database data. Moreover, the setup unit records/manages the unit data in the dictionary in a manner to correspond to the data items of the database data. Moreover, the inquiry unit generates the data of the final type of the data items by referring to the unit data, which are stored in the dictionary, in accordance with the demand of the user when the data of the final type having been subjected to the final processing are to be fetched, and by calculating the unit based upon the unit data.

Moreover, the dictionary may store the data containing the operation rules and unit data of the data items generated by the operations/processings, wherein said setup section may include rule management section for recording/managing said operation rules and said unit data of the data items generated by the operations/processing, in said dictionary, and wherein said inquiry section may include calculation processing section for performing the calculation processings according to the arithmetic rules, if defined, when the data of the data items generated by said operations/processings are to be fetched.

The inquiry section may include unit processing section for creating an arithmetic formula to make identical the units of data items to be calculated, on the basis of the unit data of said dictionary if the data item having its unit defined is selected to be operated, in case the user designates at least one of a desired unit and the arithmetic formula undefined in said dictionary.

The dictionary may store the data containing the operation rules for achieving a plurality of unit data and units for one data item, wherein said setup section may include rule management section for recording/managing said operation rules and said unit data in said dictionary, and wherein said inquiry section may include calculation processing section for performing the calculation processings according to the arithmetic rules, if defined, when the data of the data items generated by said operations/processings are to be fetched.

Third another database data exploitation support apparatus for constructing a similar database system may comprise:

setup section for recording/managing the data containing the unit data as the attributes of the data items of at least one of the trunk database of a trunk system and the public database, which is extracted from said trunk database, by a dictionary in a manner to correspond to said data items;

inquiry section for fetching the data of the final type, which have been subjected to a predetermined processing, in accordance with a demand of a user and for generating the data of the final type of said data items by referring to the unit data stored in said dictionary and by calculating the unit based upon said unit data; and operations support section for extracting master data and transaction data from said trunk database to generate said public database and for monitoring the status of said public database and changing the data environments.

Moreover, the dictionary may store the data containing the operation rules and unit data of the data items generated by the operations/processings, wherein said setup section may include rule management section for recording/managing said operation rules and said unit data of the data items generated by the operations/processing, in said dictionary, and wherein said inquiry section may include calculation processing section for performing the calculation processings according to the arithmetic rules, if defined, when the data of the data items generated by said operations/processings are to be fetched.

The inquiry section may include unit processing section for creating an arithmetic formula to make identical the units of data items to be calculated, on the basis of the unit data of said dictionary if the data item having its unit defined is selected to be operated, in case the user designates at least one of a desired unit and the arithmetic formula undefined in said dictionary.

The dictionary may store the data containing the operation rules for achieving a plurality of unit data and units for one data item, wherein said setup section may include rule management section for recording/managing said unit data and said operation rules in said dictionary, and wherein said inquiry section may include calculation processing section for performing the calculation processings according to the arithmetic rules, if defined, when the data of the data items generated by said operations/processings are to be fetched.

Fourth another database system may comprise:

a trunk database for storing the master data and the transaction data of a trunk system;

a public database extracted from said trunk database and having been subjected to a predetermined processing for a data system;

a dictionary for storing the data containing the management point data corresponding to at least one of said trunk database and said public database, and the definition data for references of managements and evaluations;

setup section for recording/managing the management point data corresponding to the references of the managements and the evaluations for data exploitations, by said dictionary in a manner to correspond to the data items of said database data;

inquiry section for fetching the data of the final type, which have been subjected to a predetermined processing, as a layout based upon said management points in accordance with a demand of a user; and operations support section for extracting said master data and said transaction data from said trunk database to generate said public database and for monitoring the status of said public database and changing the data environments.

In this case, the dictionary stores the data containing the management point data, as made to correspond to the database data, and the definition data for the references of managements and evaluations. Moreover, the setup unit records/manages the management points in the dictionary in a manner to correspond to the data items of the database data. Moreover, the inquiry unit fetches the data of the final type, which has been subjected to a predetermined processing, as the layout based upon the management points, in accordance with the demand of the user.

Moreover, the dictionary may store the data for hierarchizing and defining the segment method of said management point, wherein said setup section may be section for recording/managing the data for hierarchizing and defining the segment method of said management point, in a manner to correspond to said management point data, and wherein said inquiry section may be section for laying out and fetching the data of the final type, which have been processed by said setup section and said operations support section, in accordance with the segment method of said management point in accordance with the demand of the user and with reference to the management point.

The setup section may include segment definition section for defining the segment data containing the method of using the data directly and the method of adding a meaning, as the segment method of said management point.

The inquiry section may include layout determination section for determining said fetching format by adhering the selected management point to the worksheet for determining the fetching format of the database data, dialogically by the user through the display screen of the terminal unit.

Moreover, fourth another database data exploitation support apparatus for constructing a similar database system may comprise:

a dictionary for storing the data containing the management point data corresponding to at least one of said trunk database and said public database, and the definition data for references of managements and evaluations;

setup section for recording/managing the management point data corresponding to the database data of at least one of a trunk database and a public database, and definition data for references of the managements and the evaluations, by a dictionary to be stored with said management points and said definition data, in a manner to correspond to the data items of said database data;

inquiry section for fetching the data of the final type, which have been subjected to a predetermined processing, as a layout based upon said management points in accordance with a demand of a user; and operations support section for extracting said master data and said transaction data from said trunk database to generate said public database and for monitoring the status of said public database and changing the data environments.

Moreover, the dictionary may store the data for hierarchizing and defining the segment method of said management point, wherein said setup section may be section for recording/managing the data for hierarchizing and defining the segment method of said management point, in a manner to correspond to said management point data, and wherein said inquiry section may be section for laying out and fetching the data of the final type, which have been processed by said setup section and said operations support section, in accordance with the segment method of said management point in accordance with the demand of the user and with reference to the management point.

The setup section may include segment definition section for defining the segment data containing the method of using the data directly and the method of adding a meaning, as the segment method of said management point.

The inquiry section may include layout determination section for determining said fetching format by adhering the selected management point to the worksheet for determining the fetching format of the database data, dialogically by the user through the display screen of the terminal unit.

It is apparent that, in this invention, a wide range of different working modes can be formed based on the invention without deviating from the spirit and scope of the invention.

What is claimed is:

1. A database system comprising:

a trunk database for storing master data and transaction data of a trunk system;

a public database extracted from said trunk database and subjected to a predetermined processing for an information system;

a dictionary for storing data containing consistency definition data for defining data setup jobs for assuring consistency of database data of at least one of said trunk database and said public database and restricting conditions for executing said data setup jobs;

setup means for recording/managing the consistency definition data for defining the data setup job for assuring the consistency of the database data of at least one of the master data and the transaction data, which are extracted from said trunk database, and the restricting conditions for executing said data setup jobs, by said dictionary;

operations support means for extracting said master data and said transaction data from said trunk database to generate a public database, and for executing the data setup jobs for assuring the consistency of said database data by monitoring statuses of said public database and changing data environments and by referring to said consistency definition data of said dictionary; and inquiry means for processing/outputting the data of said public database, which have been processed by said setup means and said operations support means, in accordance with a demand of a user.

2. A system according to claim 1, wherein said operations support means includes time consistency means for compensating the time inconsistency of the transaction data collected from said original database, by executing said data setup job based on said consistency definition data.

3. A system according to claim 1, wherein said operations support means includes edition consistency means for compensating the edition inconsistency of master data corresponding to transaction data collected from said original database, by executing said data setup job based on said consistency definition data.

4. A system according to claim 1, wherein said operations support means includes processing consistency means for preventing the inconsistency of secondary processed data corresponding to the interchange of transaction data collected from said original database, by executing said data setup job based on said consistency definition data.

5. A system according to claim 1, wherein said dictionary stores calendar data for operating/managing said system, said setup means records/manages the timing data for executing said data setup job by said calendar data, and said operations support means executes said data setup job in accordance with said timing data.

6. A system according to claim 1, wherein said operations support means includes hold means for holding the publication of data within a corresponding predetermined range, if the consistency cannot be assured by the execution of said data setup job.

7. A database data exploitation support apparatus comprising:

setup means for recording/managing consistency definition data for defining data setup jobs for assuring consistency of database data of at least master data and transaction data, which are extracted from a trunk database of a trunk system, and restricting conditions for executing said data setup jobs, by a dictionary for storing the data containing said consistency definition data;

operations support means for extracting said master data and said transaction data from said trunk database to generate public database, and for executing data setup jobs for assuring assurance of said database data, by monitoring status of said public database and changing data environments and by referring to said consistency definition data of said dictionary; and inquiry means for processing/outputting the data of said public database, which have been processed by said setup means and said operations support means, in accordance with a demand of a user.

8. An apparatus according to claim 7, wherein said operations support means includes time consistency means for compensating the time inconsistency of the transaction data collected from said original database, by executing said data setup job based on said consistency definition data.

9. An apparatus according to claim 7, wherein said operations support means includes edition consistency means for compensating the edition inconsistency of master data corresponding to transaction data collected from said original database, by executing said data setup job based on said consistency definition data.

10. An apparatus according to claim 7, wherein said operations support means includes processing consistency means for preventing the inconsistency of secondary processed data corresponding to the interchange of transaction data collected from said original database, by executing said data setup job based on said consistency definition data.

11. An apparatus according to claim 7, wherein said dictionary stores calendar data for operating/managing said system, said setup means records/manages the timing data for executing said data setup job by said calendar data, and said operations support means executes said data setup job in accordance with said timing data.

12. An apparatus according to claim 7, wherein said operations support means includes hold means for holding the publication of data within a corresponding predetermined range, if the consistency cannot be assured by the execution of said data setup job.

* * * * *